US011368031B2

(12) United States Patent
Qian et al.

(10) Patent No.: US 11,368,031 B2
(45) Date of Patent: Jun. 21, 2022

(54) POWER DISTRIBUTION AND CIRCUIT PROTECTION FOR A MOBILE APPLICATION HAVING A HIGH EFFICIENCY INVERTER

(71) Applicant: Eaton Intelligent Power Limited, Dublin (IE)

(72) Inventors: Lewei Qian, Novi, MI (US); Daniel R. Ouwenga, Portage, MI (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 16/827,116

(22) Filed: Mar. 23, 2020

(65) Prior Publication Data

US 2020/0274375 A1 Aug. 27, 2020

Related U.S. Application Data

(60) Provisional application No. 62/866,478, filed on Jun. 25, 2019, provisional application No. 62/855,413, (Continued)

(30) Foreign Application Priority Data

Mar. 22, 2019 (IN) ......................... IN201911011137
May 24, 2019 (IN) ......................... IN201911020670

(Continued)

(51) Int. Cl.
*H02J 7/00* (2006.01)
*B60R 16/033* (2006.01)

(52) U.S. Cl.
CPC .......... *H02J 7/0031* (2013.01); *B60R 16/033* (2013.01)

(58) Field of Classification Search
CPC ...... H02P 1/10; H02P 1/12; H02P 1/16; H02P 1/163; H02P 1/18; H02P 1/24; H02P 1/26;

(Continued)

(56) References Cited

U.S. PATENT DOCUMENTS 2,545,639 A 3/1951 Wolff et al.
2,618,688 A 11/1952 Pulvari (Continued)

FOREIGN PATENT DOCUMENTS

CN 102903580 A 1/2013
DE 102009023801 A1 2/2010

(Continued)

OTHER PUBLICATIONS

"Second Quarter 2019 Results", Delphi Technologies [PowerPoint Slides], Aug. 1, 2019, 26 pages.

(Continued)

*Primary Examiner* — Antony M Paul
(74) *Attorney, Agent, or Firm* — GTC Law Group PC & Affiliates

(57) ABSTRACT

A power electronics assembly for a mobile application includes a first power electronics component selectively coupled to a high source on a first side and coupled to a high voltage battery on a second side, a second power electronics component selectively coupled to one of a low load or a low voltage battery on a first side and coupled to the high voltage battery on a second side; and a controller, including an operating mode circuit structured to determine a discharge operating mode for the mobile application, a power electronics configuration circuit structured to provide a switch state value for the first power electronics component and the second power electronics component in response to the discharge operating mode, and wherein the first power (Continued)

electronics component and the second power electronics component are responsive to the switch state value to coupled selected ones of the high source, low load, and low voltage battery to the high voltage battery.

18 Claims, 307 Drawing Sheets

Related U.S. Application Data filed on May 31, 2019, provisional application No. 62/881,447, filed on Aug. 1, 2019.

(30) Foreign Application Priority Data

Sep. 10, 2019 (IN) ........................ IN201911036406
Dec. 31, 2019 (IN) ........................ IN201911054618

(58) Field of Classification Search

CPC .... H02P 1/42; H02P 1/46; H02P 1/465; H02P 3/14; H02P 5/00; H02P 6/00; H02P 6/002; H02P 6/20; H02P 7/00; H02P 7/0066; H02P 8/00; H02P 9/00; H02P 9/302; H02P 11/00; H02P 21/00; H02P 21/0035; H02P 21/0046; H02P 25/00; H02P 25/021; H02P 25/107; H02P 25/085; H02P 25/10; H02P 27/00; H02P 27/04; H02P 27/06; H02P 29/00; H02P 2005/4001; H02P 2005/4007; H02P 2007/632; H02P 2201/09; H02P 2201/07; H02M 3/00; H02M 3/22; H02M 5/40; H02M 7/00; H02M 7/02; H02M 2003/00; H02M 2007/00

See application file for complete search history.

(56) References Cited

U.S. PATENT DOCUMENTS 2,749,454 A 6/1956 Little et al.
2,786,968 A 3/1957 Kabak
2,994,015 A 7/1961 Edward
3,147,467 A 9/1964 Peter
3,172,010 A 3/1965 John
3,211,958 A 10/1965 Miller et al.
3,240,930 A 3/1966 Porter et al.
3,272,949 A 9/1966 Lawrence
3,491,315 A 1/1970 Kesselring
3,718,875 A 2/1973 Kussy et al.
3,914,723 A 10/1975 Goodbar
4,023,127 A 5/1977 Mune
4,032,870 A 6/1977 Oppel et al.
4,181,922 A 1/1980 Matsko et al.
4,208,689 A 6/1980 Dunham et al.
4,213,165 A 7/1980 Jansen et al.
4,262,179 A 4/1981 Bauer
4,518,055 A 5/1985 Yagi et al.
4,633,207 A 12/1986 McClellan et al.
4,816,792 A 3/1989 Belbel et al.
4,879,535 A 11/1989 Mori et al.
4,893,102 A 1/1990 Bauer
4,982,060 A 1/1991 Streich et al.
5,020,801 A 6/1991 Negron
5,021,760 A 6/1991 Krubsack et al.
5,029,064 A 7/1991 Ball
5,047,603 A 9/1991 Pardini
5,539,608 A 7/1996 Hurley et al.
5,559,426 A 9/1996 Shea et al.
5,654,859 A 8/1997 Shi
5,793,189 A * 8/1998 Kawaguchi ............ B60L 58/14
320/140
5,796,175 A 8/1998 Itoh et al.
5,872,497 A 2/1999 Yerkovich et al.
6,020,801 A 2/2000 Passow
6,768,402 B2 7/2004 Davidson et al.
6,894,463 B2 5/2005 Kernahan
6,975,191 B2 12/2005 Ward
7,030,641 B1 4/2006 Tang et al.
7,210,304 B2 5/2007 Nagashima et al.
7,514,990 B1 4/2009 Voo
7,561,448 B2 7/2009 Katayama et al.
7,595,710 B2 9/2009 Deboer et al.
7,644,220 B2 1/2010 Moriyama et al.
7,692,903 B2 4/2010 Dwyer et al.
7,777,600 B2 8/2010 Brooks
7,952,875 B2 5/2011 Woody et al.
7,957,169 B2 6/2011 Nakajima et al.
8,134,438 B2 3/2012 Brooks
8,138,440 B2 3/2012 Onufriyenko et al.
8,186,466 B2 * 5/2012 Verbrugge ............ B60W 20/00
180/65.275
8,378,623 B2 2/2013 Kusch et al.
8,520,381 B2 8/2013 Hobein et al.
8,587,912 B2 11/2013 Jezierski et al.
8,653,913 B2 2/2014 Vellaiyanaicken et al.
8,783,396 B2 * 7/2014 Bowman ................ B60L 58/21
180/65.285
8,805,314 B2 8/2014 Katsube et al.
8,829,722 B2 9/2014 Kusch et al.
8,981,727 B2 3/2015 Kusch et al.
8,994,327 B2 3/2015 Kusch et al.
9,130,421 B2 9/2015 Chamberlin et al.
9,148,946 B1 9/2015 Singh et al.
9,241,429 B2 1/2016 Kaneko et al.
9,493,077 B2 11/2016 Yamasaki et al.
9,504,191 B2 11/2016 Singh et al.
9,520,764 B1 12/2016 Bundschuh et al.
9,538,691 B2 1/2017 Kikuchi et al.
9,691,562 B2 6/2017 Neuhaus
9,726,726 B2 8/2017 Bock et al.
9,758,047 B2 * 9/2017 Hou ........................ B60L 58/20
9,923,546 B2 3/2018 Nagahisa et al.
9,969,276 B2 * 5/2018 DeDona .................. B60L 50/66
10,010,011 B2 6/2018 Donth et al.
10,032,588 B2 7/2018 Gonzales et al.
10,116,249 B2 * 10/2018 Zou ....................... H02M 7/797
10,149,413 B1 12/2018 Dede et al.
10,164,300 B2 12/2018 Lee et al.
10,242,829 B2 3/2019 Hasegawa et al.
10,269,520 B2 4/2019 Honick et al.
10,288,665 B2 5/2019 Smith
10,320,220 B2 * 6/2019 Ge .......................... H02P 25/18
10,361,051 B2 7/2019 Bock et al.
11,050,241 B2 6/2021 Fisher
11,052,784 B2 7/2021 Mensch et al.
11,063,421 B2 7/2021 Griffiths
11,070,049 B2 7/2021 Mensch et al.
11,075,514 B2 7/2021 Shah et al.
11,081,874 B2 8/2021 Fisher
11,081,875 B2 8/2021 Fisher
11,088,533 B2 8/2021 Fisher
11,095,115 B2 8/2021 Fisher
11,095,116 B2 8/2021 Douglass
11,101,639 B2 8/2021 Griffiths et al.
11,108,225 B2 8/2021 Fisher
11,114,840 B2 9/2021 Fisher
11,121,540 B2 9/2021 Dukaric et al.
11,128,124 B2 9/2021 Shah et al.
11,128,125 B2 9/2021 Fisher
11,152,781 B2 10/2021 Fisher
11,159,008 B2 10/2021 Fisher
11,183,833 B2 11/2021 Shah et al.
2003/0142449 A1 7/2003 Iwata et al.
2004/0105664 A1 6/2004 Ivankovic
2004/0189319 A1 9/2004 Stanisic et al.
2004/0207968 A1 10/2004 Martin et al.
2005/0006956 A1 1/2005 Shi
2007/0058303 A1 3/2007 Hirai et al.
2007/0076355 A1 4/2007 Oohama
2007/0290646 A1 12/2007 Hasenour et al.
2008/0137253 A1 6/2008 George et al.

(56) References Cited

U.S. PATENT DOCUMENTS

| | | | | |
|---|---|---|---|---|
| 2009/0057112 | A1 | 3/2009 | Bennett et al. | |
| 2010/0172515 | A1 | 7/2010 | Kimura | |
| 2011/0043307 | A1 | 2/2011 | Gonzales et al. | |
| 2011/0101904 | A1 | 5/2011 | Sakamoto | |
| 2013/0062724 | A1 | 3/2013 | Tokuyama et al. | |
| 2013/0154352 | A1 | 6/2013 | Tokarz et al. | |
| 2013/0320905 | A1 | 12/2013 | Uryu | |
| 2014/0009162 | A1 | 1/2014 | Barrenscheen et al. | |
| 2014/0092655 | A1 | 4/2014 | Igarashi et al. | |
| 2014/0151337 | A1 | 6/2014 | Hiraiwa et al. | |
| 2014/0265743 | A1 | 9/2014 | Chamberlin et al. | |
| 2014/0316735 | A1 | 10/2014 | Jao et al. | |
| 2015/0084724 | A1 | 3/2015 | Gonzales et al. | |
| 2016/0169945 | A1 | 6/2016 | Mauder et al. | |
| 2016/0380563 | A1 | 12/2016 | Fukuta | |
| 2017/0368941 | A1* | 12/2017 | Chow | H02J 9/061 |
| 2018/0182587 | A1 | 6/2018 | Koepf et al. | |
| 2018/0222333 | A1 | 8/2018 | Khaligh et al. | |
| 2019/0140245 | A1 | 5/2019 | Mensch et al. | |
| 2019/0296541 | A1 | 9/2019 | Mensch et al. | |
| 2020/0114776 | A1 | 4/2020 | Fisher | |
| 2020/0114777 | A1 | 4/2020 | Fisher et al. | |
| 2020/0114778 | A1 | 4/2020 | Fisher | |
| 2020/0114779 | A1 | 4/2020 | Fisher et al. | |
| 2020/0114780 | A1 | 4/2020 | Douglass et al. | |
| 2020/0114781 | A1 | 4/2020 | Douglass | |
| 2020/0114782 | A1 | 4/2020 | Douglass | |
| 2020/0114783 | A1 | 4/2020 | Douglass | |
| 2020/0114784 | A1 | 4/2020 | Fisher | |
| 2020/0119542 | A1 | 4/2020 | Fisher | |
| 2020/0119543 | A1 | 4/2020 | Fisher | |
| 2020/0119544 | A1 | 4/2020 | Fisher | |
| 2020/0144809 | A1 | 5/2020 | Fisher | |
| 2020/0185907 | A1 | 6/2020 | Griffiths | |
| 2020/0185908 | A1 | 6/2020 | Shah et al. | |
| 2020/0185909 | A1 | 6/2020 | Fisher | |
| 2020/0194995 | A1 | 6/2020 | Shah et al. | |
| 2020/0194996 | A1 | 6/2020 | Fisher | |
| 2020/0194997 | A1 | 6/2020 | Fisher | |
| 2020/0194998 | A1 | 6/2020 | Fisher | |
| 2020/0194999 | A1 | 6/2020 | Fisher | |
| 2020/0195000 | A1 | 6/2020 | Douglass | |
| 2020/0195001 | A1 | 6/2020 | Griffiths | |
| 2020/0235564 | A1 | 7/2020 | Shah et al. | |
| 2020/0235565 | A1 | 7/2020 | Griffiths et al. | |
| 2020/0235566 | A1 | 7/2020 | Fisher | |
| 2020/0235567 | A1 | 7/2020 | Griffiths et al. | |
| 2020/0381915 | A1 | 12/2020 | Mensch et al. | |
| 2021/0006061 | A9 | 1/2021 | Shah et al. | |
| 2021/0036505 | A9 | 2/2021 | Fisher | |
| 2021/0044102 | A9 | 2/2021 | Douglass | |
| 2021/0083470 | A9 | 3/2021 | Fisher | |
| 2021/0111552 | A9 | 4/2021 | Fisher | |
| 2021/0184455 | A9 | 6/2021 | Fisher | |
| 2021/0218242 | A1 | 7/2021 | Mensch et al. | |

FOREIGN PATENT DOCUMENTS

| | | | |
|---|---|---|---|
| DE | 102012224223 | A1 | 7/2014 |
| EP | 3017992 | A1 | 5/2016 |
| EP | 3608153 | A1 | 2/2020 |
| FR | 2741994 | A1 | 6/1997 |
| FR | 3041143 | A1 | 3/2017 |
| GB | 201811874 | | 9/2018 |
| JP | H09284902 | A | 10/1997 |
| JP | H10322880 | A | 12/1998 |
| JP | 2000324674 | A | 11/2000 |
| JP | 2001078350 | A | 3/2001 |
| JP | 5675337 | B2 | 1/2015 |
| JP | 2016205866 | A | 12/2016 |
| JP | 2017139902 | A | 8/2017 |
| JP | 6255429 | B2 | 12/2017 |
| KR | 20160119604 | A | 10/2016 |
| WO | 2018186573 | A1 | 10/2018 |
| WO | 2019092103 | A2 | 5/2019 |
| WO | 2019092103 | A3 | 7/2019 |
| WO | 2019197459 | A2 | 10/2019 |
| WO | 2019197459 | A3 | 2/2020 |
| WO | 2020193466 | A1 | 10/2020 |

OTHER PUBLICATIONS 1811874.5, "United Kingdom Application Serial No. 1811874.5, Search Report dated Jan. 7, 2019", 5 pages.

PCT/EP18/80611, "International Application Serial No. PCT/EP18/80611, International Search Report and Written Opinion dated Jun. 18, 2019", Eaton Corporation, 21 pages.

PCT/EP18/80611, "International Application Serial No. PCT/EP18/80611, Invitation to Pay Additional Fees and, Where Applicable, Protest Fee", Eaton Corporation, 12 pages.

PCT/EP2019/059070, "International Application Serial No. PCT/EP2019/059070, International Search Report and Written Opinion dated Jan. 7, 2020", Eaton Corporation, 39 pages.

PCT/EP2019/059070, "International Application Serial No. PCT/EP2019/059070, Invitation to Pay Additional Fees and, Where Applicable, Protest Fee dated Aug. 27, 2019", Eaton Corporation, 14 pages.

PCT/EP2020/057951, Mar. 23, 2020, Pending, Justin Keith Griffiths.

U.S. Appl. No. 16/710,612, filed Dec. 11, 2019, Pending, Jalpa Shah.

U.S. Appl. No. 16/710,896, filed Dec. 11, 2019, Pending, Justin Keith Griffiths.

U.S. Appl. No. 16/710,700, filed Dec. 12, 2019, Pending, Justin Keith Griffiths.

U.S. Appl. No. 16/712,354, filed Dec. 12, 2019, Pending, Brandon William Fisher.

PCT/EP2019/059070, "International Application Serial No. PCT/EP2019/059070, International Preliminary Report on Patentability dated Oct. 13, 2020", Eaton Intelligent Power Limited, 29 pages.

PCT/EP2020/057951, "International Application Serial No. PCT/EP2020/057951, International Search Report and Written Opinion dated Aug. 14, 2020", Eaton Intelligent Power Limited, 23 pages.

PCT/EP2020/057951, "International Application Serial No. PCT/EP2020/057951, Invitation to Pay Additional Fees and, Where Applicable, Protest Fee dated Jun. 24, 2020", Eaton Intelligent Power Limited, 16 pages.

Floyd, Thomas L., "Electronic Devices Fourth edition", 1996, pp. 839, 850-852.

PCT/EP2020/057951 , "International Application Serial No. PCT/EP2020/057951, International Preliminary Report on Patentability dated Oct. 7, 2021", 13 pages.

* cited by examiner

12400

12400

Transfer Function (example)

Plant $TF = \frac{i_{L_1}}{d} = \frac{i_{L_2}}{d} = \frac{V_g}{L} * \frac{S^2 + S\frac{1}{RC} + \frac{1}{LC}}{s(S^2 + S\frac{1}{RC} + \frac{2}{LC})}$ Controller $= 0.3991 * \frac{(1+0.0022*s)}{s(1+9.7e\text{-}5s)}$ Phase Margin = 42 deg (after discretization@ 14 us)
Bandwidth = 600Hz

| | R(Ω)/WEAK SPOT BRIDGE | R FOR WEAK SPOT (Ω) |
|---|---|---|
| VARIABLE WIDTH RECTANGLES | 3.33E-03 | 1.11E-04 |
| | 1.66E-03 | |
| | 8.31E-04 | |
| | 6.65E-04 | |
| | 5.54E-04 | |
| | 3.91E-04 | |
| HEXAGONS | 7.52E-04 | 1.11E-04 |
| | 7.52E-04 | |
| | 7.52E-04 | |
| | 7.52E-04 | |
| | 7.52E-04 | |
| | 7.52E-04 | |
| SLOTS | 7.52E-04 | 1.11E-04 |
| | 7.52E-04 | |
| | 7.52E-04 | |
| | 7.52E-04 | |
| | 7.52E-04 | |
| | 7.52E-04 | |
| MULTILAYER | 6.65E-04 | 1.11E-04 |
| | 5.54E-04 | |
| | 1.11E-04 | |
| | 3.69E-04 | |
| | 6.65E-04 | |

20212, 20214, 20216

EFFICIENCY COMPARISON WITH 2-6 DEVICES SWITCHING

| CASE NO. | SPEED (rpm) | TORQUE (Nm) | P_INV (kW) | FSW (kHz) | EFF(%) | | | | |
|---|---|---|---|---|---|---|---|---|---|
| | | | | | 2 IN PARALLEL | 3 IN PARALLEL | 4 IN PARALLEL | 5 IN PARALLEL | 6 IN PARALLEL |
| CASE1 (10%) | 1000 | 220 | 24.94 | 10 | 91.03 | 93.48 | 94.77 | 95.56 | 96.08 |
| CASE2 (20%) | 5000 | 95 | 50.44 | 10 | 98.12 | 98.52 | 98.87 | 99.02 | 99.11 |
| CASE3 (10%) | 5000 | 47.5 | 25.15 | 10 | 98.30 | 98.71 | 98.89 | 98.98 | 98.03 |
| CASE4 (10%) | 15000 | 17.5 | 27.55 | 15 | 99.41 | 99.45 | 99.43 | 99.40 | 99.36 |

INVESTIGATING CONDUCTIVE EMI ISSUE IN INVERTER

COMPARISON

| Iteration | Max dbuV reduction |
|---|---|
| Iteration a (12.5KHz to 8.33KHz in one direction) | Up to 7 dbuV |
| Iteration b (12.5KHz to 8.33KHz in both direction) | Up to 15 dbuV |
| 23002 Iteration c (11.1KHz to 9.09KHz in both direction) | Up to 15 dbuV |

POWER DISTRIBUTION AND CIRCUIT PROTECTION FOR A MOBILE APPLICATION HAVING A HIGH EFFICIENCY INVERTER

CLAIM OF PRIORITY

This application claims priority to the following U.S. Provisional Patent Applications: Ser. No. 62/866,478, filed 25 Jun. 2019, and entitled "AN ADAPTIVE INVERTER CONTROL METHOD FOR EFFICIENCY IMPROVEMENT" ; Ser. No. 62/855,413, filed 31 May 2019, and entitled "TOPOLOGY AND METHOD FOR A CHARGER AND DCDC COMBINED MODULE" ; and Ser. No. 62/881,447, filed 1 Aug. 2019, and entitled "ACTIVE CURRENT BALANCING METHOD FOR PARALLELED POWER DEVICES".

All of the above patent documents are incorporated herein by reference in their entirety.

FIELD

Without limitation to a particular field of technology, the present disclosure is directed to electrical power distribution and circuit protection, and more particularly to electronic power distribution and circuit protection for highly variable load applications.

BACKGROUND

Electrical power distribution in many applications is subject to a number of challenges. Applications having a highly variable load, such as mobile applications or vehicles, subject fuses in the power channels to rapid swings in power throughput and induce thermal and mechanical stresses on the fuses. Certain applications have a high cost for downtime of the application. Certain applications, including mobile applications, are subject to additional drawbacks from loss of power, such as loss of mobility of the application unexpectedly, including at an inconvenient location, while in traffic, or the like. Electrical systems in many applications are complex, with multiple components in the system, and variations in the wiring and environment of the electrical system, leading to variations in the electrical system response, introduction of noise, variations in system resonant frequencies, and/or variations in system capacitance and/or inductance, even for nominally identical installations. These complexities introduce additional challenges for high resolution and/or highly precise determinations of the electrical characteristics of aspects of the system. Additionally, highly variable and/or mobile systems provide additional challenges for diagnostics and determinations about aspects of the electrical system, as highly invasive active determinations may not be acceptable to application performance, and/or the system may not provide many opportunities, or only brief opportunities, for making determinations about the electrical system.

Electric mobile applications, such as electric vehicles and high-capability hybrid vehicles provide numerous challenges for previously known inverter and power electronics systems. Mobile applications include on-highway vehicles, off-highway vehicles, commercial and passenger car vehicles, and/or off road applications including any type of vehicle or mobile equipment.

For example, many mobile applications, such as commercial and passenger vehicles, are highly cost sensitive to both initial costs of a system, and to ongoing operating costs.

Additionally, downtime for service, maintenance, or system failures has a very high cost, due to large volumes and competitive markets. Accordingly, even modest improvements to initial costs, operating costs, and reliability can make a significant impact on the outcome of the system, or make a non-marketable system competitive.

Mobile applications have limited space and weight available for components of the drive system. For example, vehicle sizing and fuel efficiency concerns drive many applications to reduce both the size and the weight of the vehicle, and to accommodate vehicle shape for aerodynamics, according to the specific application, and/or according to user or customer preferences. Additionally, mobile applications have a large number of features, and application requirements and customer preferences are such that additional features are almost always value added if the system can accommodate them while meeting other constraints. Accordingly, reducing the size and weight of a given component provides value to the application, whether through a net reduction of the application size and weight, or through the ability to accommodate additional features within the same size and weight.

Mobile applications generally have a large number of components, and often many of the components are provided by third parties and integrated by a primary manufacturer or original equipment manufacturer (OEM). Accordingly, reductions in the size or weight of a component provide for easier integration of components, and/or are required to accommodate a limited space claim during the design phase, upgrades, retro-fits, or the like. Additionally, both the large number of components and the integration of many components from separate component providers introduce complexities into the integration of the mobile application. Further, each component and sub-component, and each interface between components, creates a failure point that can cause a service event, undesirable operation, application downtime, and/or a mission disabling failure. Failures occurring in mobile applications often occur at a location that is inconvenient for service access, and may require moving the degraded or disabled vehicle to a service location before the failure can be corrected. Accordingly, components that have a reduced number of sub-components, that can utilize standardized interfaces, and/or that have a reduced number of interfaces are desirable for mobile applications. Some mobile applications are produced in very high volume, and even modest reductions in either the number of interfaces or the number of sub-components can add high value to the system.

Some mobile applications are produced in small volumes with short engineering design time, and accordingly a reduction in the number of interfaces can greatly reduce the design cycle time, providing a significant benefit where engineering costs cannot be distributed across a high volume of products. Some mobile applications are produced as retro-fit or upgrades, and/or include a number of options where a component may appear on certain models or versions of the mobile application, but may not be on other models or versions, and/or may be installed in a different location on the vehicle than on other models or versions. For example, mobile applications may have components added post-manufacturing as part of a customer option, to accommodate new regulations, to support an environmental policy (e.g., of a company, or for a fleet of vehicles), to upgrade a vehicle, and/or to repurpose or remanufacture a vehicle. Accordingly, components having a reduced size, a reduced weight, and/or a reduced number of interfaces provide for easier post-manufacturing changes, a greater number of options in the post-manufacturing changes, and/or greater reliability for components that are installed using non-standardized or low volume processes that may not be as refined as a standardized process for a high volume application. Additionally, size and weight savings in components of the application can provide for the inclusion of additional features within the same cost and weight profile.

Mobile applications often have a large differential in duty cycle even for systems that have similar power ratings. Further, mobile applications often involve systems that are sold or otherwise transferred, where the same system can experience a significant change in the duty cycle and operating conditions after the system is in the hands of a user. Accordingly, a lack of flexibility in design parameters at the time of initial sale can limit the available markets for a system, and a lack of flexibility in design parameters in use can result in increased failures later in the life cycle of the system.

Electrical power distribution in many applications is subject to a number of challenges. Presently available systems for providing conversion between electric power and other power sources and loads suffer from a number of drawbacks. Variability in the load types, performance characteristics, and overall system arrangements lead to difficult integration issues that reduce the desirability of hybrid power utilization for many applications, and reduce the available system efficiencies as many aspects of an application are not integrated into the hybrid power arrangement. Additionally, many applications, such as off-road applications, and certain specific on-road applications that have unusual equipment or duty cycles, are low volume and are not economically justifiable to design and integrate a hybrid power system. Systems having a number of varying load and power devices and subsystems additionally create integration challenges, leading to a multiplicity of power conversion devices distributed around the system and customized for the particular system. Accordingly, it may not be economically justifiable to create a hybrid power system for such systems using presently known technologies.

SUMMARY

Embodiments of the present disclosure provide improved arrangements for efficient DC/DC conversion between power sources and loads on a mobile electric application, improved accessibility for user access to power supplies, and flexibility to interface with varying charging devices.

Embodiments of the present disclosure provide for improved interfaces for power management components, such as PDUs, inverters, contactors, and fuses. Embodiments are disclosed that reduce the number of components, the cost of components, the number of interfaces between components, and the packaging size of components. Embodiments of the present disclosure provide for improved capability of power management components, including avoidance of undesirable operating conditions, improved mitigation and recovery from undesirable operating conditions, improved power density of power management components, and reduced system burdens such as power consumption, design and integration resources, and system resources such as connectors, coolant volumes, space utilization.

BRIEF DESCRIPTION OF THE DRAWINGS

The present disclosure will become more fully understood from the detailed description and the accompanying drawings, wherein:

FIGS. 118A and 118B depict a view of an integrated inverter assembly.

FIG. 119 depicts a view of an integrated inverter assembly with a perspective view depicting the gate driver PCB and the DC link capacitor.

FIG. 120 depicts a view of an integrated inverter assembly with AC bus bars and motor temperature/position sensor.

FIG. 121 depicts a view of an integrated inverter assembly with cure-in-place gasket.

FIG. 122 depicts a view of an integrated inverter assembly with close-up of one corner of the main cover.

FIG. 123 depicts a view of an integrated inverter assembly with example installation for the IGBTs.

FIGS. 124-127 depict views of an example embodiment of a main cover portion of an integrated inverter assembly.

FIG. 128 depicts an example embodiment of an upper and lower cooling channel.

FIG. 129 depicts an example embodiment of a coupling mechanism.

FIG. 130 depicts an example embodiment of a coupling mechanism.

FIG. 131 depicts a view of an integrated inverter assembly showing a coolant channel cover.

FIG. 132 depicts a DC Link Capacitor in the prior art.

Figure 133:
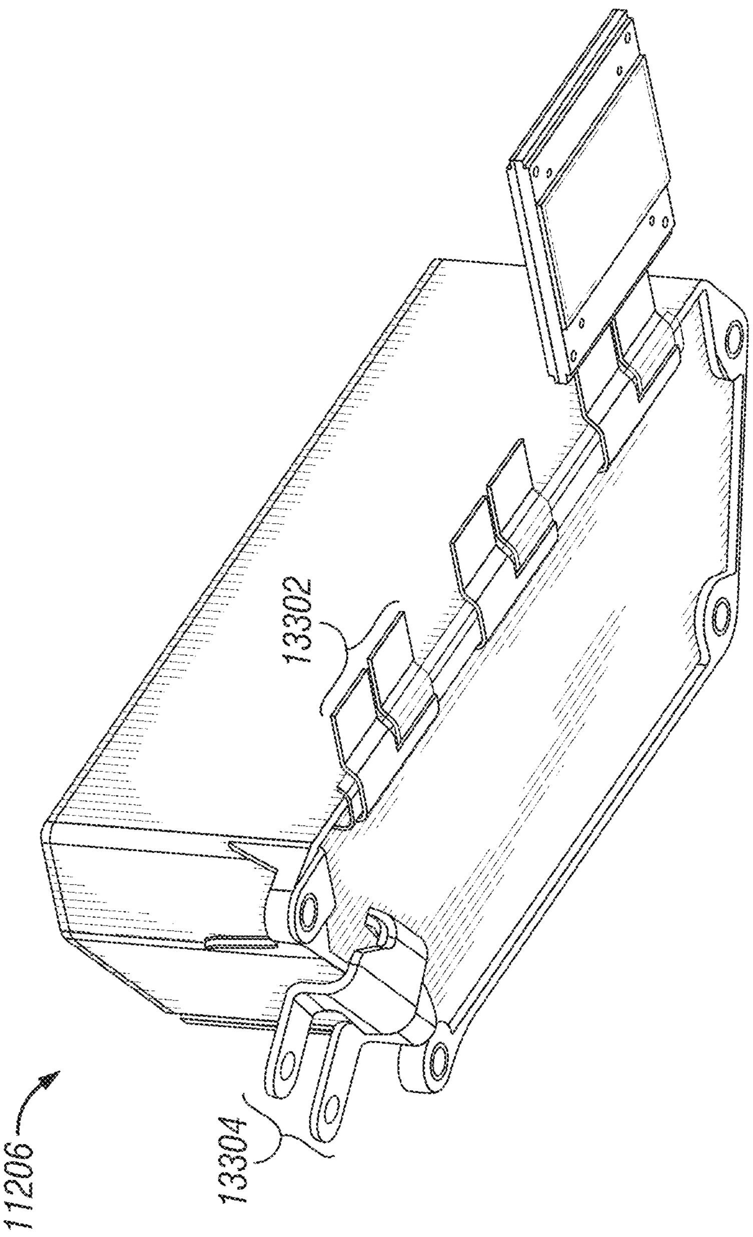

FIG. 133 depicts an embodiment DC Link Capacitor.

Figure 134:
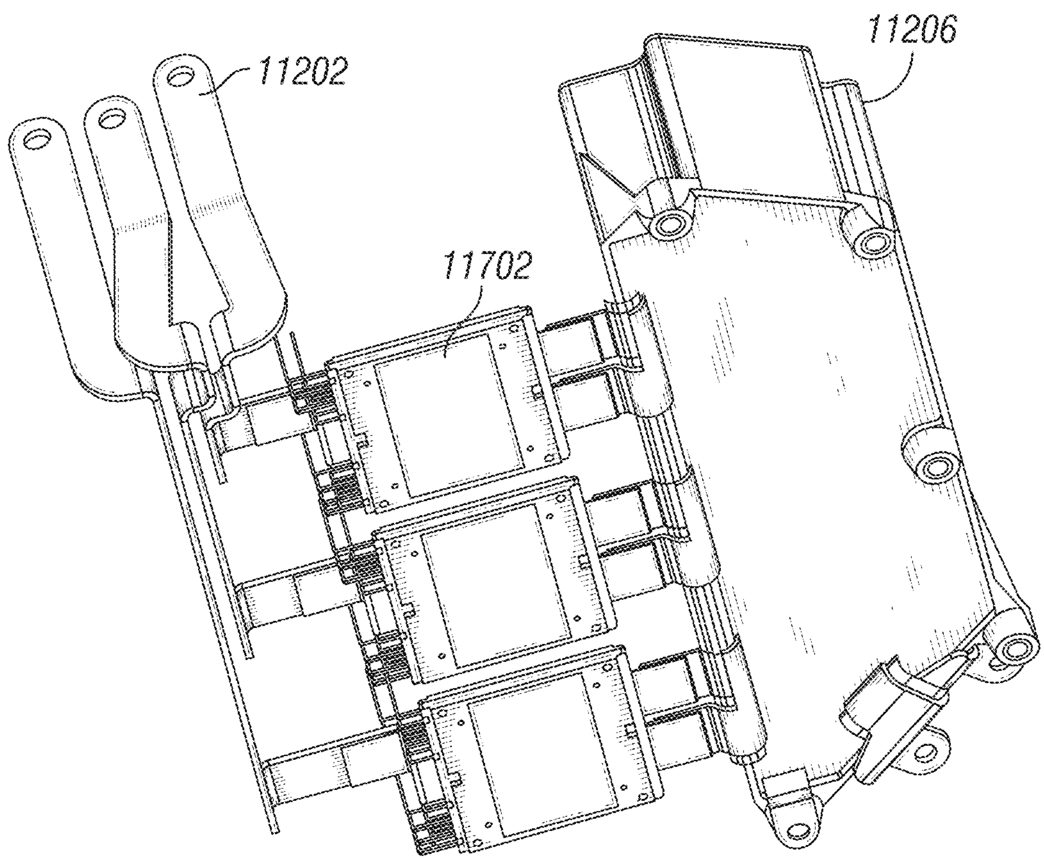

FIG. 134 depicts an embodiment potted DC Link Capacitor.

Figure 135:
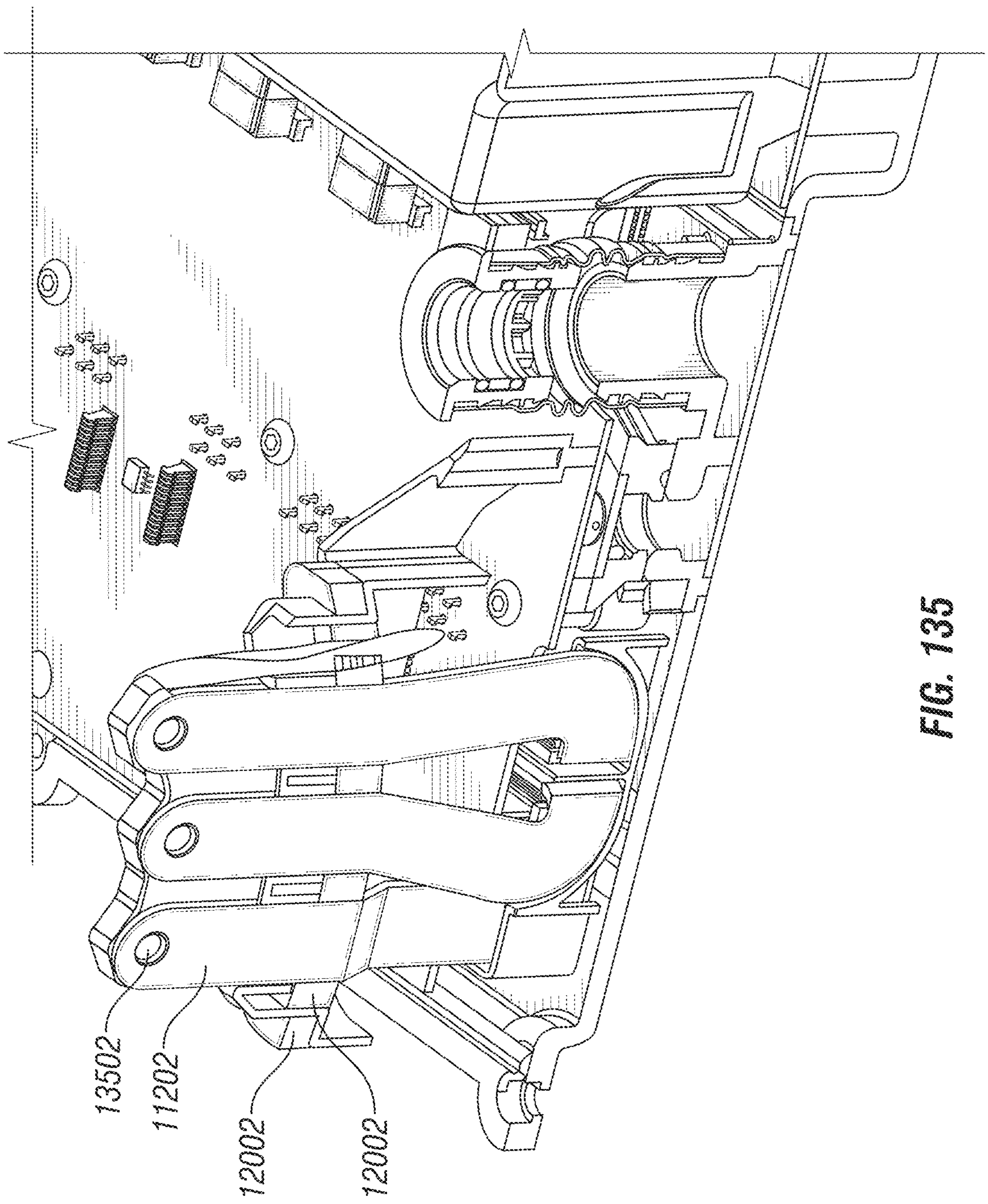

FIG. 135 depicts a view of an integrated inverter assembly with AC bus bars and motor temperature/position sensor.

Figure 136:
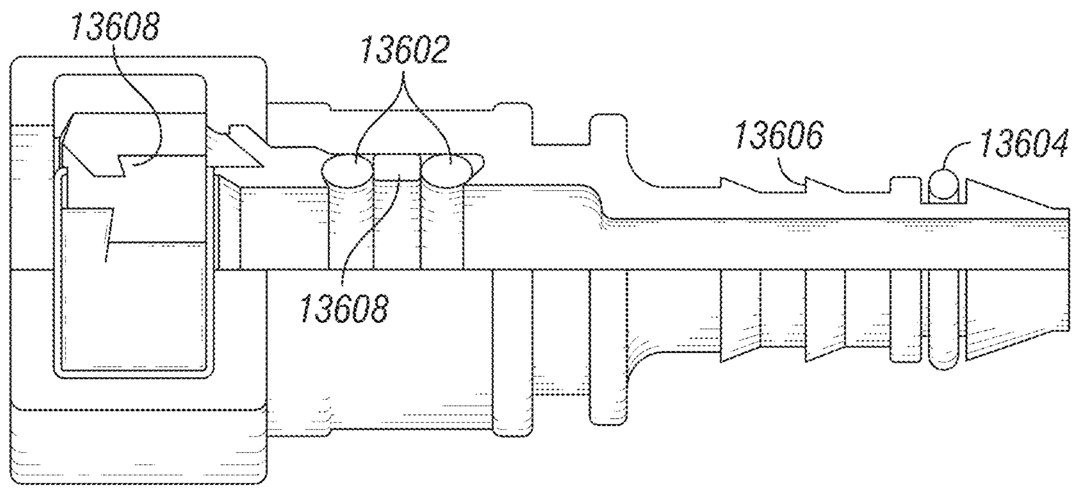

FIG. 136 depicts a quick connector in the prior art.

Figure 137:
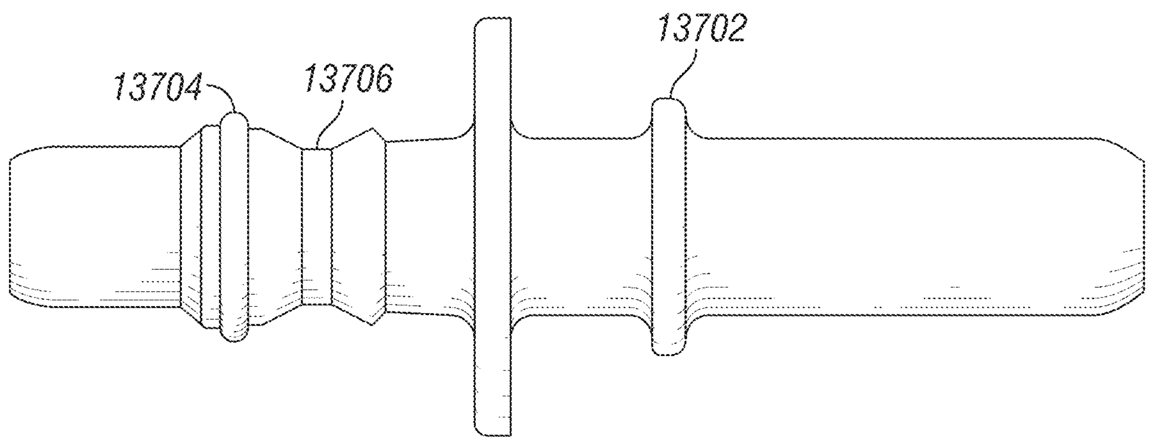

FIG. 137 depicts a quick connector in the prior art.

Figure 138:
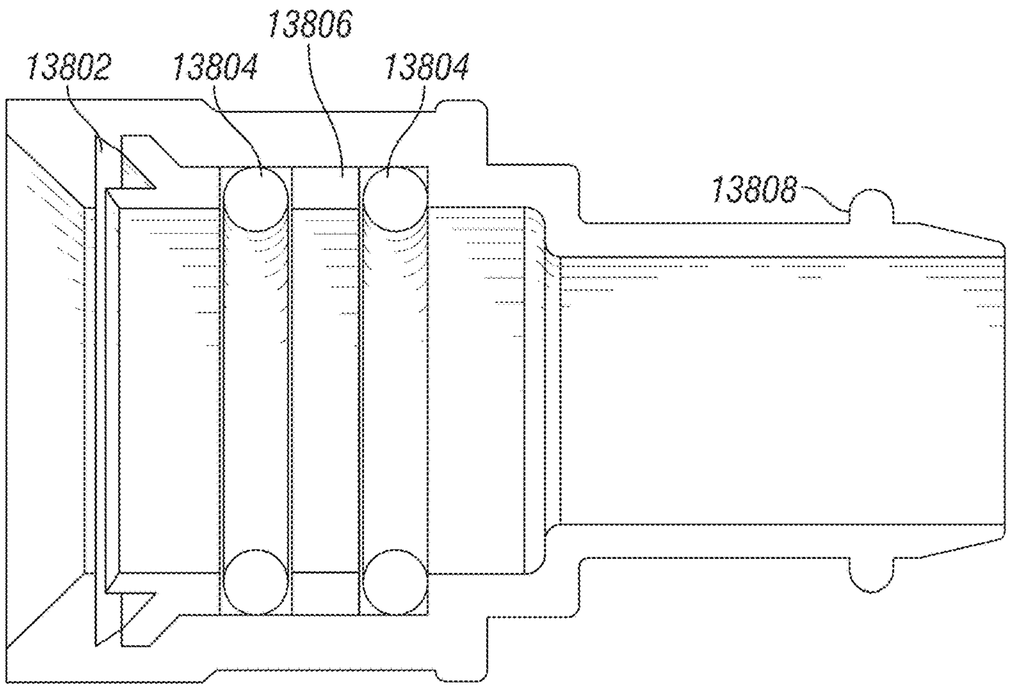

FIG. 138 depicts an embodiment fluid connector.

Figure 139:
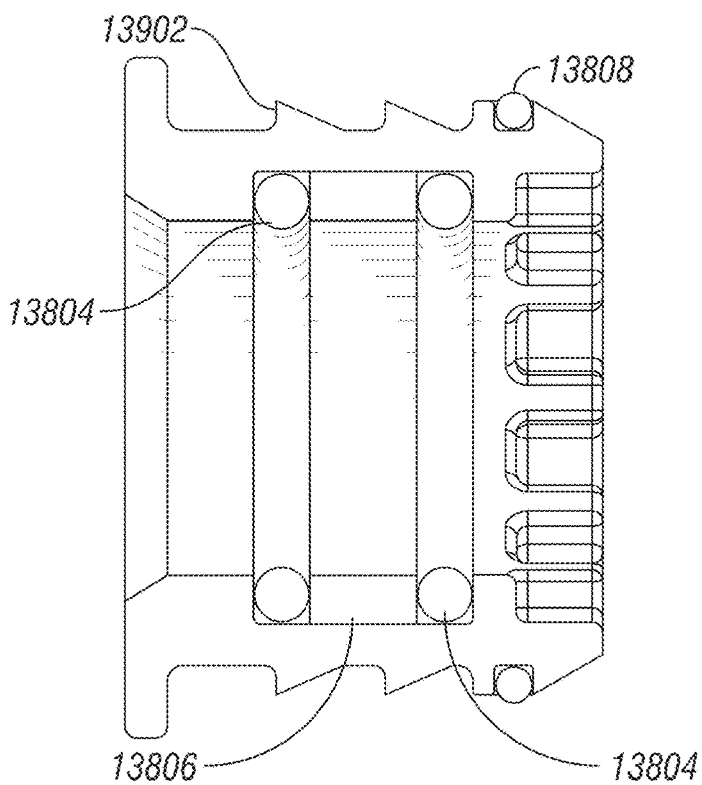

FIG. 139 depicts an embodiment fluid connector.

Figure 140:
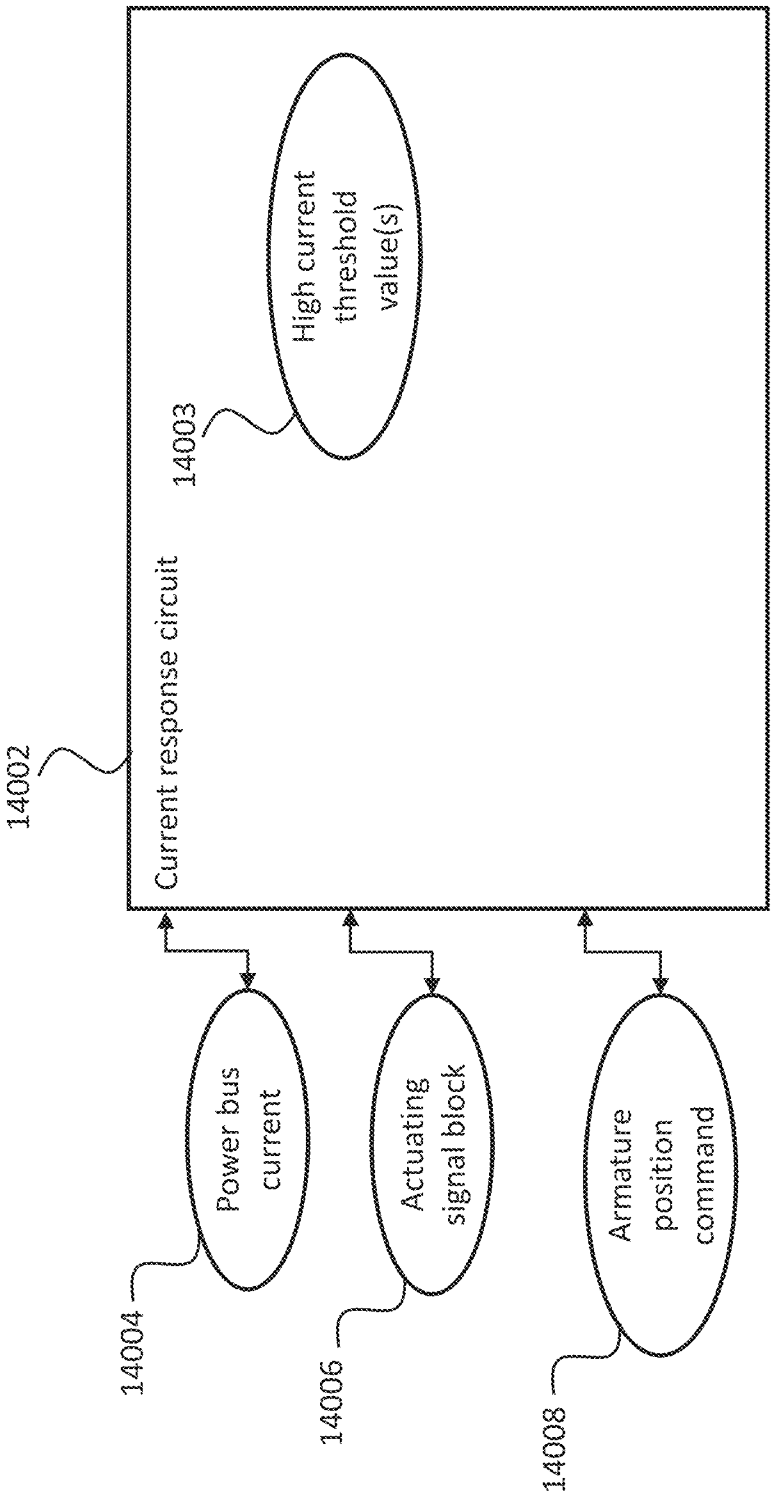

FIG. 140 depicts a schematic diagram of a controller.

Figure 141:
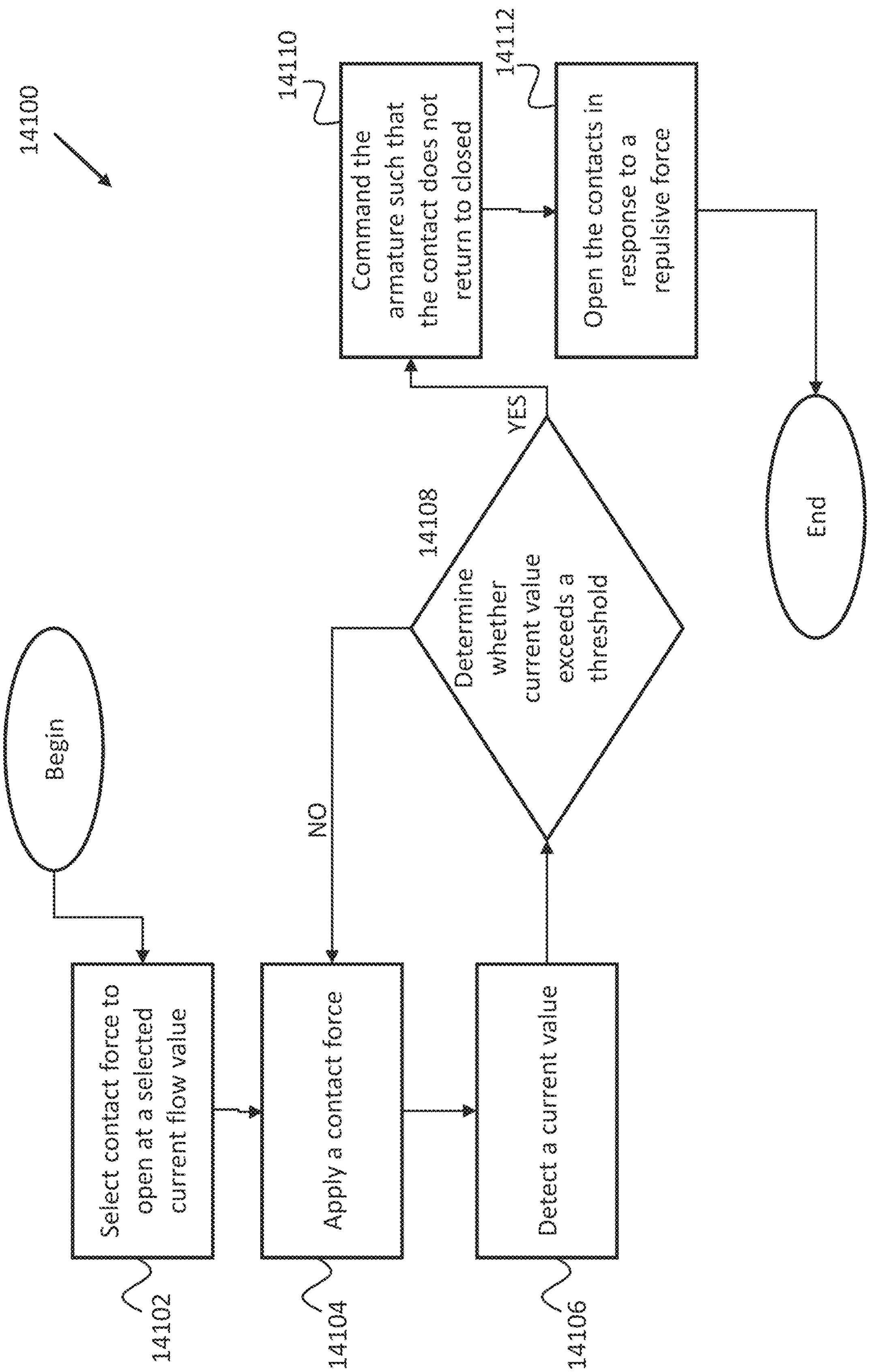

FIG. 141 depicts a schematic flow diagram of a procedure to open a motive power circuit.

Figure 142:
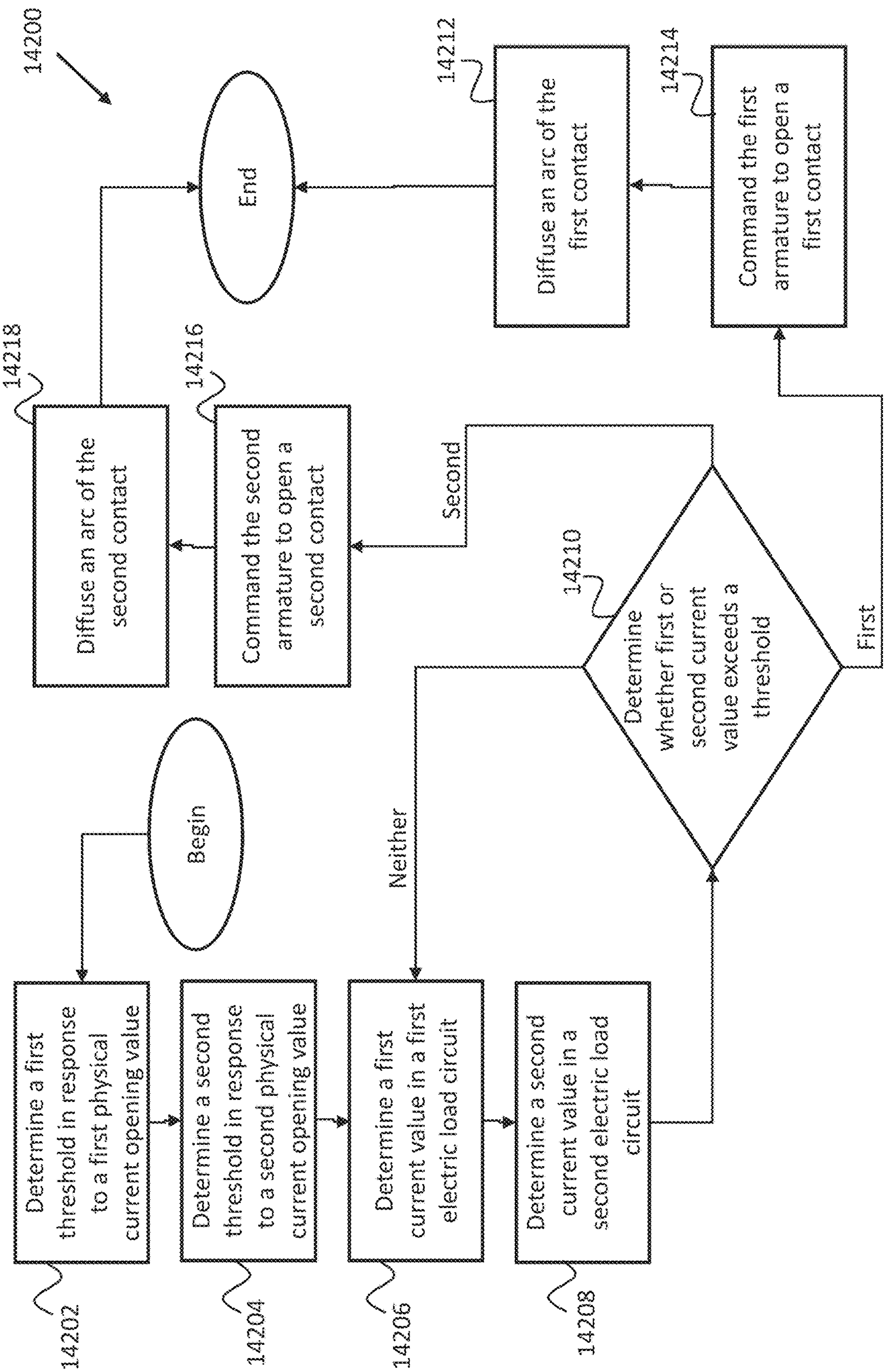

FIG. 142 depicts a schematic flow diagram of a procedure to open a motive power circuit.

Figure 143:
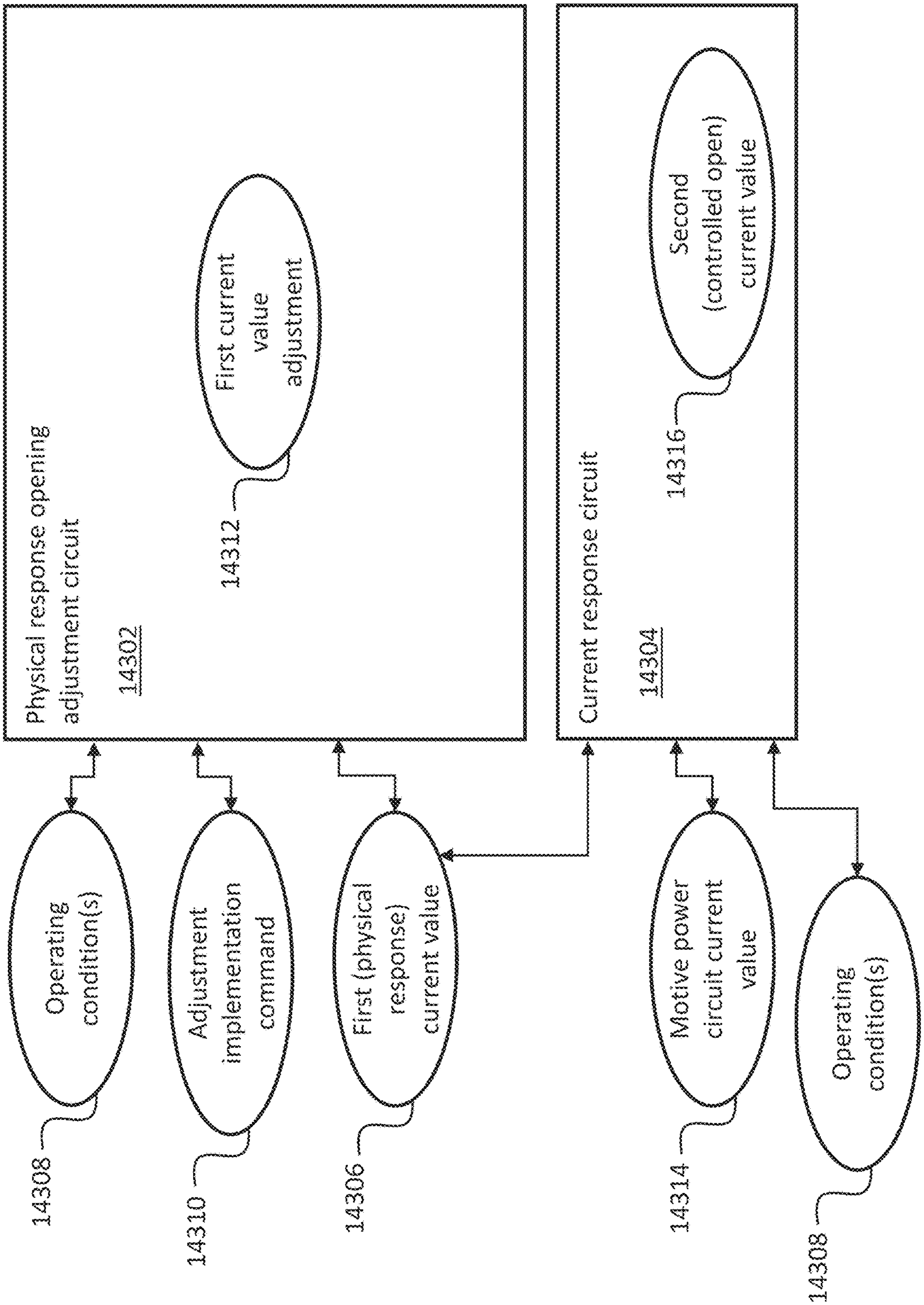

FIG. 143 depicts a schematic diagram of a controller.

Figure 144:
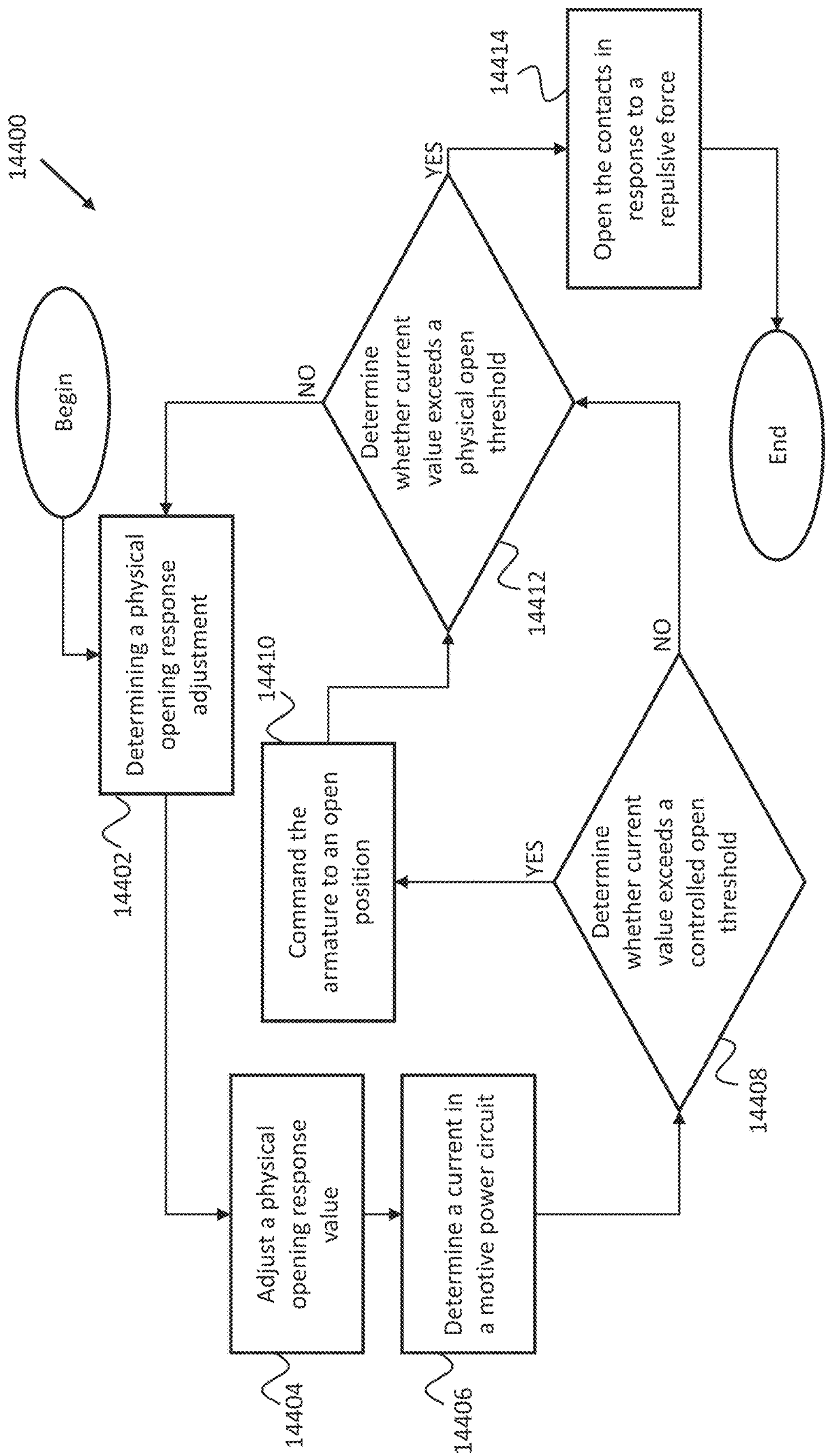

FIG. 144 depicts a schematic flow diagram of a procedure to open a motive power circuit.

Figure 145:
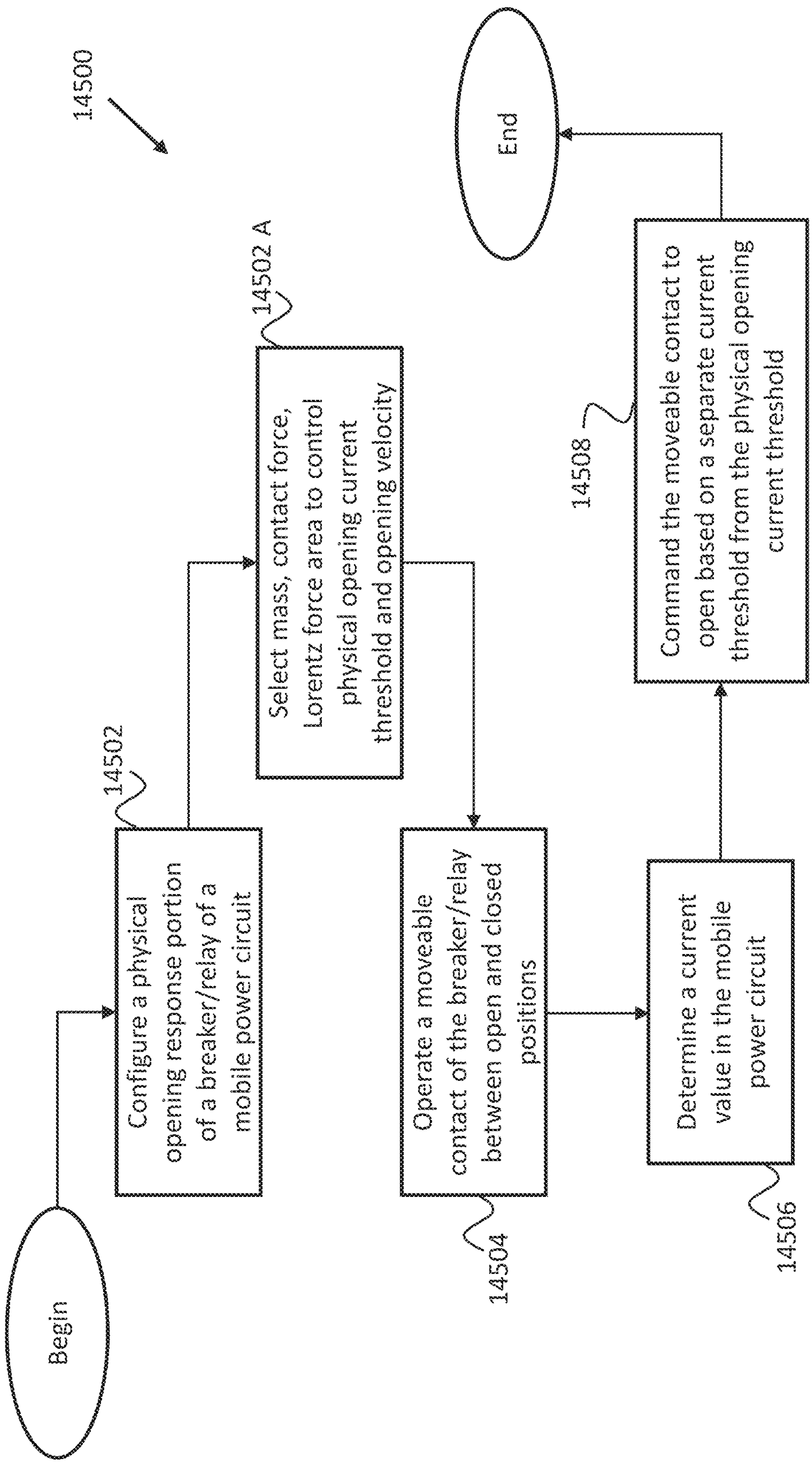

FIG. 145 depicts a schematic flow diagram of a procedure to open a motive power circuit.

Figure 146:
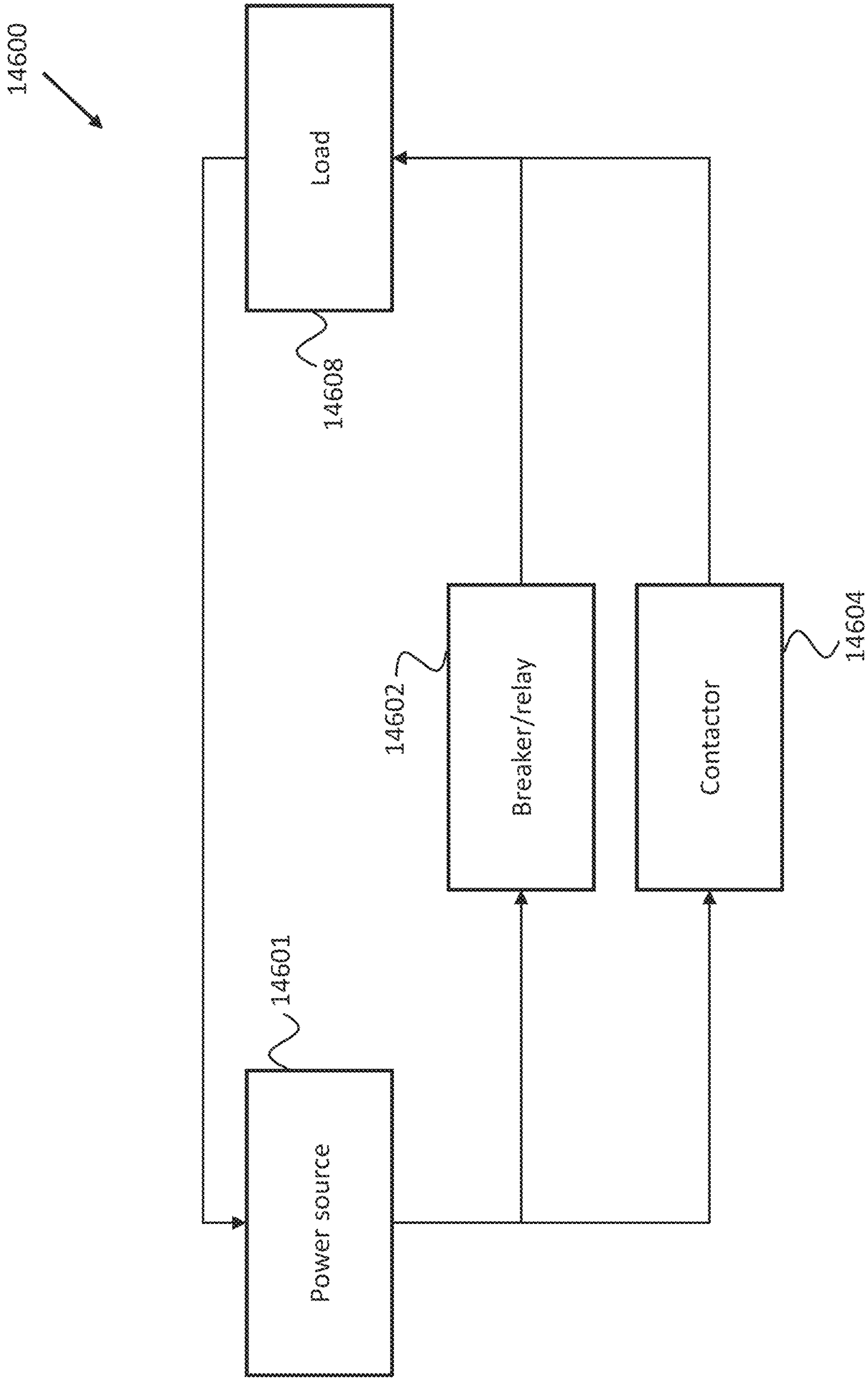

FIG. 146 depicts an embodiment of a system having a breaker/relay.

Figure 147:
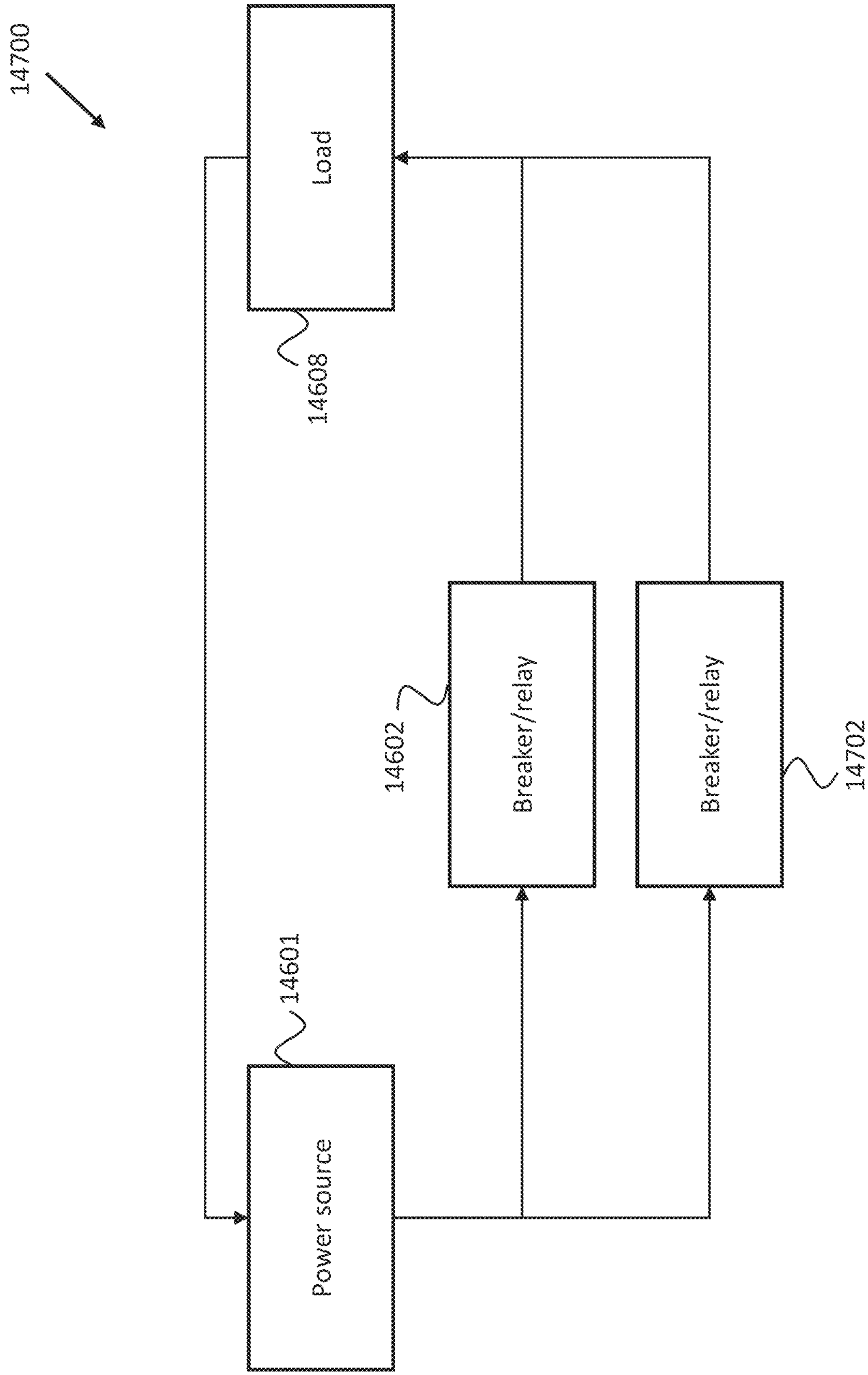

FIG. 147 depicts an embodiment of a system having a breaker/relay.

Figure 148:
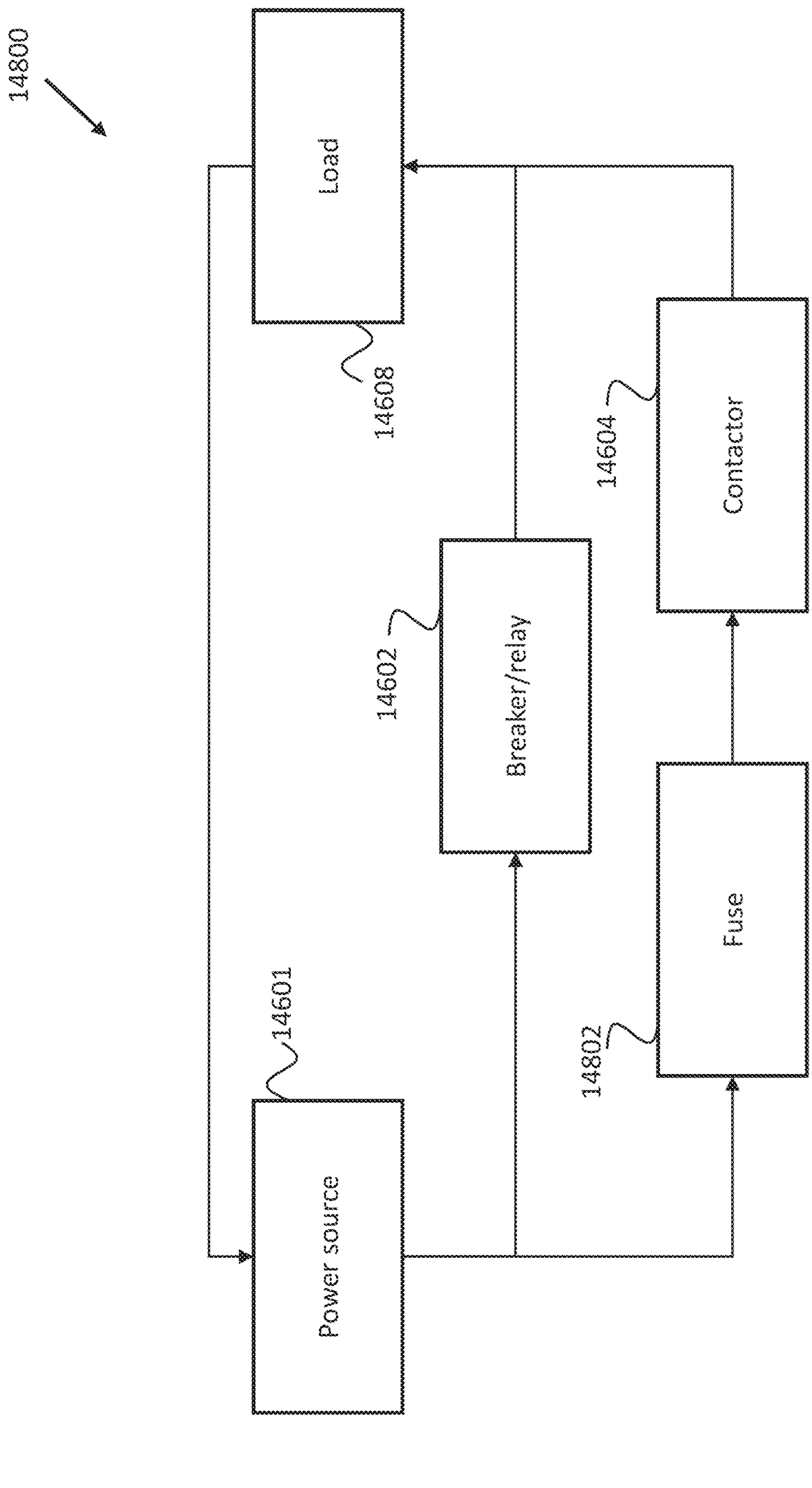

FIG. 148 depicts an embodiment of a system having a breaker/relay.

Figure 149:
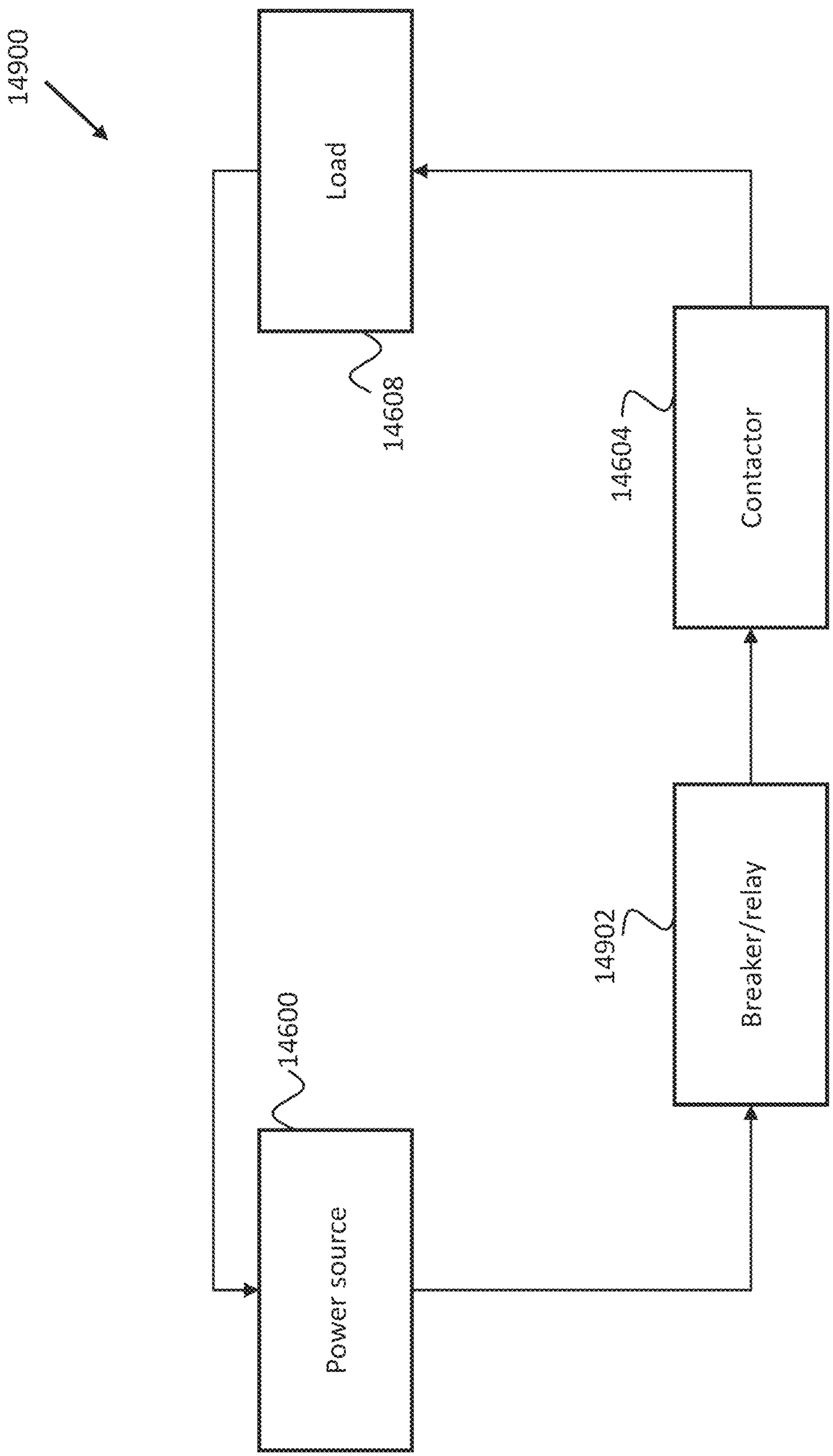

FIG. 149 depicts an embodiment of a system having a breaker/relay.

Figure 150:
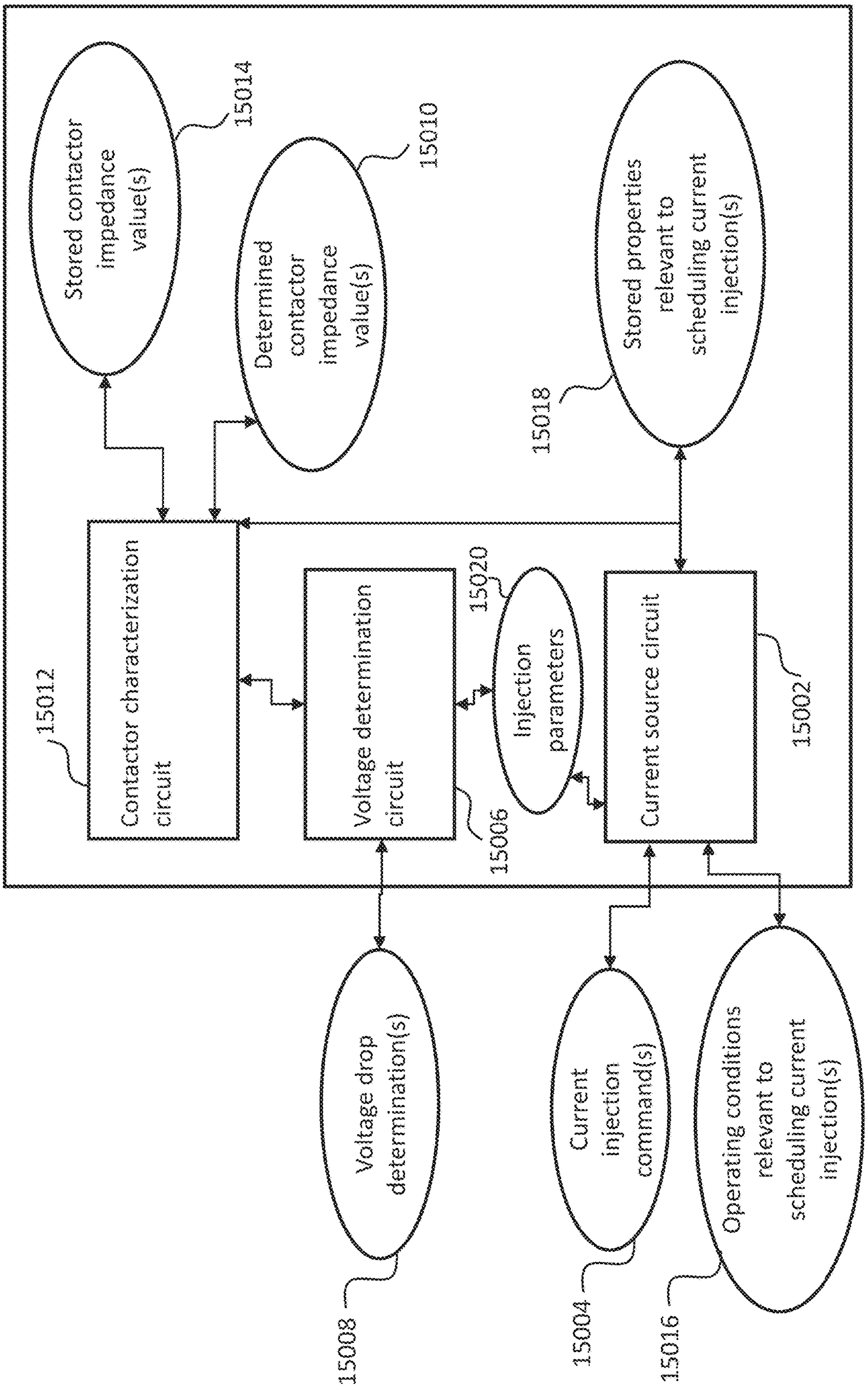

FIG. 150 depicts a schematic diagram of a controller.

Figure 151:
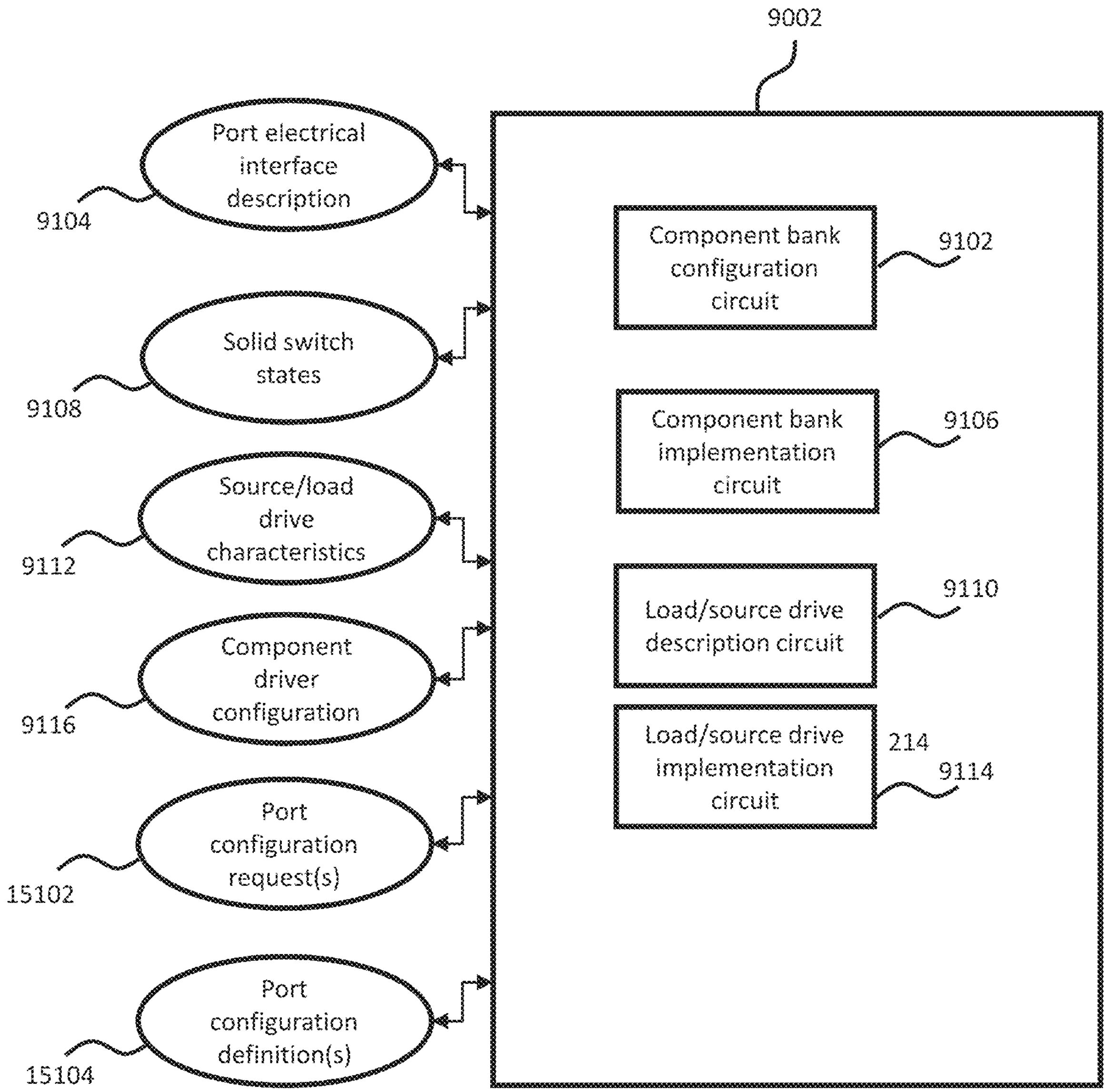

FIG. 151 depicts a schematic diagram of a controller.

Figure 152:
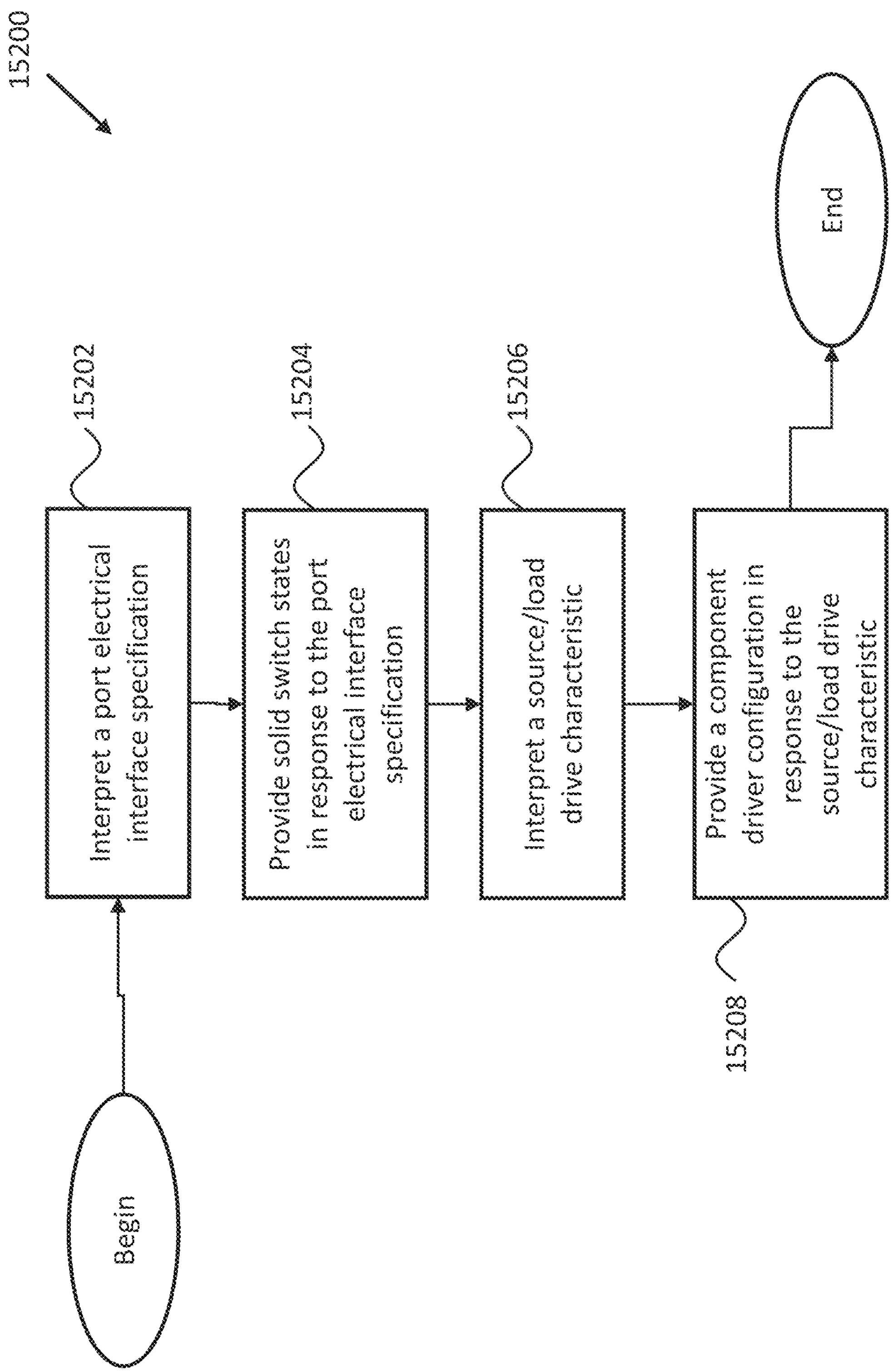

FIG. 152 depicts a schematic flow diagram of a procedure to configure a power converter.

Figure 153:
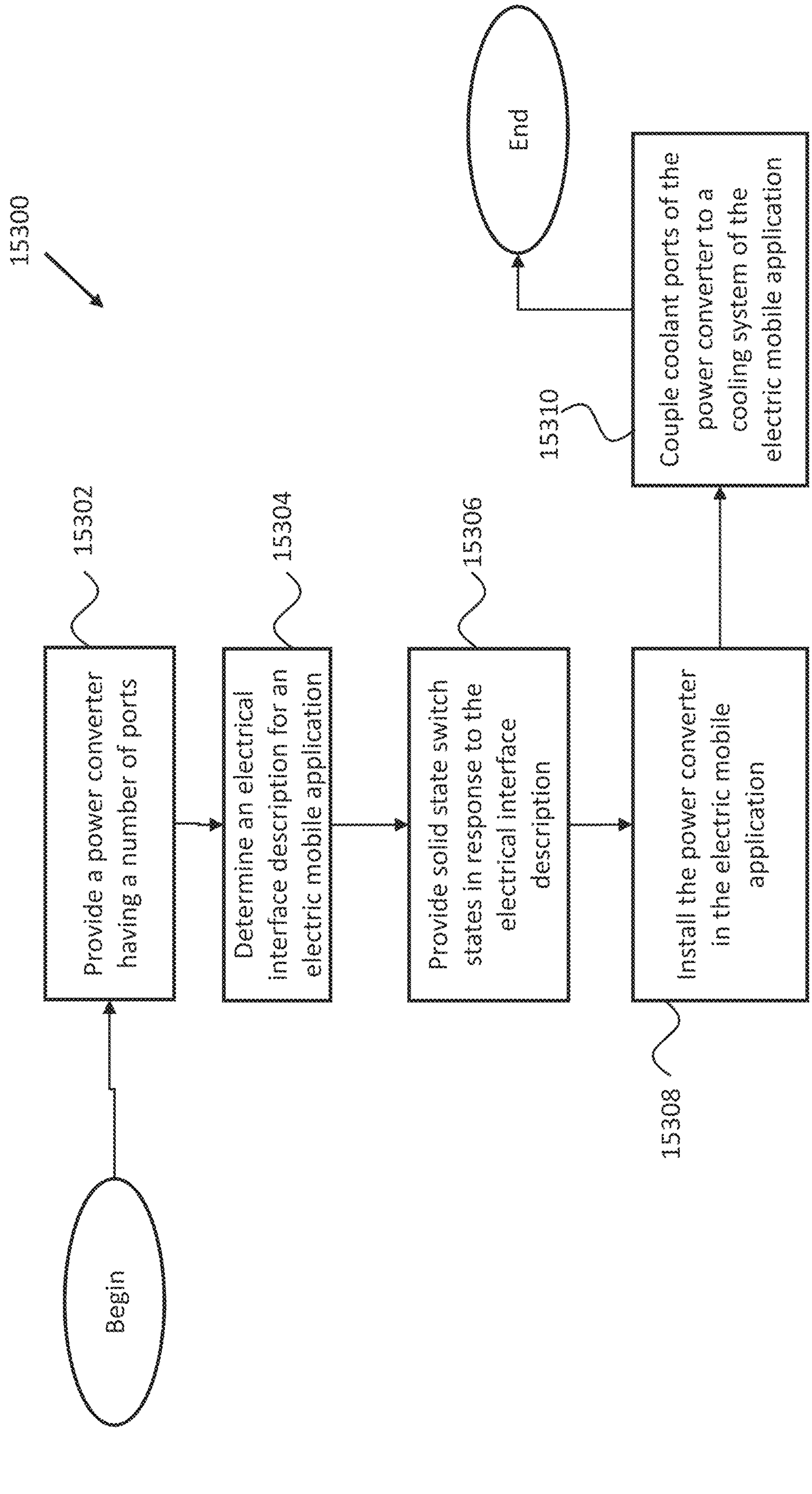

FIG. 153 depicts a schematic flow diagram of a procedure to integrate a power converter.

Figure 154:
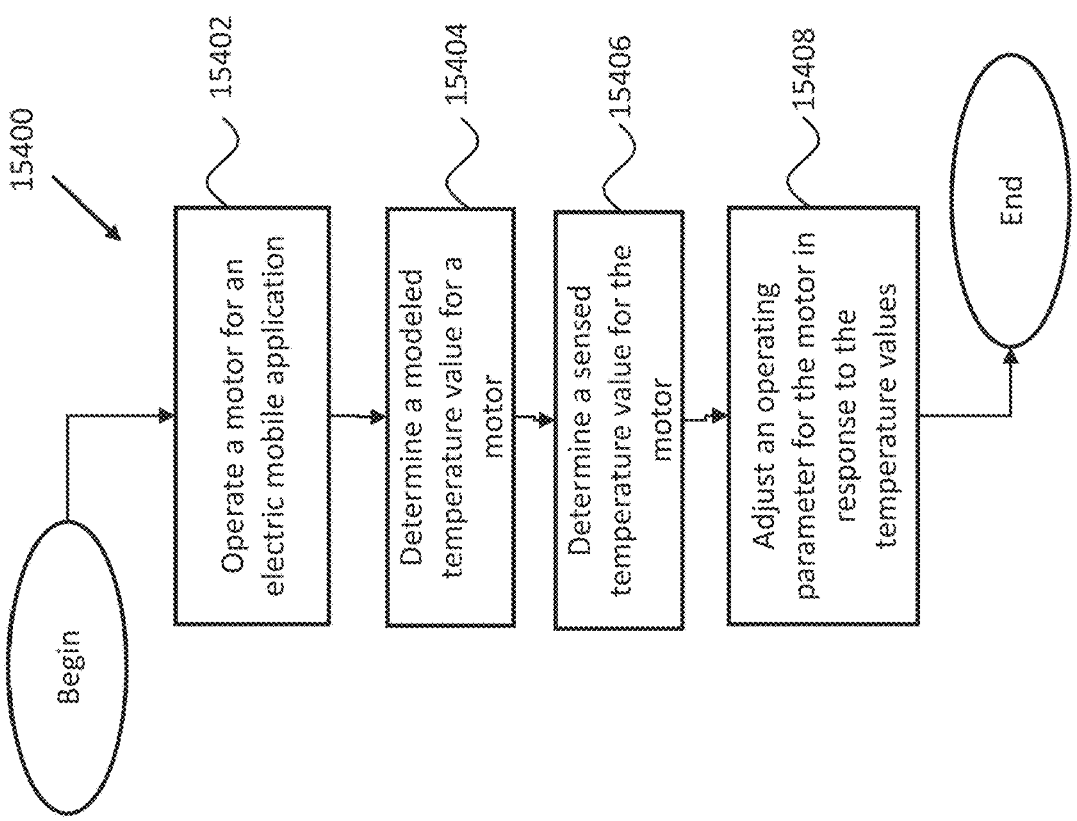

FIG. 154 depicts a schematic flow diagram of a procedure to adjust operations of a motor.

Figure 155:
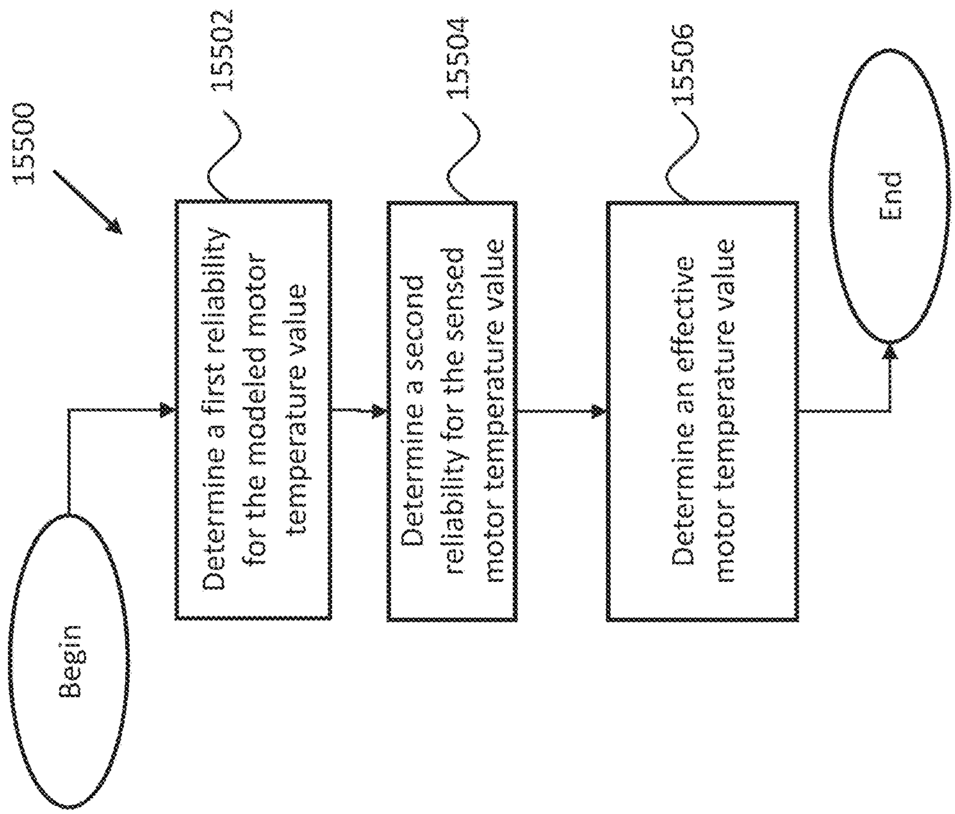

FIG. 155 depicts a schematic flow diagram of a procedure to adjust operations of a motor.

Figure 156:
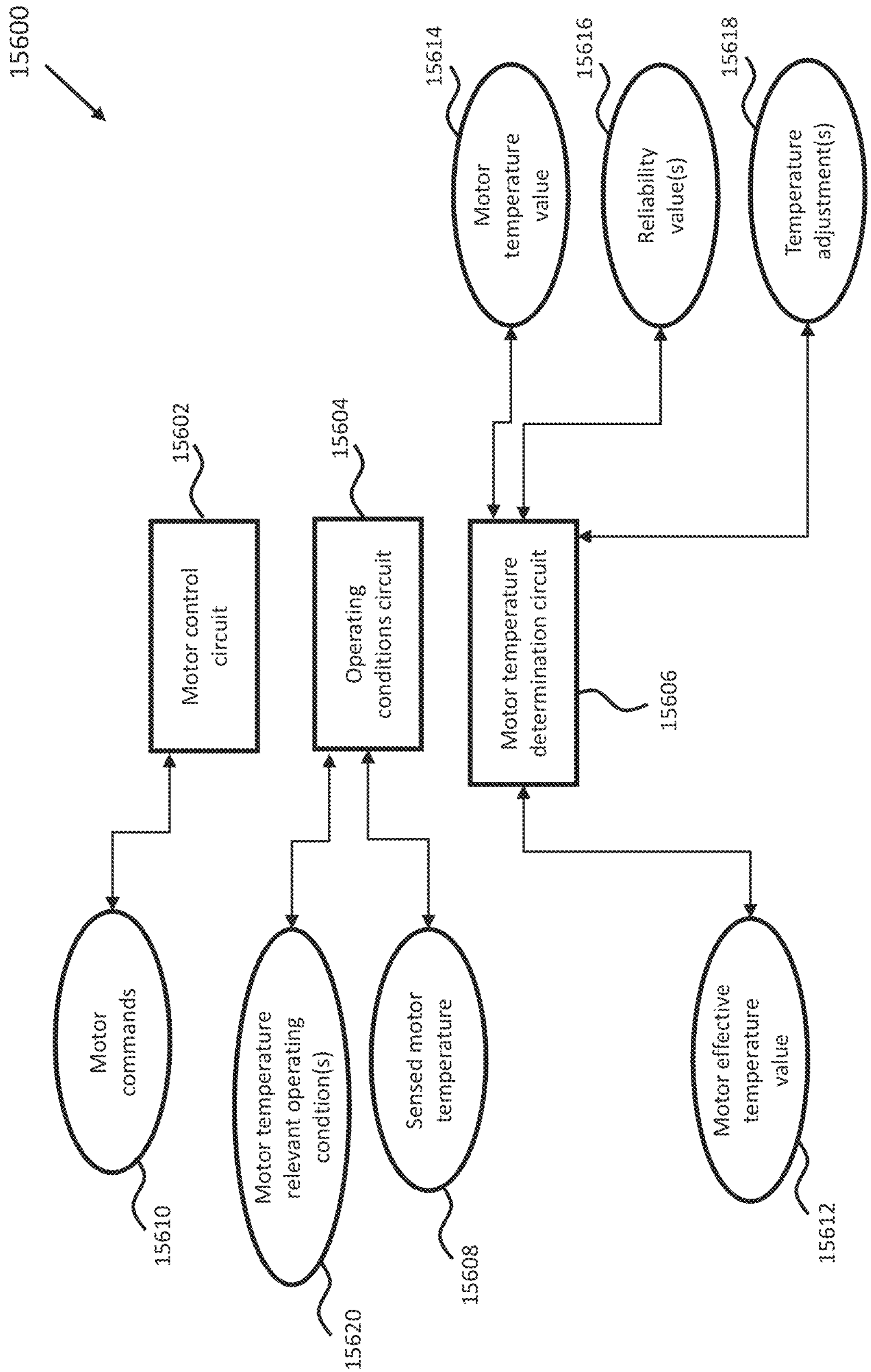

FIG. 156 depicts a schematic diagram of a controller.

Figure 157:
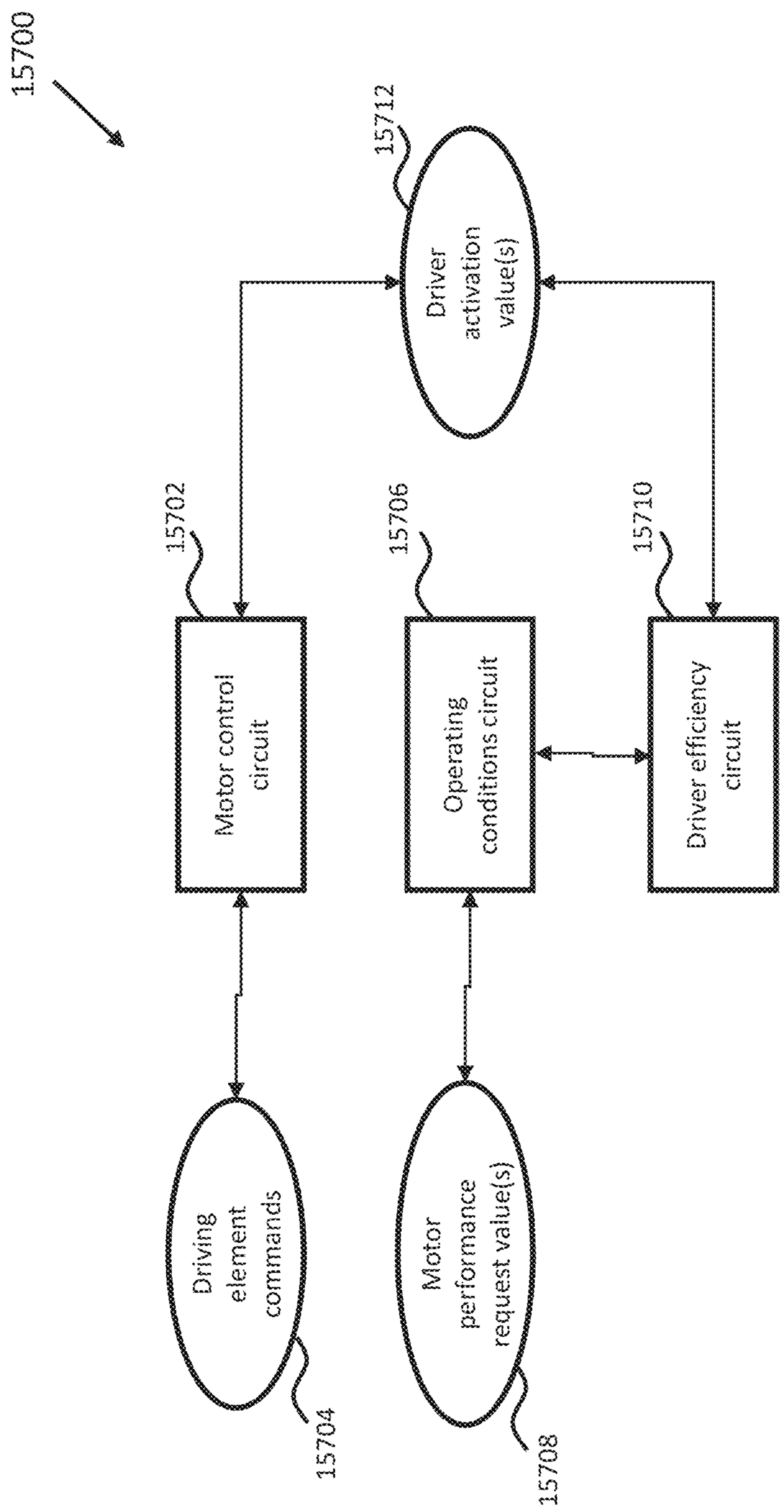

FIG. 157 depicts a schematic diagram of a controller.

Figure 158:
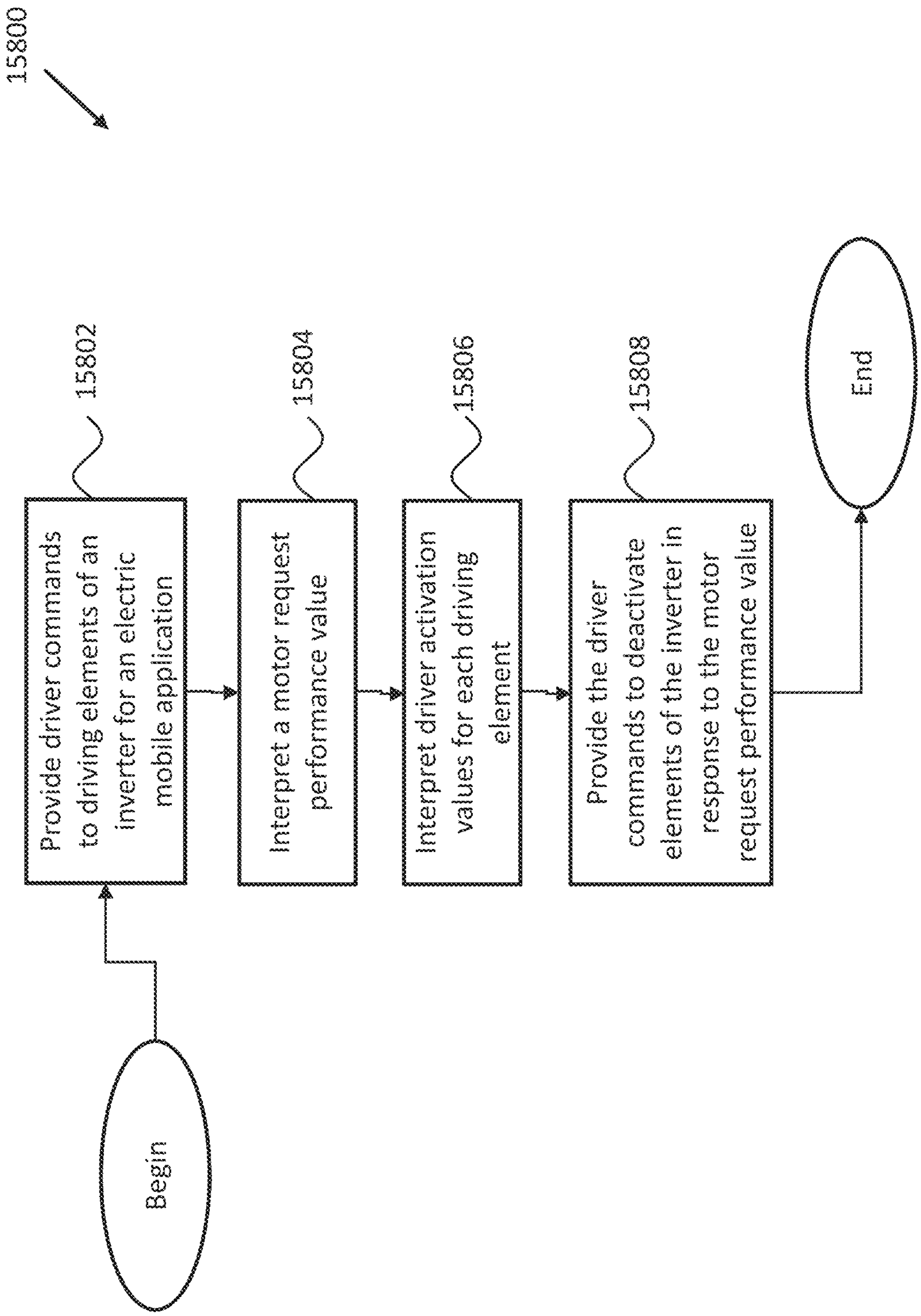

FIG. 158 depicts a schematic flow diagram of a procedure to adjust operations of an inverter.

Figure 159:
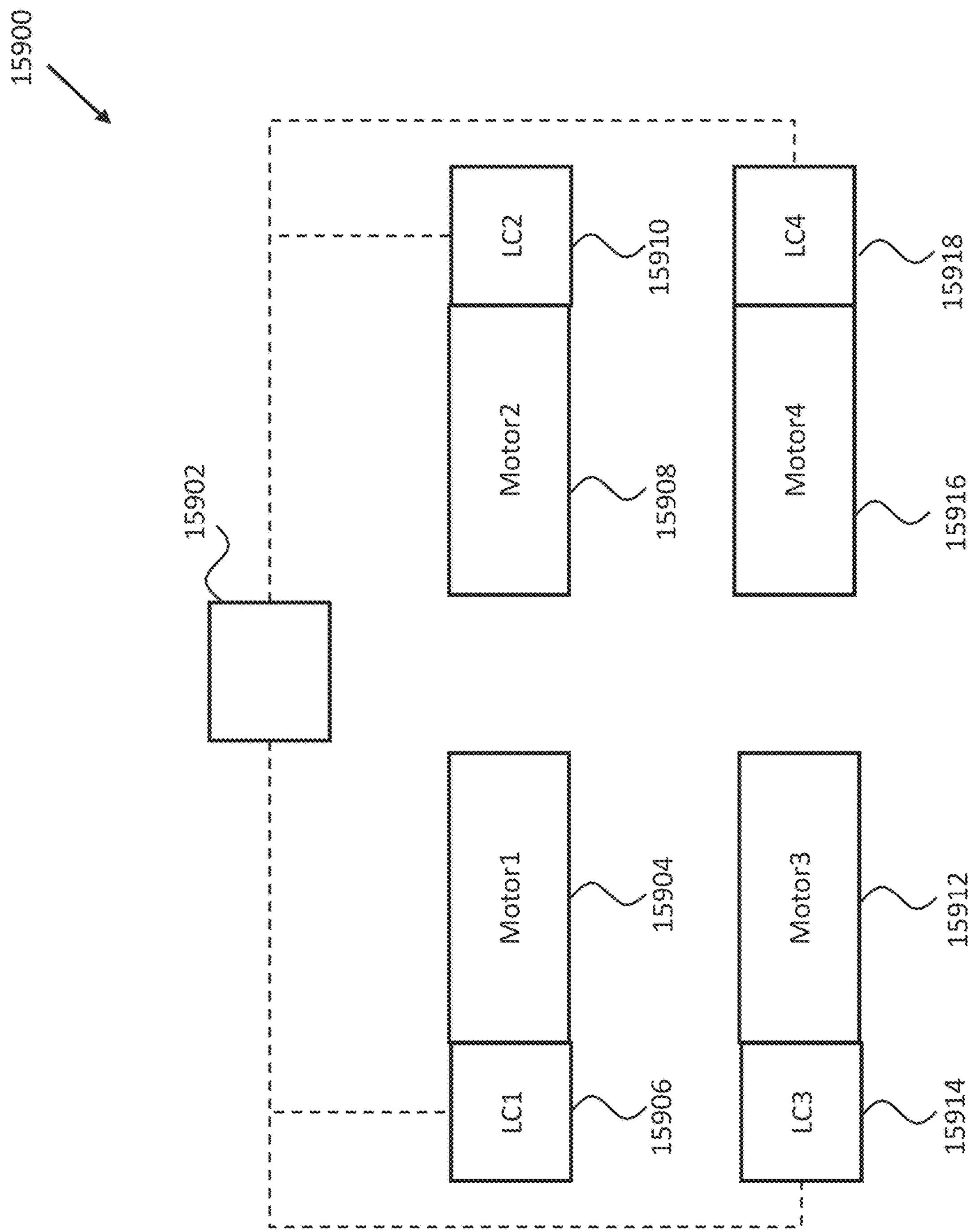

FIG. 159 depicts an embodiment of a system having multiple motors.

Figure 160:
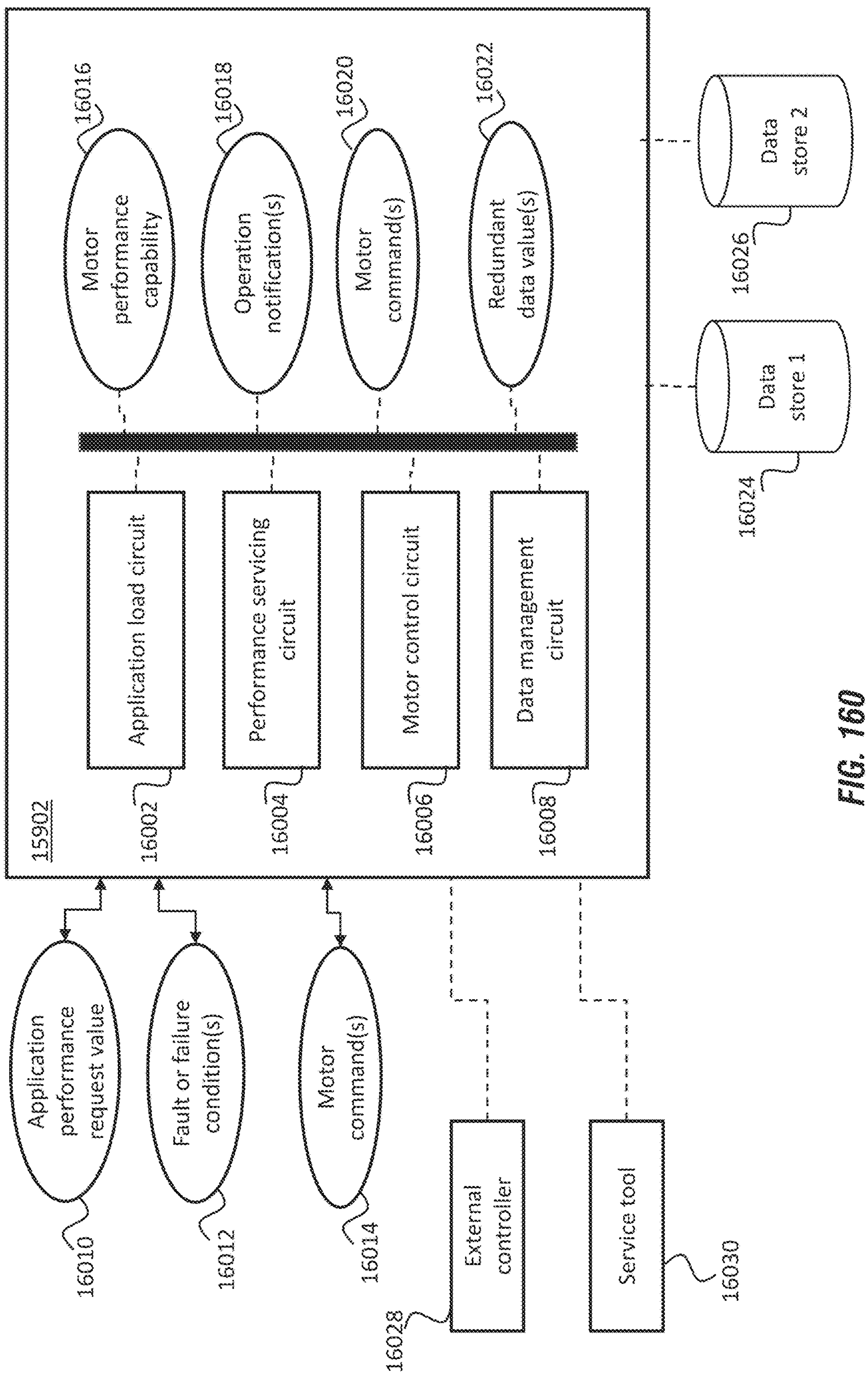

FIG. 160 depicts a schematic diagram of a controller.

Figure 161:
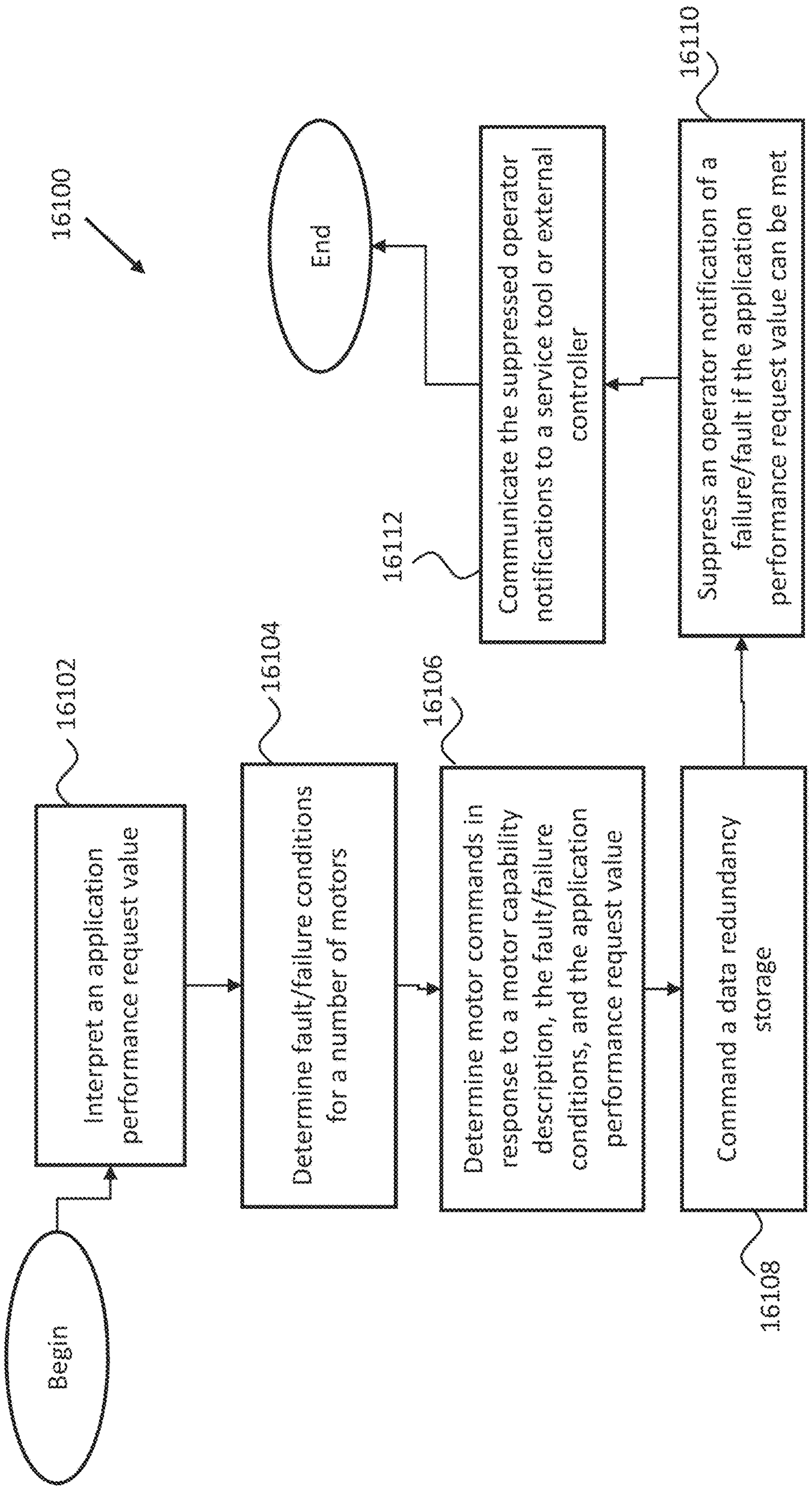

FIG. 161 depicts a schematic flow diagram of a procedure to operate multiple motors.

Figure 162:
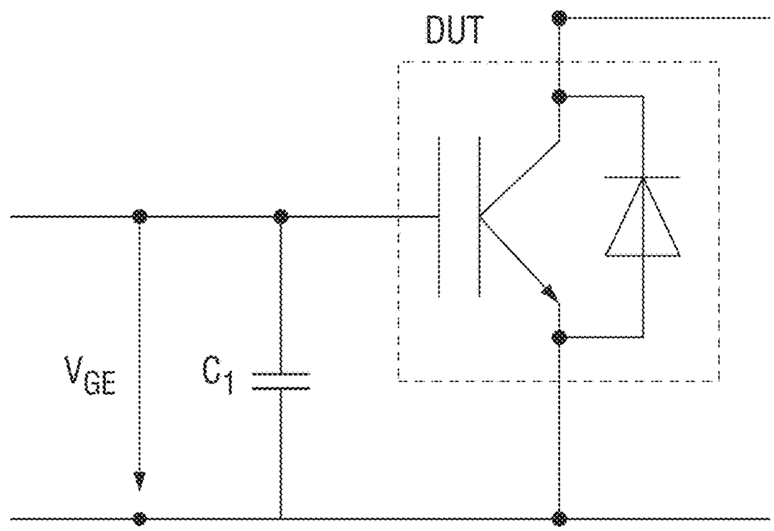

FIG. 162 depicts an embodiment for IGBT Driver control.

Figure 163:
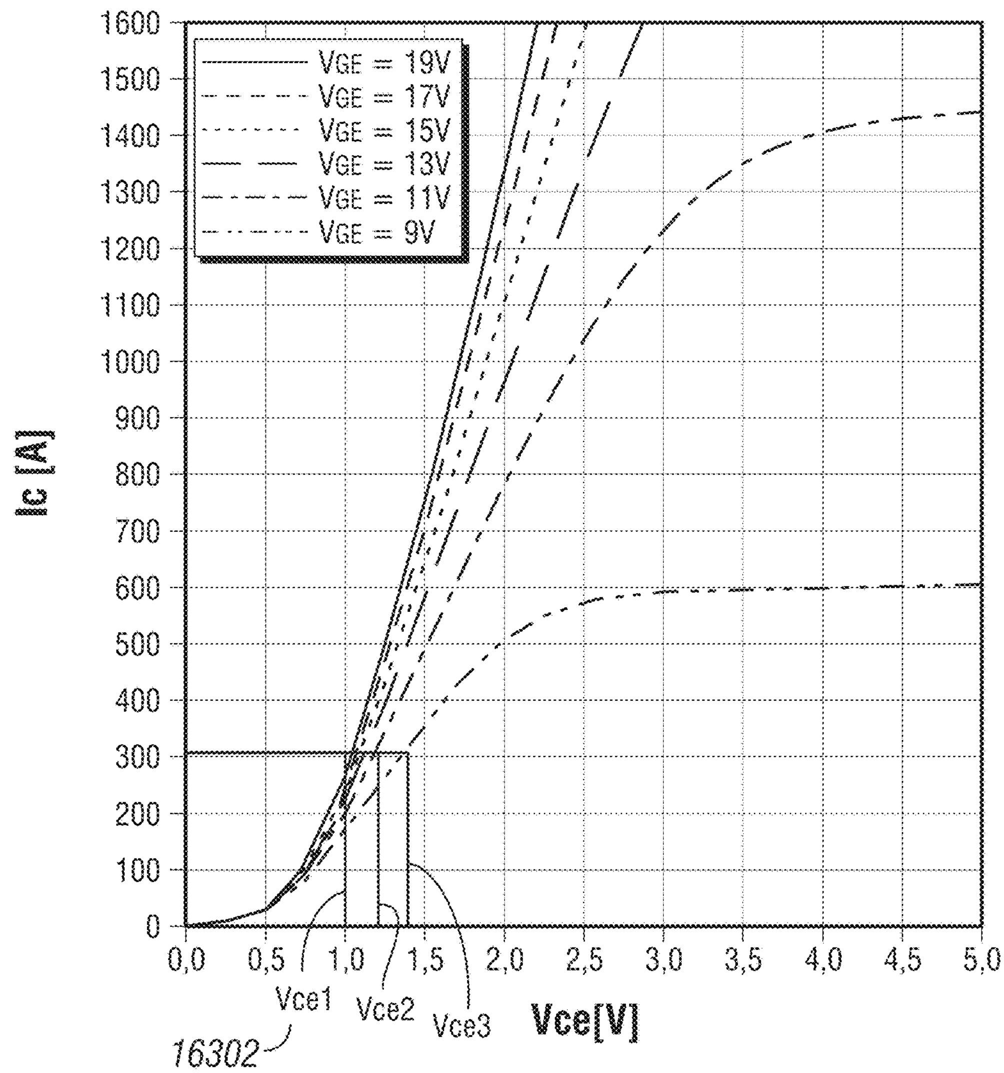

FIG. 163 depicts an embodiment $V_{ce}$ ($I_c$) curves under different $V_{GE}$ values.

Figure 164:
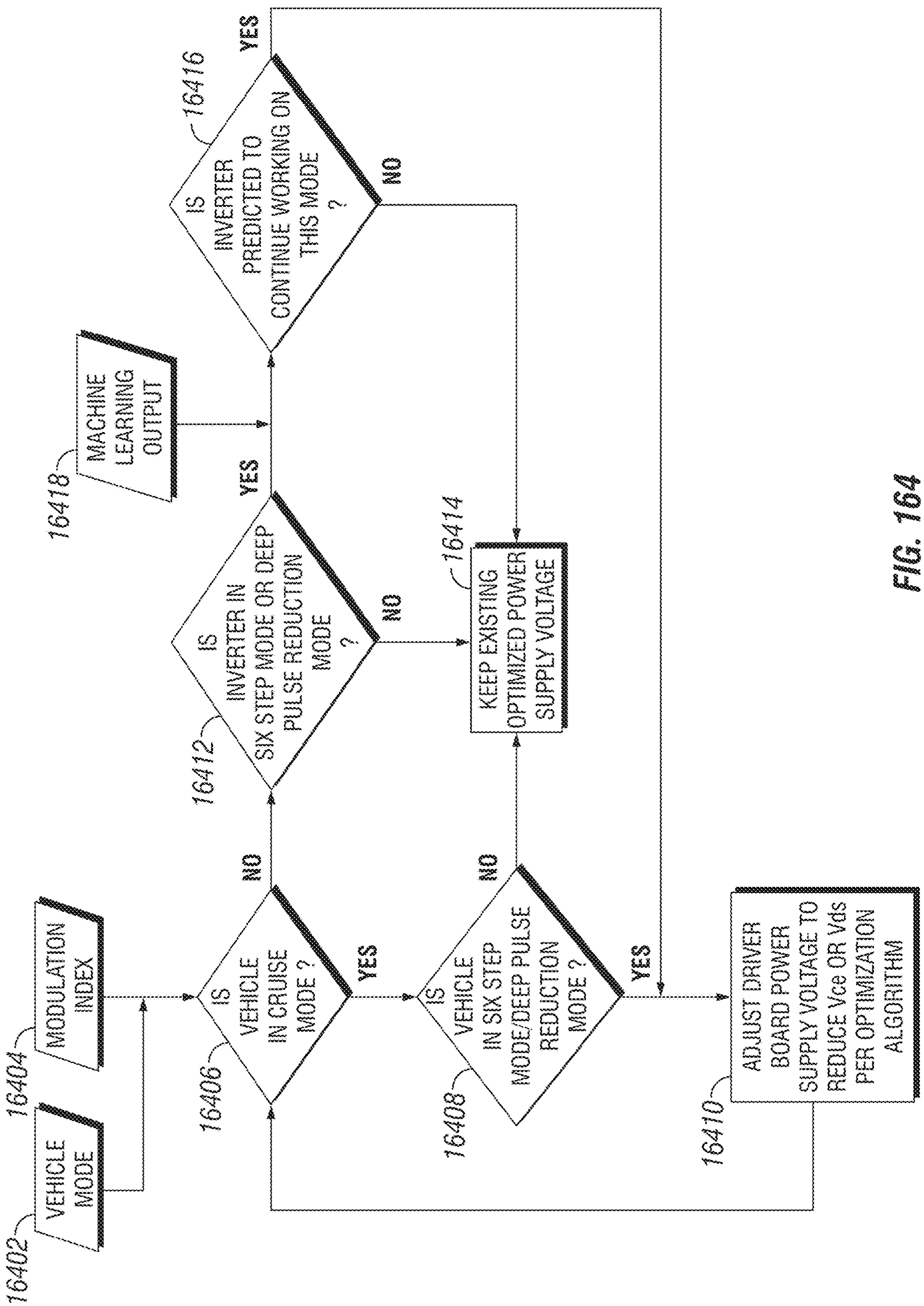

FIG. 164 depicts an embodiment flow diagram for dynamic driver board power supply voltage (DBPSV) control.

Figure 165:
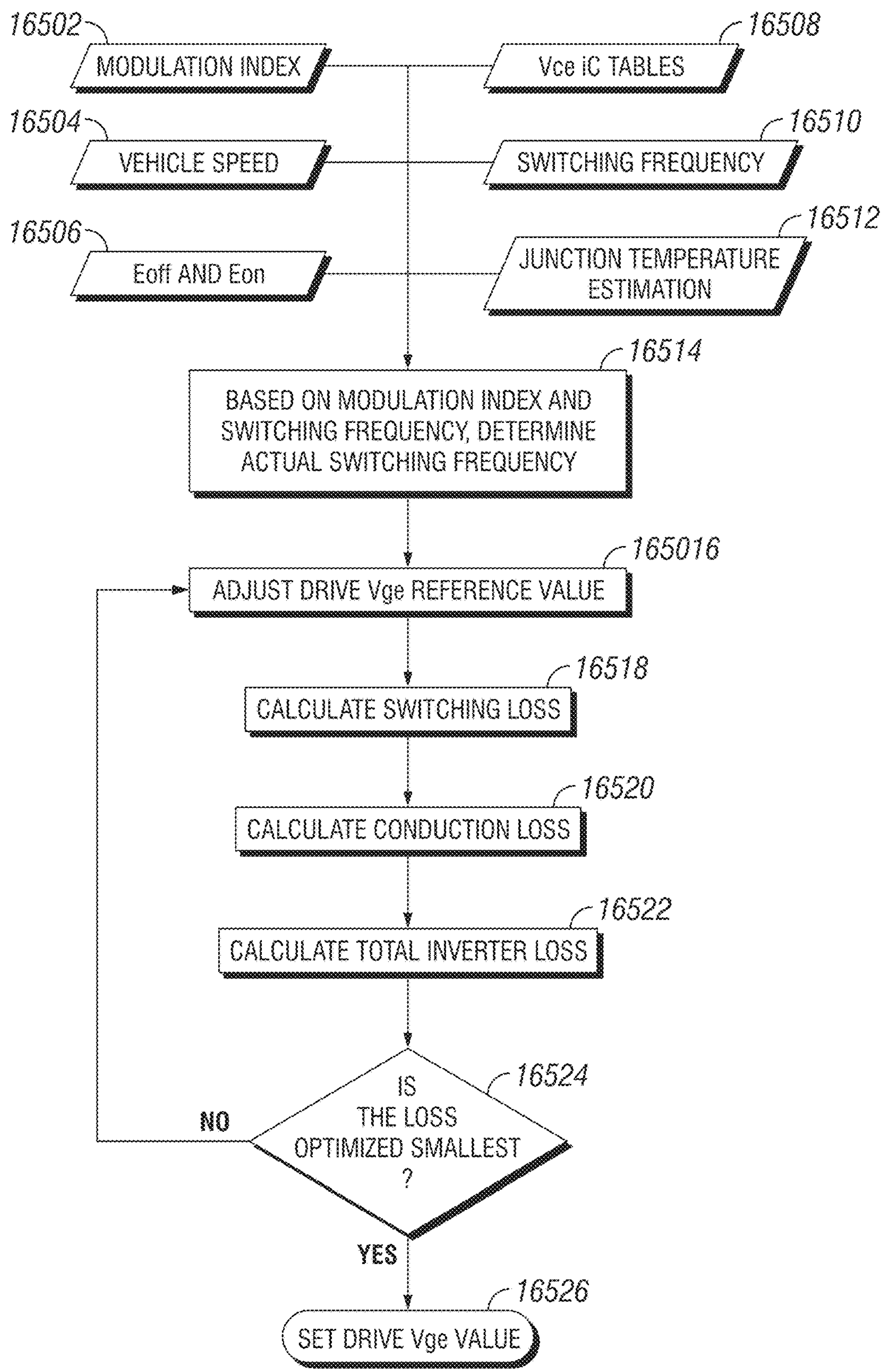

FIG. 165 depicts an embodiment calculation flow diagram.

Figure 166A:
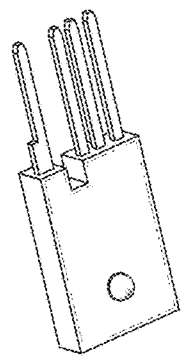
Figure 166B:
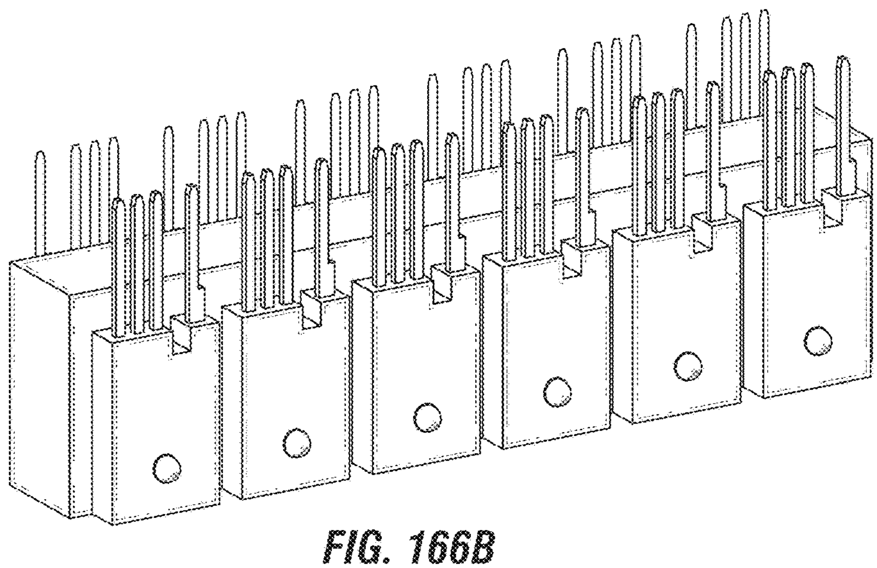
Figure 166C:
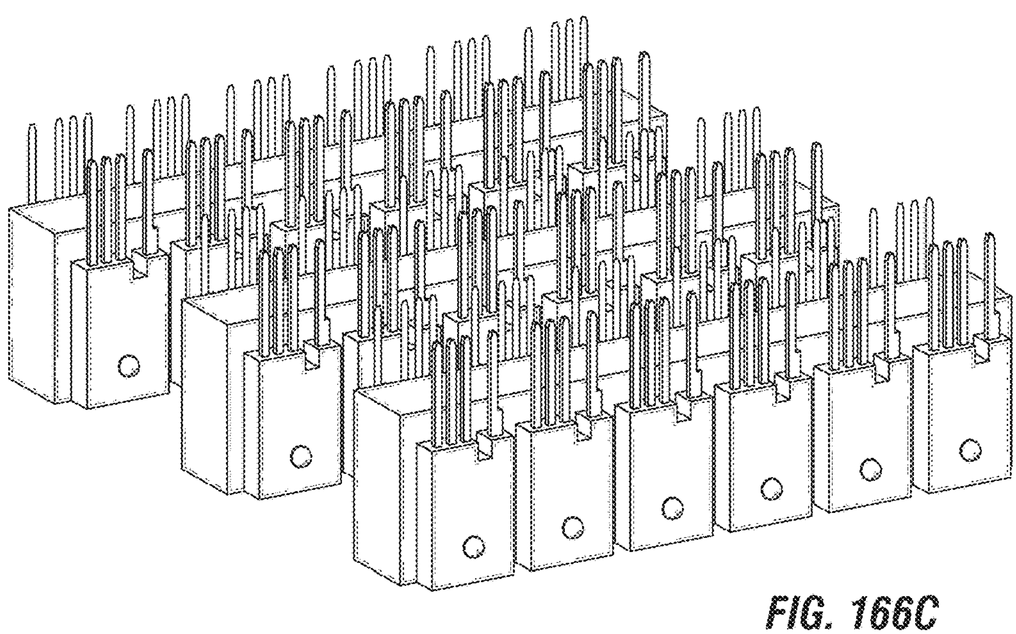

FIGS. 166A-C depict embodiments for power connection designs for a traction inverter with multiple paralleled devices.

Figure 167A:
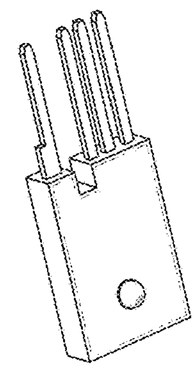
Figure 167B:
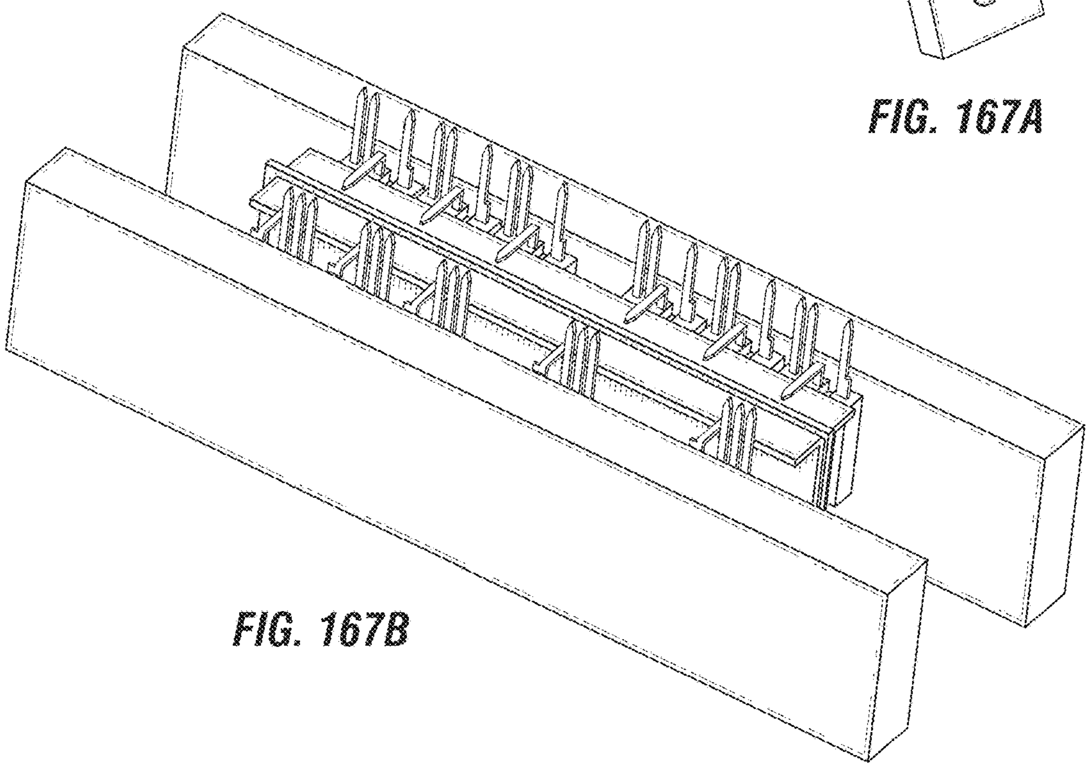

FIGS. 167A-B depict embodiments for power connection designs for a traction inverter with multiple paralleled devices.

Figure 168:
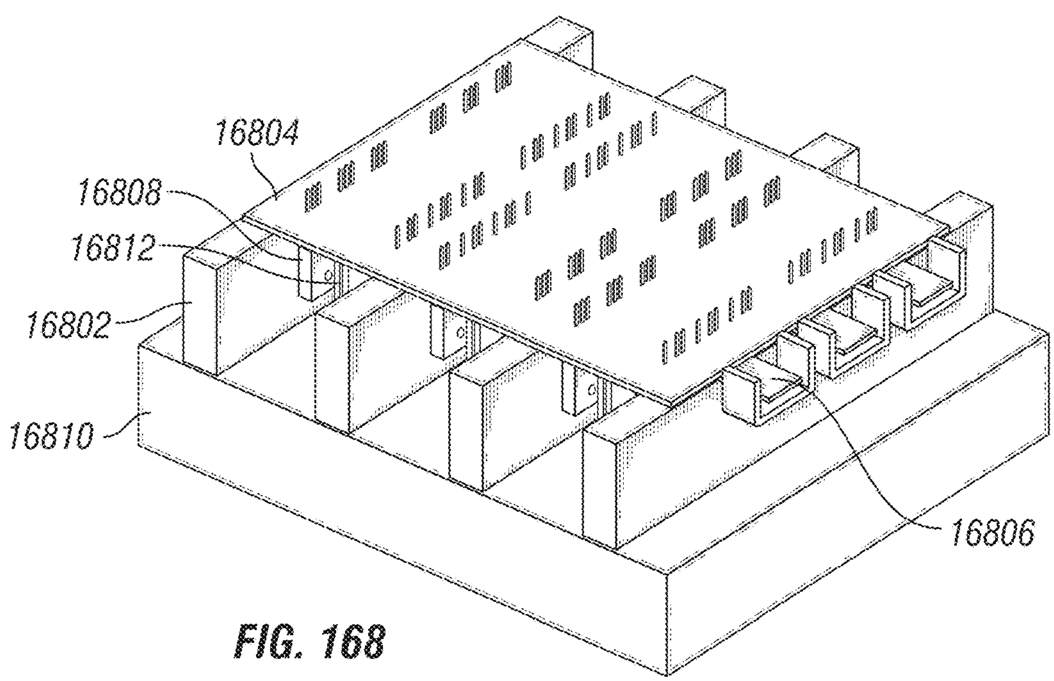

FIG. 168 depicts an embodiment three-phase assembly.

Figure 169:
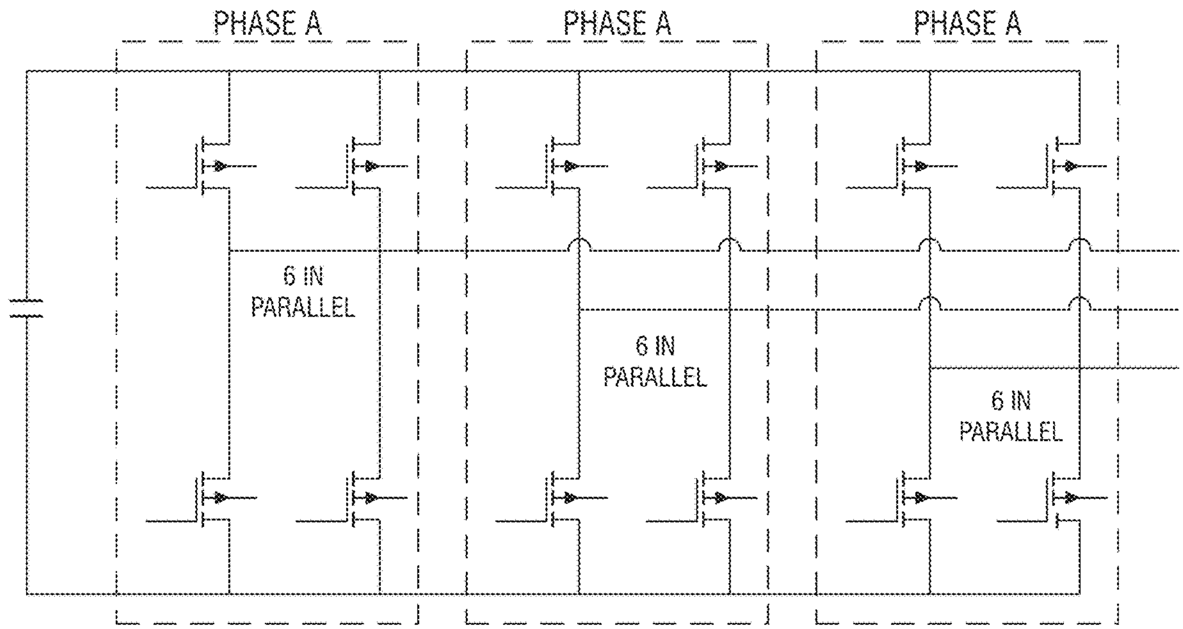

FIG. 169 depicts an example circuit of a three-phase two-level inverter.

Figure 170:
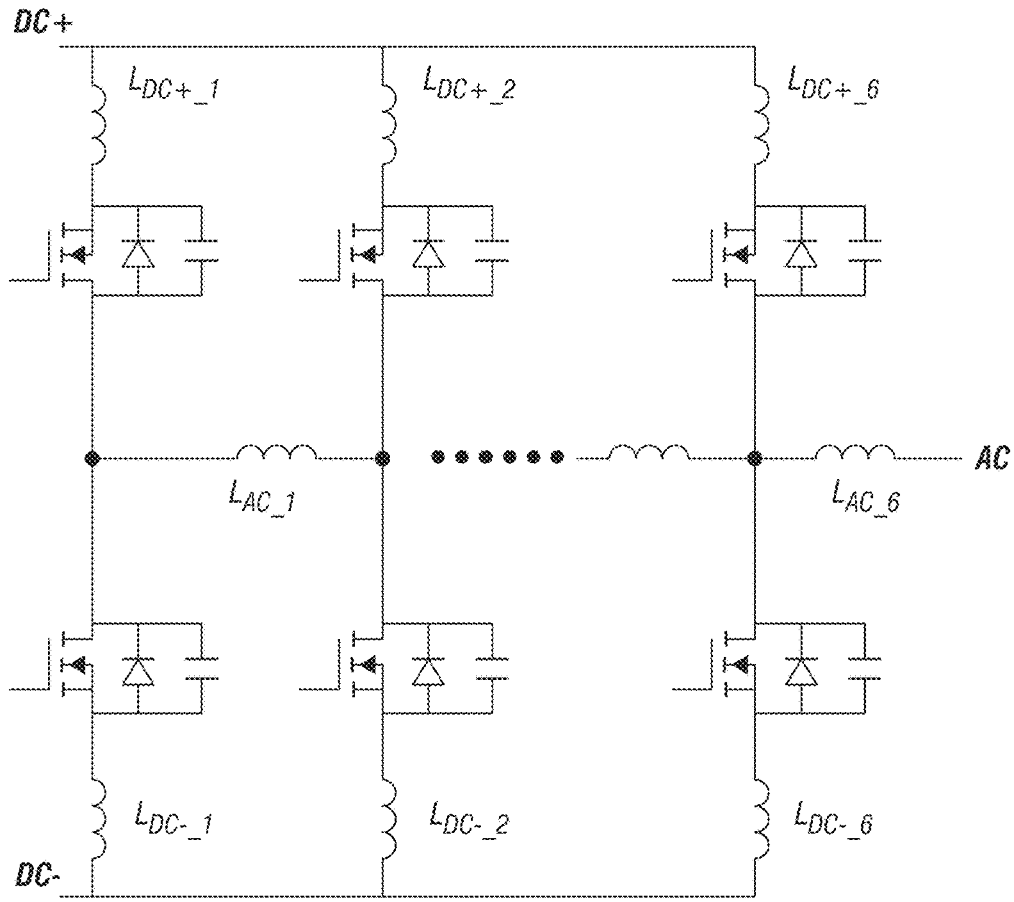

FIG. 170 depicts an example circuit of a one-phase switch with six devices in parallel.

Figure 171A:
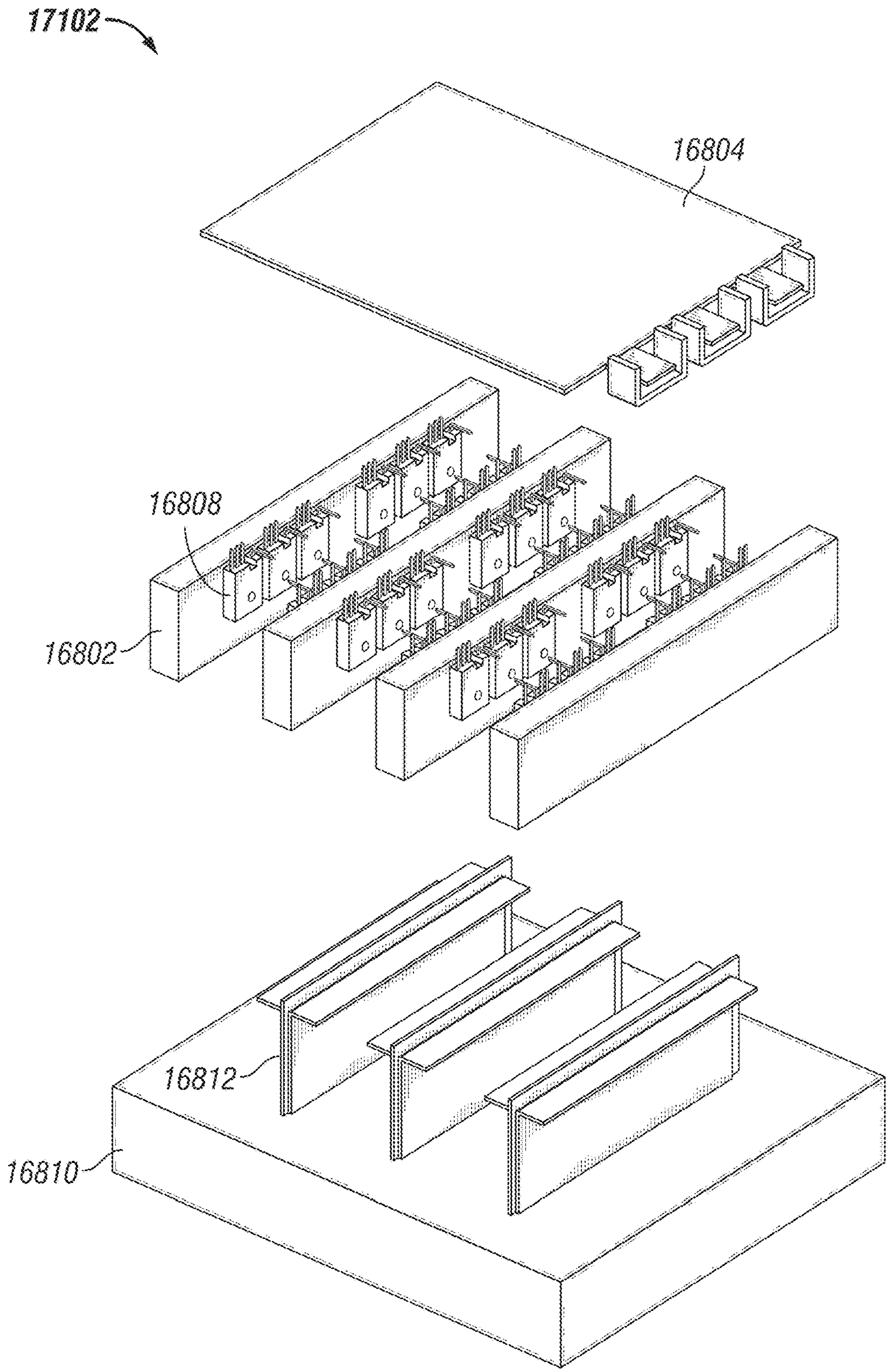
Figure 171B:
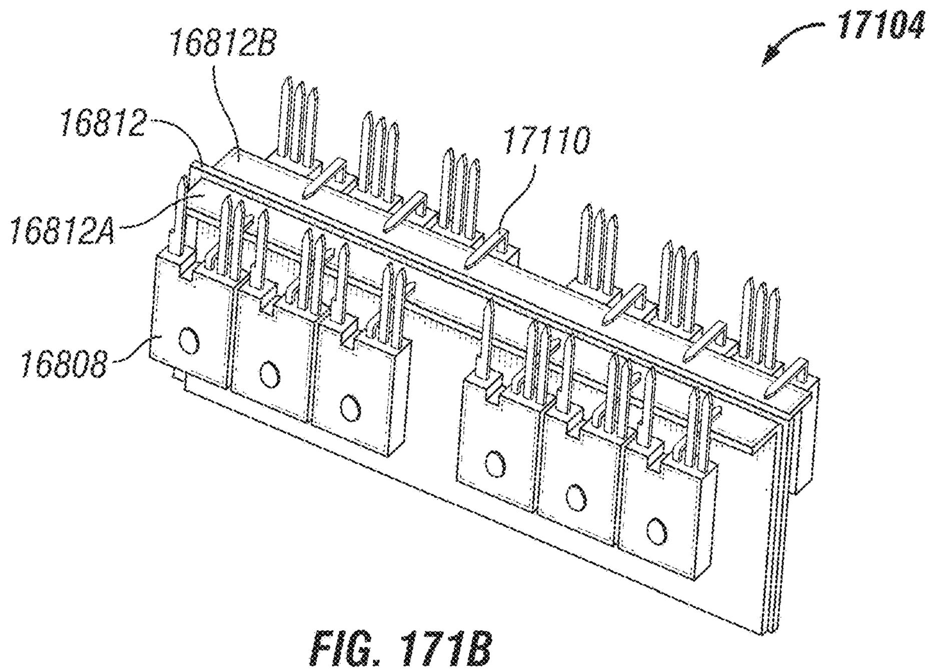
Figure 171C:
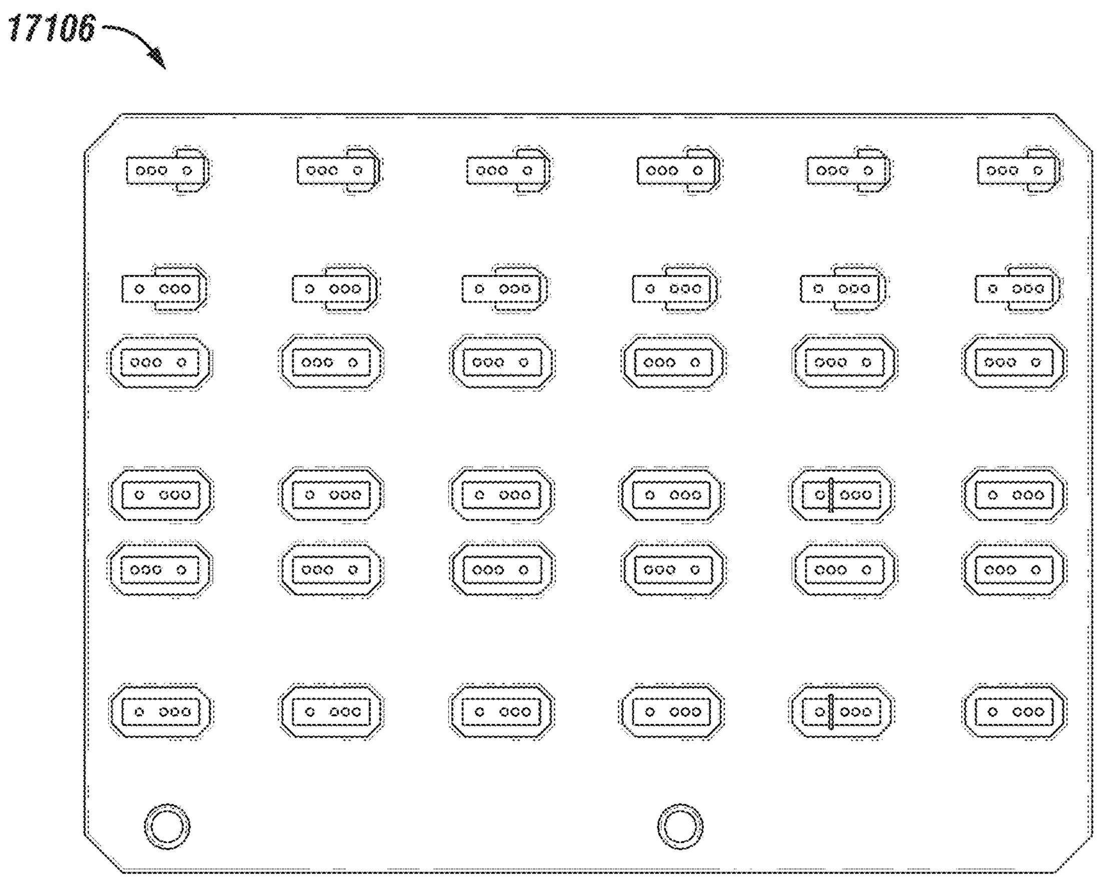

FIGS. 171A-C depict embodiments of aspects of a multiple paralleled design including an exploded view of a three-phase assembly, a DC busbar connection, and an AC printed circuit board connection.

Figure 172A:
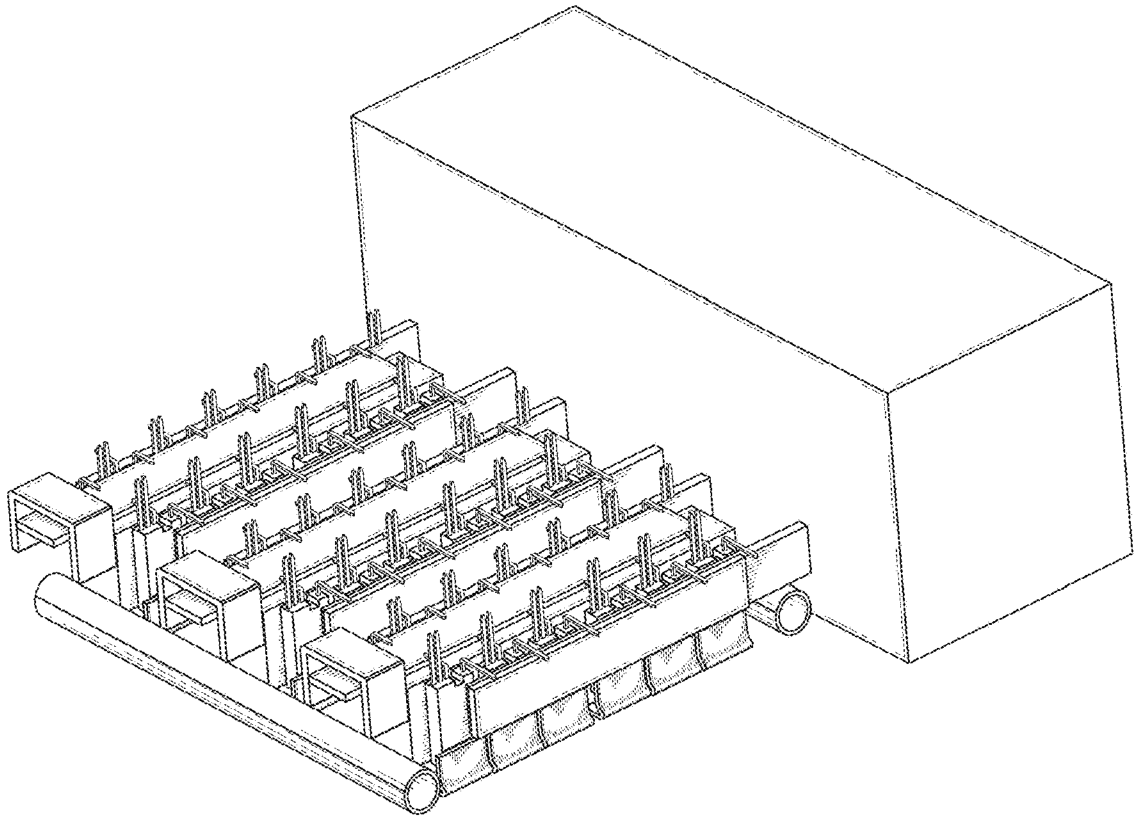
Figure 172B:
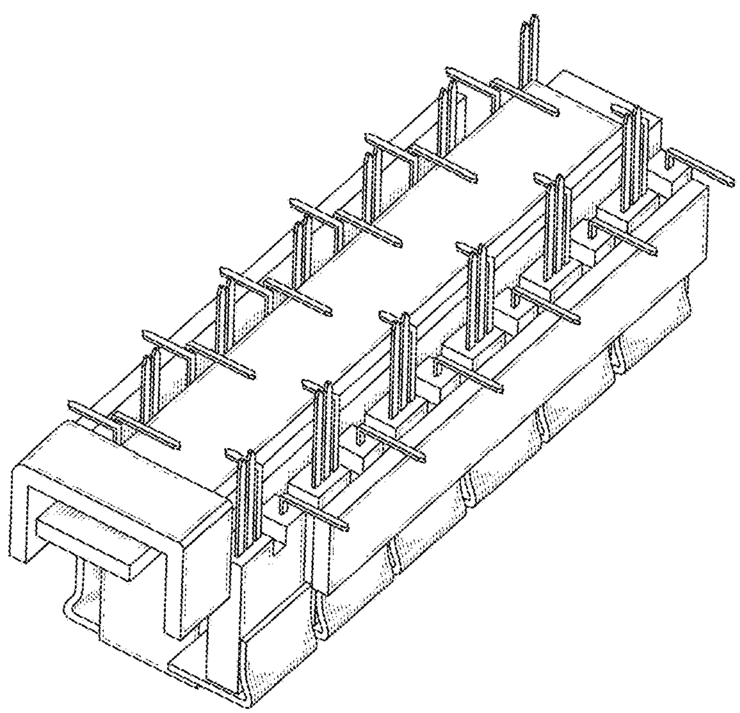

FIGS. 172A-B depict embodiments of a multiple busbar connection arrangement.

Figure 173A:
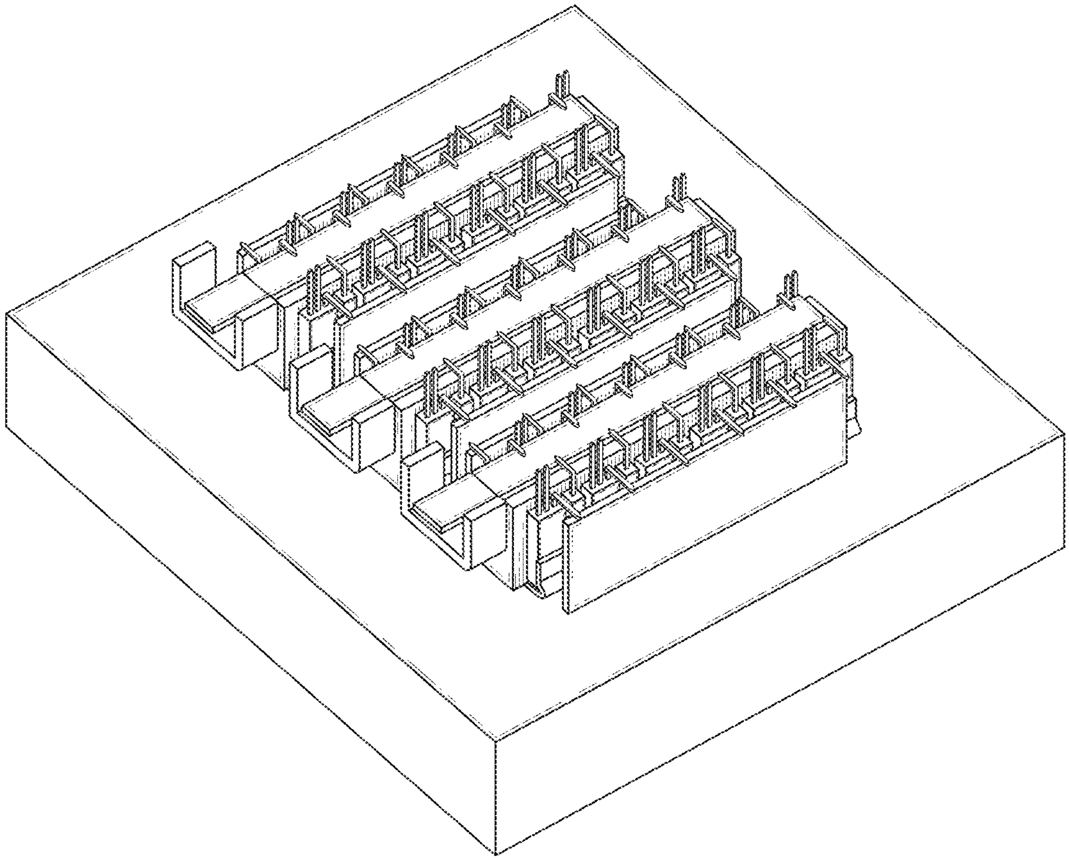
Figure 173B:
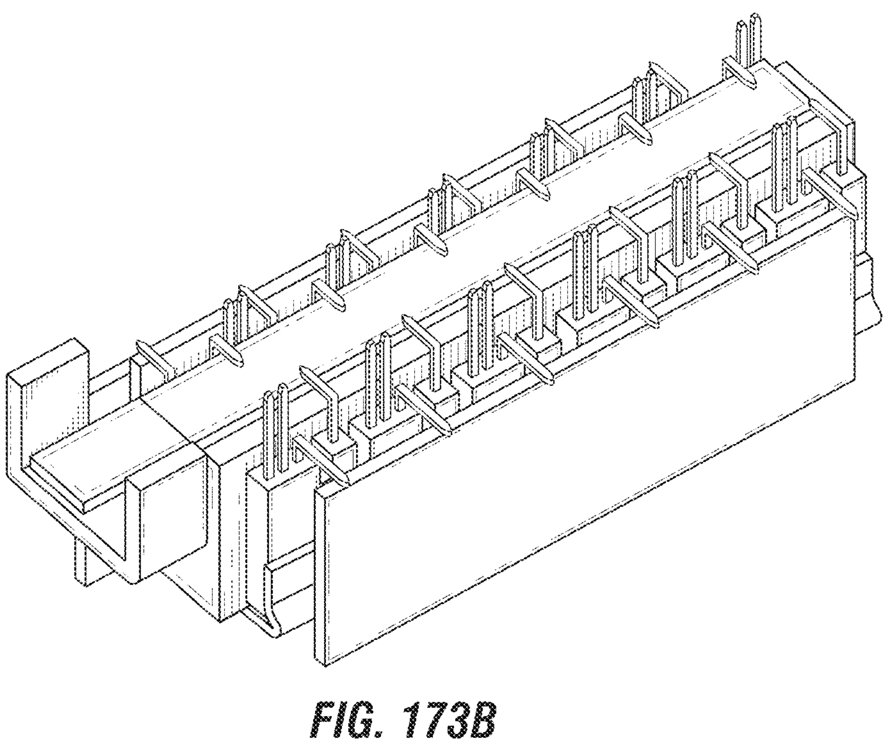

FIGS. 173A-B depict embodiments of a multiple busbar connection arrangement.

Figure 174A:
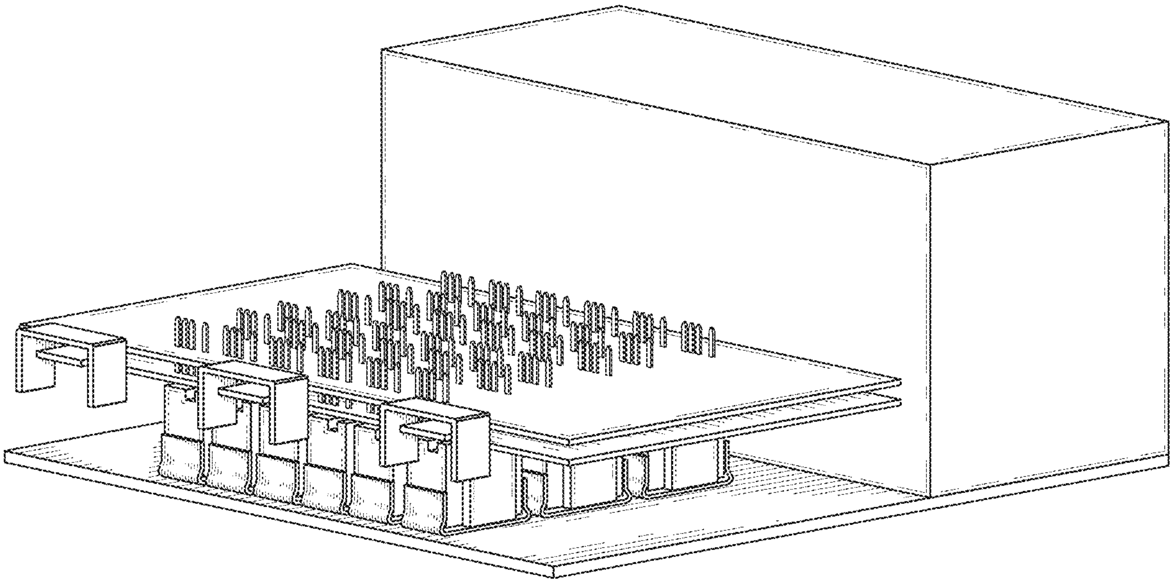
Figure 174B:
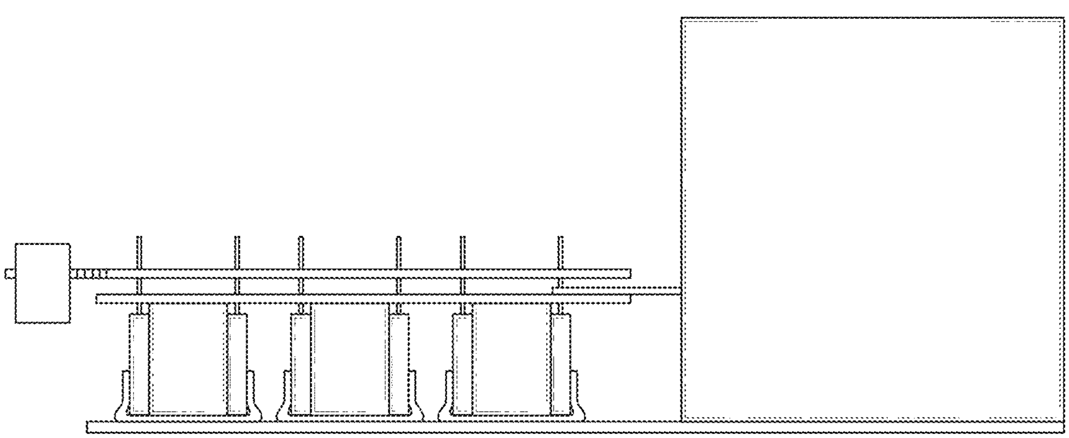

FIGS. 174A-B depict embodiments of a multiple busbar connection arrangement in connection with a AC printed circuit board.

Figure 175C:
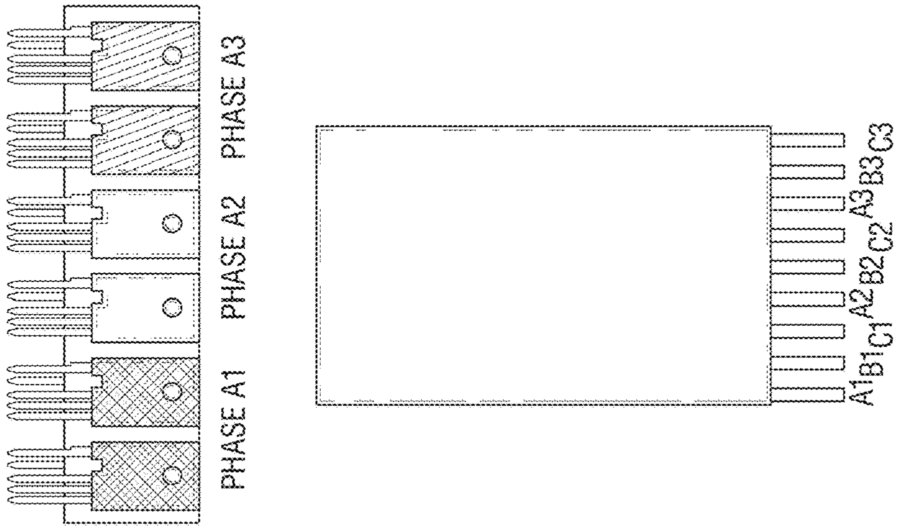
Figure 175B:
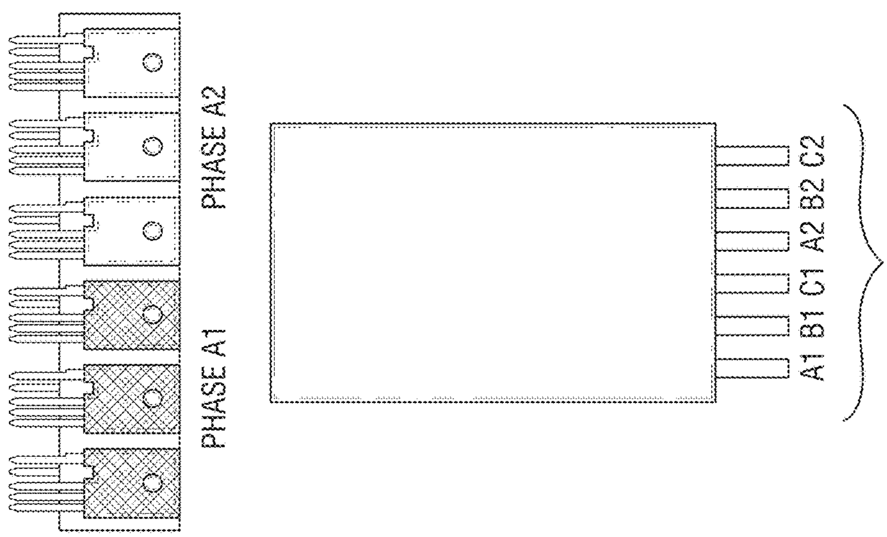
Figure 175A:
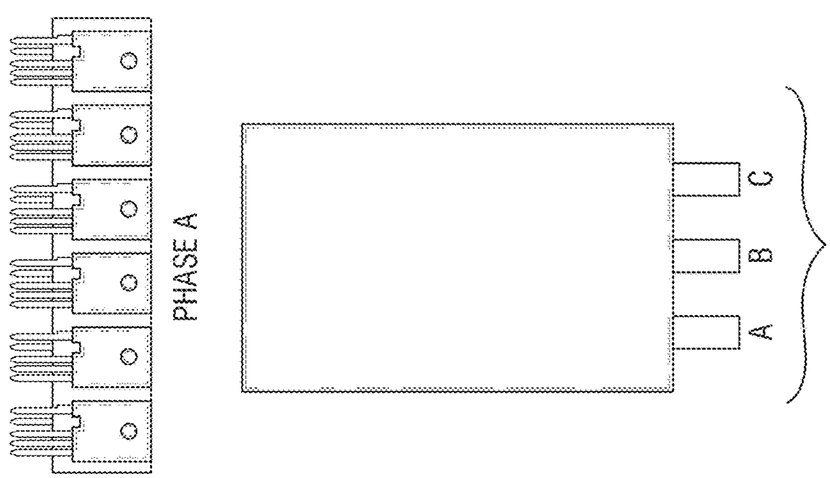

FIGS. 175A-C depict embodiment options for driving a multi-phase motor.

Figure 176:
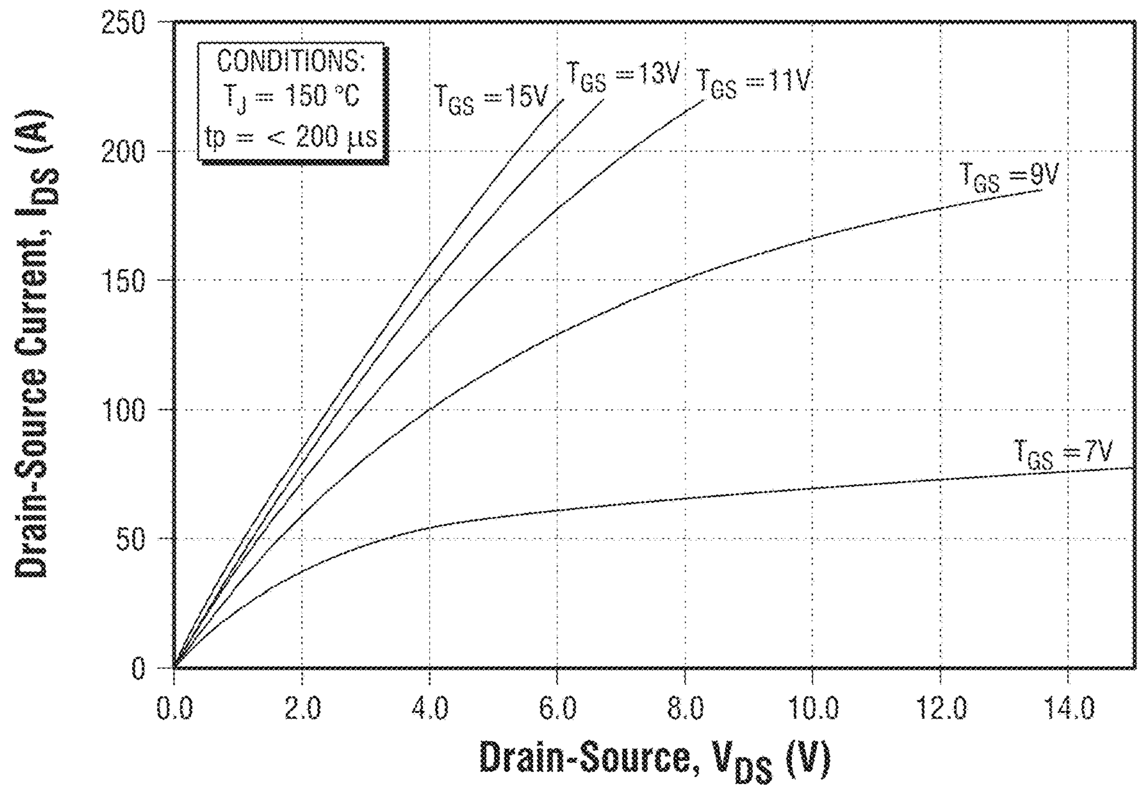

FIG. 176 depicts a gate drive relationship for a device.

Figure 177:
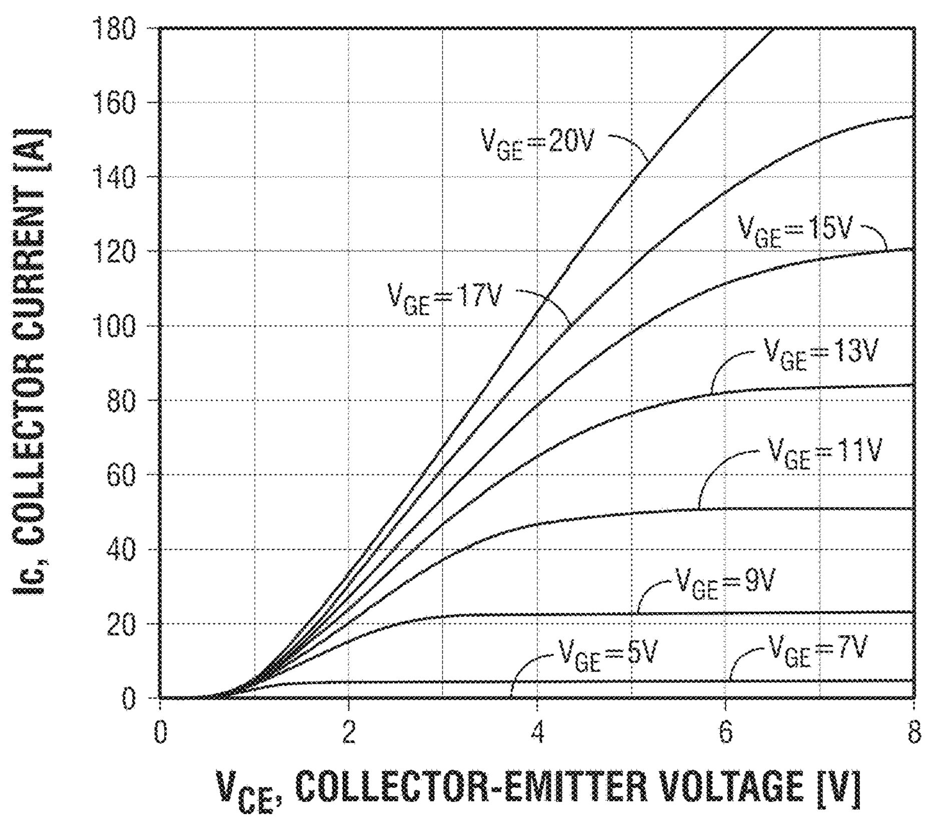

FIG. 177 depicts a gate drive relationship for a device.

Figure 178:
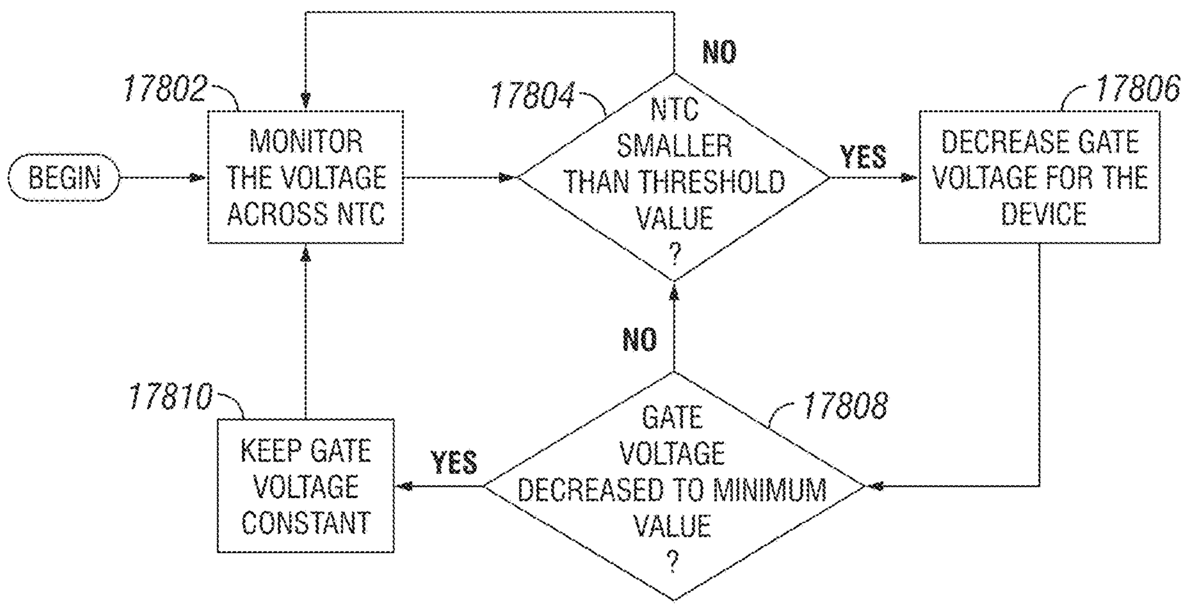

FIG. 178 depicts an embodiment process flow diagram relating to control of a gate voltage to control device temperature.

Figure 179:
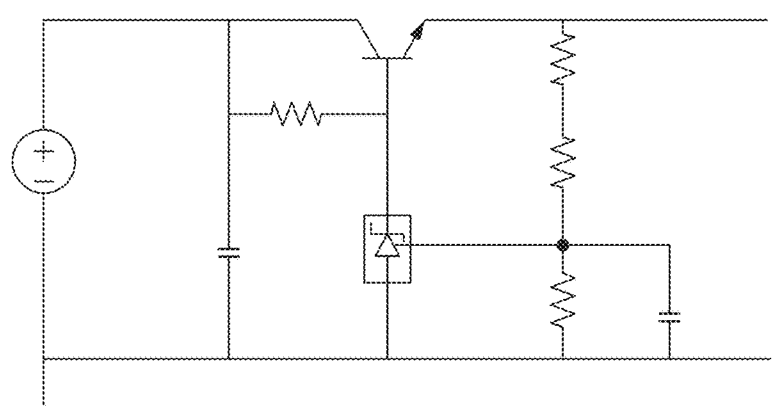

FIG. 179 depicts an embodiment circuit for providing active current balancing.

Figure 180A:
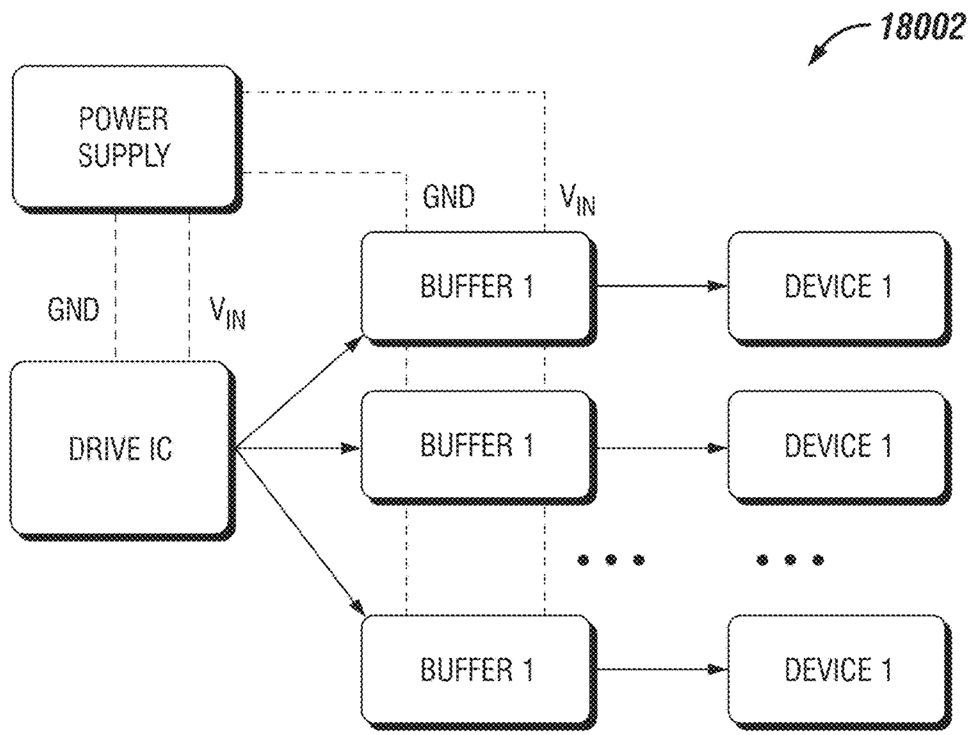
Figure 180B:
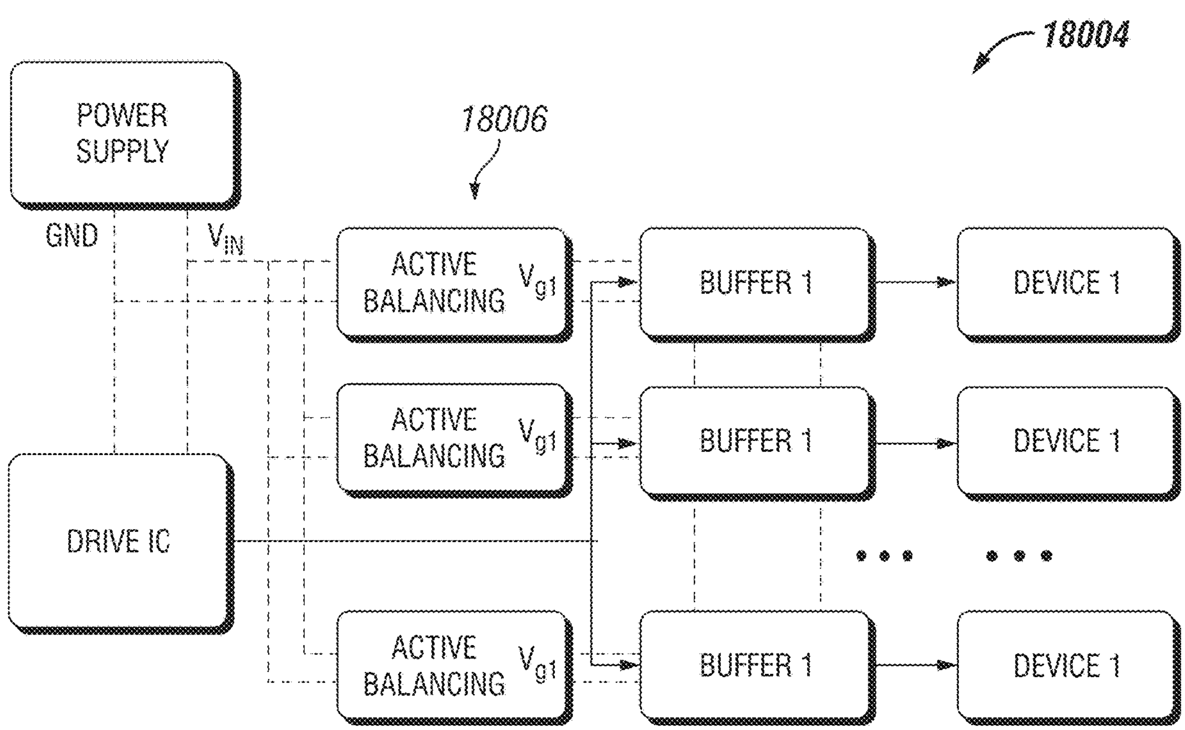

FIGS. 180A-B depict embodiment block diagrams for an overall structure with active current balancing.

Figure 181:
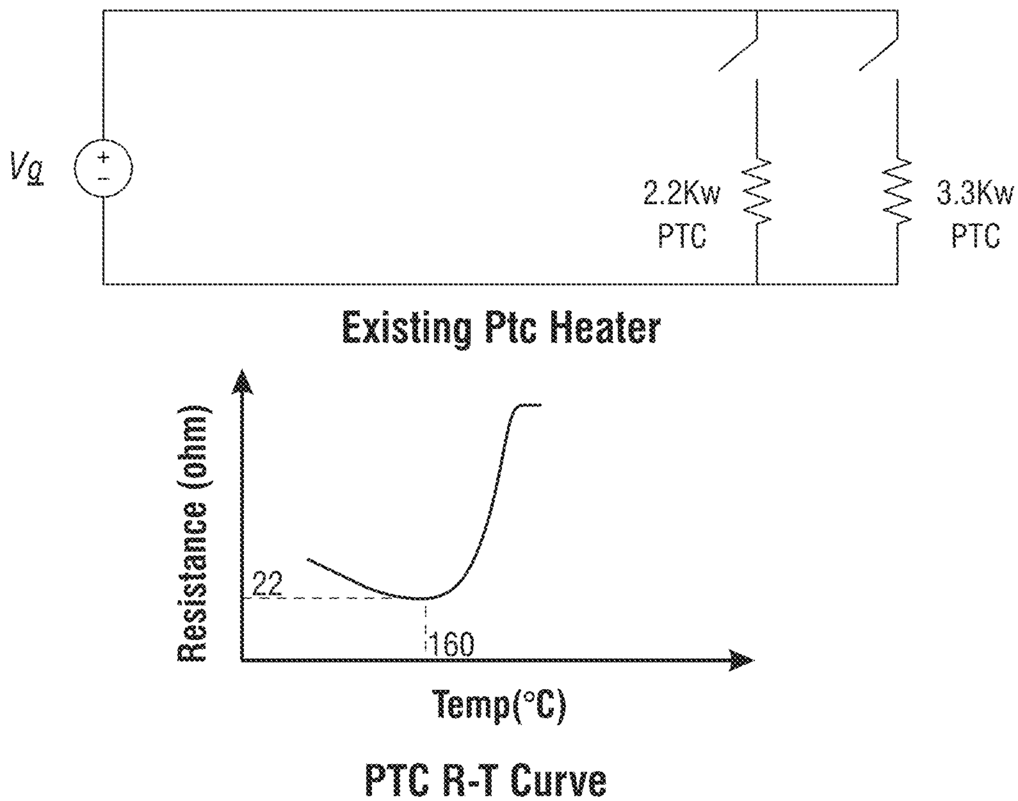

FIG. 181 depicts an example previously known circuit and related positive temperature coefficient (PTC) resistance-temperature (R-T) curve.

Figure 182:
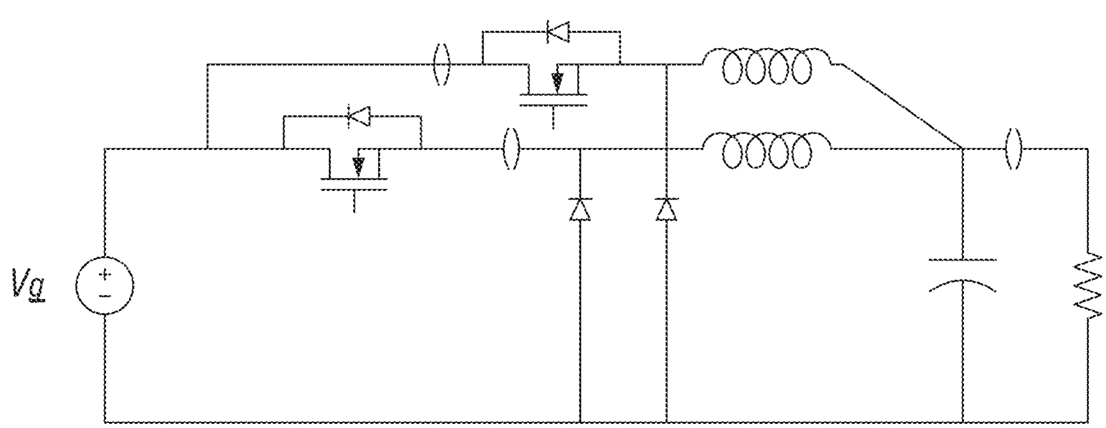

FIG. 182 depicts an embodiment control circuit related to a high power electric heater.

Figure 183:
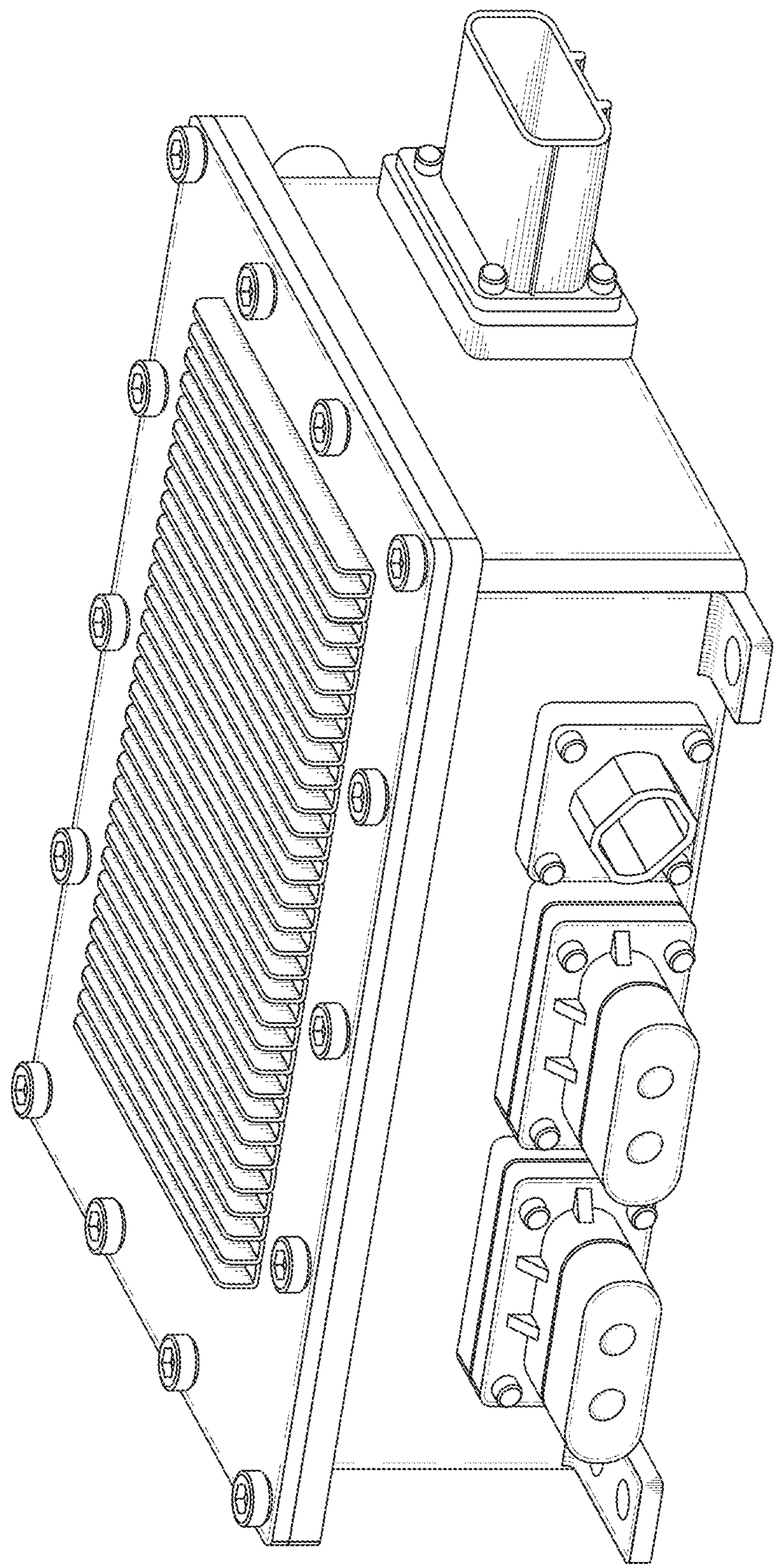

FIG. 183 presents an embodiment integrated positive temperature coefficient (PTC) heating element and a power distribution unit (PDU).

Figure 184:
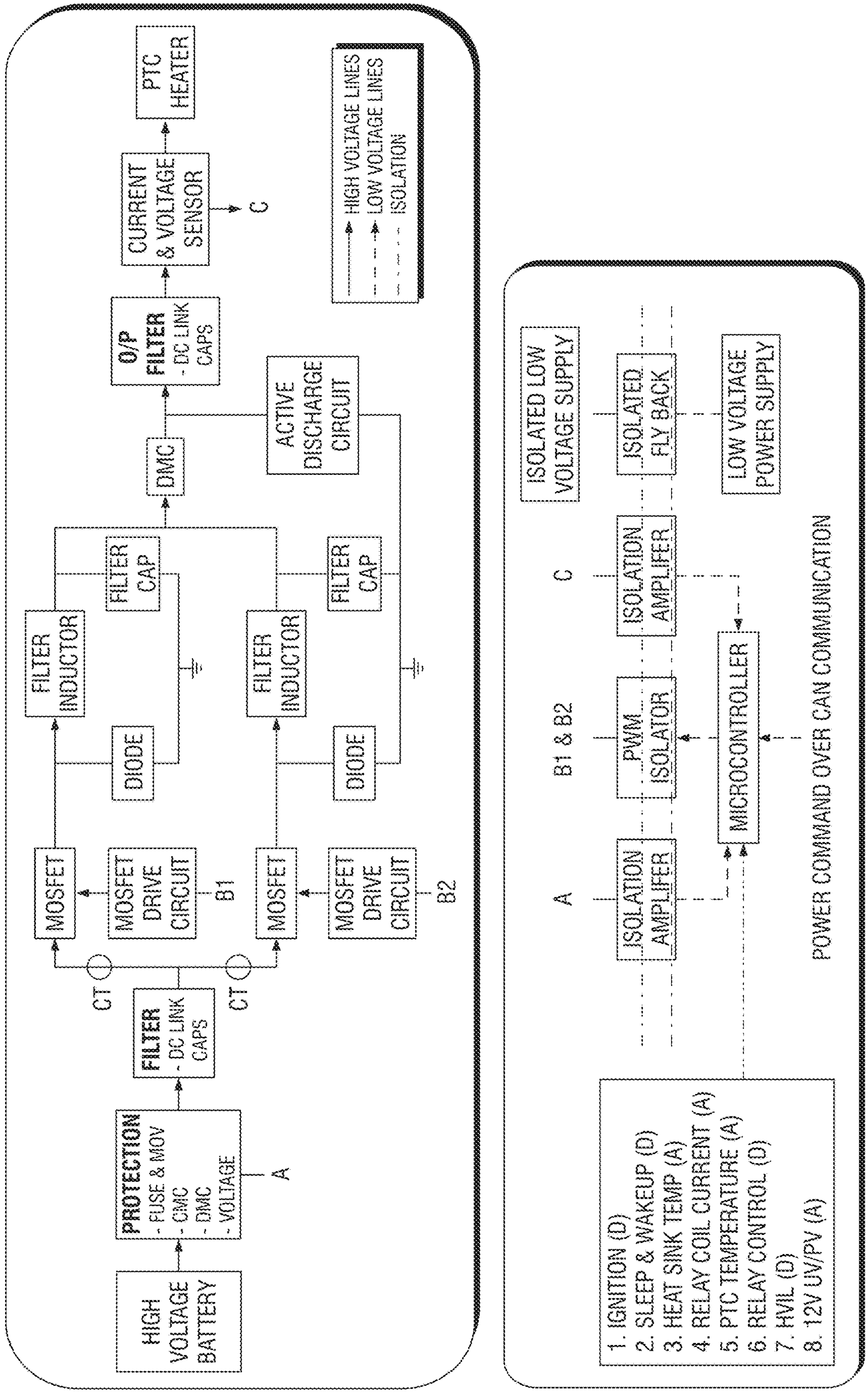

FIG. 184 presents an embodiment example electrical architecture, including a battery voltage provided to PDU functionality and a PTC heater function.

Figure 185A:
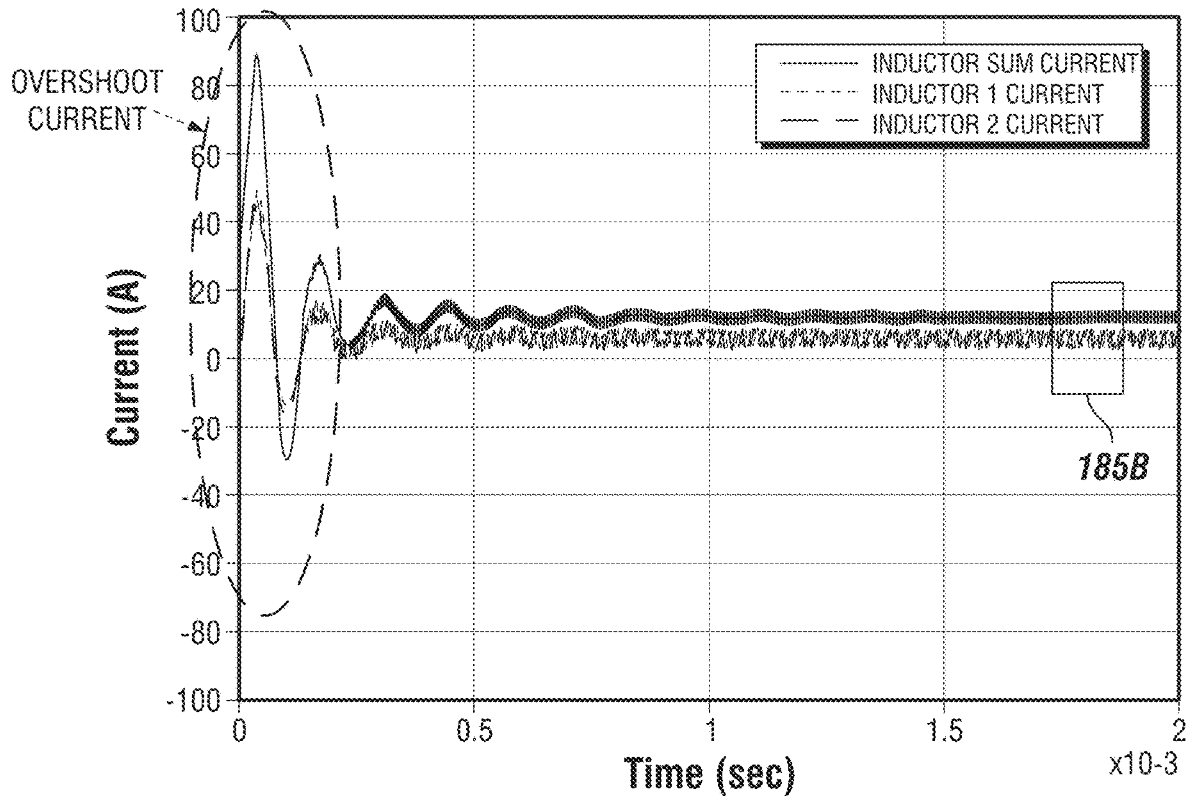
Figure 185B:
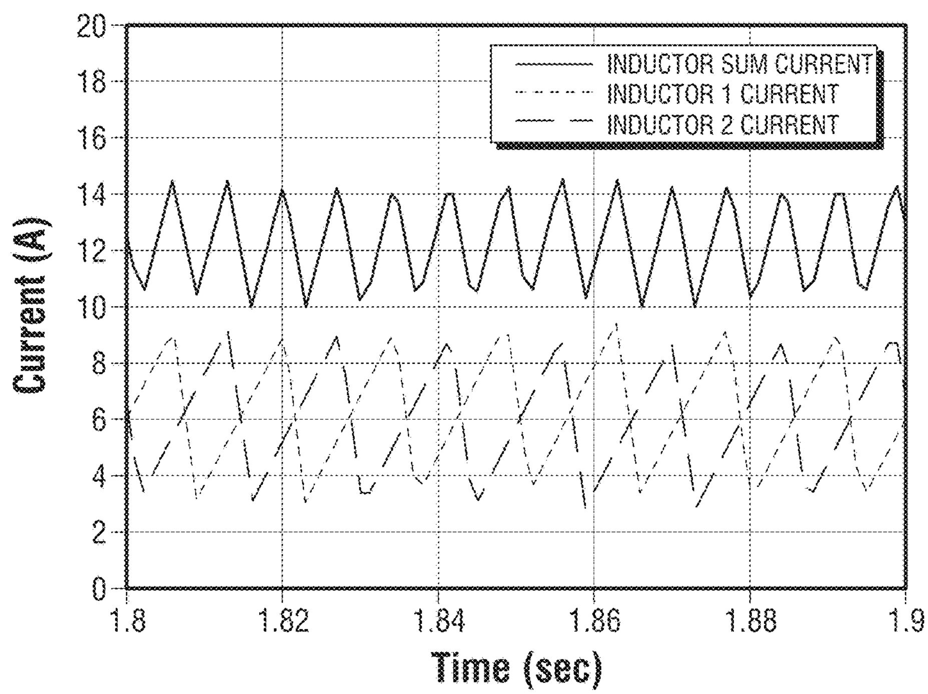

FIGS. 185A-B illustrate overshoot current as controlled through overshoot current management in an embodiment of the present disclosure.

Figure 186A:
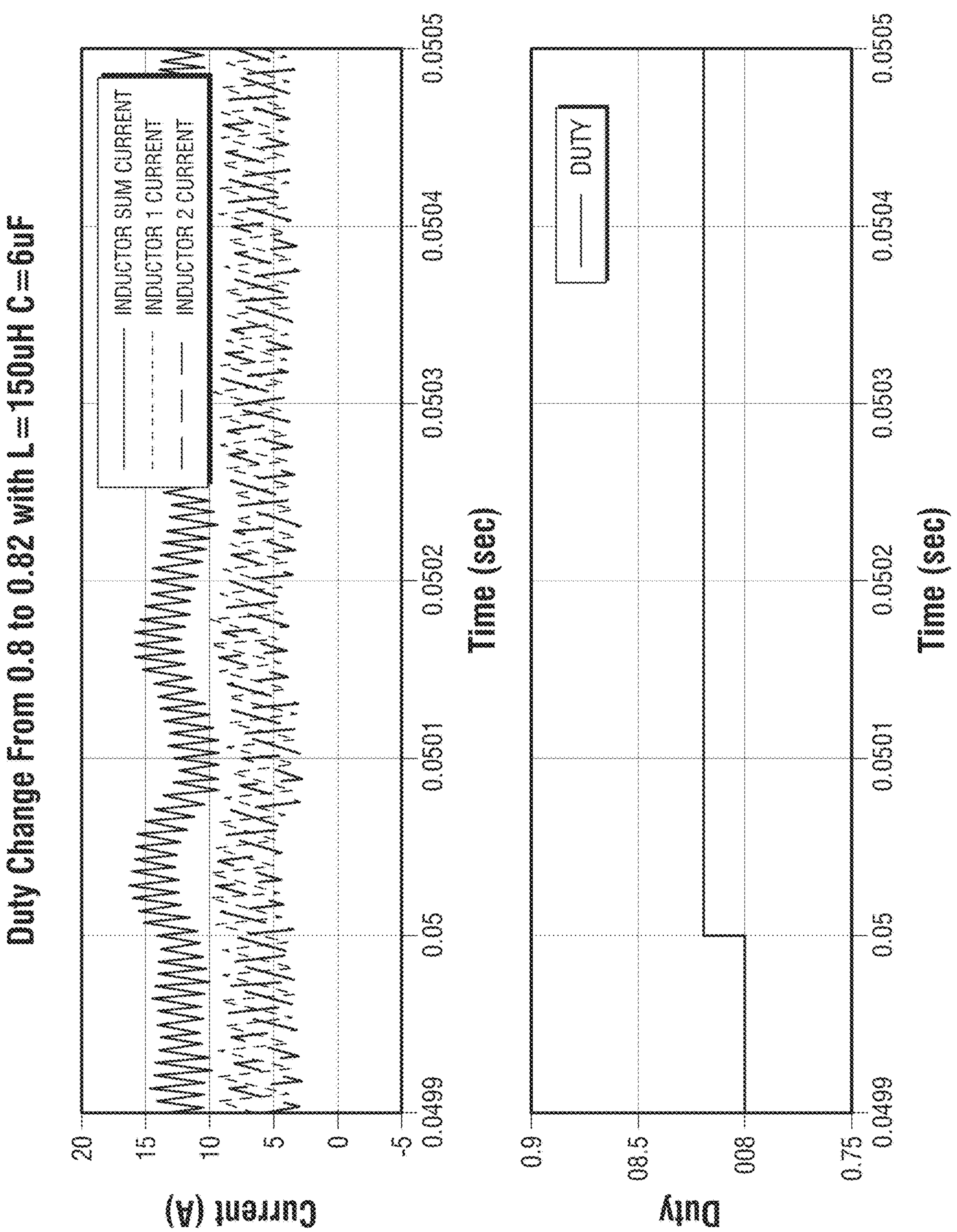
Figure 186B:
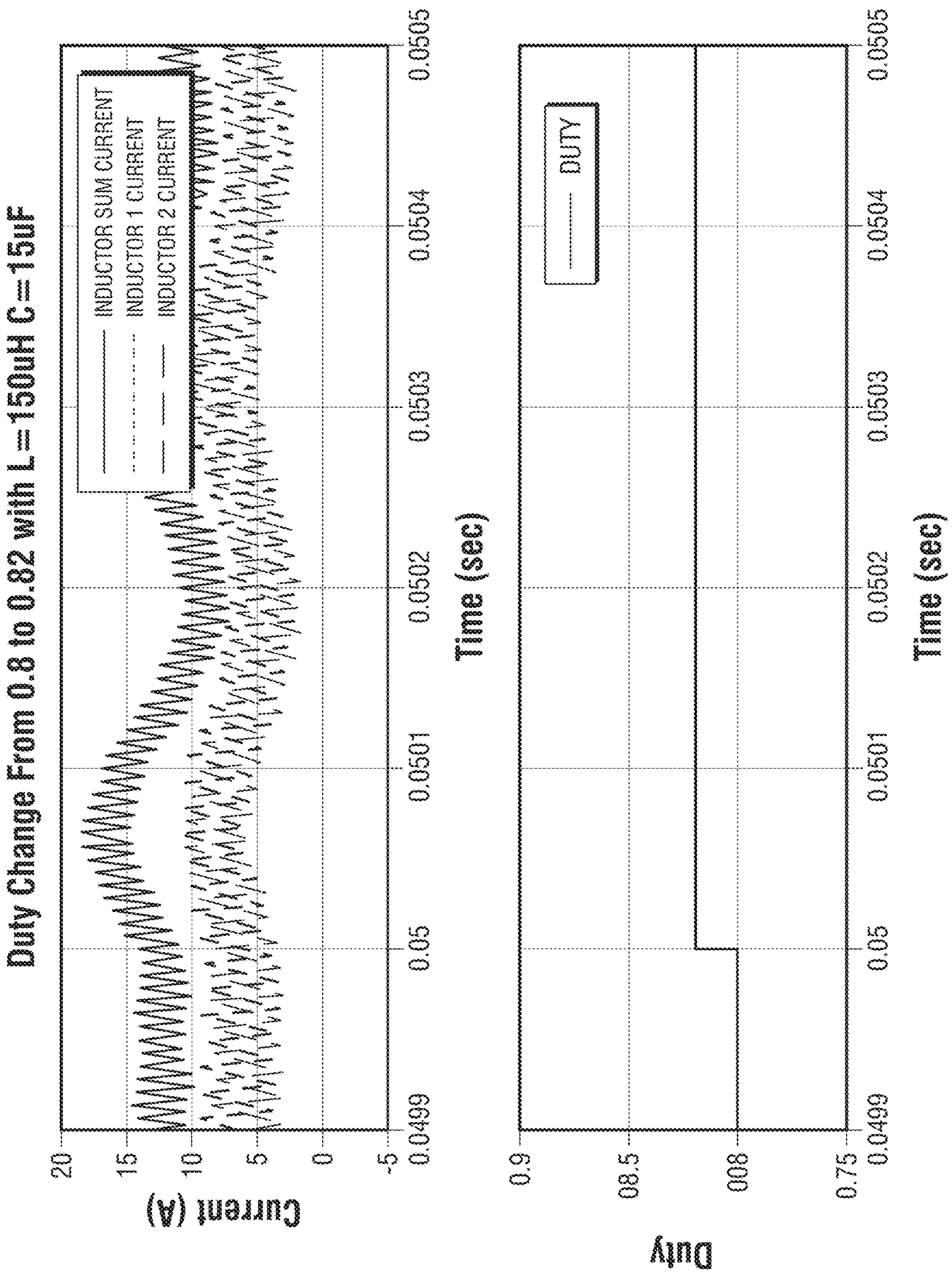

FIGS. 186A-B illustrate an uncontrolled previously known dynamic response.

Figure 187:
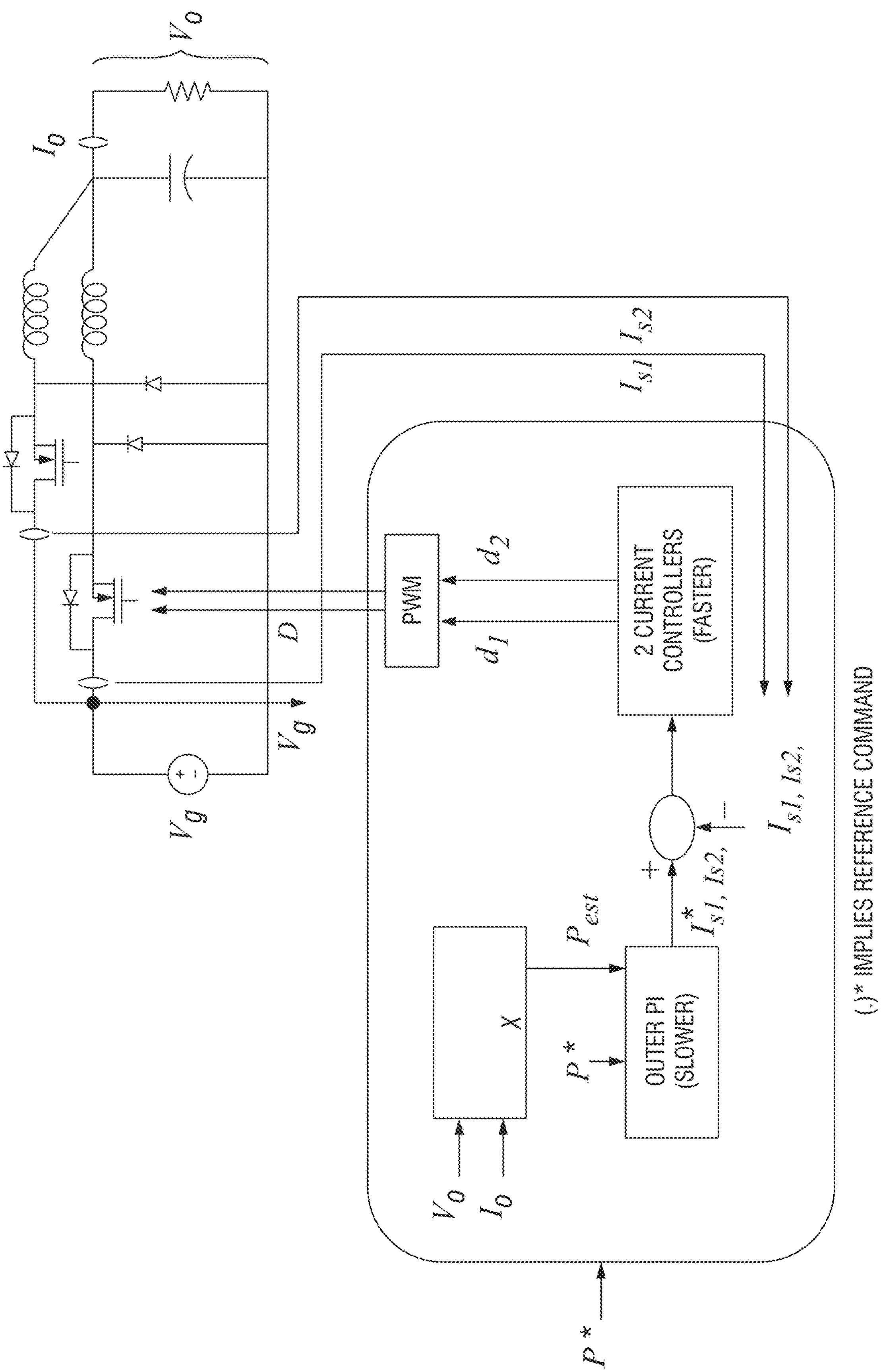

FIG. 187 illustrates an embodiment example control architecture that employs a two loop control.

Figure 188:
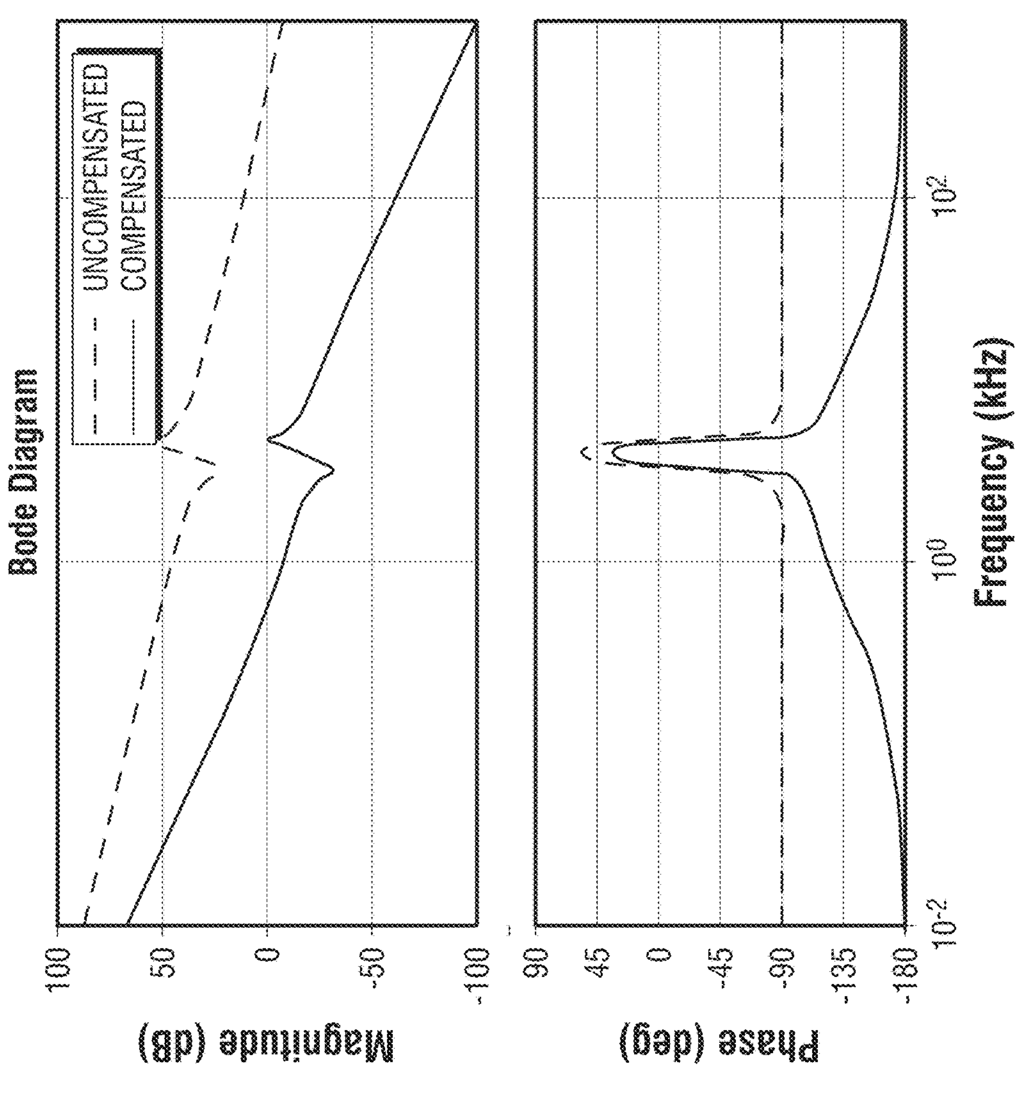

FIG. 188 depicts an embodiment Bode plot (frequency response) and transfer function with respect to an example control architecture based on modeling and simulation.

Figure 189A:
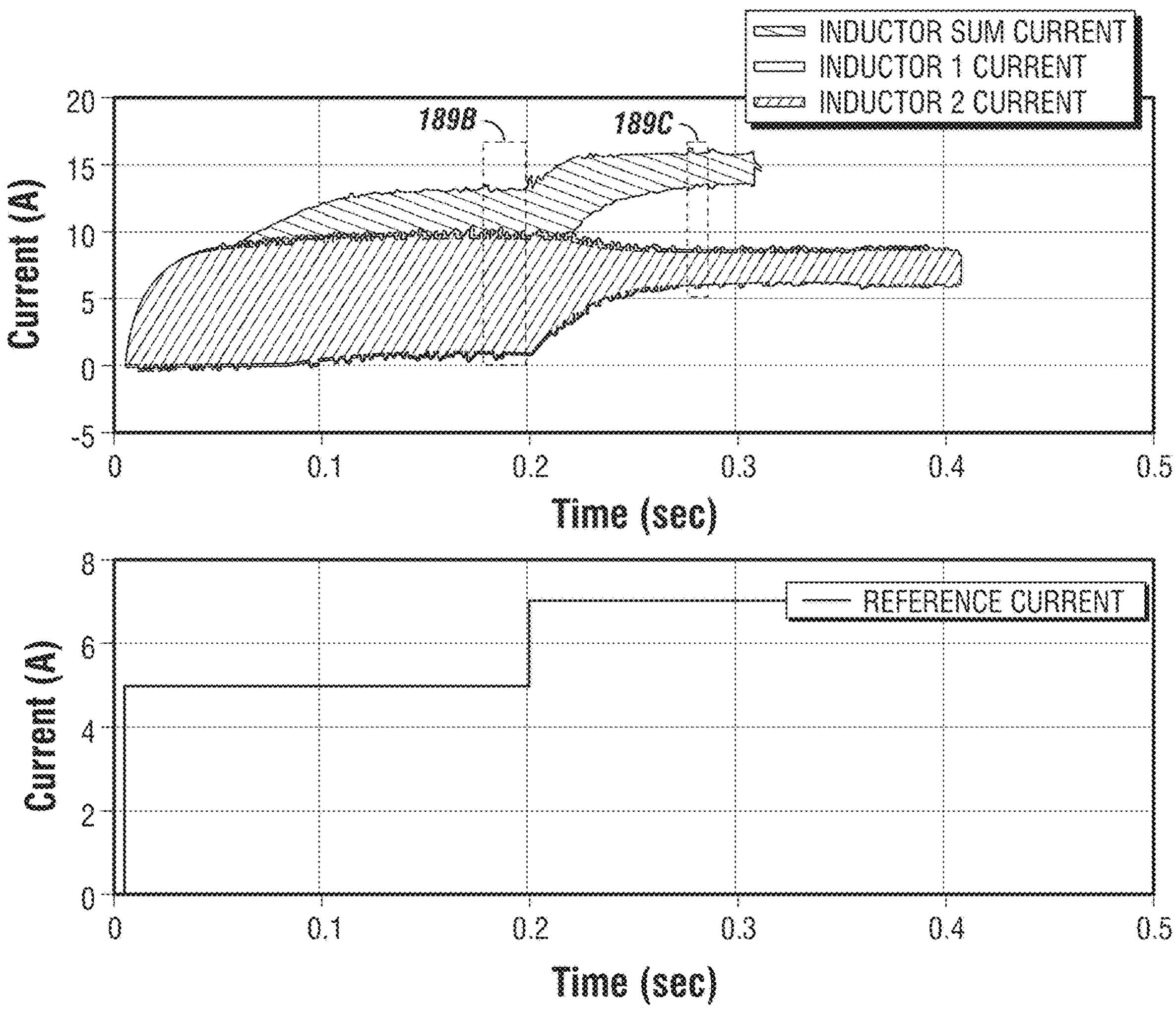
Figure 189B:
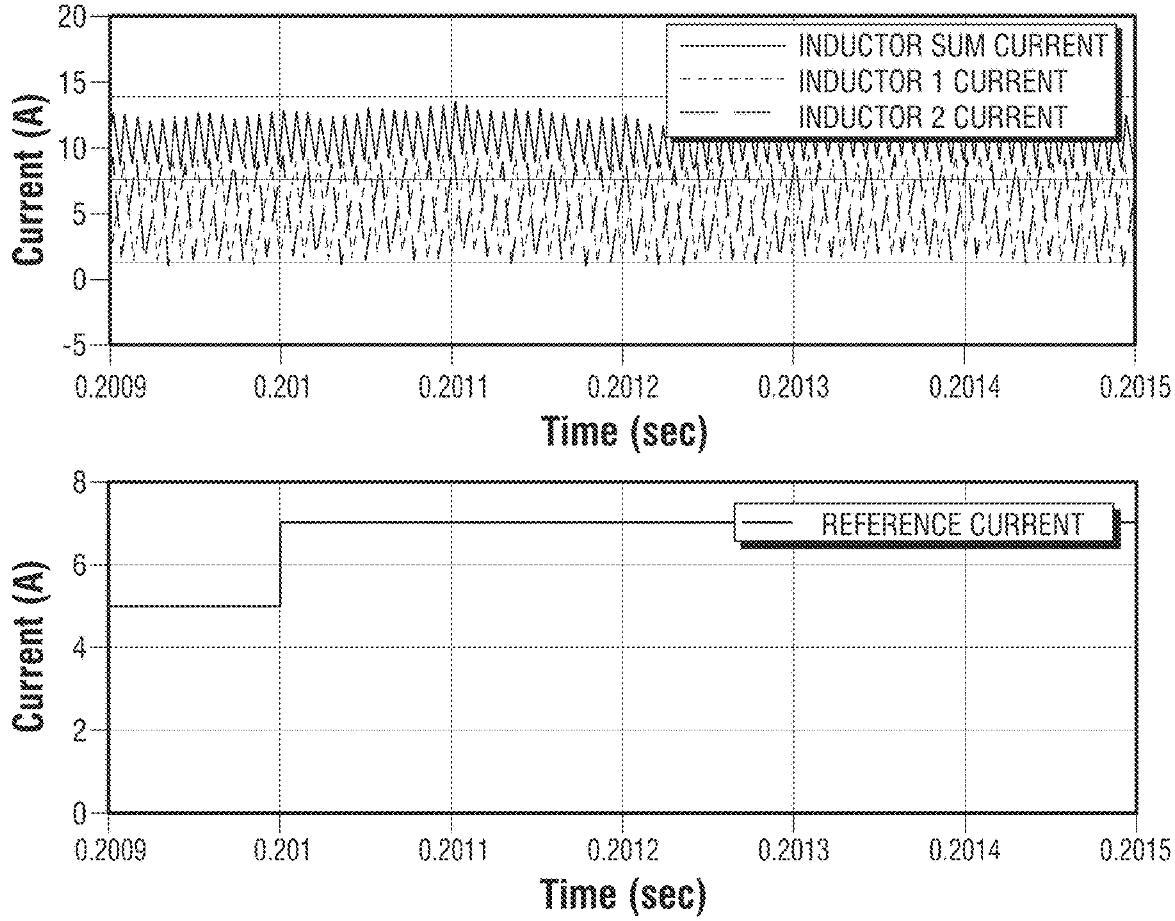
Figure 189C:
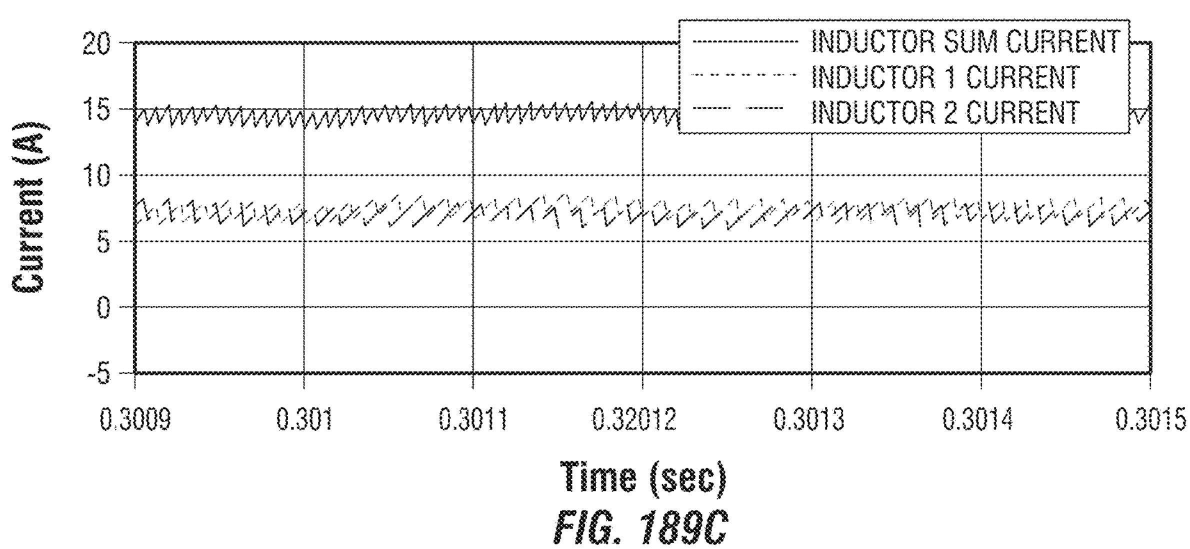
Figure 190A:
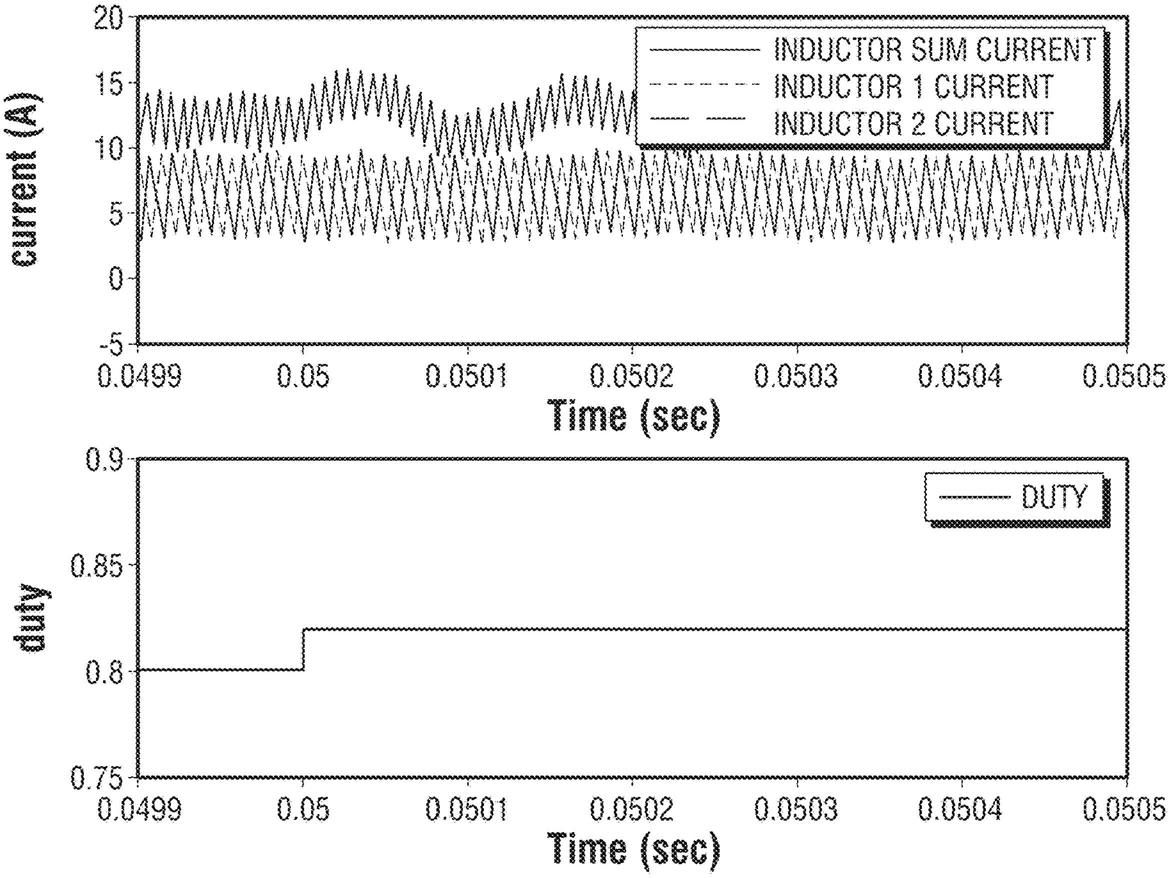
Figure 190B:
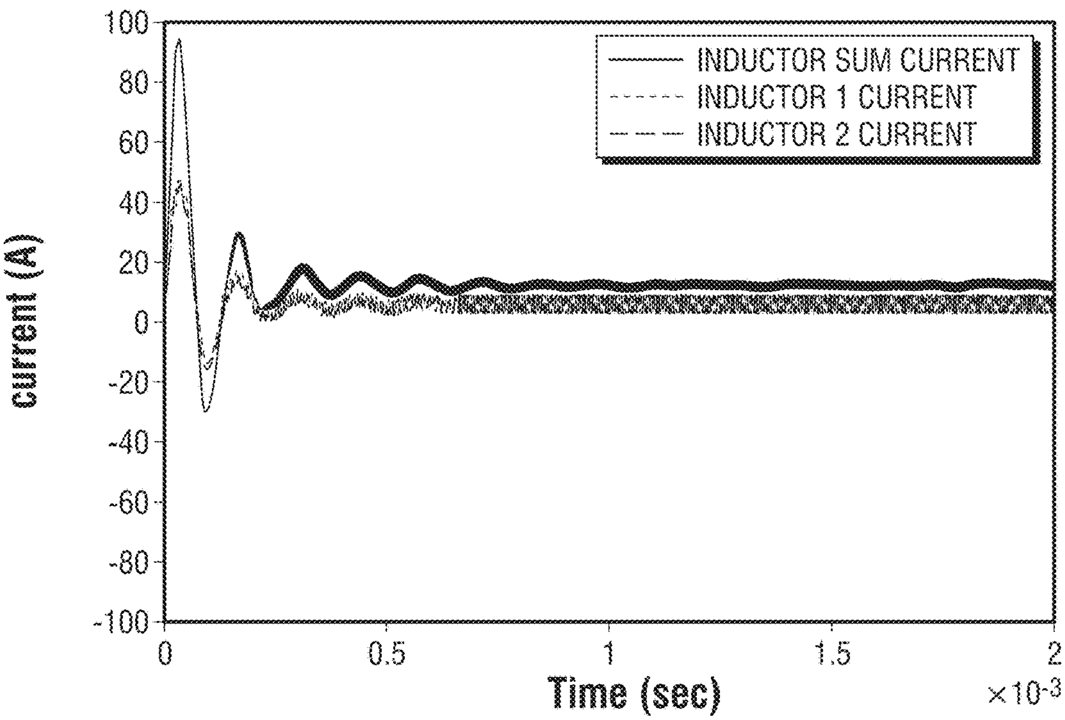
Figure 190C:
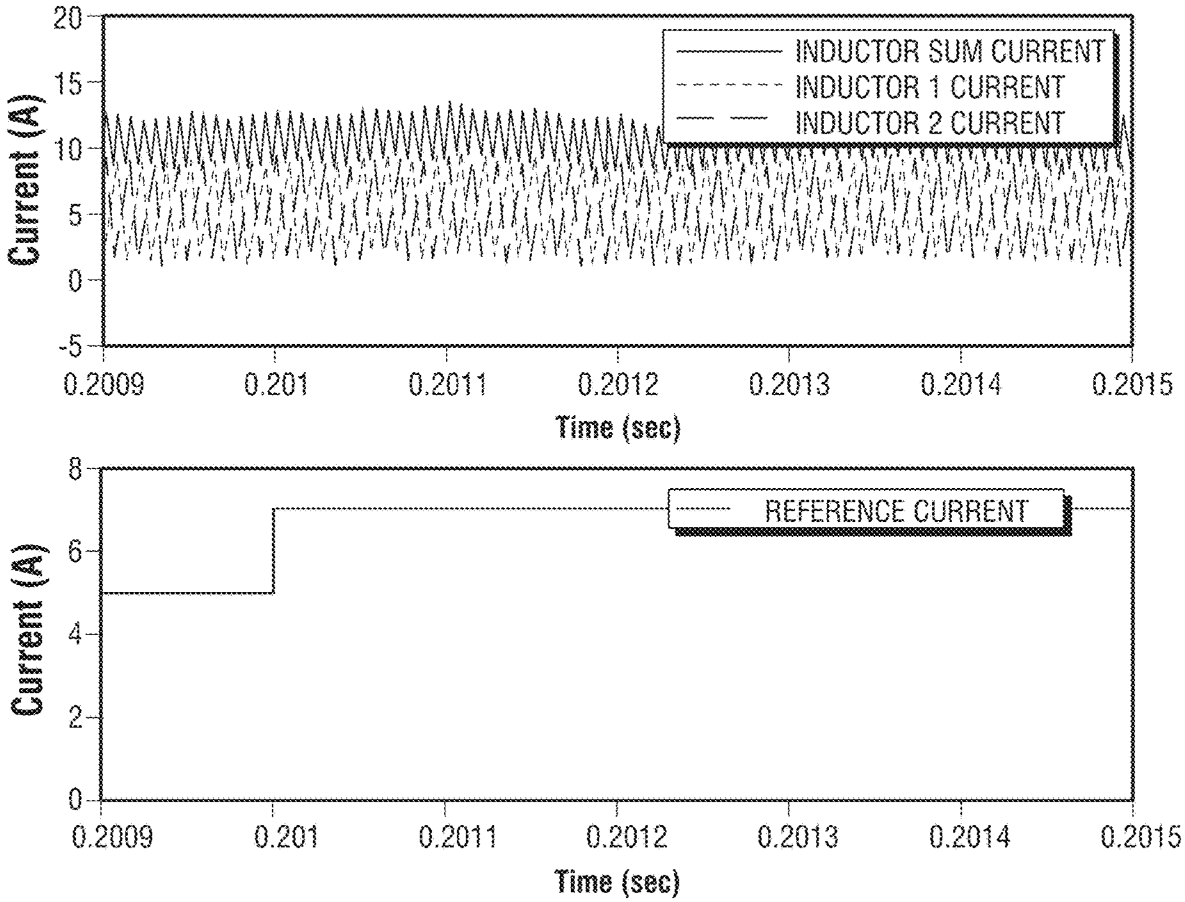
Figure 190D:
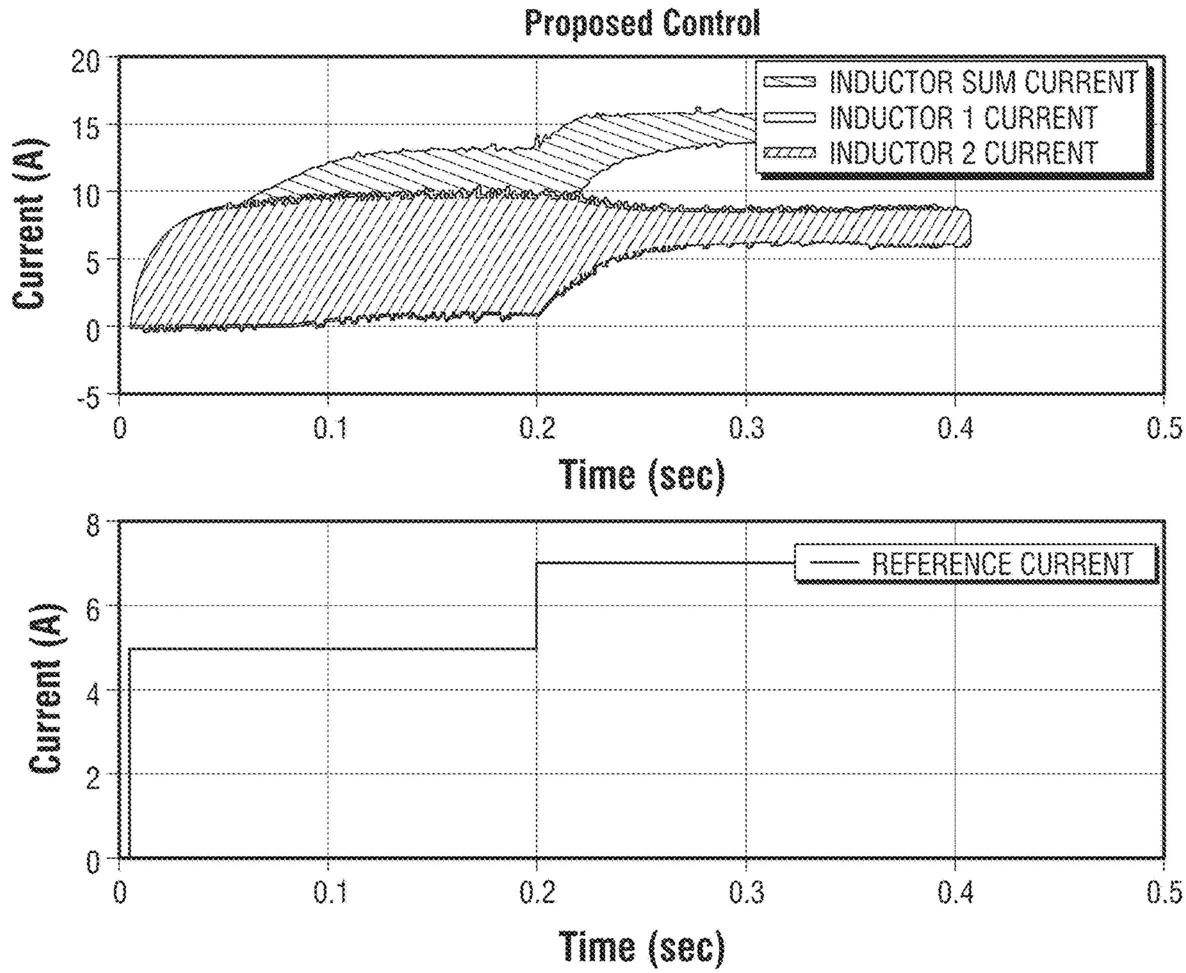
Figure 190E:
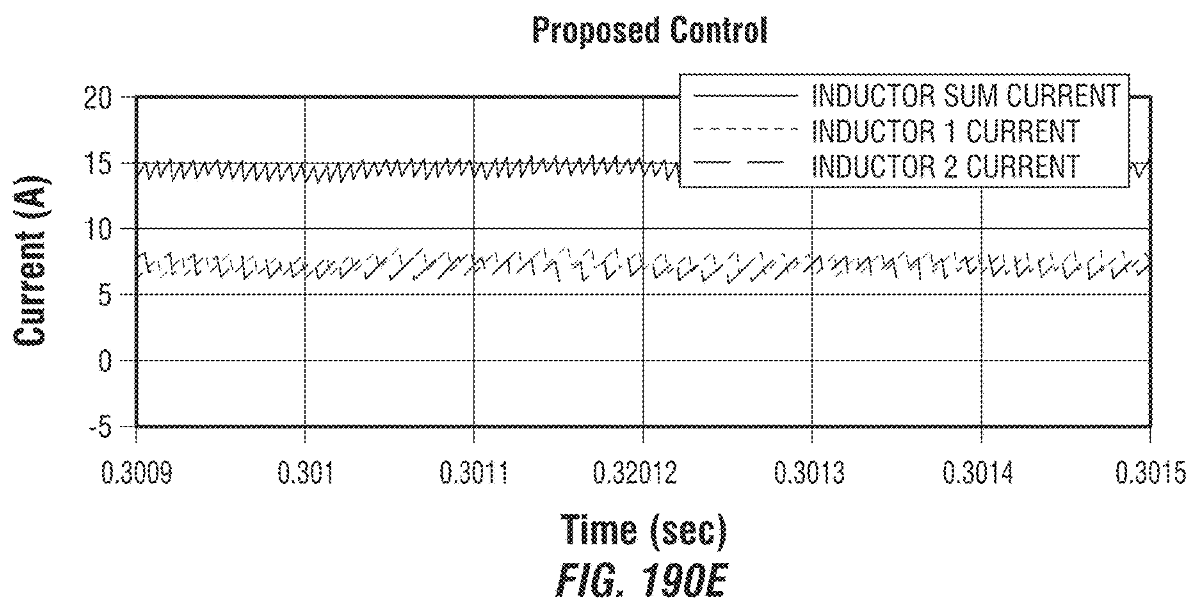

FIGS. 189A-C depict an embodiment current-time plot illustrating an example controller.

FIGS. 190A-E provides a comparison of a previously known time profile response and an embodiment time profile response of the present disclosure.

Figure 191A:
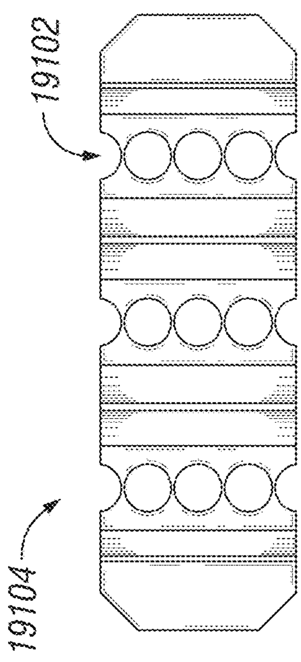
Figure 191B:
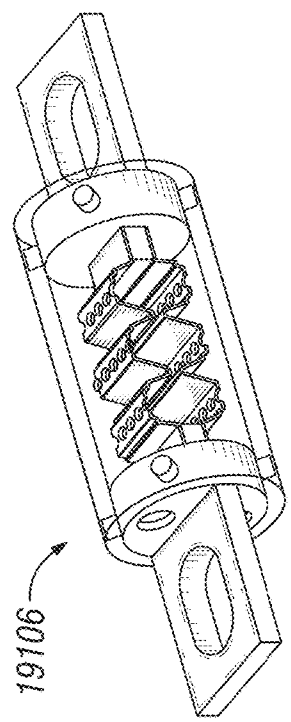

FIG. 191A-B depicts an embodiment current protection.

Figure 192:
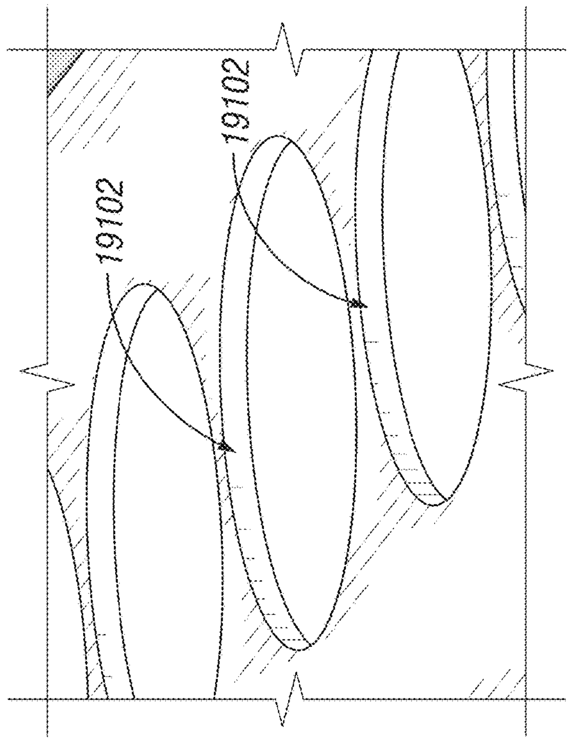

FIG. 192 depicts an embodiment a location of cyclic fatigue on current protection.

Figure 193:

FIG. 193 depicts an embodiment of arc induced fuse damage.

Figures 194A, 194B:
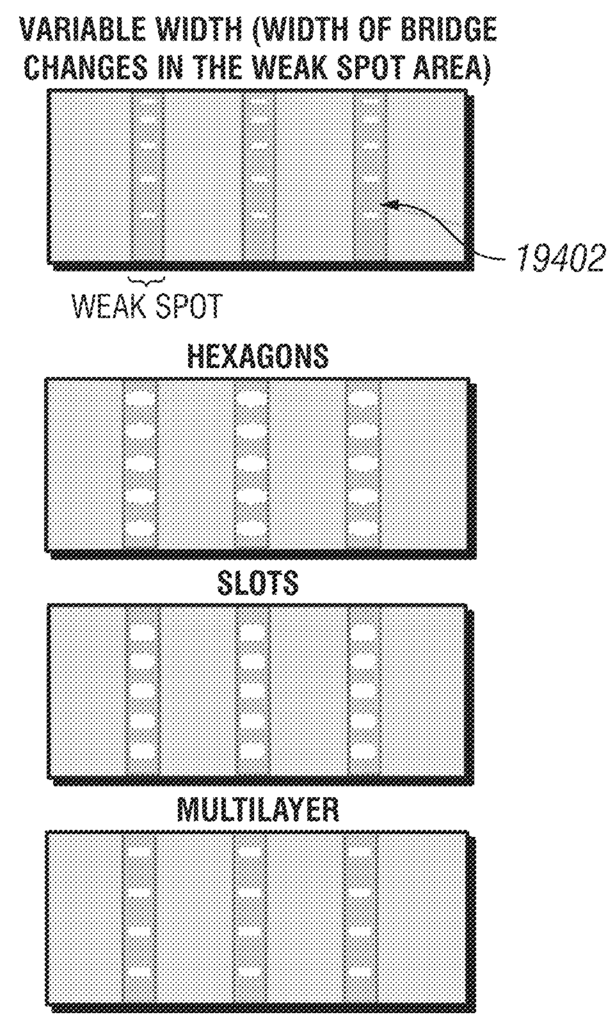

FIGS. 194A-B depict embodiment of printed fuse resistance calculations.

Figure 195A:
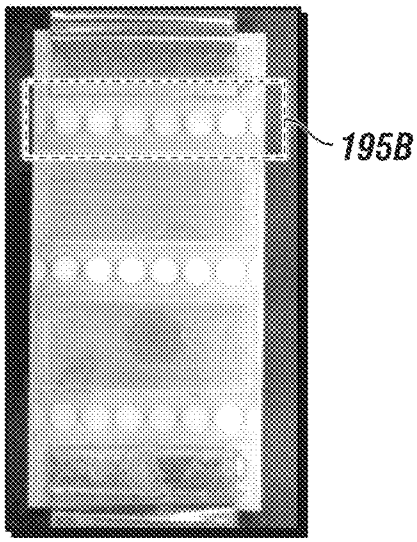
Figure 195B:
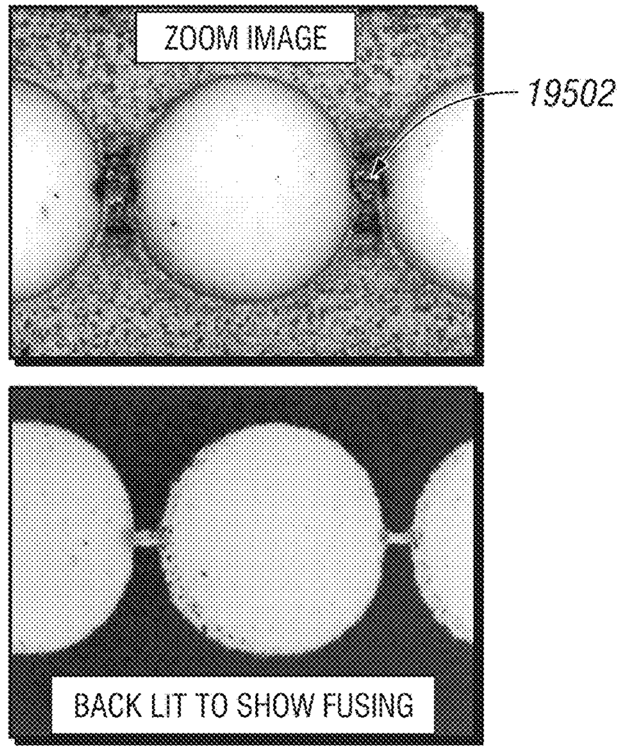

FIGS. 195A-B depict an embodiment printed fuse test result.

Figure 196:
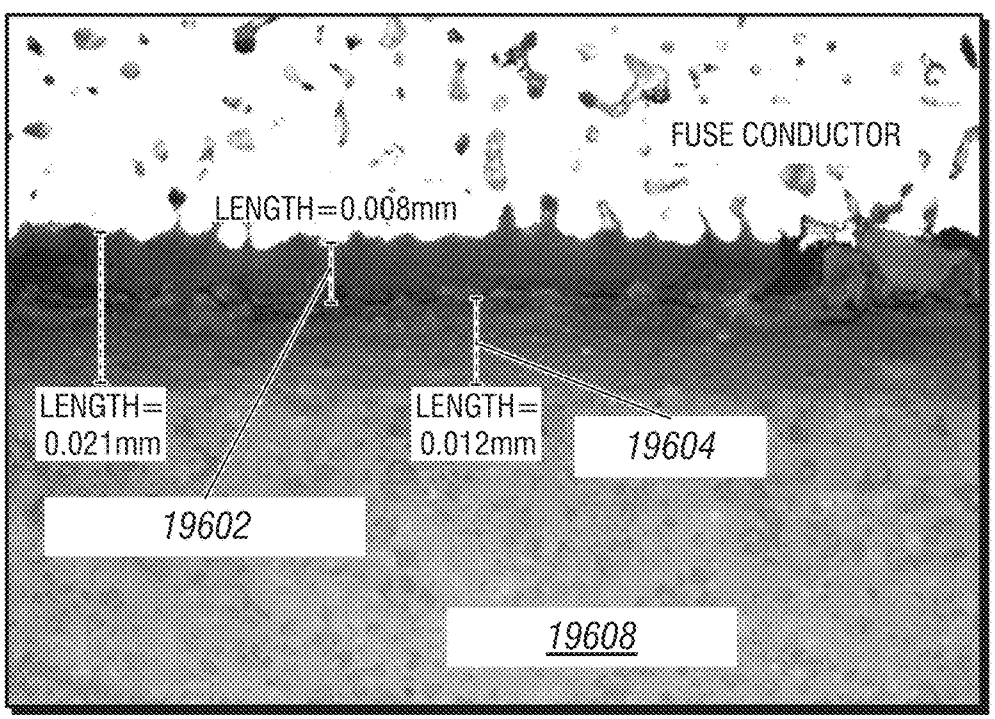

FIG. 196 depicts an embodiment of a cross section of a printed weak spot.

Figure 197:
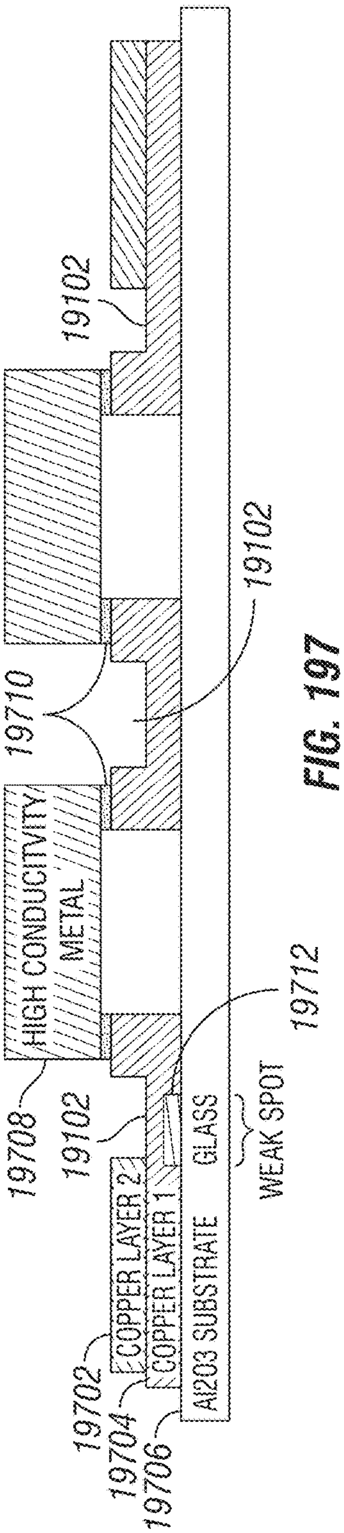

FIG. 197 depicts an embodiment of a printed fuse with soldered metal for high current.

Figure 198:
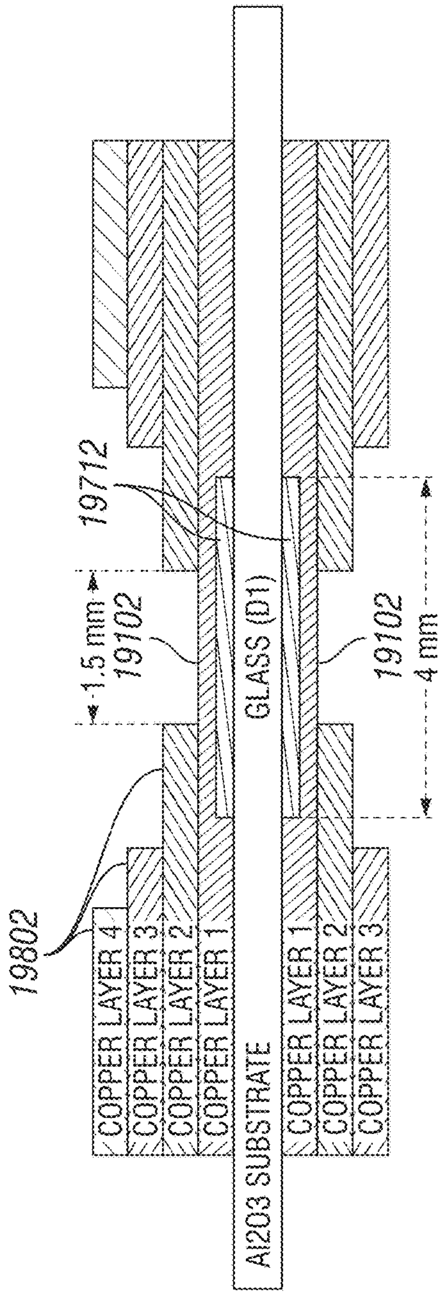

FIG. 198 depicts an embodiment of a fuse printed on two sides of a base substrate.

Figure 199:
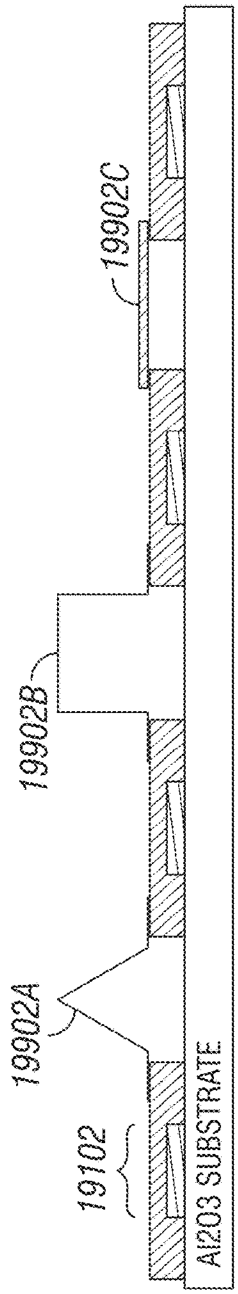

FIG. 199 depicts an embodiment printed fuse hybrid concept with discrete foil jumpers for high current.

Figure 200:
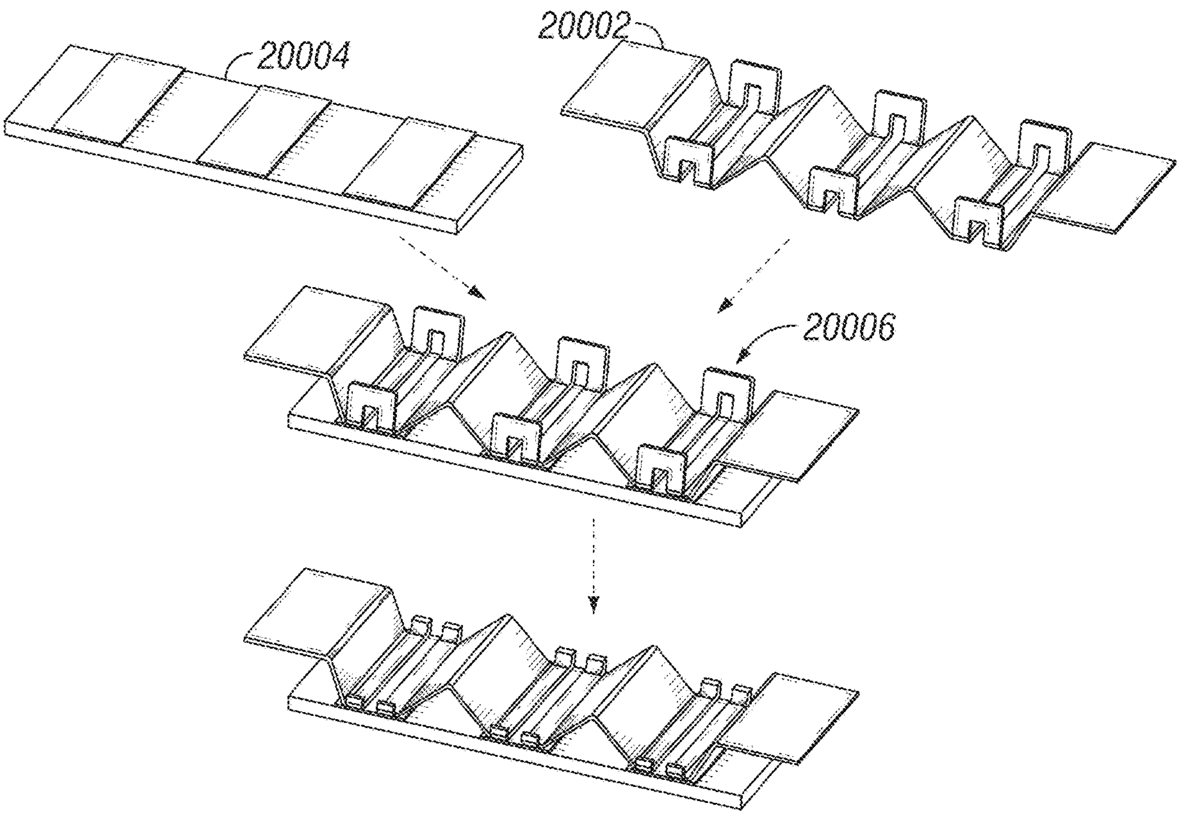

FIG. 200 depicts an embodiment of a printed fuse hybrid concept with single foil jumper for high current.

Figure 201:
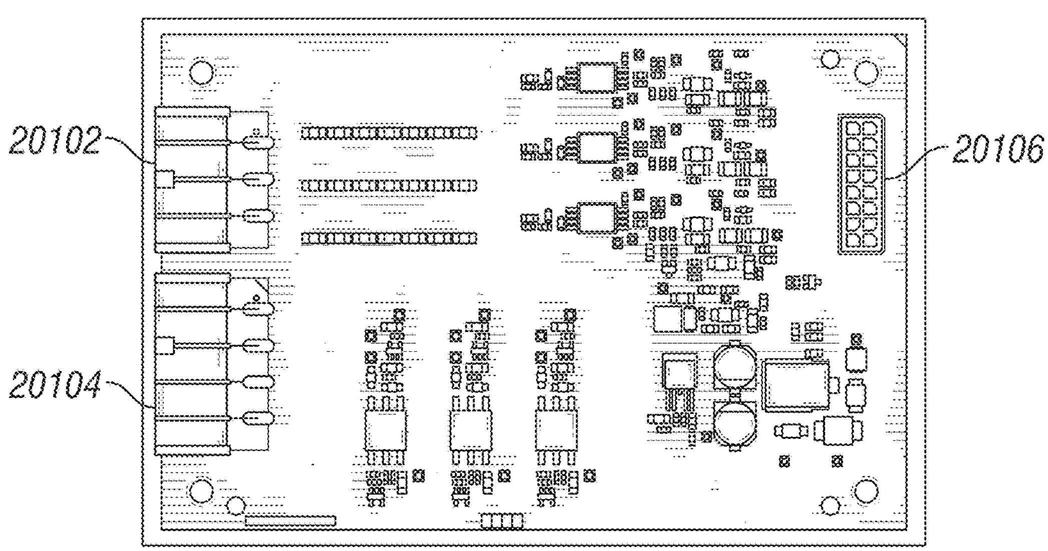

FIG. 201 depicts an embodiment hardware depiction of an isolated high voltage sensor for an electric mobile application.

Figure 202:
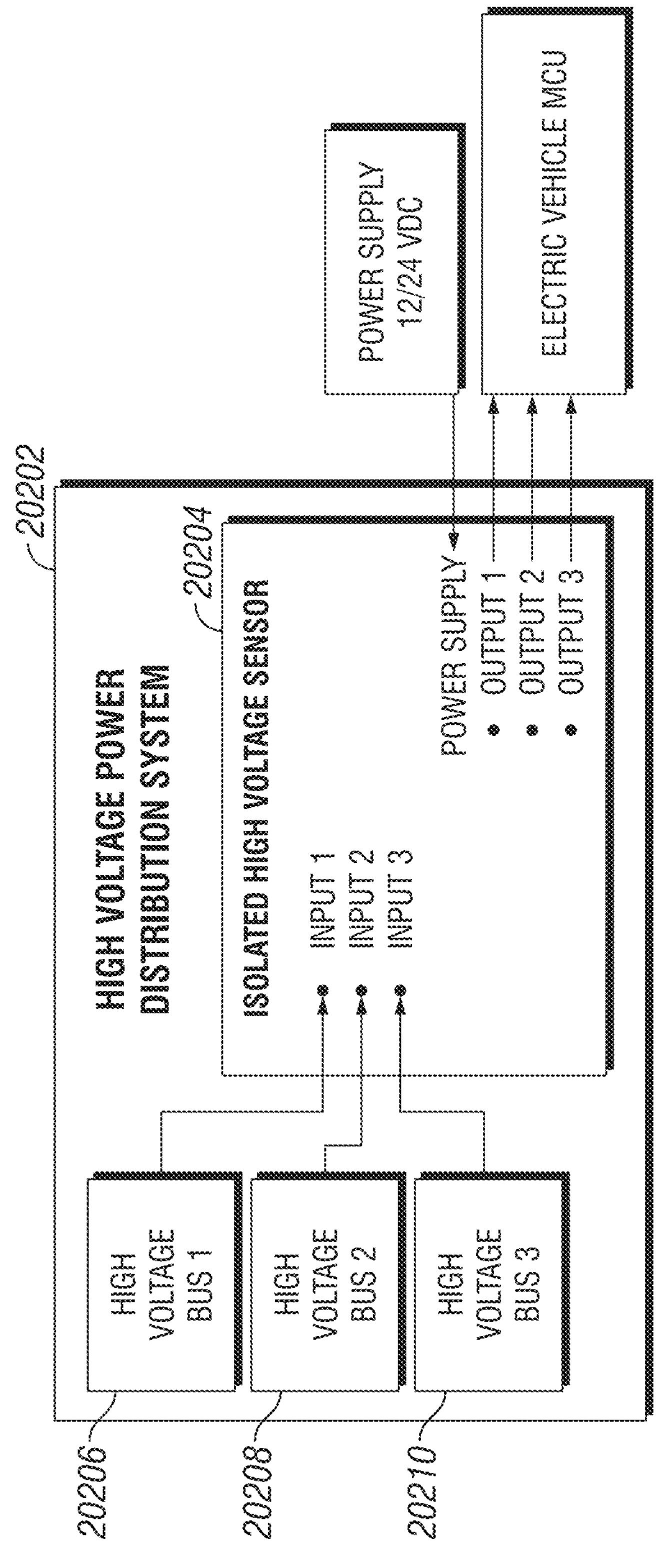

FIG. 202 depicts an embodiment block diagram of an isolated high voltage sensor for an electric mobile application.

Figure 203:
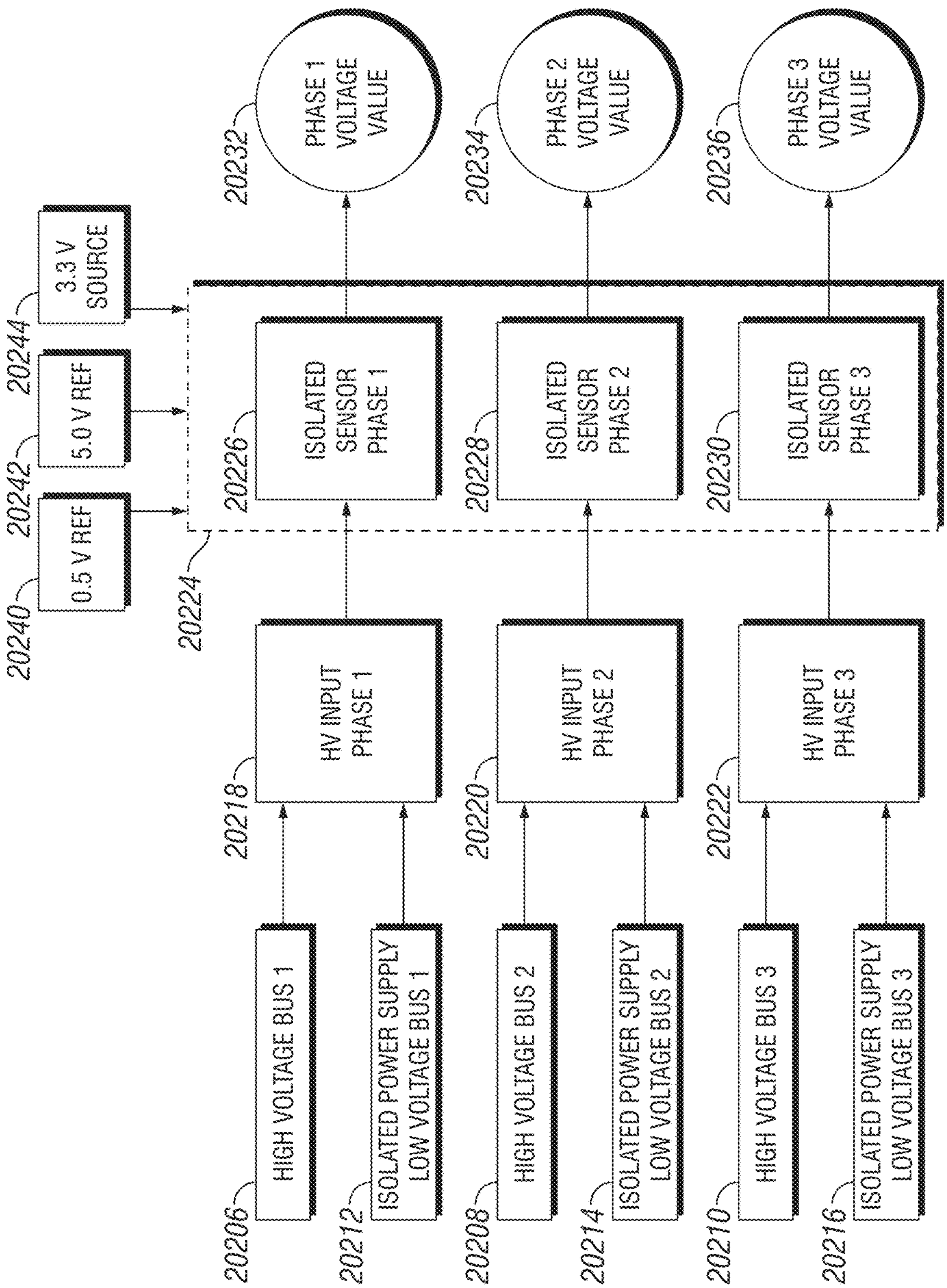

FIG. 203 depicts an embodiment block diagram detail of an isolated high voltage sensor for an electric mobile application.

Figure 204:
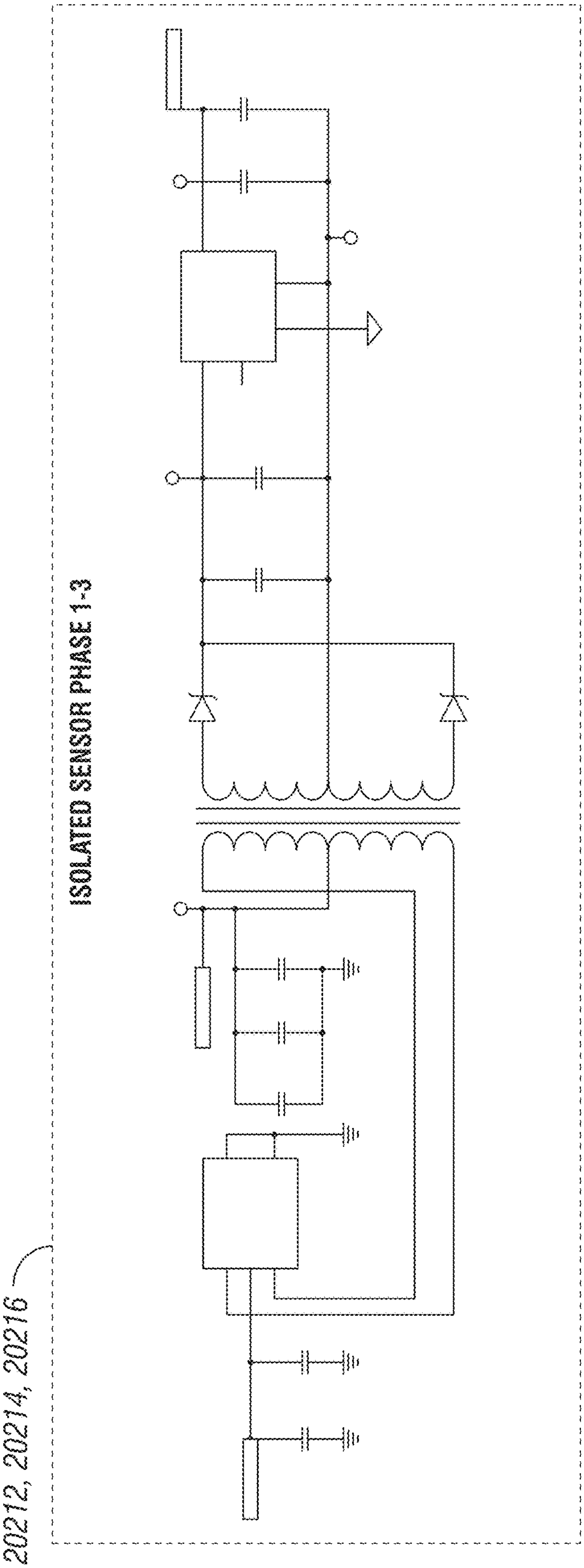

FIG. 204 depicts an embodiment schematic for an isolated power supply in an isolated high voltage sensor for an electric mobile application.

Figure 205:
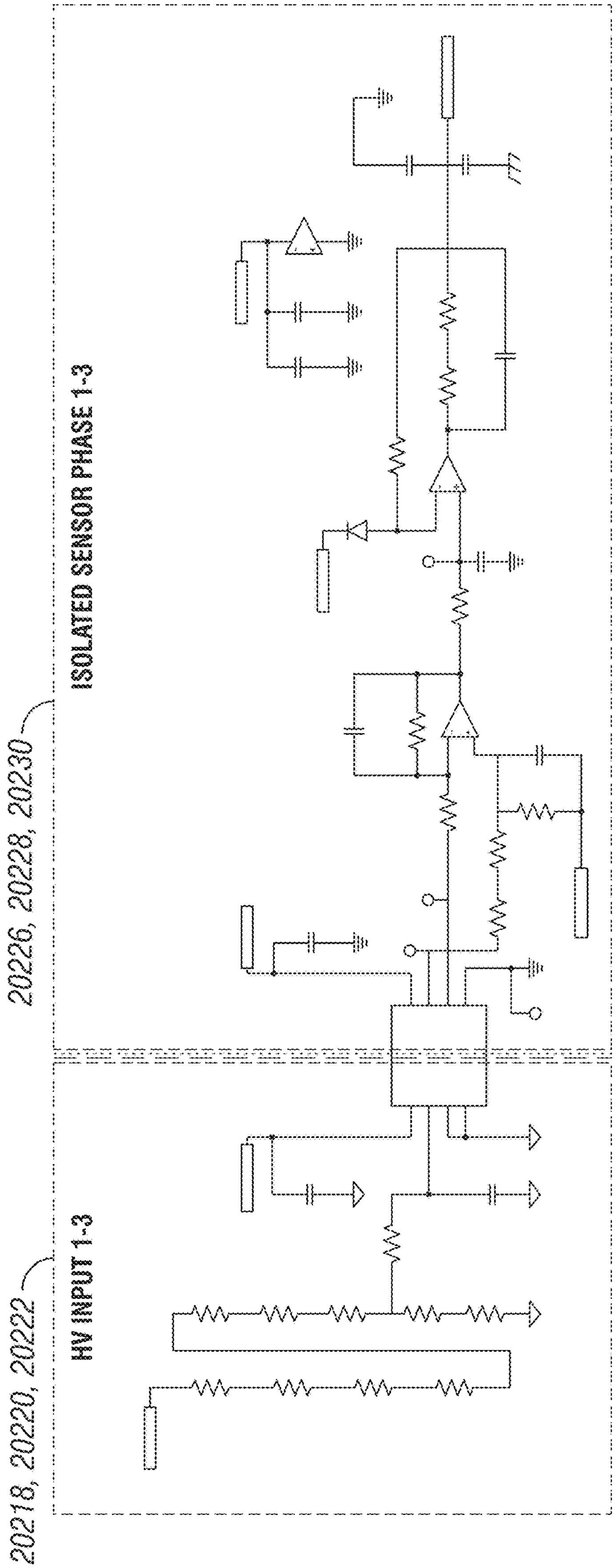

FIG. 205 depicts an embodiment schematic for a high voltage input and sensor phase in an isolated high voltage sensor for an electric mobile application.

Figure 206:
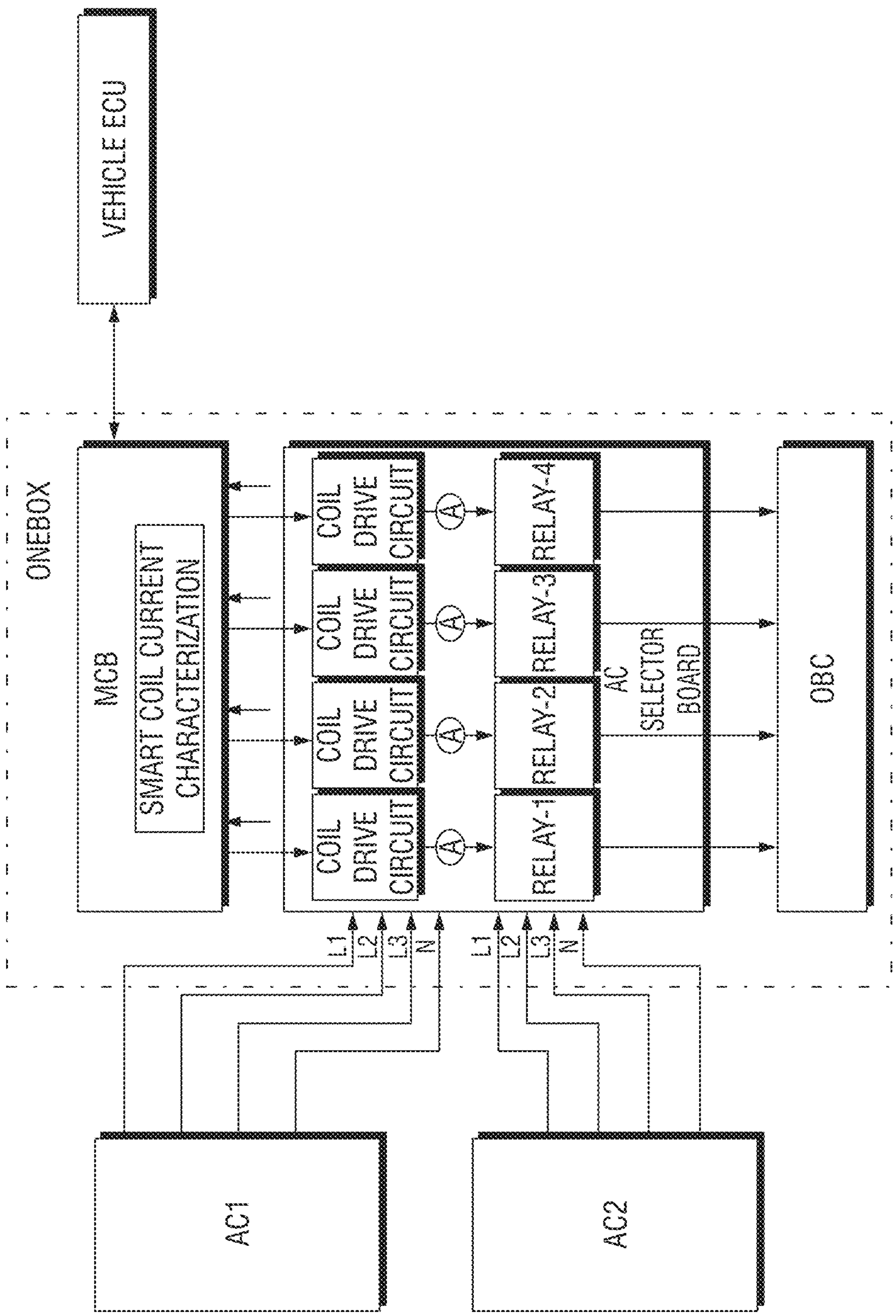

FIG. 206 depicts an embodiment architecture block diagram for an AC selector switch matrix relay.

Figure 207:
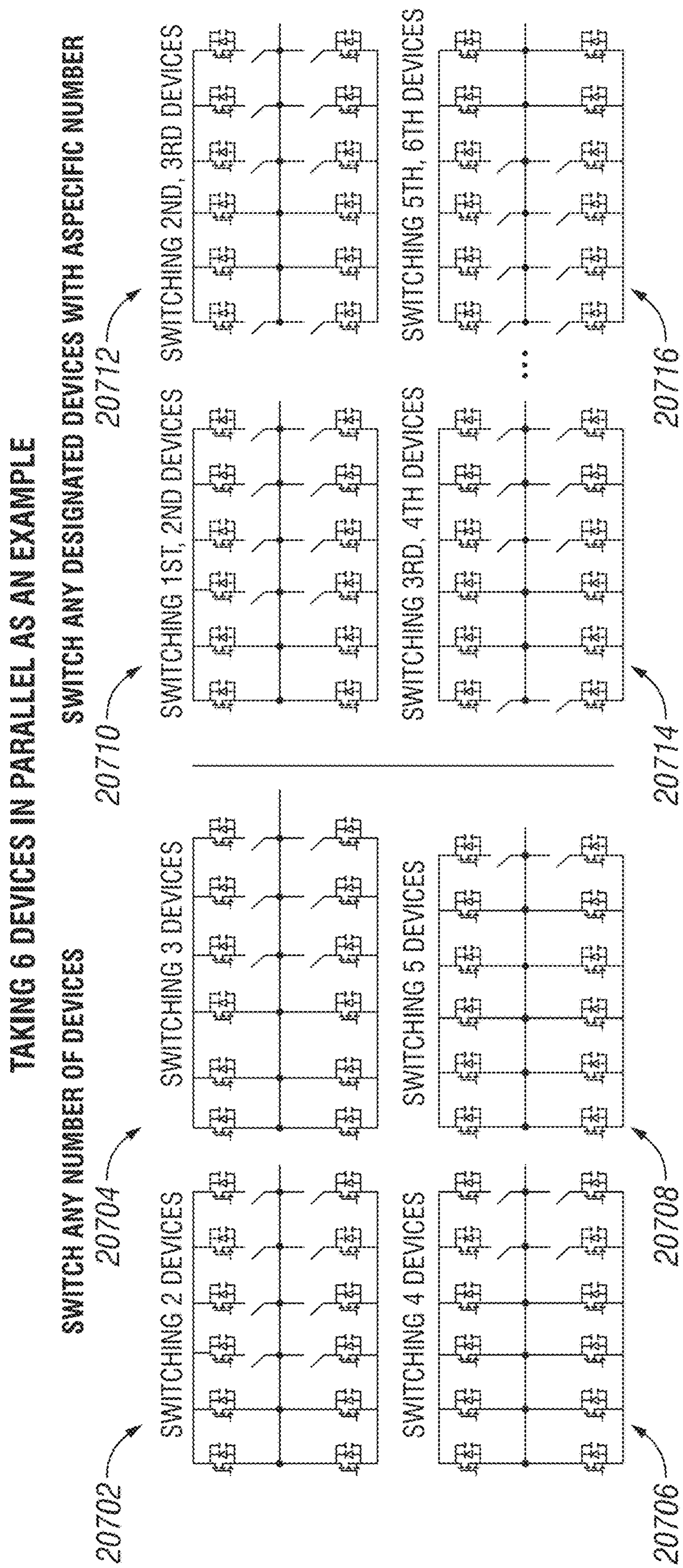

FIG. 207 depicts embodiment configurations for parallel device switching.

Figure 208:
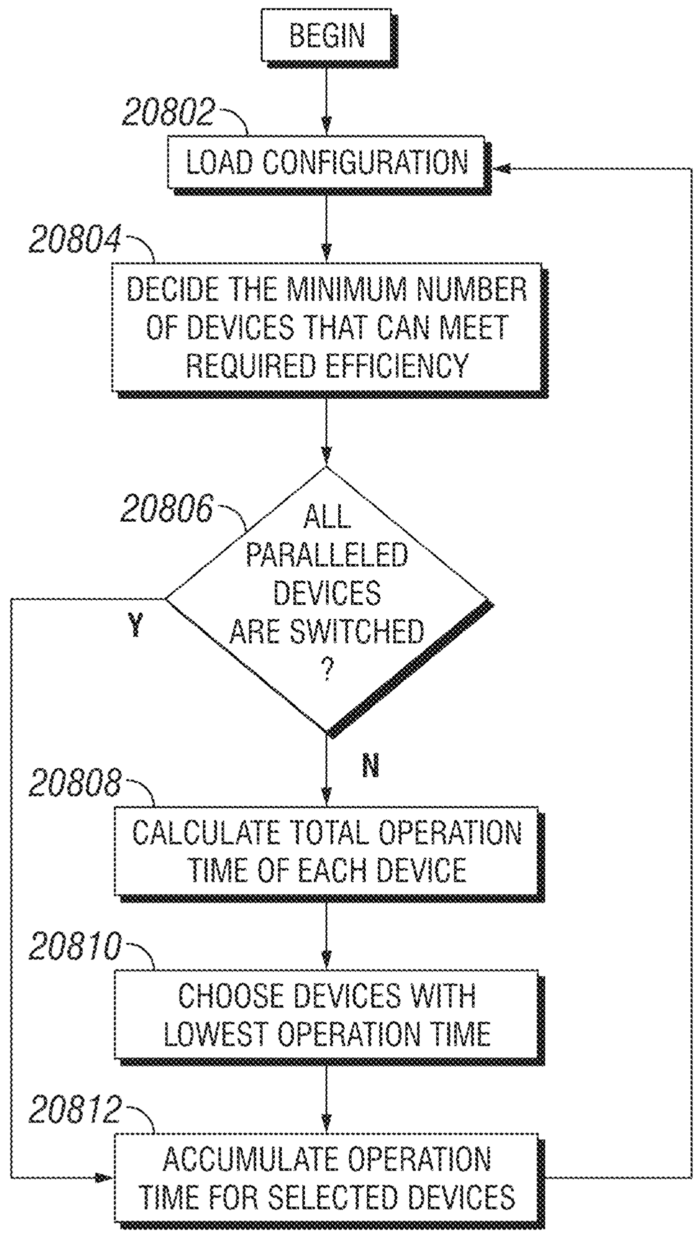

FIG. 208 presents an embodiment flow process diagram for adaptive switch control.

Figures 209, 210:
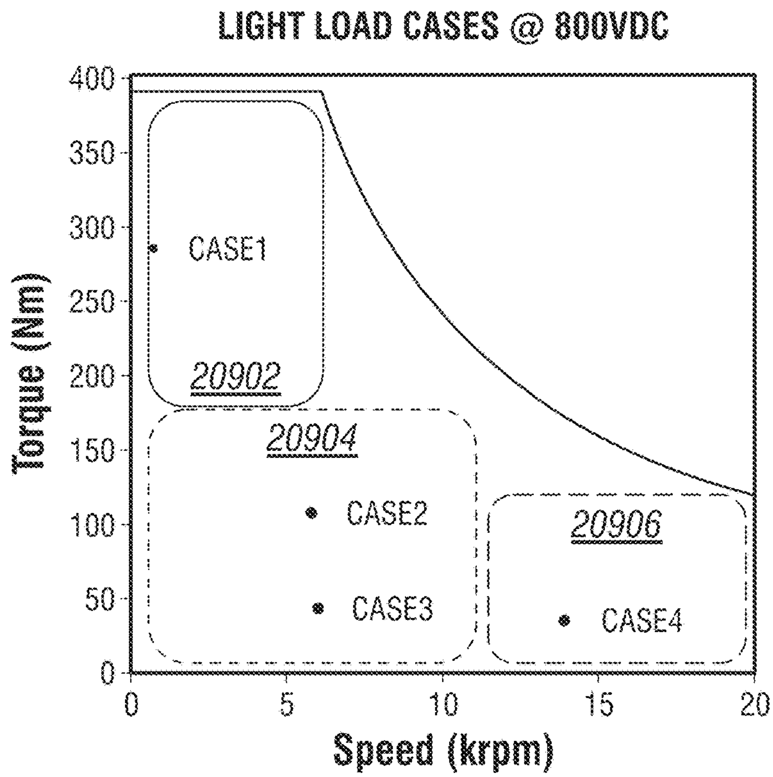

FIG. 209 depicts embodiment switching zones used in adaptive switch control.

FIG. 210 depicts embodiment efficiency in adaptive switch control.

Figure 211:
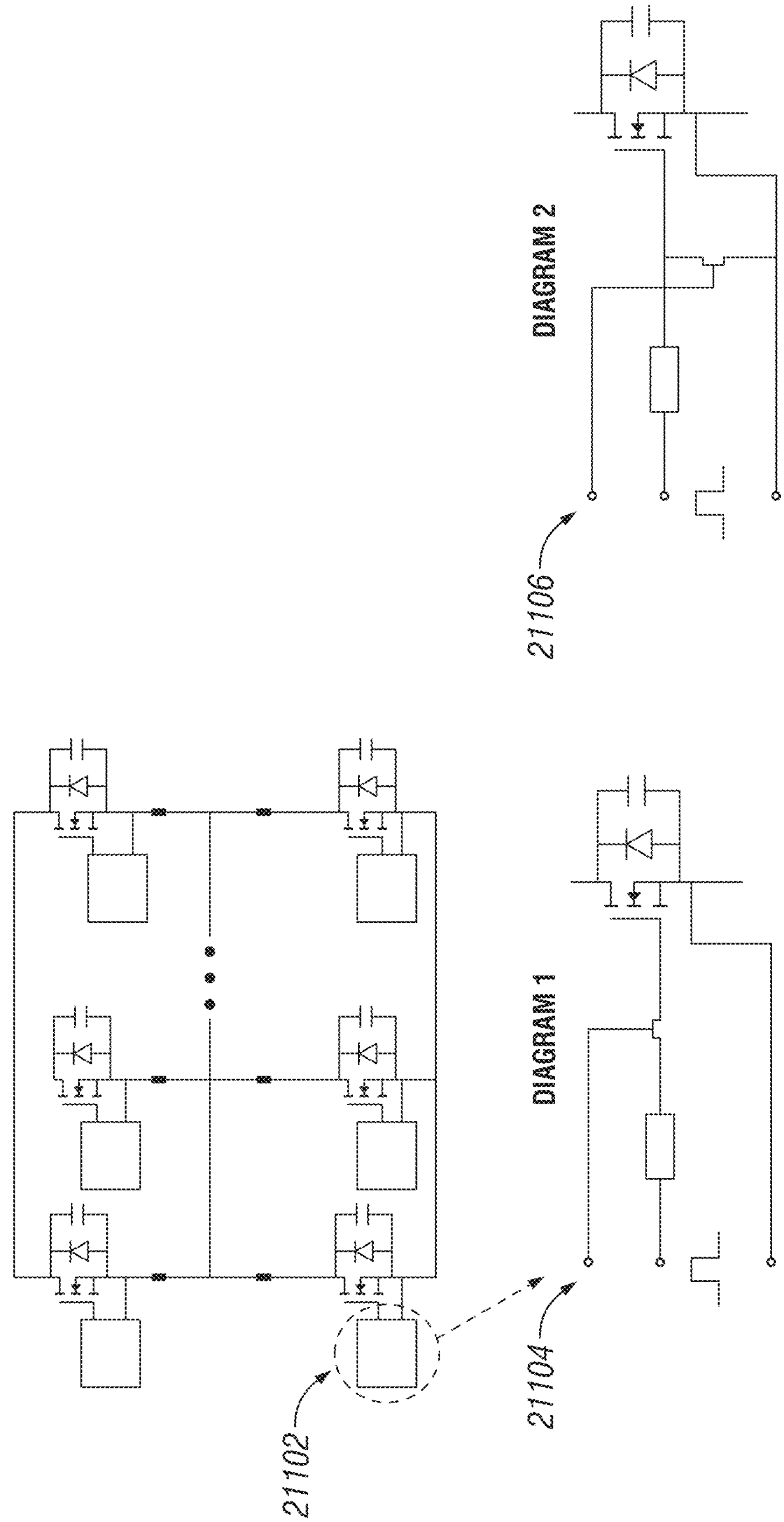

FIG. 211 depicts an embodiment switching circuit with example gate driver configurations.

Figure 212:
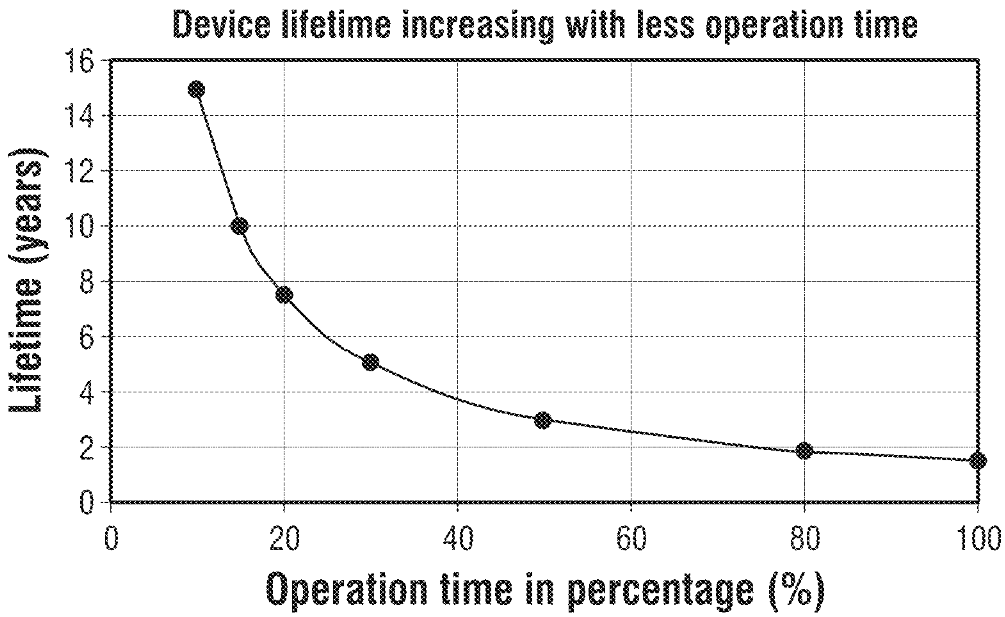

FIG. 212 illustrates an embodiment lifetime plot with respect to reduced operation time.

Figure 213:
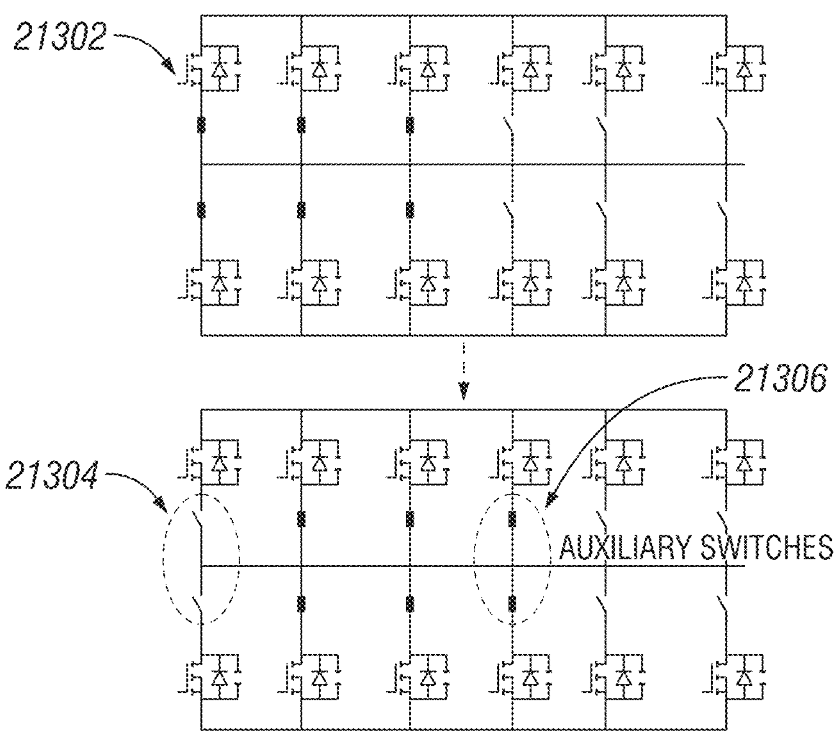

FIG. 213 depicts an embodiment switching scheme for failed switching devices.

Figure 214:
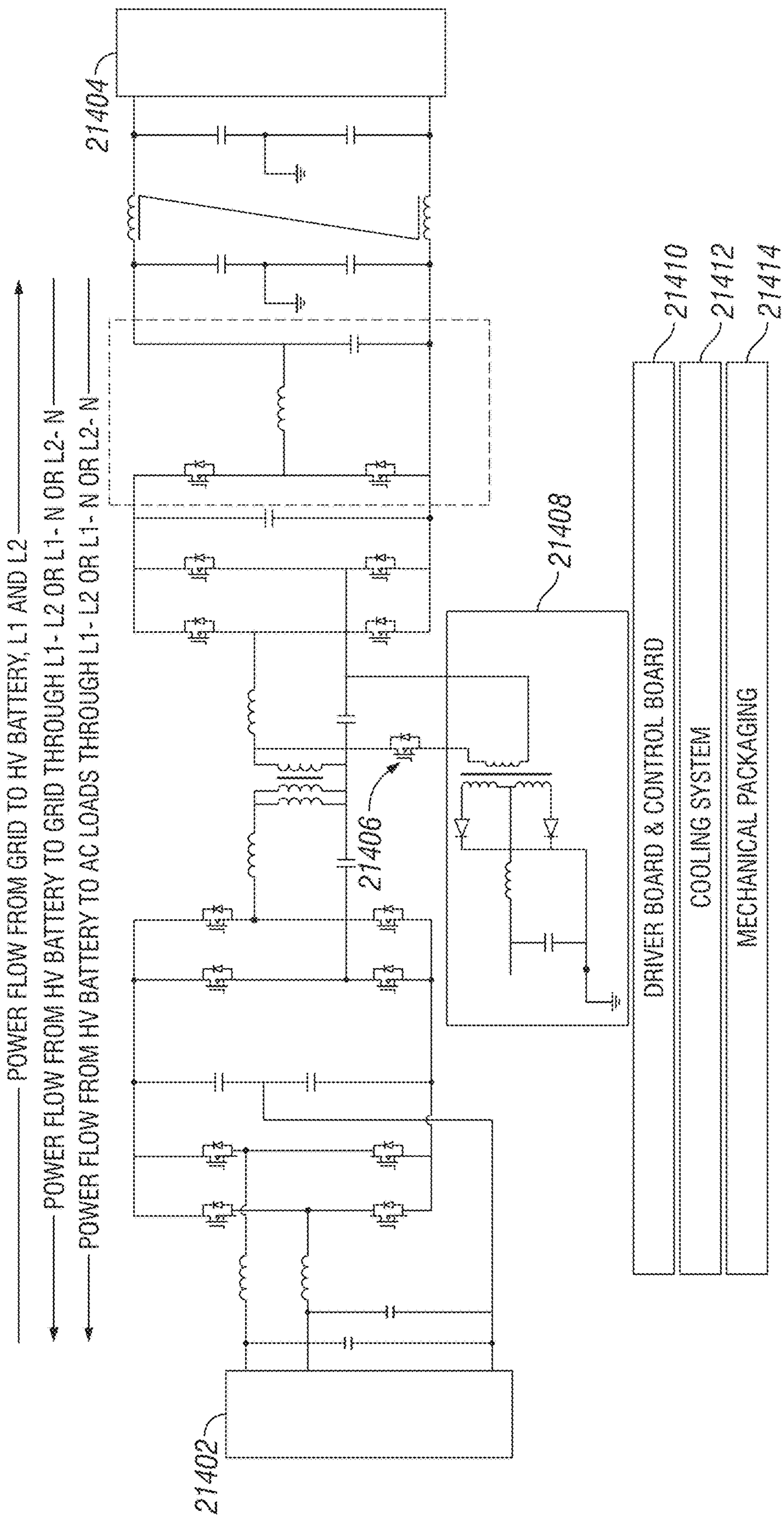

FIG. 214 depicts an embodiment topology for a charger and DC-to-DC combined module.

Figure 215:
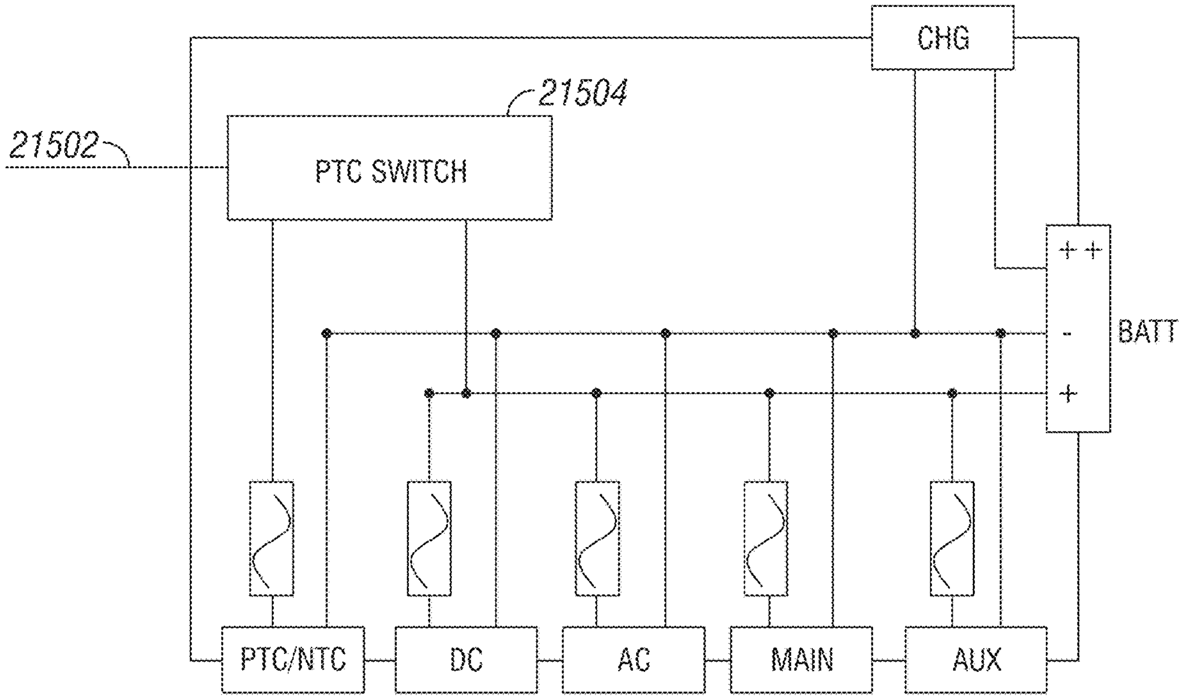

FIG. 215 depicts an example previously known power distribution unit for an electric mobile application.

Figure 216:
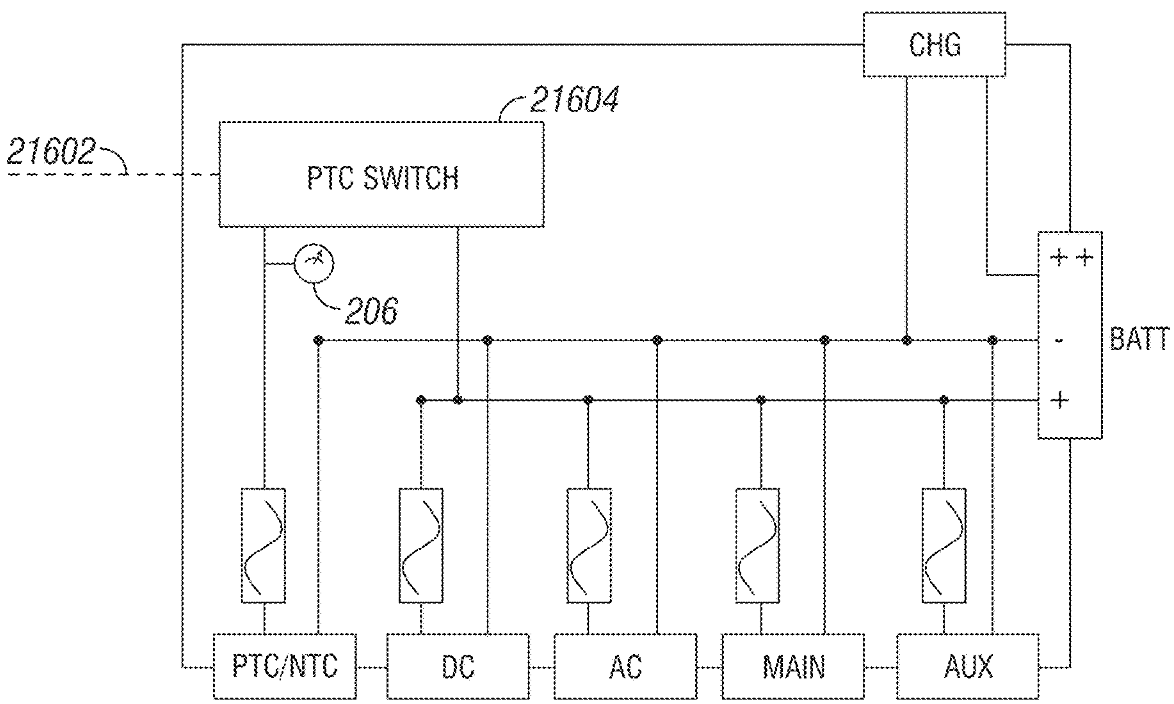

FIG. 216 depicts an embodiment example power distribution unit having a positive temperature coefficient controller and climate control communications.

Figure 217:
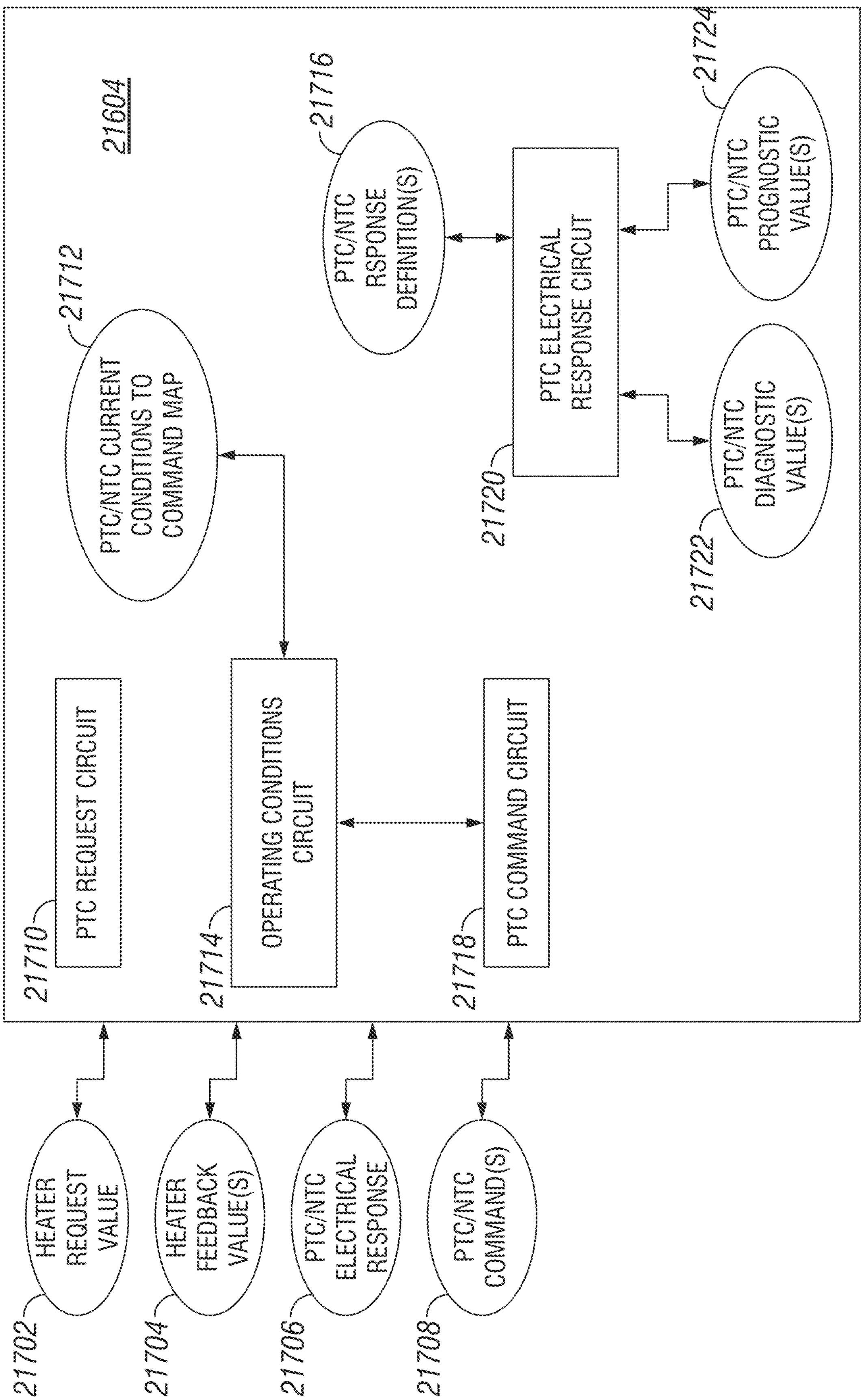
Figure 218A:
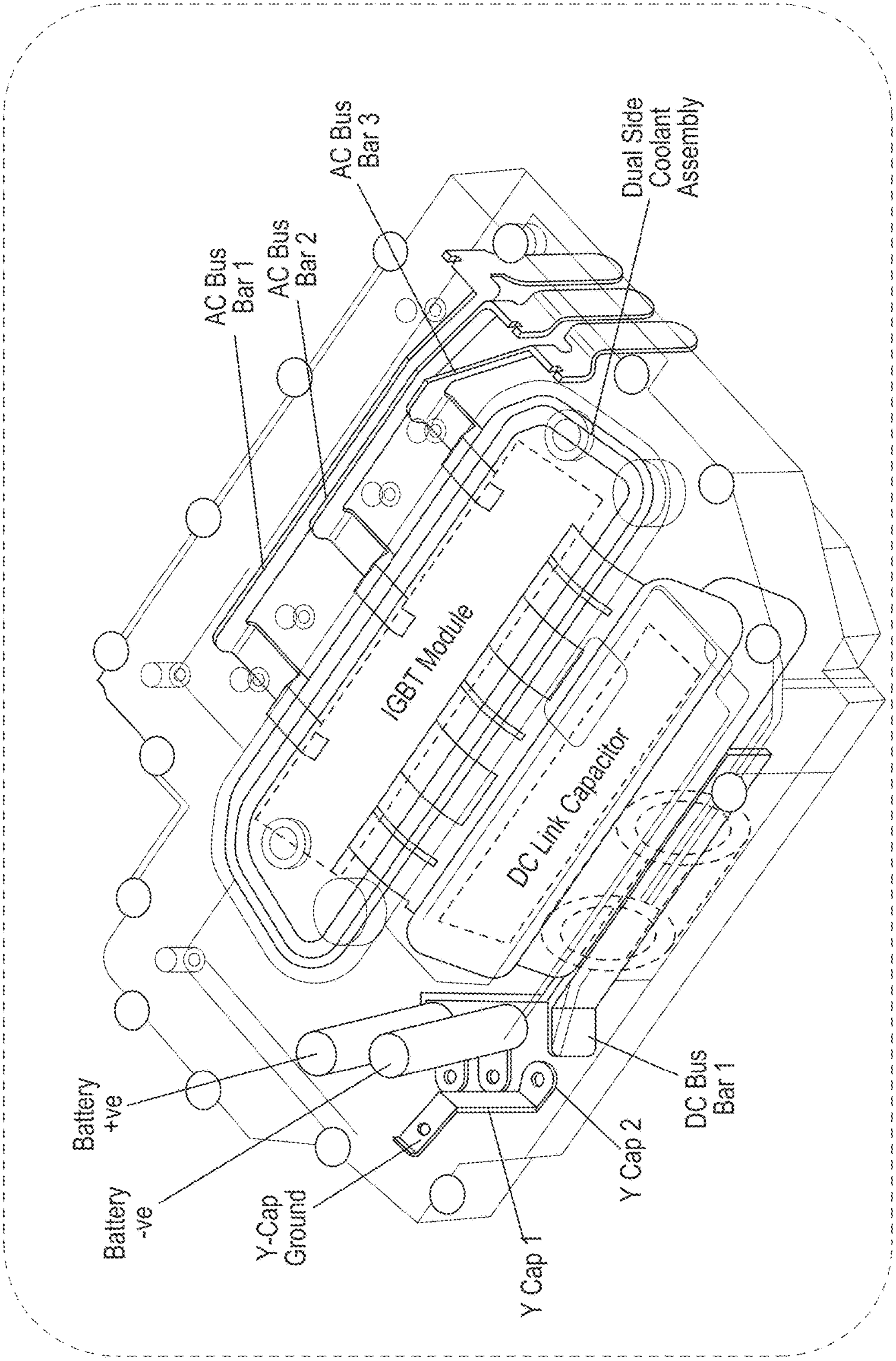
Figure 218C:
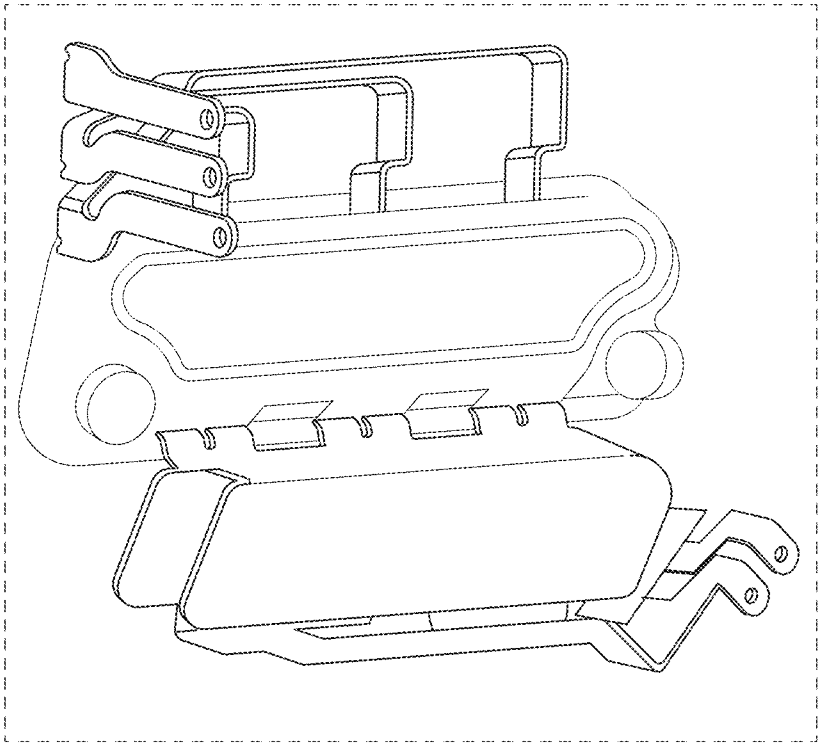
Figure 218B:
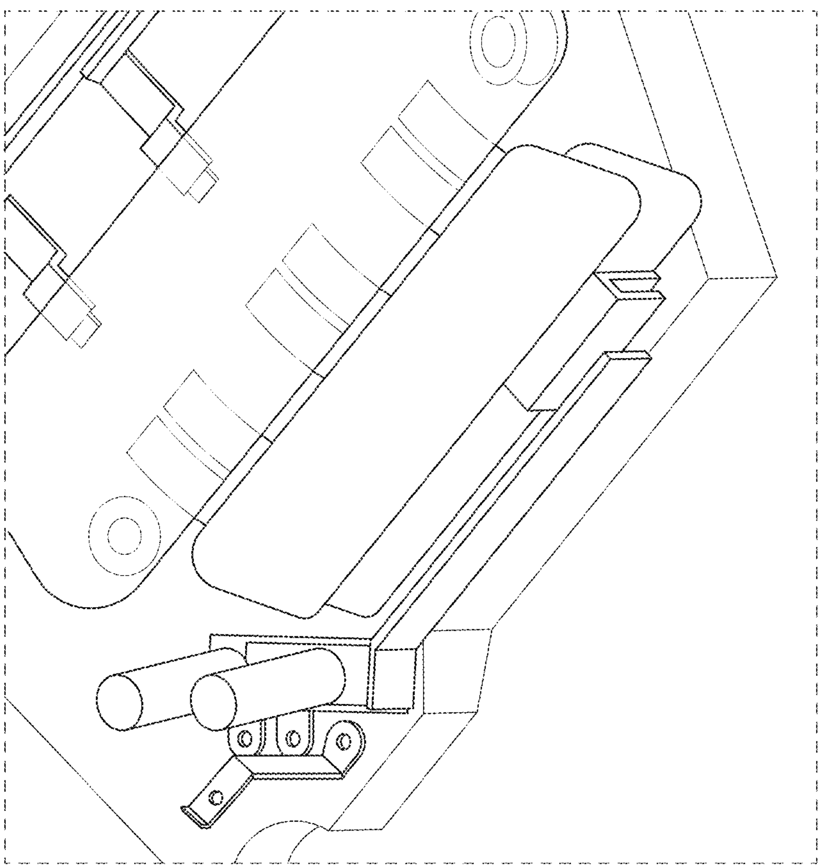
Figure 218D:
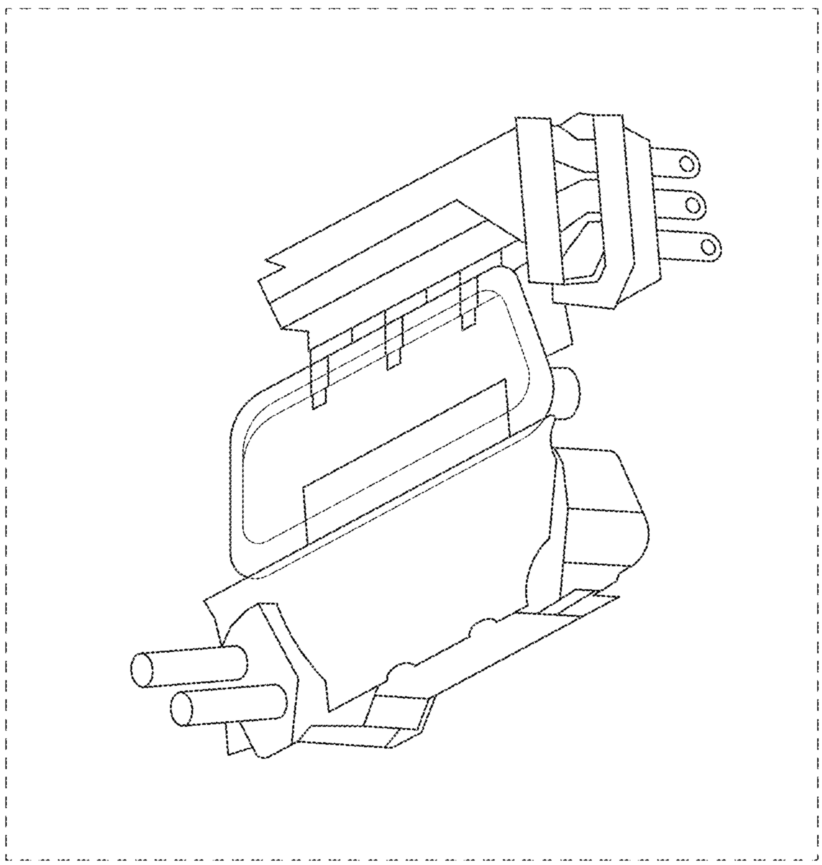

FIG. 217 depicts an embodiments example positive temperature coefficient controller having various circuits configured to functionally execute operations.

FIGS. 218A-D depict embodiment views for an inverter configured to determine conducted emissions, including a side view, bottom view, and with view directed to polymer packaging.

Figure 219:
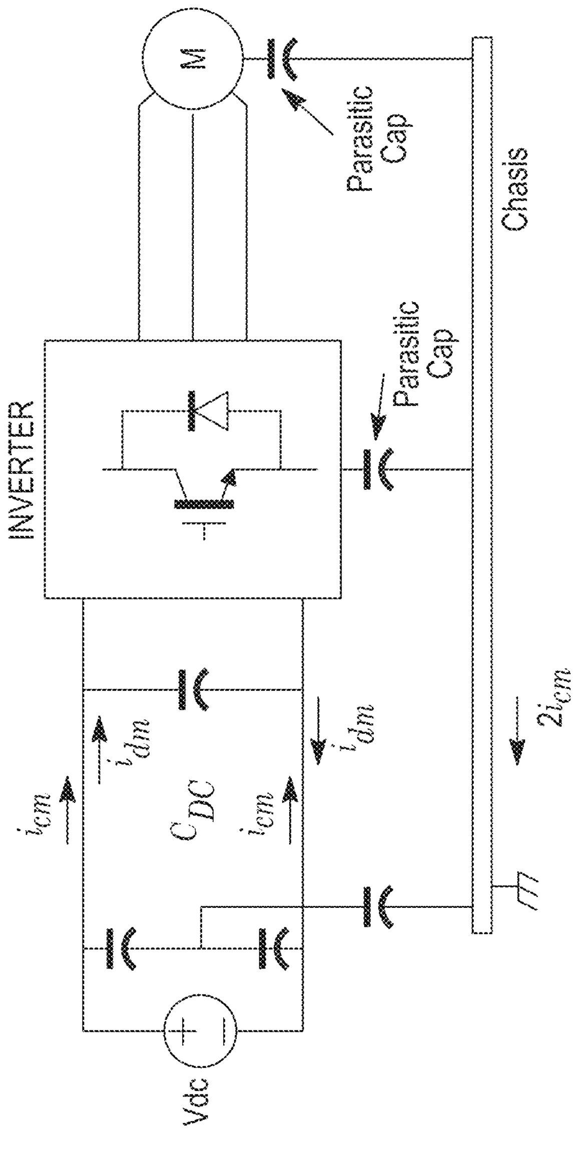

FIG. 219 depicts a configuration for determining conducted emissions in an inverter.

Figure 220:
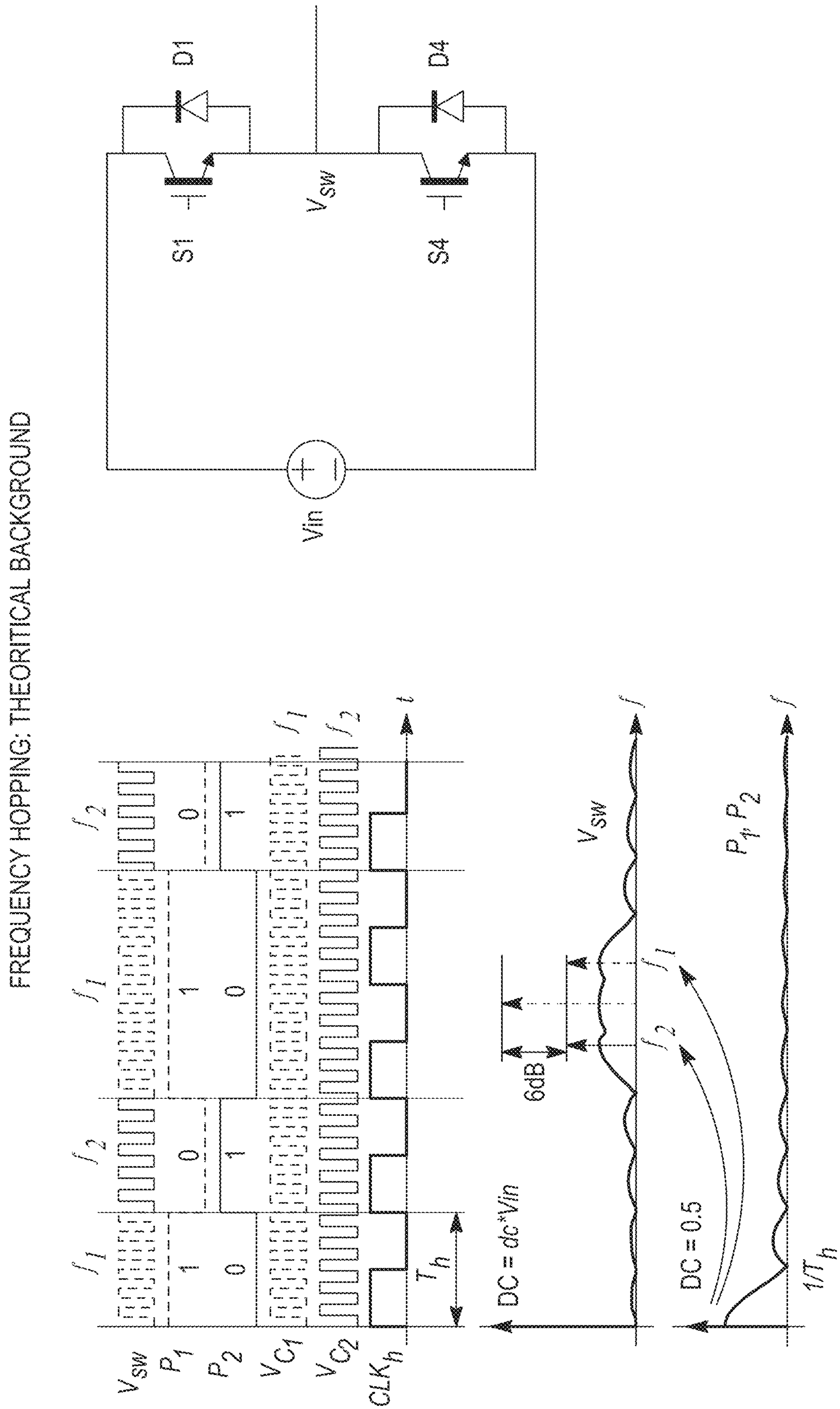

FIG. 220 depicts a frequency hopping configuration for inverter control.

Figure 221:
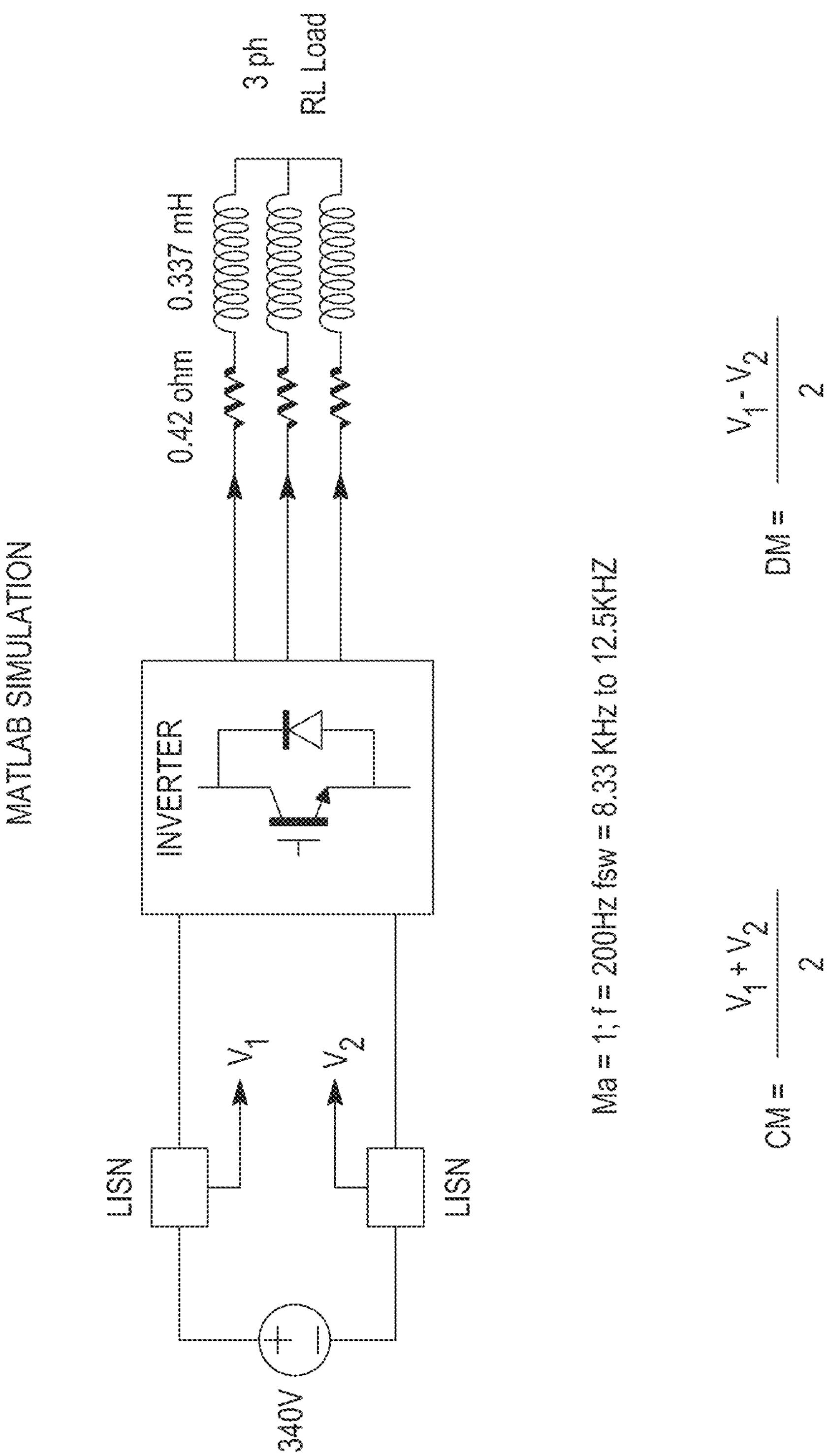

FIG. 221 depicts a MATLAB simulation configuration for determining conducted emissions.

Figure 222:
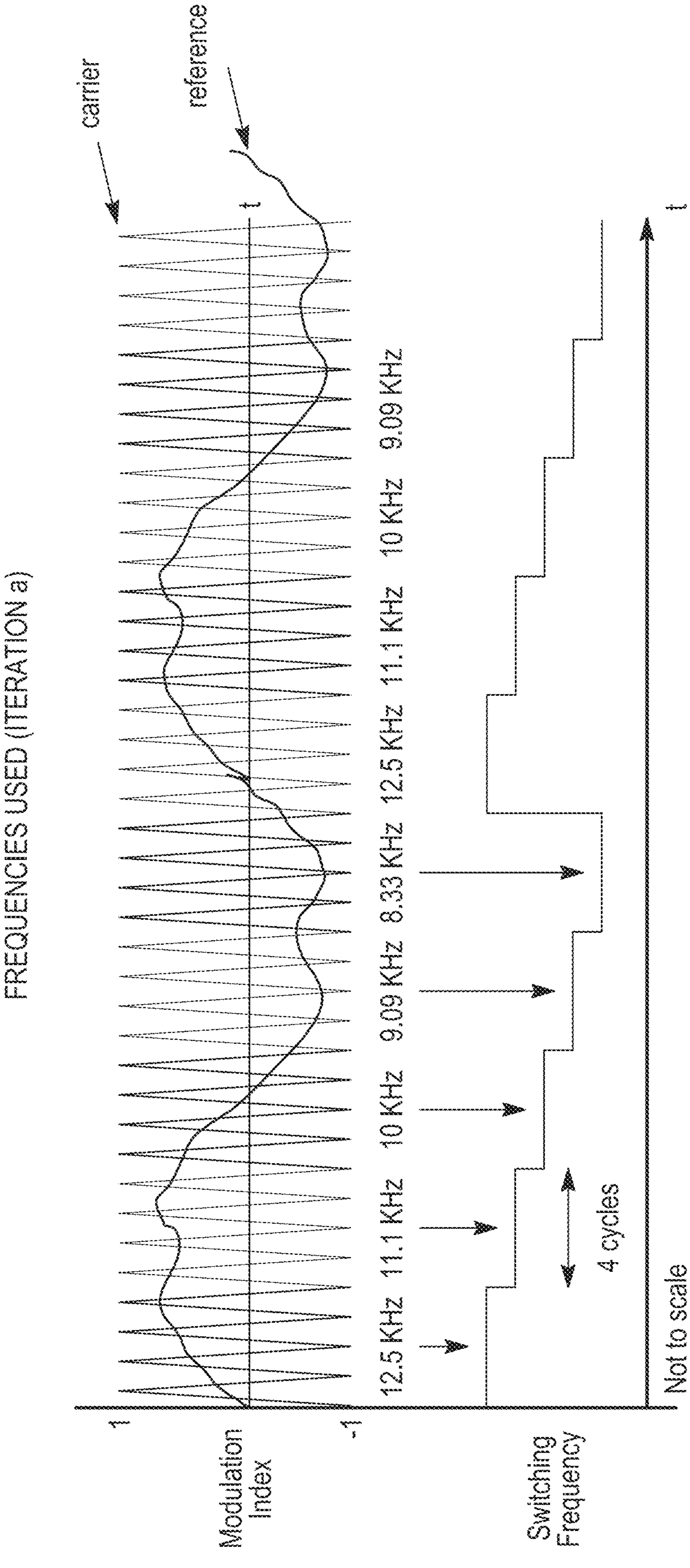

FIG. 222 depicts frequencies used in a first iteration of emissions determination.

Figure 223:
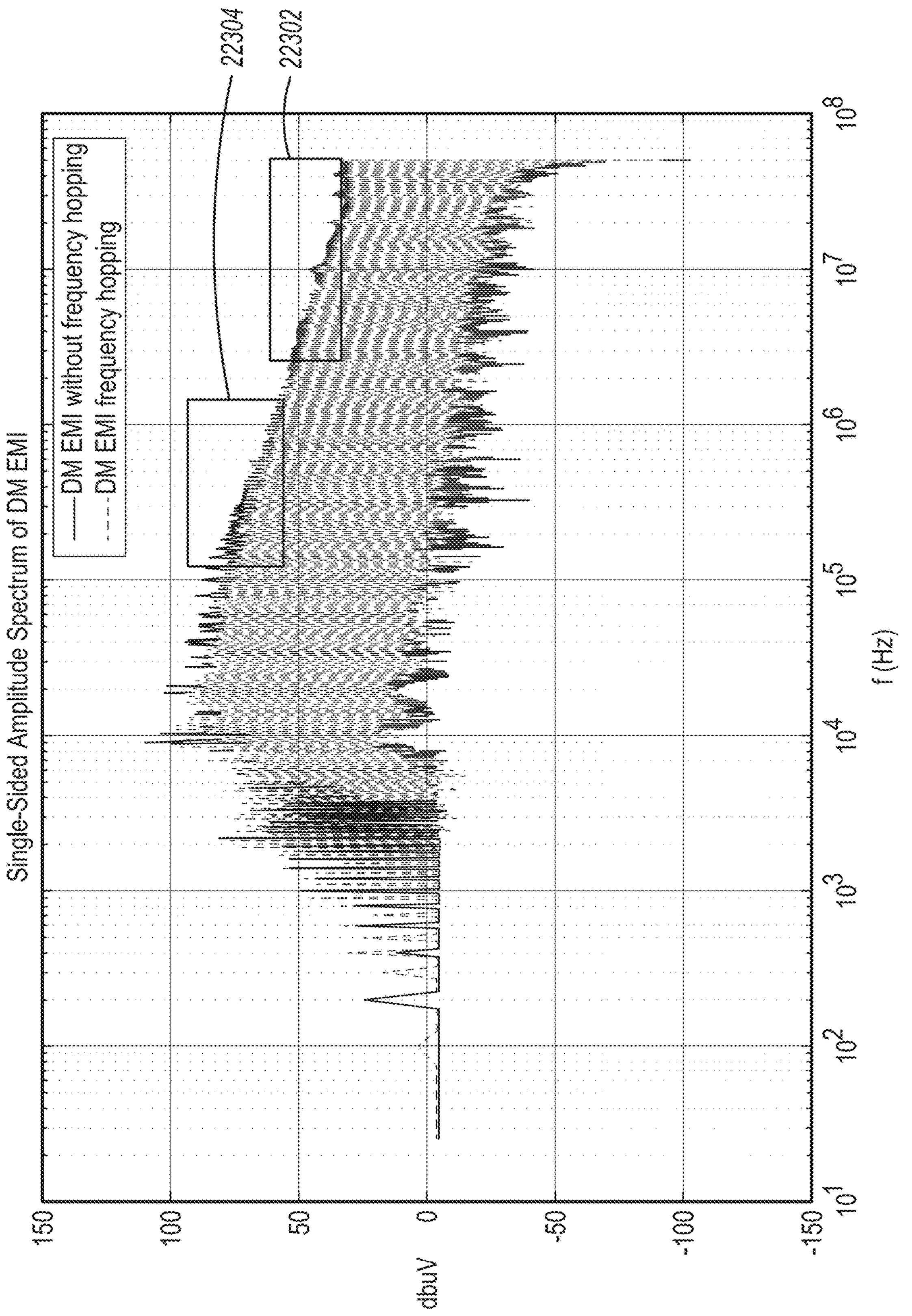

FIG. 223 depicts a first result from the first iteration of emissions determination.

Figure 224A:
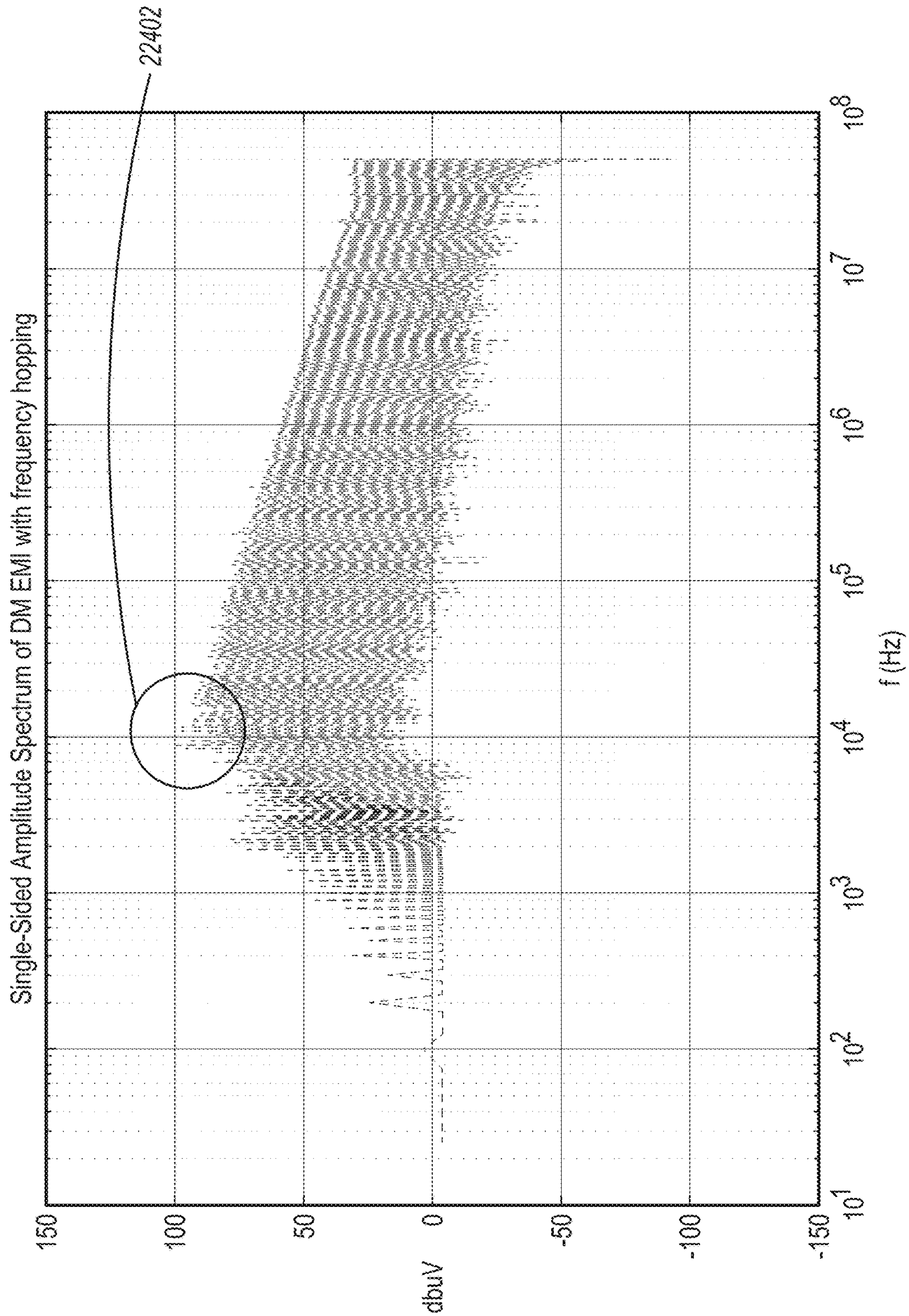
Figure 224B:
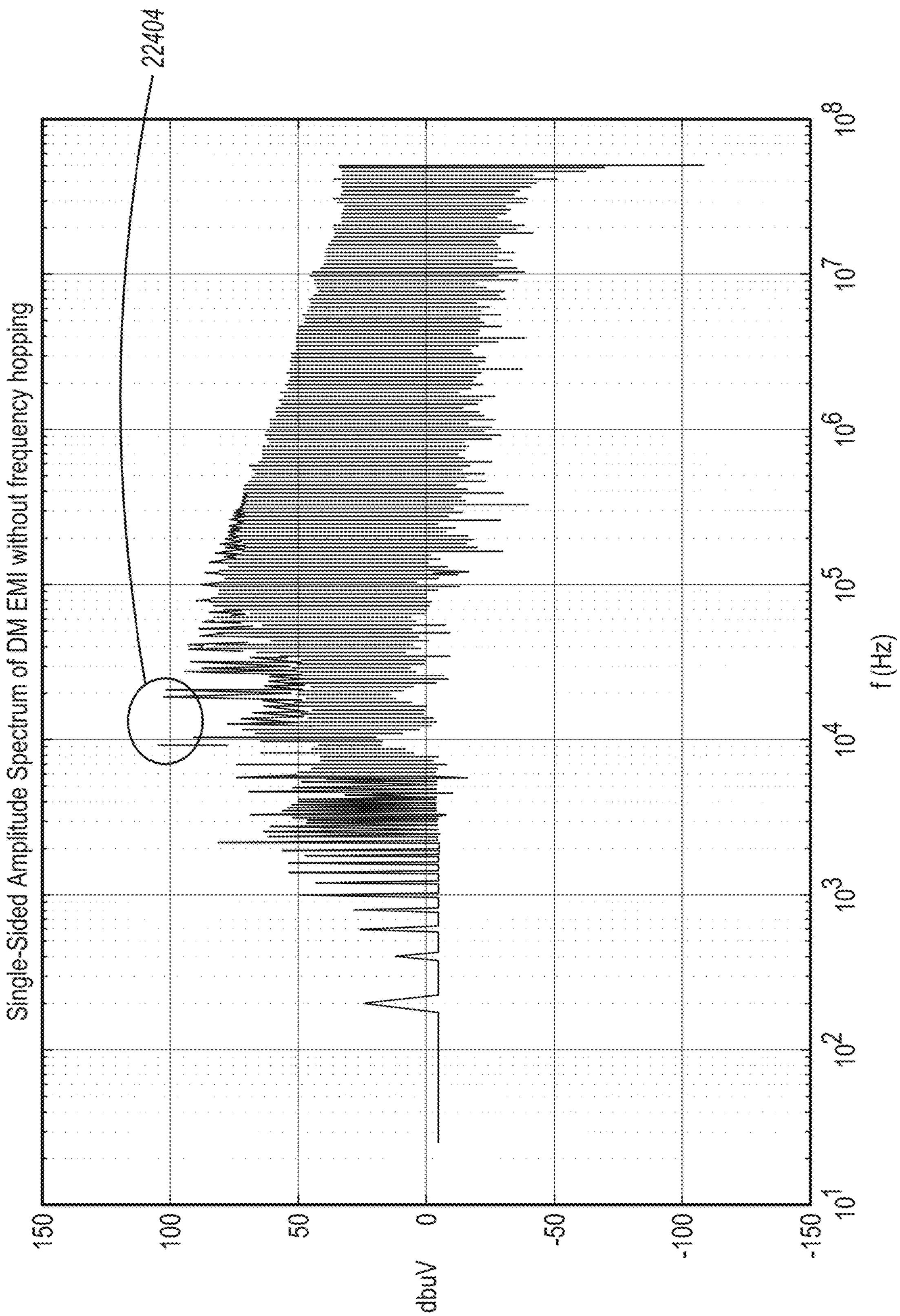

FIGS. 224A-B depicts a second result from the first iteration of emissions determination.

Figure 225:
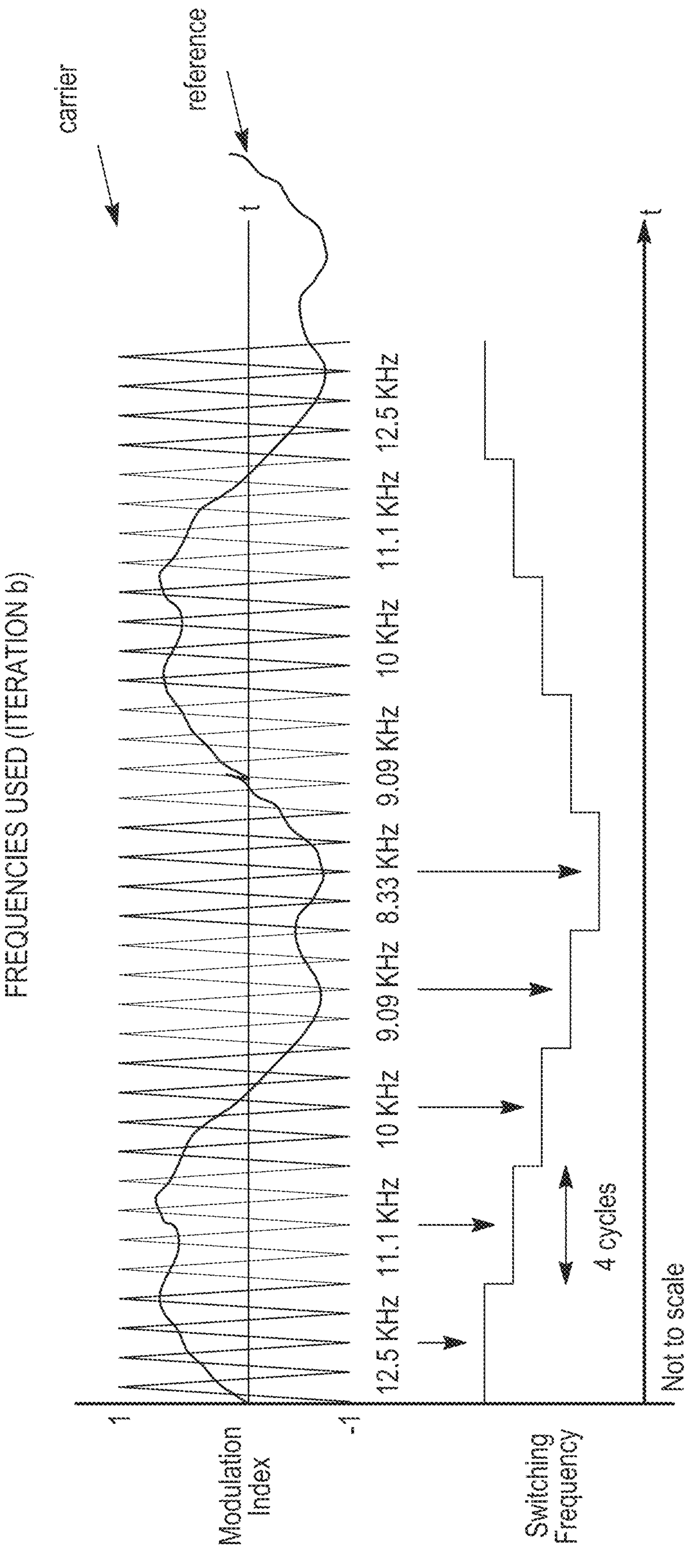

FIG. 225 depicts frequencies used in a second iteration of emissions determination.

Figure 226:
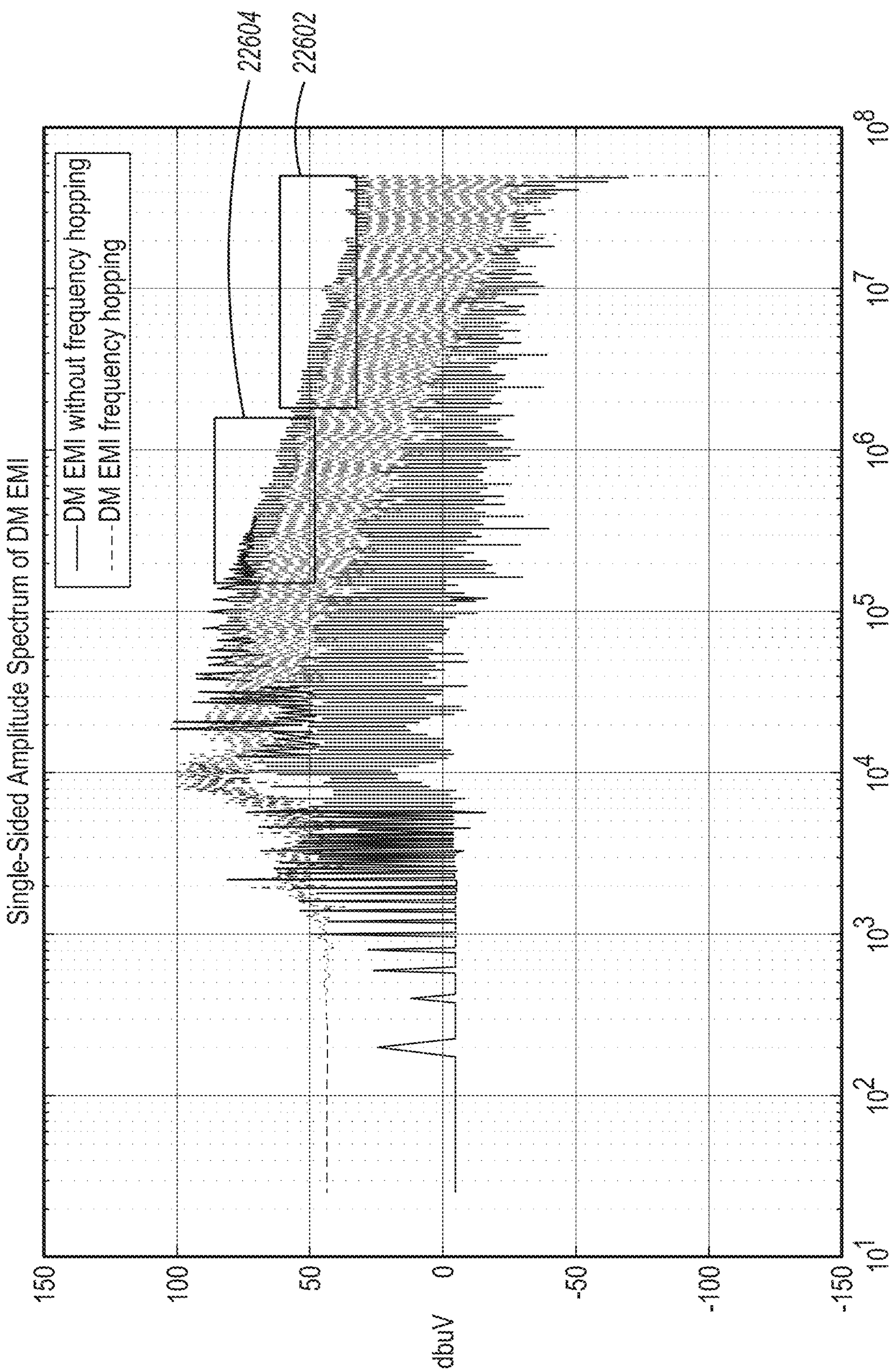

FIG. 226 depicts a result from the second iteration of emissions determination.

Figure 227:
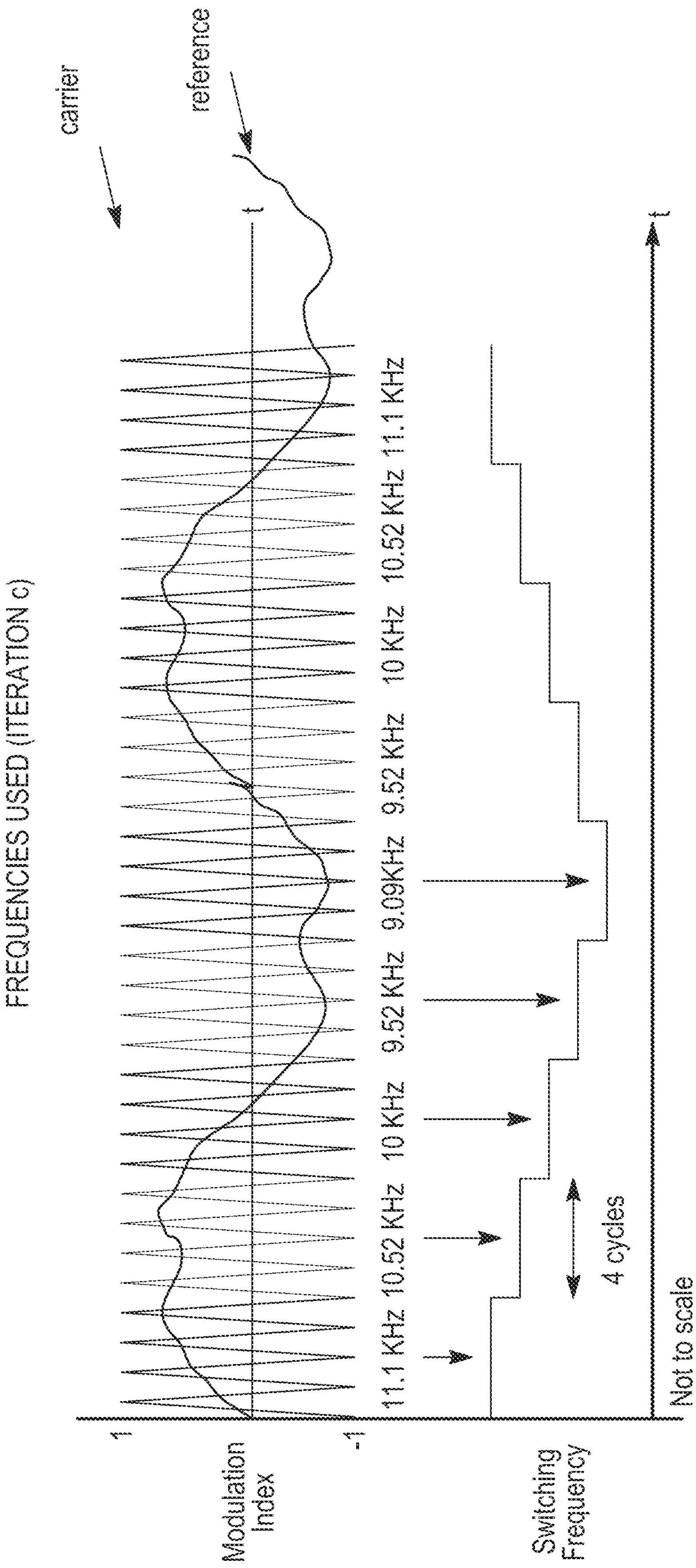

FIG. 227 depicts frequencies used in a third iteration of emissions determination.

Figure 228:
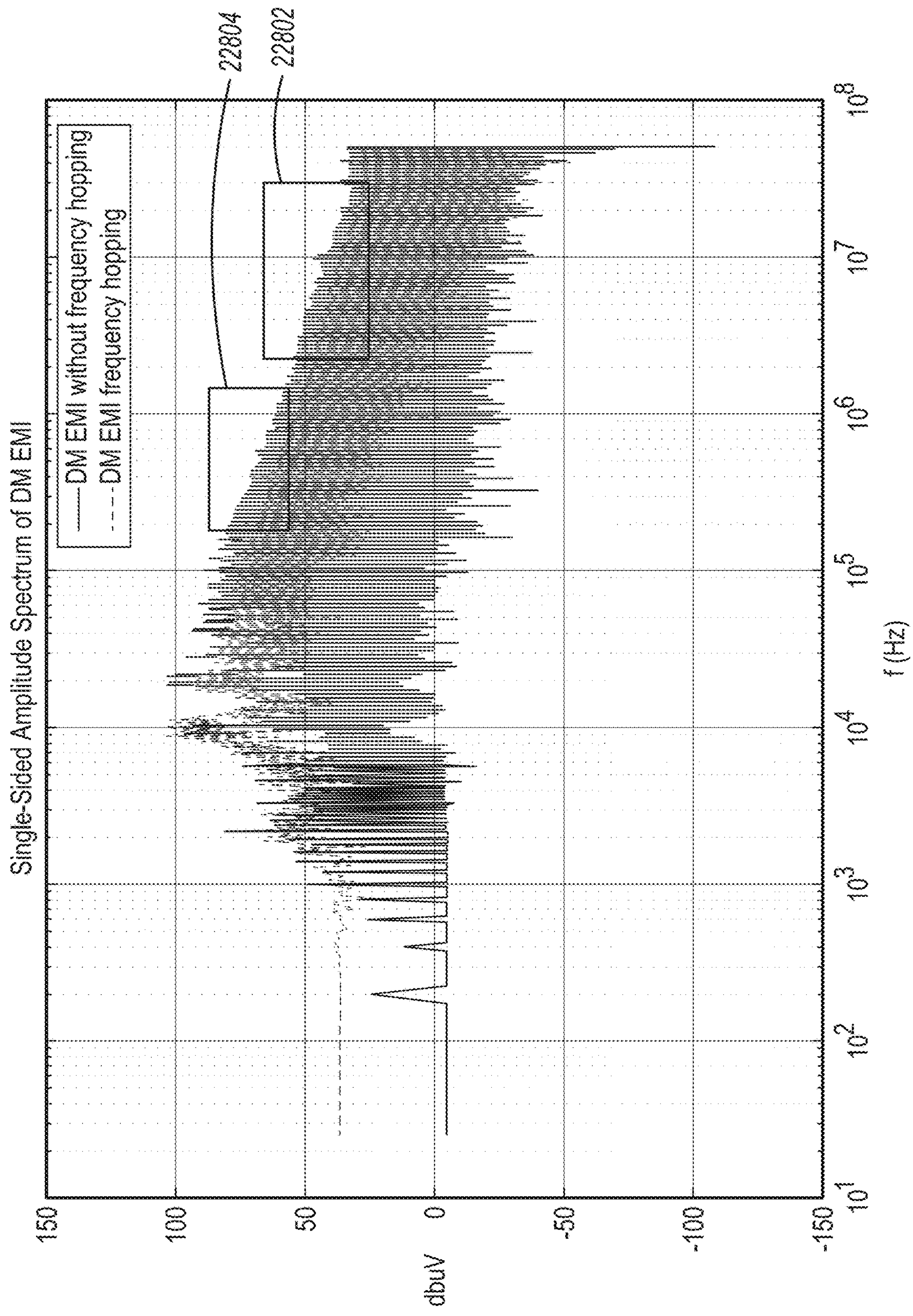

FIG. 228 depicts a first result from the third iteration of emissions determination.

Figure 229:
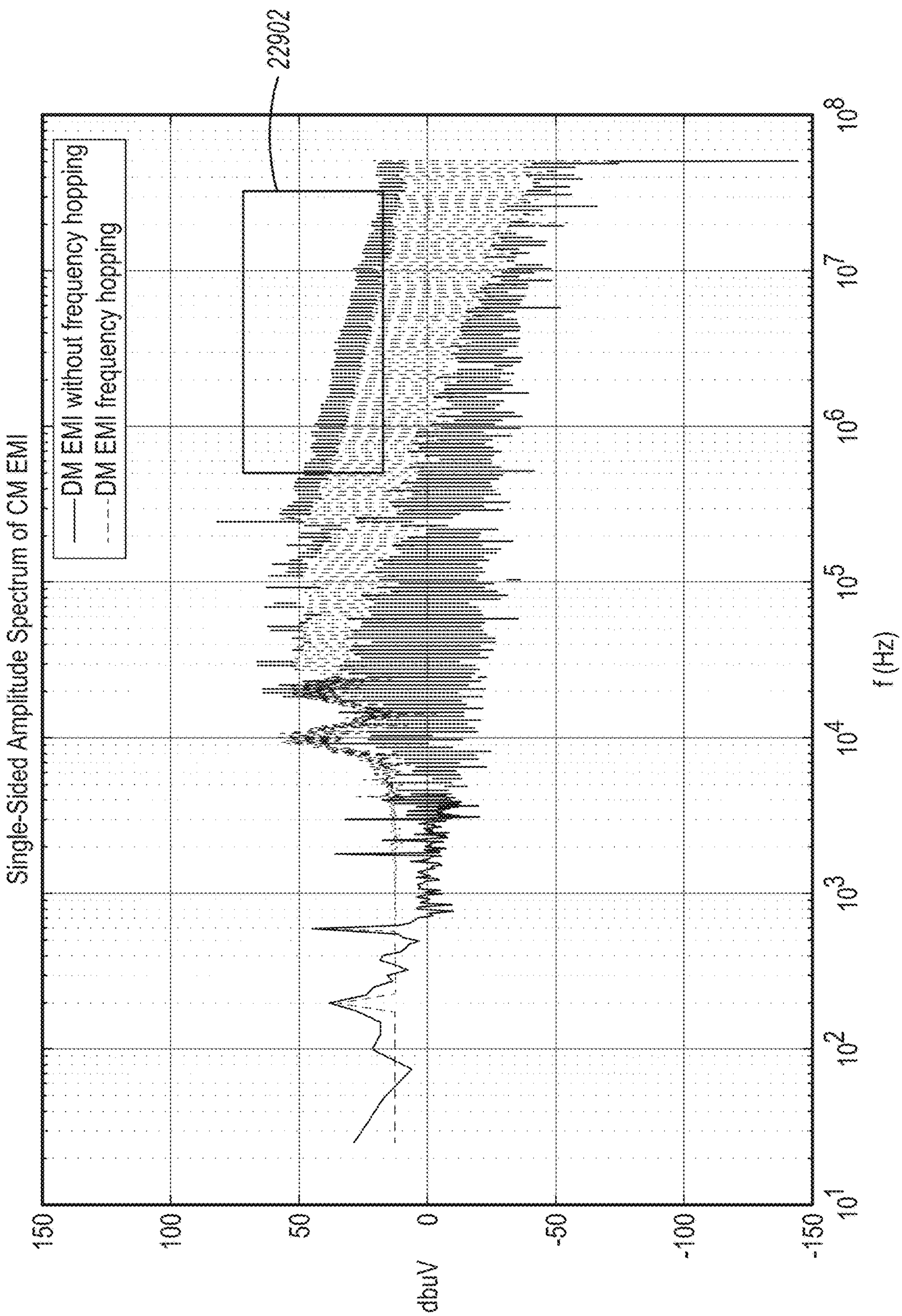

FIG. 229 depicts a second result from the third iteration of emissions determination.

FIG. 230 lists a comparison of results from the first iteration, second iteration, and third iteration of emissions determination.

Figure 231:
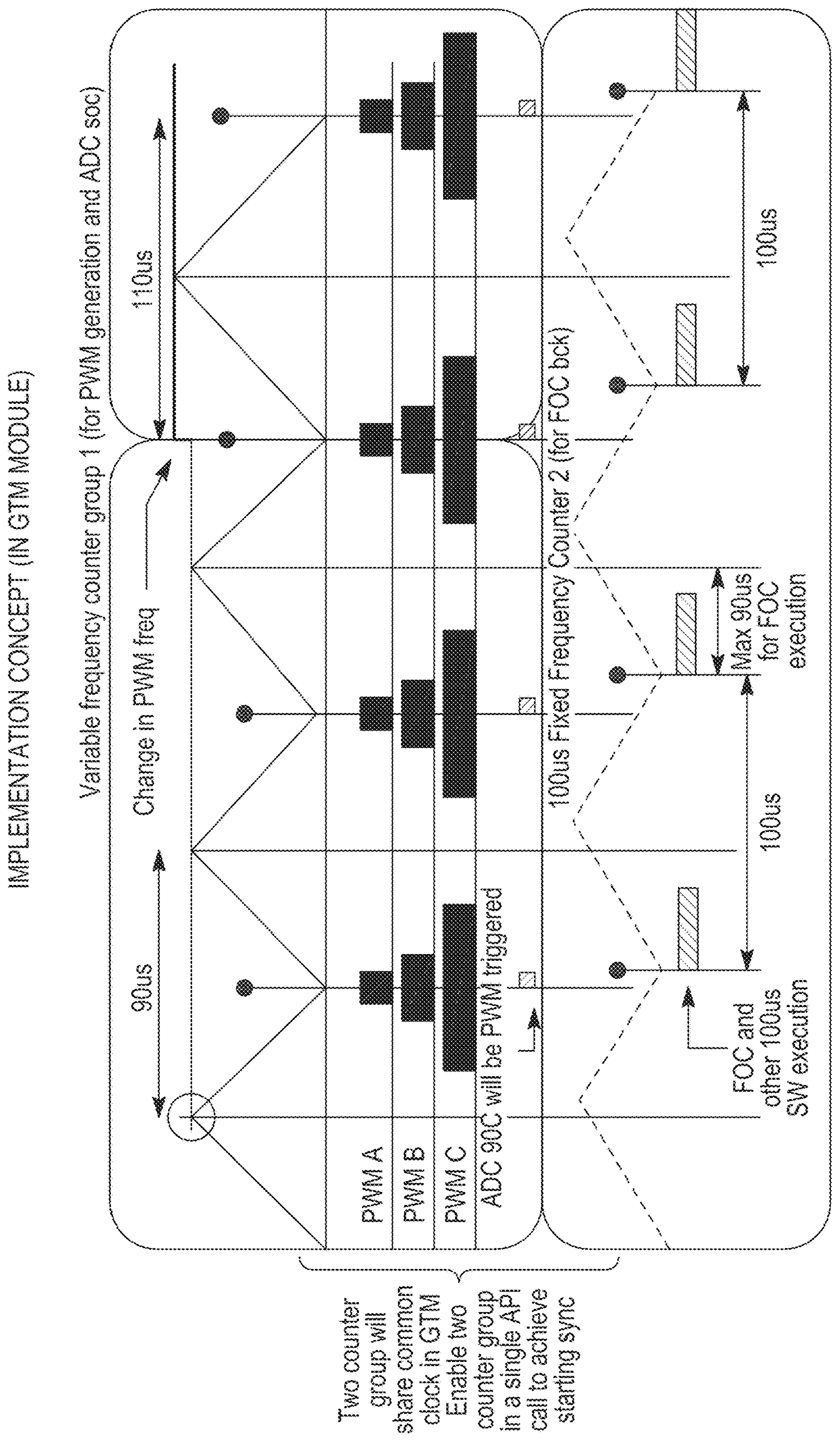

FIG. 231 depicts a timing diagram in embodiments of the present disclosure.

Figure 232:
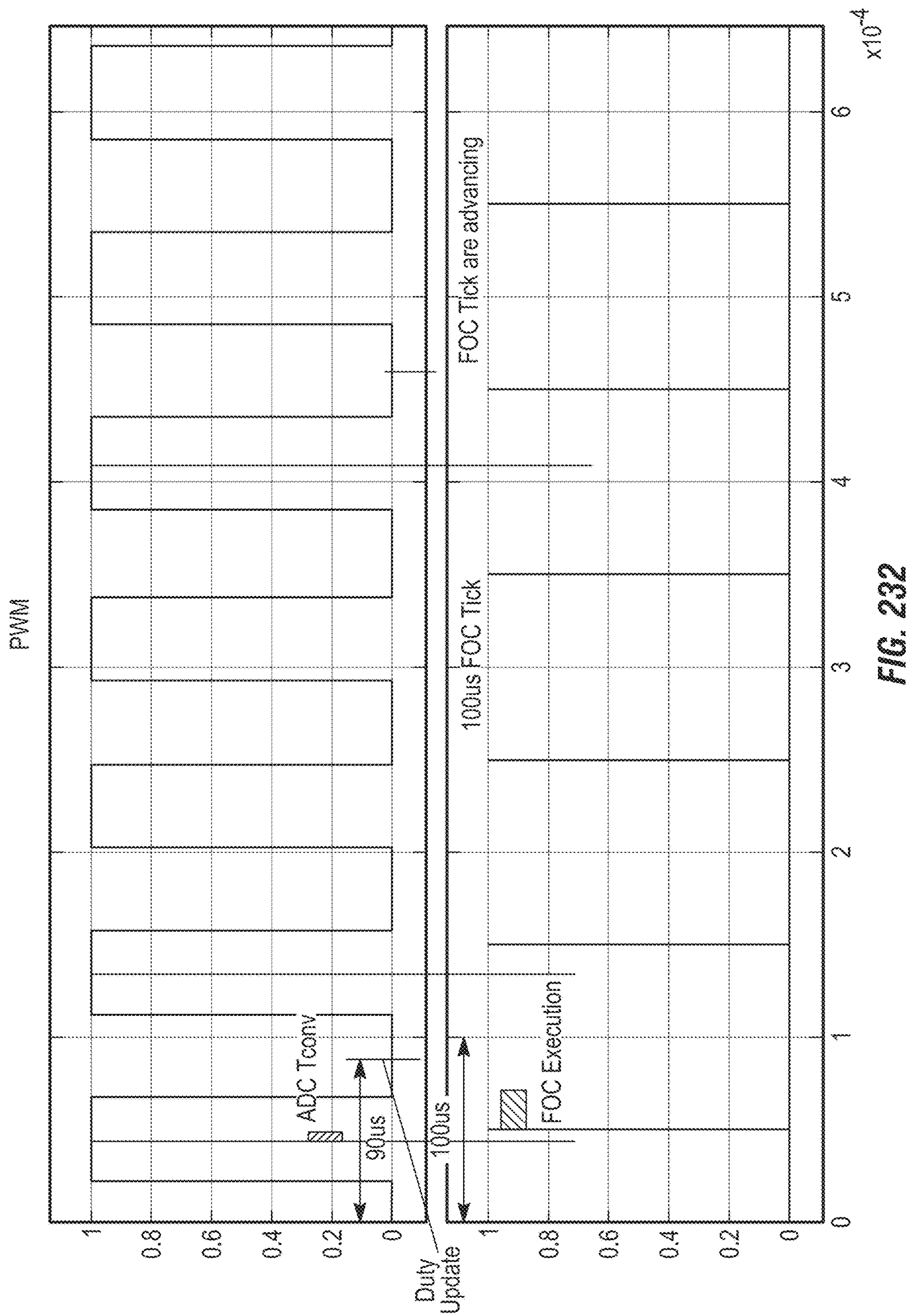

FIG. 232 depicts a timing diagram in embodiments of the present disclosure.

Figure 233:
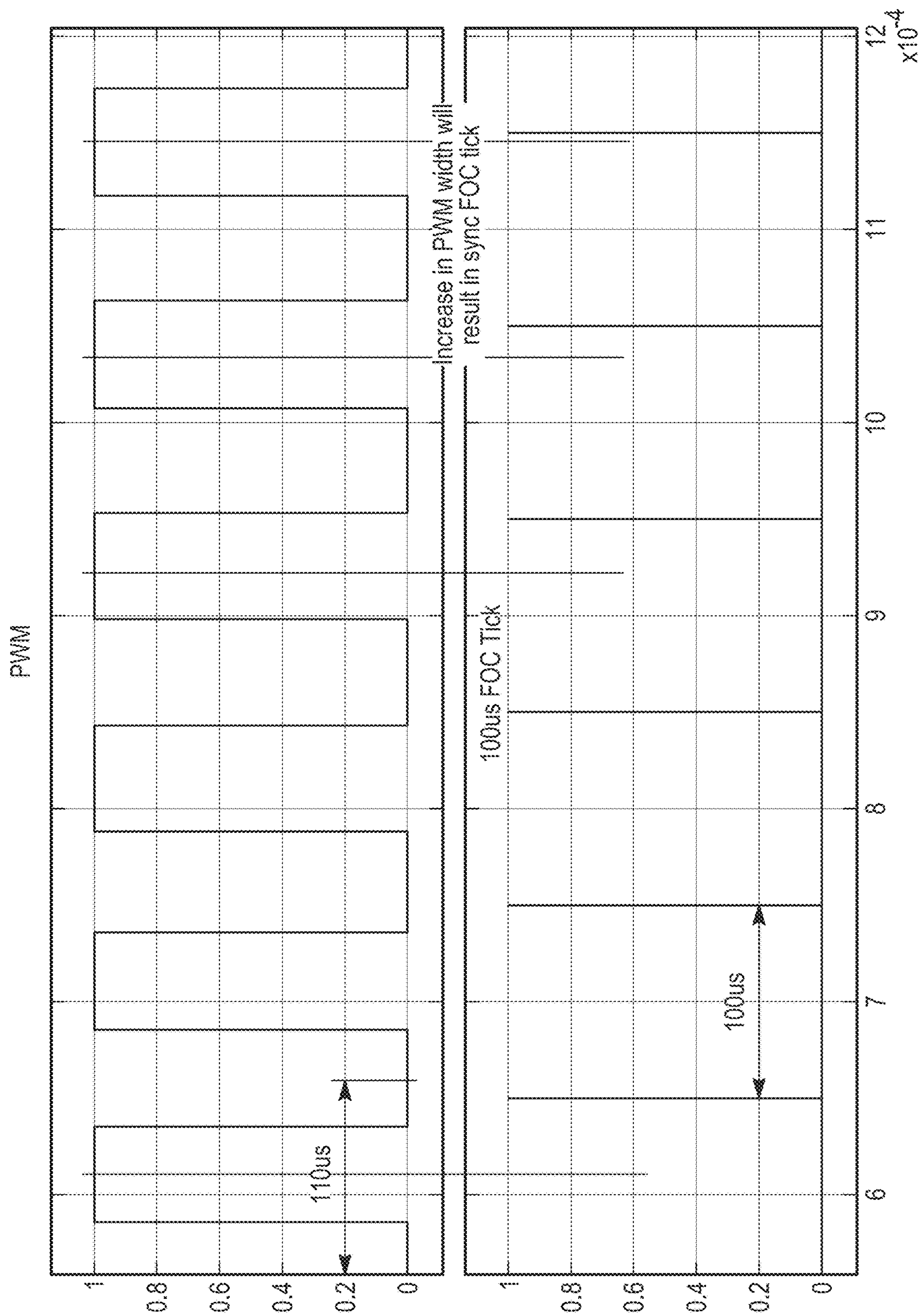

FIG. 233 depicts a timing diagram in embodiments of the present disclosure.

Figure 234:
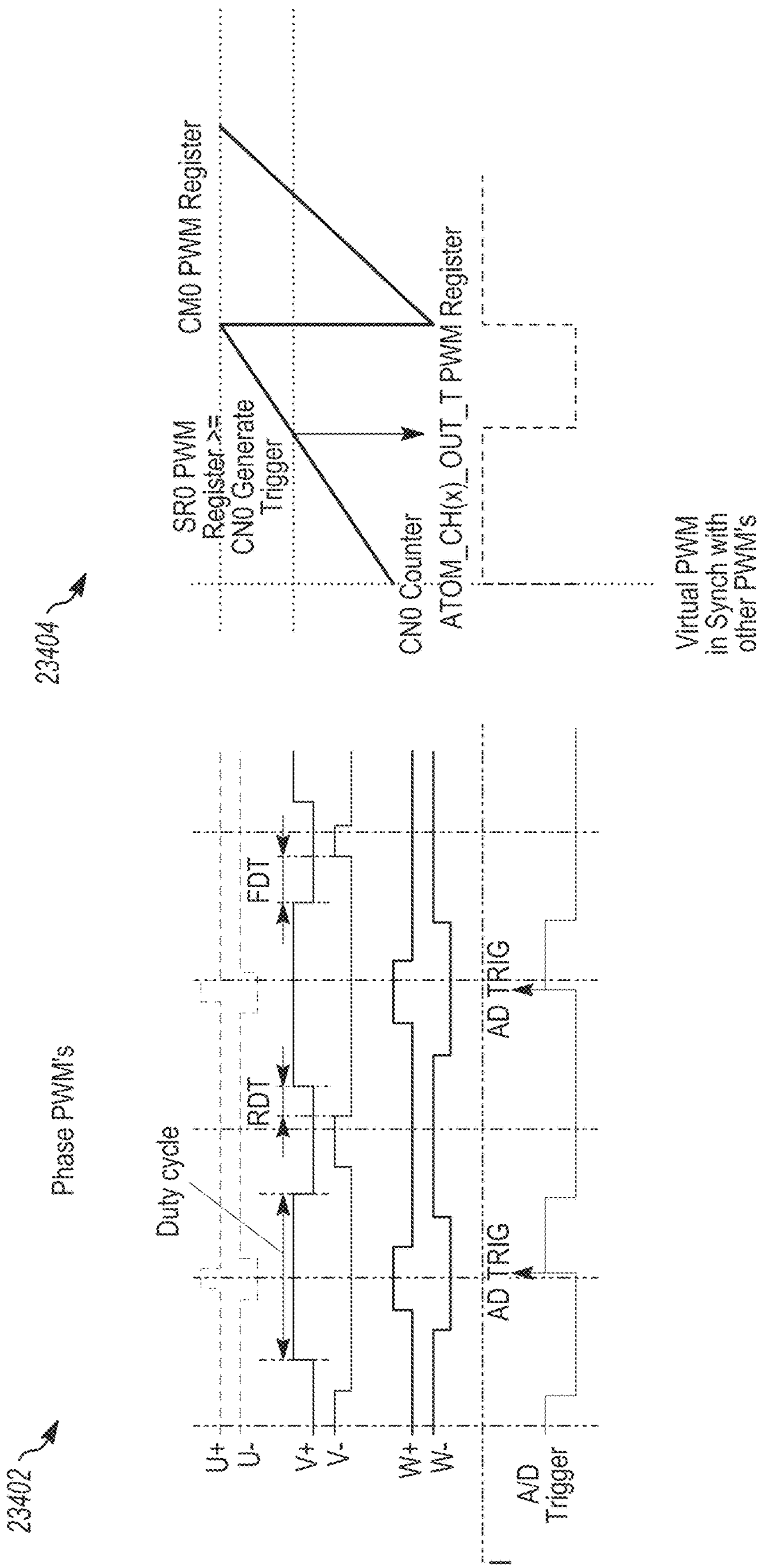

FIG. 234 depicts a phased pulse-width modulated timing diagram in embodiments of the present disclosure.

Figure 235:
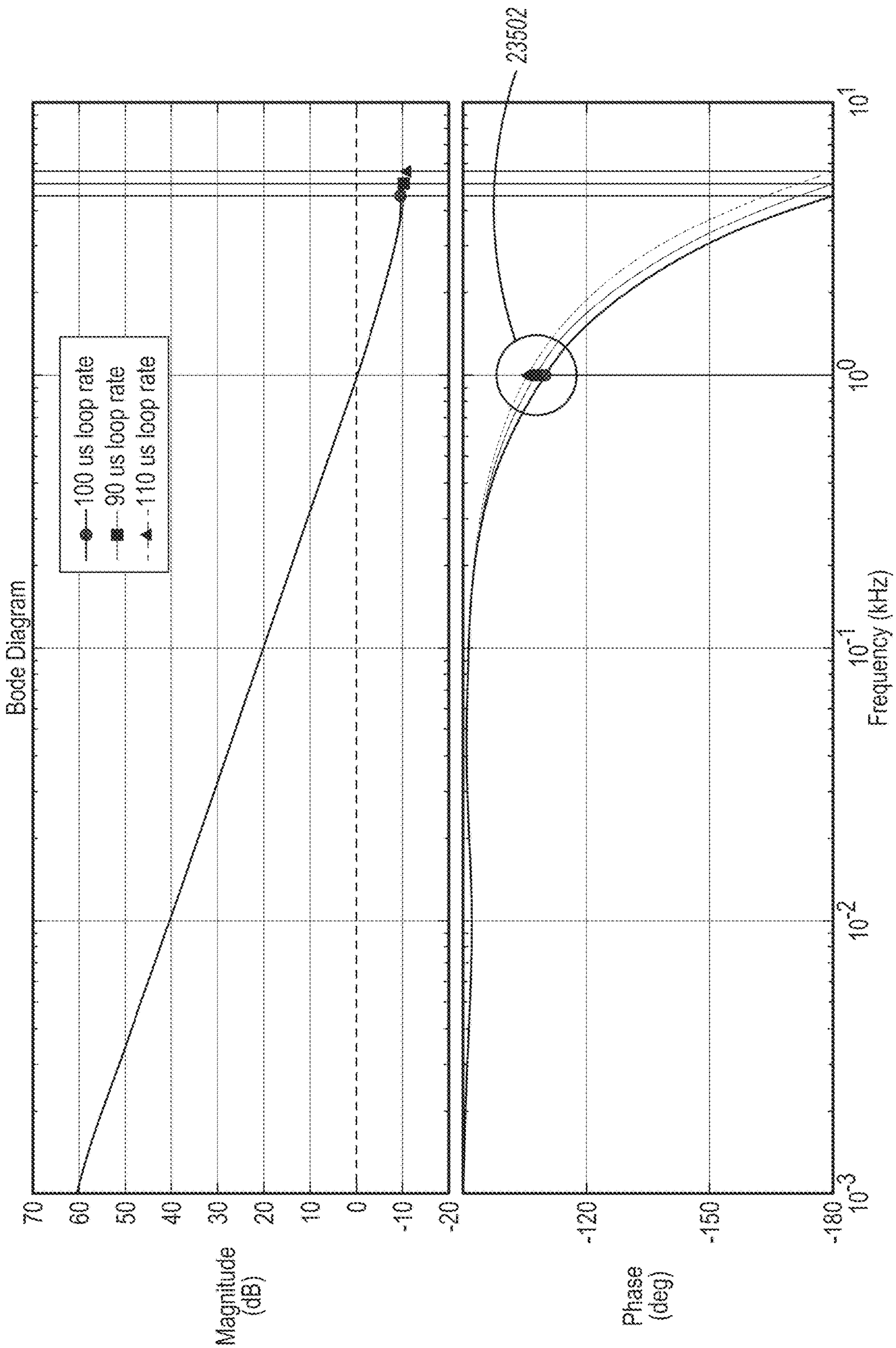

FIG. 235 depicts an effect of frequency hopping on a first controller gain in embodiments of the present disclosure.

Figure 236:
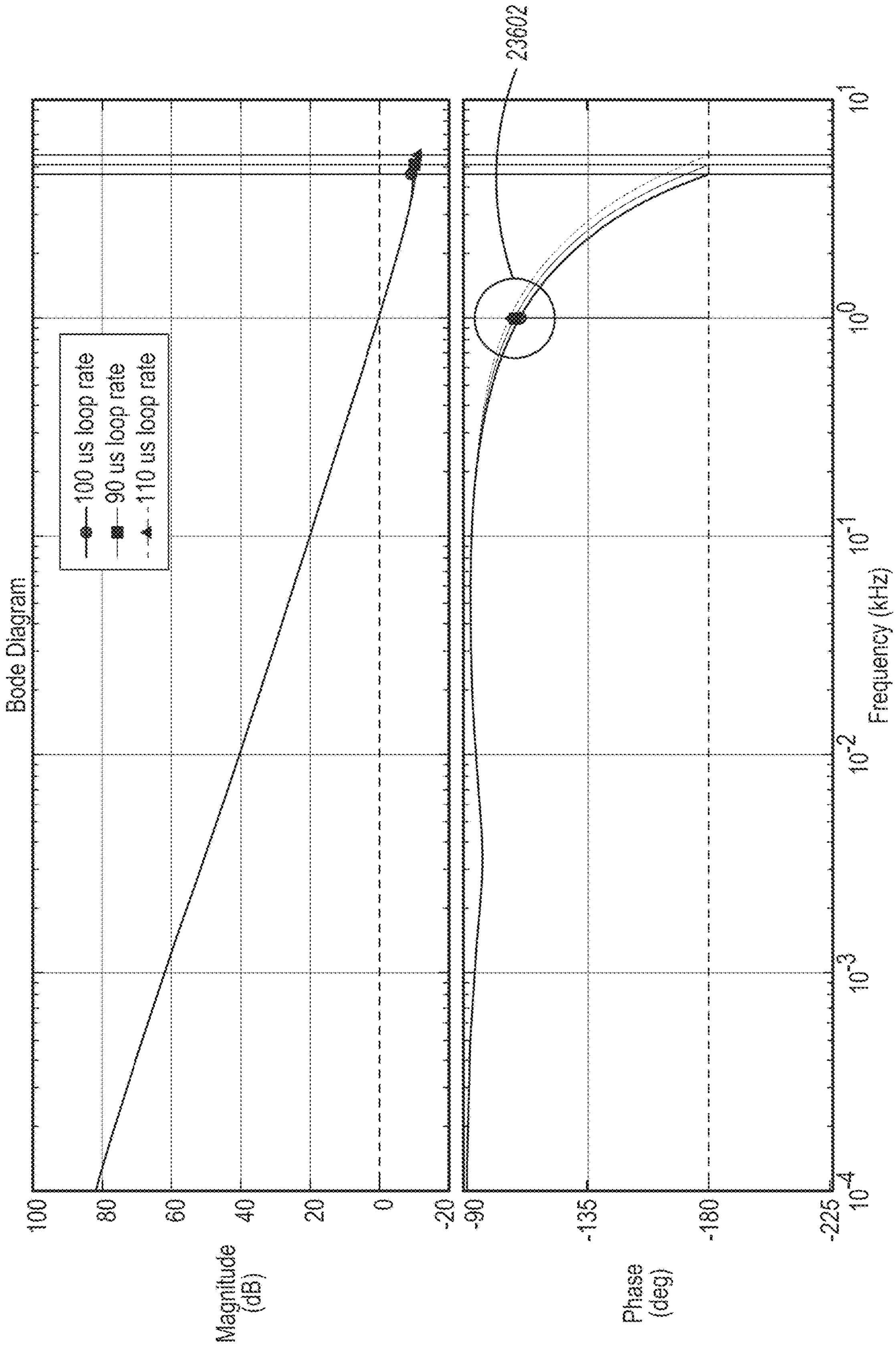

FIG. 236 depicts an effect of frequency hopping on a second controller gain in embodiments of the present disclosure.

Figure 237:
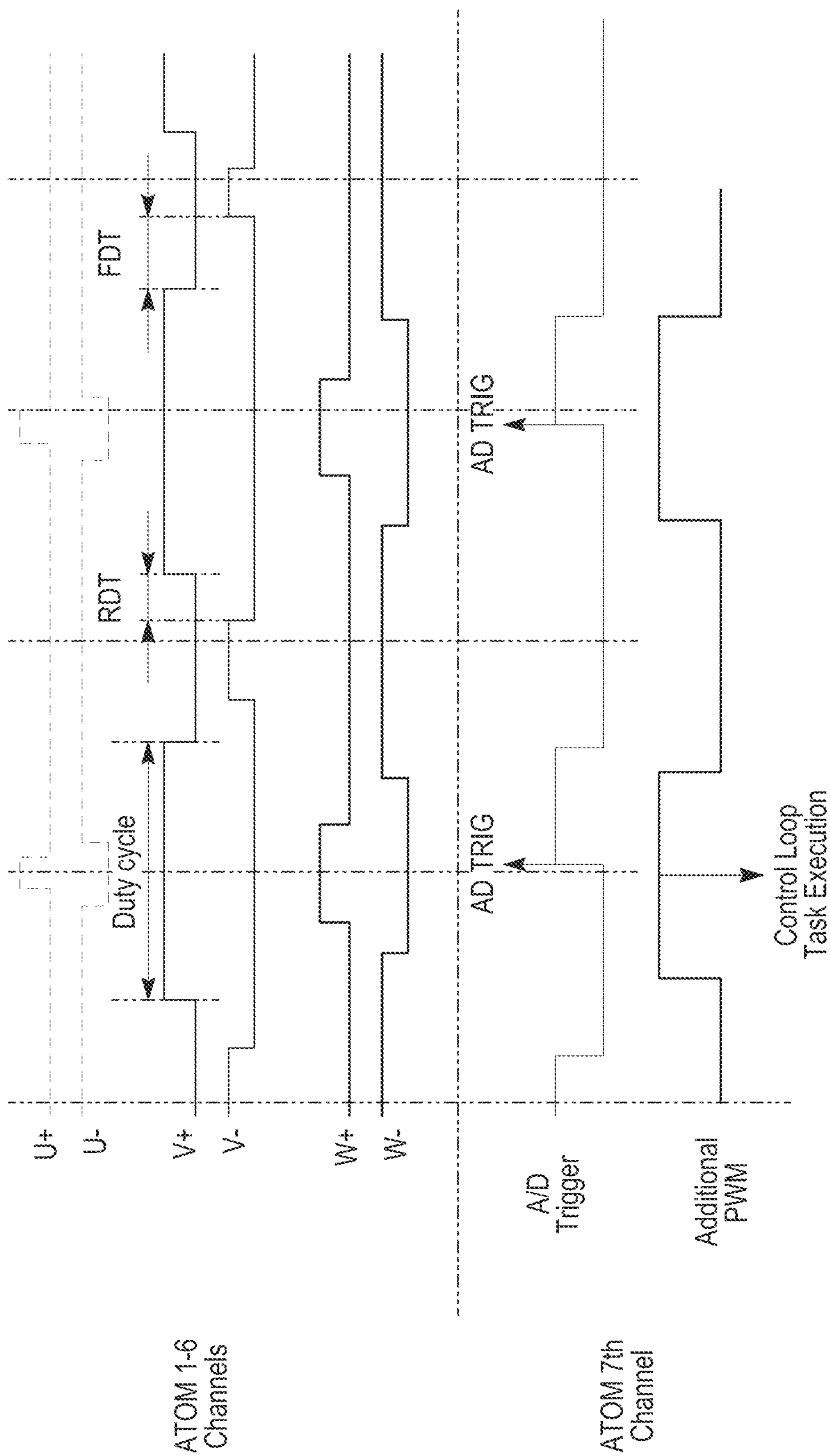

FIG. 237 depicts an implementation timing diagram in embodiments of the present disclosure.

Figure 238:
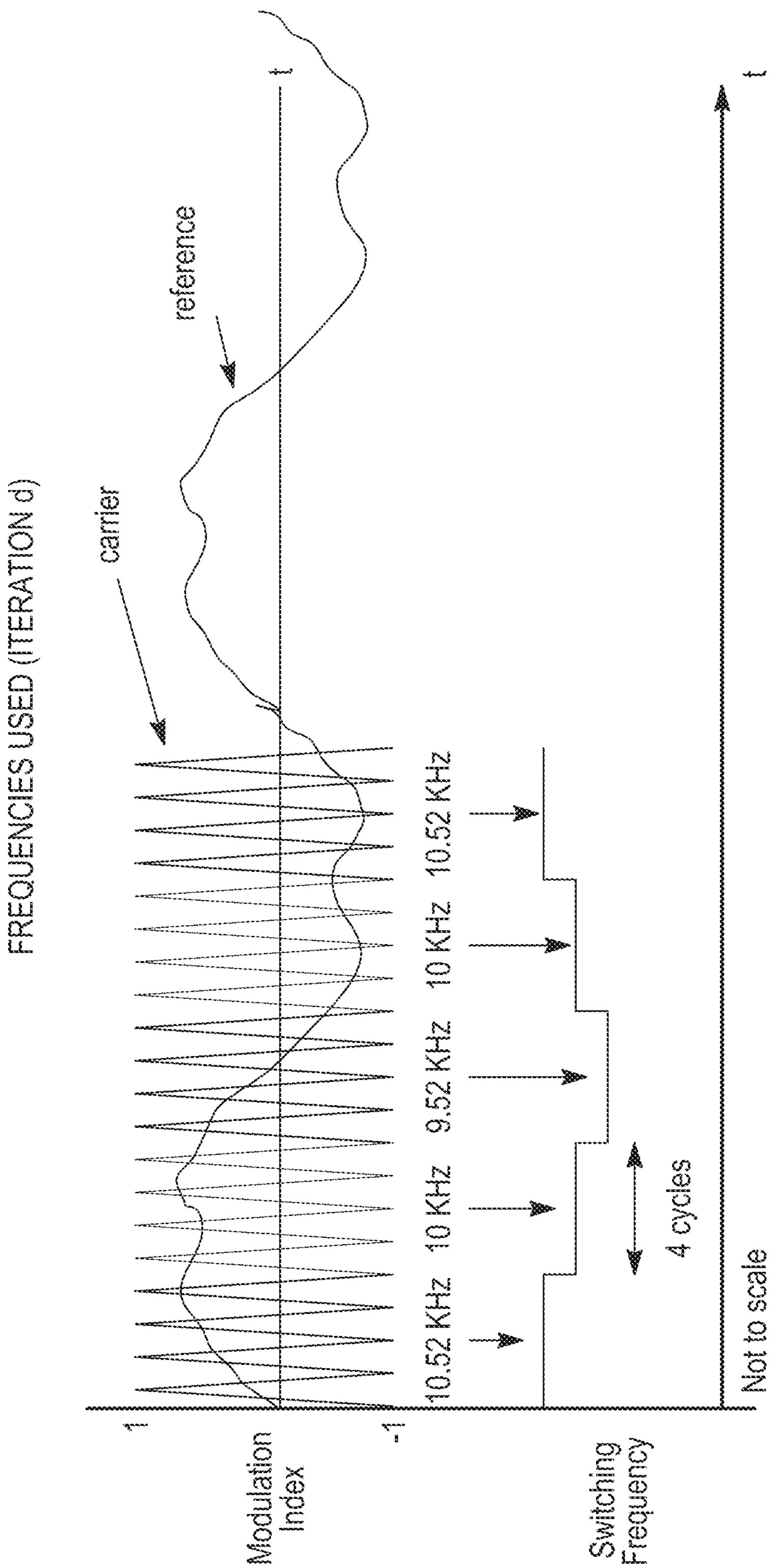

FIG. 238 depicts frequencies used in a fourth iteration of emissions determination.

Figure 239:
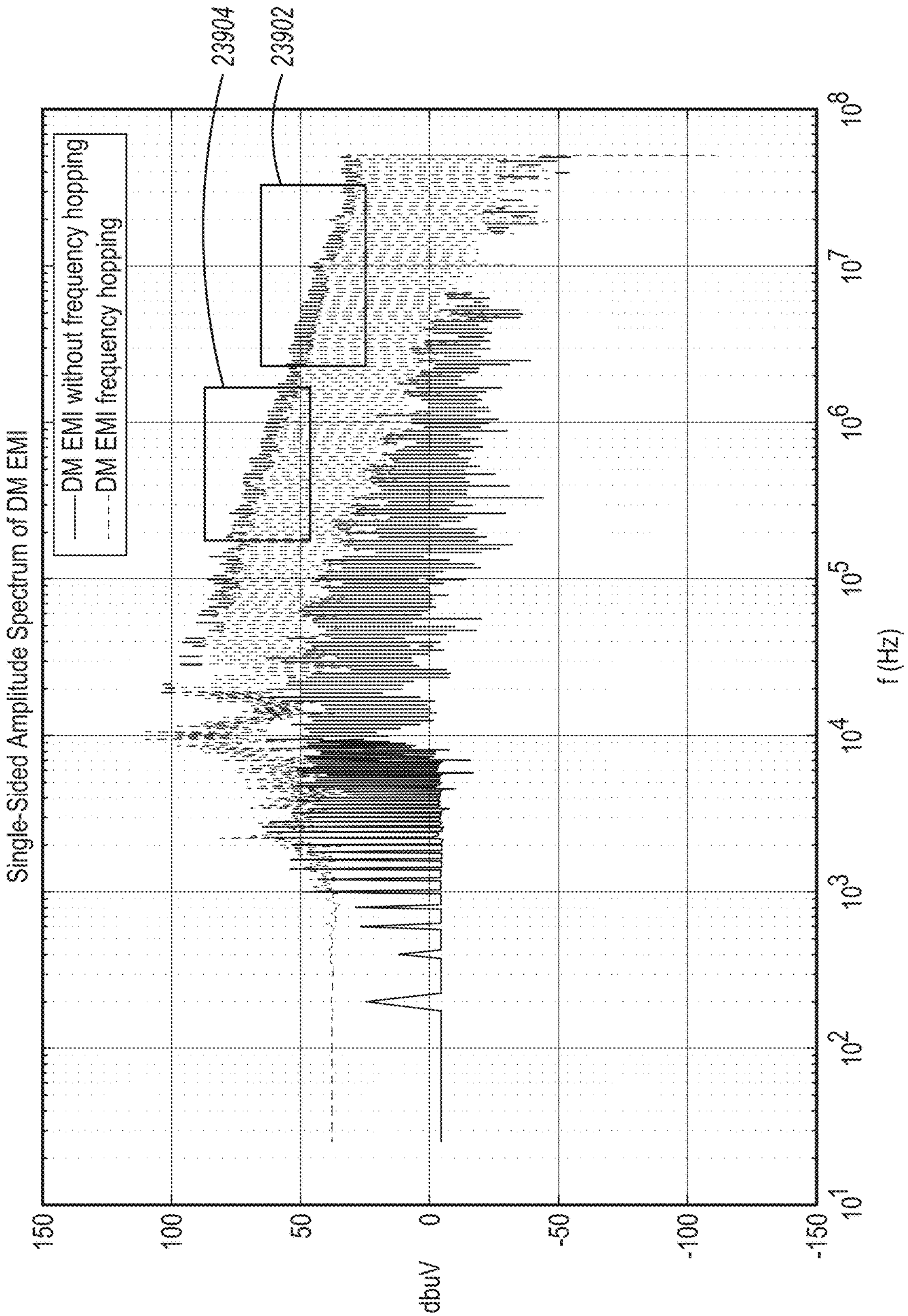

FIG. 239 depicts a first result from the fourth iteration of emissions determination.

Figure 240:
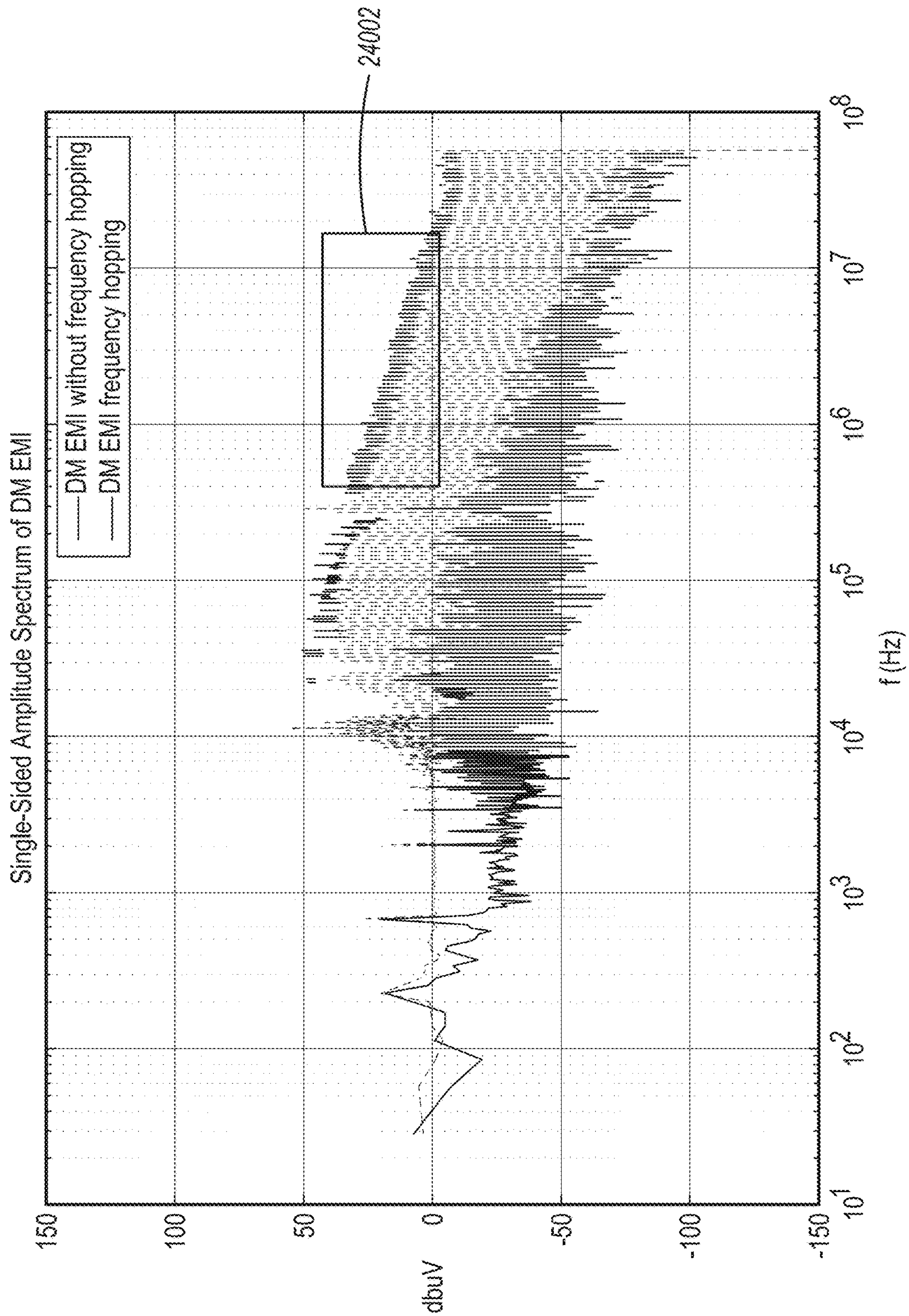

FIG. 240 depicts a second result from the fourth iteration of emissions determination.

Figure 241:
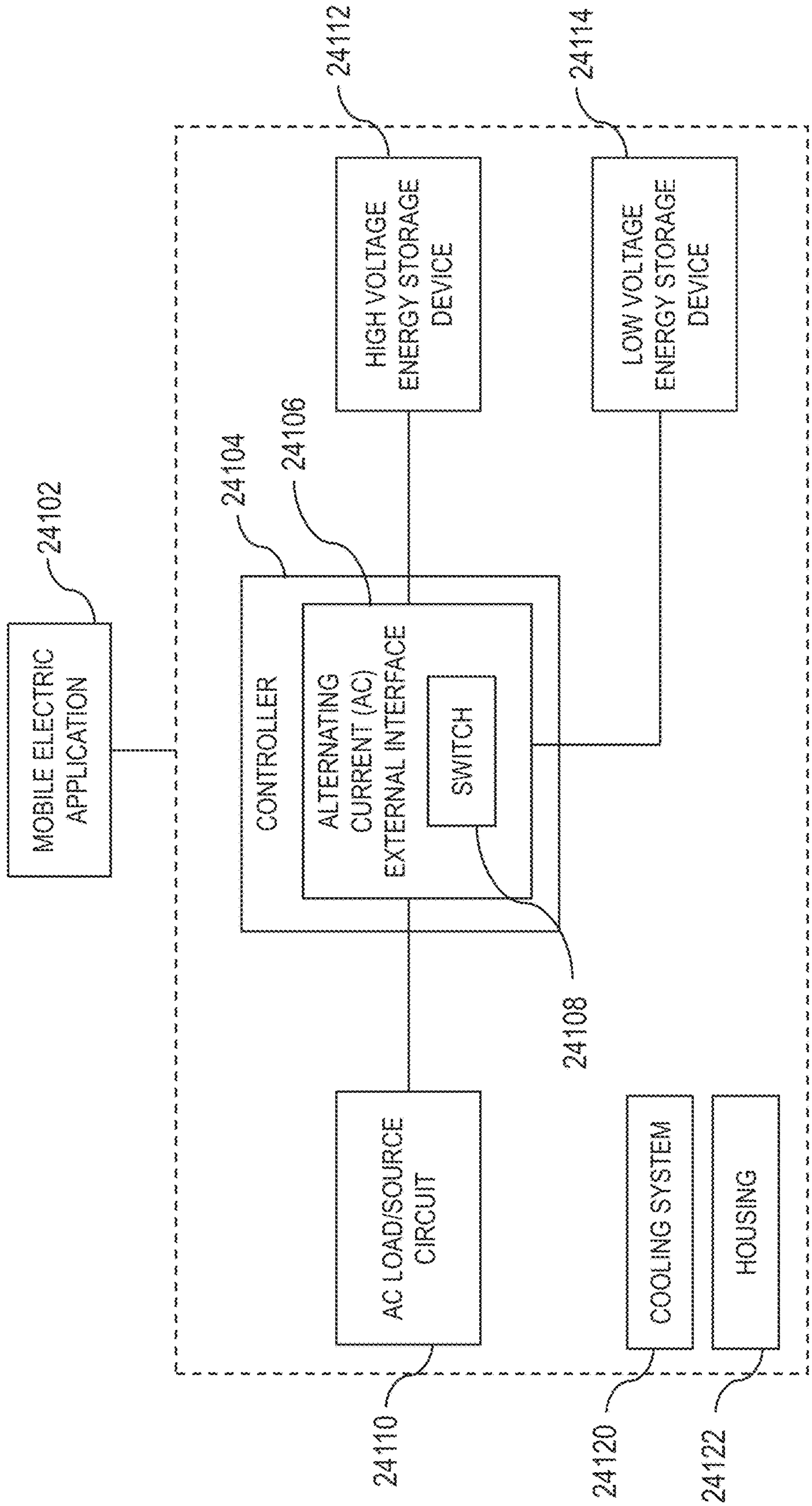

FIG. 241 depicts an embodiment example system for power distribution includes a mobile electric application.

Figure 242:
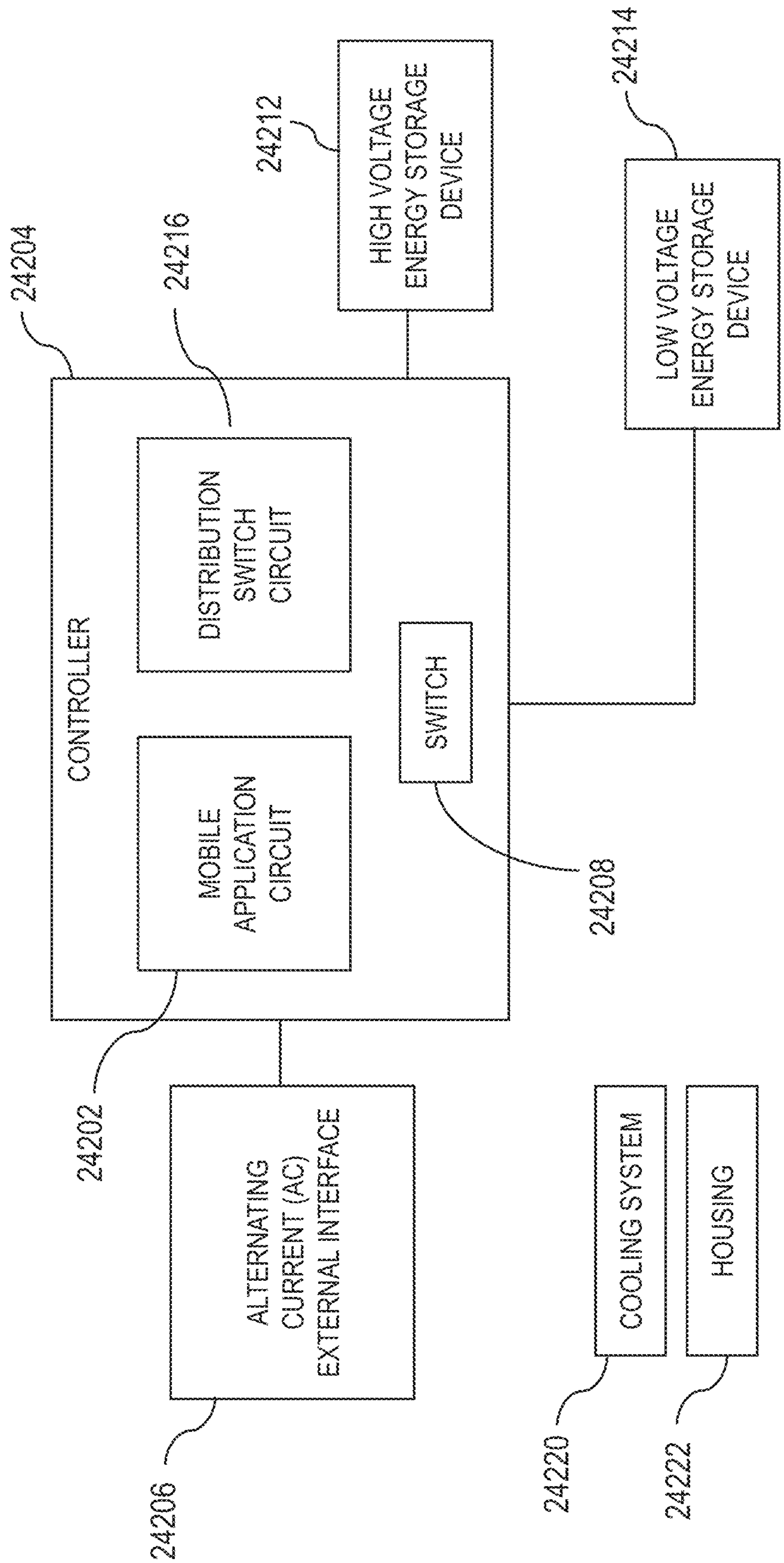

FIG. 242 depicts an embodiment example system for controlling power distribution includes a controller in control communication with a mobile application circuit.

Figure 243:
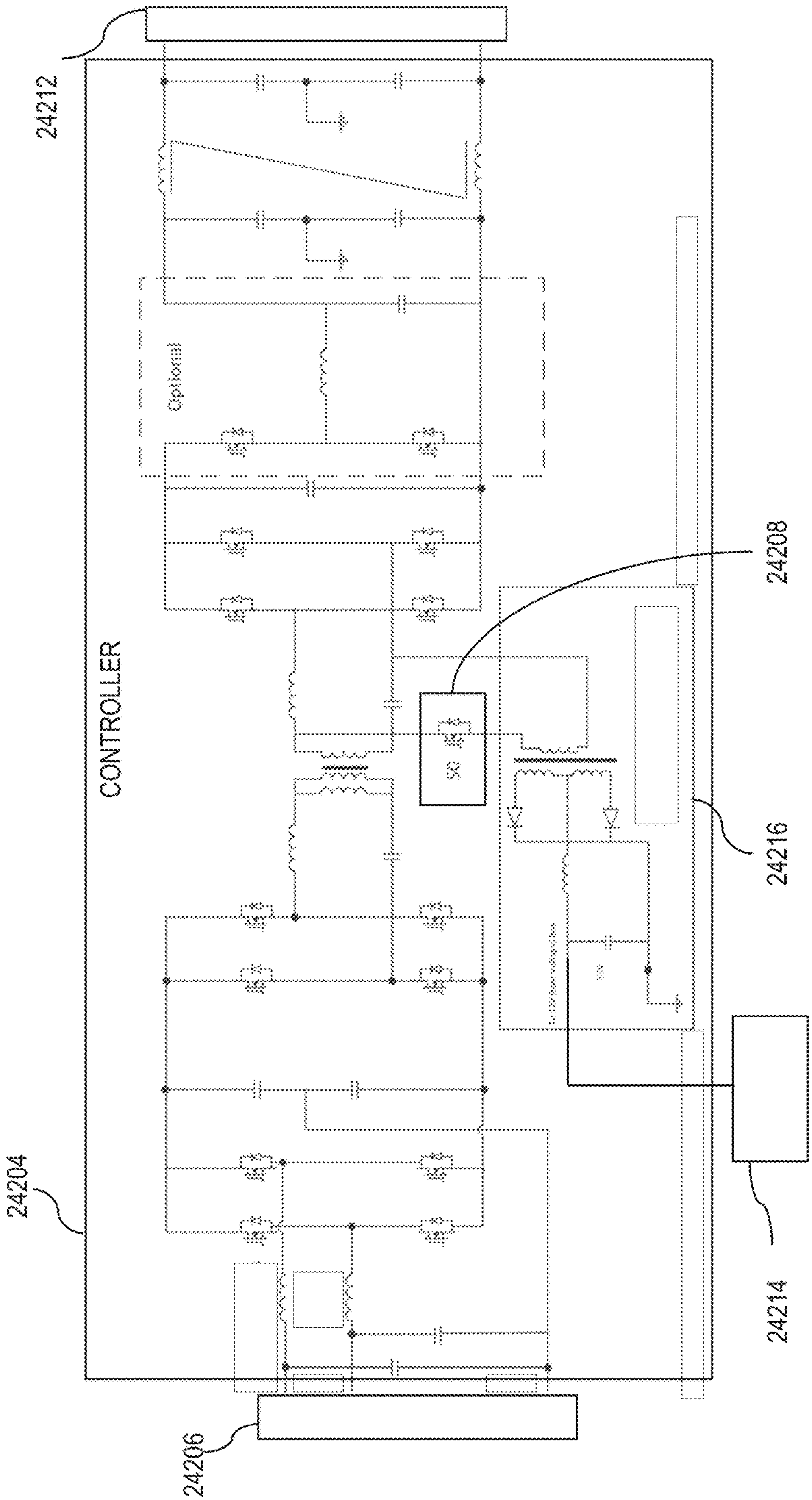

FIG. 243 depicts an embodiment example controller for power distribution in control communication with a mobile application circuit.

Figure 244:
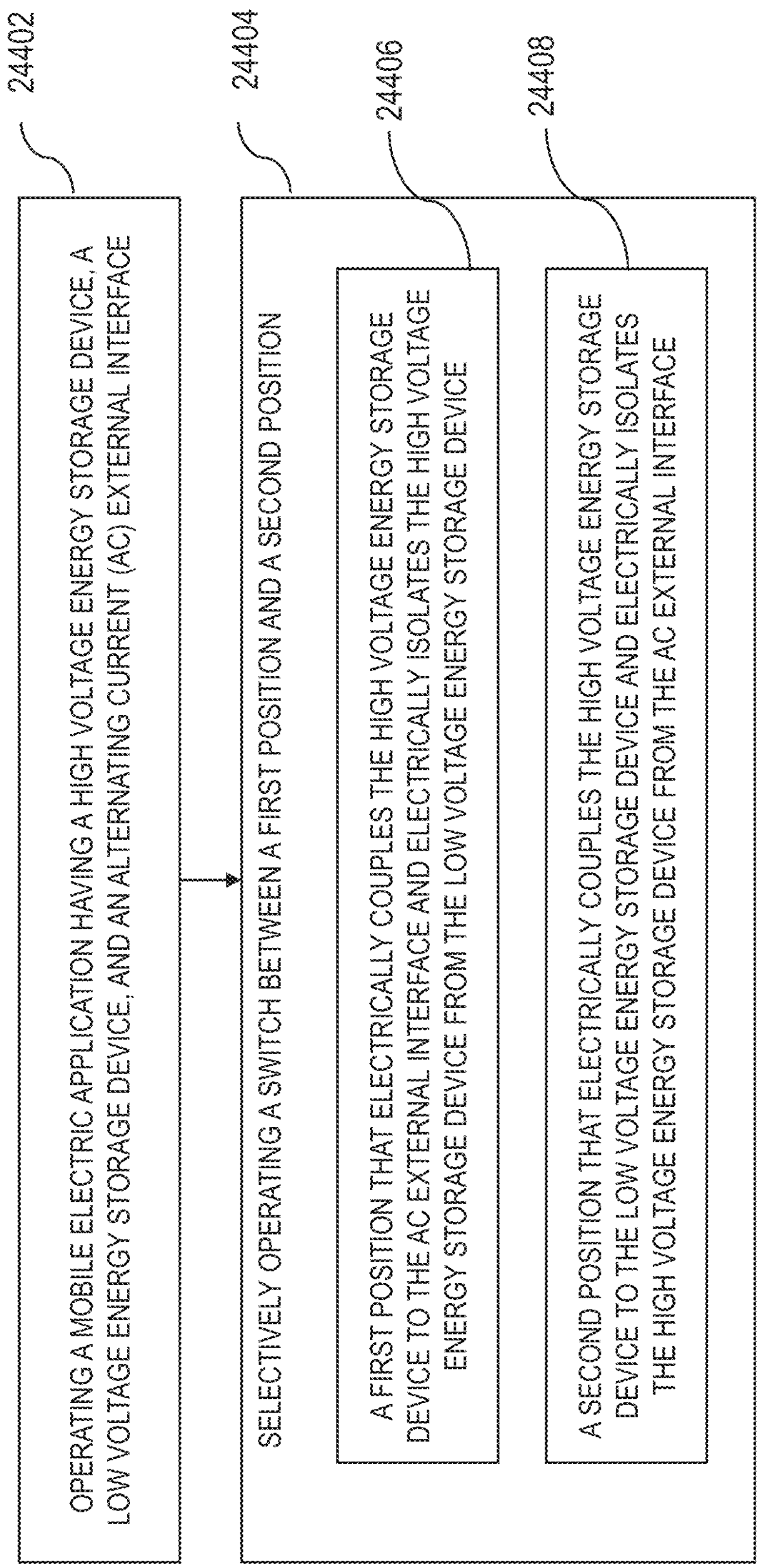

FIG. 244 depicts an embodiment example procedure for controlling the distribution.

Figure 245:
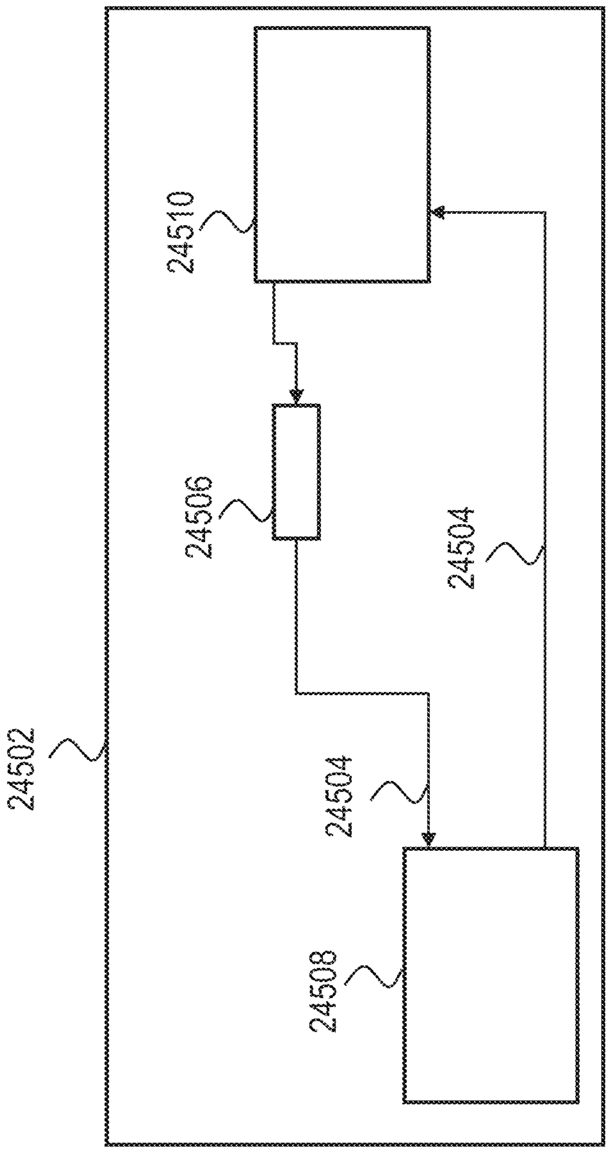

FIG. 245 depicts an embodiment example vehicle including a motive electrical power path and a power distribution unit having a motive current protection circuit.

Figure 246:
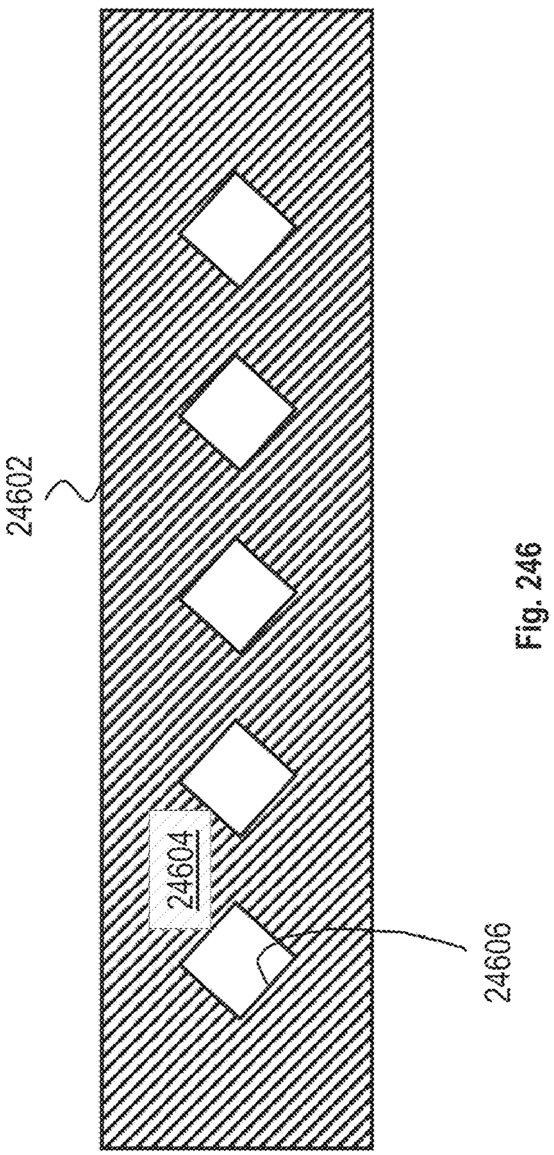

FIG. 246 depicts an embodiment schematic depiction of an element of a fuse.

Figure 247:
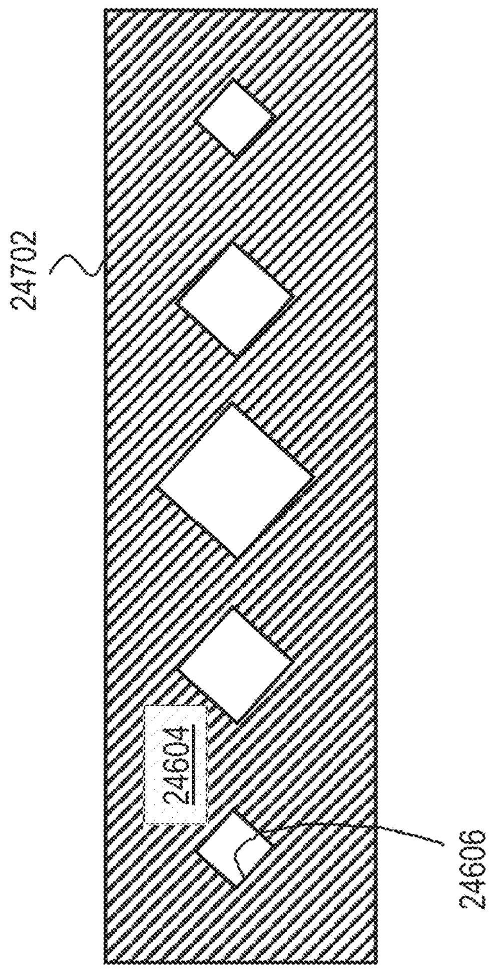

FIG. 247 depicts an embodiment example element of a fuse including a gap progression with increasing gap sizes toward a center position.

Figure 248:
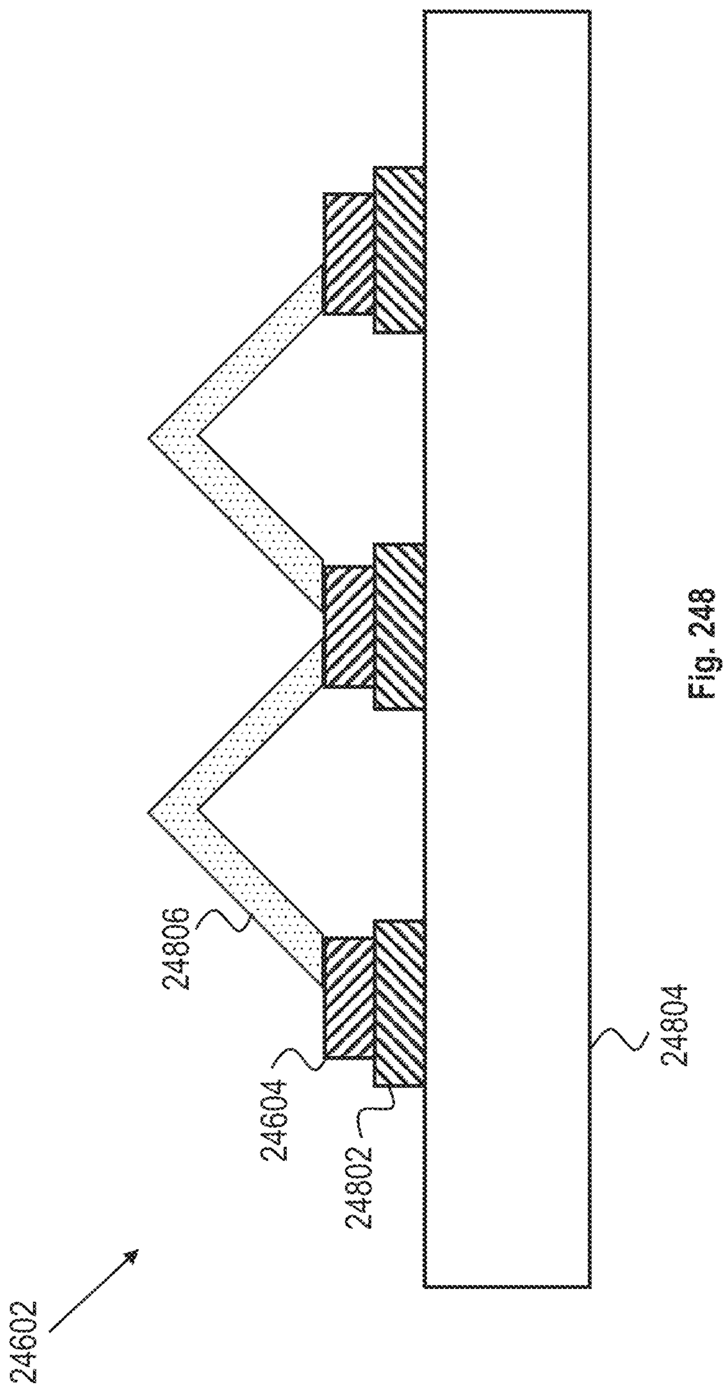

FIG. 248 depicts an embodiment example fuse includes a substrate with a printed glass layer.

Figure 249:
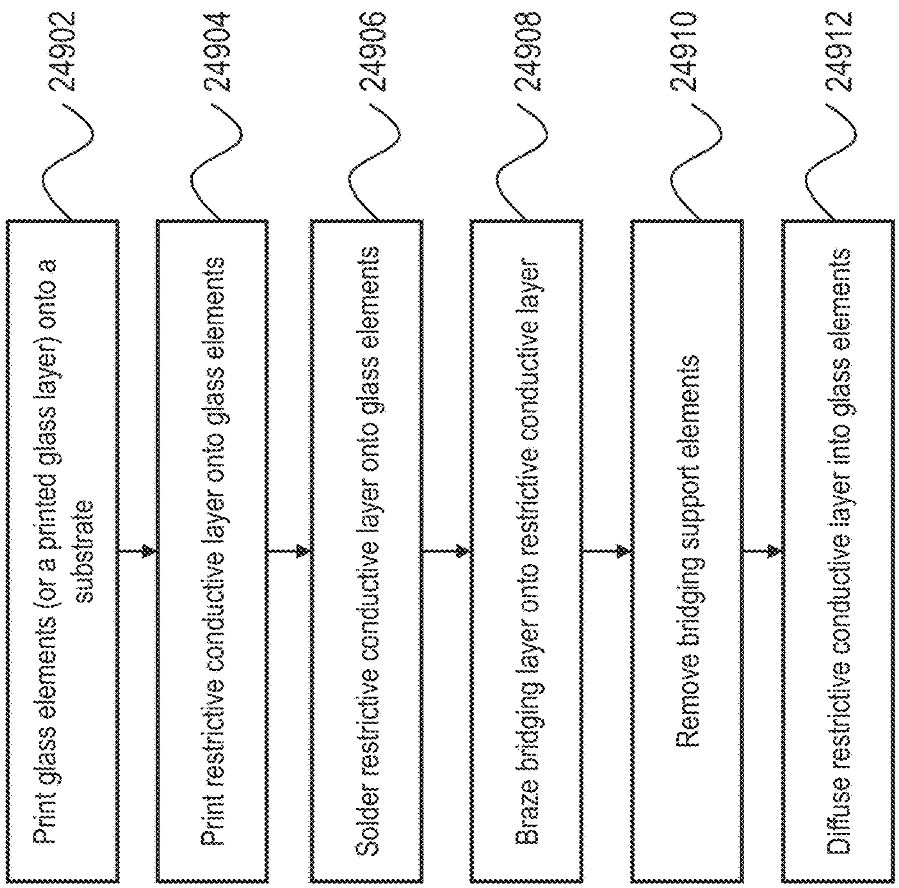

FIG. 249 depicts an embodiment example procedure for preparing a fuse element having a printed restrictive conductive layer.

Figure 250:
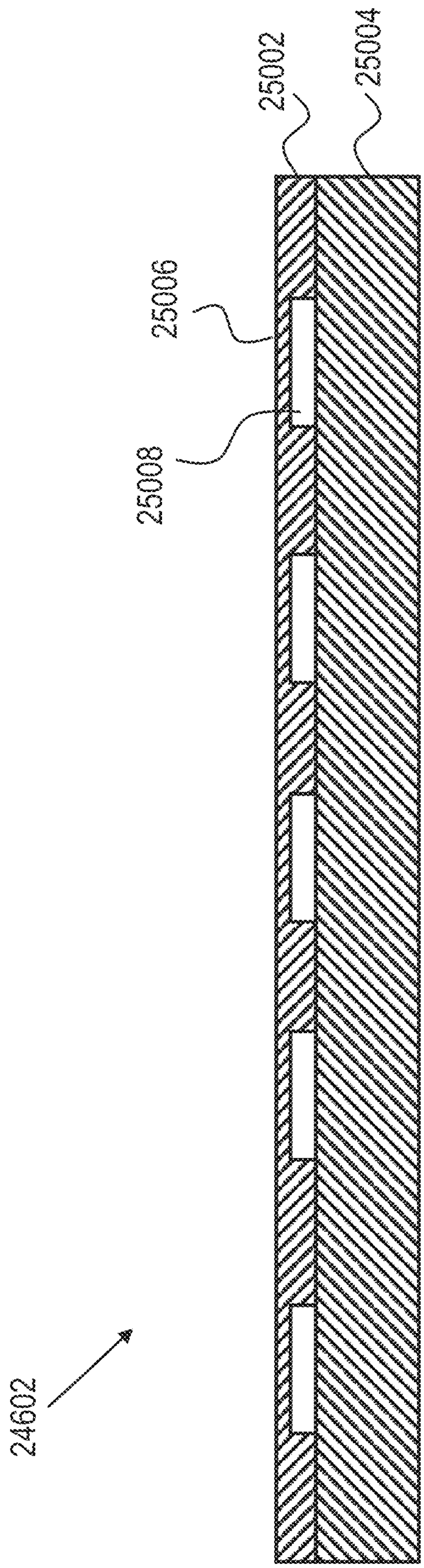

FIG. 250 depicts an embodiment schematic depiction of an element of a fuse having a laminate restrictive conductive layer and a laminate structural layer.

Figure 251:
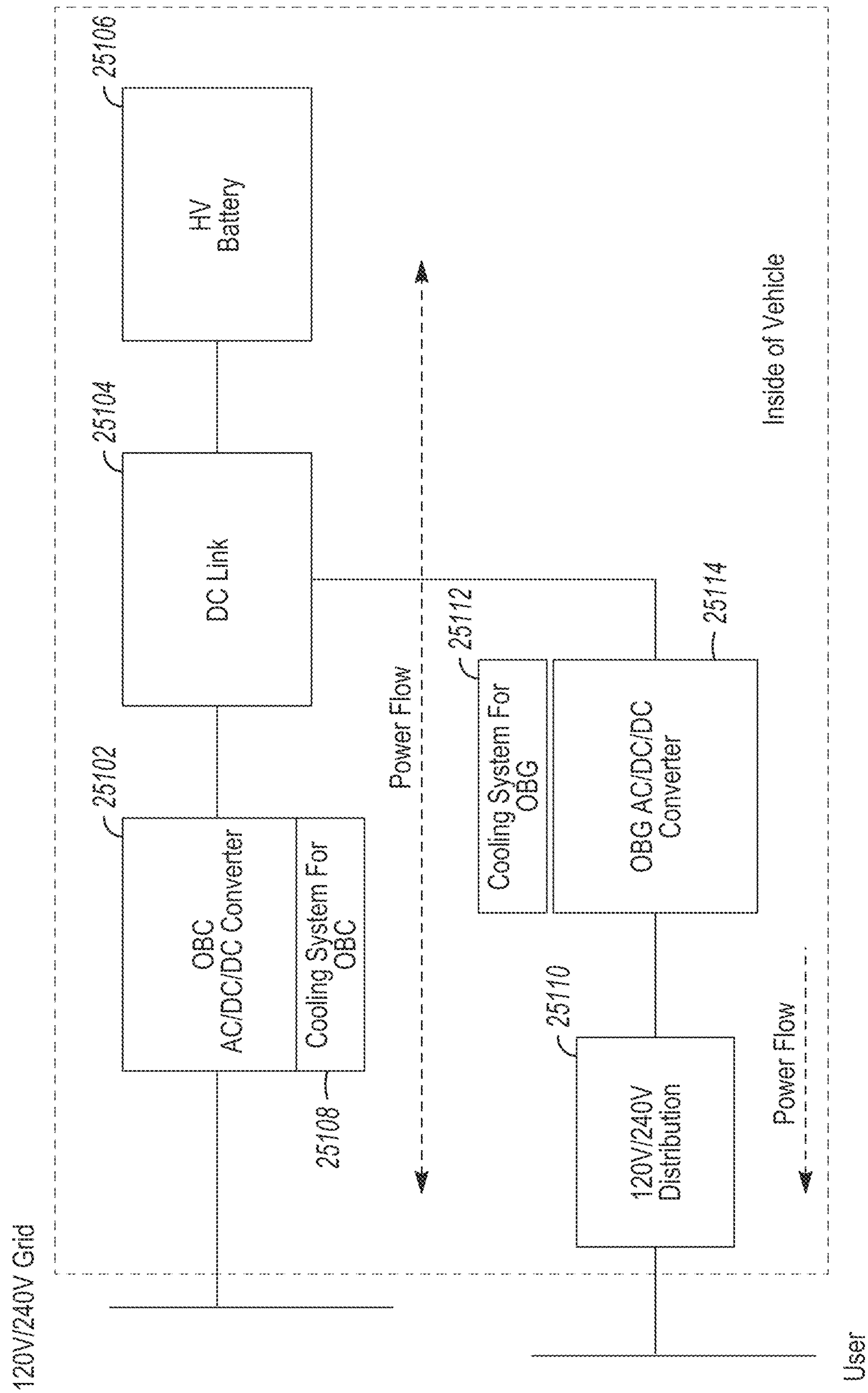

FIG. 251 depicts an embodiment topology for charging and power generation in an electric mobile application.

Figure 252:
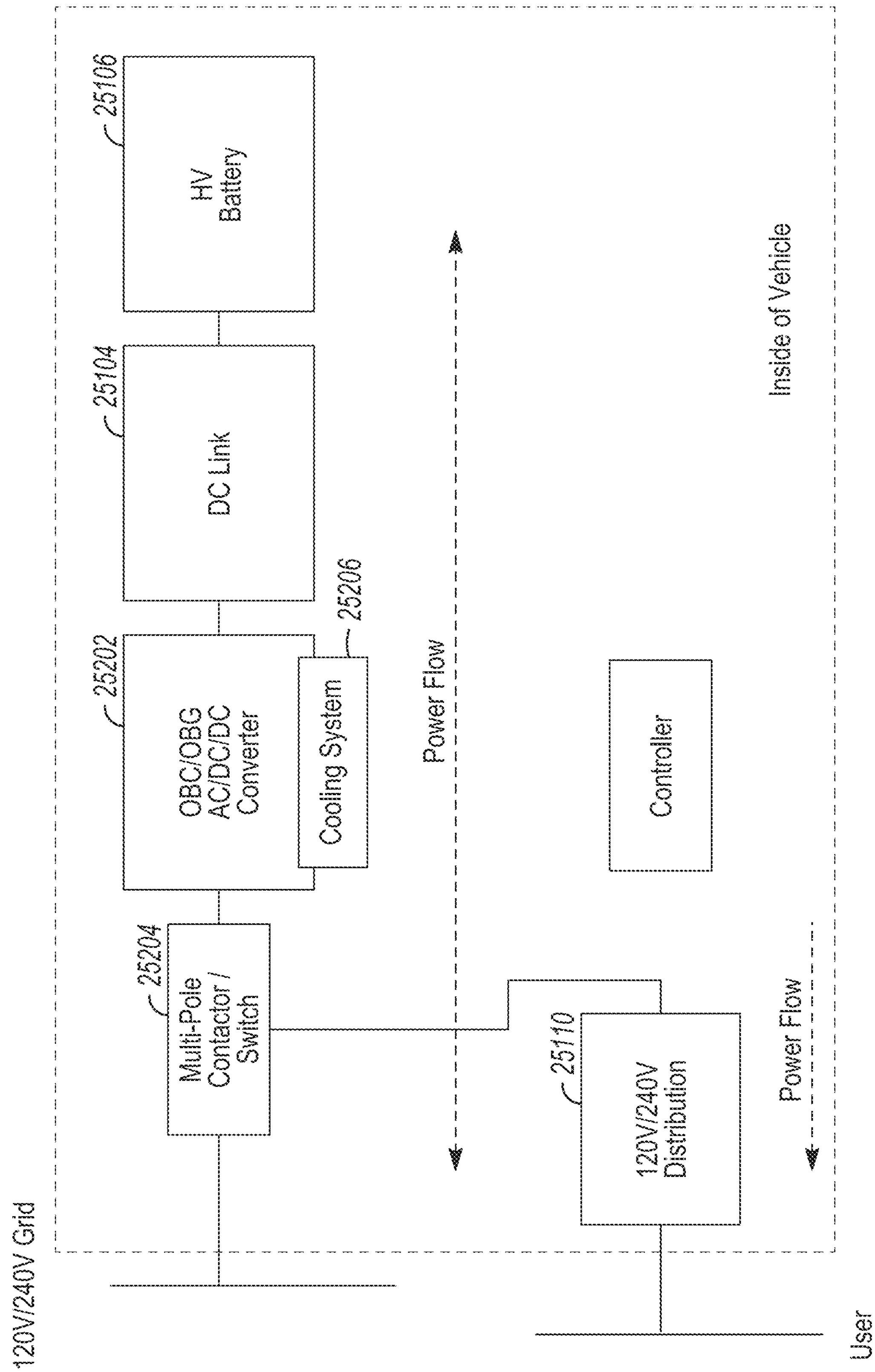

FIG. 252 depicts an alternate embodiment topology for charging and power generation in an electric mobile application.

Figure 253:
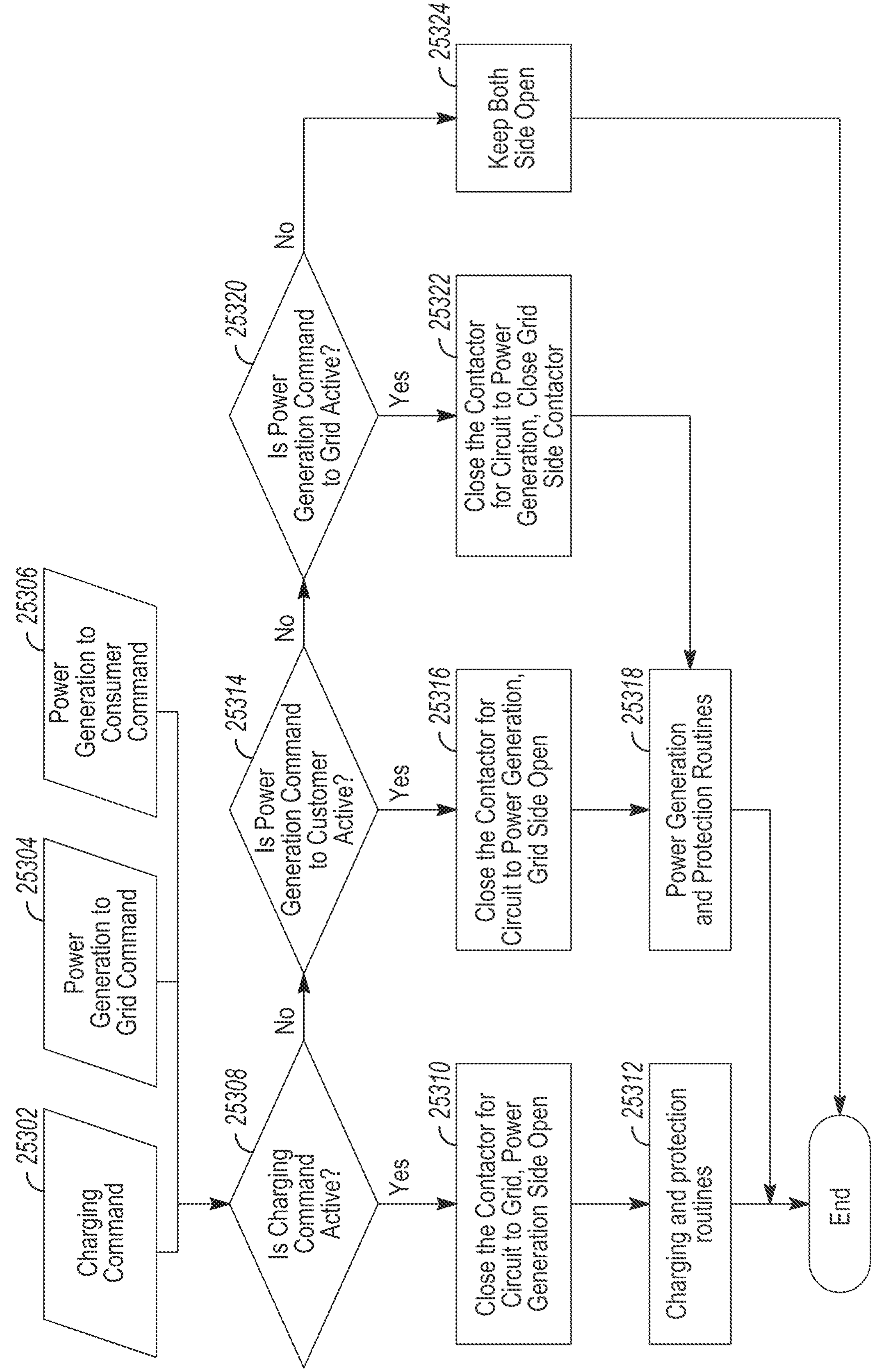

FIG. 253 depicts an embodiment control method for the alternate embodiment topology.

Figure 254:
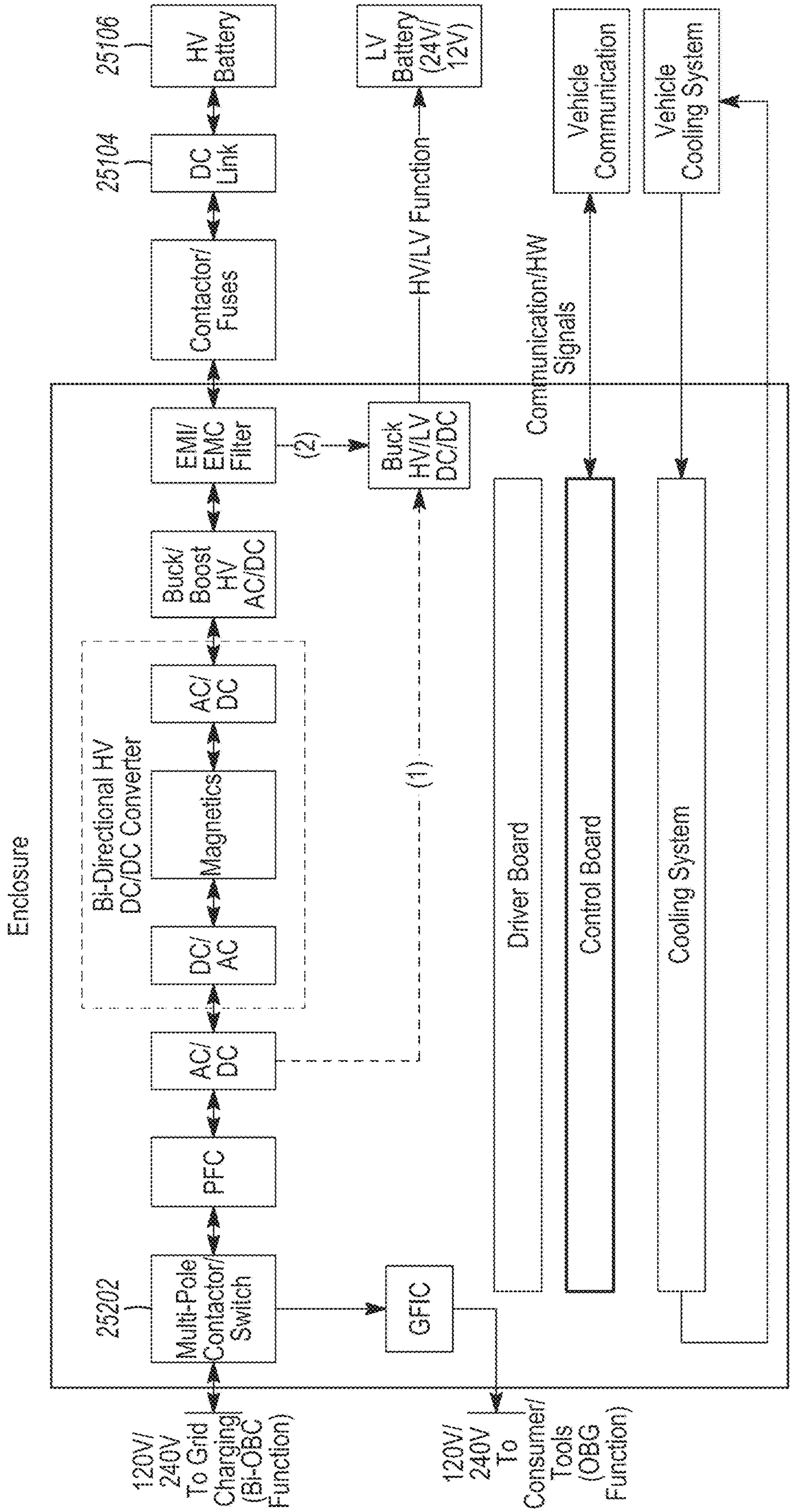

FIG. 254 depicts an embodiment functional block diagram for the alternate embodiment topology.

Figure 255:
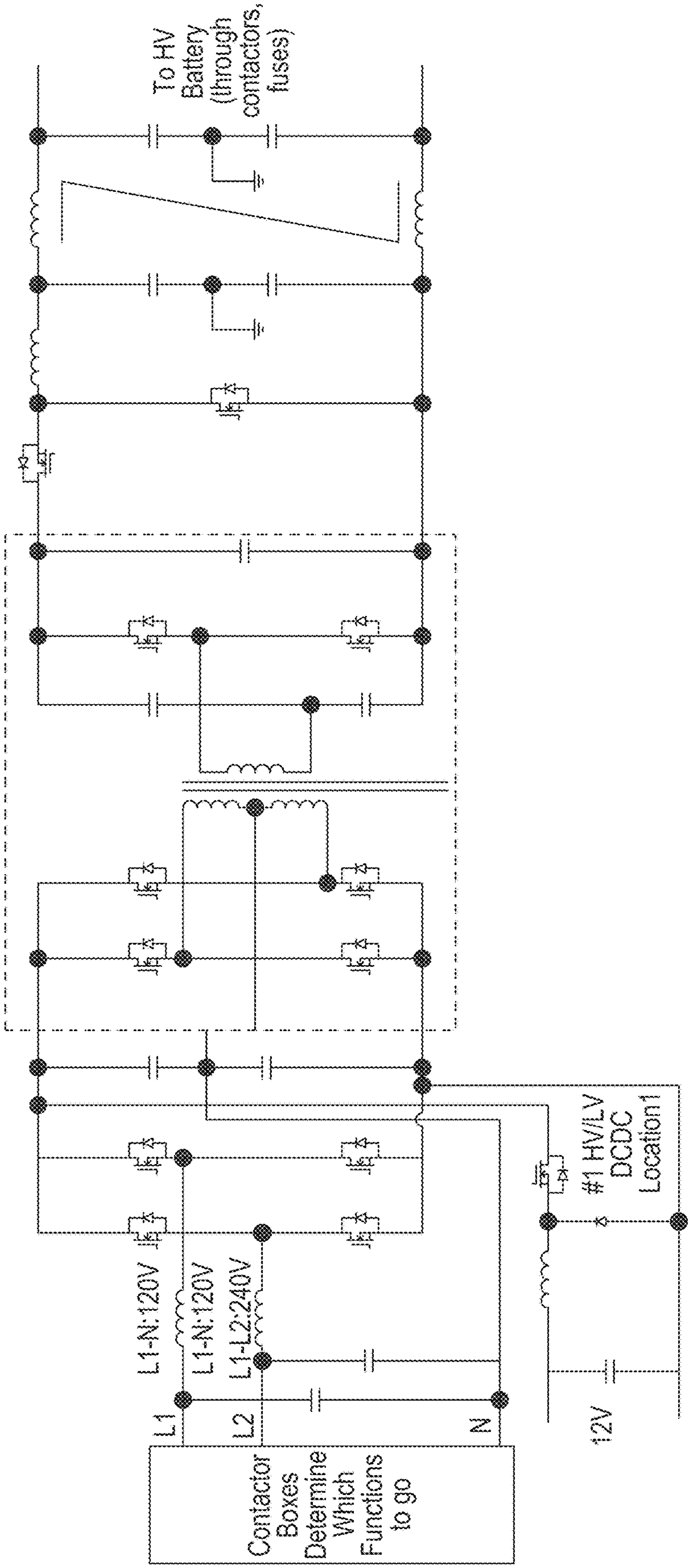

FIG. 255 depicts an embodiment representational schematic diagram for the alternate embodiment topology.

Figure 256:
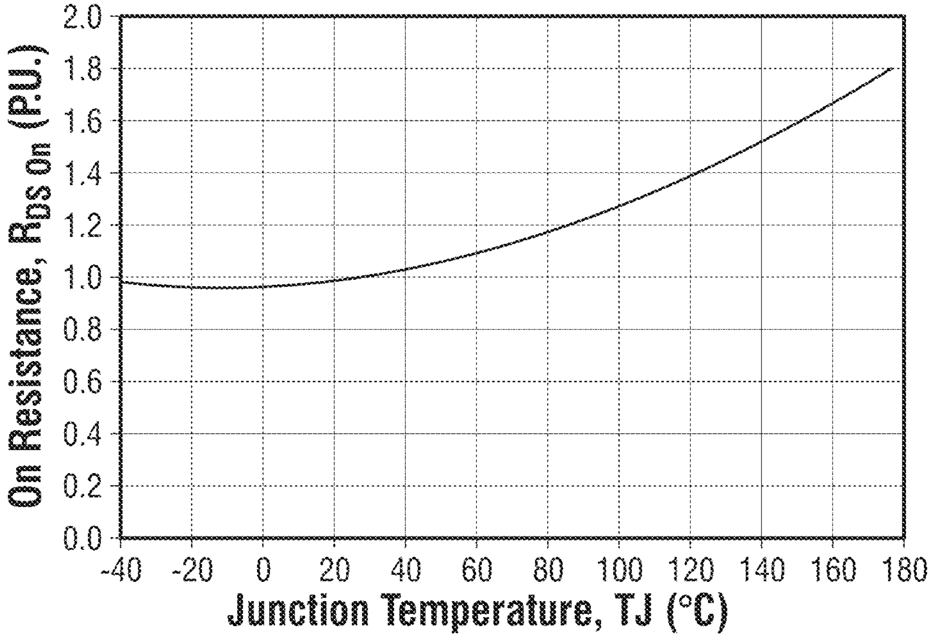

FIG. 256 depicts a typical normalized on-resistance vs. temperature curve for a switching device.

Figure 257:
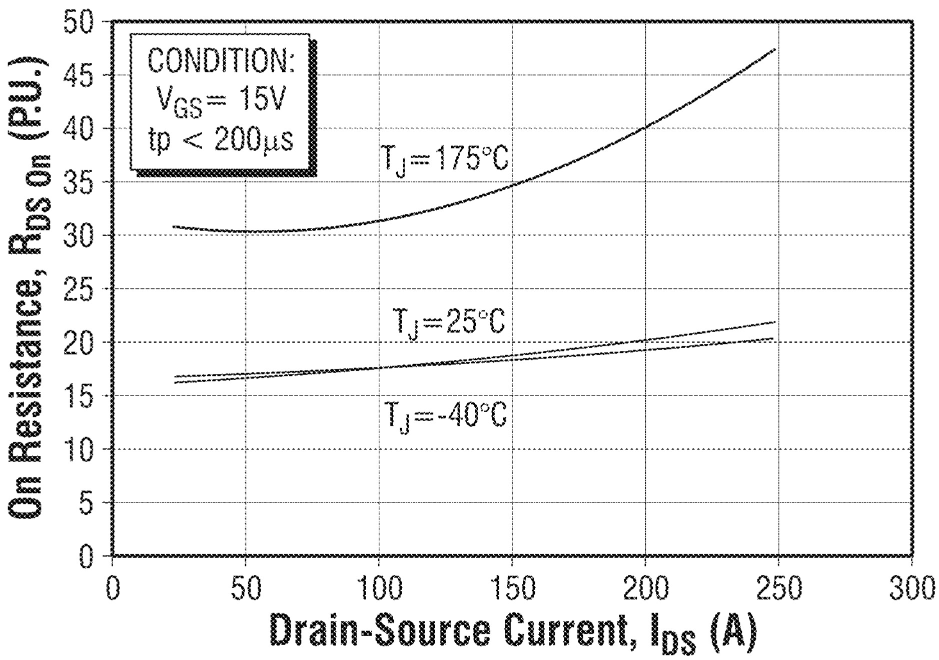

FIG. 257 depicts a typical on-resistance vs. drain current for various temperatures for a switching device.

Figure 258:
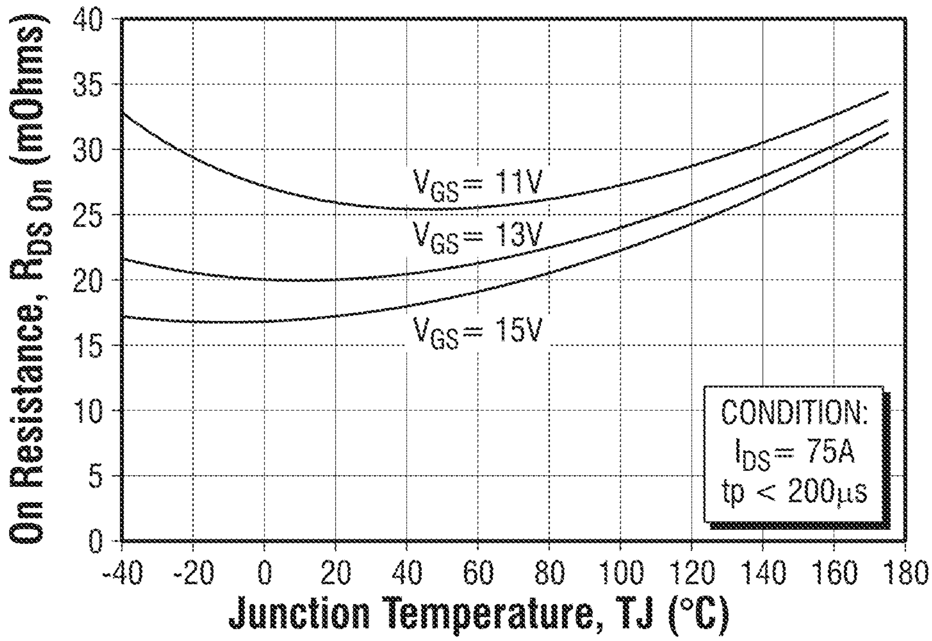

FIG. 258 depicts a typical on-resistance vs. temperature for various gate voltages for a switching device.

Figure 259:
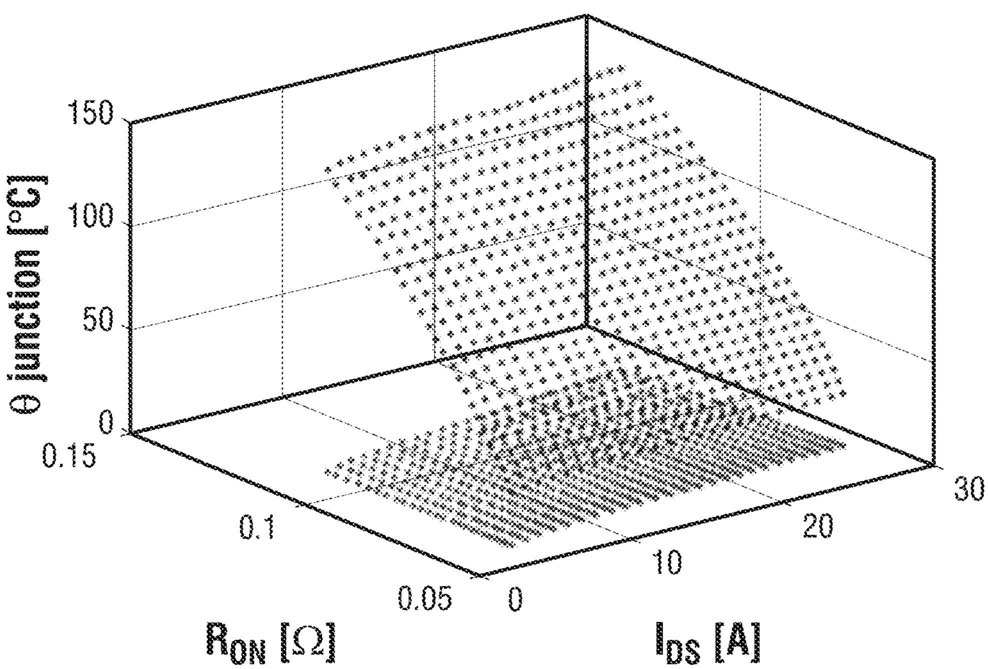

FIG. 259 depicts a derived relationship for temperature vs. drain current vs. on-resistance for a switching device.

Figure 260:
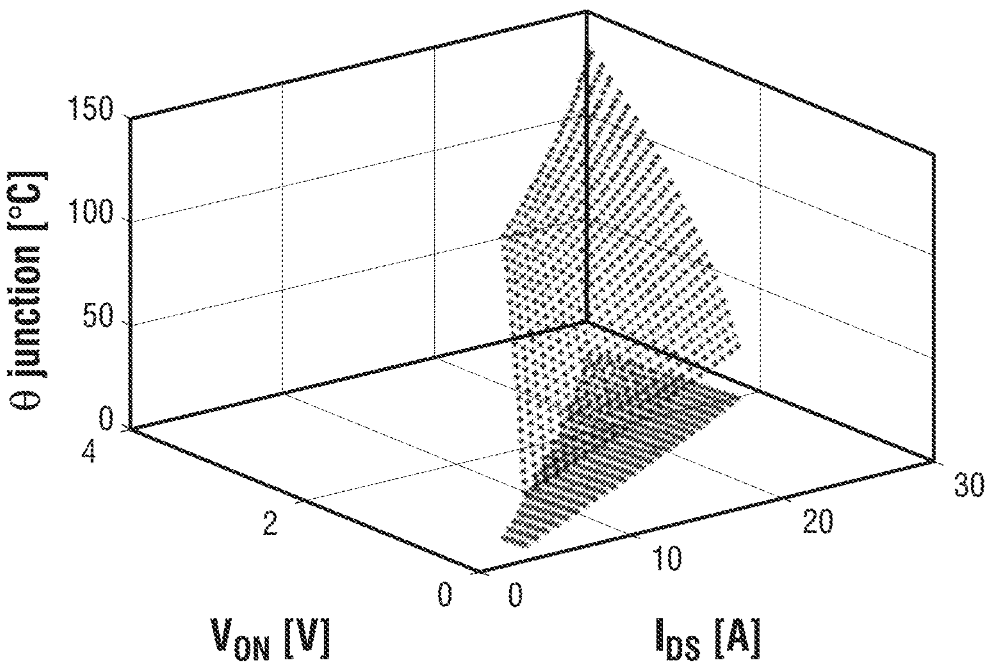

FIG. 260 depicts a derived relationship for temperature vs. drain current vs. on-voltage for a switching device.

Figure 261:
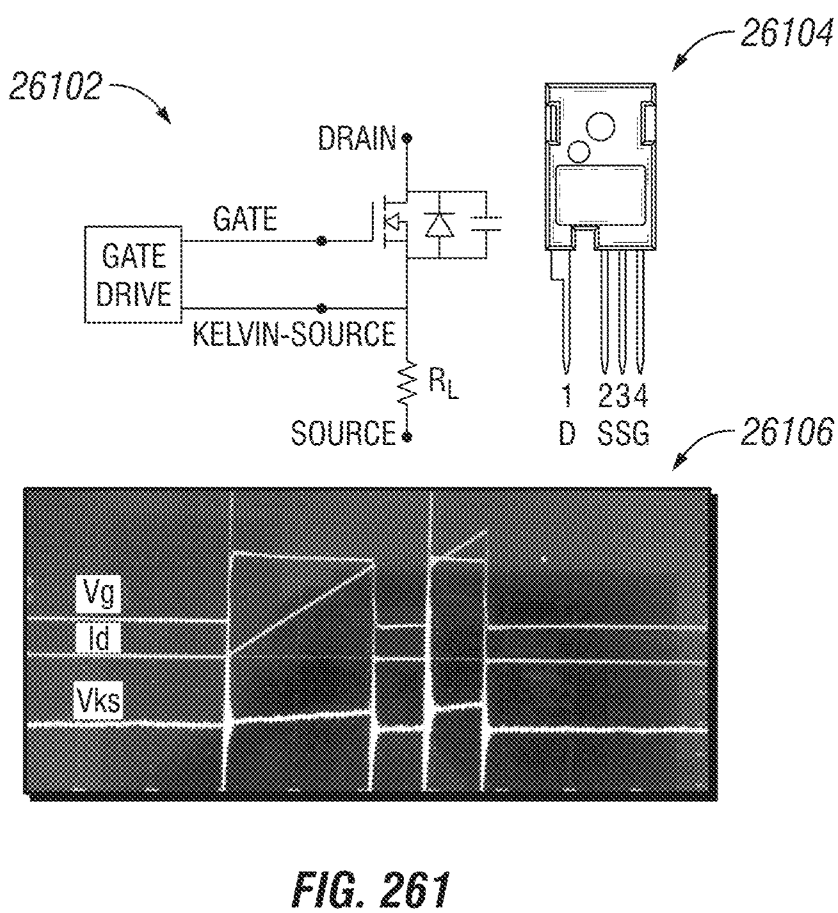

FIG. 261 depicts an embodiment testing configuration, packaging, and resulting waveform for detecting junction temperature by Kelvin-source.

Figure 262:
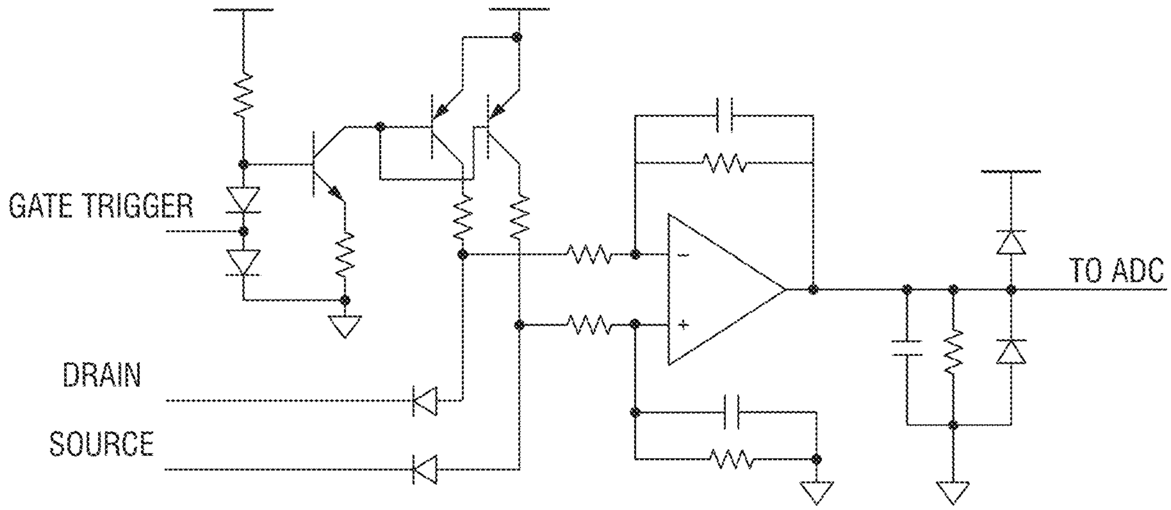

FIG. 262 depicts an embodiment circuit configuration for measuring drain voltage.

Figure 263:
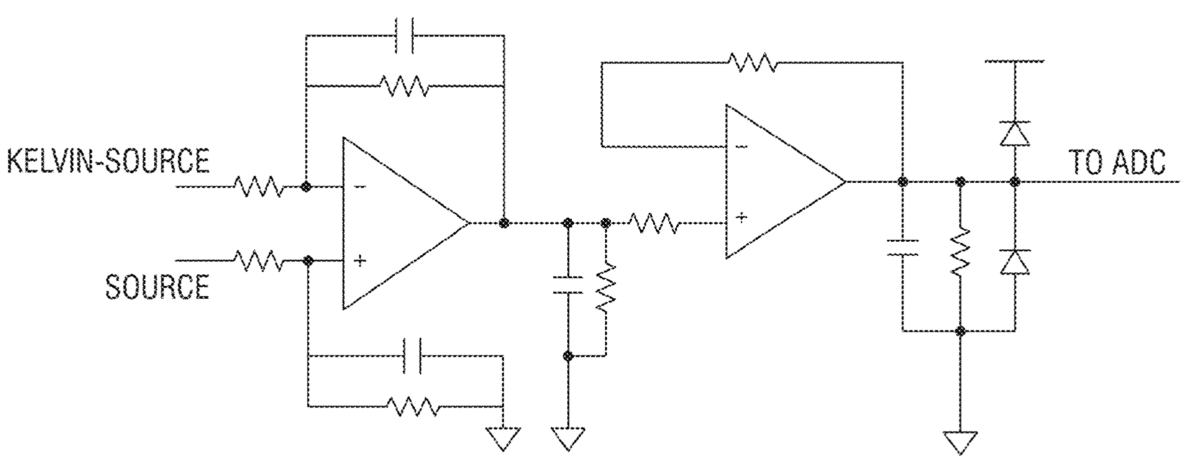

FIG. 263 depicts an embodiment circuit configuration for measuring Kelvin source voltage.

Figure 264A:
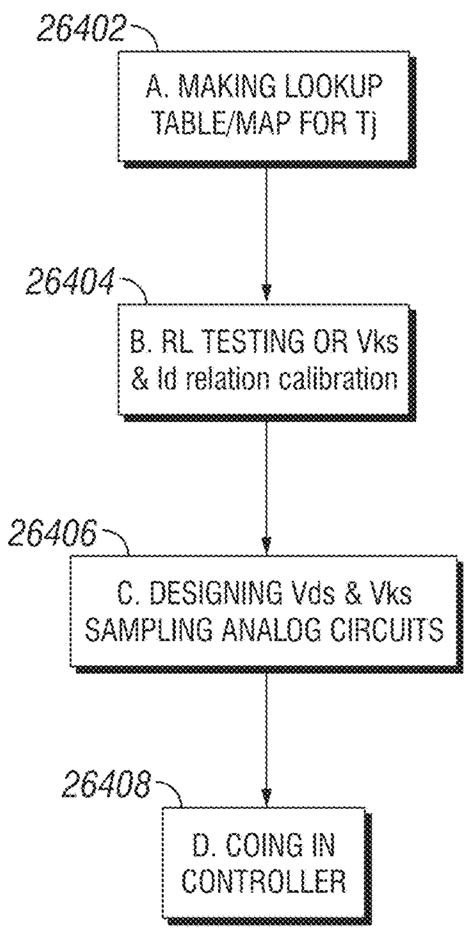
Figure 264B:
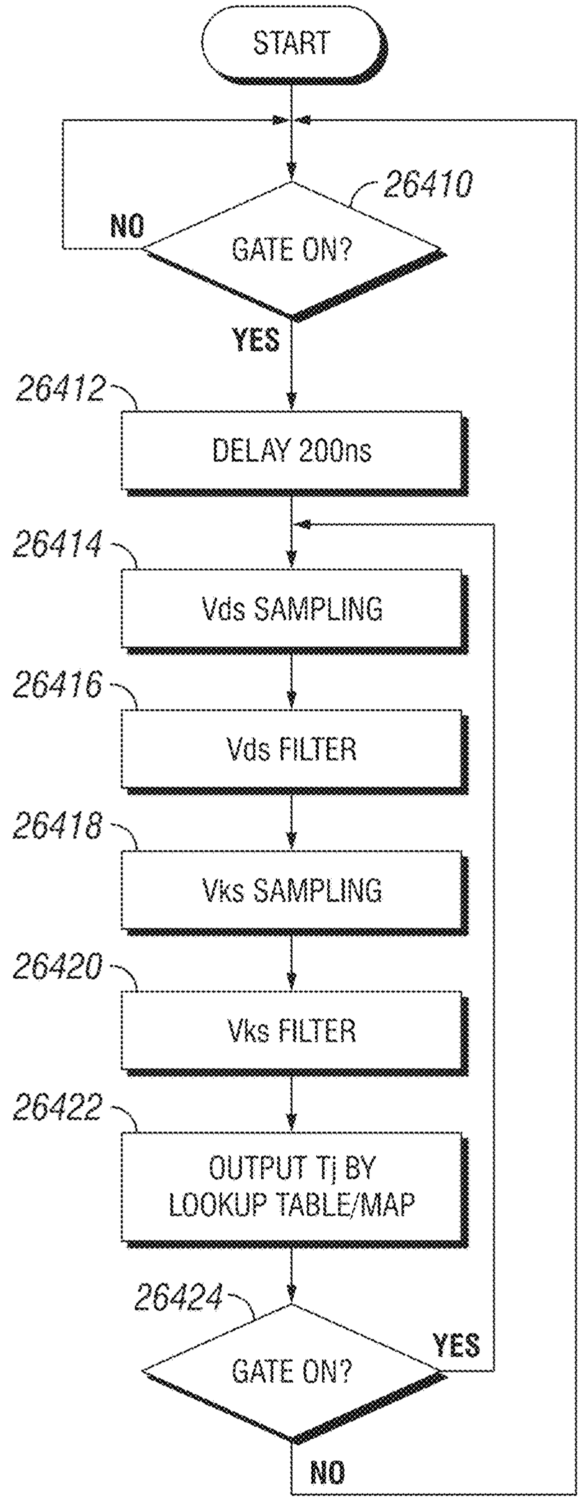

FIGS. 264A-B depict an embodiment process flow diagrams for junction temperature detection based on Kelvin-source.

Figure 265:
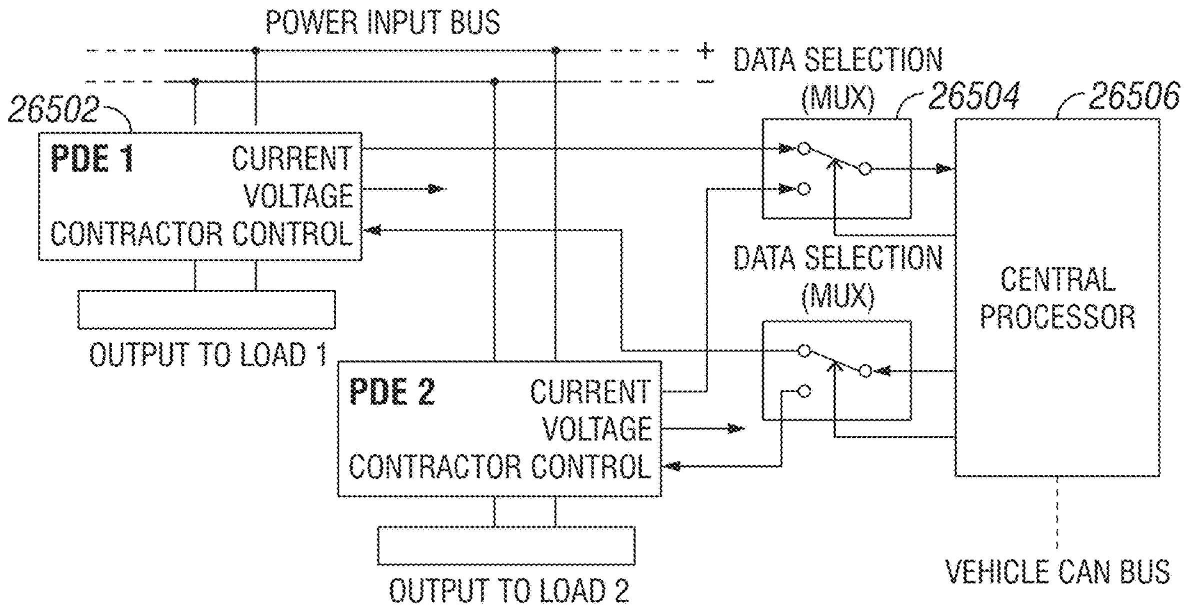

FIG. 265 depicts an embodiment junction box architecture.

Figure 266:
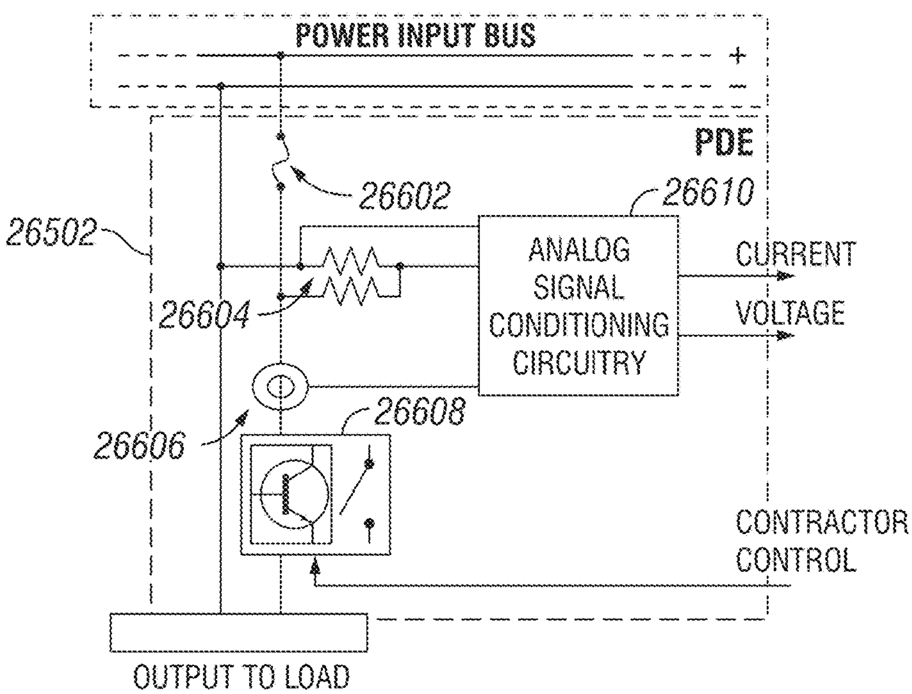

FIG. 266 depicts an embodiment of a one PDE controller configuration.

Figure 267:
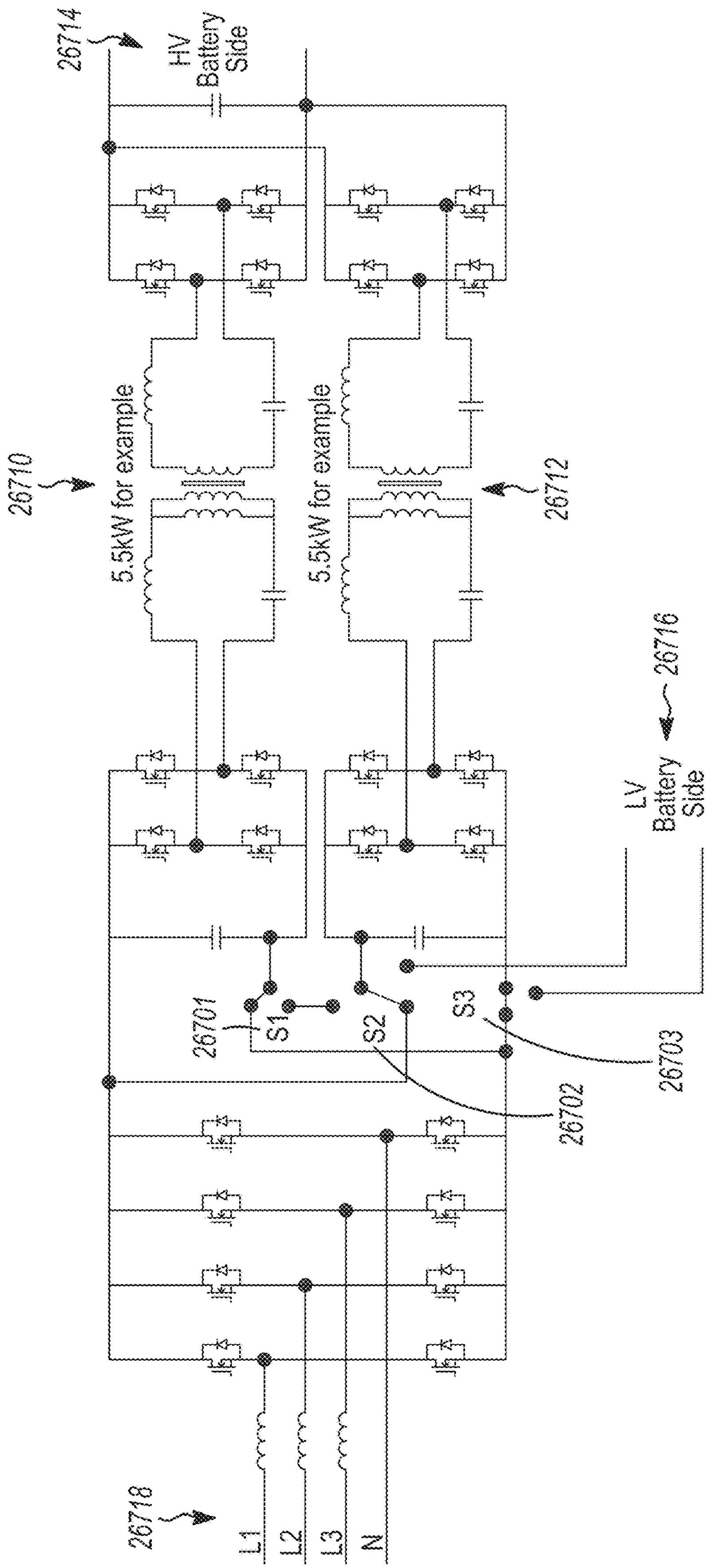

FIG. 267 depicts an embodiment combined bi-directional on-board charger and bi-directional DC-to-DC converter control topology in a first mode for charging the high voltage battery from AC side of the circuit.

Figure 268:
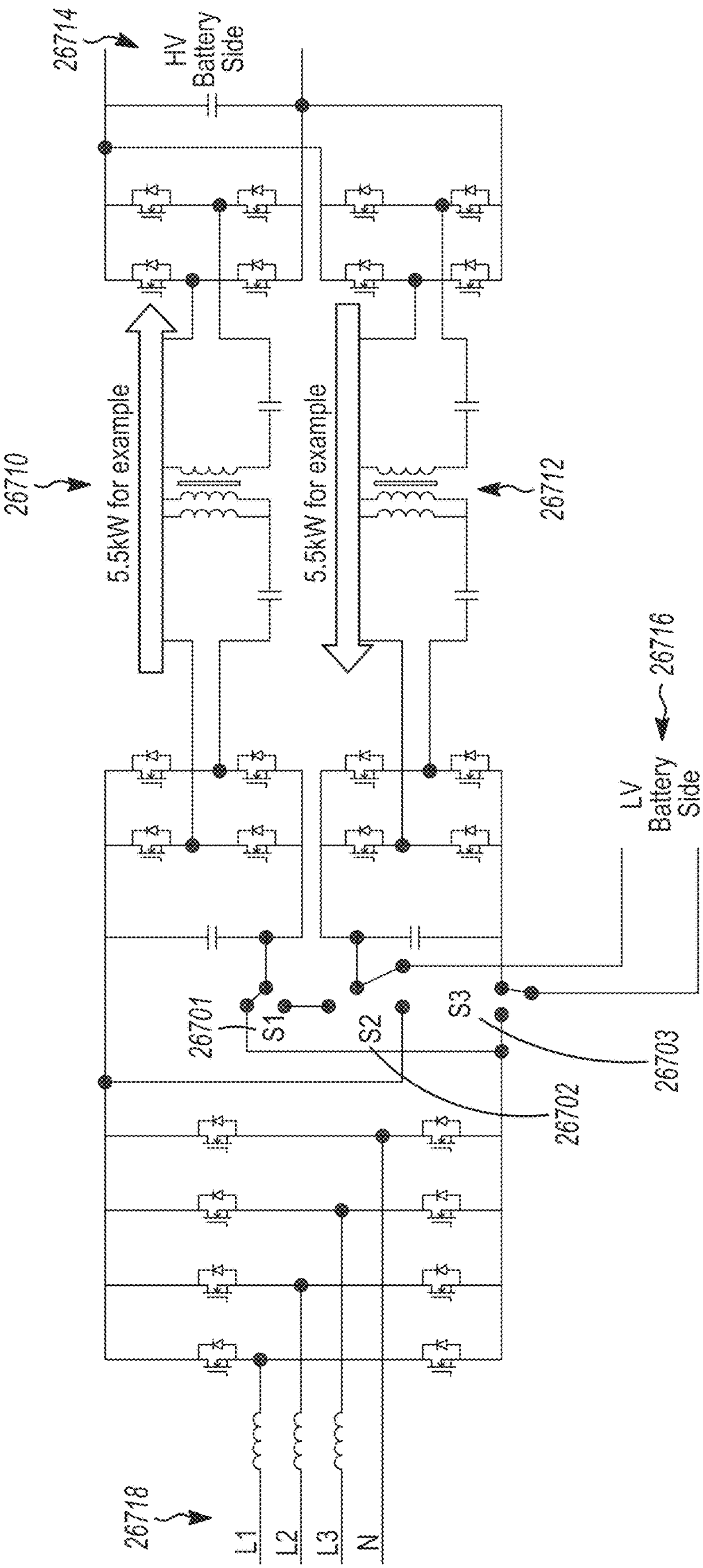

FIG. 268 depicts an embodiment combined bi-directional on-board charger and bi-directional DC-to-DC converter control topology in a second mode for simultaneously charging the high voltage battery from the AC side of the circuit and the high voltage battery supplying power to the DC-to-DC converter and connected low voltage loads, such as when the low voltage battery is in a low state of charge.

Figure 269:
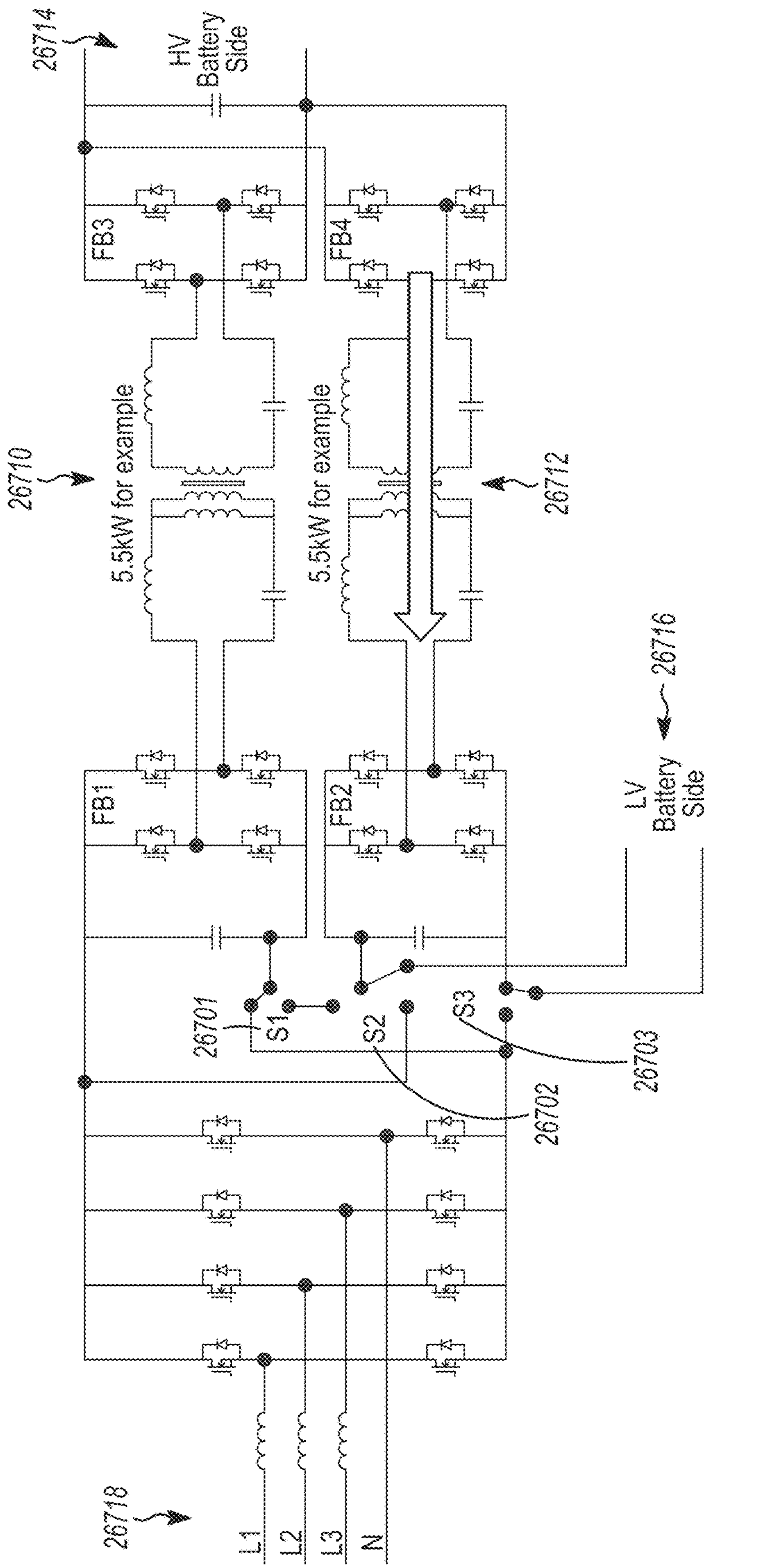

FIG. 269 depicts an embodiment combined bi-directional on-board charger and bi-directional DC-to-DC converter control topology in a third mode for driving an electric vehicle where the high voltage battery supplies power to the DC-to-DC converter and connected low voltage loads.

Figure 270:
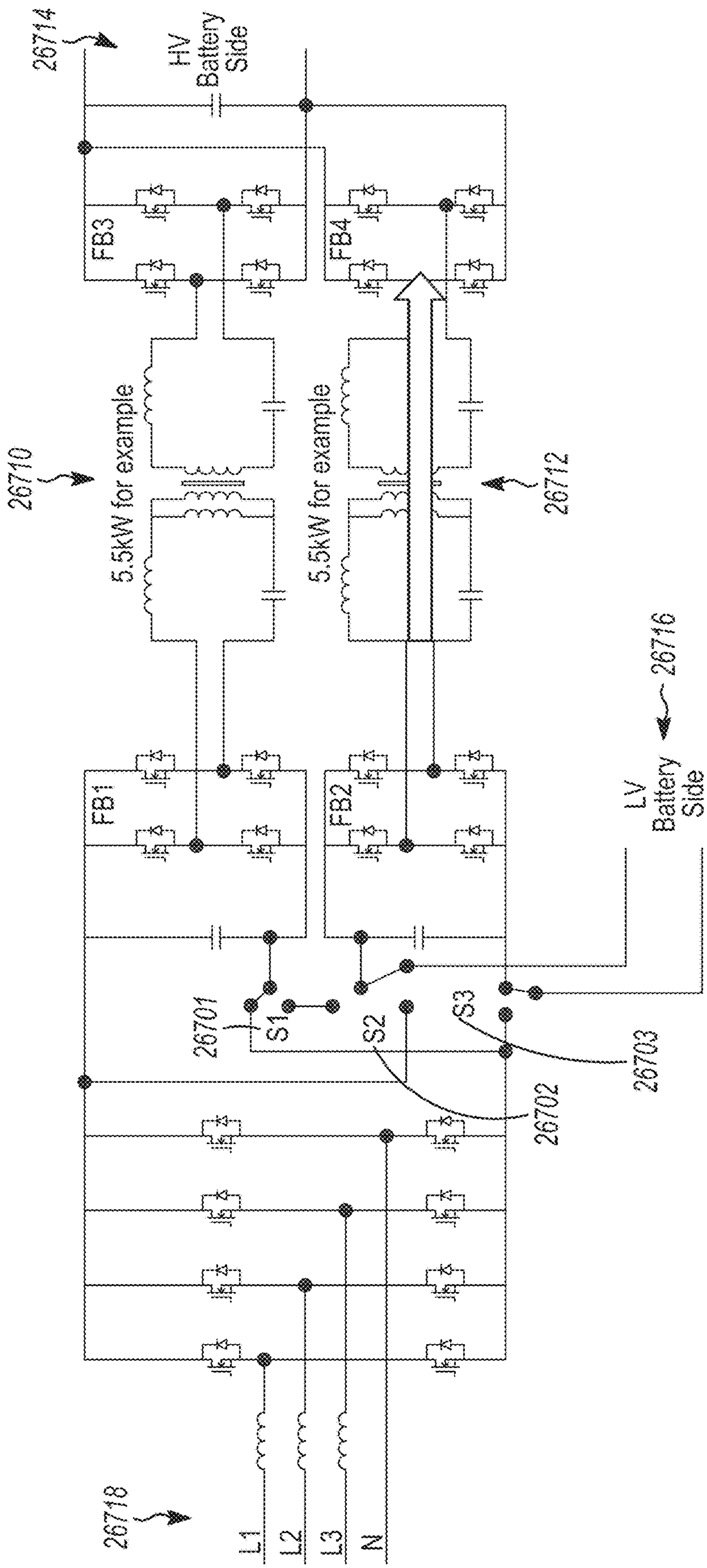

FIG. 270 depicts an embodiment combined bi-directional on-board charger and bi-directional DC-to-DC converter control topology in a forth mode for the low voltage battery supplies power to the high voltage battery such as in a pre-charge configuration.

Figure 271:
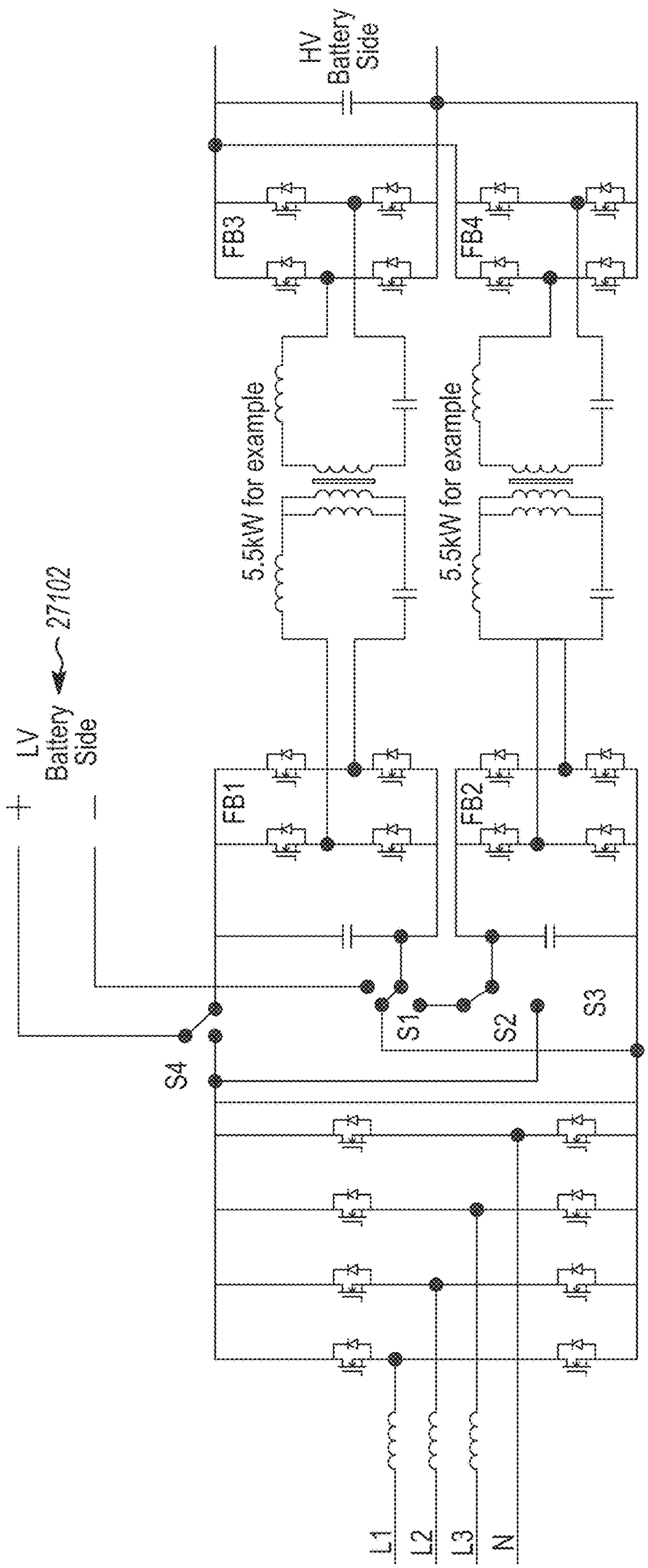

FIG. 271 depicts an embodiment combined bi-directional on-board charger and bi-directional DC-to-DC converter control topology in a first alternate configuration with the DC-to-DC converter connections on the top portion of the circuit.

Figure 272:
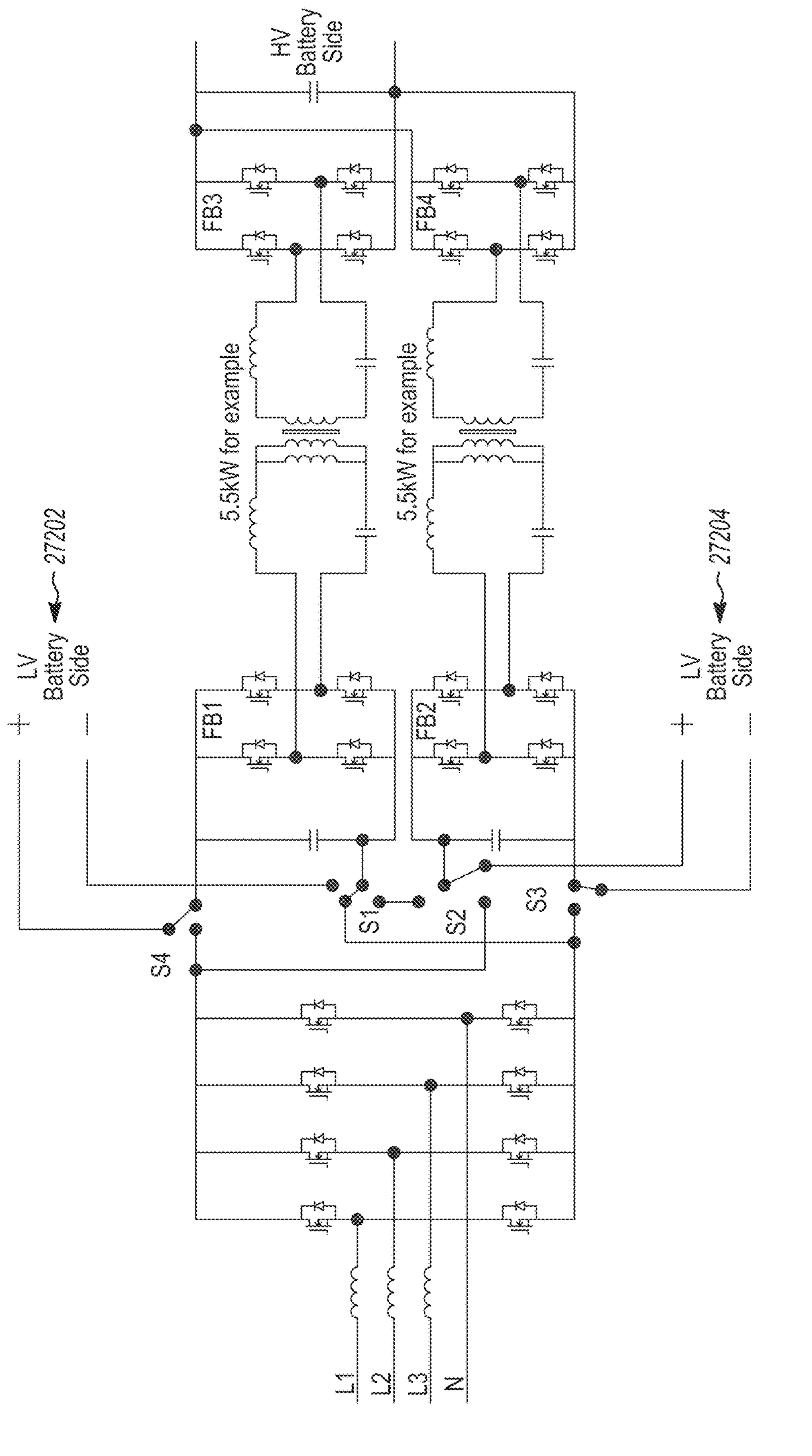

FIG. 272 depicts an embodiment combined bi-directional on-board charger and bi-directional DC-to-DC converter control topology in a second alternate configuration with the DC-to-DC converter connections on the both the top and bottom portions of the circuit.

Figure 273:
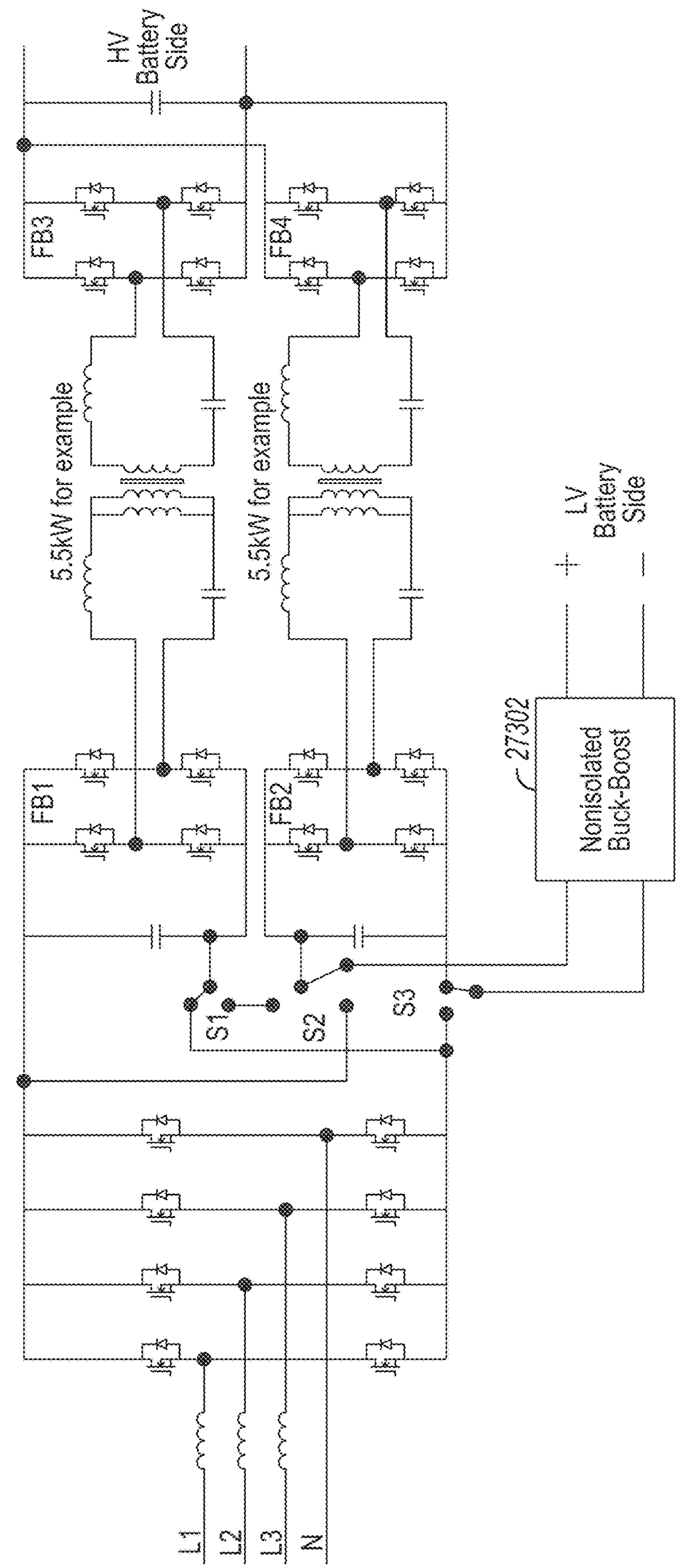

FIG. 273 depicts an embodiment combined bi-directional on-board charger and bi-directional DC-to-DC converter control topology in a third alternate configuration that adds a non-isolated buck-boost converter as the DC-to-DC converter providing low voltage power to low voltage loads.

Figure 274:
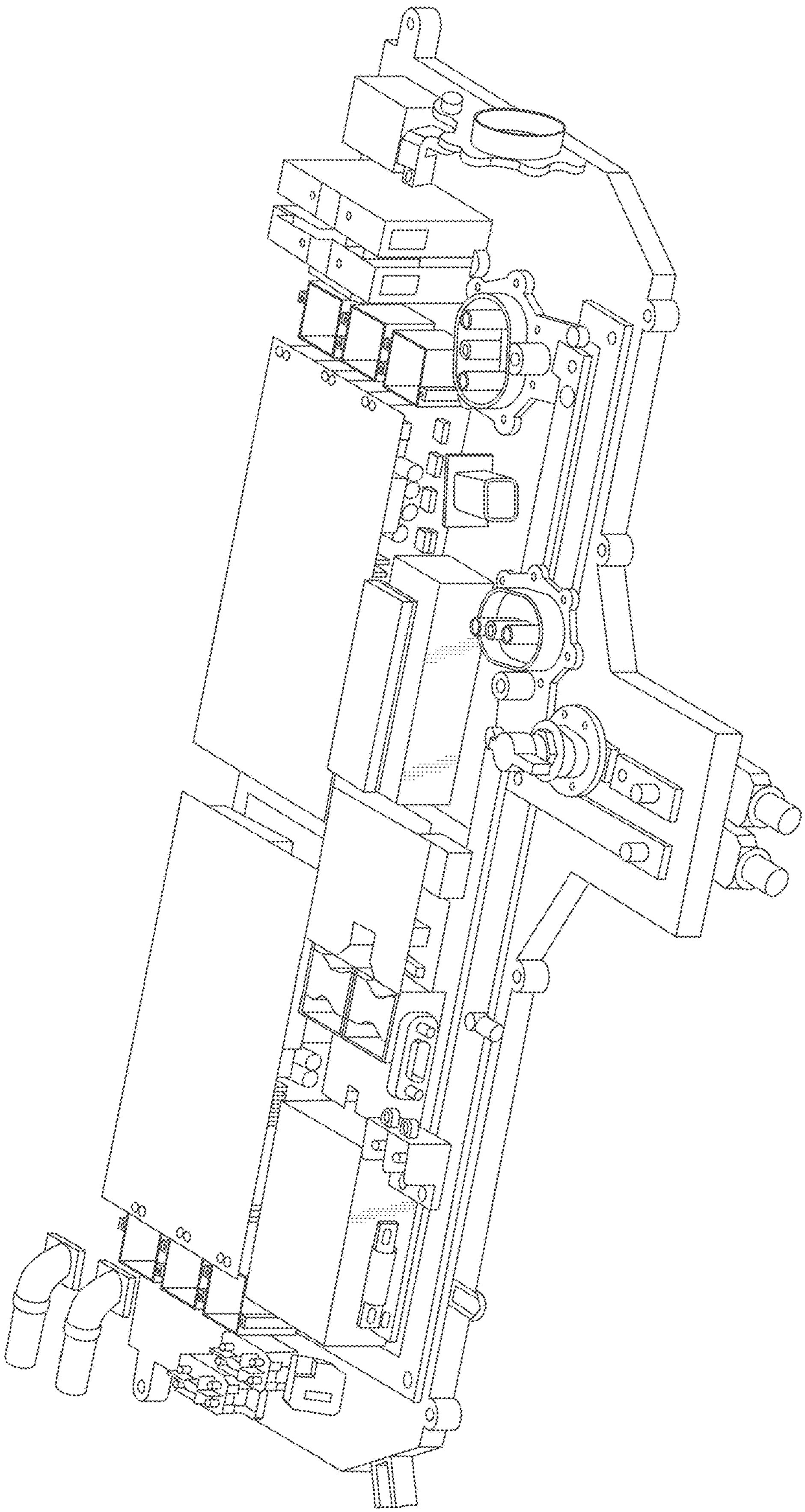

FIG. 274 depicts an embodiment power distribution system isometric view.

Figure 275:
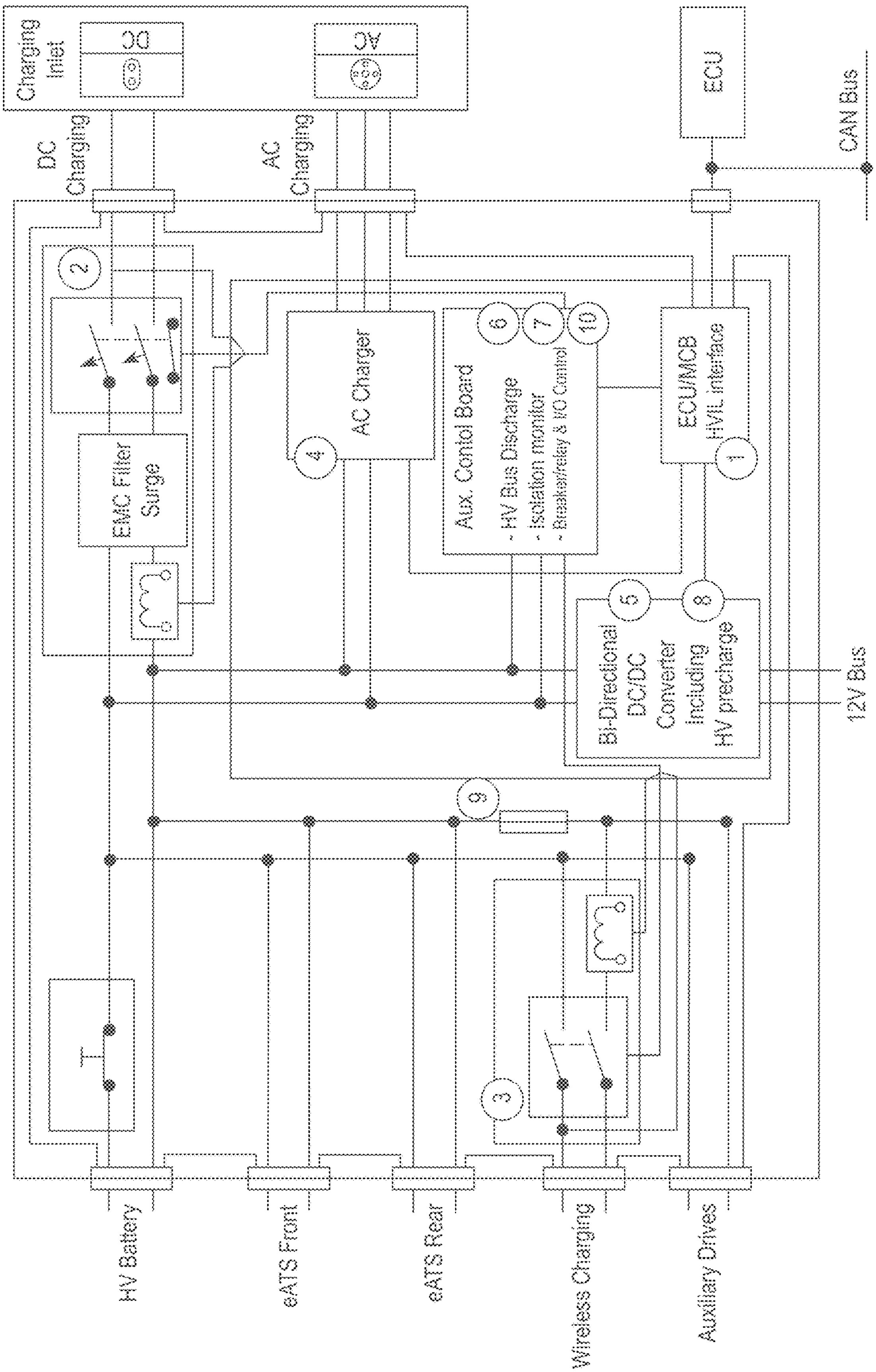

FIG. 275 depicts an embodiment power distribution system functional block diagram.

Figure 276:
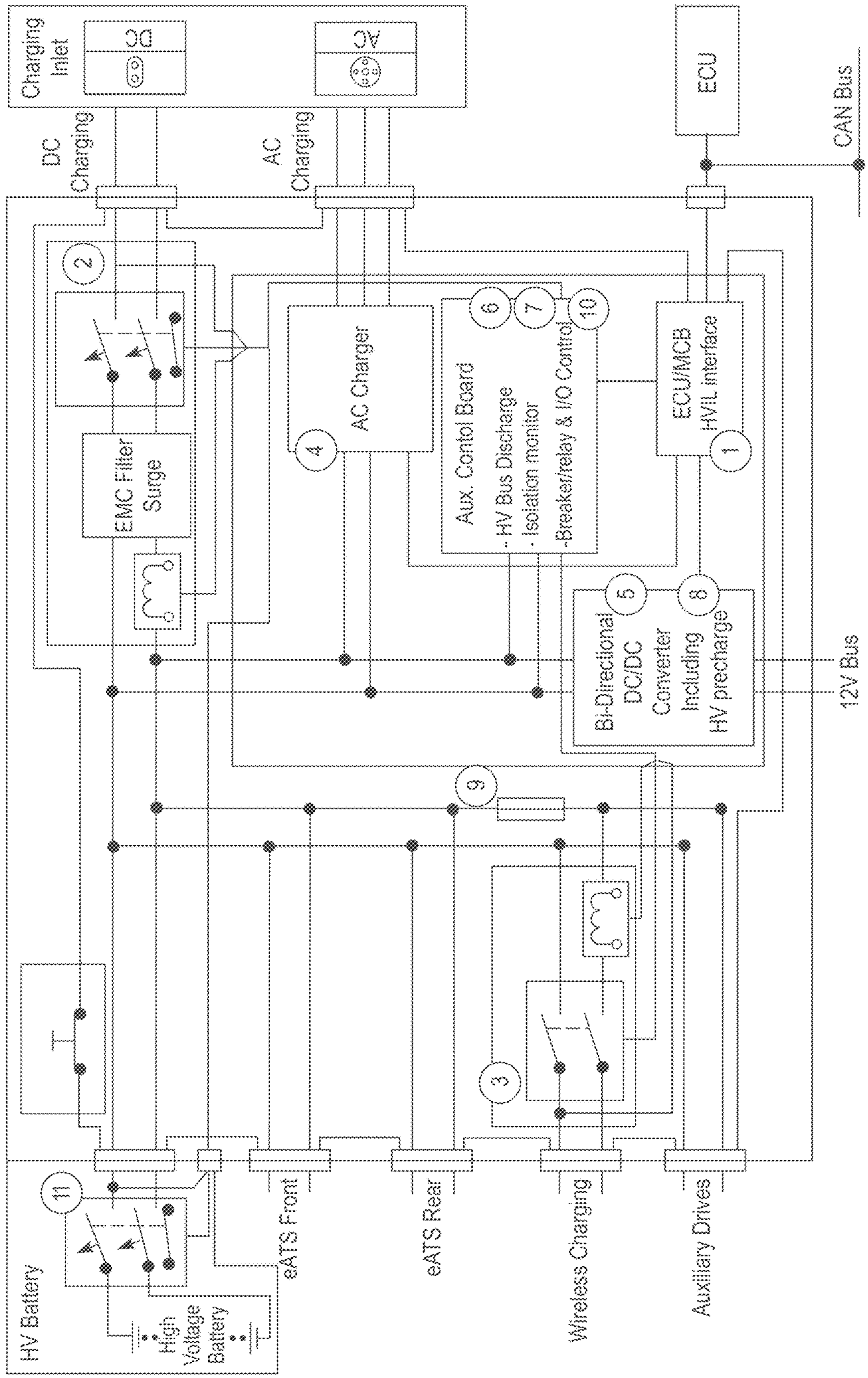

FIG. 276 depicts an embodiment power distribution system functional block diagram.

Figure 277:
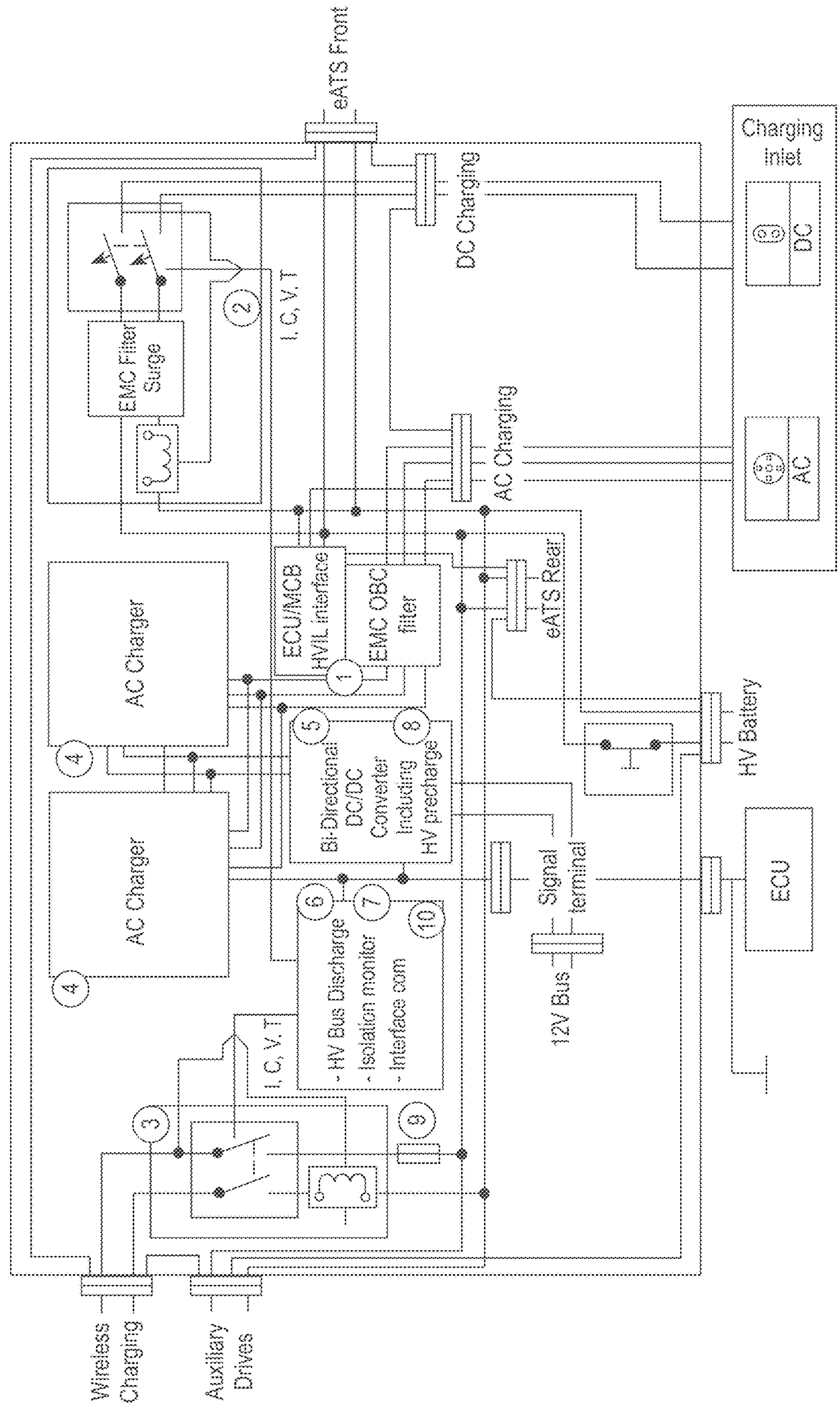

FIG. 277 depicts an embodiment power distribution system functional block diagram.

Figure 278:
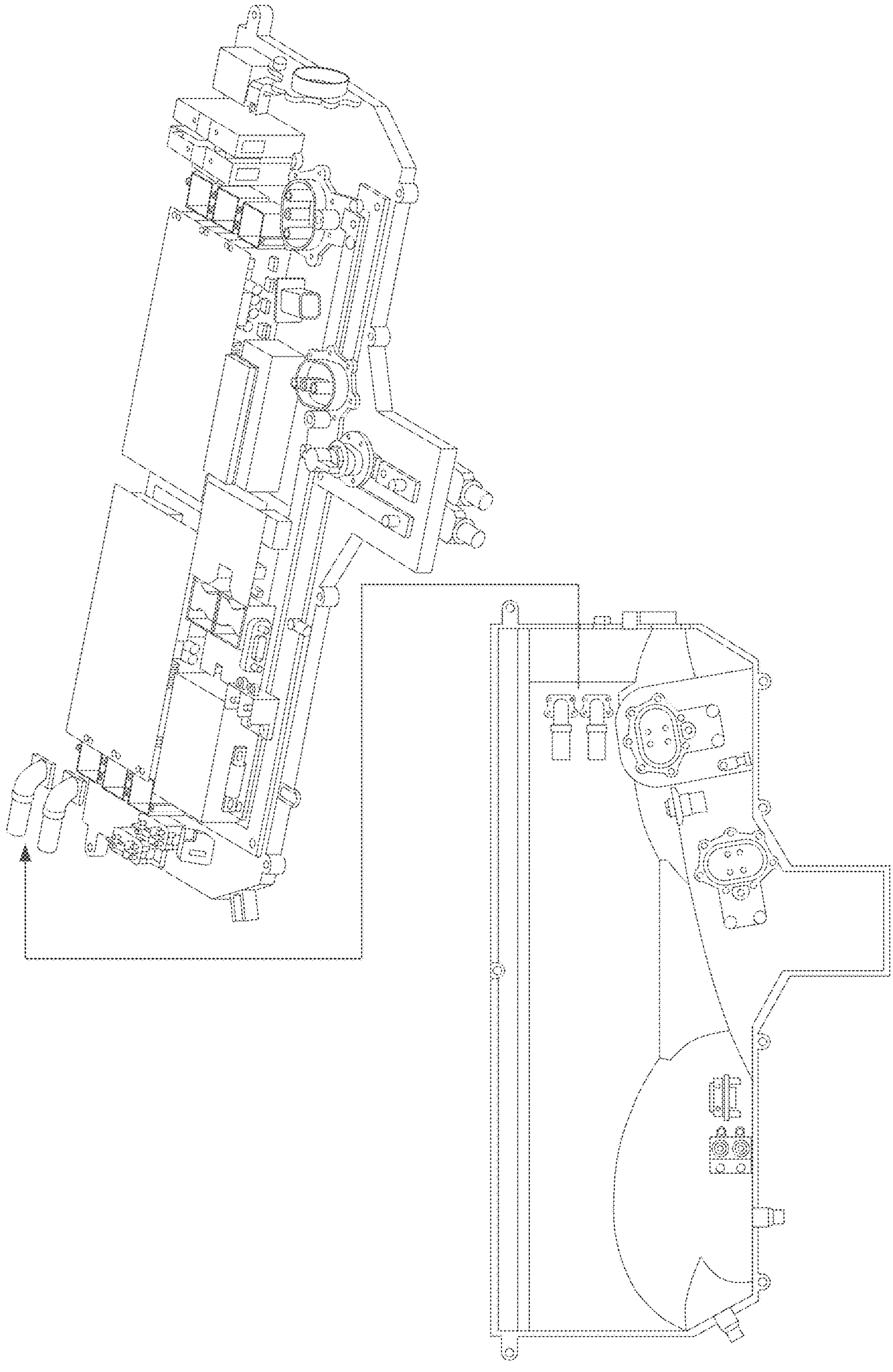

FIG. 278 depicts an embodiment power distribution system isometric view with connector positions.

Figure 279:
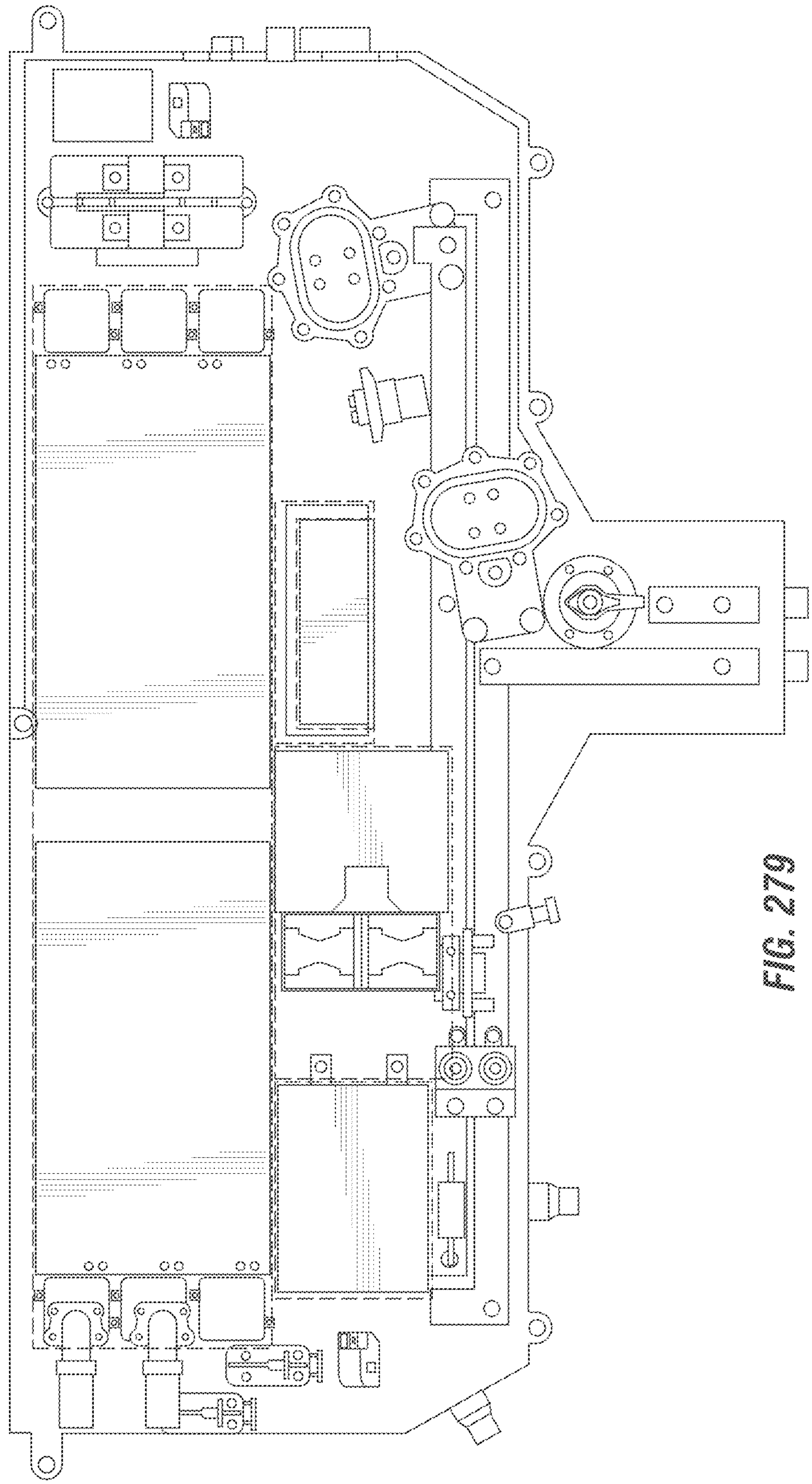

FIG. 279 depicts an embodiment power distribution system layout.

Figure 280:
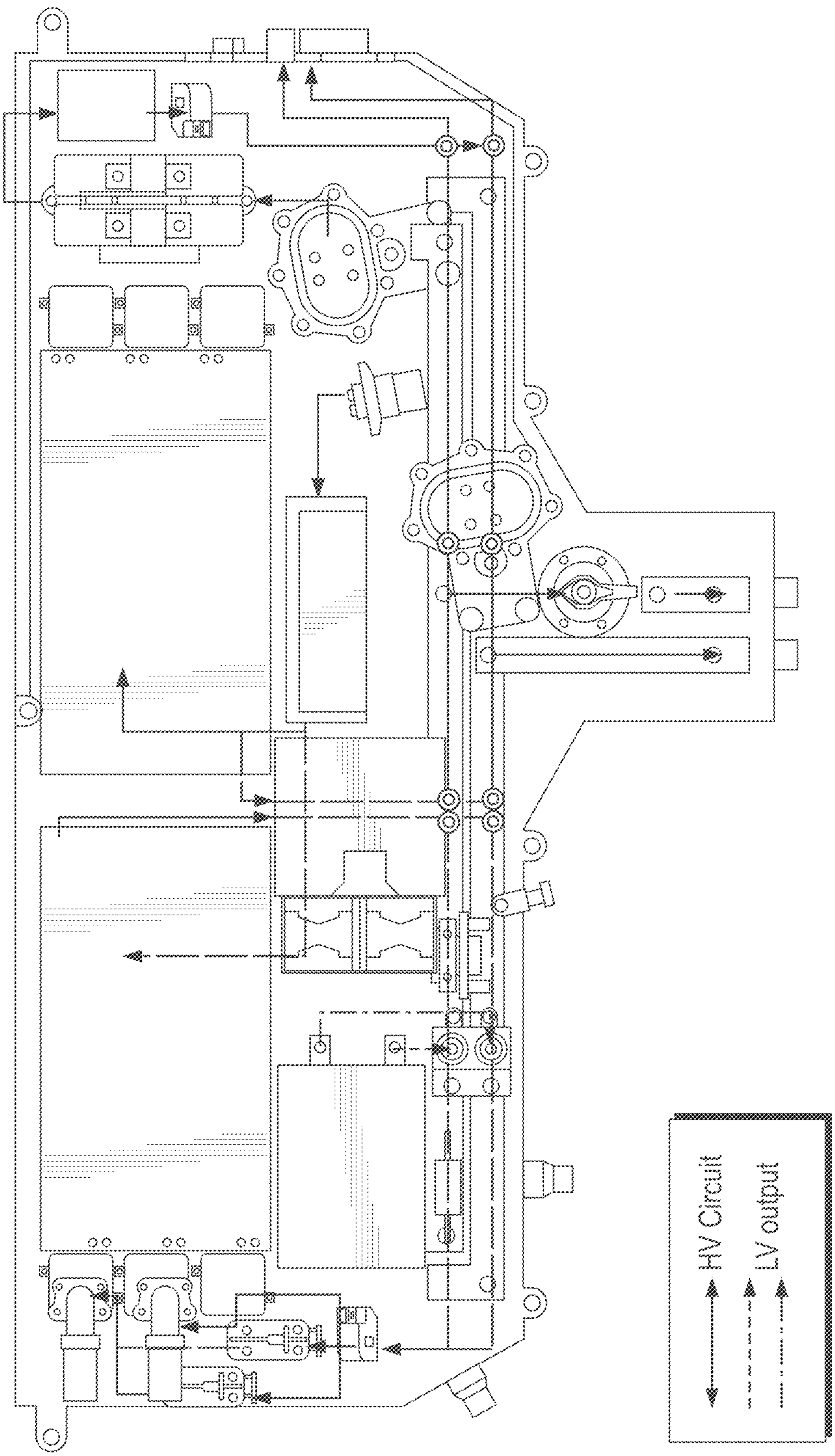

FIG. 280 depicts an embodiment power distribution system layout with power circuit indications.

Figure 281:
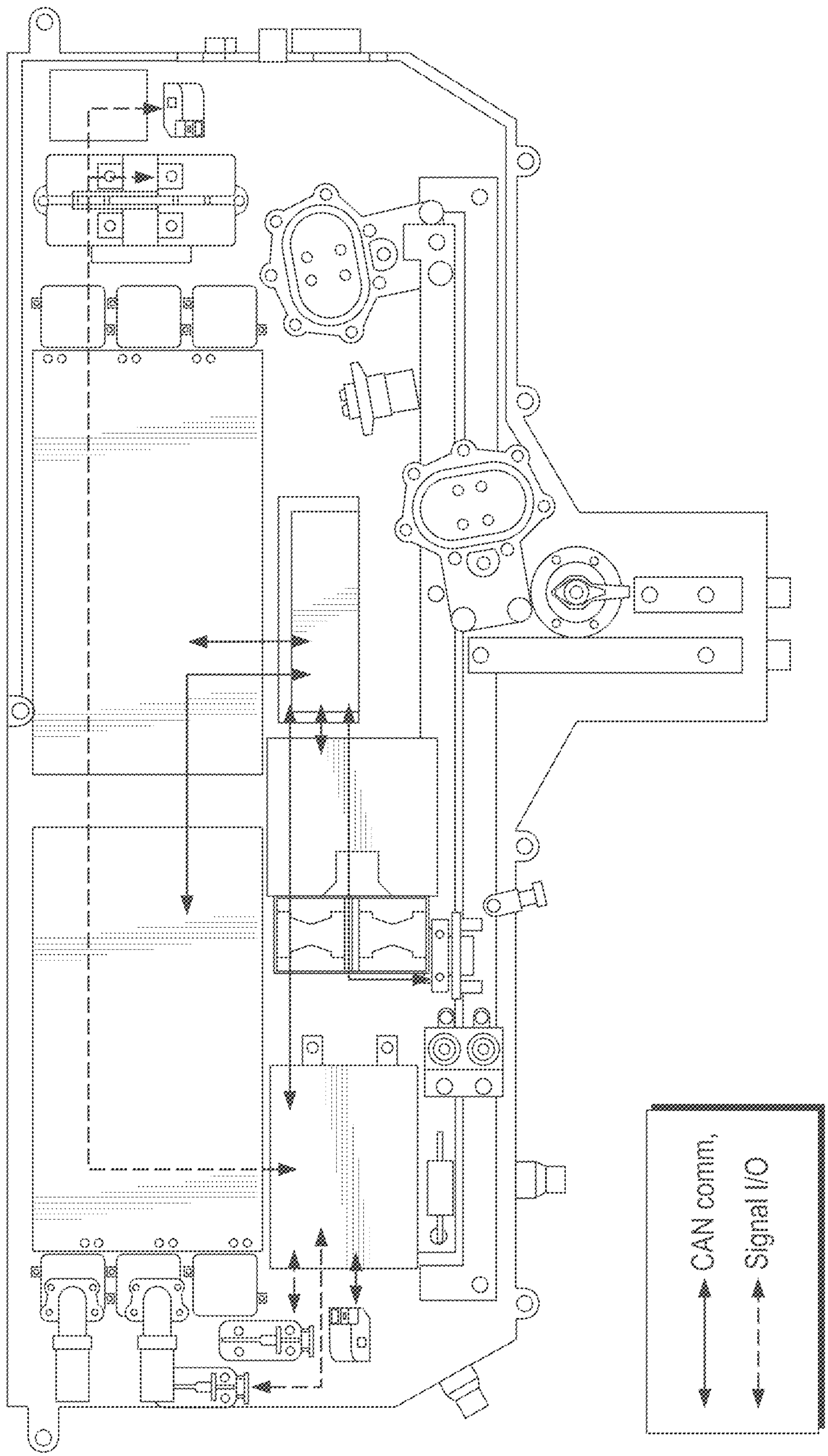

FIG. 281 depicts an embodiment power distribution system layout with power circuit indications.

Figure 282:
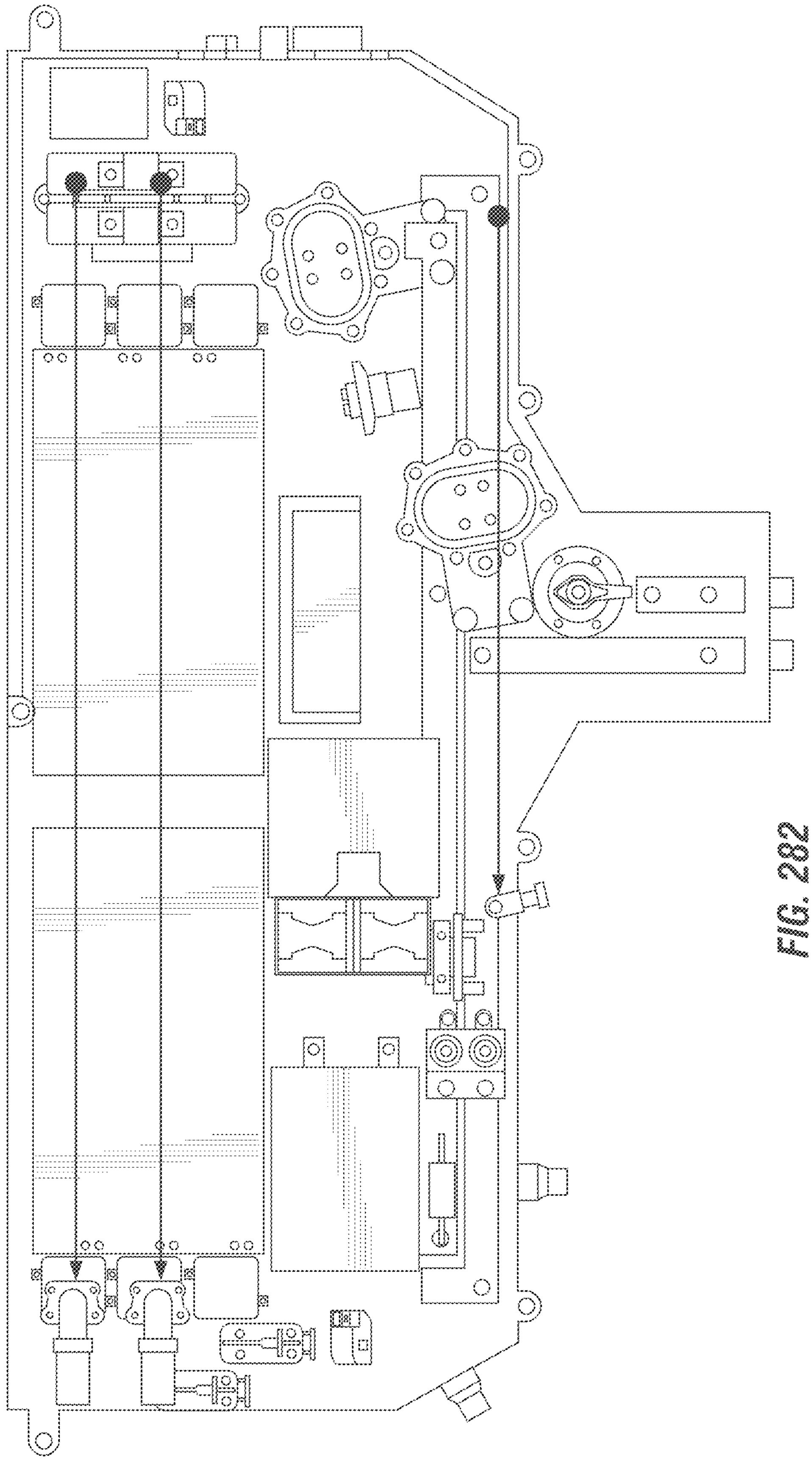

FIG. 282 depicts an embodiment power distribution system layout with power circuit indications.

Figure 283:
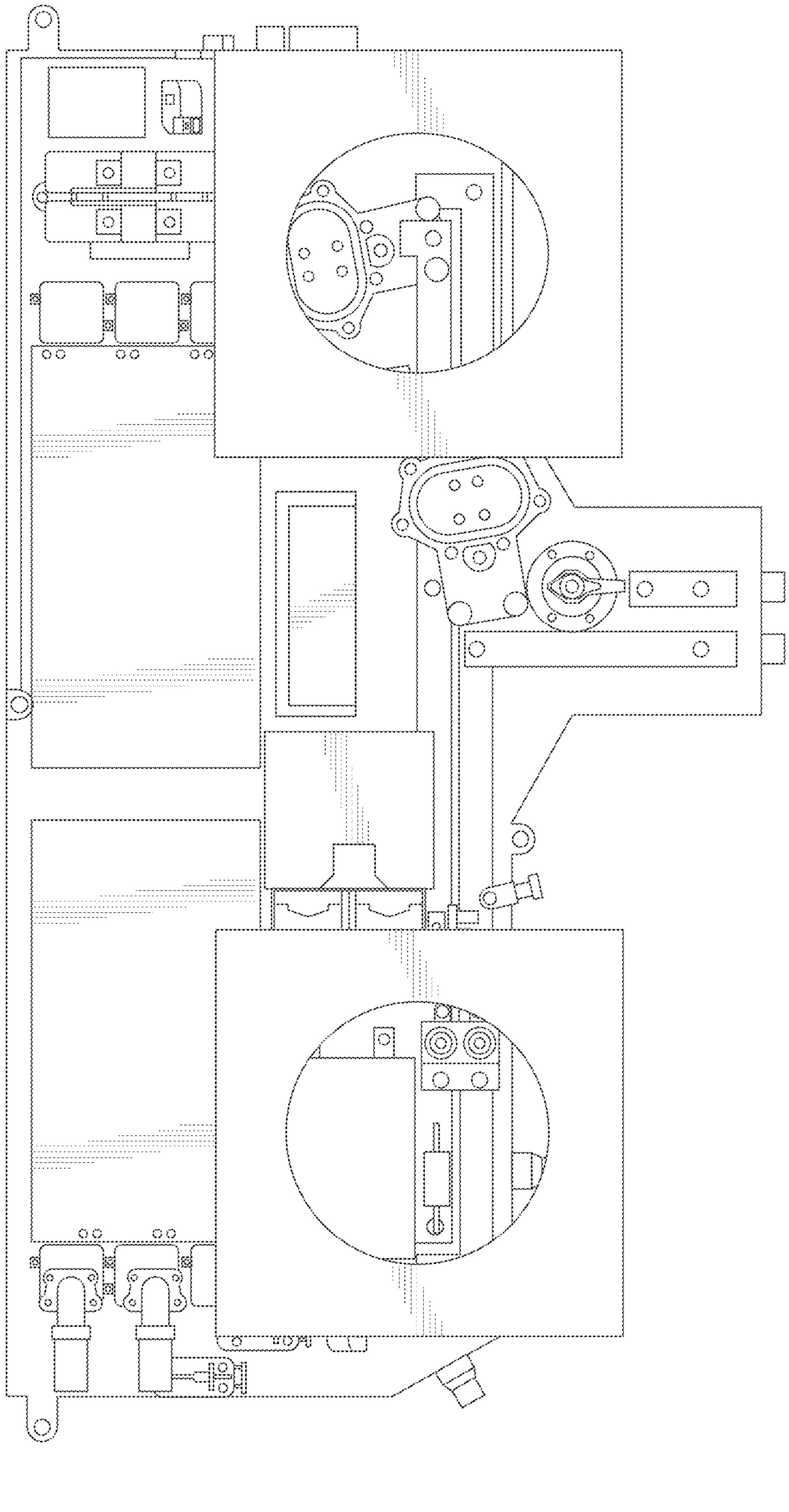

FIG. 283 depicts an embodiment power distribution system layout with housing and service flaps.

Figure 284:
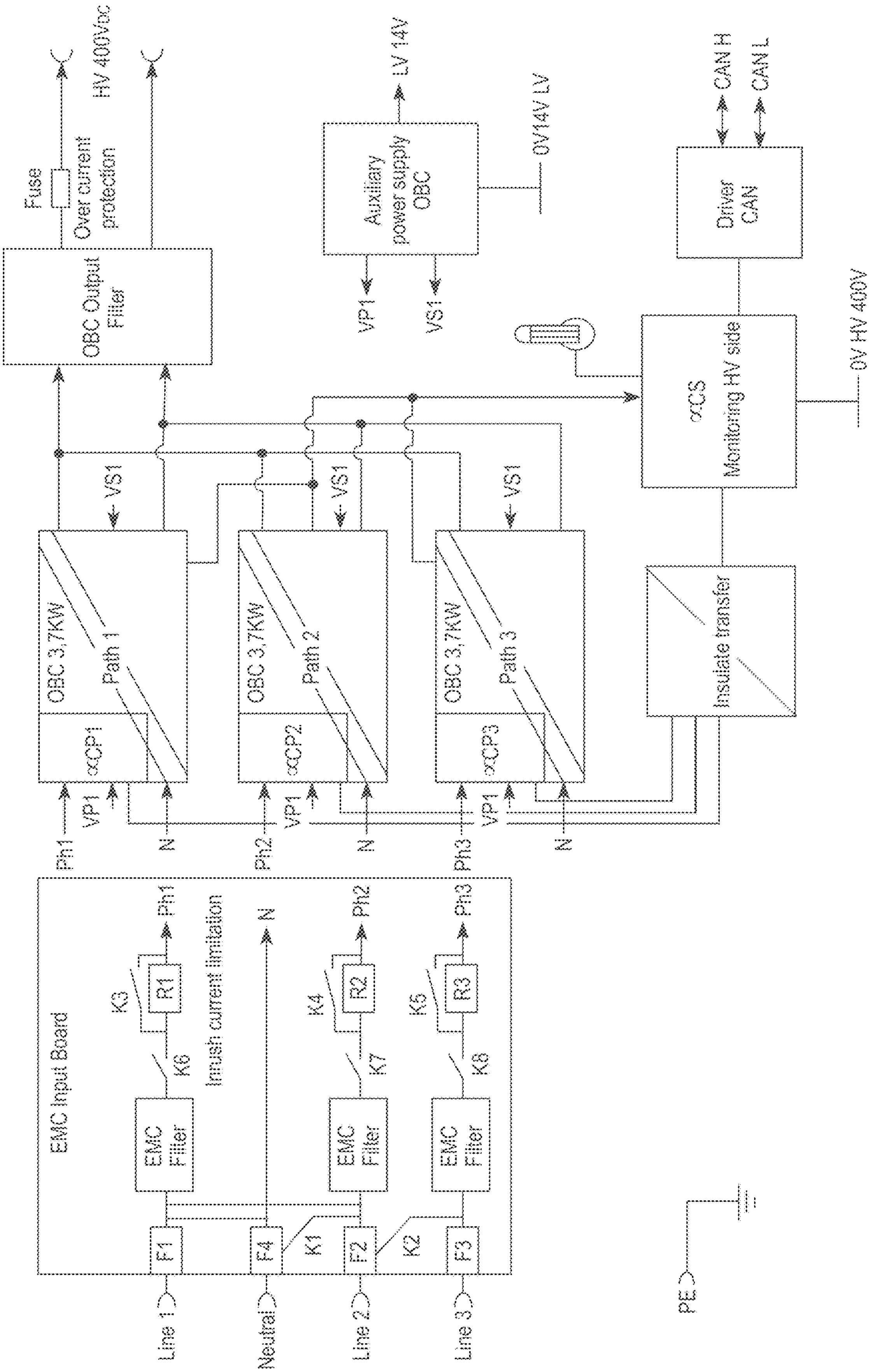

FIG. 284 depicts an embodiment on-board charger functional diagram.

Figure 285:
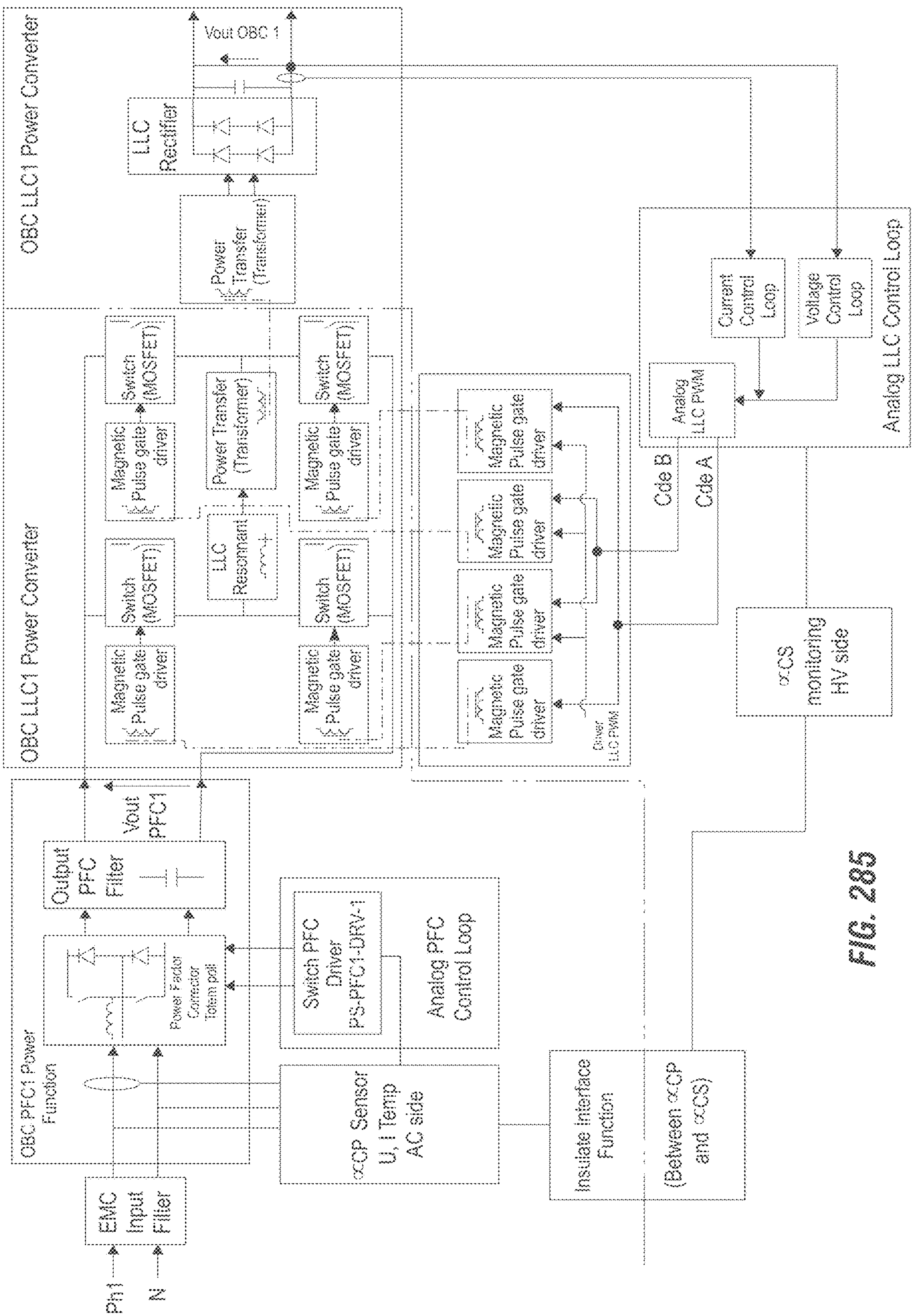

FIG. 285 depicts an embodiment on-board charger functional diagram.

Figure 286:
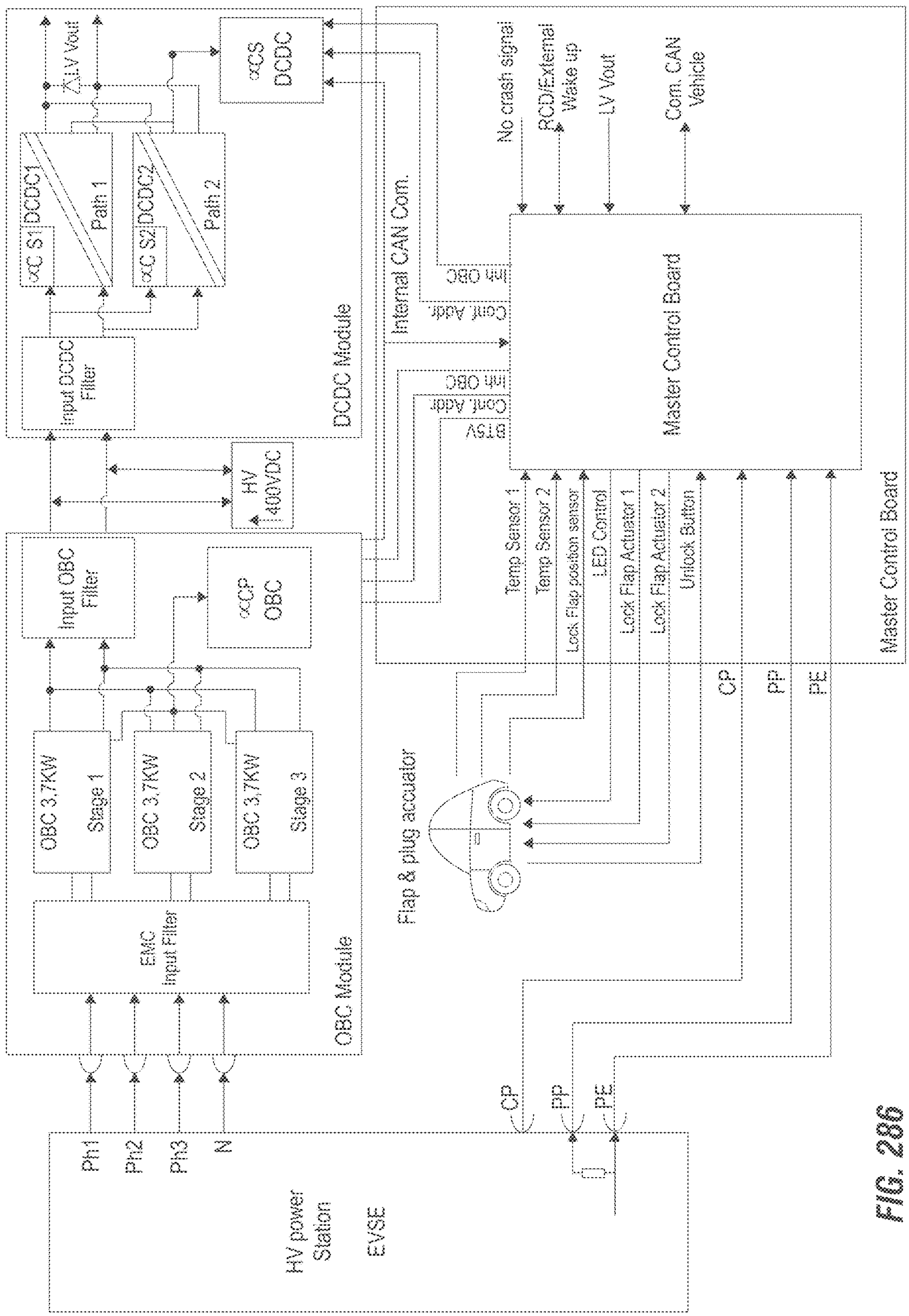

FIG. 286 depicts an embodiment on-board charger functional diagram.

Figure 287:
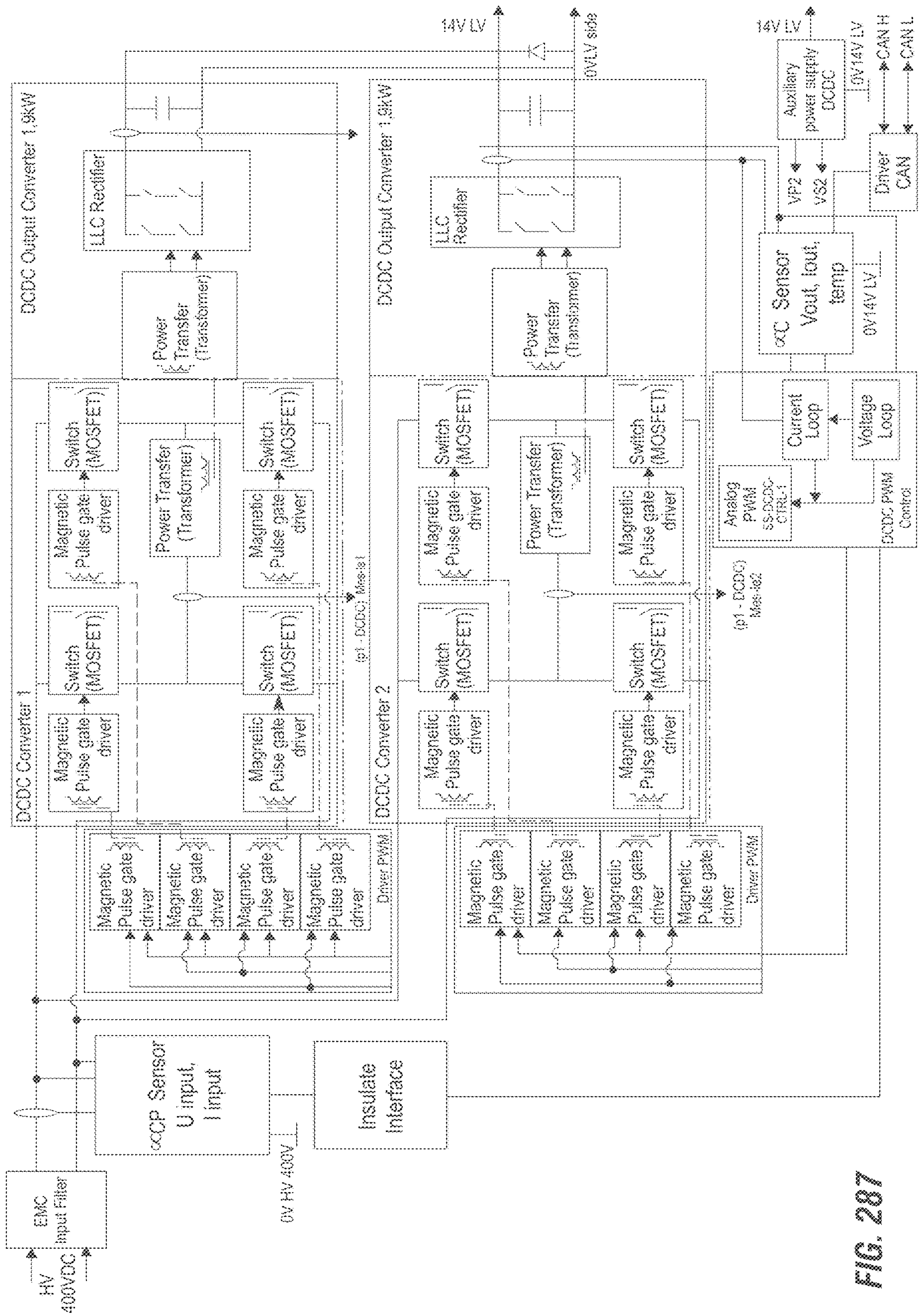

FIG. 287 depicts an embodiment DC converter functional diagram.

Figure 288:
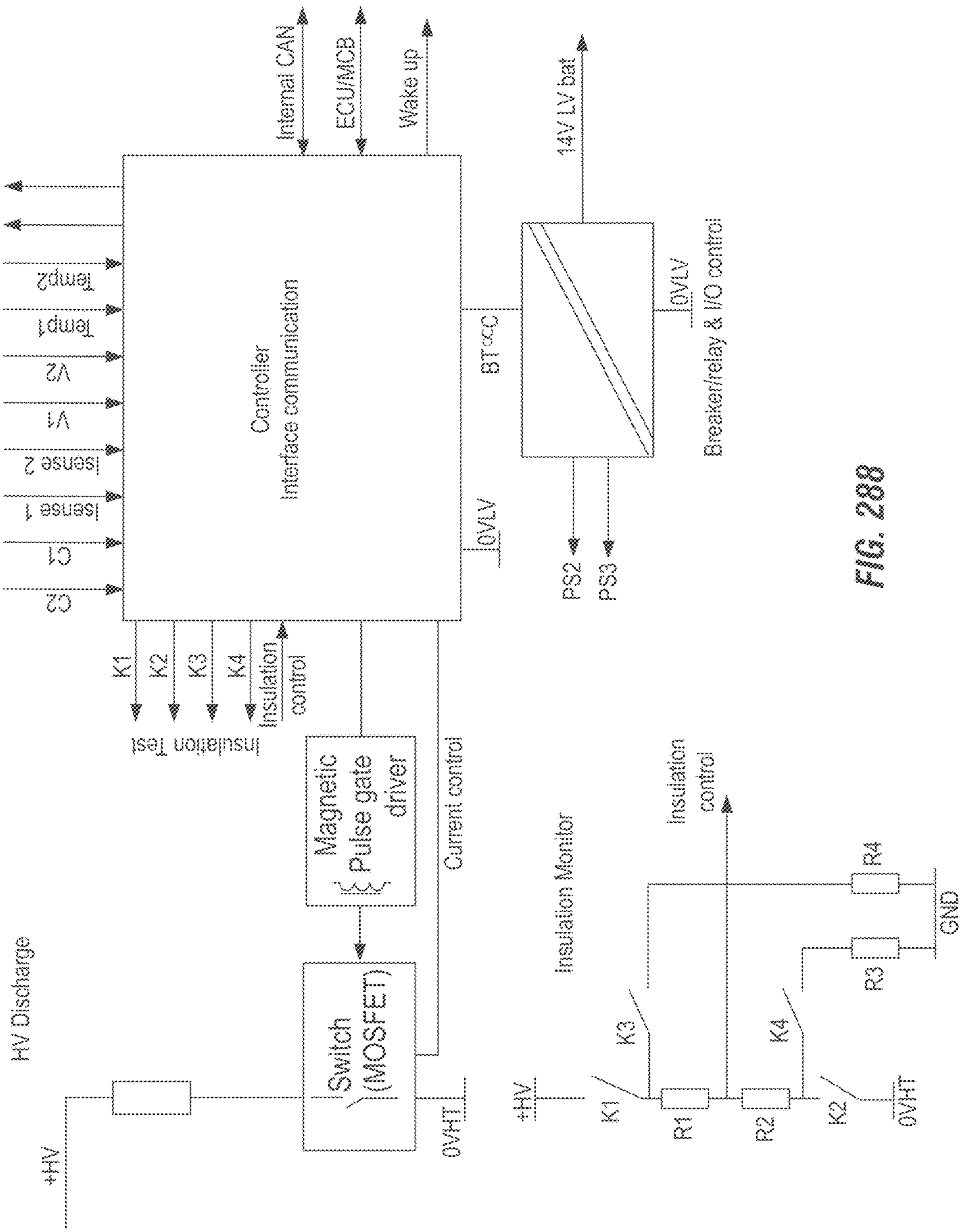

FIG. 288 depicts an embodiment auxiliary board functional diagram.

Figure 289:
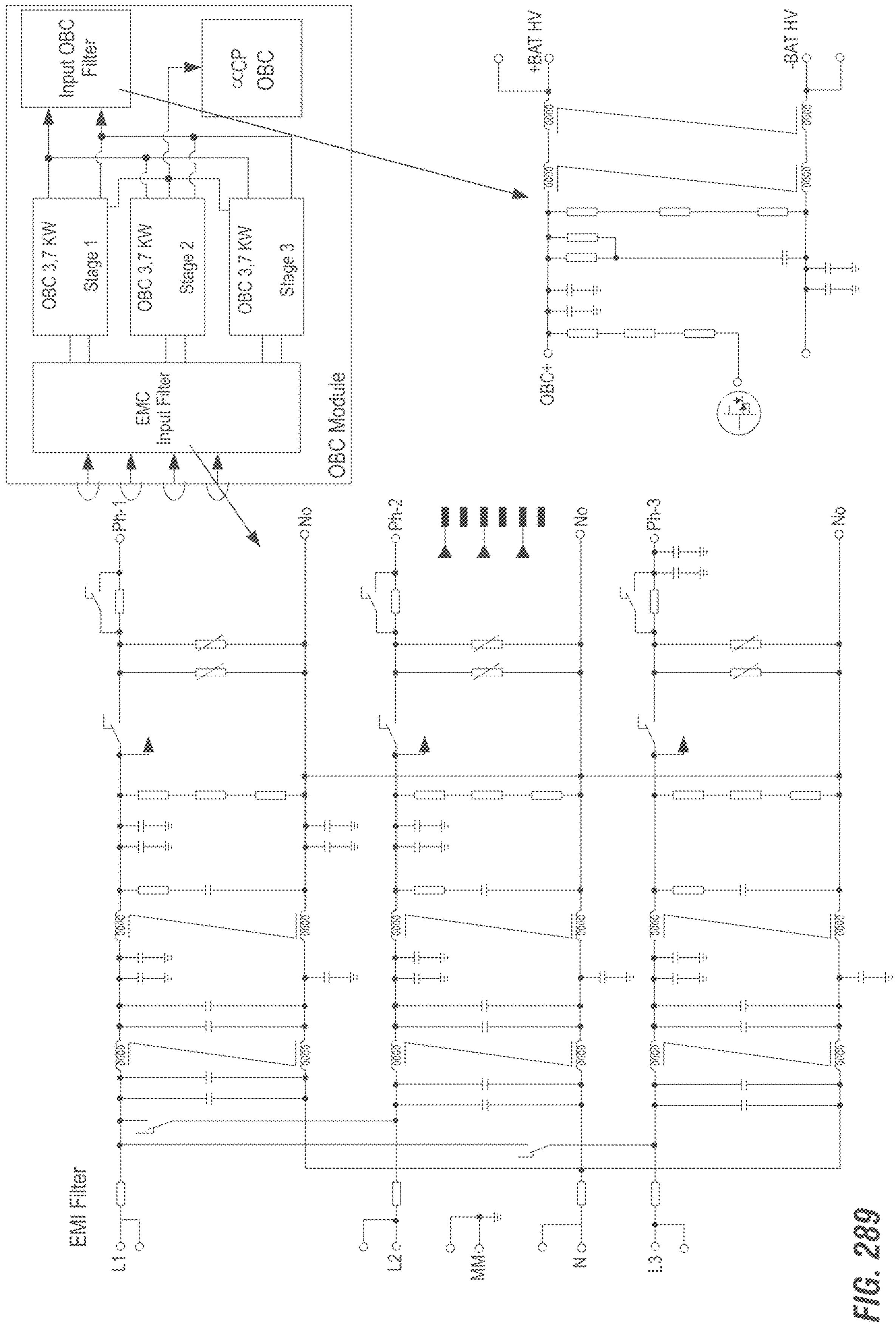

FIG. 289 depicts an embodiment EMI configuration.

Figure 290:
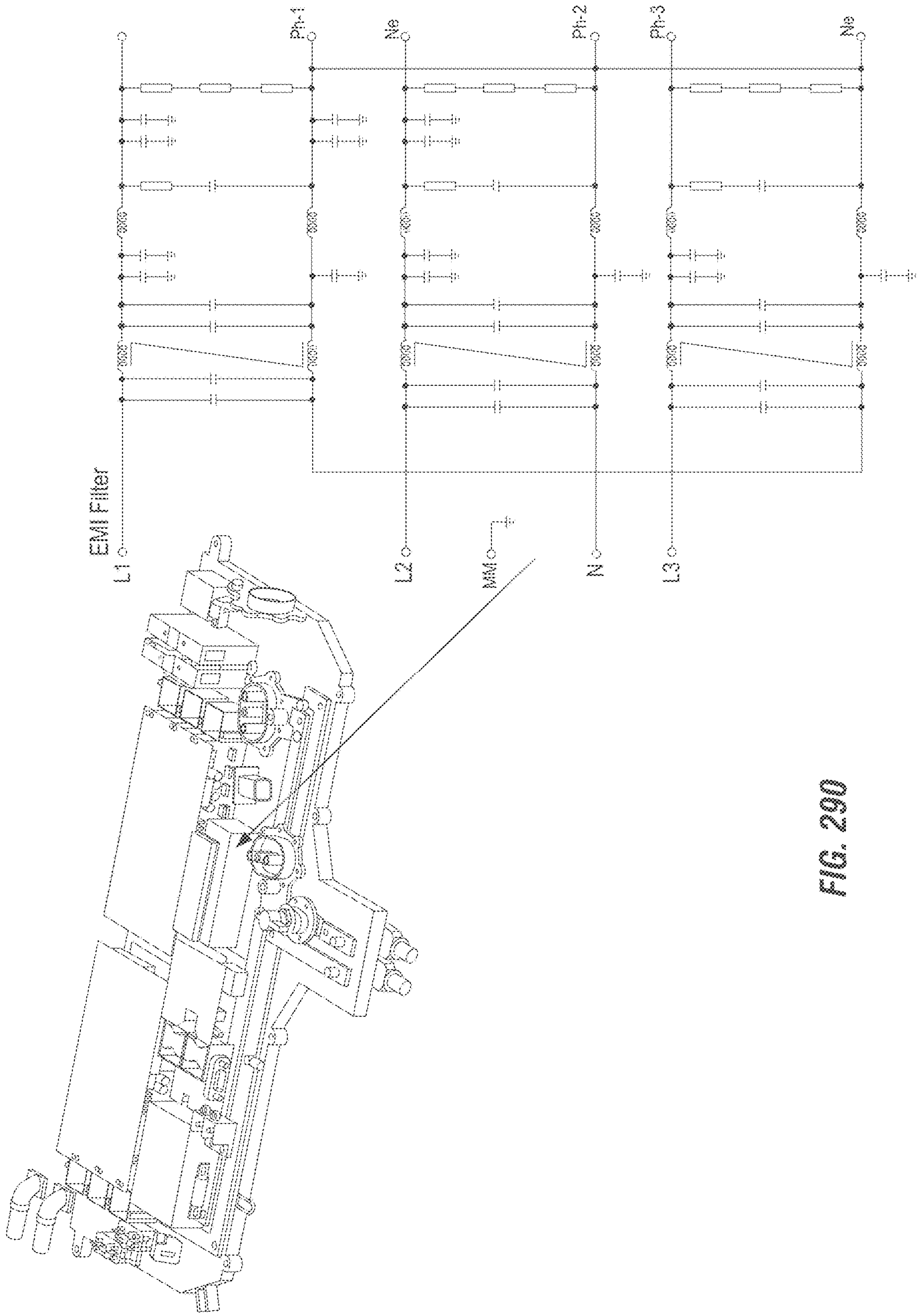

FIG. 290 depicts an embodiment EMI configuration.

Figure 291:
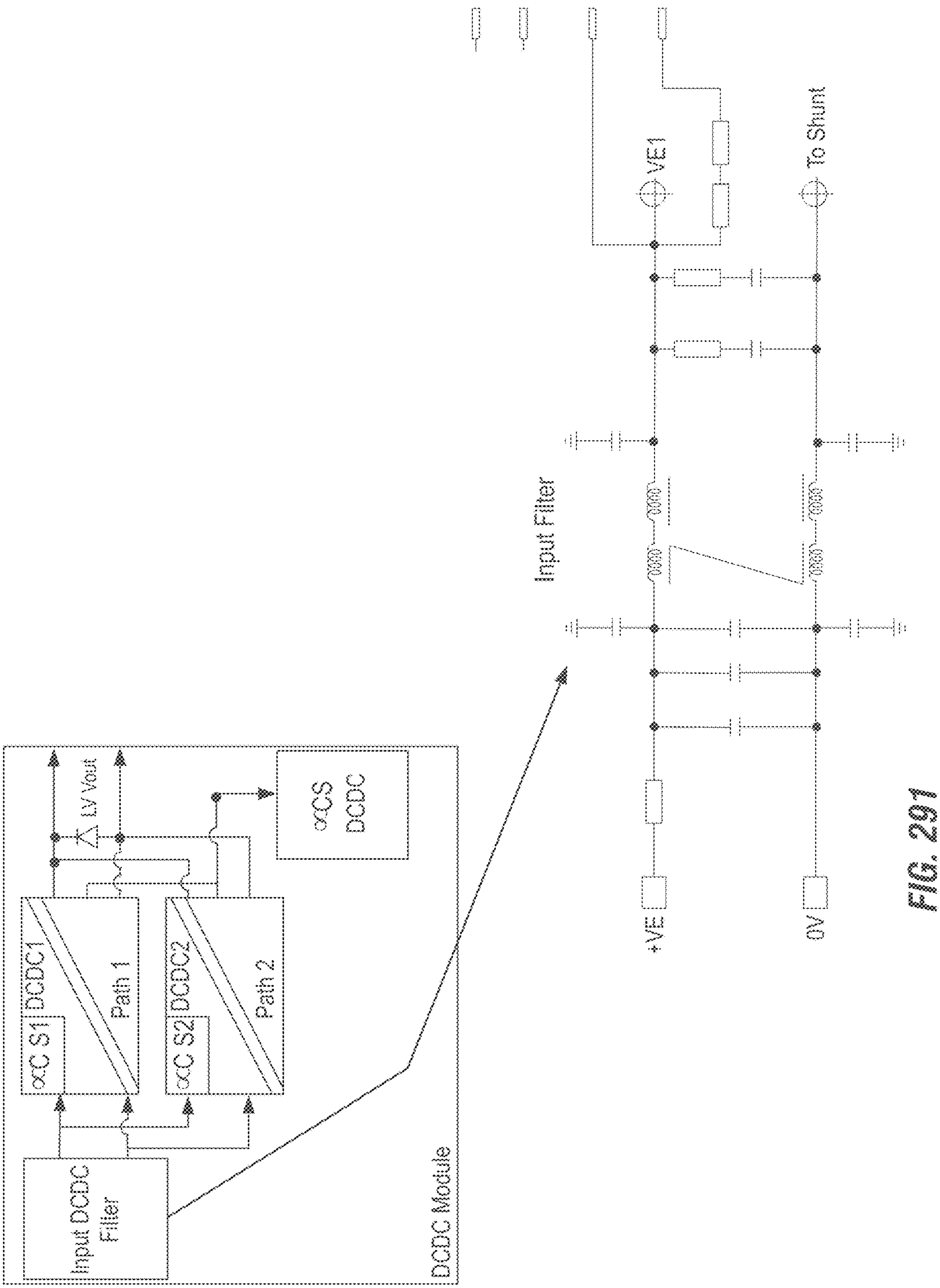

FIG. 291 depicts an embodiment EMI configuration.

Figure 292:
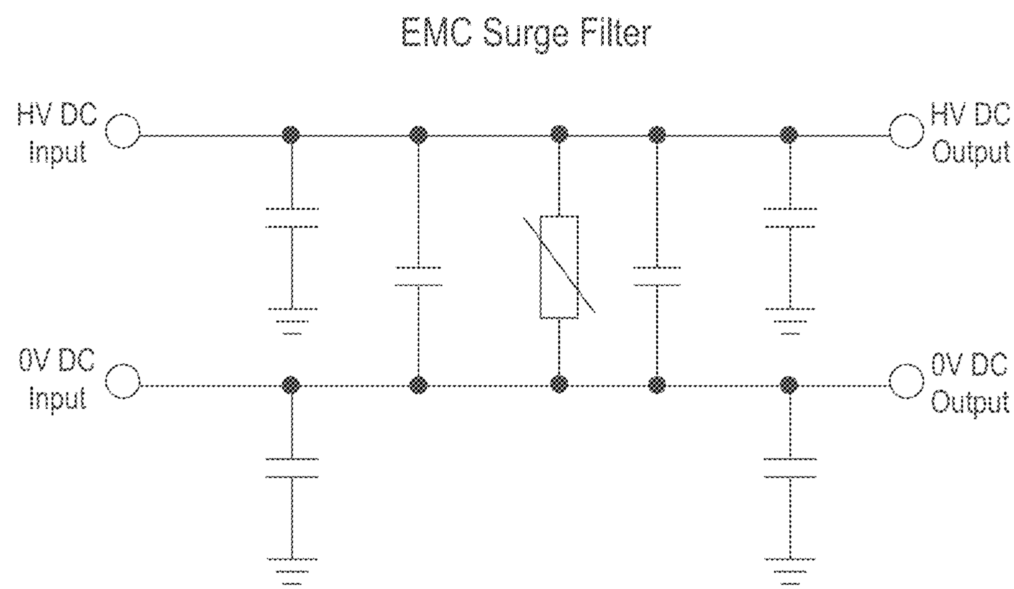

FIG. 292 depicts an embodiment surge filter circuit.

Figure 293:
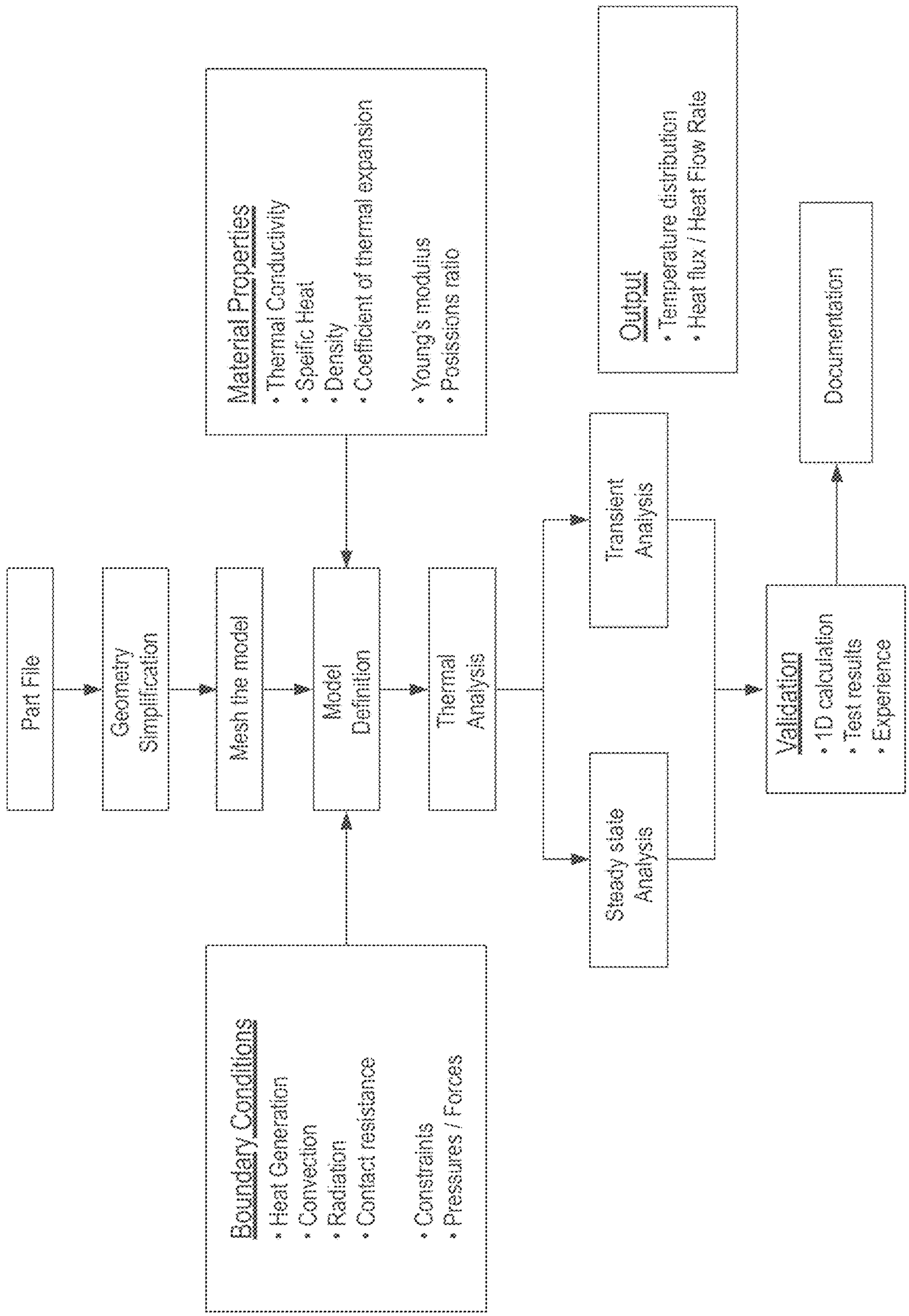

FIG. 293 depicts an embodiment thermal flow diagram.

Figure 294:
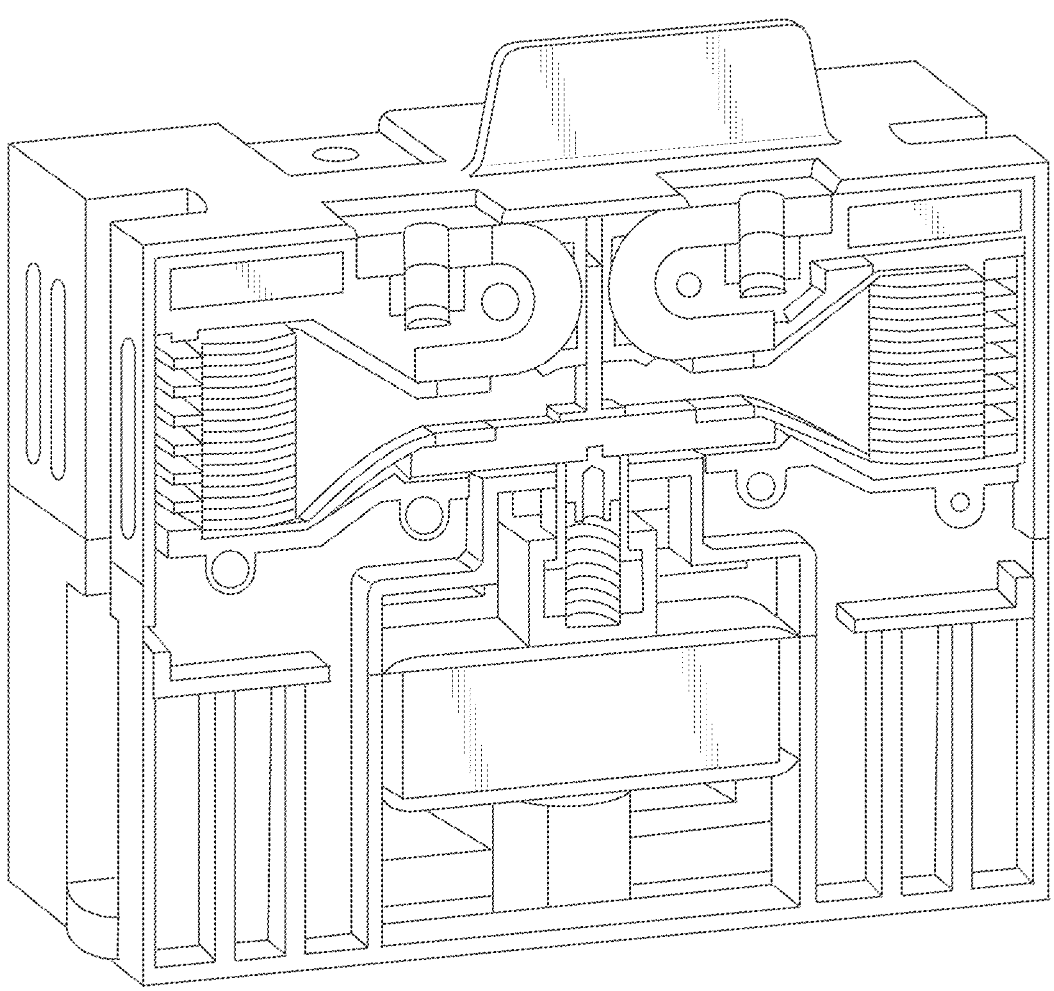

FIG. 294 depicts an embodiment breaker/relay.

Figure 295:
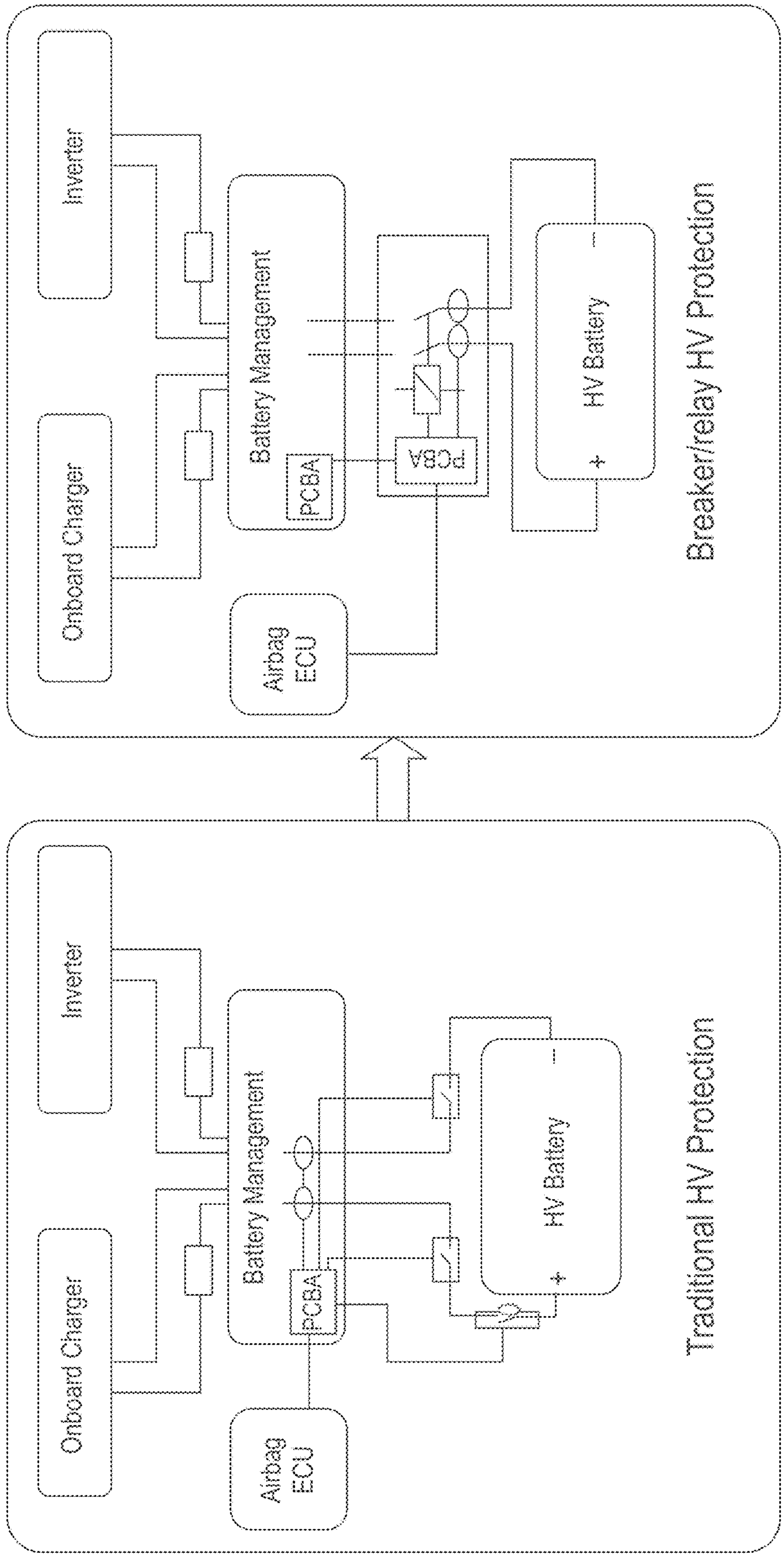

FIG. 295 depicts an embodiment high voltage functional block diagram.

Figure 296:
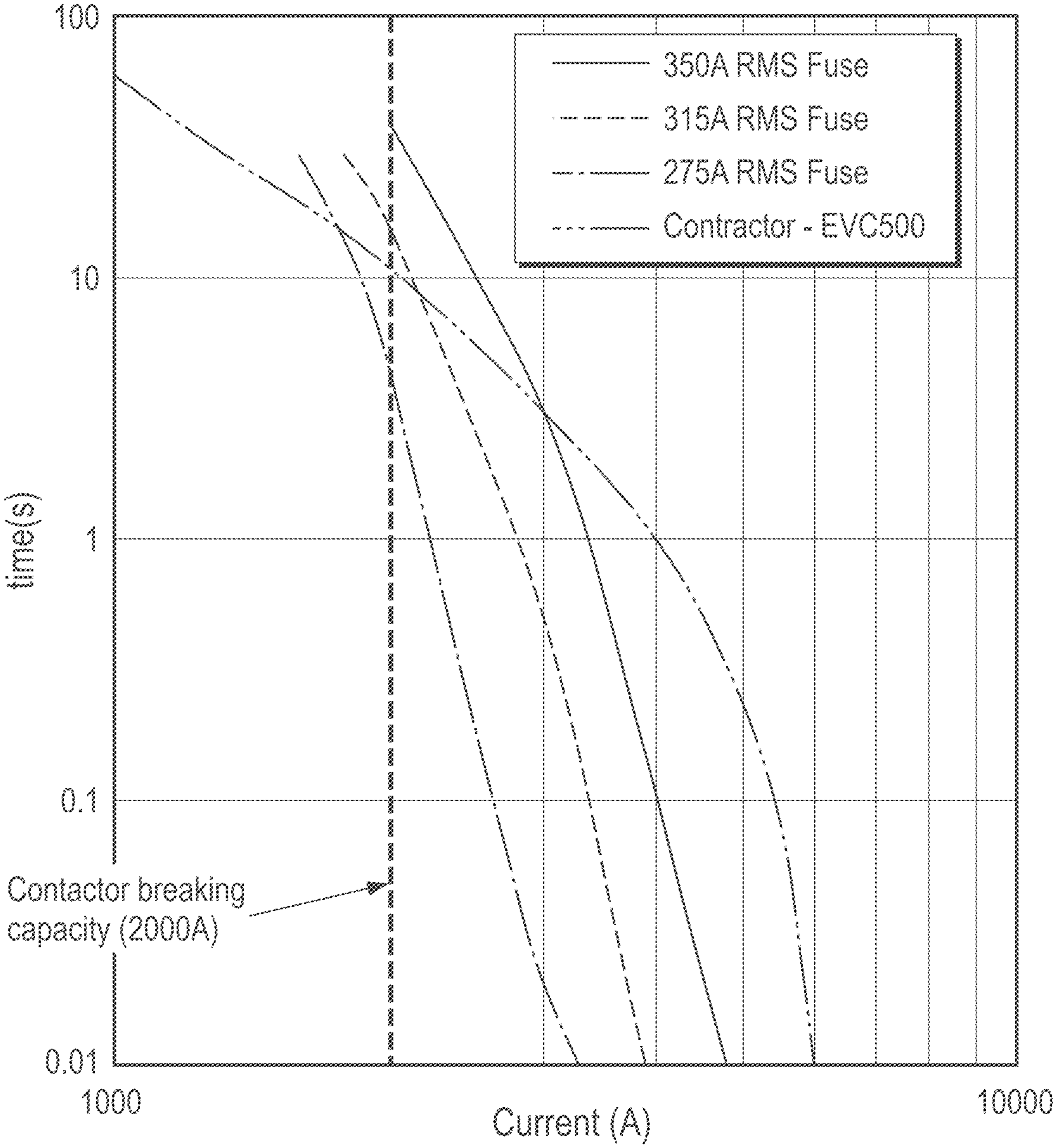

FIG. 296 depicts an embodiment fuse and contactor breaking plot.

Figure 297:
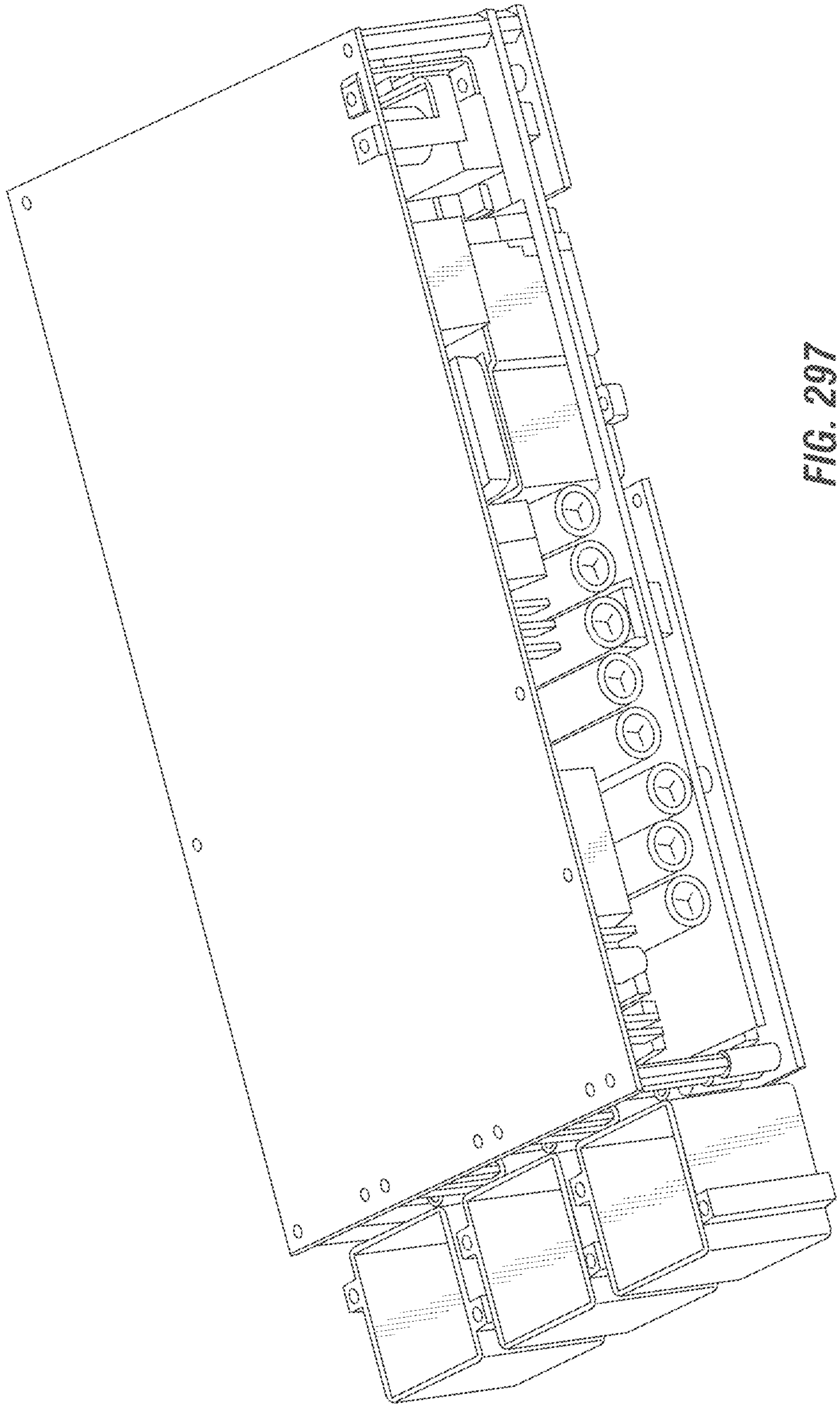

FIG. 297 depicts an embodiment view of an on-board charger module.

Figure 298:
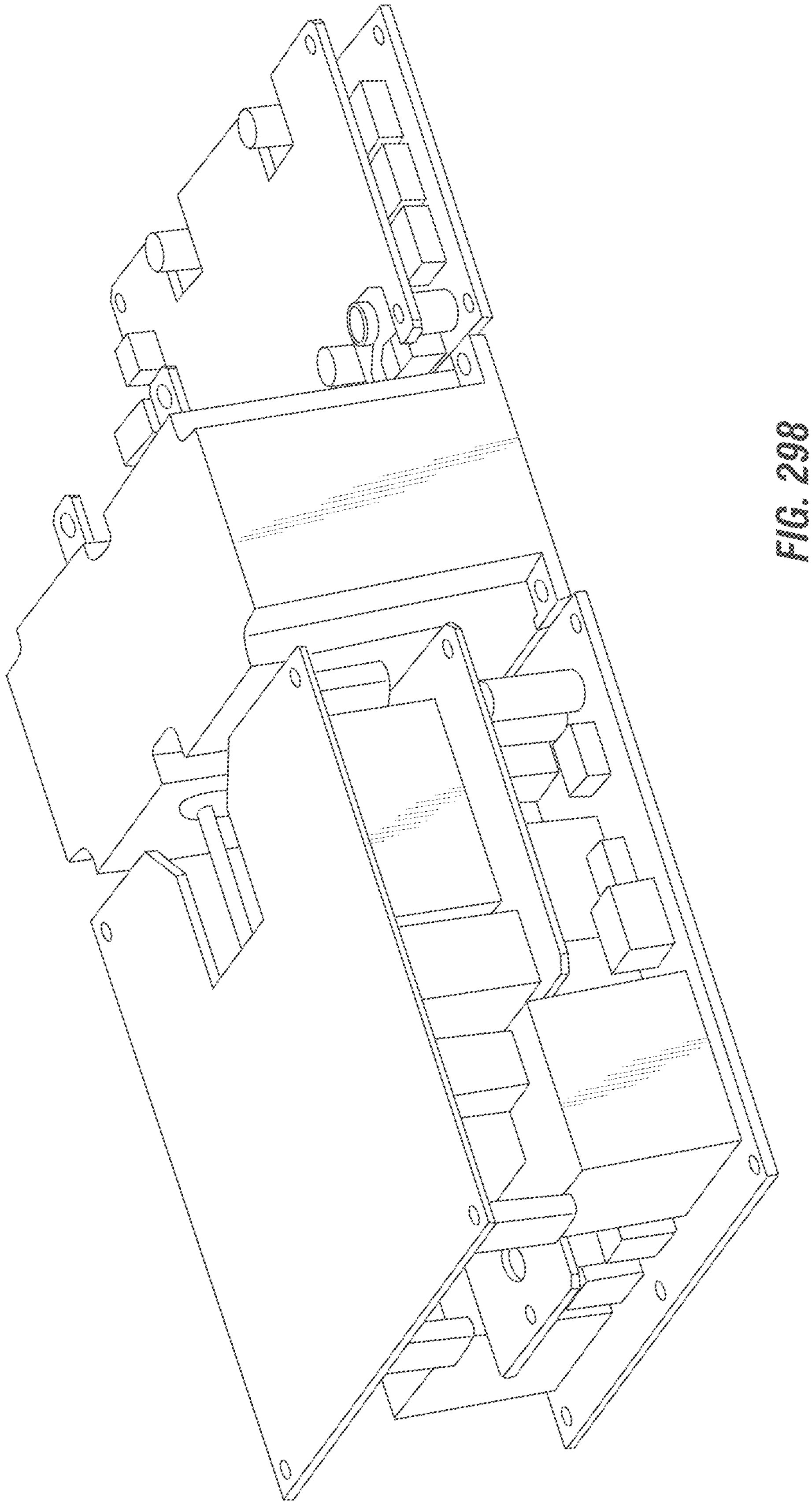

FIG. 298 depicts an embodiment view of a DC-to-DC converter module.

Figure 299:
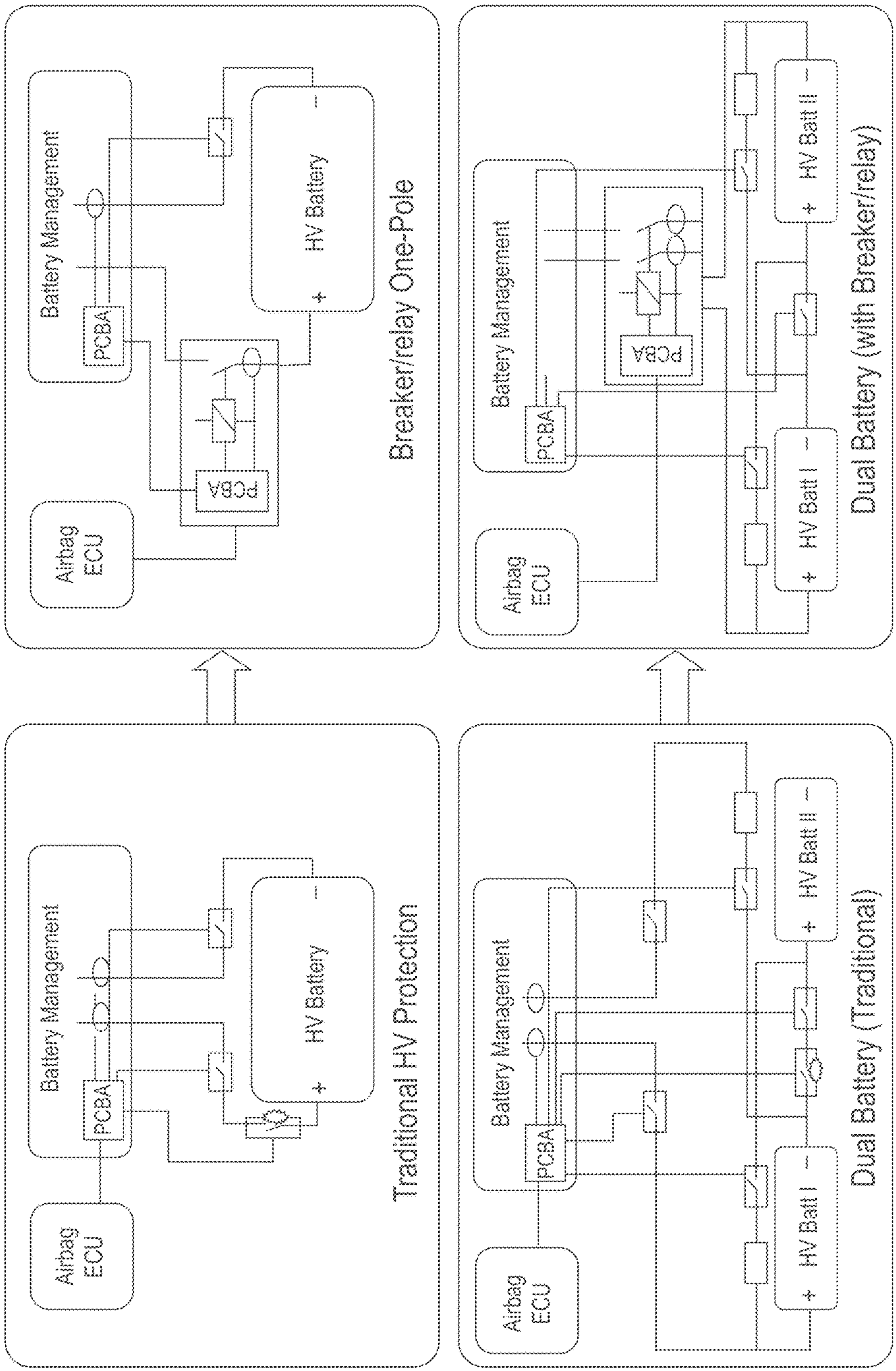

FIG. 299 depict embodiment high-voltage systems.

Figure 300:
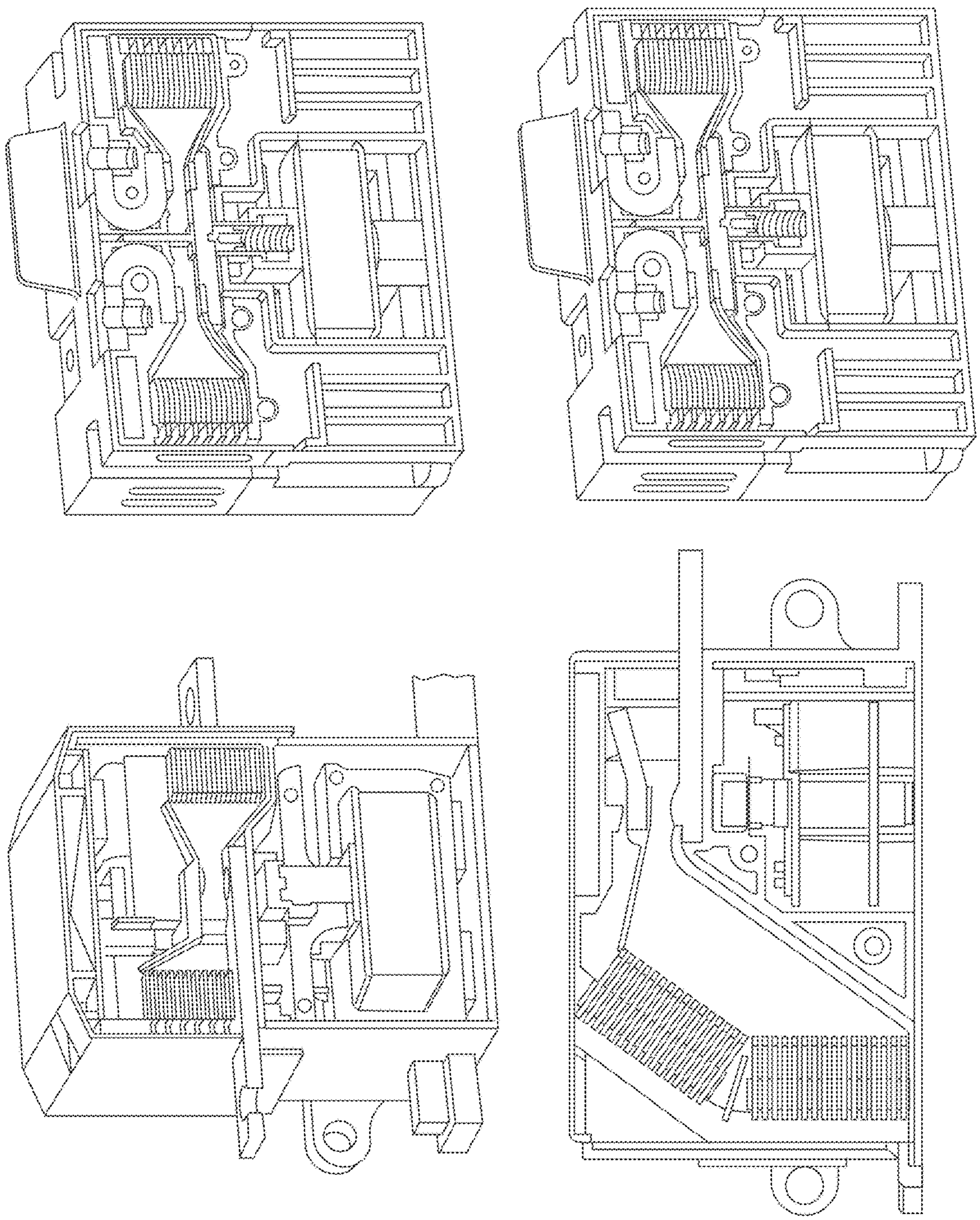

FIG. 300 depicts embodiment breaker/relays.

Figure 301:
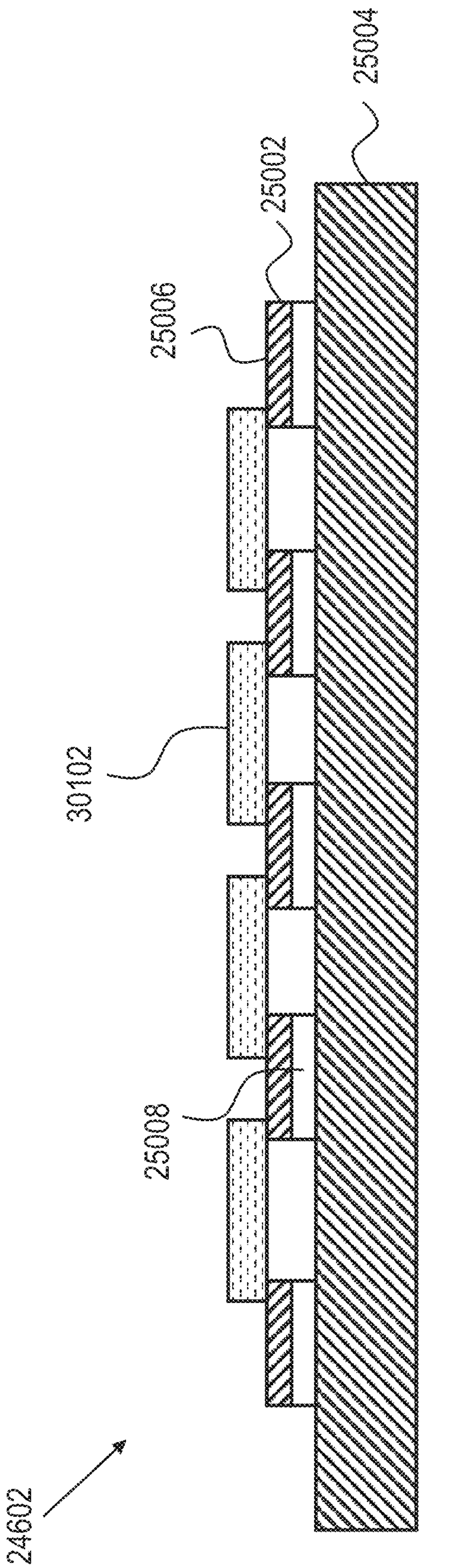

FIG. 301 depicts an embodiment example fuse includes a laminate conductive layer.

Figure 302:
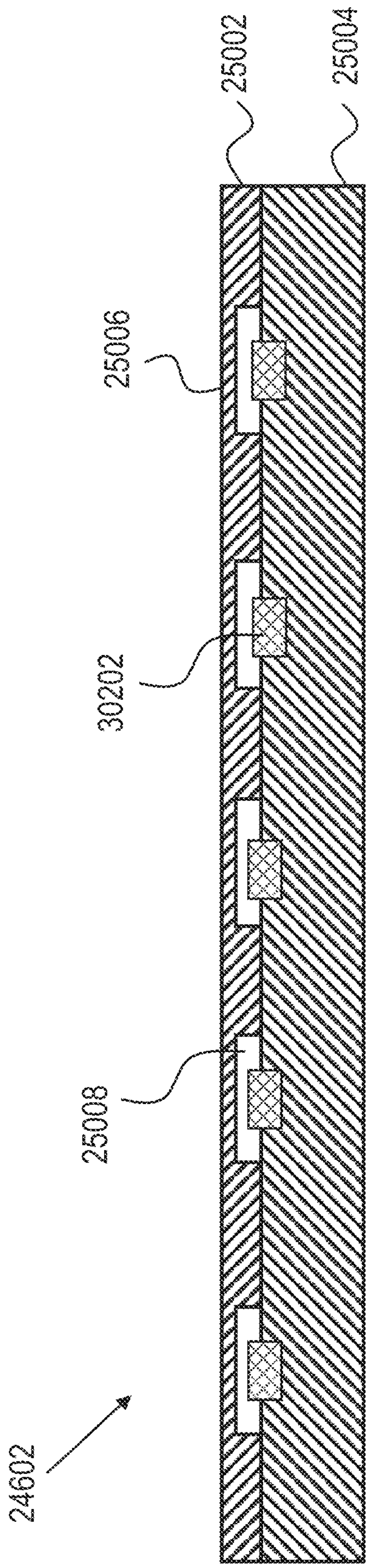

FIG. 302 depicts an embodiment example fuse includes a laminate thermal layer.

Figure 303:
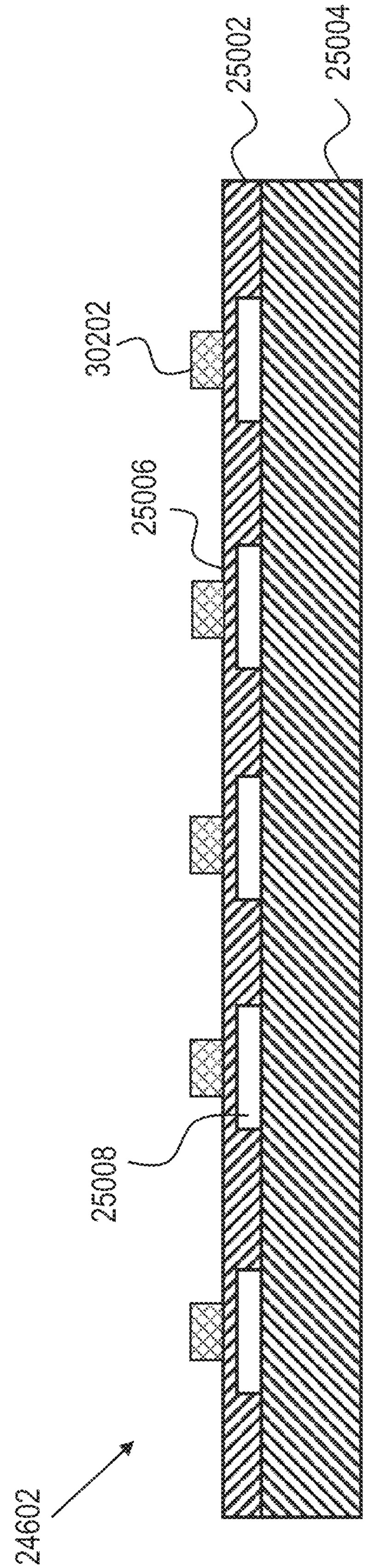

FIG. 303 depicts an embodiment laminate thermal layer including a number of elements.

Figure 304:
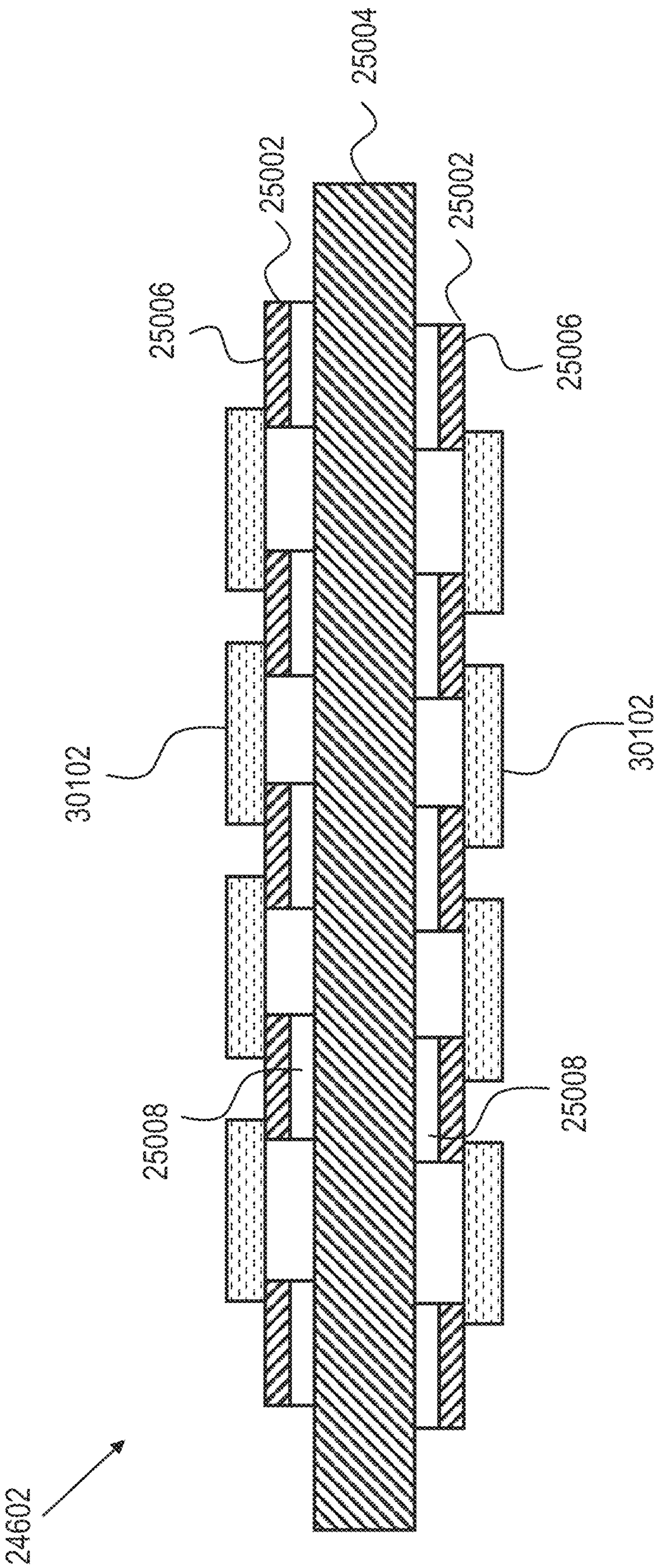

FIG. 304 depicts an embodiment example fuse includes laminated elements on a second side of the substrate layer.

Figure 305:
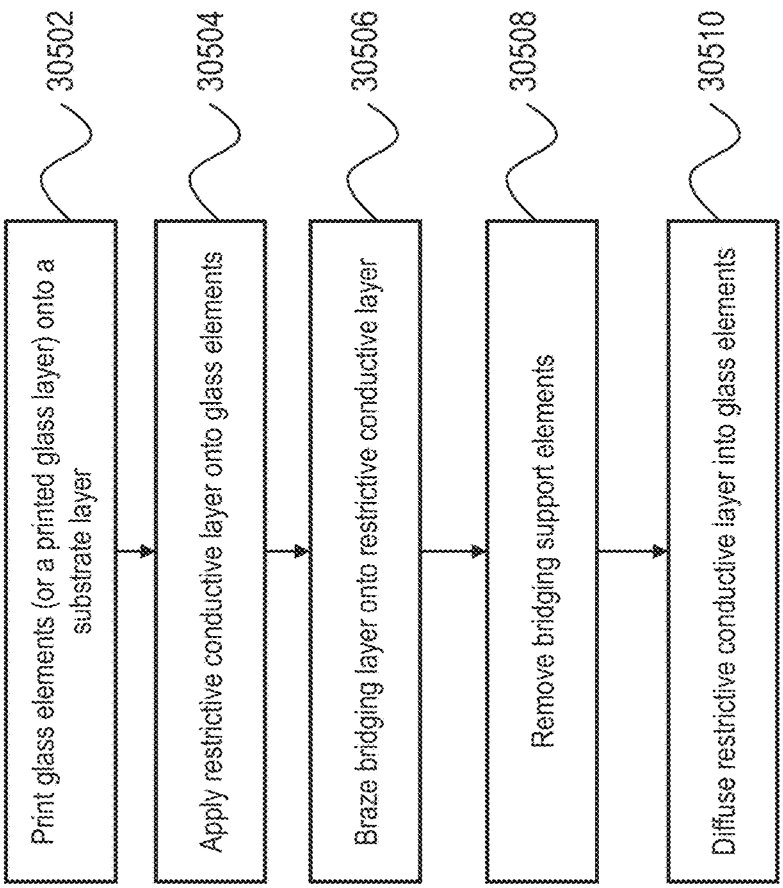

FIG. 305 depicts an embodiment example procedure to assembly a laminated fuse.

Figure 306:
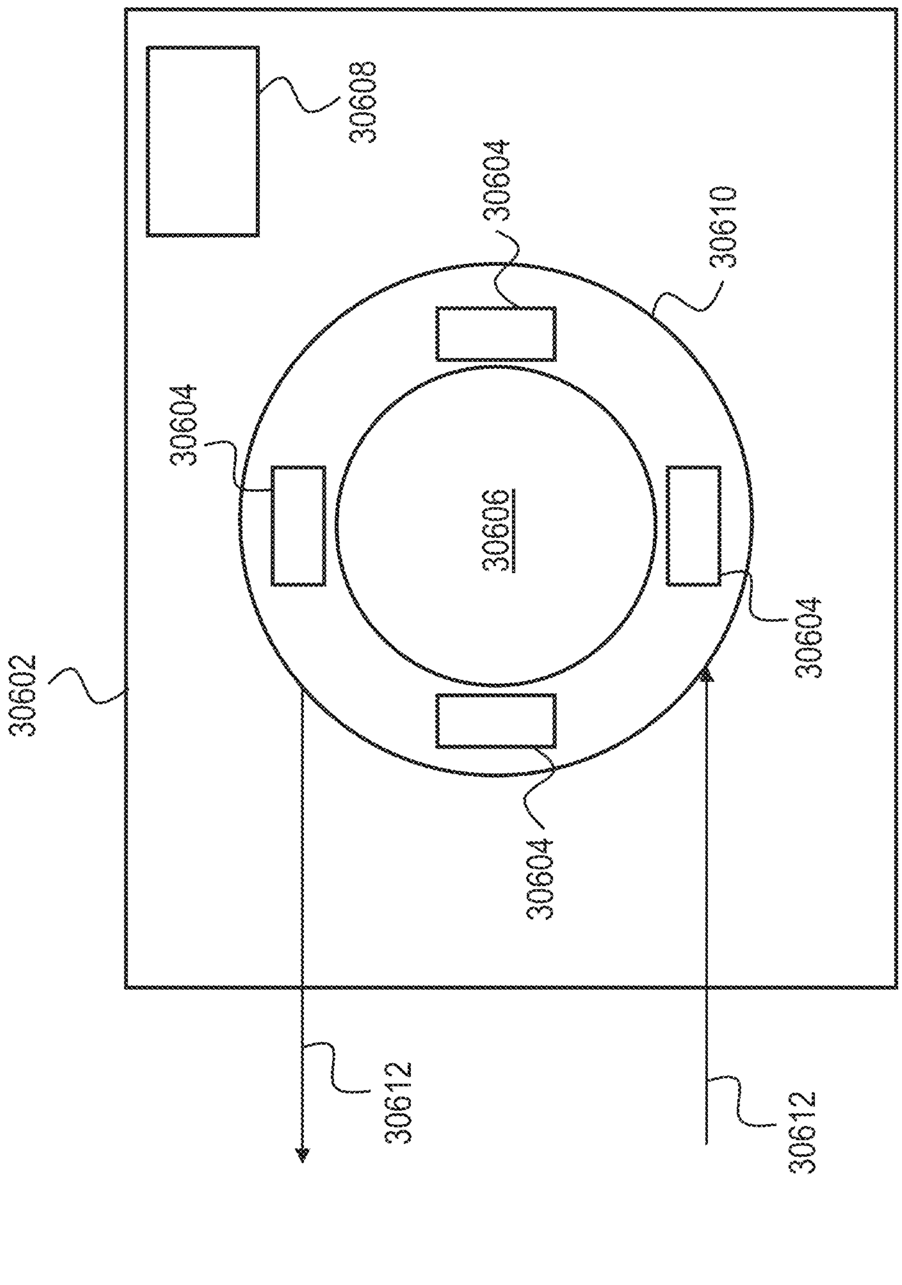

FIG. 306 depicts an embodiment example inverter including a number of transistor drivers.

Figure 307:
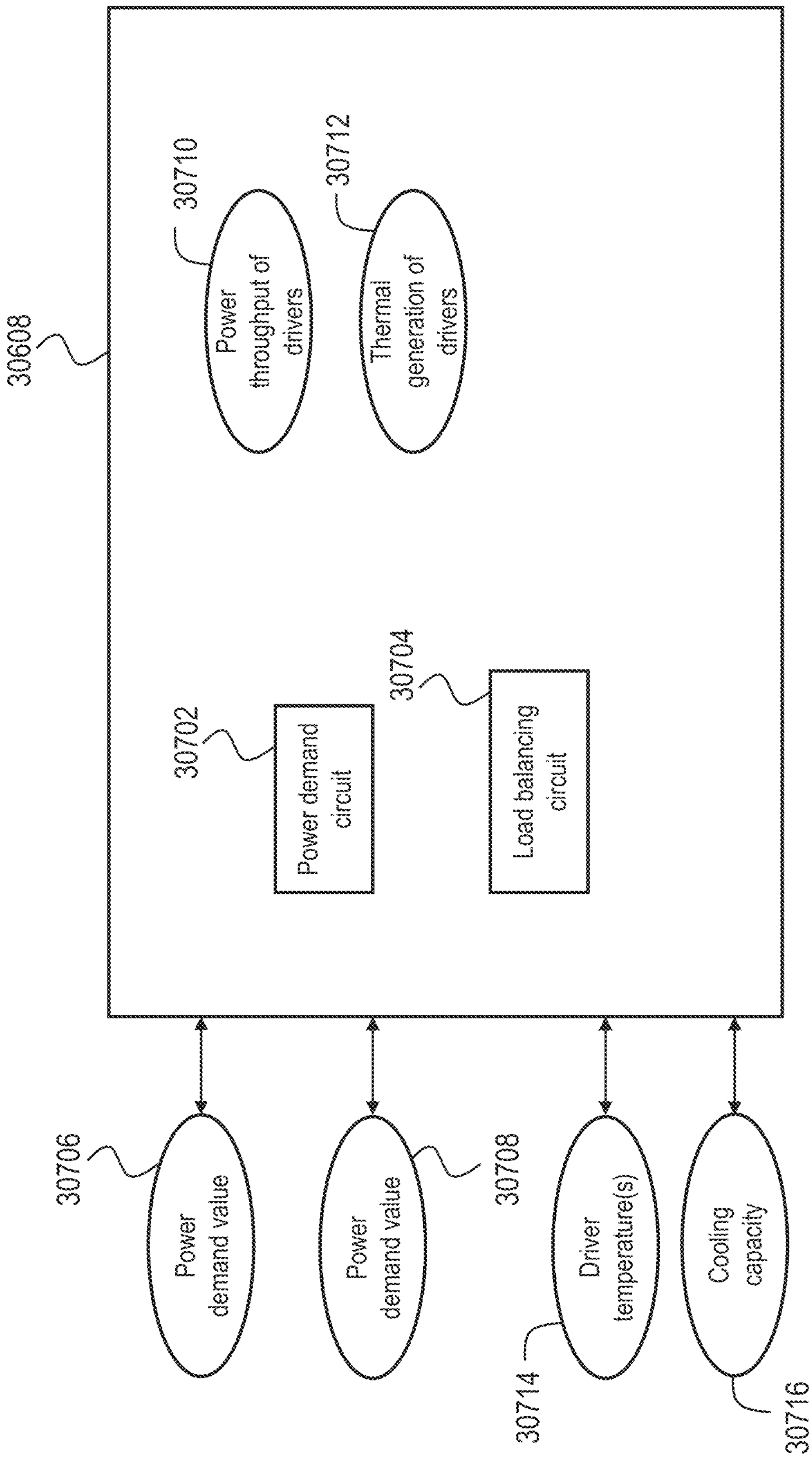

FIG. 307 depicts an embodiment example controller including a power demand circuit.

Figure 308:
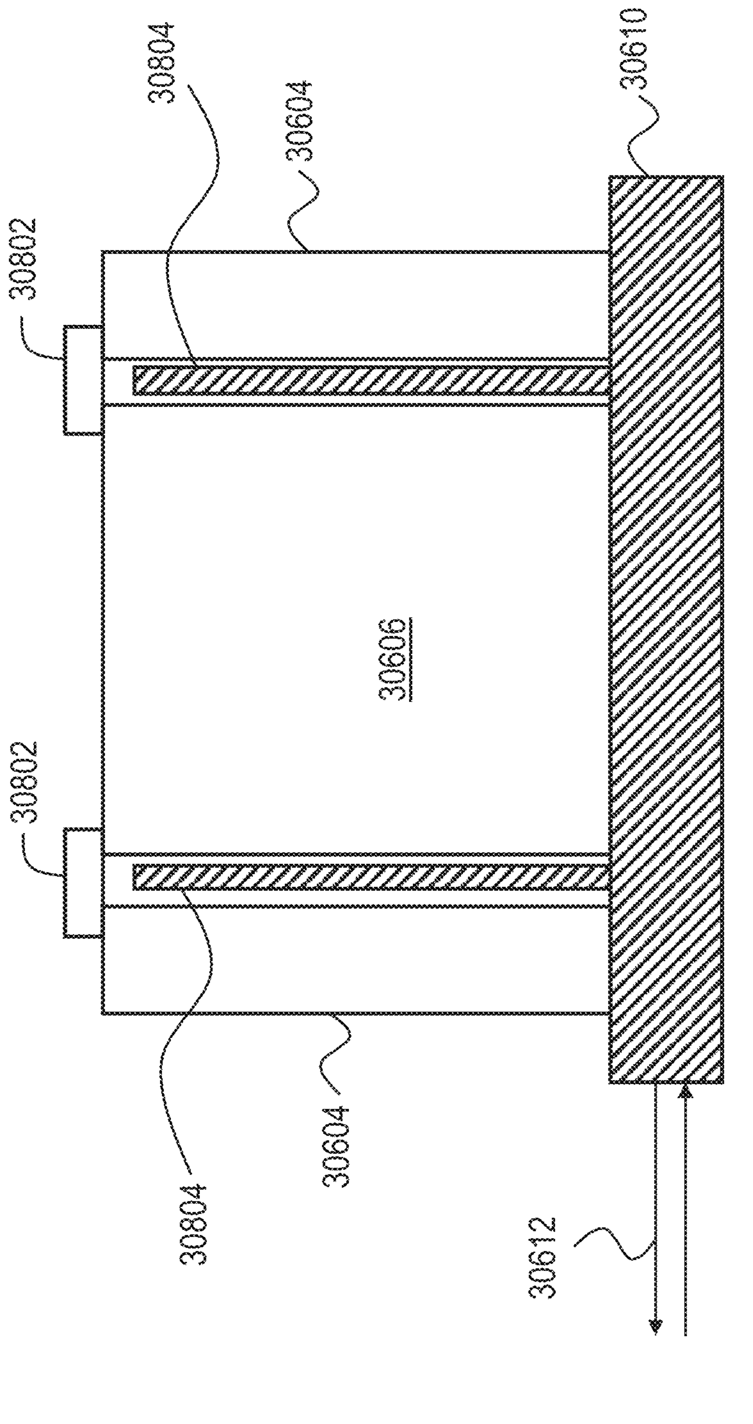

FIG. 308 depicts an embodiment example inverter in a side view.

Figure 309:
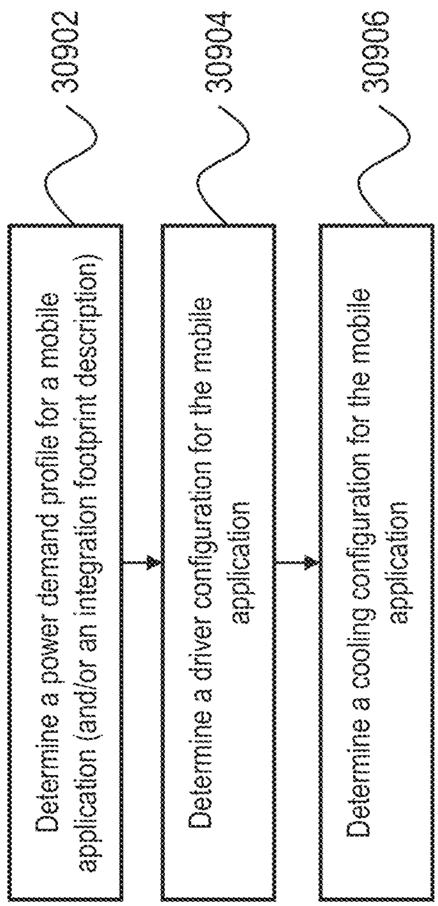

FIG. 309 depicts an embodiment example procedure to provide a configurable cooling scheme.

Figure 310:
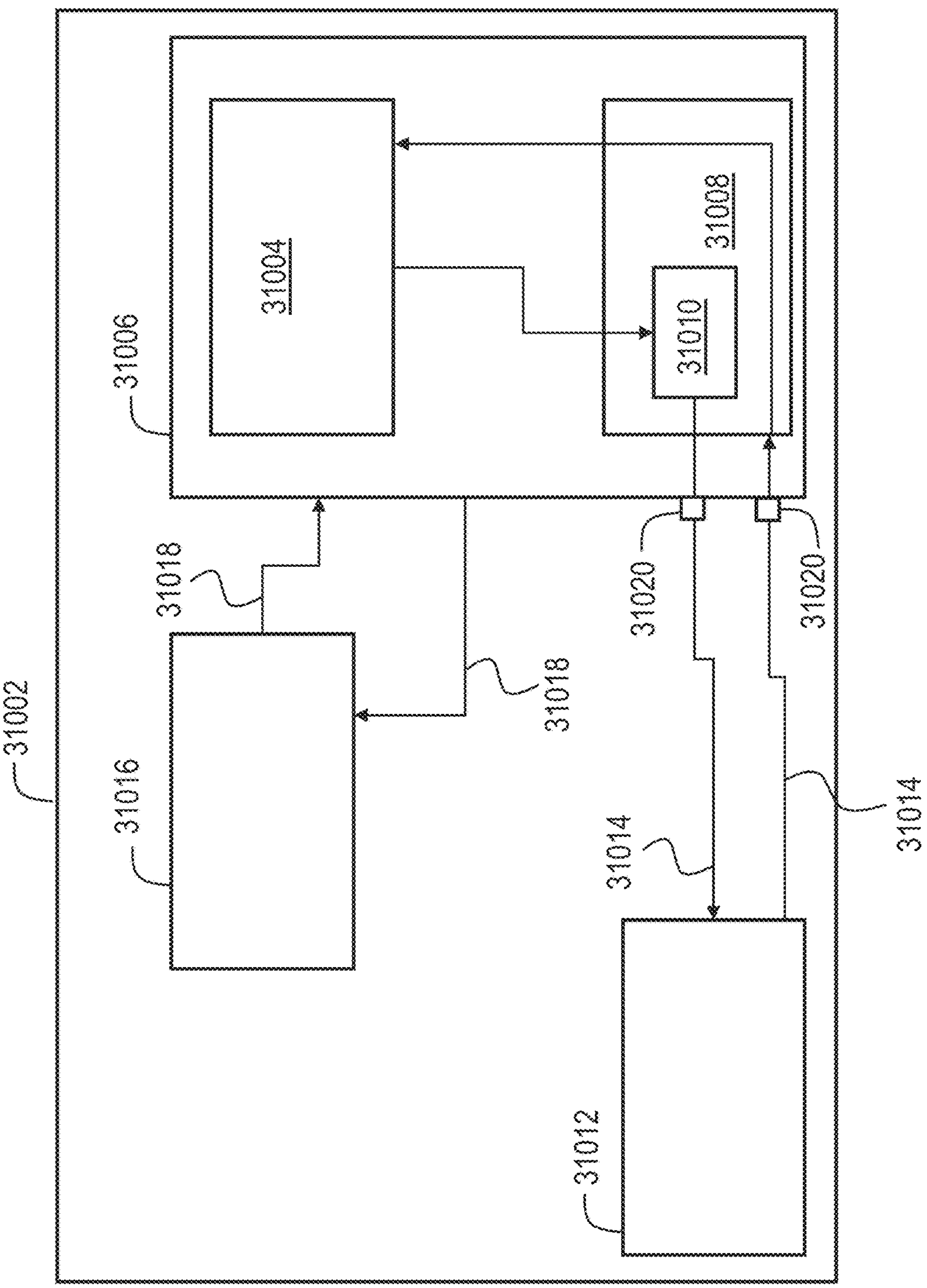

FIG. 310 depicts an embodiment example mobile application including a motive power circuit.

Figure 311:
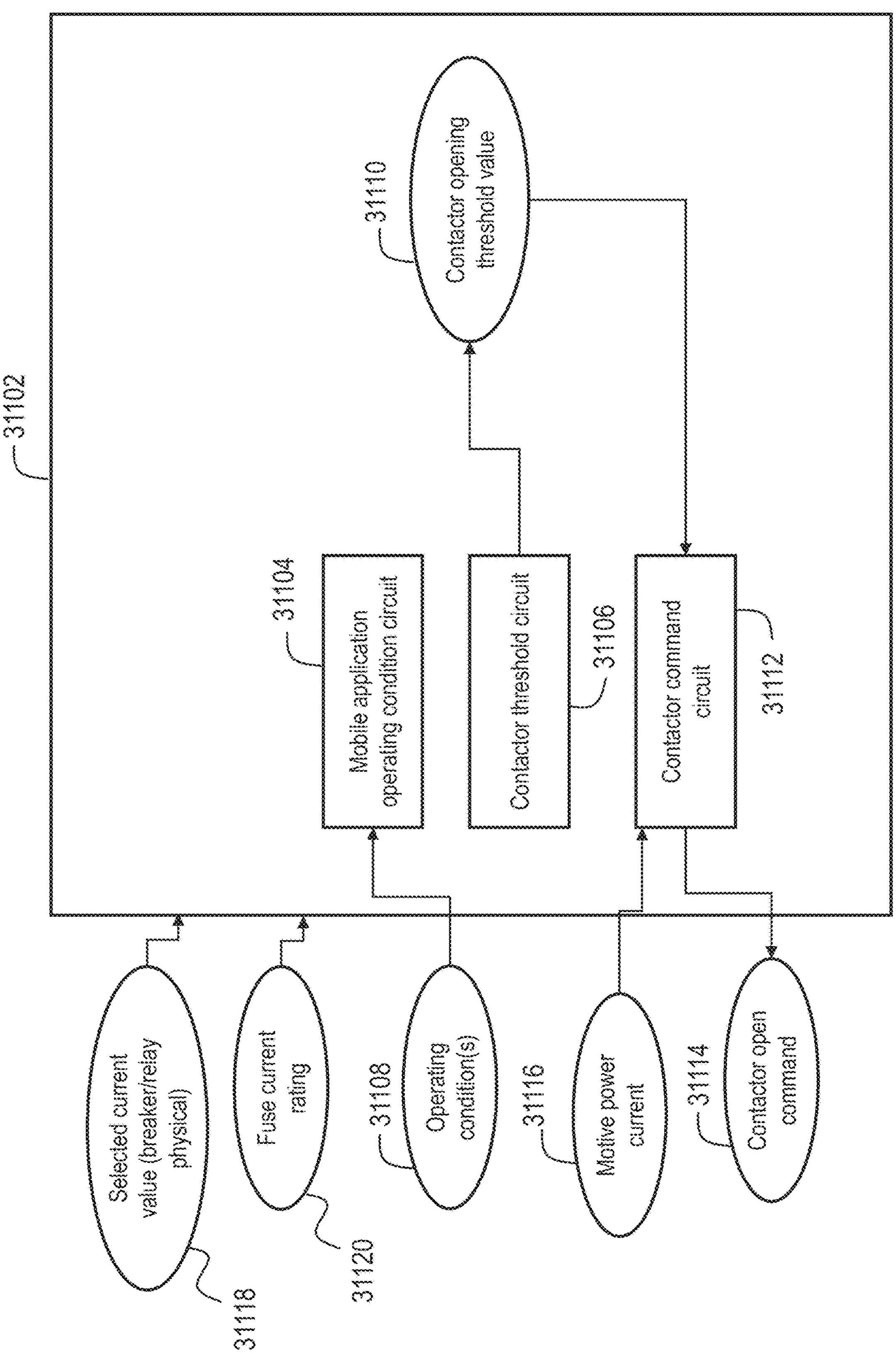

FIG. 311 depicts an embodiment example controller for a mobile application.

Figure 312:
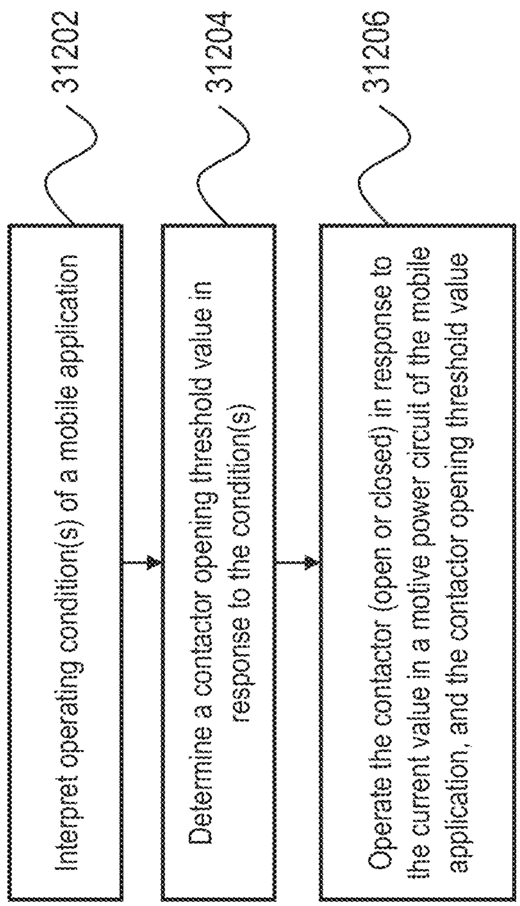

FIG. 312 depicts an embodiment example procedure for operating a contactor.

Figure 313:
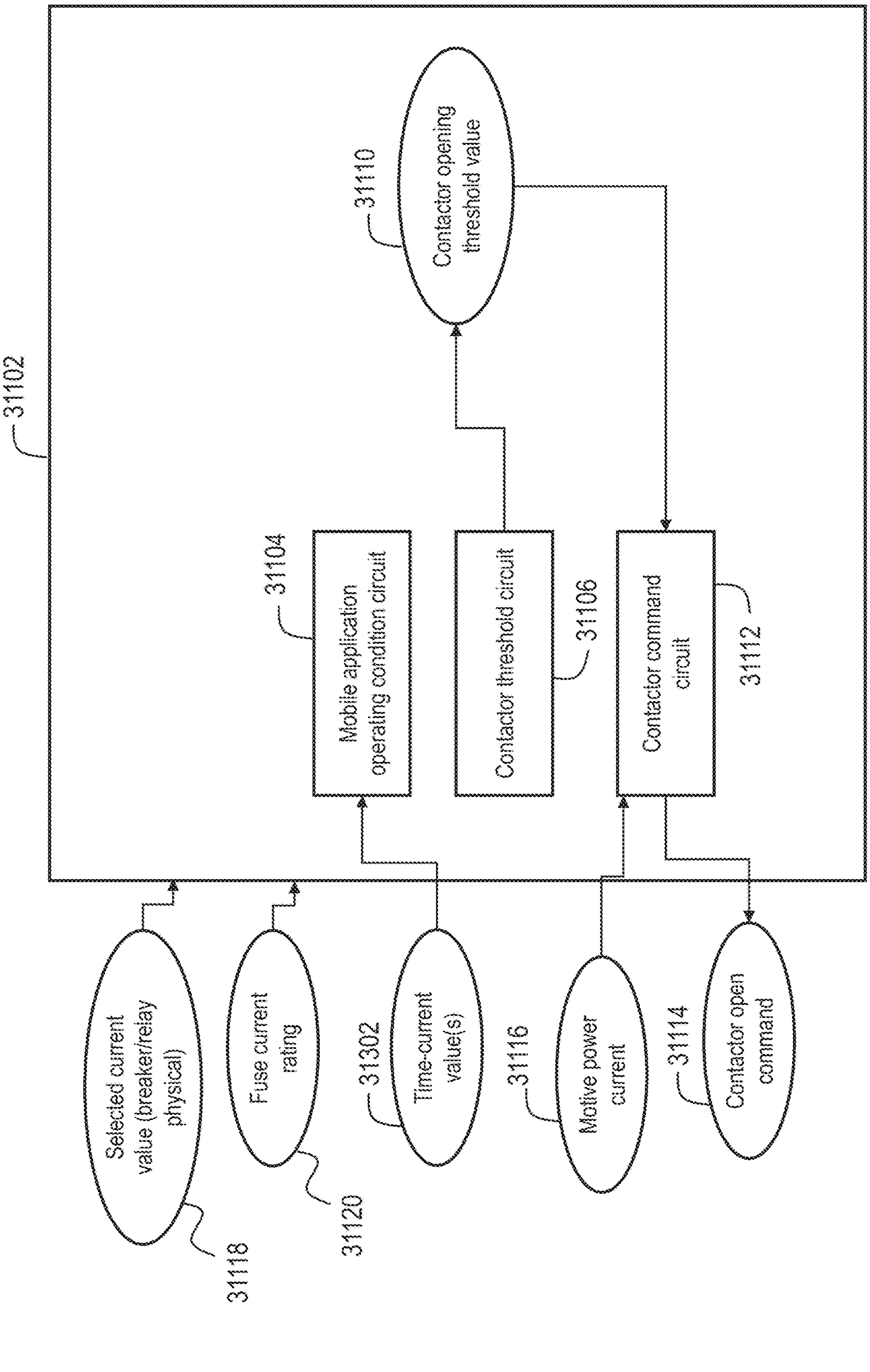

FIG. 313 depicts an embodiment example controller for a mobile application.

Figure 314:
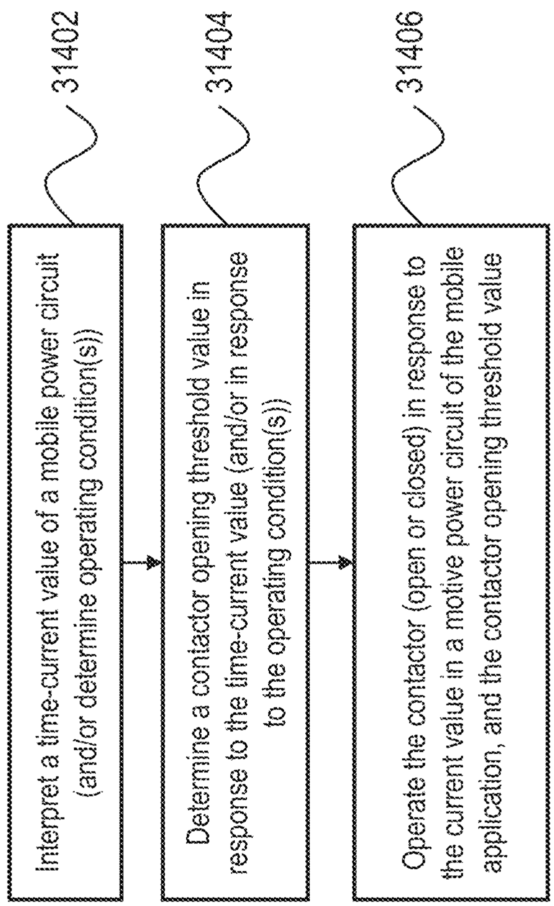

FIG. 314 depicts an embodiment example procedure for operating a contactor.

Figure 315:
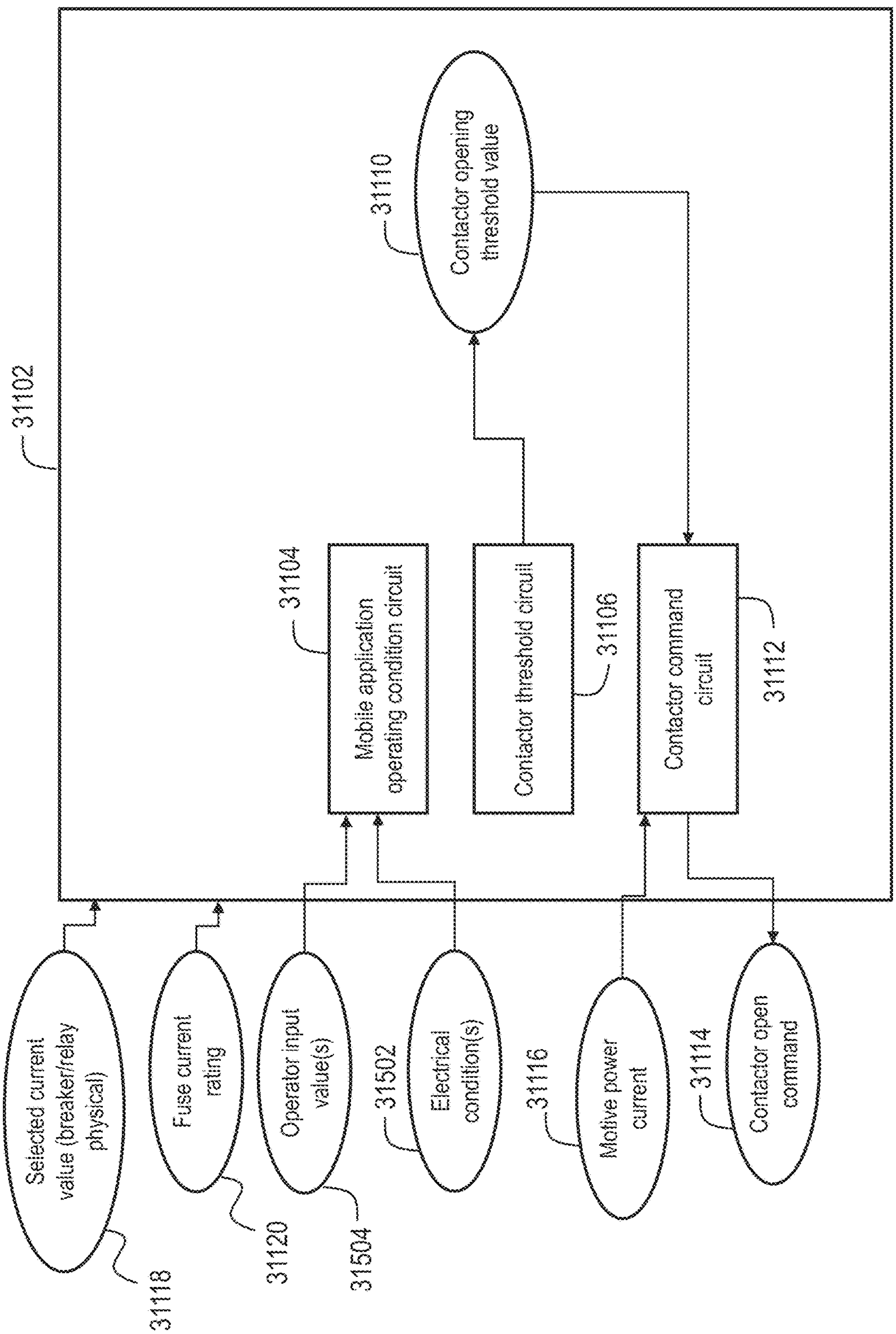

FIG. 315 depicts an embodiment example controller for a mobile application.

Figure 316:
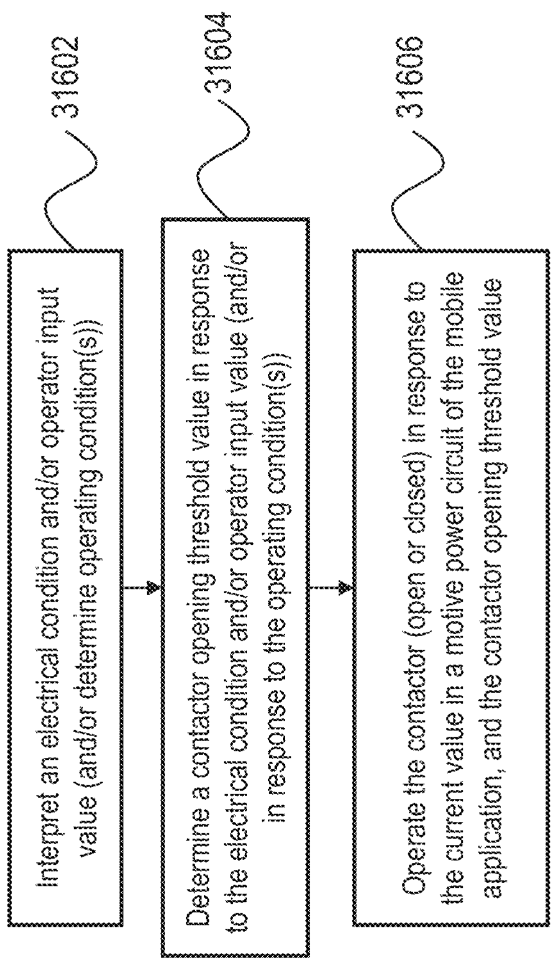

FIG. 316 depicts an embodiment example procedure for operating a contactor.

Figure 317:
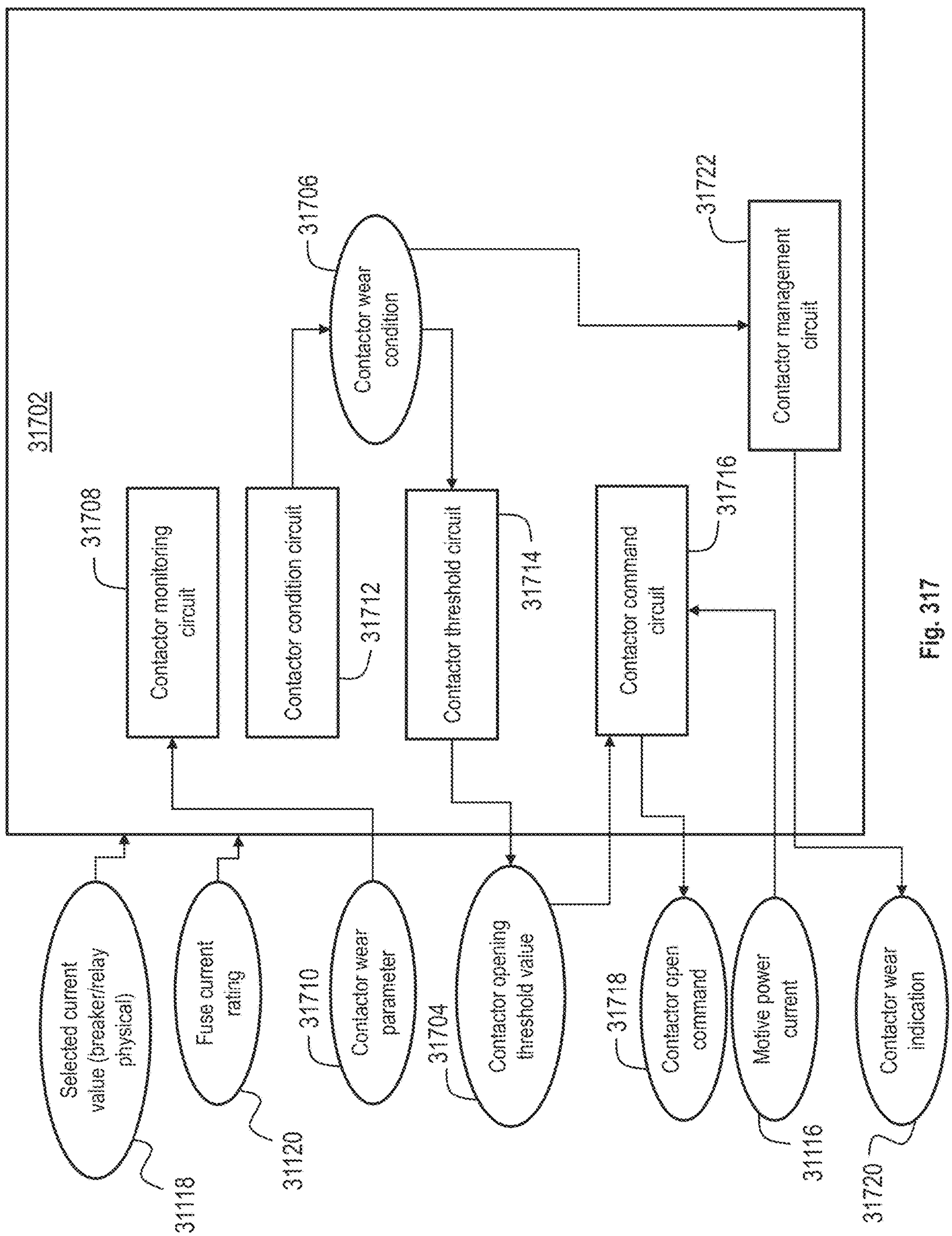

FIG. 317 depicts an embodiment an example controller providing a contactor operating threshold value in response to a condition of a contactor of the mobile application.

Figure 318:
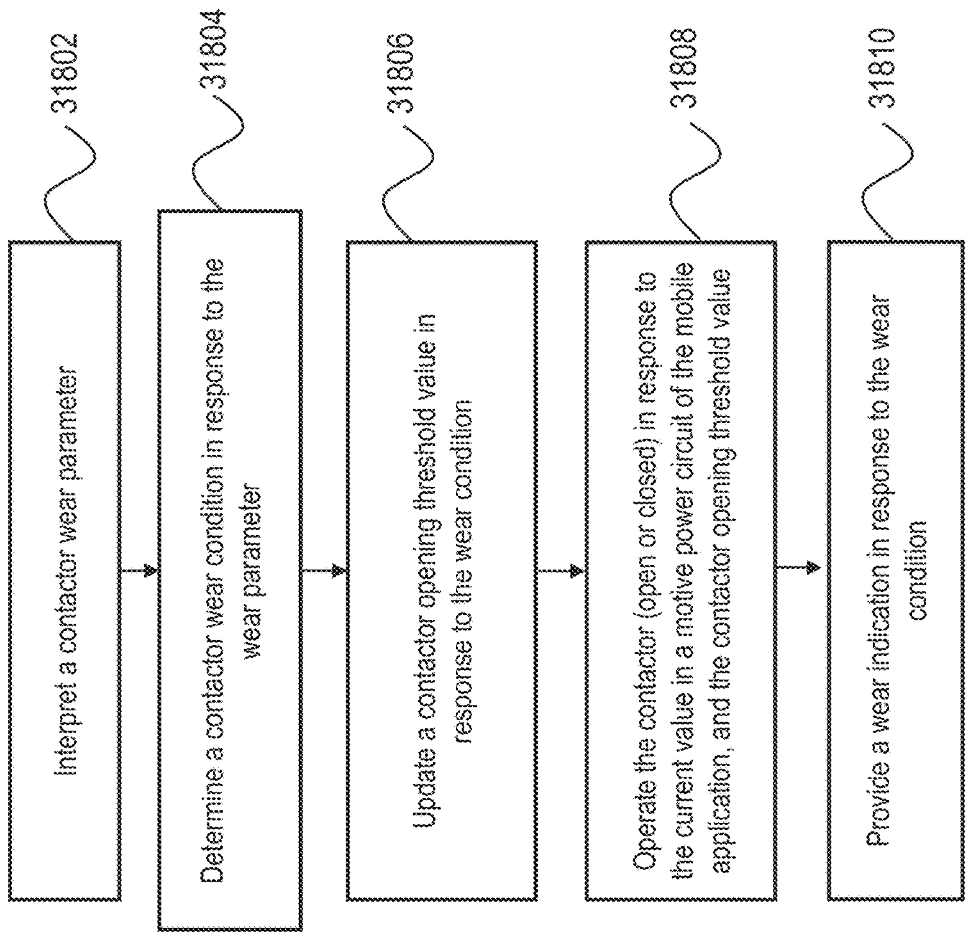

FIG. 318 depicts an embodiment example procedure for providing a contactor operating threshold value in response to a condition of a contactor of the mobile application.

Figure 319:
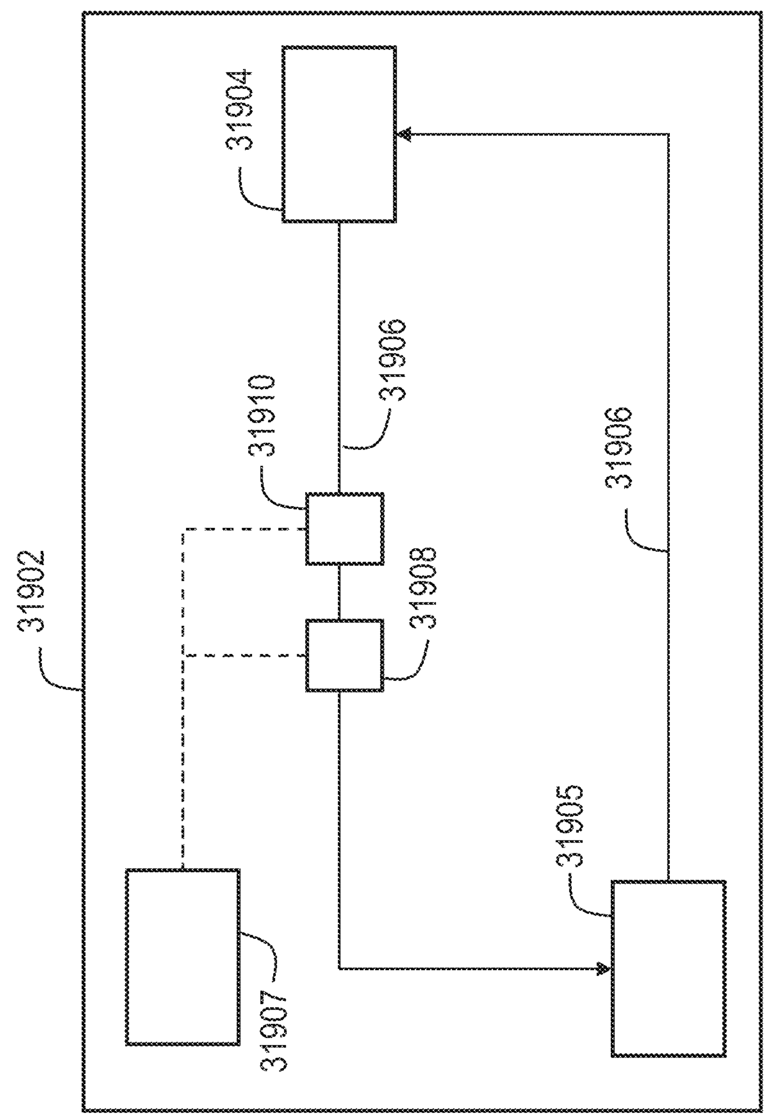

FIG. 319 depicts an embodiment example mobile application 31902 includes a motive power circuit.

Figure 320:
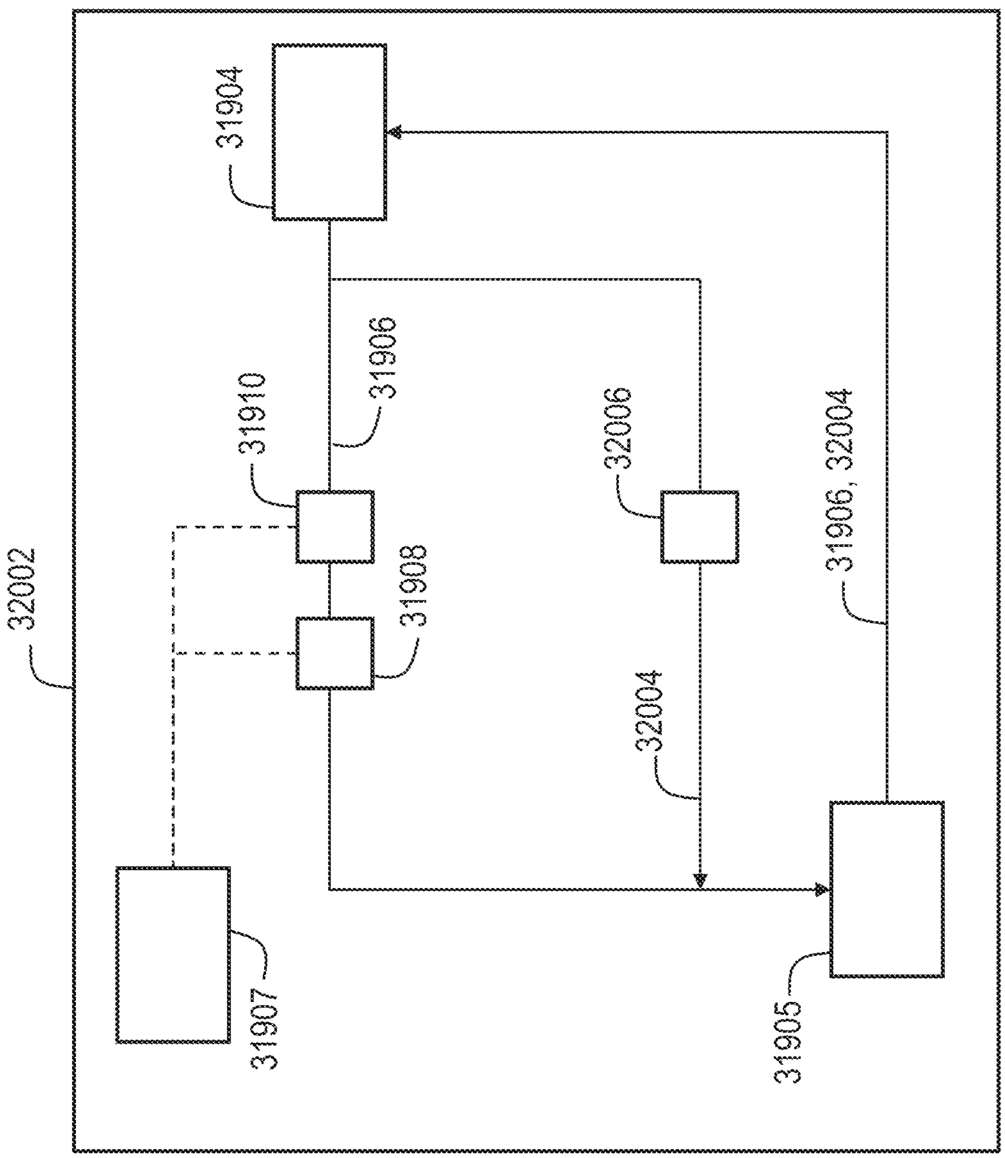

FIG. 320 depicts an embodiment example mobile application.

Figure 321:
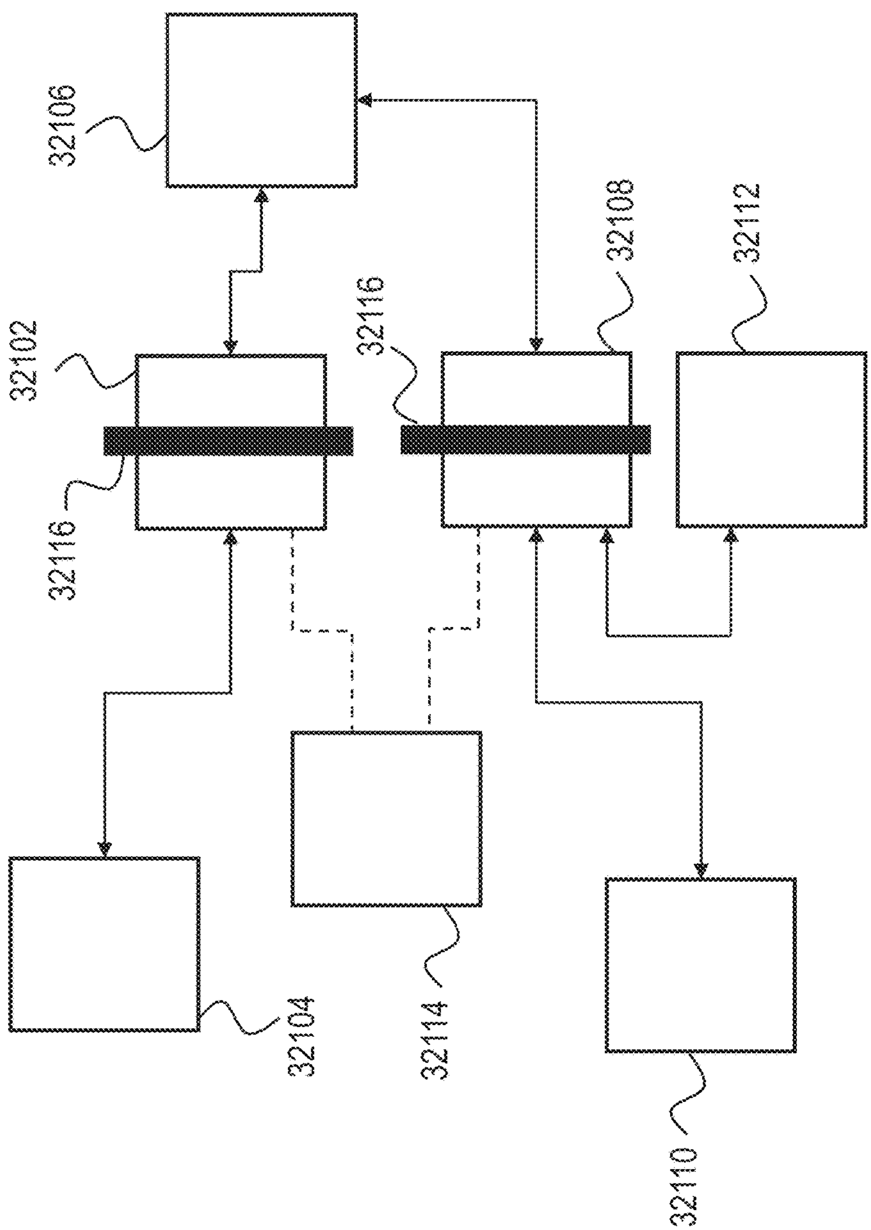

FIG. 321 depicts an embodiment example power electronic assembly for a mobile application.

Figure 322:
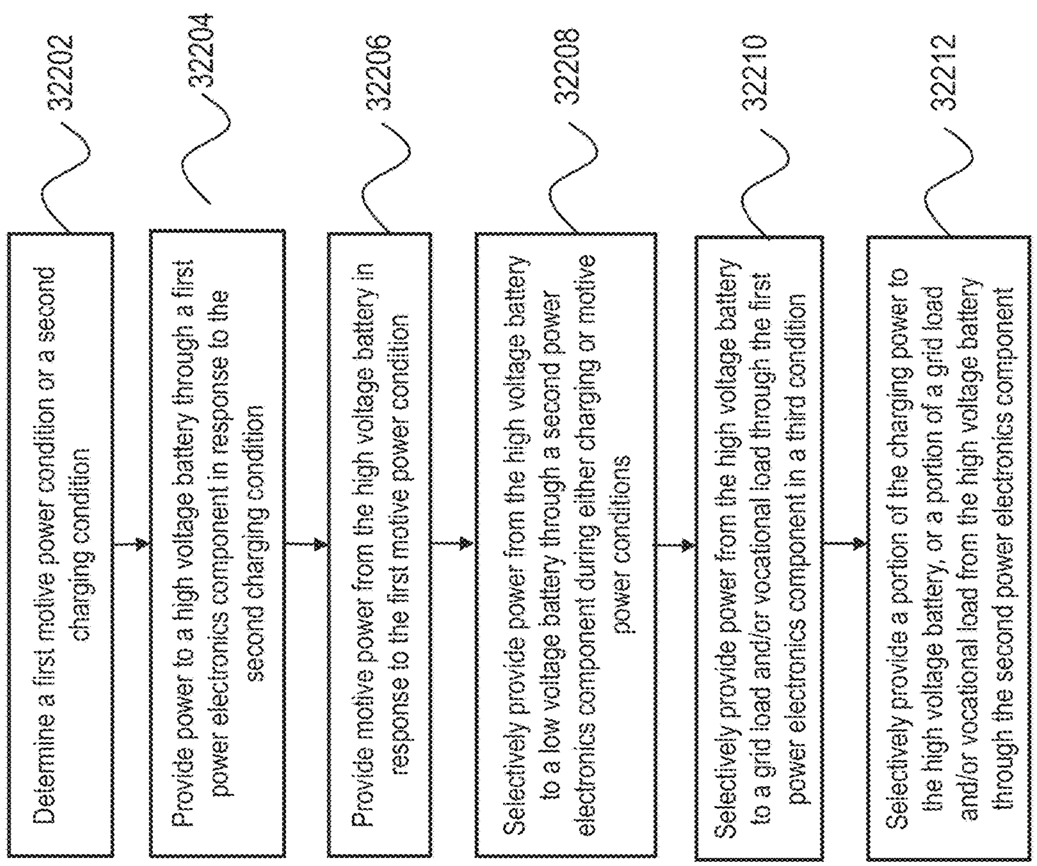

FIG. 322 depicts an embodiment example procedure for configuring charging power electronics for a mobile application.

Figure 323:
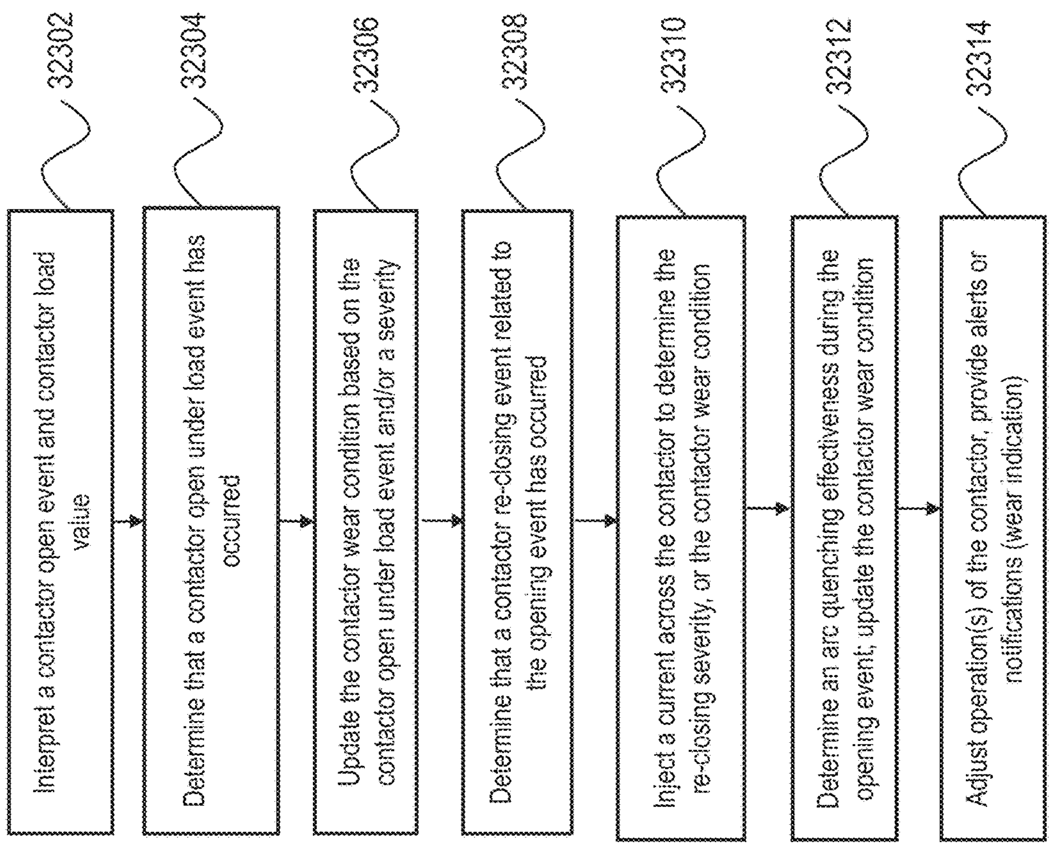

FIG. 323 depicts an embodiment example procedure to determine and/or update a wear condition of a contactor.

Figure 324:
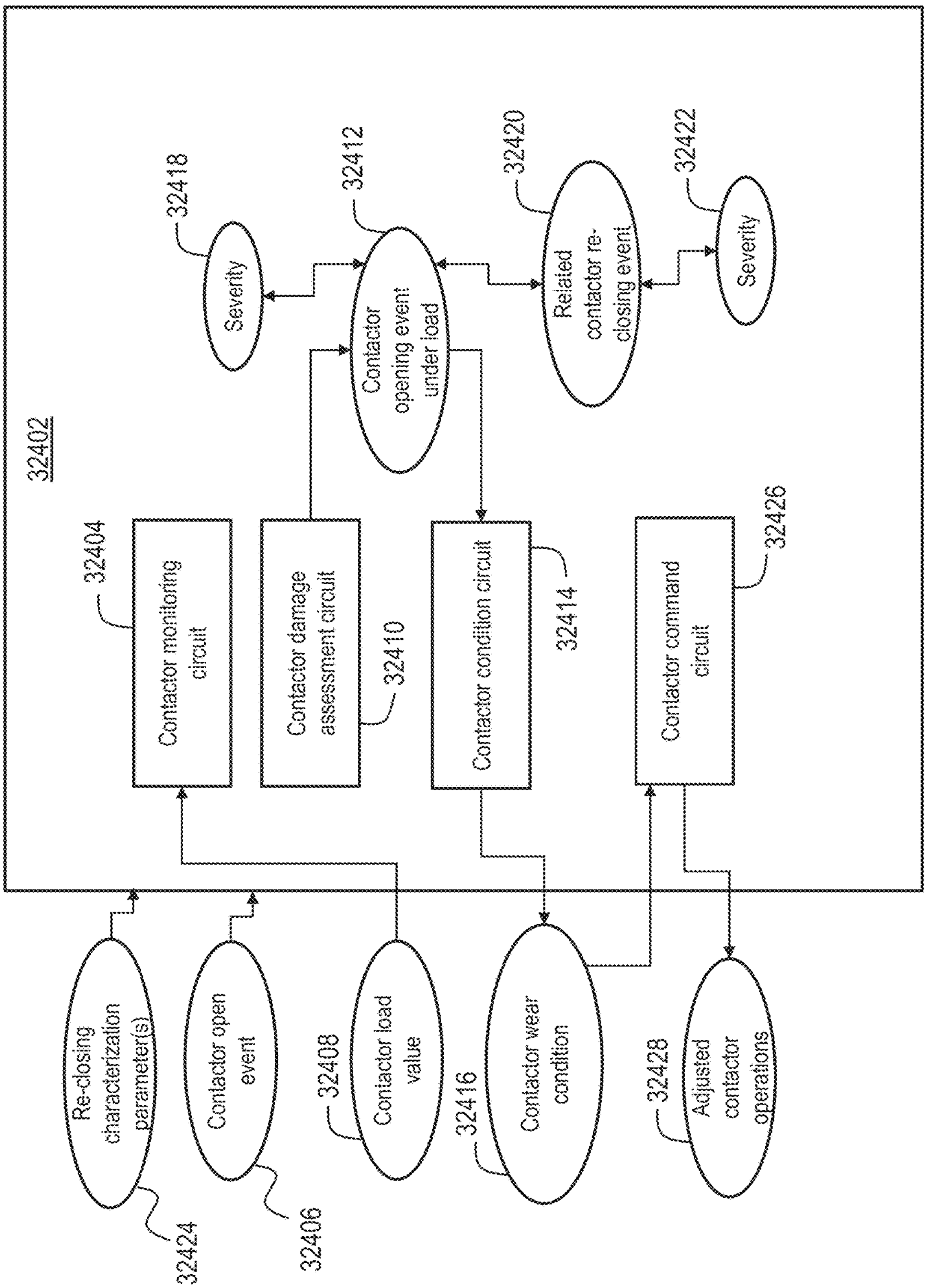

FIG. 324 depicts an embodiment example apparatus to determine or update a contactor wear condition.

Figure 325:
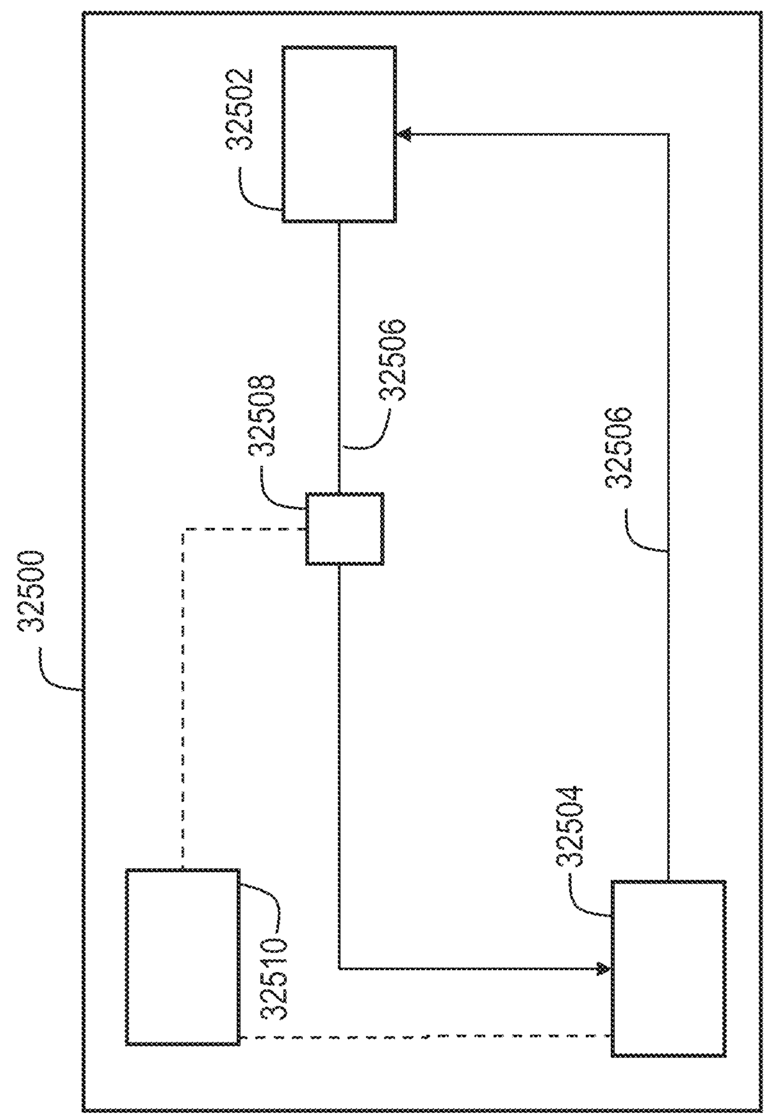

FIG. 325 depicts an embodiment example mobile application includes a motive power circuit having a power storage device and an electrical load.

Figure 326:
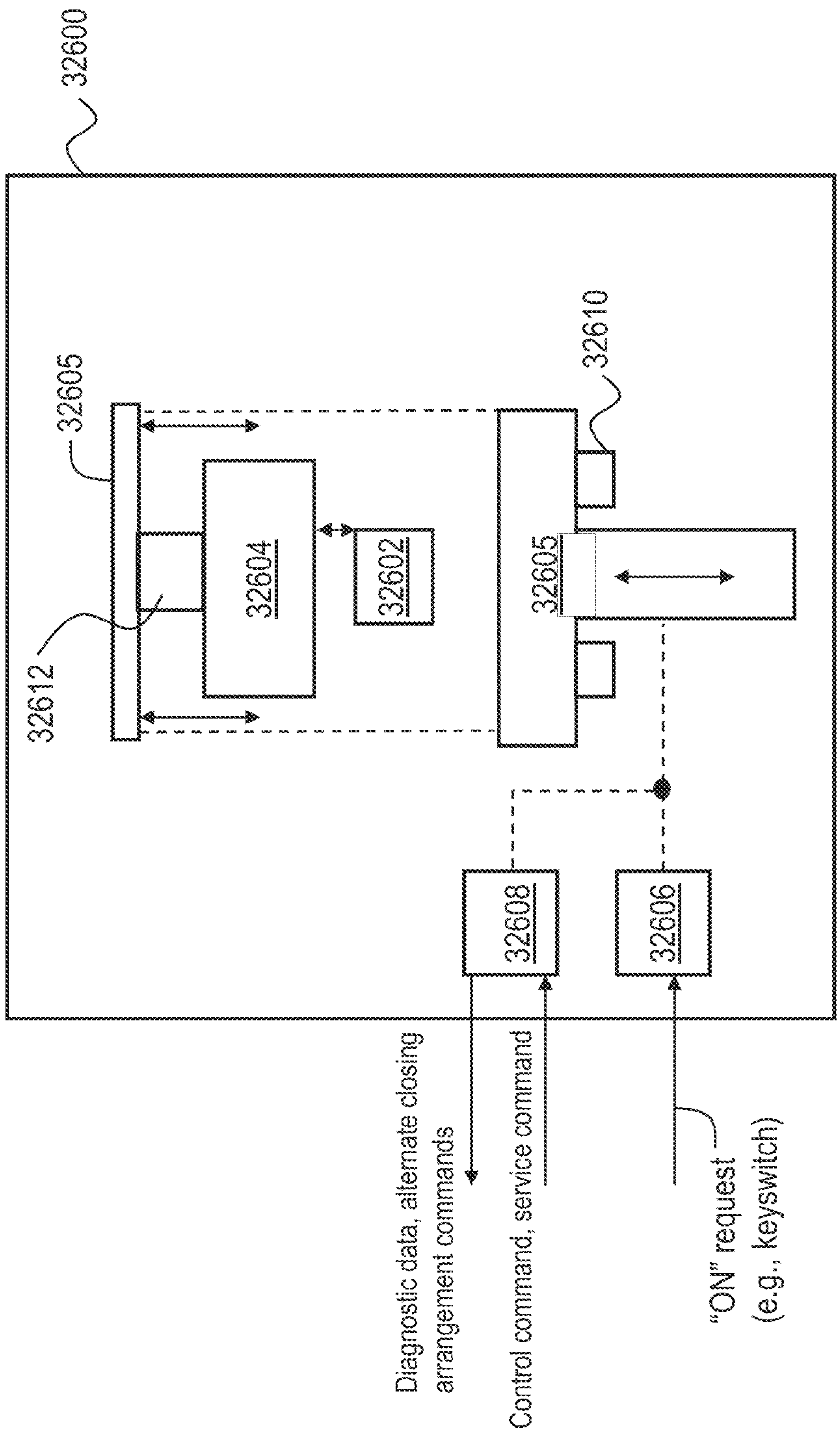

FIG. 326 depicts an embodiment example breaker/relay.

Figure 327:
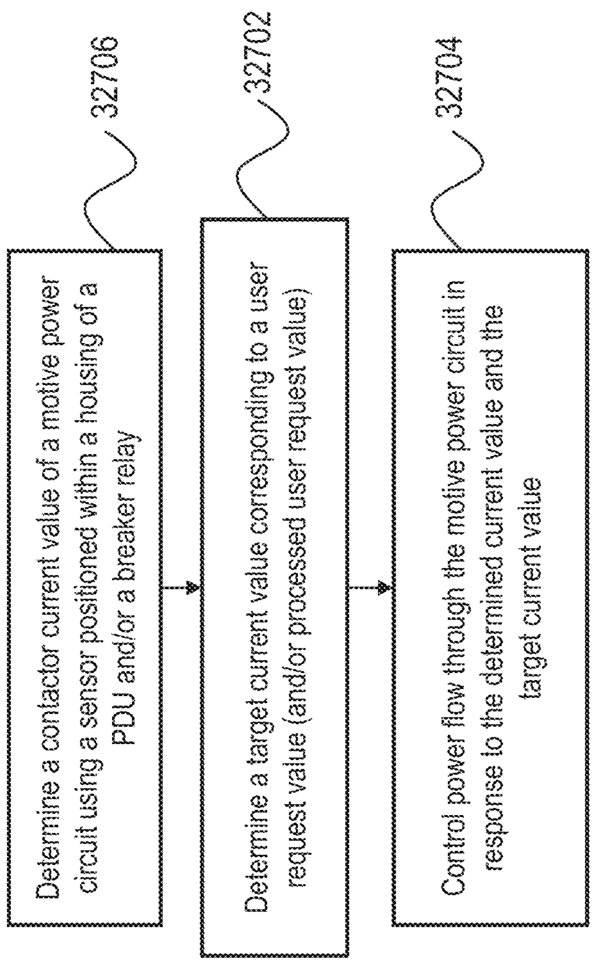

FIG. 327 depicts an embodiment example procedure includes an operation to detect a contactor current value for a contactor of a breaker/relay positioned in a motive power circuit of a mobile application.

Figure 328:
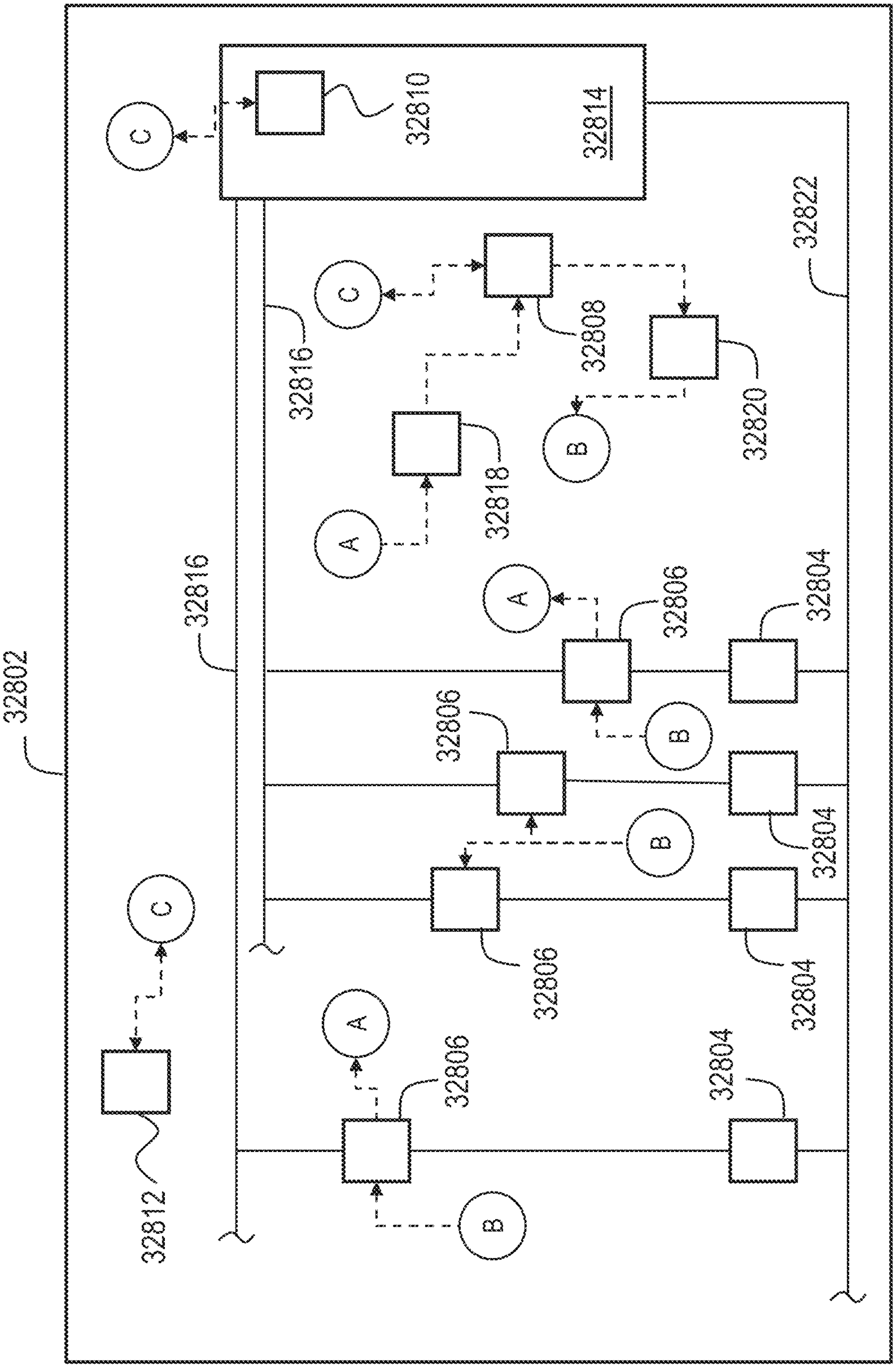

FIG. 328 depicts an embodiment example mobile application including a number of loads and a power bus.

Figure 329:
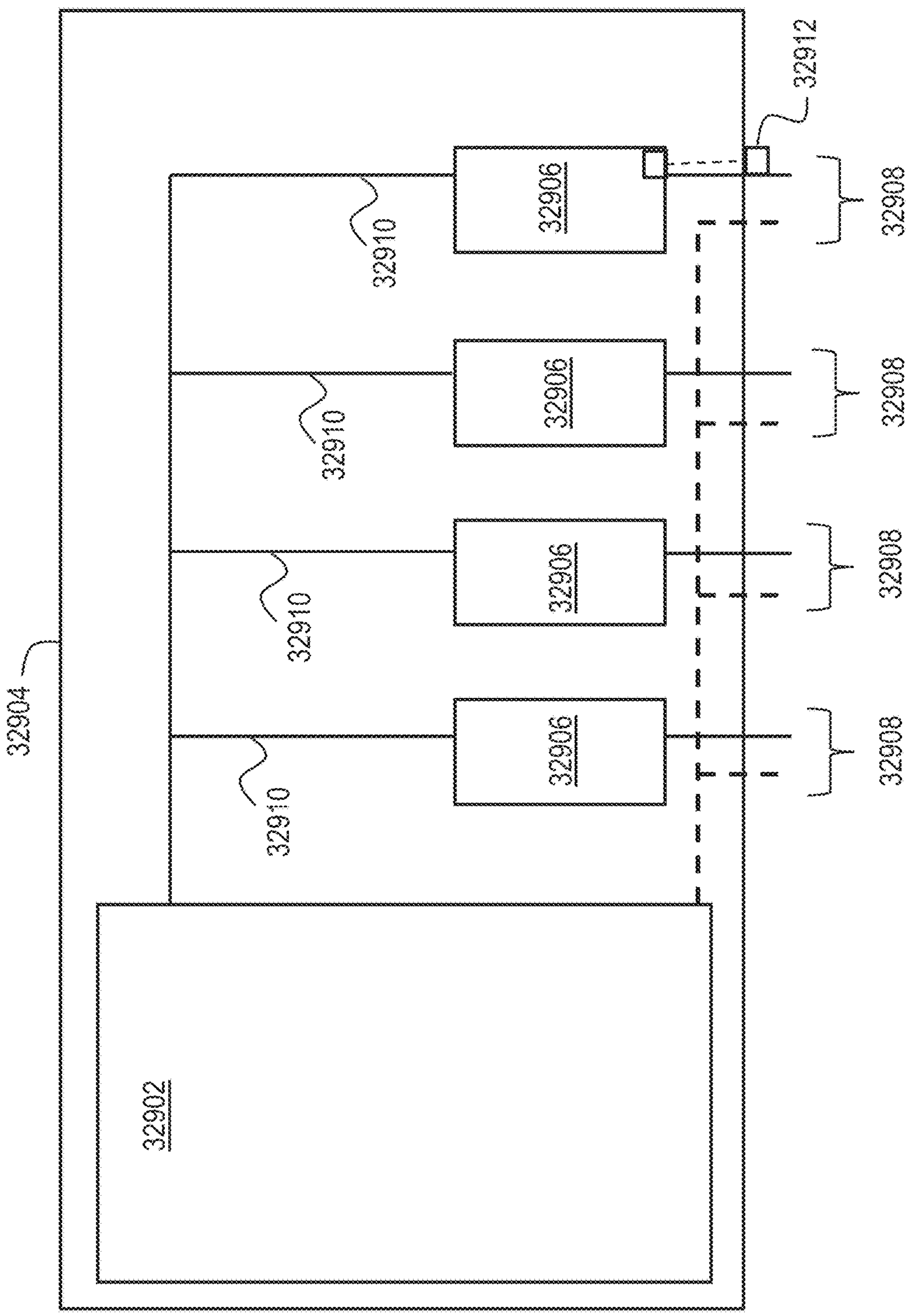

FIG. 329 depicts an embodiment example high voltage battery pack for a mobile application.

Figure 330:
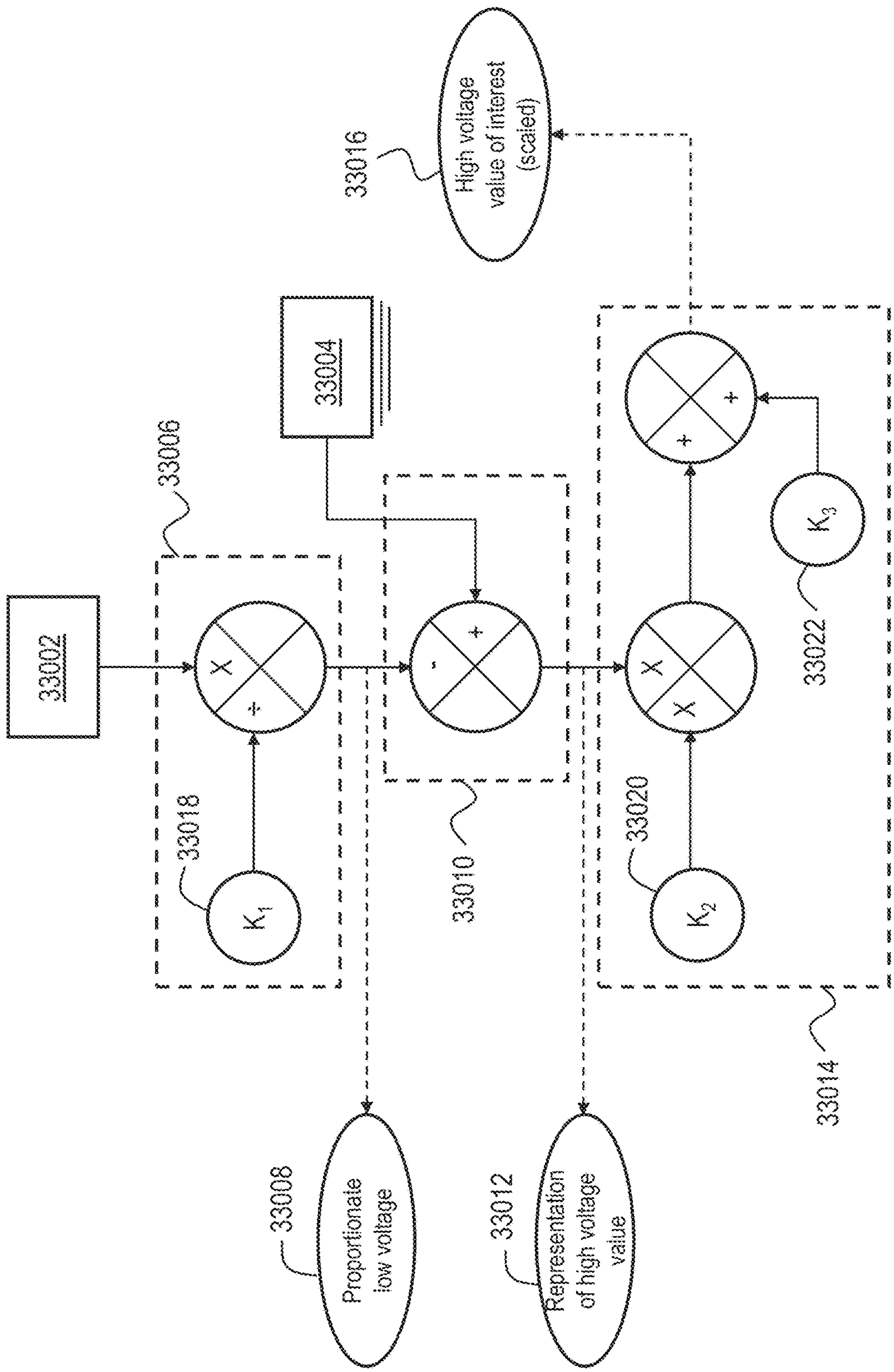

FIG. 330 depicts an embodiment an apparatus for measuring a high voltage with high accuracy.

Figure 331:
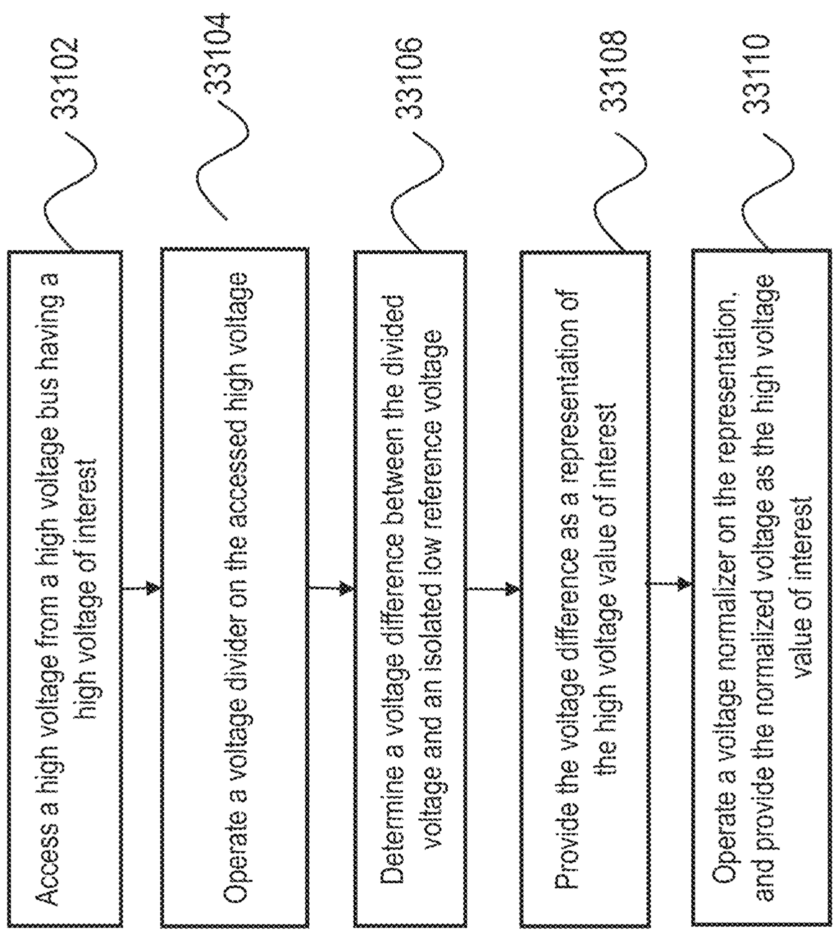

FIG. 331 depicts an embodiment example procedure for providing a high accuracy sensor for a high voltage signal.

Figure 332:
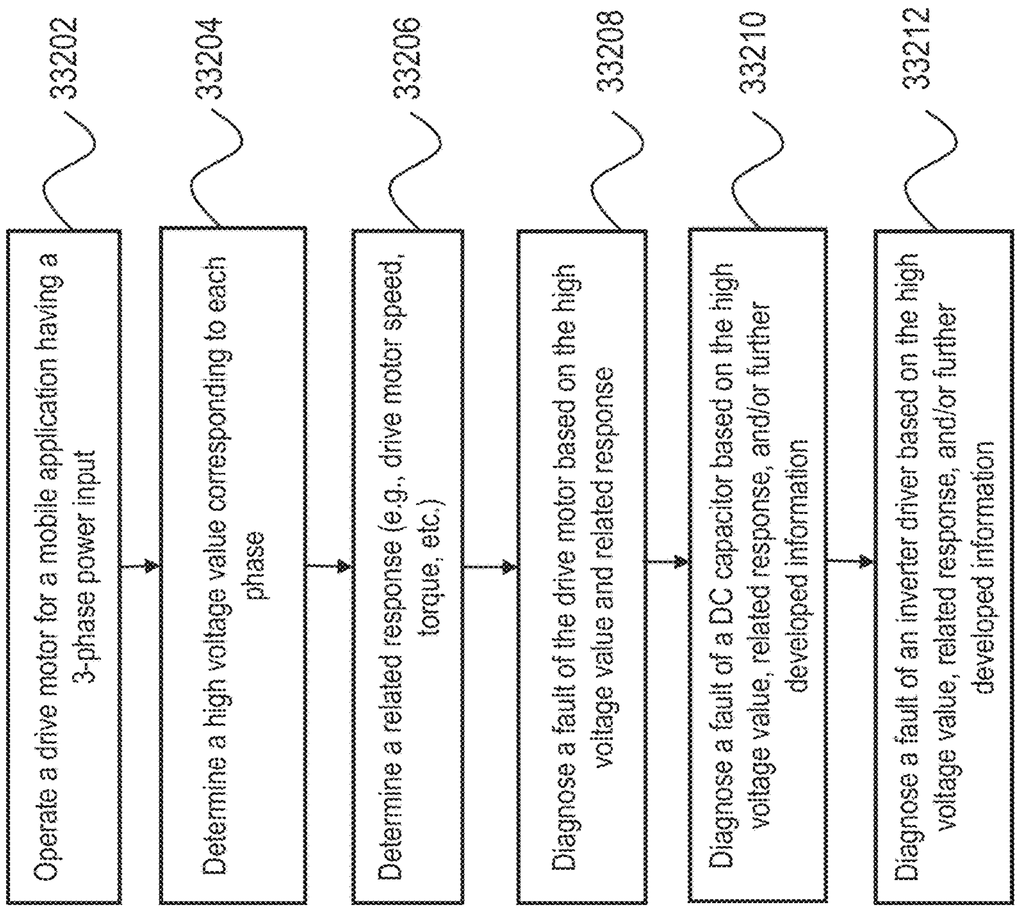

FIG. 332 depicts an embodiment example procedure for diagnosing a component fault using a sensed high voltage value.

Figure 333:
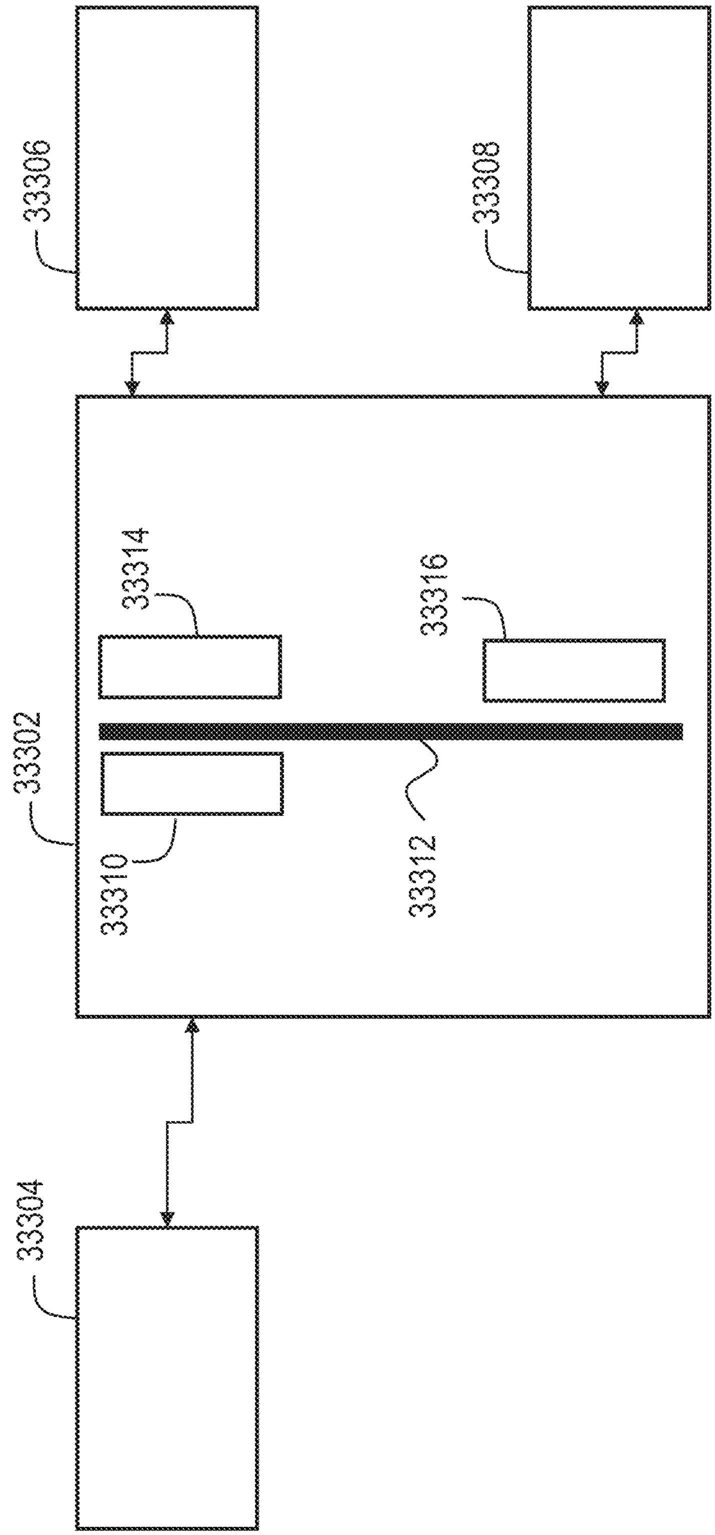
Figure 334:
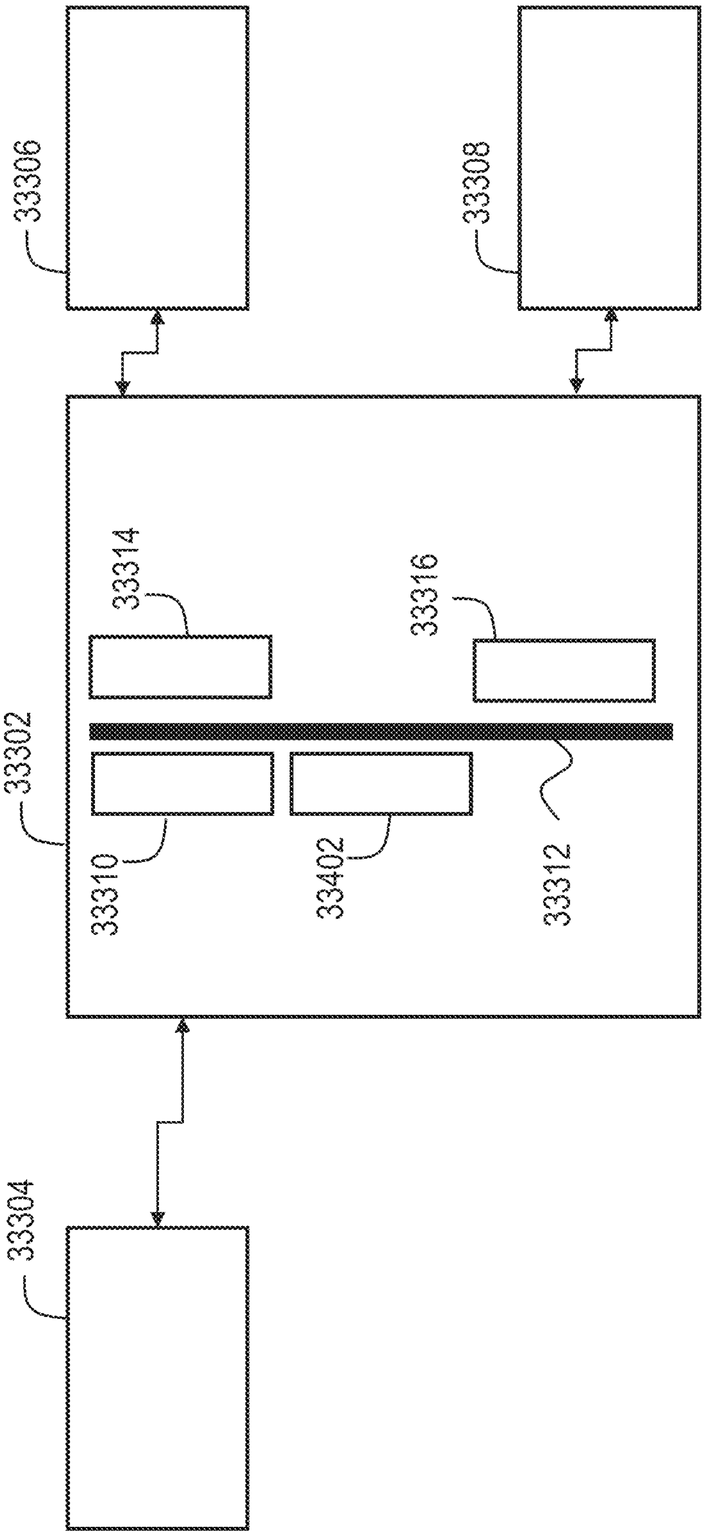

FIG. 333 depicts an embodiment example apparatus for providing power to transfer in a DC/DC converter assembly for a mobile application FIG. 334 depicts an embodiment example DC/DC converter assembly.

Figure 335:
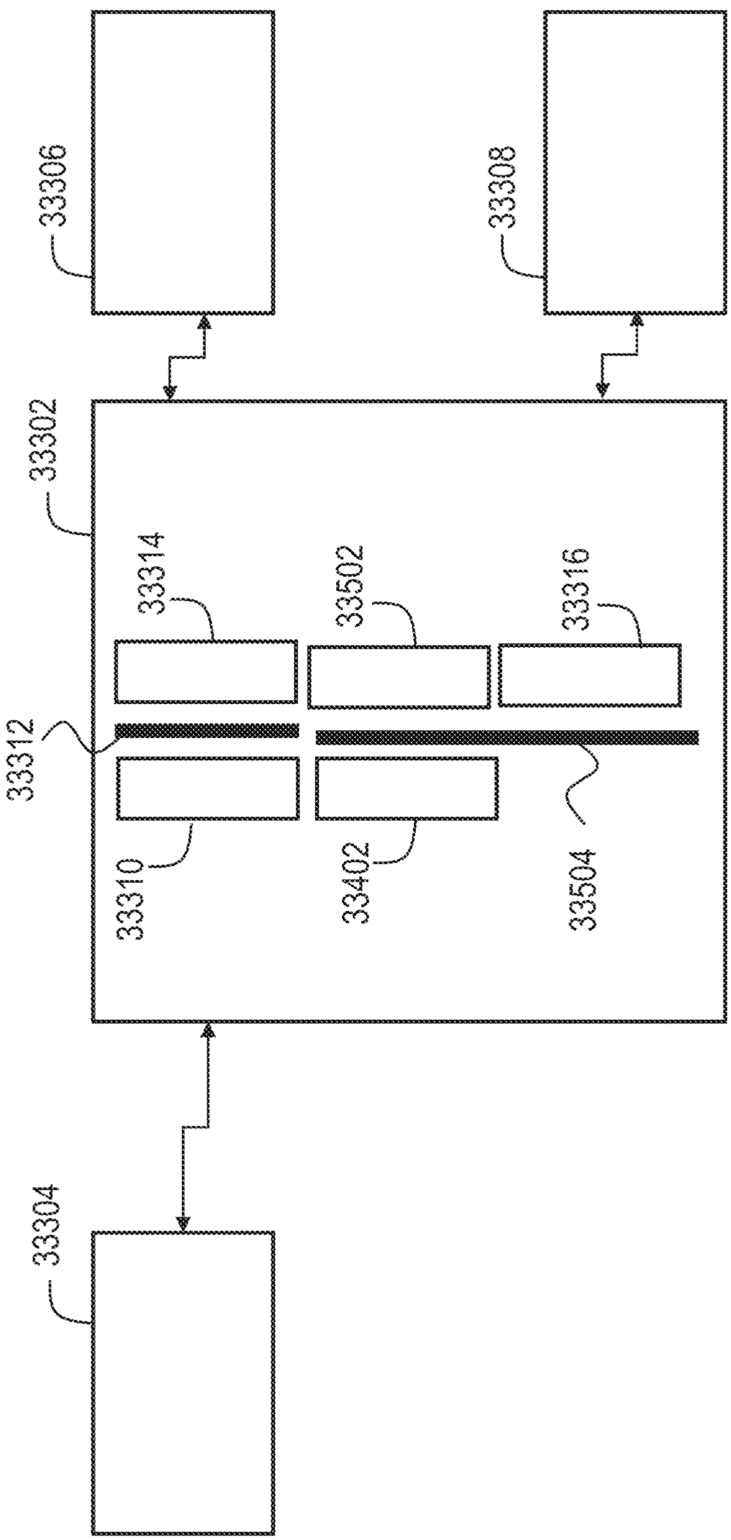

FIG. 335 depicts an embodiment example DC/DC converter assembly.

Figure 336:
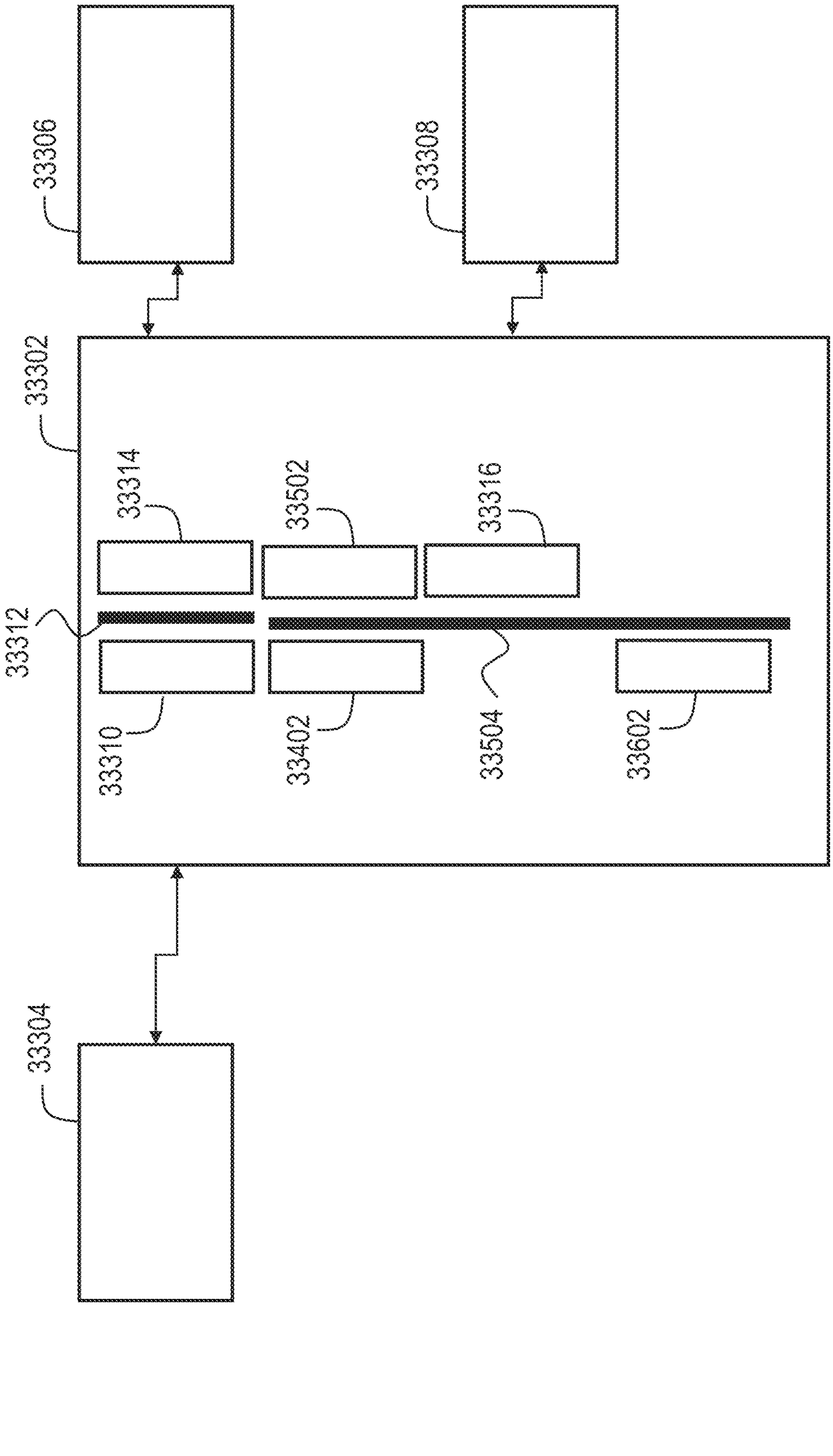

FIG. 336 depicts an embodiment example DC/DC converter assembly.

Figure 337:
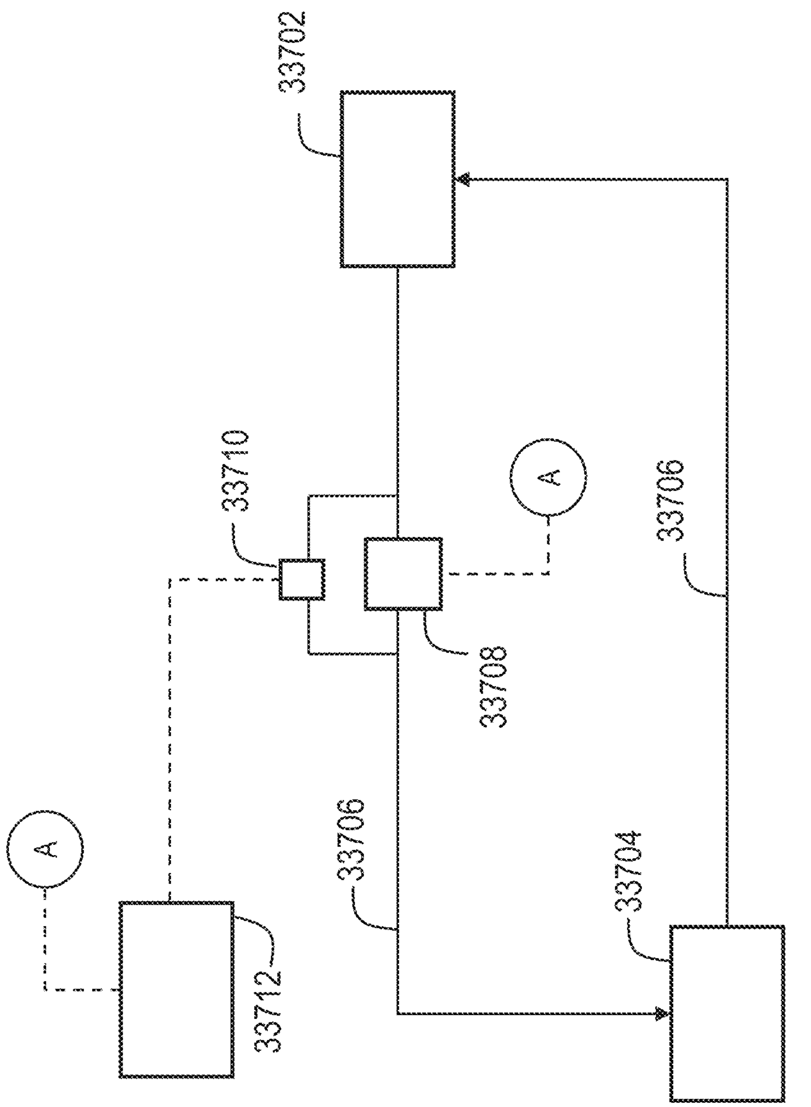

FIG. 337 depicts an embodiment example motive power circuit.

Figure 338:
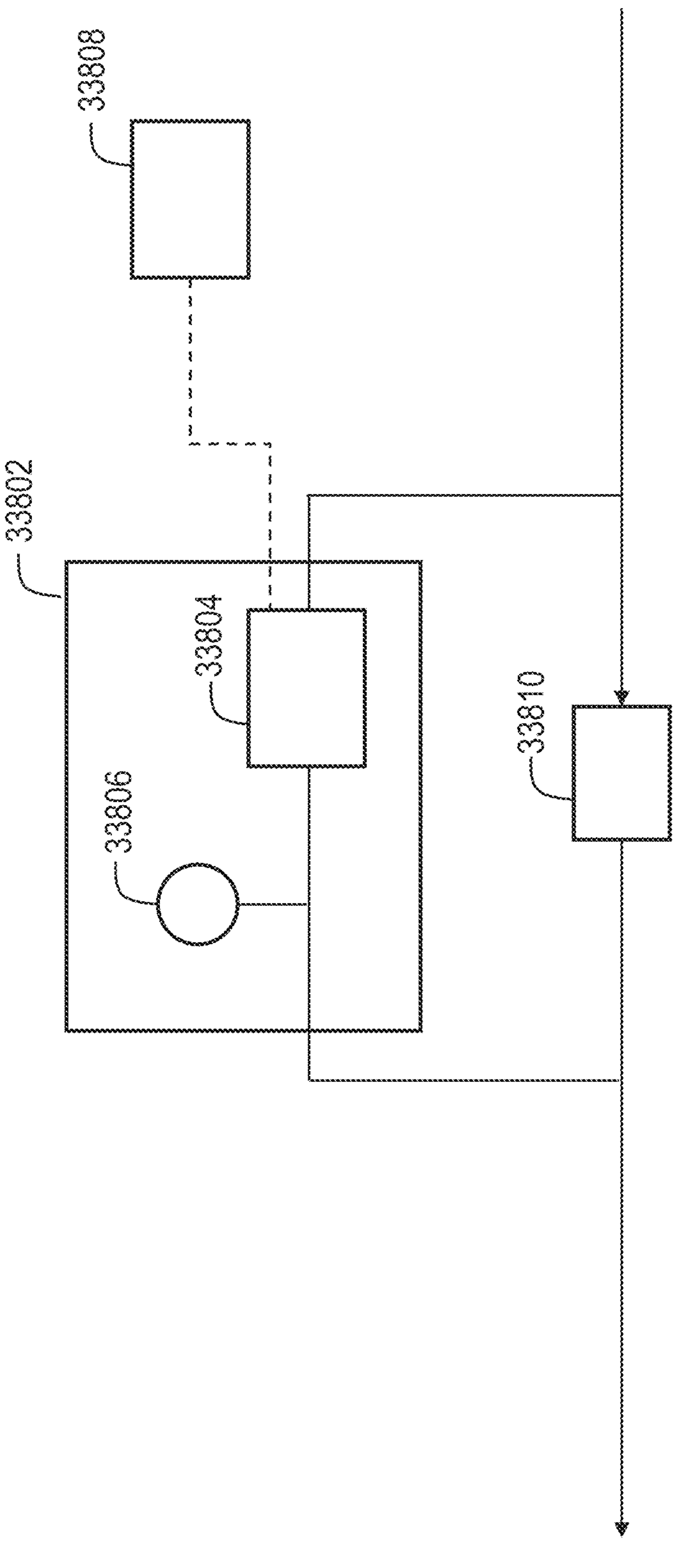

FIG. 338 depicts an embodiment example system for performing power distribution diagnostics in a mobile electric application.

Figure 339:
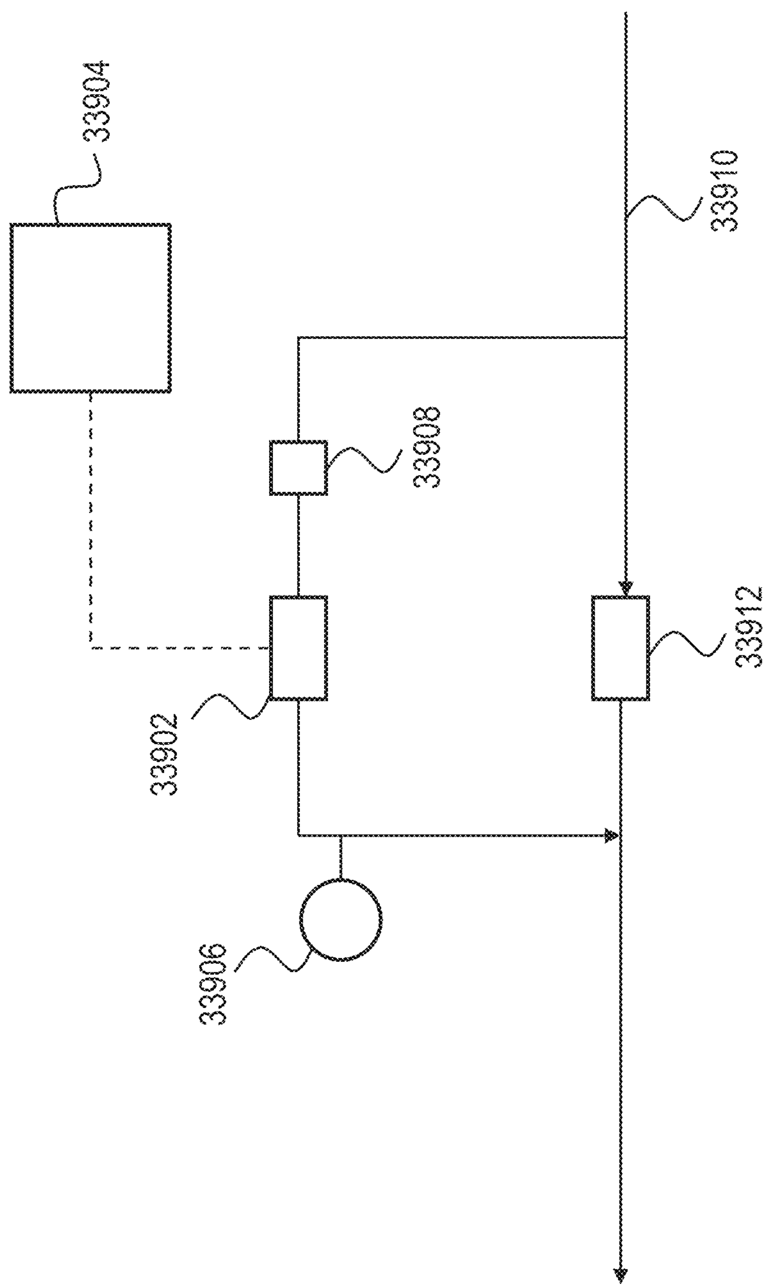

FIG. 339 depicts an embodiment example solid state pre-charge circuit.

Figure 340:
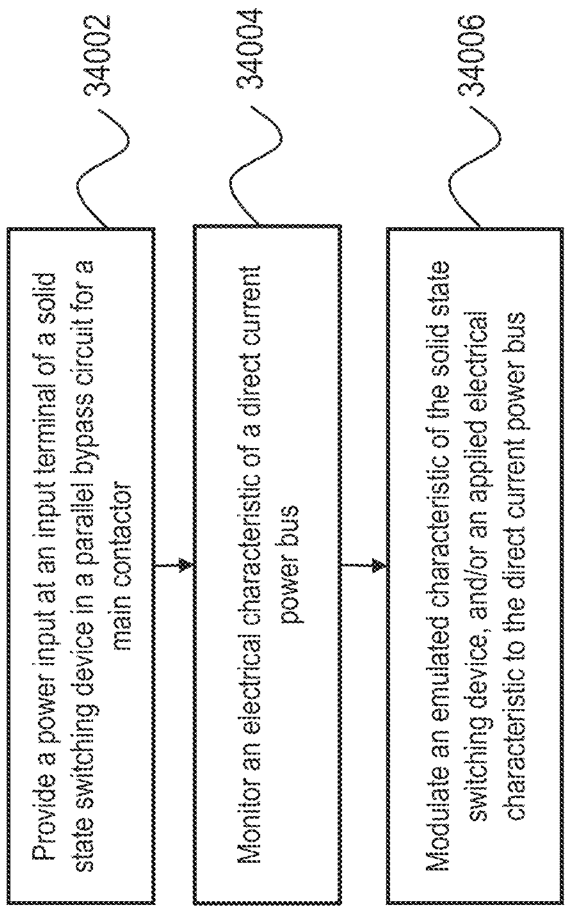

FIG. 340 depicts an embodiment an example procedure for operating a pre-charge circuit.

Figure 341:
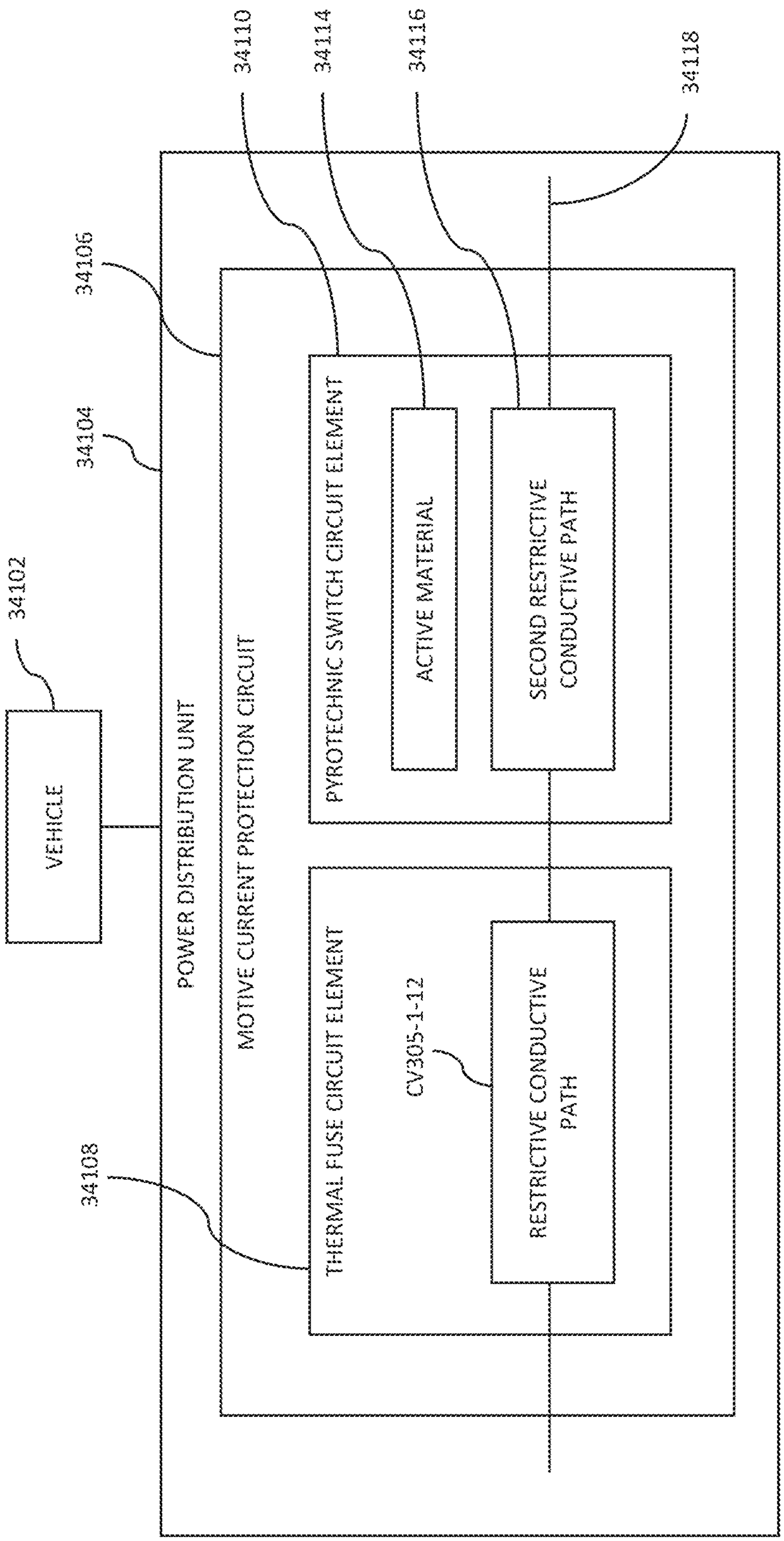

FIG. 341 depicts an embodiment block diagram for a printed fuse and pyrotechnic system.

Figure 342:
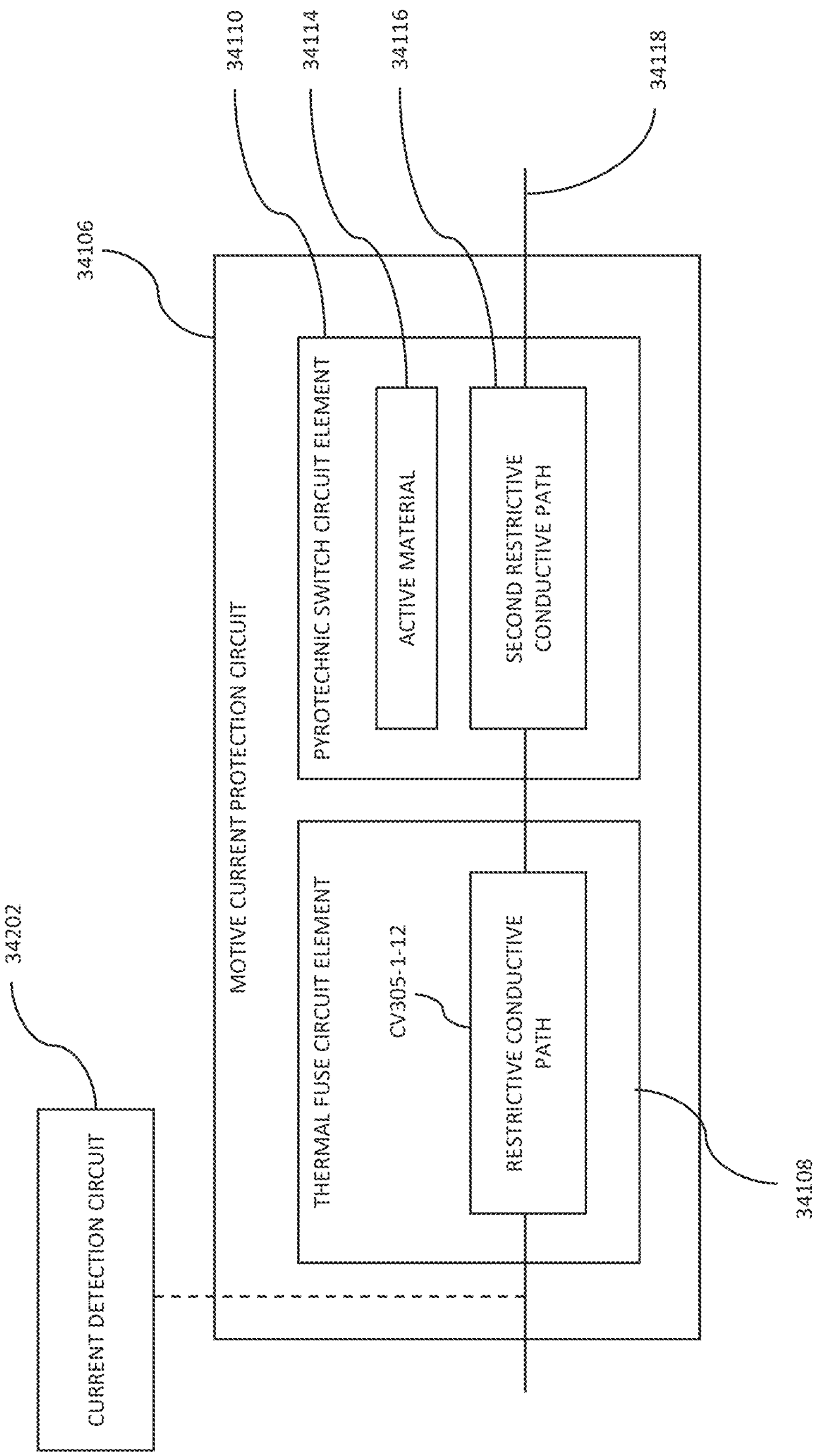

FIG. 342 depicts an embodiment block diagram for a printed fuse and pyrotechnic apparatus.

Figure 343:
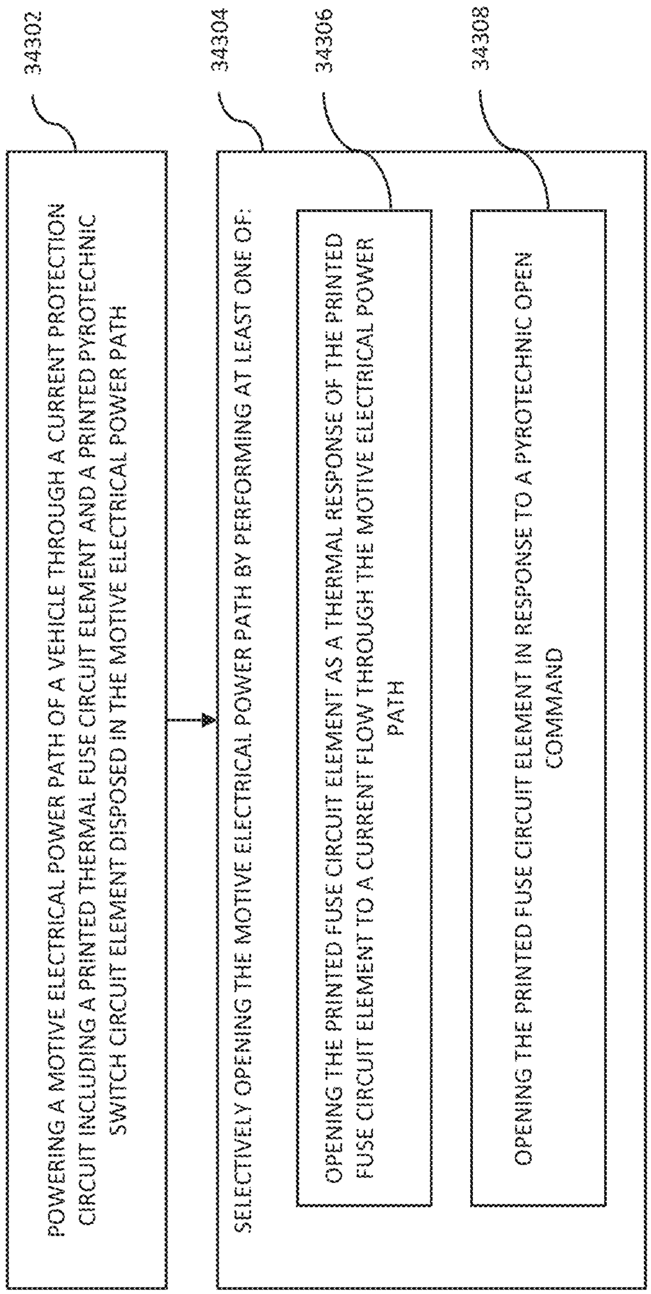

FIG. 343 depicts an embodiment flow diagram for a printed fuse and pyrotechnic method.

Figure 344:
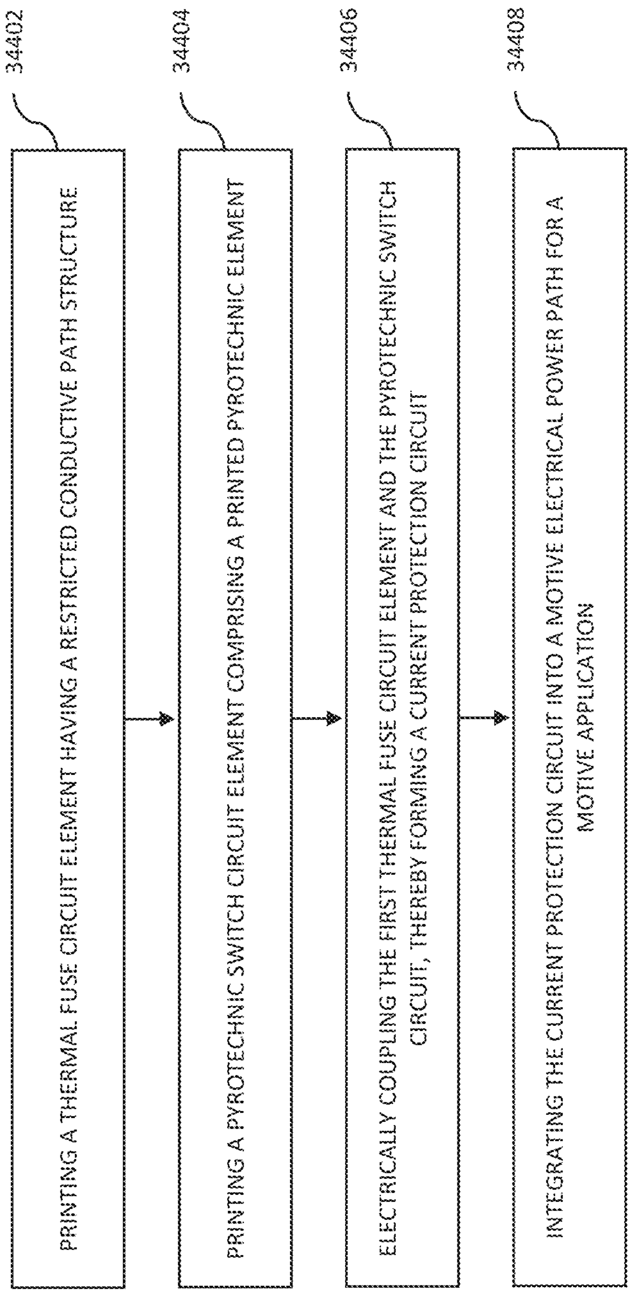
Figures 345A, 345B, 345C, 345D:
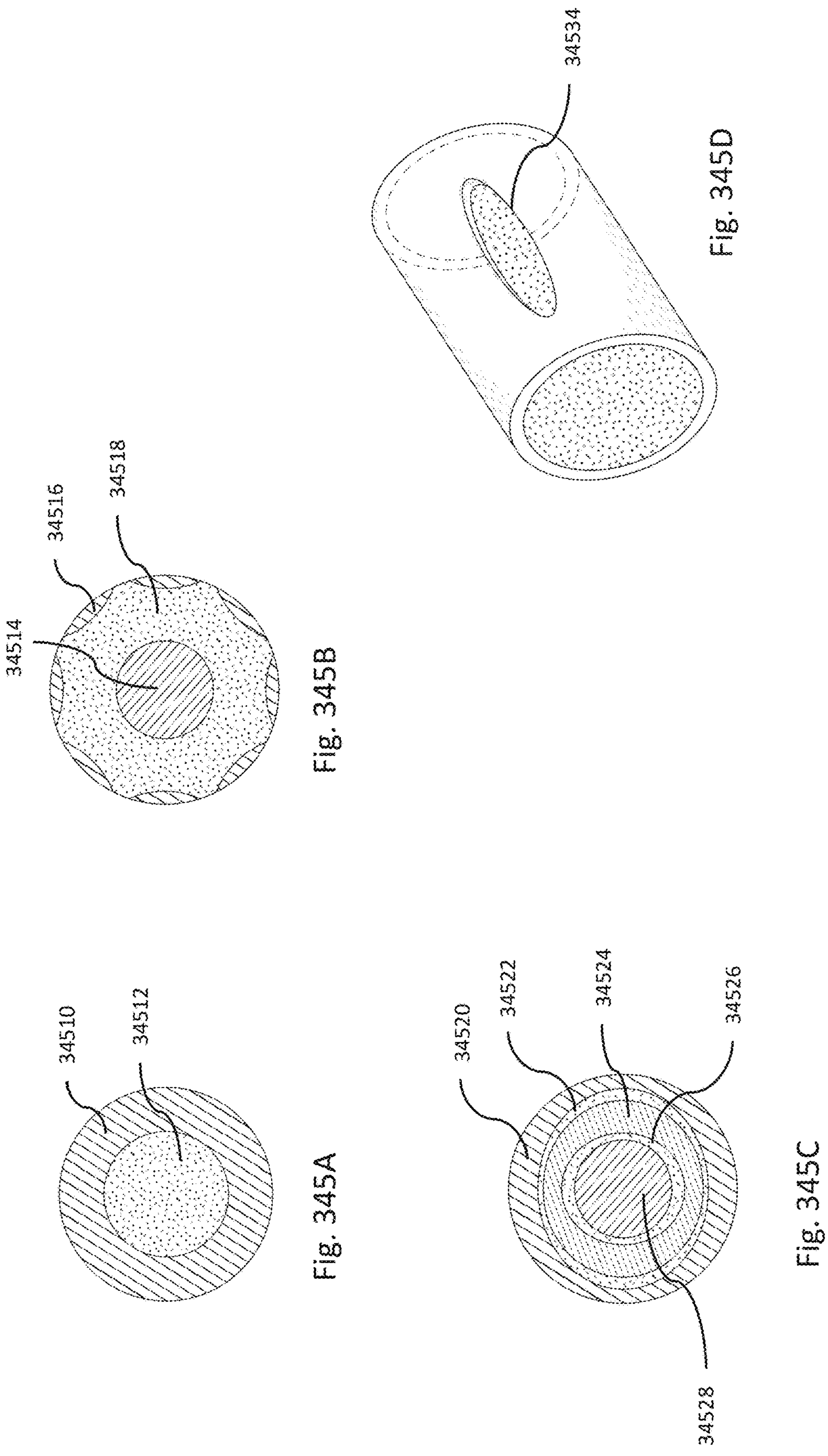

FIG. 344 depicts an embodiment flow diagram for a printed fuse and pyrotechnic method.

FIG. 345A-D depicts an embodiment configurations for printed pyrotechnic configurations.

DETAILED DESCRIPTION

Figure 1:
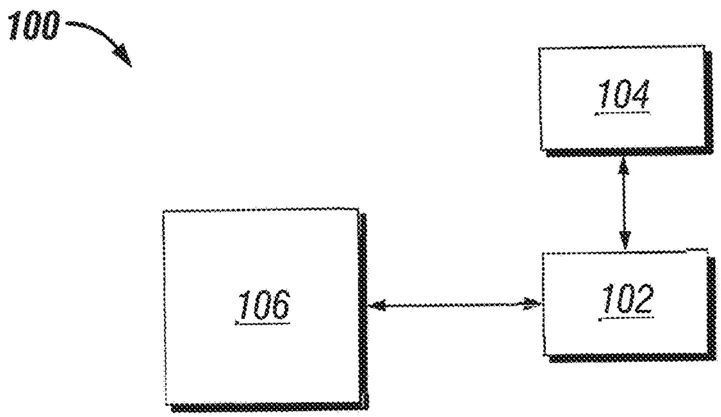
FIG. 1 shows an embodiment system schematically depicting a power distribution unit (PDU) operationally positioned between a power source and a load.

Referencing FIG. 1, an example system 100 is schematically depicted including a power distribution unit (PDU) 102 operationally positioned between a power source 104 and a load 106. The power source 104 may be any type—including at least a battery, generator, and/or capacitor. The power source 104 may include multiple sources or lines of power, which may be distributed according to the type of power (e.g., a battery input separated from a generator input) and/or may be distributed according to the devices powered (e.g., auxiliary and/or accessory power separated from main load power such as motive force power, and/or divisions within the accessories, divisions within the motive force power, etc.). The load 106 may be any type, including one or more motive force loads (e.g., to individual drive wheel motors, to a global motive drive motor, etc.), one or more accessories (e.g., on-vehicle accessories such as steering, fan, lights, cab power, etc.). In certain embodiments, the PDU 102 provides for ease of integration of the electrical system of the application including the system 100, such as by utilizing uniform input and output access, grouping all power distribution into a single box, single area, and/or to a single logically integrated group of components. In certain embodiments, the PDU 102 provides for protection of the electrical system, including fusing and/or connection or disconnection (manual and/or automated) of the electrical system or individual aspects of the electrical system. In certain embodiments, one or more power sources 104 may be high voltage (e.g., motive power sources, which may be 96V, 230V-360V, 240V, 480V, or any other value) or low voltage (e.g., 12V, 24V, 42V, or any other value). In certain embodiments, one or more power sources 104 may be a direct current (DC) power source or an alternating current (AC) power source, including multi-phase (e.g., three phase) AC power. In certain embodiments, the PDU 102 is a pass-through device, providing power to the load 106 approximately as configured by the power source 104—for example only as affected by sensing and other operations from the PDU 102 that are not provided for power configuration. In certain embodiments, the PDU 102 may include power electronics, for example rectifying, adjusting voltage, cleaning up noisy electrical power, etc. to provide selected electrical power characteristics to the load 106.

Figure 2:
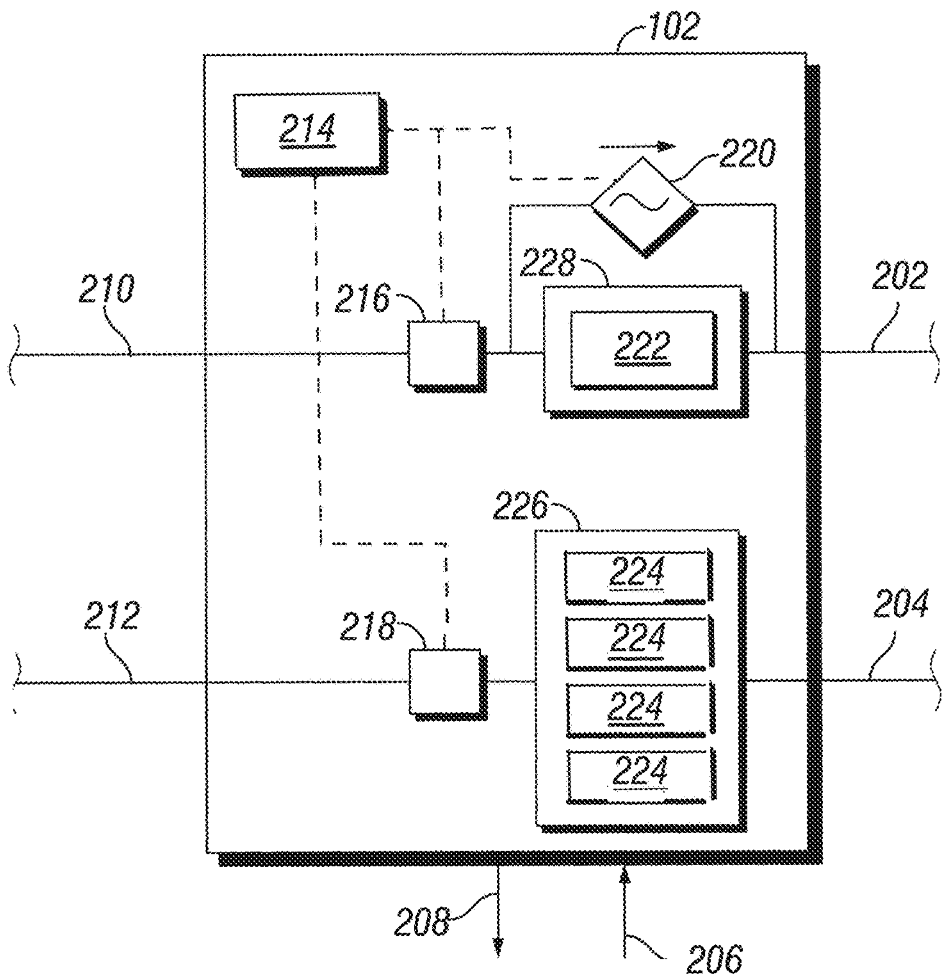
FIG. 2 depicts a more detailed embodiment system schematically depicting a PDU.

Referencing FIG. 2, a more detailed view of an example PDU 102 is schematically depicted. The example PDU 102 includes a main power source 202 (e.g., high voltage, main load power, motive power, etc.) which may be provided by one or more power sources 104, and an auxiliary power source 204 (e.g., auxiliary, accessory, low voltage, etc.) which may be provided by one or more power sources 104. The example PDU 102 depicts a single main power source 202 and a single auxiliary power source 204, but a given application may include one or more main power sources 202, and may include separated auxiliary power sources 204 and/or omit auxiliary power sources 204.

The example PDU 102 further includes a coolant inlet 206 and a coolant outlet 204. The provision of coolant to the PDU 102 is optional and may not be included in certain embodiments. The coolant may be of any type according to availability in the application, including for example an on-vehicle coolant available (e.g., engine coolant, transmission coolant, a coolant stream associated with an auxiliary device or other power components such as a power source 104, etc.) and/or may be a coolant dedicated to the PDU 102. Where present, the amount of cooling provided by the coolant may be variable—for example by changing an amount of coolant flowing through a coolant loop through the PDU 102—such as by operating hardware (e.g. a valve or restriction) within the PDU 102, providing a request for a coolant flow rate to another device in the system, etc.

The example PDU 102 further includes a main power outlet 210 and an auxiliary power outlet 212. As described preceding, the PDU 102 may include multiple main power outlets 210, and/or divided, multiple, multiplexed, and/or omitted auxiliary power outlets 212. The example PDU 102 is a pass-through power device where, except for effects on the power due to sensing and/or active diagnostics, the power outlets 210, 212 have approximately the same electrical characteristics of the corresponding power inlets 202, 204. However, the PDU 102 can include power electronics (solid state or otherwise) to configure power in any desired manner.

The example PDU 102 further includes a controller 214 configured to functionally execute certain operations of the PDU 102. The controller 214 includes and/or is communicatively coupled to one or more sensors and/or actuators in the PDU 102, for example to determine current values, voltage values, and/or temperatures of any power source or input, fuse, connector, or other device in the PDU 102. Additionally or alternatively, the controller 214 is communicatively coupled to the system 100 including the PDU 102, including for example a vehicle controller, engine controller, transmission controller, application controller, and/or network device or server (e.g., a fleet computer, cloud server, etc.). The controller 214 may be coupled to an application network (e.g., a CAN, a datalink, a private or public network, etc.), an outside network, and/or another device (e.g., an operator's portable device, an in-cab computer for a vehicle, etc.). The controller 214 is depicted schematically as a single stand-alone device for convenience of illustration. It will be understood that the controller 214 and/or aspects of the controller 214 may be distributed across multiple hardware devices, included within another hardware device (e.g., a controller for the power source, load, vehicle, application, etc.), and/or configured as hardware devices, logic circuits, or the like to perform one or more operations of the controller 214. The PDU 102 is depicted schematically as a device within a single enclosure, but may be within a single enclosure and/or distributed in two or more places within an application. In certain embodiments, the inclusion of the PDU 102 within a single enclosure provides certain advantages for integration, reduction of footprint, and/or simplification of interfaces. Additionally or alternatively, inclusion of the PDU 102 in more than one location in an application is contemplated herein, and/or the inclusion of more than one PDU 102 within an application is contemplated herein.

The example PDU 102 includes a main contactor 216 selectively controlling the main power throughput of the PDU 102. In the example, the main contactor 216 is communicatively coupled to and controlled by the controller 214. The main contactor 216 may additionally be controllable manually, and/or other main contactors 216 may be in-line for the main power that are controllable manually. An example main contactor 216 includes a solenoid (or other coil-based) contactor, such that energizing the solenoid provides for either connected main power (e.g., normally open, or power is disconnected when not energized) and/or energizing the solenoid provides for disconnected main power (e.g., normally closed, or power is connected when not energized). The characteristics of the system 100, including design choices about whether power should be active when controller 214 power fails, servicing plans, regulations and/or policies in place, the consequences of power loss for the system 100, the voltage typically carried on the main power source, the availability of a positive manual disconnect option, and the like, may inform or dictate the decision of whether the main contactor 216 is normally open or normally closed. In certain embodiments, the main contactor 216 may be a solid state device such as a solid state relay. Where more than one main contactor 216 is present, the various contactors may include the same or distinct hardware (e.g., one is a solenoid and one is a solid state relay), and/or may include the same or distinct logic for being normally open or normally closed. The main contactor 216 may be additionally controllable by devices outside the PDU 102—for example a keyswitch lockout, another controller in the system 100 having access to control the main contactor 216, etc., and/or the controller 214 may be responsive to outside commands to open or close the main contactor 216, and/or additional contactors in-line for the main power may be responsive to devices outside the PDU 102.

The example PDU 102 includes an auxiliary contactor 218 selectively controlling the auxiliary power throughput of the PDU 102. In the example, the auxiliary contactor 218 is communicatively coupled to and controlled by the controller 214. The auxiliary contactor 218 may additionally be controllable manually, and/or other auxiliary contactor 218 may be in-line for the auxiliary power that are controllable manually. An example auxiliary contactor 218 includes a solenoid (or other coil-based) contactor, such that energizing the solenoid provides for either connected auxiliary power (e.g., normally open, or power is disconnected when not energized) and/or energizing the solenoid provides for disconnected auxiliary power (e.g., normally closed, or power is connected when not energized). The characteristics of the system 100, including design choices about whether power should be active when controller 214 power fails, servicing plans, regulations and/or policies in place, the consequences of power loss for the system 100, the voltage typically carried on the auxiliary power source(s), the availability of a positive manual disconnect option, and the like, may inform or dictate the decision of whether the auxiliary contactor 218 is normally open or normally closed. In certain embodiments, the auxiliary contactor 218 may be a solid state device such as a solid state relay. The auxiliary contactor 218 may be additionally controllable by devices outside the PDU 102—for example a keyswitch lockout, another controller in the system 100 having access to control the auxiliary contactor 218, etc., and/or the controller 214 may be responsive to outside commands to open or close the auxiliary contactor 218, and/or additional contactors in-line for the auxiliary power may be responsive to devices outside the PDU 102. In certain embodiments, auxiliary contactors 218 may be provided for each auxiliary line, for subsets of the auxiliary lines (e.g., four auxiliary power inputs, with 2, 3, or 4 auxiliary contactors 218), etc.

An example PDU 102 includes a current source 220, which may be an alternating current source, and/or which may be provided as solid state electronics on the controller 214. The current source 220 is capable of providing a selected current injection to the main power across a main fuse 222, for example as AC current, DC current, and/or controllable current over time. For example, the PDU 102 may include sensors such as voltage and/or current sensors on the main power, and the current source 220 provides an electrical connection to a power source (which may be an external power source and/or sourced through the controller) in a manner configured to inject the desired current to the main power. The current source 220 may include feedback to ensure the desired current is injected, for example to respond to system noise, variability, and aging, and/or may apply the nominal electrical connection to inject current, and the controller 214 determines sensor inputs to determine what current was actually injected on the main power. The example PDU 102 depicts a current source 220 associated with the main fuse 222, but the PDU 102 may further include one or more current sources 220 associated with any one or more of the fuses 222, 224 in the PDU 102, including across fuses individually, in subsets, or across all of the fuses (subject to compatibility of power on the fuses—for example simultaneous current injection across electrically coupled fuses should generally be avoided) at once. It can be seen that the inclusion of additional current sources 220 provides for greater resolution in injecting current across individual fuses and in managing variation of the fuses over time, which the inclusion of fewer current sources 220 reduces system cost and complexity. In certain embodiments the current source 220 is configured to selectively inject current across each fuse in the PDU 102, and/or across each fuse of interest, in a sequence or schedule, and/or as requested by a controller 214.

Figure 3:
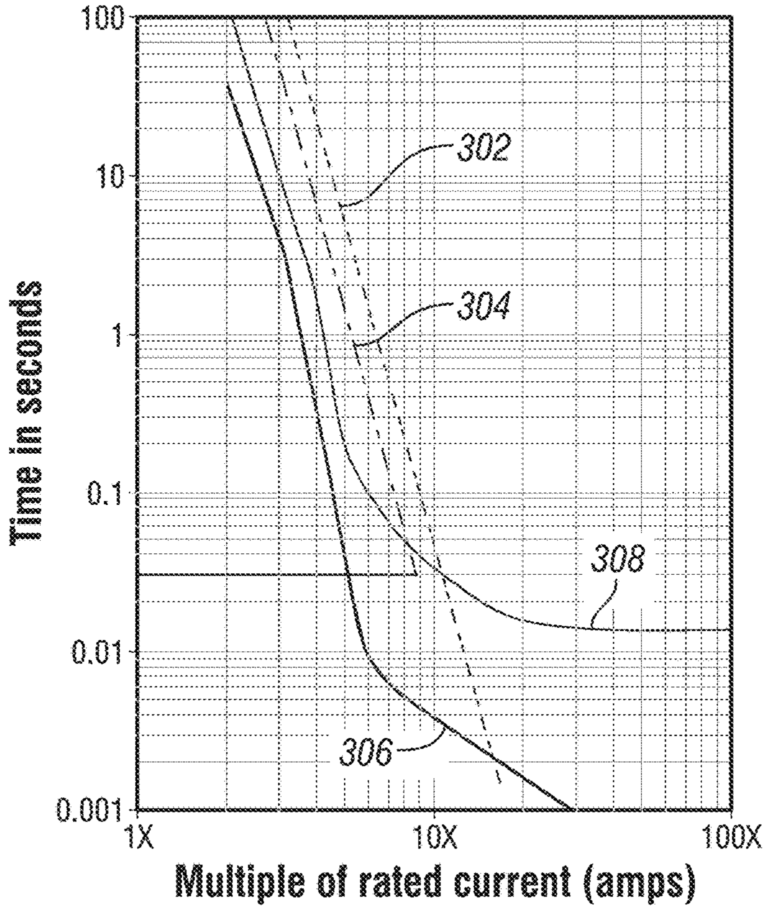
FIG. 3 depicts a non-limiting example response curve for a fuse.

The example PDU 102 includes the main fuse 222 and the auxiliary fuses 224. The main fuse 222 or fuses are associated with the main power, and the auxiliary fuses 224 are associated with the auxiliary power. In certain embodiments, the fuses are thermal fuses, such as resistive devices that exhibit heating, and are intended to fail if a given current profile is exceeded in the associated power line. Referencing FIG. 3, a typical and non-limiting example response curve for a fuse is depicted. The curve 302 represents an application damage curve, depicting a current-time space over which some aspect of the application will be damaged if the curve is exceeded. For example, in the example application damage curve 302, if 10*x* rated current is exceeded for about 50 milliseconds, damage to some aspect of the application will occur. It will be understood that an application may contain many components, and that the components may differ in the application damage curve 302. Additionally, each fuse 222, 224 may be associated with distinct components having a different damage curve than other components. The curve 304 represents a control space, wherein in certain embodiments, the controller 114 provides control protection to keep the system from reaching the application damage curve 302 in the event of a fuse failure or off-nominal operation. The application damage curve 302 may be a specified value, for example a system requirement to be met, where exceedance of the application damage curve 302 does not meet the system requirement, although actual damage to components may be experienced at some other value in the current-time space. The curve 306 represents the fuse melting line for an illustrative fuse. At the position of the fuse melting line 306, the fuse temperature exceeds the fuse design temperature, and the fuse melts. However, the fuse continues conducting for a period of time after melting commences, as depicted by the fuse conduction line 308 (e.g., due to conduction through the melted material before the connection is broken, arcing, and the like). When the time-current space reaches the fuse conduction line 308, the fuse is no longer conducting on the power line, and the line is disconnected. It will be understood that specific system dynamics, fuse-to-fuse variability, fuse aging (e.g., induced mechanical or thermal degradation, changes in composition or oxidation, and the like), the exact nature of the current experienced (e.g., the rise time of the current), and other real-world variables will affect the exact timing of both fuse melting and fuse disconnection. However, even with a nominal fuse as depicted in FIG. 3, it can be seen that for very high currents, the nominal fuse conduction line 308, and even the fuse melting line 306, can cross the application damage curve 302—for example because certain dynamics of the fuse disconnection operation are less responsive (in the time domain) or unresponsive to the current applied at very high current values.

The example PDU 102 further includes a conduction layer 226 associated with the auxiliary power, and a conduction layer 228 associated with the main power. The conduction layers 226, 228 include the power couplings of the power lines to the fuses. In certain embodiments, the conduction layers 226, 228 are just wires or other conductive couplings between the fuses and the power connections to the PDU 102. Additionally or alternatively, conduction layers 226, 228 may include flat or laminated portions, for example with stamped or formed conductive layers, to provide power connections within the PDU 102, and/or portions of the conduction layers 226, 228 may include flat or laminated portions. Without limitation to any other disclosures provided herein, the utilization of flat or laminated portions provides for flexibility in the manufacture of the conduction layers 226, 228, flexibility in the installation and/or a reduced installed footprint of the conduction layers 226, 228, and/or provides for greater contact area between the conduction layers 226, 228 and portions of the PDU 102—for example the fuses, controller, contactors, or other devices within the PDU 102 where thermal and/or electrical contact between the conduction layers 226, 228 and the other devices are desired. The example conduction layers 226, 228 are depicted in association with the fuses, but the conduction layers 226, 228 may additionally or alternatively be associated with the controller 214 (e.g., power coupling, communications within or outside the PDU 102, coupling to actuators, coupling to sensors, and/or thermal coupling), contactors 216, 218, and/or any other device within the PDU 102.

Figure 4:
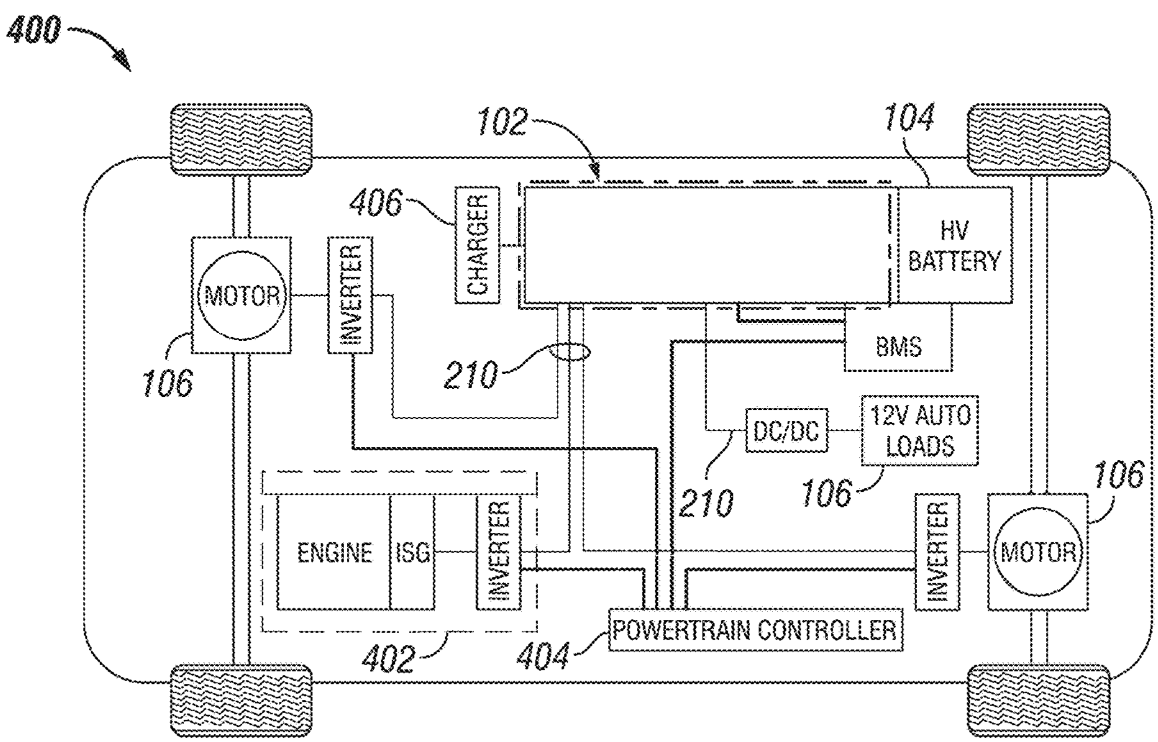
FIG. 4 depicts a non-limiting example system for mobile application such as a vehicle.

Referencing FIG. 4, an example system 400 is a mobile application such as a vehicle. The example system 400 includes the high voltage battery 104 electrically coupled to high voltage loads 106 through the PDU 102. In the example system 400, an auxiliary prime mover, such as an internal combustion engine 402 (with associated conversion electronics, such as a generator, motor-generator, and/or inverter) is additionally coupled to the PDU 102. It is understood that the high voltage battery 104 and/or the auxiliary prime mover 402 may act as a power source or a load during certain operating conditions of the system 400, and additionally the high voltage loads 106 (e.g., electric motors or motor-generators coupled to the wheels) may act as a load or a source during certain operating conditions. The description of loads 106 and sources 104 herein is non-limiting, and references only nominal operation, ordinary operation, and/or operational conditions selected for conceptual description, even if the described load 106 and/or source 104 often, usually, or always operates in a mode that is not the described name. For example, the high voltage battery 104 may operate as a power source during motive operations where net energy is being taken from the battery, and/or as a load during charging operations, motive operations where the wheels or auxiliary prime mover are charging the battery, etc.

The example system 400 further includes a powertrain controller 404 to control operations of the powertrain, which may be associated with another component in the system 400, and/or part of another controller in the system (e.g., a vehicle controller, battery controller, motor or motor-generator controller, and/or engine controller). The example system 400 further includes a charger 406 coupled to the high voltage batter 404 through the PDU 102, and low voltage loads ("12V Auto Loads" in the example of FIG. 4) representing auxiliary and accessory loads in the system 400. One of skill in the art will recognize the system 400 as including a serial hybrid powertrain for a vehicle—for example where auxiliary power (e.g., the internal combustion engine) interacts only with the electrical system to re-charge batteries and/or provide additional real-time electrical power during operations, but does not mechanically interact with the drive wheels. Additionally or alternatively, a system may include a parallel hybrid system, where auxiliary power can interact mechanically with the drive wheels, and/or interact with the electrical system (either, or both). Additionally or alternatively, a system may be a fully electric system, where auxiliary power is not present, and/or where auxiliary power is present but does not interact with the high voltage/motive power system (e.g., an alternative power unit to drive accessories, refrigeration, or the like—which power may be communicated through the PDU 102 but separated from the motive power electrical system). In certain embodiments, motive systems such as vehicles experience highly transient load cycles—for example during acceleration, deceleration, stop-and-go traffic, emergency operations, and the like—and accordingly management of power in such system is complex, and certain devices such as fuses can be vulnerable to the highly transient load cycle. Additionally or alternatively, loss of operations for vehicles can result in costs for system down-time, loss or untimely delivery of cargo, and/or significant operational risks due to failures (e.g., stranding the operator and/or vehicle, loss of operations in traffic, loss of operations on a motor-way, etc.). In certain embodiments, other systems that may be hybrid electric and/or fully electric are additionally or alternatively subject to highly variable duty cycles and/or specific vulnerabilities to operational interruptions, such as, without limitation, pumping operations, process operations for a larger process (e.g., chemical, refining, drilling, etc.), power generation operations, mining operations, and the like. System failures for these and other operations may involve externalities such as losses associated with the process failure that go beyond the down-time for the specific system, and/or down-time for such systems can incur a significant cost.

Figure 5:
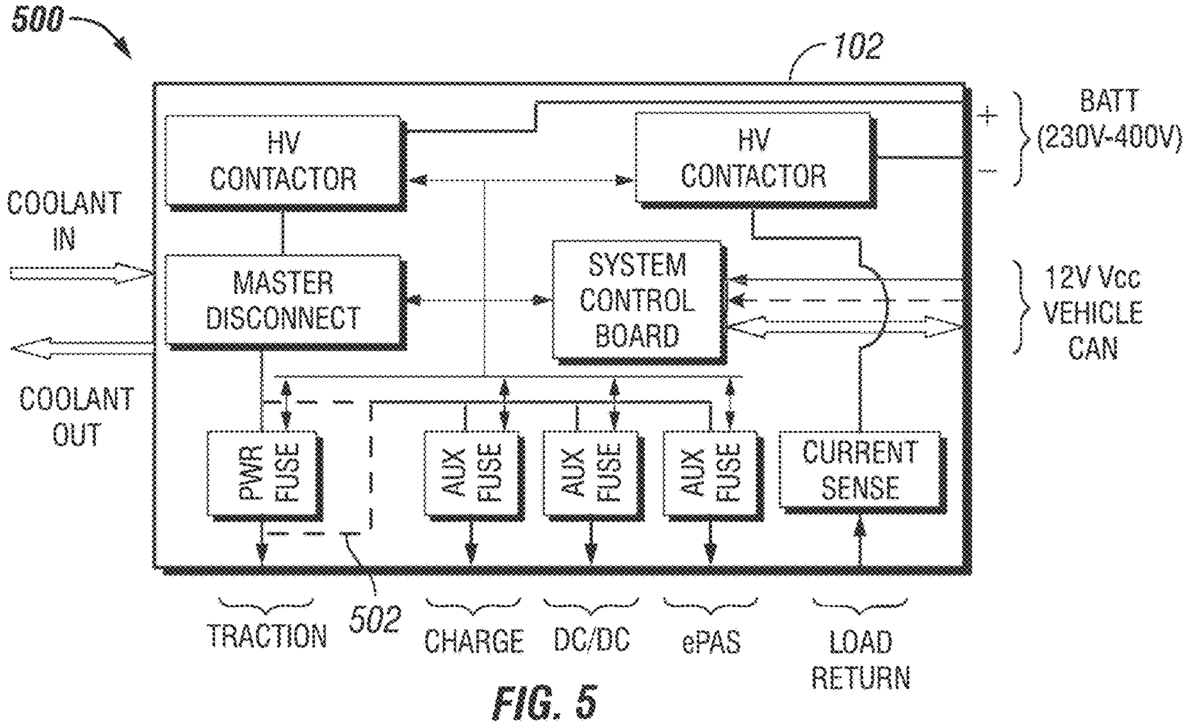
FIG. 5 depicts a non-limiting example system including a PDU.

Referencing FIG. 5, an example system is depicted including a PDU 102. The example PDU 102 has a number of auxiliary power connections (e.g., charging, power steering, vehicle accessories, and a load return for current detection, in the example), and a main motive/traction power connection. The example system 500 includes two high voltage contactors, one for each of the battery high side and low side, where in the example two high voltage contactors are controllable by the system control board but may be additionally or alternatively manual (e.g., a switch accessible by an operator). The system control board additionally can control a master disconnect that can disconnect all power through the PDU 102. The system 500 further depicts a power fuse bypass 502, controllable by the system control board, that supports certain operations of the present disclosure as described throughout. The system 500 depicts a power fuse bypass 502, but may additionally or alternatively include an auxiliary bypass for one or more of the auxiliary fuses, any subset of the auxiliary fuses, and/or for all of the auxiliary fuses together. The example system 500 includes an optional coolant supply and return coupling. The battery coupling in the system 500 depicts a 230V to 400V battery coupling, but the high voltage coupling may be any value. The system control board is depicted as communicatively coupled to a 12V CAN network, although the communicative coupling of the system control board to the surrounding application or system can be any network understood in the art, multiple networks (e.g., vehicle, engine, powertrain, private, public, OBD, etc.), and/or may be or may include a wireless network connection.

Figure 6:
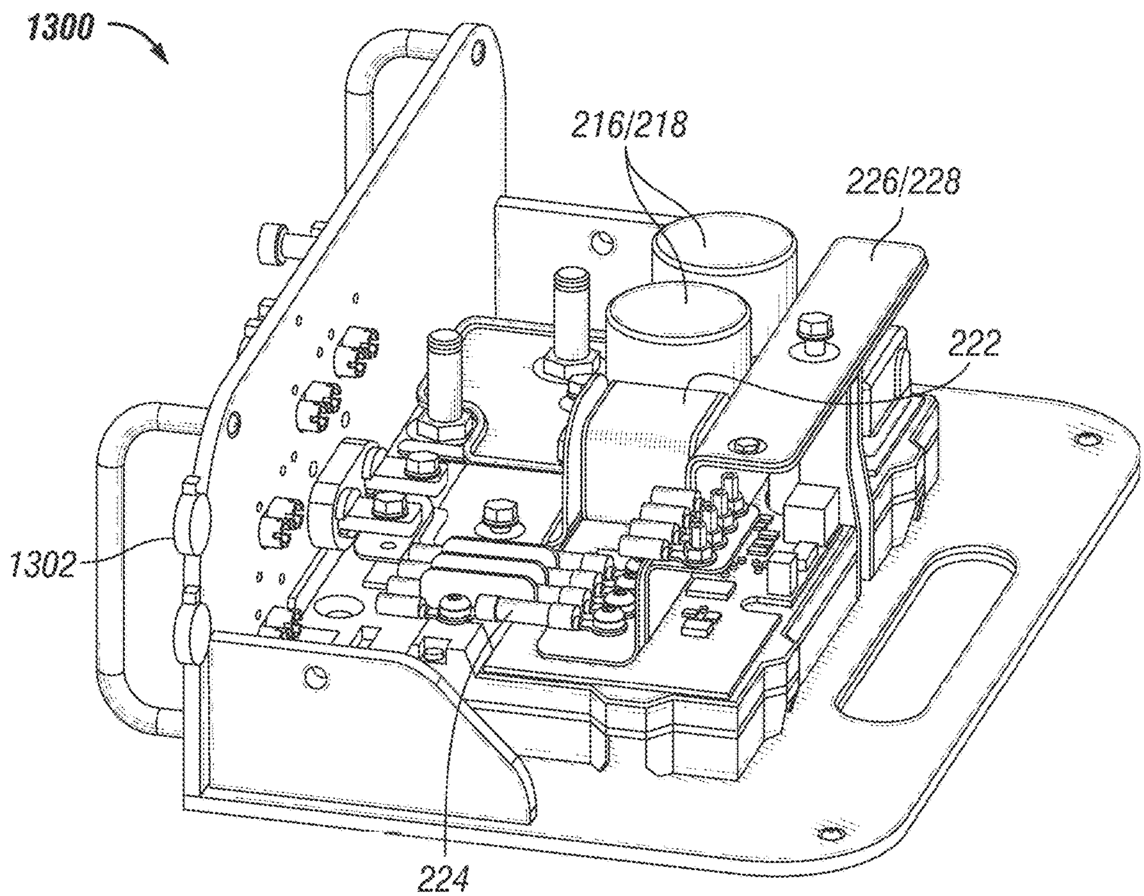
FIG. 6 depicts an embodiment apparatus including all or portions of a PDU.

Referencing FIG. 6, an illustrative apparatus 1300 is depicted, which may include all or portions of a PDU 102. Any descriptions referencing interactions between the main fuse 222 and laminated layers 226/228 herein additionally or alternatively contemplate interactions between any fuses and/or connectors in the apparatus 1300, and/or any other component of a PDU 102 as described throughout the present disclosure. The example apparatus 1300 includes contactors 216/218 which may be high voltage contactors, and/or may be associated with various ones of the fuses 222, 224 in the apparatus 1300. The apparatus 1300 includes laminated layers 226/228, which may include conductive layers for certain aspects of the conductive circuitry in the apparatus 1300. The laminated layers 226/228 may additionally or alternatively provide stiffness and/or structural support for various components in the apparatus 1300. The laminated layers 226/228 may be configured to interact with any components in a manner desired to support the functions of the laminated layers 226/228, including structural functions, heat transfer functions, and/or electrical conductivity functions. The example laminated layers 226/228 interact with all contactors and fuses in the apparatus 1300, although laminated layers 226/228 can readily be configured to interact with selected ones of the contactors and/or fuses, and/or with other components in the apparatus, for example in a manner similar to a printed circuit board (PCB) design. The example apparatus 1300 is positioned on a L-bracket, which may be a final configuration, and/or may be a test configuration. In certain embodiments, the apparatus 1300 is enclosed in a dedicated housing, and/or enclosed in a housing of another device in a system 100—such as the battery housing. In certain embodiments, the apparatus 1300 includes a removable housing portion (e.g., a top portion, lid, etc.) for service and/or maintenance access to the components of the apparatus. The example apparatus 1300 includes connectors 1302—for example to provide power, datalink access, connections to the power source 104, connections to loads 106, connections to sensors (not shown), and/or any other type of connection to the system 100 or otherwise.

Figure 7:
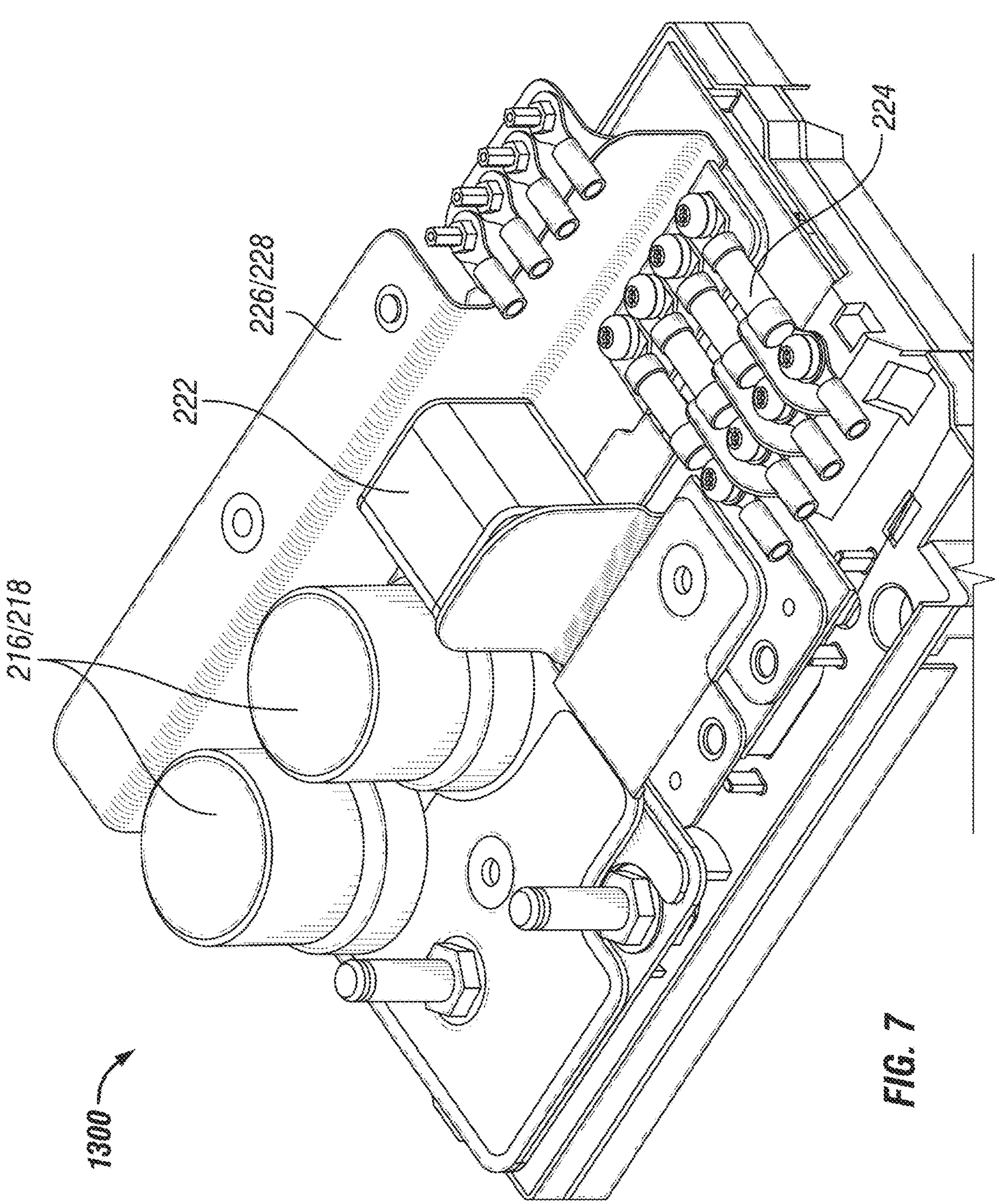
FIG. 7 shows a non-limiting example of interactions between a main fuse and laminated layers.
Figure 8:
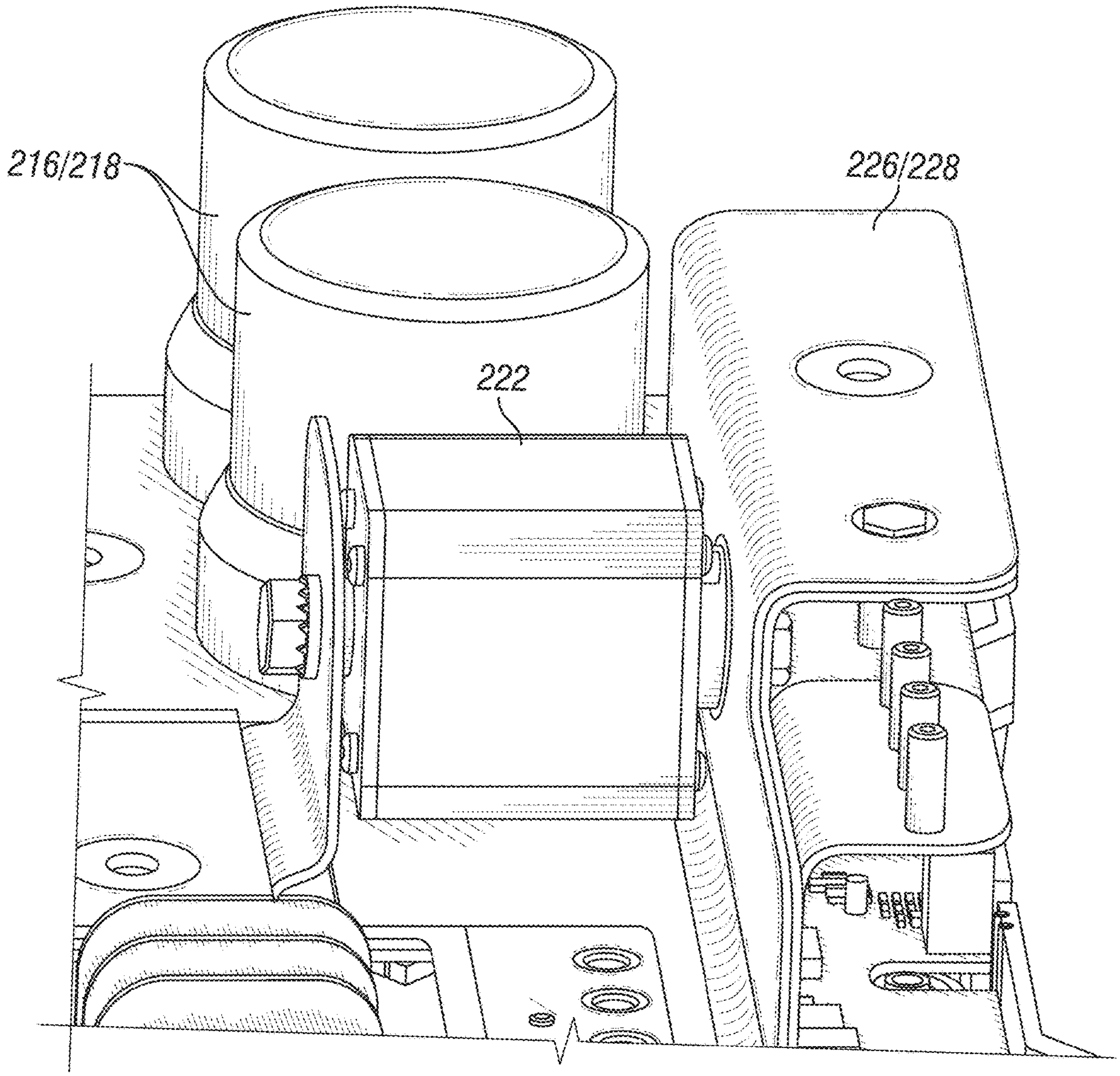
FIG. 8 shows closer detail of a non-limiting example of interactions between a main fuse and laminated layers.

Referencing FIG. 7, an alternate view of an apparatus 1300 is depicted. The apparatus 1300 depicted in FIG. 7 shows the physical interaction between the main fuse 222 and the laminated layers 226/228 for an example embodiment. Referencing FIG. 8, a closer detail view of interactions between the main fuse 222 and the laminated layers 226/228 is depicted for an example embodiment. In the example of FIG. 8, it can be seen that the main fuse 222 includes a relatively large thermal contact area with the laminated layers 226/228 on a bottom side of the fuse, and a relatively small thermal contact area with the laminated layers 226/228 on the mounting sides (e.g., through the mounting components). The thermal contact area between the main fuse 222 and the laminated layers 226/228 is selectable, and in certain embodiments the mounting side or an open side of the main fuse 222 includes a greater thermal contact area, and/or the bottom side includes a large thermal contact area or is not in significant thermal contact with the laminated layers 226/228.

Figure 9:
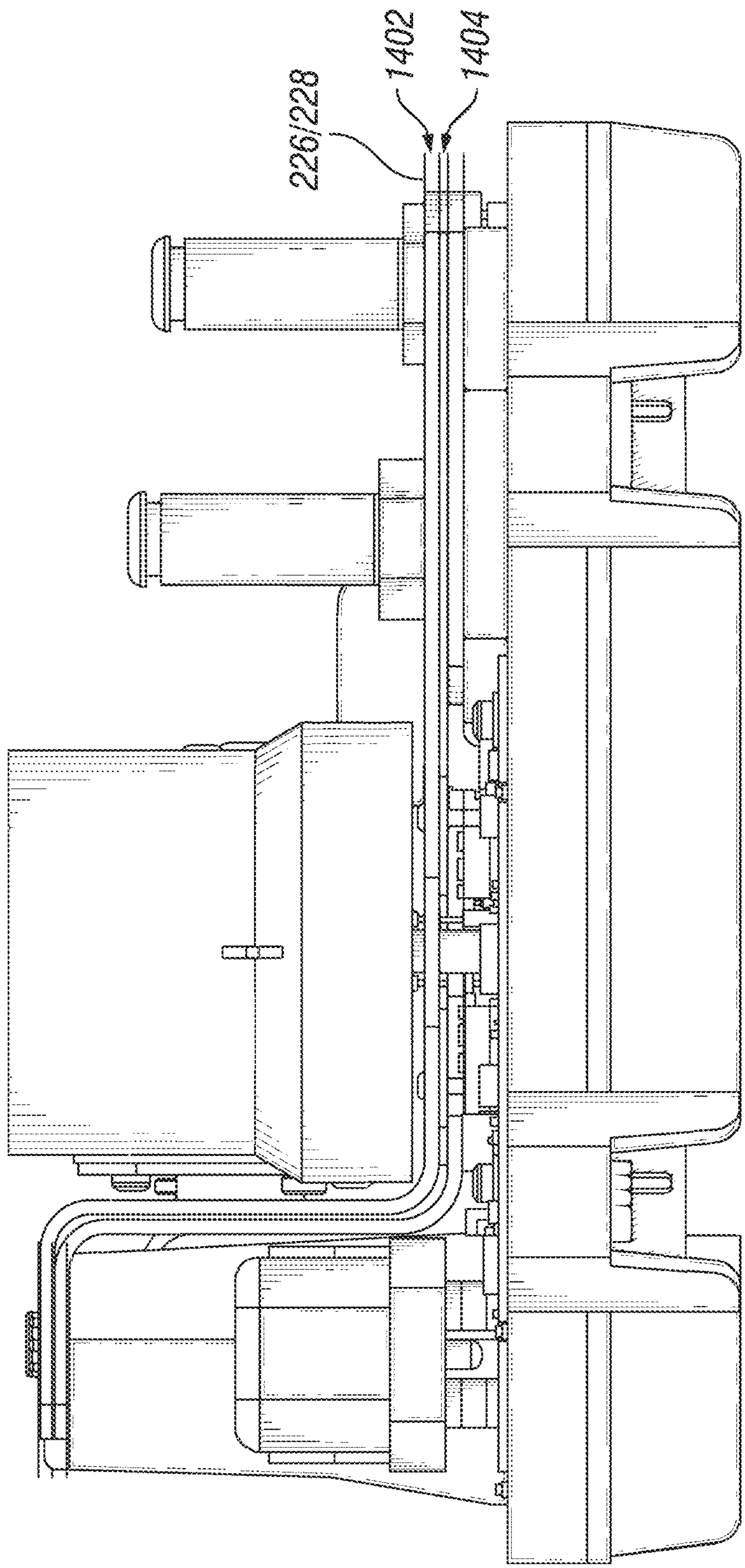
FIG. 9 depicts an embodiment detailed view of a side section of the laminated layers.

Referencing FIG. 9, a detail view of a side section of the laminated layers 226/228 is depicted. The laminated layers 226/228 in the example include an outer structural layer 1402 and an opposing outer structural layer (not numbered), with an interstitial space 1404 between the outer structural layers. In certain embodiments, conductive flow paths and/or thermal flow paths are provided in the interstitial space 1404 between the structural layers. It will be understood that the use of two outer structural layers 1402 provides certain mechanical advantages, including increased durability to shocks and minor impacts, denting of a layer, and bending or flexing of the PDU 102. Additionally or alternatively, the use of two outer structural layers 1402 provides for improved mechanical moments for certain types of stresses. Accordingly, in certain embodiments, the interstitial space 1404 is empty (e.g., it forms a gap), and/or negligible (e.g., the outer layers are sandwiched directly together at least in certain portions of the PDU 102), and nevertheless an improved design is achieved. In certain embodiments, the interstitial space 1404 includes thermally conductive members (e.g., high thermal conductivity paths at selected locations), electrically conductive members (e.g., high electrical conductivity paths at selected locations), active and/or convective thermal paths (e.g., coolant or other convective thermal materials that flow through selected paths in the interstitial space 1404), insulating materials (e.g., to direct electrical or heat flow, and/or to separate components or layers electrically and/or thermally), and/or dielectric materials (e.g., to improve electric isolation of components and/or layers).

Figure 10:
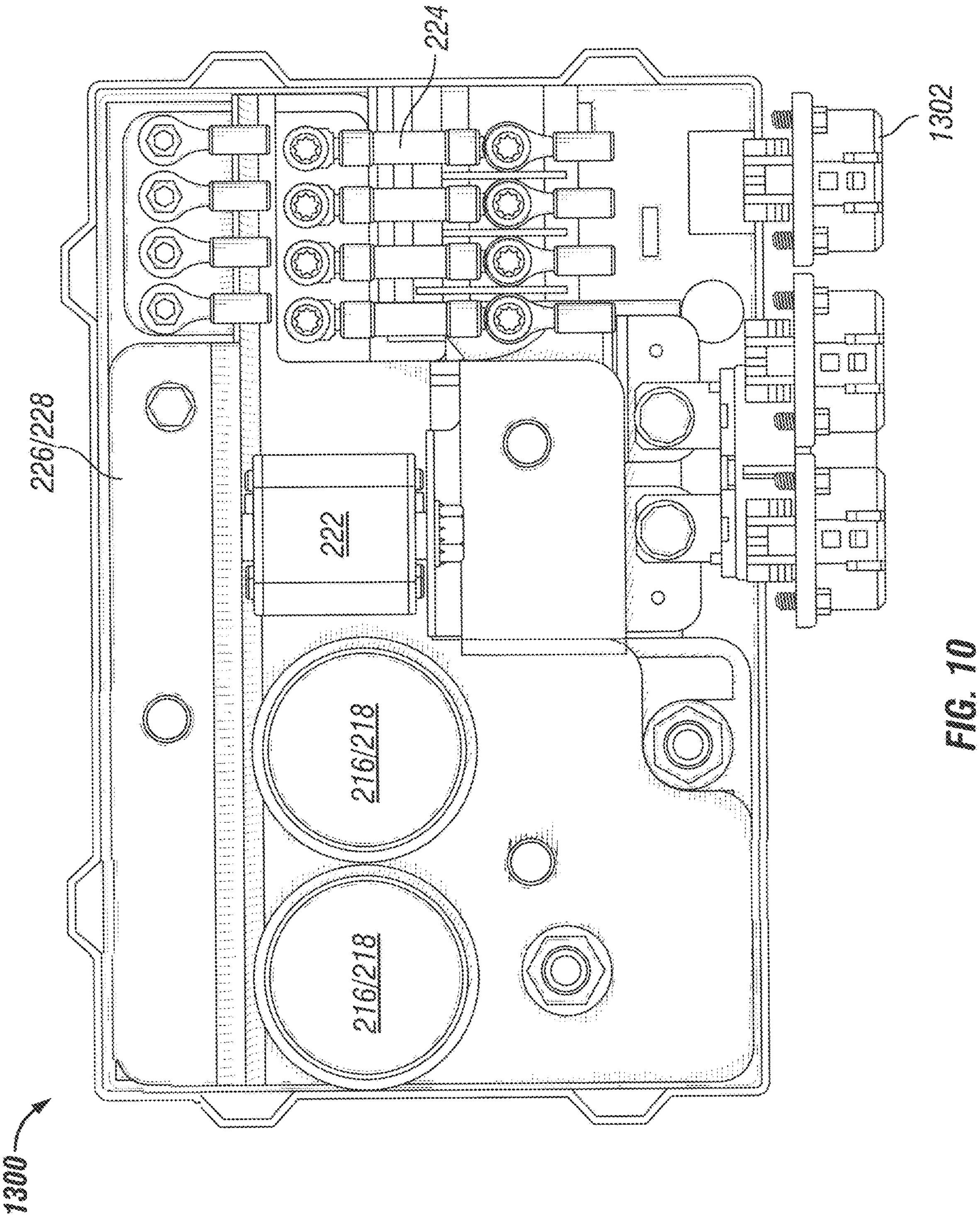
FIG. 10 shows a top view of a non-limiting example apparatus.
Figure 11:
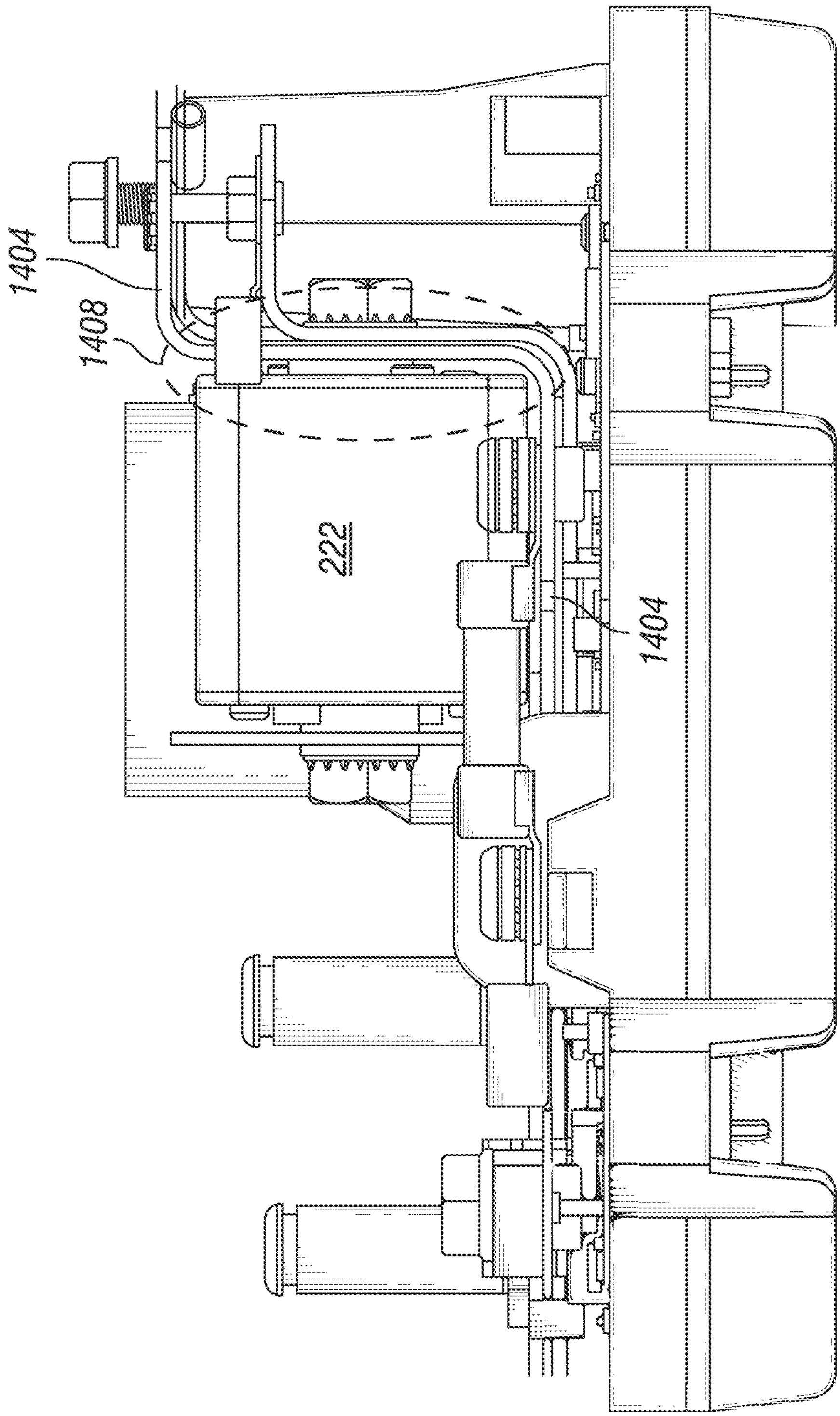
FIG. 11 shows an alternate side view of a non-limiting example apparatus.

Referencing FIG. 10, a top view of an example apparatus 1300 is depicted. The laminated layers 226/228 are distributed throughout the apparatus 1300, providing selectable support, thermal conductivity paths, and/or electrical conductivity paths, to any desired components in the apparatus. Referencing FIG. 11, a side detail view of the interactive space 1408 between the laminated layers 226/228 and the main fuse 222 is depicted. The interactive space includes thermally conductive paths between mount points on the main fuse 222 and the laminated layers 226/228. Additionally, the interstitial space 1404 between the layers is present, in the example, along both the bottom and side of the main fuse 222. Accordingly, desired thermal transfer and/or electrical communication between the main fuse 222 and the interstitial layer 226/228 (and thereby with any other selected components in the apparatus 1300) is available as desired. In certain embodiments, greater thermal and/or electrical coupling between the main fuse 222 and the laminated layers 226/228 is provided—for example by running the laminated layers 226/228 along the housing of the main fuse 222 rather than offset from the housing, and/or by providing a thermally conductive connection (e.g., thermal grease, silicone, and/or contact utilizing any other thermally coupling material such as a metal or other conductor) between the main fuse 222 and the laminated layers 226/228.

Figure 12:
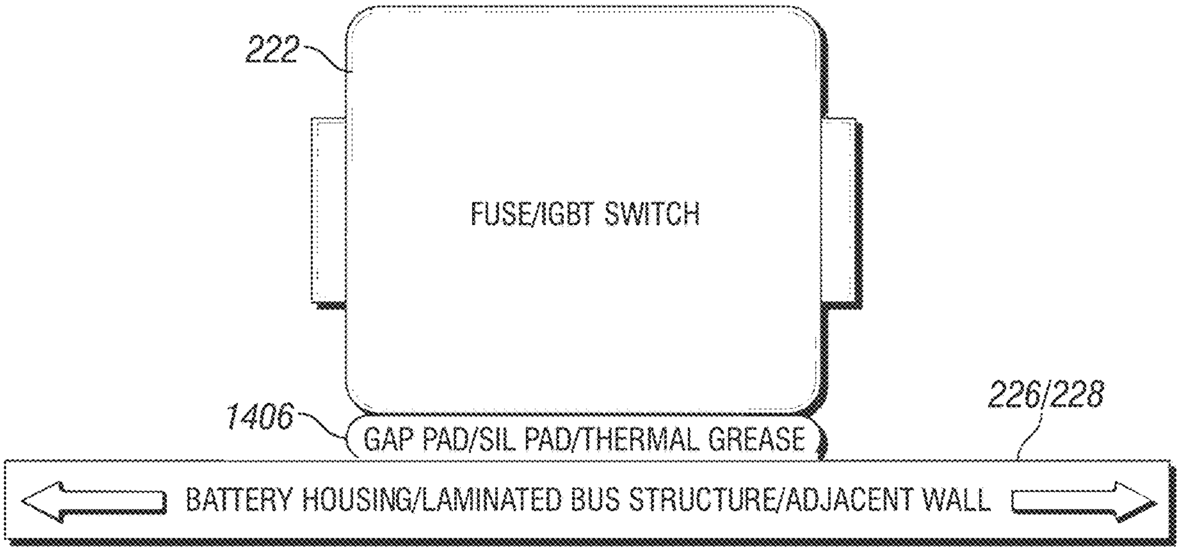
FIG. 12 depicts an embodiment configuration showing a main fuse coupled to laminated layers on a bottom side of the main fuse.
Figure 13:
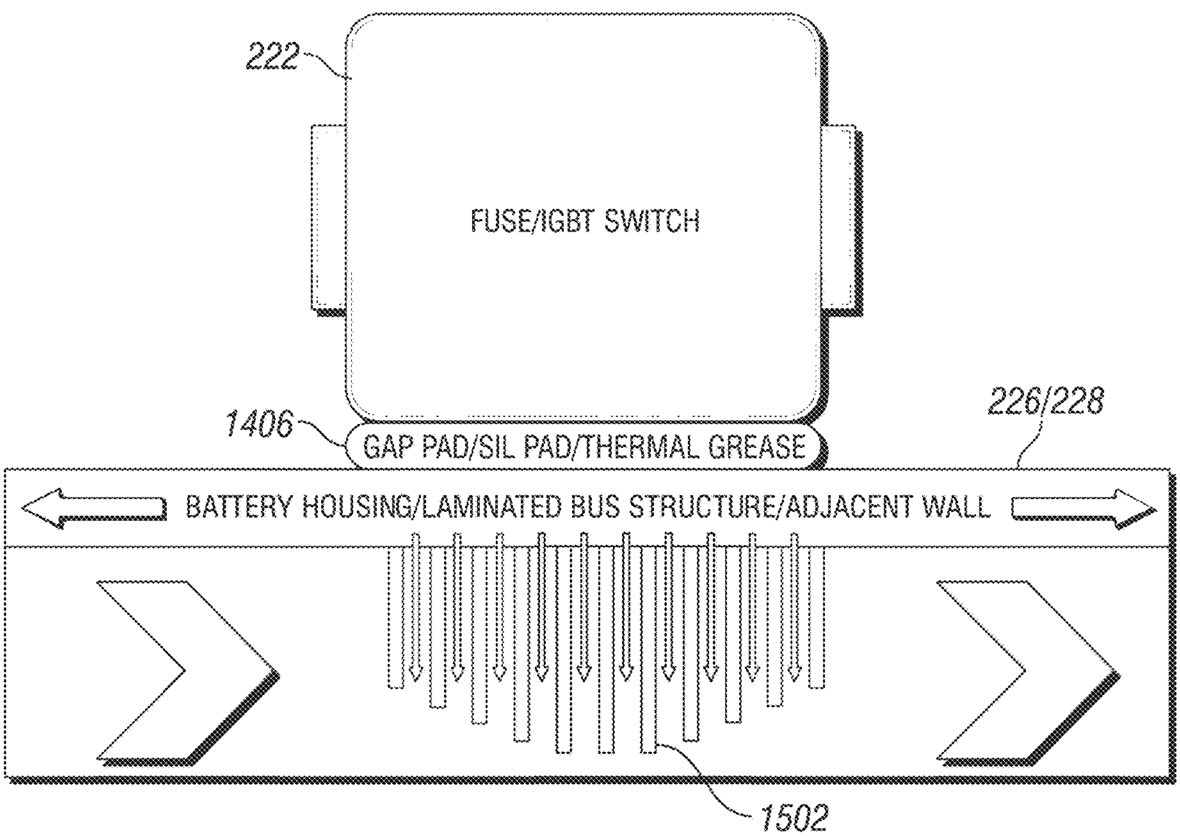
FIG. 13 depicts an embodiment configuration showing a main fuse coupled to laminated layers on a bottom side of the main fuse with thermal fins.

Referencing FIG. 12, a main fuse 222 coupled to laminated layers 226/228 on a bottom side of the main fuse 222 is depicted. The example of FIG. 12 depicts a thermally conductive layer 1406 disposed between the main fuse 222 and the laminated layers 226/228—for example thermal grease, silicone, a silicone pad, a mounted metal material, and/or any other thermally conductive layer understood in the art. In the example of FIG. 12, the increased effective thermal contact area provides for greater heat transfer away from the main fuse 222 when the main fuse 222 gets hotter than the laminated layer 226, 228. Additionally, the heat can be directed away by the inclusion of a thermally conductive material within the interstitial space 1404 (e.g., reference FIG. 14), including for example utilizing a conductive path the direct heat to a selected portion of a PDU housing, to an active cooling exchange, heating fins, or the like. In the example of FIG. 12, the support layers 226/228 that the fuse 222 is coupled to in FIG. 12 may additionally or alternatively include be only a single layer (e.g., not a laminated layer, and/or layers 226, 228 having no interstitial space 1404), a housing of the PDU 102, and/or another component in a system 100 such as a battery pack housing. In certain embodiments, the heat conductivity in FIG. 12 is enhanced by the laminated layers 226/228, for example by the inclusion of a highly conductive channel in the interstitial space 1404, which may be improved by the structural support, routing availability, and/or environmental isolation provided by the laminated layers 226/228. Referencing FIG. 13, in addition to the features depicted in FIG. 12, fins 1502 for improved heat transfer and/or structural rigidity are depicted upon the laminated layers 226/228 (which may be laminated layers, a single layer, a housing wall, etc.). In certain embodiments, the fins are oriented such that fluid flows past them in a direction to enhance heat transfer (e.g., oriented for improved effective flow area and/or turbulence generation in a liquid flow, to maximize effective area in a gas flow, and/or to allow natural convection of fluid—such as gas rising—to cause a high effective flow area of the fins 1502). In certain embodiments, for example where the support layers 226, 228 (and/or layer 226) is a portion of a housing, battery pack housing, or other device, the fins 1502 may instead be presented into ambient air, a forced air flow region, or in a region to be in contact with any selected fluid to facilitate heat transfer to the fluid.

Convective heat transfer, as utilized herein, includes any heat transfer path wherein convective heat transfer forms at least a portion of the overall heat transfer mechanism. For example, where a portion of the heat transfer is conductive (e.g., through a wall, thermal grease, etc.) into a flowing fluid (where generally convective heat transfer dominates), then the heat transfer mechanism is convective and/or includes a convective portion. In certain embodiments, heat transfer utilizing an active or passively flowing fluid include convective heat transfer as utilized herein. The heat transfer may be dominated by conduction under certain operating conditions, dominated by convection under certain operating conditions, and/or include contributing mixes of conductive and convective heat transfer under certain operating conditions.

Figure 14:
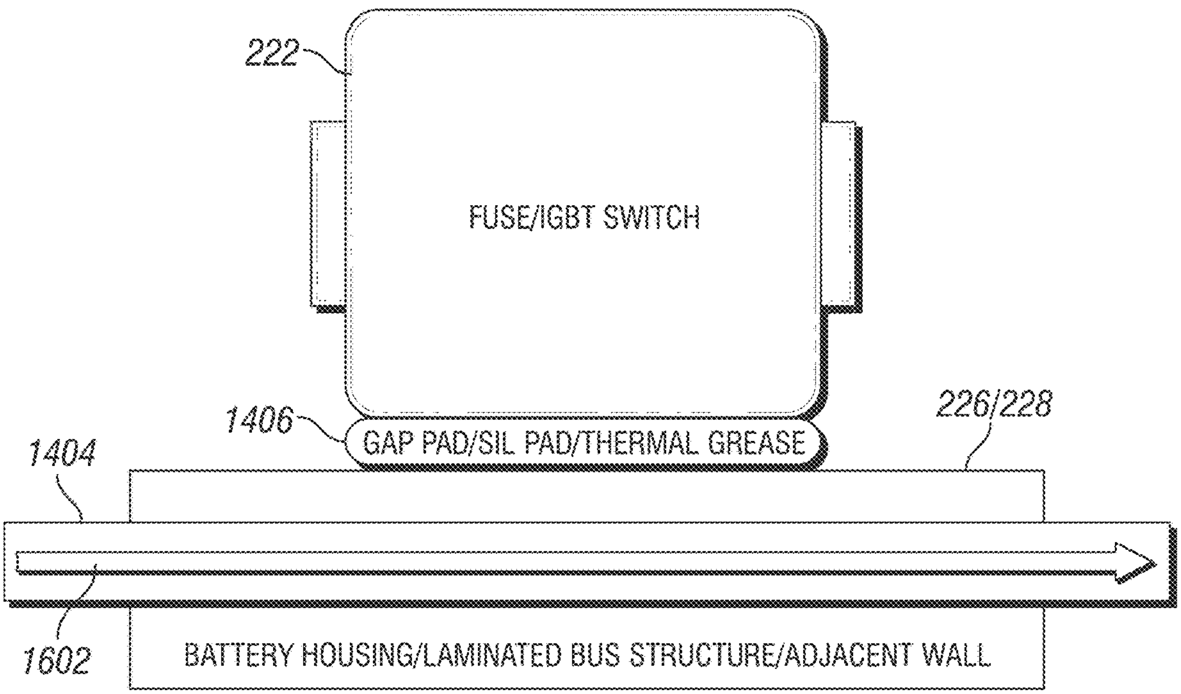
FIG. 14 depicts an embodiment configuration showing a main fuse coupled to laminated layers on a bottom side of the main fuse with features for enhanced heat flow.

Referencing FIG. 14, in addition to the features depicted in FIG. 12, a fluid flow 1602 through the interstitial space 1404 is provided, which in certain embodiments enhances the heat flow from the main fuse 222 to the laminated layers 226/228. The fluid flow 1602 may be a coolant (e.g., a vehicle, engine, battery pack, and/or transmission coolant, or other coolant source available in the system), and/or may be a dedicated coolant such as a closed system for the PDU 102 and/or power source 104. In certain embodiments, the fluid flow 1602 includes a gas (e.g., air, compressed air, etc.). In certain embodiments, coolant flow may be active (e.g., through a valve from a pressurized source, and/or pumped) or passive (e.g., configured to occur during normal operations without further control or input).

Figure 15:
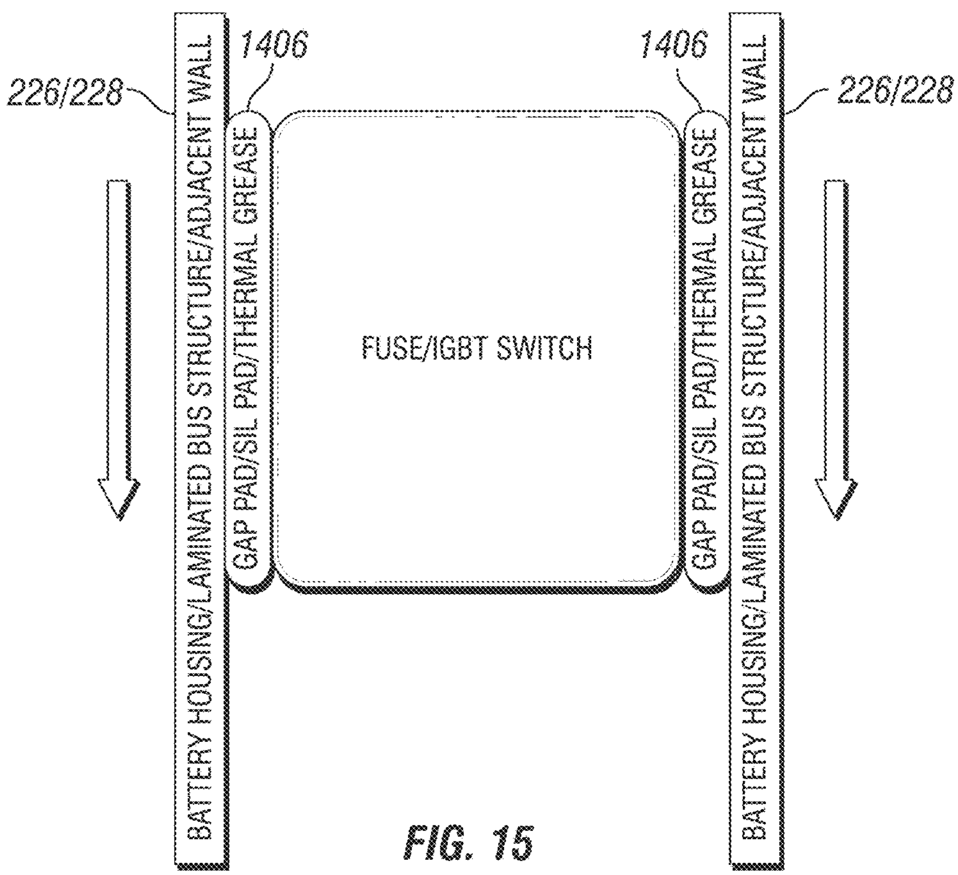
FIG. 15 depicts an alternate embodiment configuration showing a main fuse coupled to laminated layers on a bottom side of the main fuse with features for heat flow.

Referencing FIG. 15, a main fuse 222 is depicted having enhanced thermal connectivity to laminated layers 226, 228 (which may be laminated, a single layer, a housing, etc.). In the example, enhanced thermal conductivity is provided by a thermal coupling layer 1406, but may alternatively or additionally include positioning the layers 226, 228 in proximity to the main fuse 222, and/or providing another high conductivity path (e.g., a metal, etc.) to a selected location of the layer 226, 228 and/or the thermal coupling layer 1406. The embodiment of FIG. 15 provides additional heat transfer capability for the main fuse 222, similar to that depicted in FIG. 12, and the embodiments of FIGS. 12, 13, 14, and 15 may be fully or partially combined.

Figure 16:
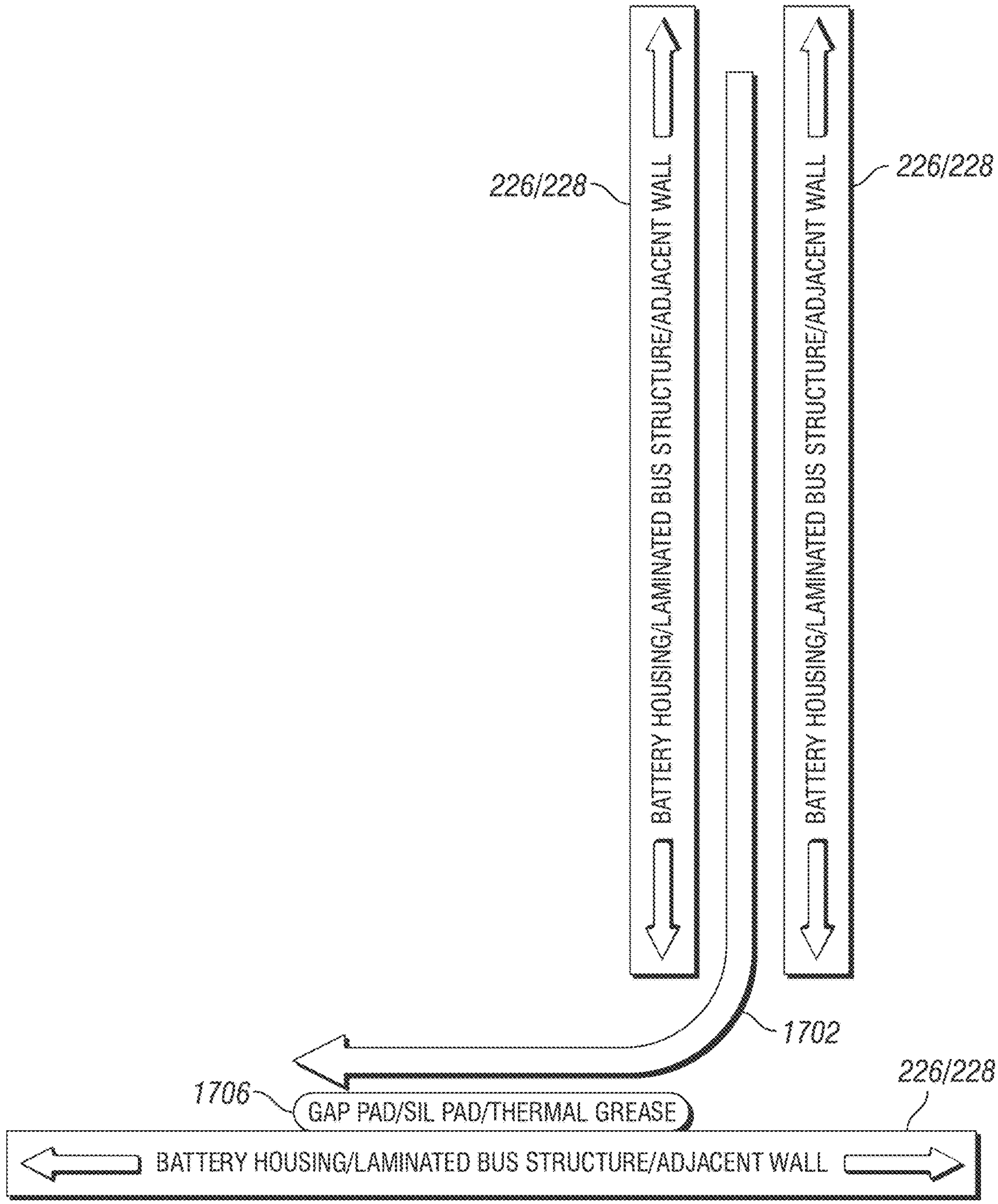
FIG. 16 depicts an alternate embodiment configuration showing a main fuse coupled to laminated layers on a bottom side of the main fuse with features for heat flow.

Referencing FIG. 16, a high conductivity thermal path 1702 to move heat out of the laminated layers 226/228 is depicted. The high conductivity thermal path 1702 may be combined with any other embodiments described throughout the present disclosure to control heat flow in a desired manner. In certain embodiments, the high conductivity thermal path 1702 is thermally coupled 1706 to another portion of the laminated layers 226, 228, to a housing, to a single layer, or to any other desired component in the PDU 102 or within thermal connectivity of the PDU 102. The portion of FIG. 16 receiving the transferred heat may additionally or alternatively be coupled to active or passive heat transfer components, include fins or other heat transfer enhancement aspects, and/or may be thermally coupled to a convective heat transfer component or fluid.

Figure 17:
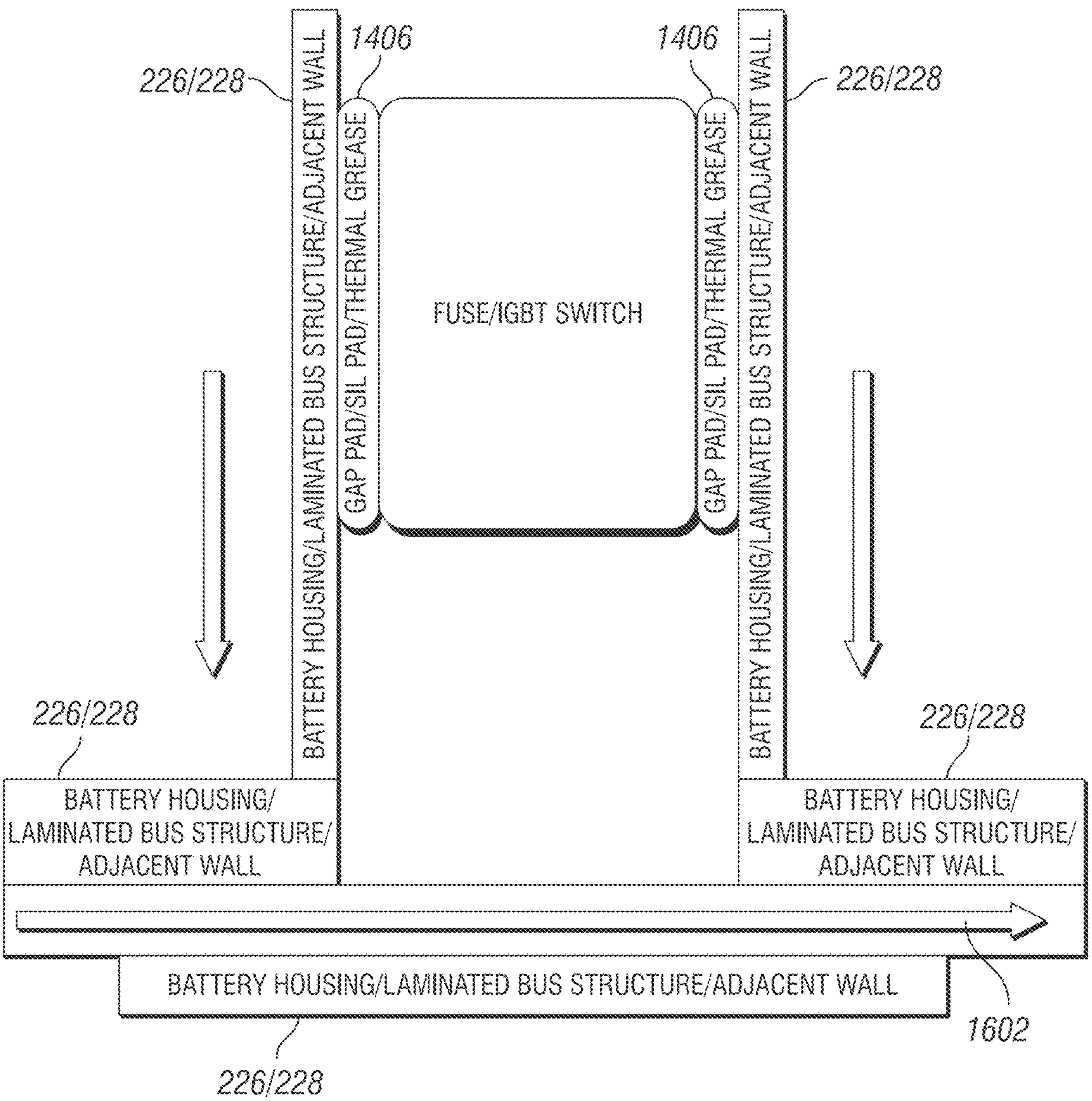
FIG. 17 depicts an alternate embodiment configuration showing a main fuse coupled to laminated layers on a bottom side of the main fuse with features for heat flow.

Referencing FIG. 17, the fluid flow 1602 is displaced from the portion of the laminated layers 226/228 in direct thermal contact to the main fuse 222. The example includes the fluid flow 1602 below the main fuse 222, and the main fuse 222 thermally coupled to the laminated layers 226/228 on the sides of the fuse, but the fluid flow 1602 may be on either side or both sides of the main fuse 222, with the main fuse 222 thermally coupled to another one of the sides and/or the bottom of the main fuse 222, and combinations of any of the foregoing. The descriptions of FIGS. 12 through 17 are described in the context of the main fuse 222, but the embodiments therein may apply to any one or more selected components of the PDU 102, including without limitation any fuse, connector, and/or controller positioned within the PDU 102.

Figure 18:
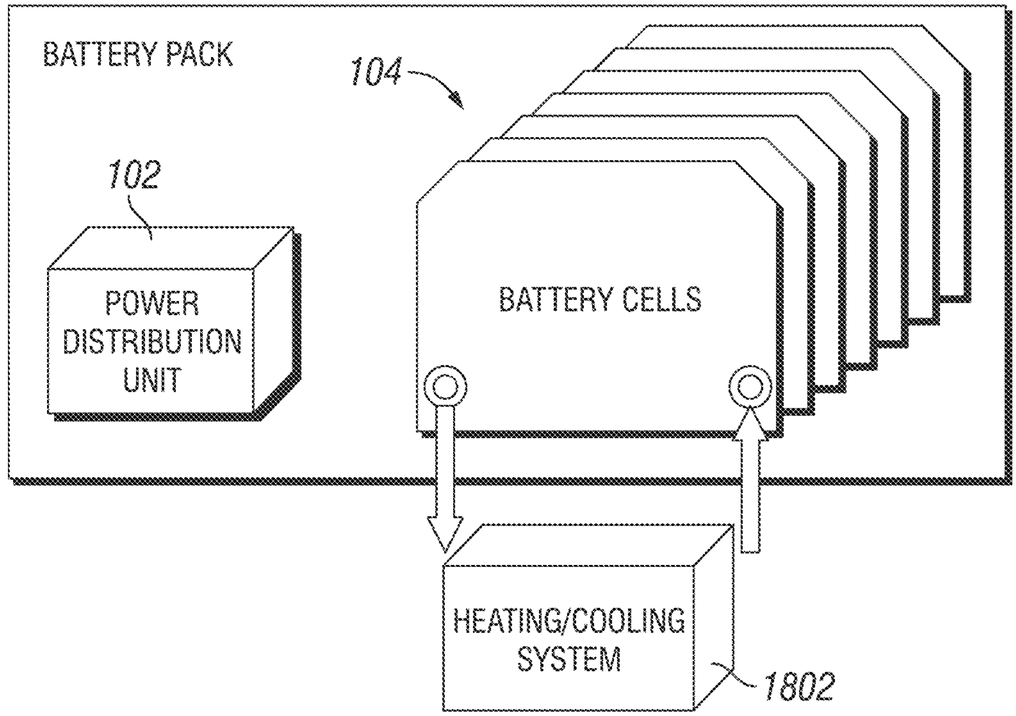
FIG. 18 shows a non-limiting example system including a PDU positioned within a battery pack housing or enclosure.
Figure 19:
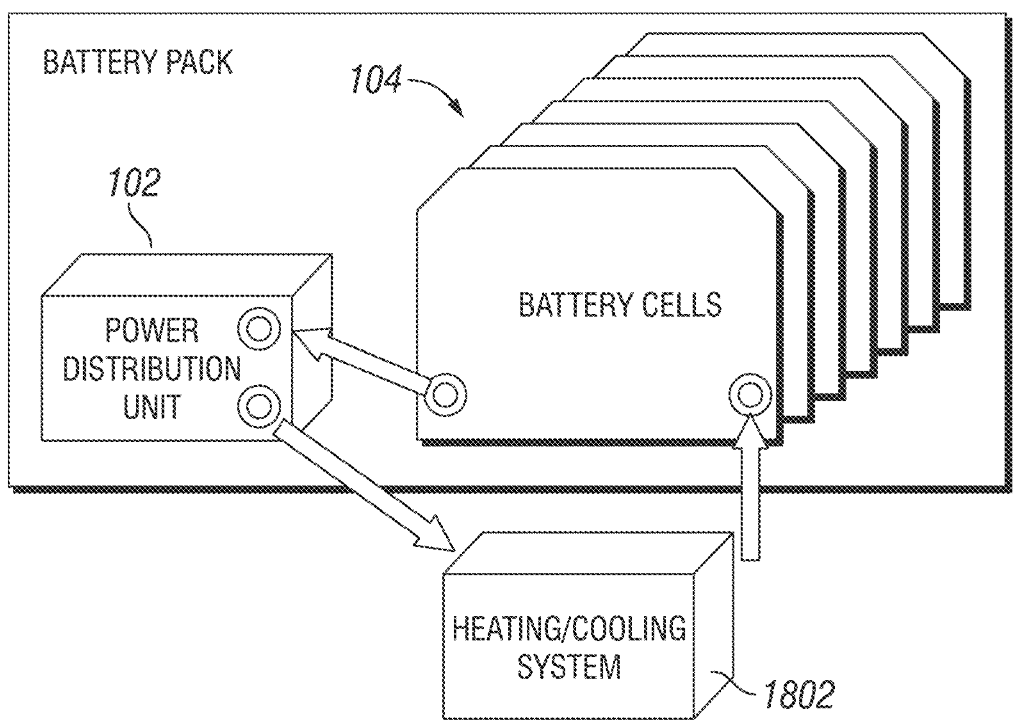
FIG. 19 shows a non-limiting example system including a PDU in a coolant loop for a heat transfer system.

Referencing FIG. 18, an example system includes the PDU 102 positioned within a battery pack housing or enclosure, where the battery cells (e.g., power source 104) are thermally coupled to a heating/cooling system 1802 present in the system. Additionally or alternatively, the PDU 102 may be thermally coupled to the battery cells 104, for example with conductive paths, at a housing interface, or the like, and/or the PDU 102 may be thermally isolated from the battery cells 104 and/or only in nominal thermal connectivity with the battery cells 104 (e.g., an arrangement where some heat transfer therebetween is expected, but without intentional design elements to increase the heat transfer between the PDU 102 and the battery cells 104). Referencing FIG. 19, an example system includes the PDU 102 in the coolant loop for the heat transfer system 1802, for example with thermal coupling aspects provided to transfer heat from the PDU 102 to the coolant loop and/or with the coolant loop including a flow branch in thermal contact with the PDU 102. The example in FIG. 19 depicts a series coolant arrangement between the battery cells 104 and the PDU 102, but any arrangement is contemplated herein including at least a parallel arrangement, a series arrangement with the PDU 102 contacted first, and/or mixed arrangements (e.g., portions of one of the battery cells 104 and the PDU 102 contacted, then all or a portion of the other, etc.).

An example procedure includes an operation to provide active and/or passive cooling to a temperature sensitive component on a PDU 102. The example procedure further includes cooling the temperature sensitive component sufficiently to extend a life of the component to a designed service life, to a predetermined maintenance interval, to a life and/or predetermined maintenance interval of the PDU 102 and/or a battery pack, and/or to reduce a temperature of a fuse to avoid thermal/mechanical damage to the fuse, a "nuisance fault" of the fuse (e.g., a failure of the fuse not occurring due to a designed protective mechanism of the fuse, such as over-current operation).

In certain embodiments, fuse design imposes complications on system—for example a fuse threshold may be desired for the fuse to engage between about 135% up to 300% of the system overcurrent threshold value. However, a fuse on the smaller end of the scale may fail due to thermal and/or mechanical fatigue over the life of the system, causing a "nuisance failure" or a fuse failure that is not due to the protective function of the fuse. Such failures cause high costs, down-time, degraded perception of the product embodying the system, potentially dangerous situations or stranding due to power loss, and the like. Designing a larger fuse to avoid nuisance failures can impose the external system to increased risk of an overcurrent event, and/or significant costs to upgrade the rest of the power system. Additionally, design of a system for multiple maximum power availabilities (e.g., one power system for two different power ratings) requires that the fuse plan be altered or designed to accommodate multiple systems. In certain embodiments, the same hardware may be utilized for different power ratings, and/or changed after the system is in operation, providing for an off-nominal fuse sizing for at least one of the multiple power ratings.

Figure 20:
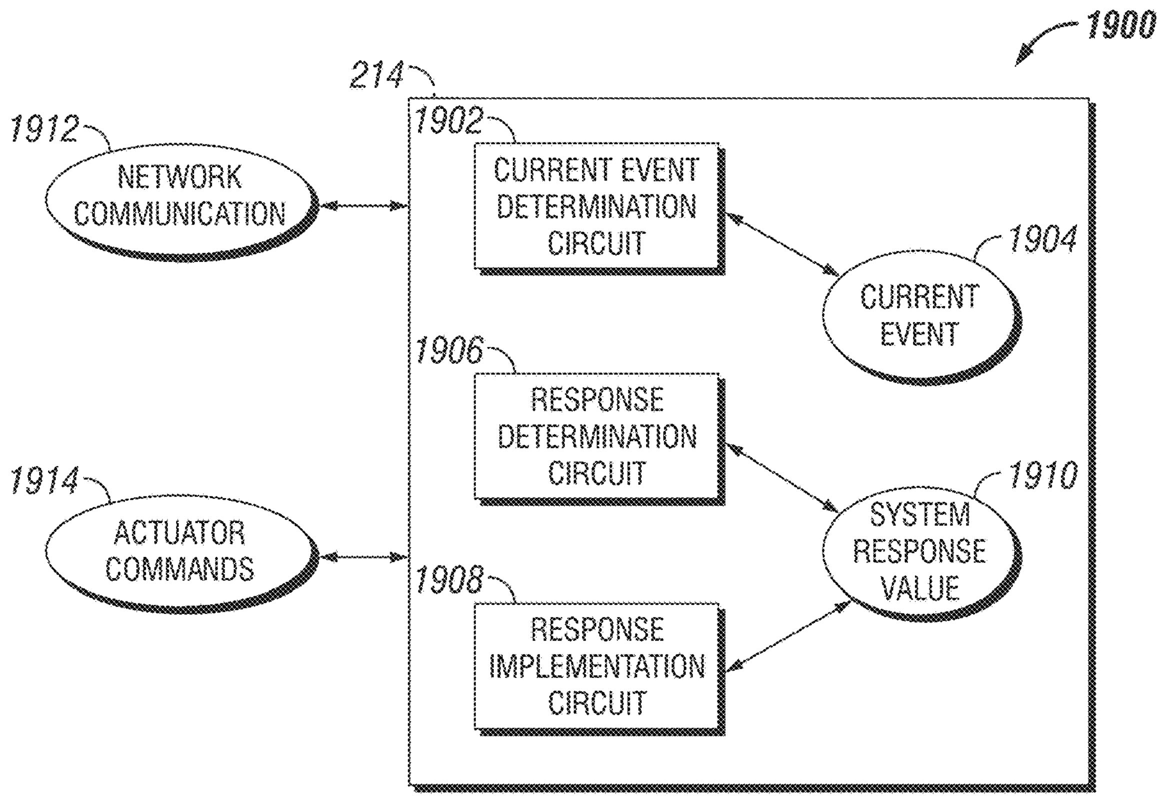
FIG. 20 shows a non-limiting example apparatus for providing additional protection against fuse nuisance faults and system failures.

Referencing FIG. 20, an example apparatus 1900 for providing additional protection against fuse nuisance faults and system failures is described. The example apparatus 1900, for example implemented on the controller 214, includes a current event determination circuit 1902 that determines a current event 1904 is active or predicted to occur, where the current event includes a component experiencing (or about to experience) a wear event—such as a current value that will cause thermal and/or mechanical stress on the component but may not cause an immediate failure or observable damage. An example component includes the fuse, but may be any other component in the system including a battery cell, a switch or connector, a motor, etc. Another example current event includes a system failure value—for example a current value that will possibly or is expected to cause a system failure (e.g., a cable failure, connector failure, etc.).

The apparatus 1900 further includes a response determination circuit 1906 that determines a system response value 1910 to the current event 1904. Example and non-limiting responses include notifying an operator to reduce power, reducing power, notifying a system controller that a current event 1904 is present or imminent, opening a contactor on the circuit related to the event, delaying circuit protection, monitoring the event and a cause for response delay and responding at a later time, and/or scheduling a response according to an operating condition in the system. The apparatus 1900 further includes a response implementation circuit 1908, where the response implementation circuit 1908 determines communications and/or actuator responses according to the system response value 1910, and provides network communications 1912 and/or actuator commands 1914 to implement the system response value 1910. Example and non-limiting actuator responses include operating a contactor, operating an active coolant actuator to modulate thermal conduction away from the fuse, or the like.

Figure 21:
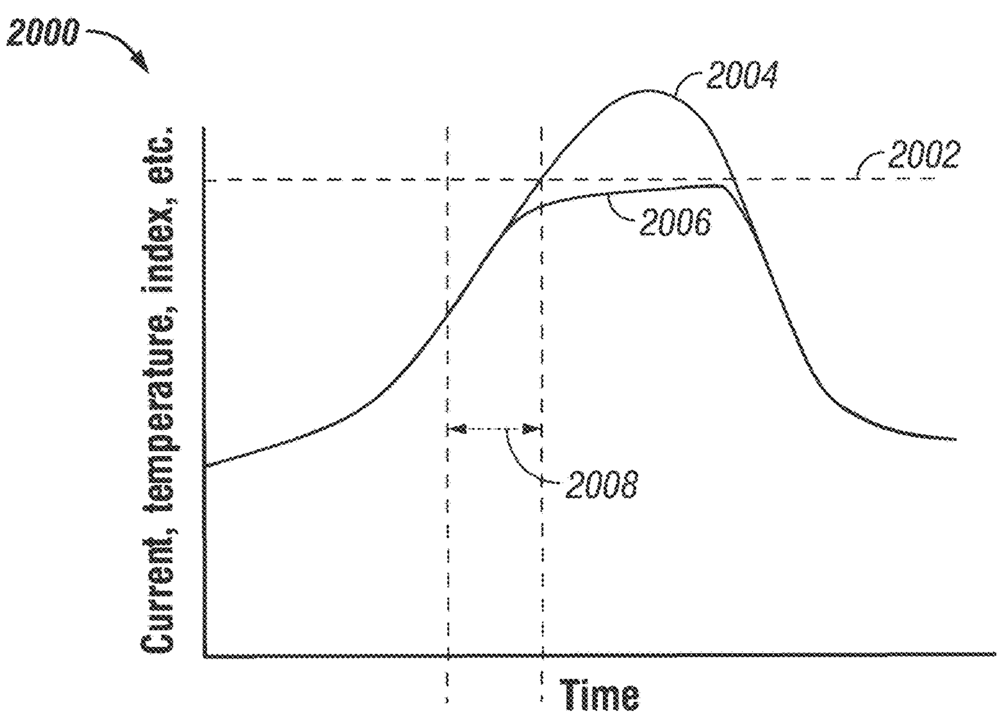
FIG. 21 depicts an embodiment illustrative data for implementing a system response value.

Referencing FIG. 21, illustrative data 2000 for implementing a system response value 1910 is depicted. The illustrative data 2000 includes a threshold value 2002—for example a current, temperature, index parameter, or other value at which component wear and/or system failure is expected to occur, and utilized as a threshold by the current event determination circuit 1902—at least under certain operating conditions at a point in time for the system. It is understood that the current event determination circuit 1902 may utilize multiple thresholds, and/or dynamic thresholds, as described throughout the present disclosure. The curve 2004 represents the nominal system performance, for example the current, temperature, index parameter, or the like that will be experienced by the system in the absence of operations of the apparatus 1900. In the example, the response determination circuit 1906 determines that the threshold value 2002 will be crossed, and accounts for a contactor disconnection time 2008 (and/or an active coolant loop response time), commanding the contactor and/or increasing thermal conduction away from the fuse, in time to avoid crossing the threshold value 2002. The illustrative data 2000 depicts a resulting system response curve 2006, wherein the resulting system performance is kept below the threshold value 2002. The system may experience alternative response trajectories (e.g., the resulting system response curve 2006 may fall well below the threshold value 2002 depending upon the dynamics of the system, how long the contactor is kept open, etc.). Additionally or alternatively, the response determination circuit 1906 may nevertheless allow the threshold value 2002 to be crossed, for example according to any operations or determinations described throughout the present disclosure. In certain embodiments, the response determination circuit 1906 allows the threshold value 2002 to be crossed, but results in a lower peak value of the response, and/or a lower area under the response curve that is above the threshold value 2002, than would occur without the operations of the response determination circuit 1906.

An example procedure, which may be performed by an apparatus such as apparatus 1900, includes an operation to determine that a current event (or other response event) is exceeding or predicted to exceed a wear threshold value, and/or determining that the current event is exceeding or predicted to exceed a system failure value. In response to determining the current event is exceeding or predicted to exceed either value, the procedure includes an operation to perform a mitigating action. The component for the wear threshold value may be a fuse (e.g., the fuse is experiencing or expected to experience a current event that will cause mechanical stress, thermal stress, or high usage of the fuse life), a component in the system (e.g., a contactor, a cable, a switch, a battery cell, etc.), and/or a defined threshold value that is nominally determined (e.g., calibration for a value that is expected to be relevant to possible component damage, without being necessarily tied to a specific component). In certain embodiments, the wear threshold value and/or the system failure value are compensated for the age or wear state of the system or a component in the system (e.g., thresholds are reduced, and/or responses are increased, as the system ages).

Non-limiting mitigating actions, which may be system response values 1910, include, without limitation: 1) disconnecting a circuit having the wear component (e.g., the fuse, system component, and/or the specific power line experiencing the event); 2) notifying an operator to reduce a power request; 3) notifying a vehicle or powertrain controller of the current event; 4) adjusting or limiting available power to the operator; 5) delaying circuit protection (disconnection and/or power reduction) in response to circumstances (e.g., in traffic, moving vehicle, application type, notification from an operator that continued operation is required, etc.)—including allowing a component in the system to experience the underlying wear event and/or failure event; 6) continued monitoring and disconnecting the circuit (or reducing power, etc.) if the event persists and if later conditions allow; 7) scheduling the response according to an operating mode of the system (e.g., sport, economy, emergency, fleet operator (and/or policy), owner/operator (and/or policy), geographic policy, and/or regulatory policy); and/or 8) bypassing the wear component (e.g., bypassing current around a fuse as a response action).

In certain embodiments, the operation to determine that the current event is exceeding the wear threshold value and/or the system failure value is based upon a calculation such as: 1) determining the current through the circuit exceeds a threshold value (e.g., an amp value); 2) determining a rate of change of the current through the circuit exceeds a threshold value (e.g., an amp/second value); and/or 3) determining that an index parameter exceeds a threshold value (e.g., the index including accumulated amp-seconds; amp/sec-seconds; a counting index for periods above a threshold value or more than one threshold value; a counting index weighted by the instantaneous current value; an integrated current, heat transfer, and/or power value; and/or counting down or resetting these based on current operating conditions).

In certain embodiments, the operation to determine that the current event is exceeding the wear threshold value and/or the system failure value includes or is adjusted based upon one or more of: 1) a trip curve (e.g., a power-time or current-time trajectory, and/or an operating curve on a data set or table such as that represented in FIG. 3); 2) a fuse temperature model, including a first or second derivative of the temperature, and one or more temperature thresholds for scheduled and/or escalating response; 3) a measured battery voltage (e.g., current values may be higher as battery voltage lowers, and/or dynamic response of current may change causing changes for the wear threshold value, system failure value, and/or current event determination); 4) a first derivative of current, temperature, power demand, and/or an index parameter; 5) a second derivative of current, temperature, power demand, and/or an index parameter; 6) information from a battery management system (e.g., voltage, current, state of charge, state of health, rate of change of any of these, which parameters may affect current values, expected current values, and/or dynamic response of current values, causing changes for the wear threshold value, system failure value, and/or current event determination); 7) determination of and monitoring of contactor disconnect times, and accounting for the contactor disconnect time in determining the response to the current event; 8) utilizing ancillary system information and adjusting the response (e.g., a power request from operations that is expected to create an upcoming change, a supplemental restraint system active/deploying—open contactors (cut power); collision avoidance system active—keep contactors closed for maximum system control; and/or an anti-lock brake system and/or traction control system active—keep contactors closed for maximum system control). In certain embodiments, a degree of activation may also be considered, and/or system status may be communicated to the PDU—for example the system may report critical operation requiring power as long as possible, or shut-down operations requiring power to be cut as soon as possible, etc.

Figure 22:
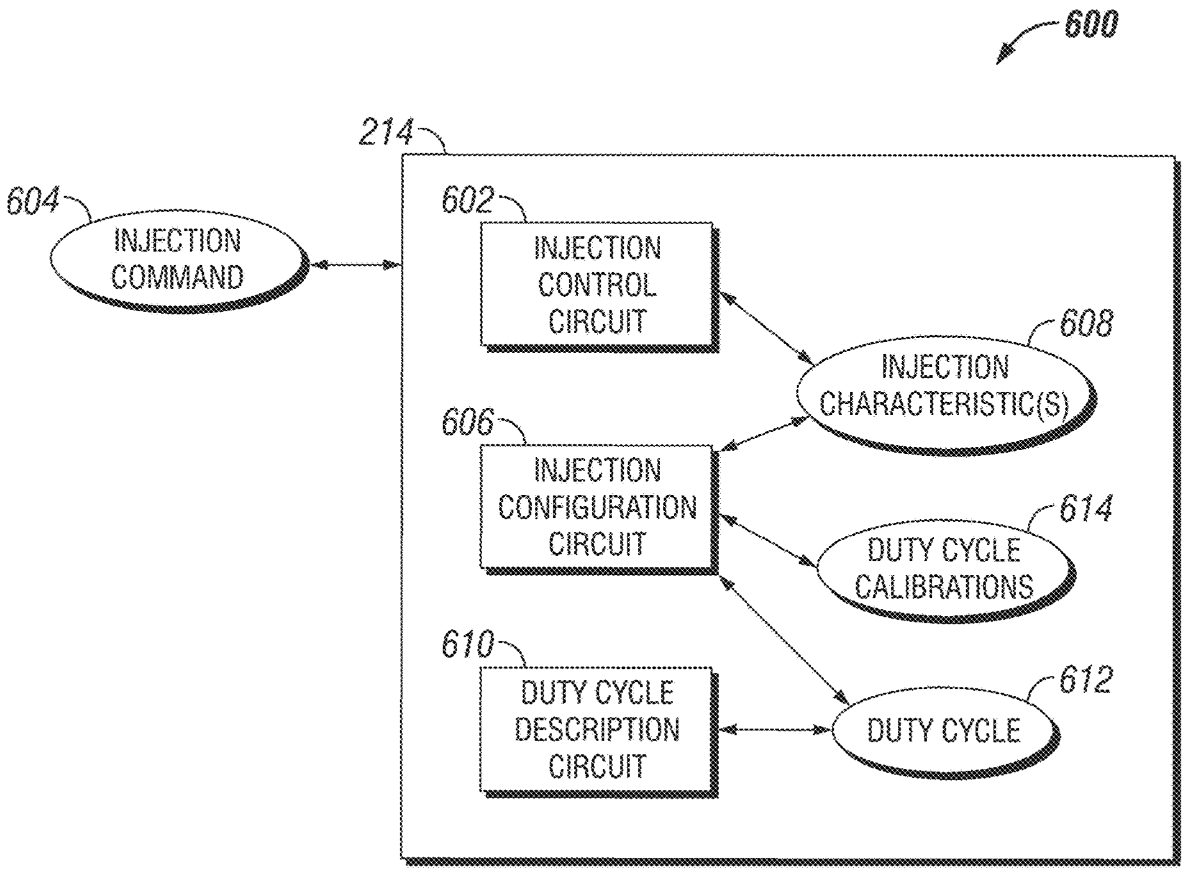
FIG. 22 depicts a non-limiting example apparatus to measure current through a fuse utilizing active current injection.

Referencing FIG. 22, an example apparatus 600 to measure current through a fuse utilizing active current injection is schematically depicted. The apparatus 600 includes the controller 214 having a number of circuits configured to functionally execute operations of the controller 214. The controller 214 includes an injection control circuit 602 that provides an injection command 604, where the current source 220 is responsive to the injection command 604. The controller 214 further includes an injection configuration circuit 606 that selects a frequency, amplitude, and/or waveform characteristic (injection characteristic 608) for the injection command 604. The controller 214 further includes a duty cycle description circuit 610 that determines a duty cycle 612 for a system including the controller 214, where the duty cycle includes a description of currents and voltages experienced by the fuse. In certain embodiments, the duty cycle description circuit 612 further updates the duty cycle 612, for example by observing the duty cycle over time, over a number of trips, over a number of operating hours, and/or over a number of miles traveled. In certain embodiments, the duty cycle description circuit 612 provides the duty cycle as an aggregated duty cycle, such as a filtered duty cycle, averaged duty cycle, weighted average duty cycle, bucketed duty cycle with a quantitative description of a number of operating regions, or the like, and selects or mixes a calibration from a number of calibrations 614, each calibration corresponding to a defined duty cycle.

An example procedure to determine fuse current throughput is described following. In certain embodiments, one or more aspects of the procedure may be performed by an apparatus 600. The procedure includes an operation to inject a current having a selected frequency, amplitude, and/or waveform characteristic into the circuit through the fuse, and to estimate the fuse resistance (including dynamic resistance and/or impedance) in response to the measured injected AC voltages and the injected current. In certain embodiments, the selected frequency, amplitude, and/or waveform characteristic is selected to provide for an acceptable, improved, or optimized measurement of the fuse resistance. For example, the base power current through the fuse to support operations of the application have a certain amplitude and frequency characteristic (where frequency includes both the power frequency if AC, and the long term variability of the amplitude if AC or DC). The injected current may have a selected frequency and/or amplitude to allow for acceptable detection of the fuse resistance in view of the base power current characteristics, and also selected to avoid interference with the operations of the application. For example, if the base power current is high, a higher amplitude of the injection current may be indicated, both to support measurement of the injected AC voltage, and because the base power current will allow for a higher injected current without interfering with the operations of the system. In another example, a frequency may be selected that is faster than current variability due to operations, that does not impinge upon a resonant frequency or harmonic frequency of a component in the system, or the like.

An example procedure includes storing a number of calibration values corresponding to various duty cycles of the system (e.g., current-voltage trajectories experienced by the system, bucketed time windows of current-voltage values, etc.), determining the duty cycle of the system, and selecting a calibration value from the calibration values in response to the determined duty cycle. The calibration values correspond to the current injection settings for the current injection source, and/or to filter values for digital filters to measure the fuse voltage and/or fuse current values. In certain embodiments, the duty cycle can be tracked during operations, and updated in real-time or at shutdown. In certain embodiments, an aggregated duty cycle description is stored, which is updated by data as observed. An example aggregated duty cycle includes a moving average of the duty cycle observed (e.g., a duty cycle defined as a trip, power on to power off cycle, operating time period, and/or distance traveled), a filtered average of the duty cycle (e.g., with selected filter constants to provide the desired response to a change—for example to respond within one trip, five trips, 30 trips, one day, one week, one month, etc.). In certain embodiments, the duty cycle updates occur with a weighted average (e.g., longer trips, higher confidence determinations, and/or operator selections or inputs may be weighted more heavily in determining the duty cycle).

A response indicates the period until the system is acting substantially based upon the changed duty cycle information, for example where calibration A is for a first duty cycle and calibration B is for the changed duty cycle, the system may be deemed to have responded to the change when 60% of calibration B is utilized, 90% of calibration B is utilized, 96% of calibration B is utilized, and/or when the system has switched over to calibration B. The utilization of multiple calibrations may be continuous or discrete, and certain aspects of the calibrations individually may be continuous or discrete. For example, where calibration A is selected, a particular amplitude (or trajectory of amplitudes), frequency (or trajectory of frequencies), and/or waveform (or number of waveforms) may be utilized, and where calibration B is selected, a different set of amplitudes, frequencies, and/or waveforms may be utilized. Where a duty cycle is positioned between A and B, and/or where the duty cycle response is moving between A and B, the system can utilize mixtures of the A and B duty cycles, and/or switch between the A and B duty cycles. In a further example, the switching between the A and B duty cycles can occur in a mixed fashion—for example where the current response is at 80% of B, then calibration B may be utilized 80% of the time and calibration A may be utilized 20% of the time. In certain embodiments, the calibration may be switched abruptly at a certain threshold (e.g., at 70% response toward the new calibration), which may include hysteresis (e.g., switch to calibration B at 80% of the distance between calibration A and B, but switch back only when at 40% of the distance between calibration A and B). In certain embodiments, certain aspects (e.g., the amplitude) may move continuously between calibrations, where other aspects (e.g., the waveform) utilize only one calibration or the other. In certain embodiments, indicators of quality feedback may be utilized to adjust the calibration response (e.g., where, during movement toward calibration B, the indicated fuse resistance appears to be determined with greater certainty, the system moves the response toward calibration B more quickly than otherwise, which may include utilizing more of calibration B than indicated by the current aggregated duty cycle, and/or adjusting the aggregated duty cycle to reflect a greater confidence that the duty cycle is going to be maintained).

Example amplitude selections include both the peak amplitude of the injected current, the adjustment from the baseline (e.g., higher increase than decrease, or the reverse), and/or the shape of amplitude generation (e.g., which may be in addition to or incorporated within the waveform selection). Additionally or alternatively, the amplitude for a given calibration may be adjusted throughout a particular current injection event—for example to provide observations at a number of amplitudes within the current injection event. Example frequency selections include adjusting the frequency of the periods of the current injection events, and may further include testing at a number of discrete frequencies, sweeping the frequencies through one or more selected ranges, and combinations of these. Example waveform selections include waveform selections to induce desired responses, to be more robust to system noise (e.g., variability in the base current, inductance and/or capacitance of components in the system, or the like), to enhance the ability of the current injection detection to isolate the injected current from the load current, and/or may include utilization of multiple waveforms in a given calibration to provide a number of different tests. In certain embodiments, where multiple amplitudes, frequencies, and/or waveforms are utilized, the injected AC voltage (and corresponding fuse resistance) can be determined by averaging measured parameters, by using higher confidence measurements, and/or by eliminating outlying measurements from the injected AC voltage determination.

According to the present description, operations to provide a high confidence determination of a fuse resistance value in a PDU 102 are described. In certain embodiments, the high confidence determination of the fuse resistance can be utilized to determine the fuse condition, to provide a high accuracy or high precision determination of current through the fuse and of power consumption by the system 100, and/or to perform system diagnostics, fault management, circuit management, or the like.

Figure 23:
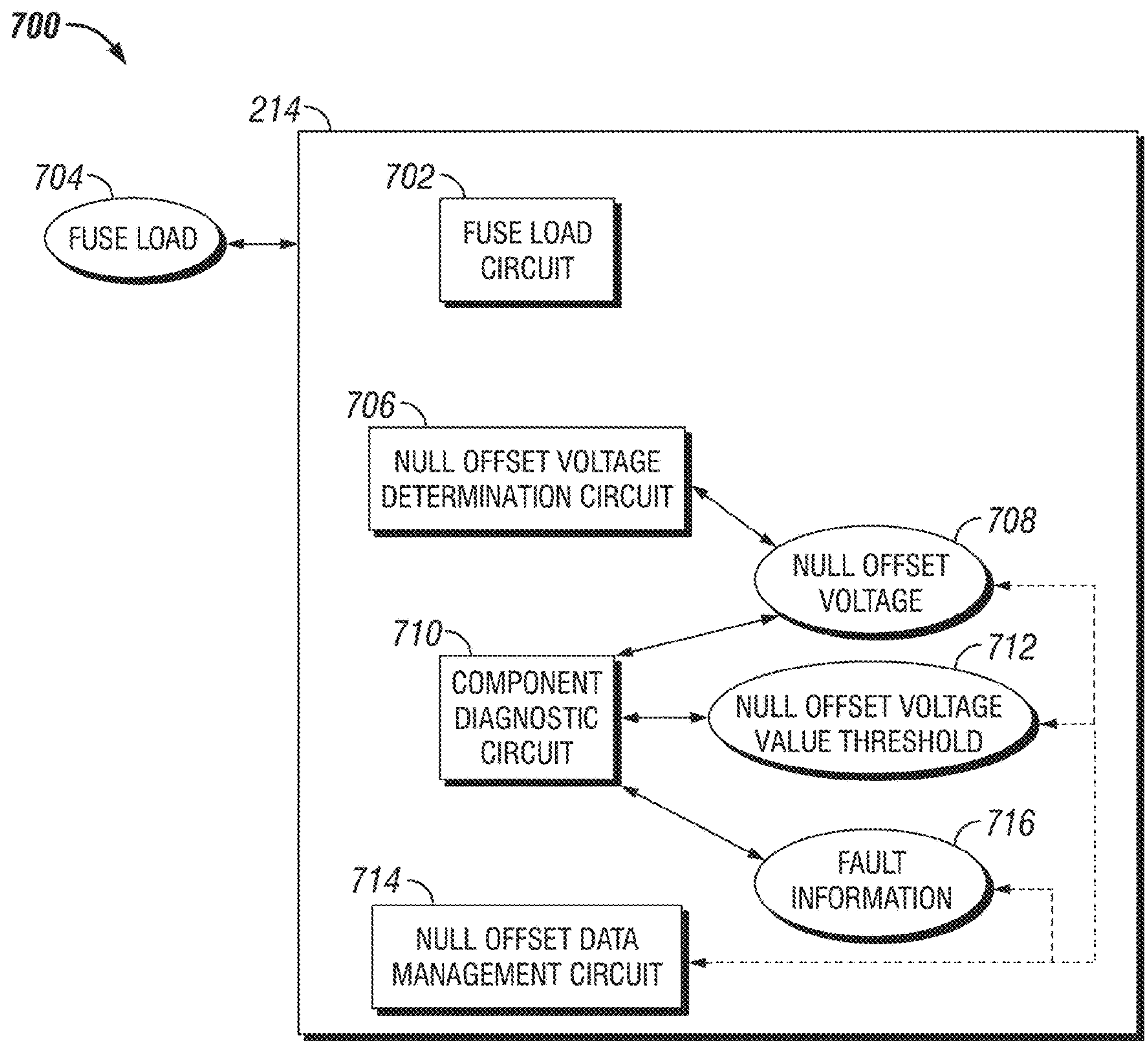
FIG. 23 depicts a non-limiting example apparatus to determine a null offset voltage and/or diagnose a system component.

Referencing FIG. 23, an example apparatus 700 to determine a null offset voltage and/or diagnose a system component are schematically depicted. The example apparatus 700 includes a controller 214 having a fuse load circuit 702 that determines that no current is demanded for a fuse load 704. The example apparatus 700 further includes a null offset voltage determination circuit 706 that determines a null offset voltage 708 in response to the fuse load 704 indicating that no current is demanded. The example apparatus 700 further includes a component diagnostic circuit 710 that determines whether a component is degraded, failed, and/or in a fault or off-nominal condition in response to the null offset voltage 708, and determines fault information 716 in response to the determining whether a component is degraded, failed, and/or in a fault or off-nominal condition (e.g., fault counters, fault values, and/or component-specific information). Operations of the component diagnostic circuit 710 include comparing the null offset nominal voltage 708 to a null offset voltage threshold value 712, and/or performing operations to determine which component is causing an off-nominal null offset voltage 708. The example apparatus 700 further includes a null offset data management circuit 714 that stores the null offset voltage 708, and/or any diagnostic or fault information 706 such as fault counters, fault values, and/or indications of which component is causing the off-nominal null offset voltage 708. In certain embodiments, where contributions to the null offset voltage 708 are determined separately for certain components, an example null offset data management circuit 714 stores individual contributions of the null offset voltage 708 separately. In certain embodiments, the utilization of the null offset voltage 708 improves the accuracy of determining the fuse resistance from the injected current.

An example procedure to determine null offset voltage for a fuse current measurement system is described following. The example procedure may be performed by a system component such as an apparatus 700. Null offset voltages occur in a controller 214 due to individual offsets of op-amps and other solid state components in the controller 214, as well as due to part-to-part variations, temperature drift, and degradation of one or more components in the system over time. The presence of a null offset voltage limits the accuracy with which current measurement through a fuse is available, and can thereby limit the types of controls and diagnostics that can be performed in the system.

An example procedure includes an operation to determine that no current is demanded for a fuse load. Example operations to determine that no current is demanded for a fuse load include a recent key-on or key-off event for a vehicle (e.g., the vehicle is starting, powering down, is in an accessory position, and/or has not yet engaged power to the fuse of interest), observation of the fuse circuit, and/or by a status observation provided by another controller in the system (e.g., a powertrain controller is explicitly indicating that no power is being provided, is indicating a status inconsistent with power being provided, etc.). An example operation determines that no current is demanded for a fuse during a key-off event, and/or within a time period after a key-on event.

The example procedure further includes an operation to determine the null offset voltage in response to determining that no current is demanded for the fuse load, and an operation to store the null offset voltage. In certain embodiments, the stored null offset voltage is stored in non-volatile memory, for example to be utilized in a subsequent operation of the system. In certain embodiments, the null offset voltage is stored in a volatile memory and utilized for a current operation cycle. The stored null offset voltage may be replaced when a new value is determined for the null offset voltage, and/or updated in a scheduled manner (e.g., by averaging in or filtering in updated values, by holding new values for subsequent confirmation before being applied, etc.).

An example procedure further includes diagnosing a component of the system in response to the null offset voltage. For example, as the null offset voltage increases over time, a degradation of the controller 214 may be indicated, and a fault (visible or service available) may be provided to indicate that the controller 214 is operating off-nominally or failed. Additionally or alternatively, a contactor (e.g., the main contactor 216) may be diagnosed in response to the null offset voltage. In certain embodiments, further operations such as engaging another contactor in-line with the diagnosed contactor may be utilized to confirm which component of the system is degraded or failed. In certain embodiments, the controller 214 may cut power to one or more components within the controller 214 to confirm that the controller 214 components are causing the offset voltage. In certain embodiments, the procedure includes determining the individual contributions of components to the offset voltage—for example by separating the controller 214 contribution and the contactor contribution. In response to the offset voltage being above a threshold value and/or confirming which component of the system is causing the off-nominal offset voltage, the controller 214 may increment a fault value, set a fault value, and/or set a service or diagnostic value. In certain embodiments, the null offset voltage and/or any fault values may be made available to the system, to a network, and/or communicated to another controller on the network.

According to the present description, operations to provide a nominal offset voltage for high confidence determination of a fuse current and a fuse resistance value in a PDU 102 are described. In certain embodiments, the high confidence determination of the fuse resistance can be utilized to determine the fuse condition, to provide a high accuracy or high precision determination of current through the fuse and of power consumption by the system 100, and/or to perform system diagnostics, fault management, circuit management, or the like.

Figure 24:
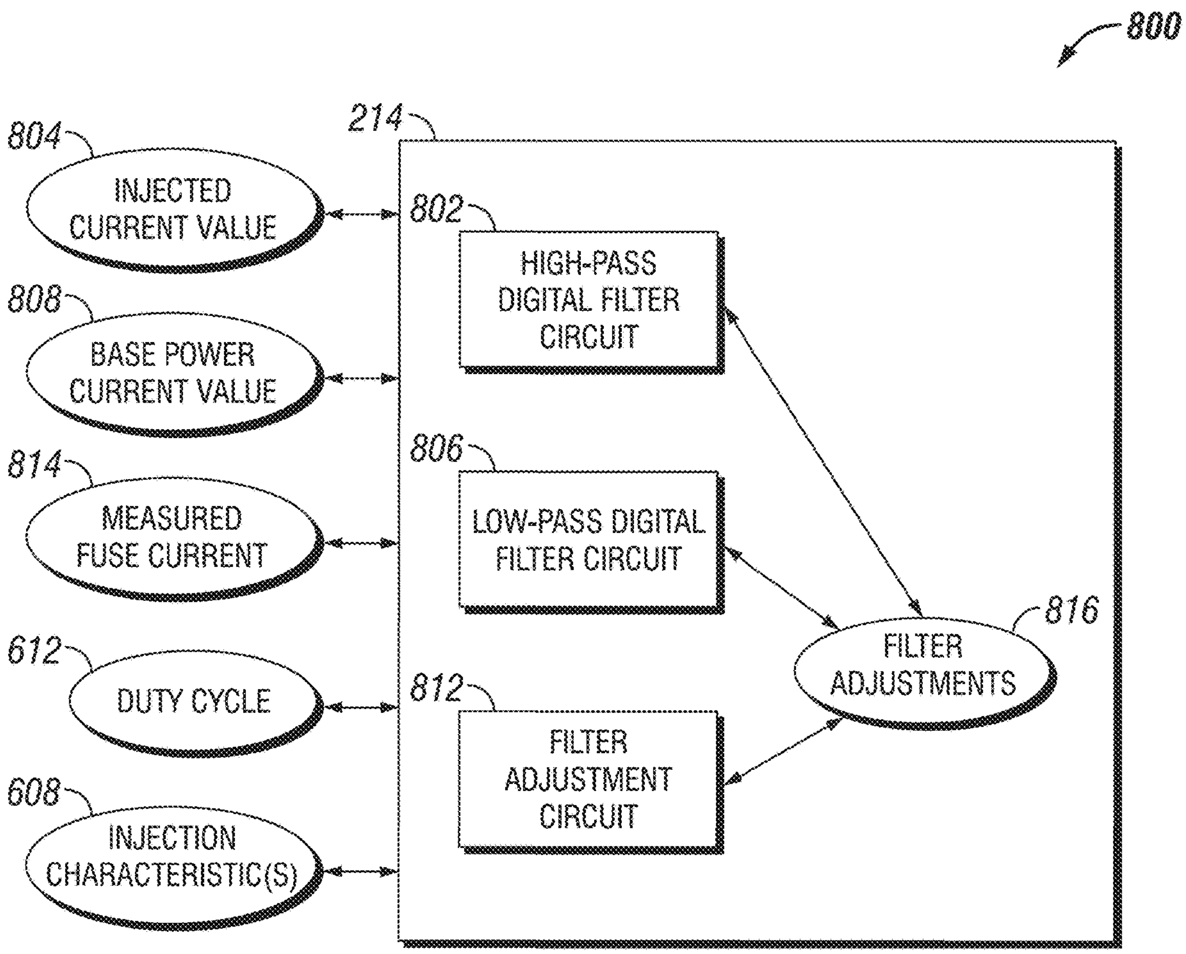
FIG. 24 depicts a non-limiting example apparatus to provide for digital filtering of a current measurement through a fuse circuit.

Referencing FIG. 24, an example apparatus 800 to provide for digital filtering of a current measurement through a fuse circuit is depicted schematically. In certain embodiments, where current is injected through a fuse, the measurement of the base power current and the injected AC current through the fuse are de-coupled utilizing a low-pass filter (pulling out the base power signal) and a high-pass filter (pulling out the injected current signal). Previously known systems utilize an analog filter system—for example constructed of capacitors, resistors, and/or inductive devices, that provide the selected filtering of the signal and thereby provide the separated base power signal and injected current signal. However, analog filter systems suffer from a number of drawbacks. First, analog systems are not configurable, are only configurable to a discrete number of preconsidered options, and/or are expensive to implement. Accordingly, a wide range of base power signals and injected AC current signals are not typically available for high accuracy determination of the fuse current with an analog filter system. Additionally, analog filter systems suffer from phase variance between the low-pass filter and the high-pass filter, and/or between the filtered output and the injected current signal. Accordingly, post-processing and/or acceptance of a less accurate signal are required, and accuracy is diminished on the measured current even with post-processing. Further, if the system has a component that has a base frequency or harmonic that interferes with the filter, the analog filter is not able to respond and will not provide reliable measurements. Because the frequency dynamics of the system can change over time, for example as components degrade, are service or replaced, and/or due to environmental or duty-cycle driven changes, even careful system design cannot fully resolve the inability of analog filters to respond to interference from frequency dynamics in the system. The example apparatus 800 includes a high-pass digital filter circuit 802 that determines the injected current value 804 for the fuse circuit by providing a high-pass filter operation on a measured fuse current 814, and a low-pass digital filter circuit 806 that determines the base power current value 808 for the fuse circuit by providing a low-pass filter operation on the measured fuse current. The example apparatus 800 further includes a filter adjustment circuit 812 that interprets a duty cycle 612 and/or an injection characteristic 608, and adjusts the filtering for the high-pass digital filter circuit 802 and/or the injection characteristic 608—for example by providing filter adjustments 816 such as providing distinct cutoff frequencies to ensure separation of the signals, to raise or lower cutoff frequencies to ensure a descriptive energy portion of the signal is captured, and/or to manipulate the filters to avoid a frequency or a harmonic in the system. While the example embodiment of FIG. 24 utilizes a digital filter, in certain embodiments the available controller processing resources and/or time response of digital filtering may lead certain systems to utilize analog filters and/or a combination of analog filters with digital filters.

An example procedure includes an operation to provide digital filters in a PDU 102 to determine base power and injected current values from a measured current value through the fuse. The example procedure further includes an operation to determine the base power by performing a low-pass filter operation on the measured current value, and to determine the injected current value by performing a high-pass filter operation on the measured current value. The example procedure further includes an operation to adjust parameters of the low-pass filter and/or the high-pass filter in response to a duty cycle of the system including the PDU 102 (including, for example, power, voltage, and/or current values passing through the fuse), and/or in response to an injection characteristic of the injected current through the fuse. The example procedure includes adjusting the parameters to improve the separation of the base power and/or injected current values, to improve the accuracy of determining the injected current amount, to adjust to a frequency and/or a harmonic of a component in the system in electrical communication with the fuse, and/or to respond to a system or environmental noise affecting one or both of the high-pass and low-pass filters.

According to the present description, operations to implement digital filters for de-convoluting a voltage characteristic and current measurement through a fuse are provided. The digital filtering allows for the system to provide a high confidence determination of a fuse current and a fuse resistance value in a PDU 102. In certain embodiments, the high confidence determination of the fuse resistance can be utilized to determine the fuse condition, to provide a high accuracy or high precision determination of current through the fuse and of power consumption by the system 100, and/or to perform system diagnostics, fault management, circuit management, or the like.

Fuses for highly transient load applications and/or high duty cycle variability applications, such as but not limited to electrical systems for mobile applications and vehicles experience a number of challenges. Load variation can change considerably throughout operations, including experiencing both high positive and high negative current operations, and often in a short period of time (e.g., acceleration and regenerative braking cycles in stop-and-go traffic; high load operation going up a hill followed by significant regeneration down the other side, etc.). Additionally, current transients and reversals can result in significant in-rush currents that are experienced by the fuse. Fuses are designed to fail at a protective current value, which is intended to correspond to a fuse temperature value. Because they are designed to fail at a relatively close value to the maximum current demands, they are consequently one of the most delicate physical parts in the system—both electrically and physically. Sub-critical current values and current transient values can cause the fuse to suffer thermal and mechanical stresses, both from temperatures experienced and temperature transients. Fuses subject to significant sub-critical cycling can fail—either by melting even though the designed failure current has not been exceeded, or by breaking due to mechanical stress. Mobile applications, as discussed throughout the present disclosure, are subject to particularly high costs and risks when a mission critical component such as a fuse fails (e.g., the vehicle generally does not have motive power available if a main power fuse fails). Additionally, mobile applications are subject to high transient loads through the motive power system.

Figure 25:
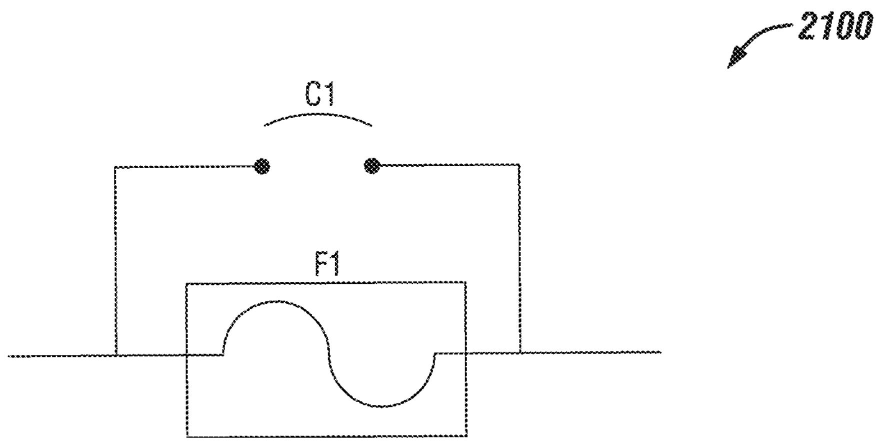
FIG. 25 depicts a non-limiting example fuse circuit that may be present on a PDU.

Referencing FIG. 25, an example fuse circuit 2100 is depicted, which may be present on a PDU 102. The example fuse circuit 2100 may be associated with a main fuse, an auxiliary fuse, and/or a group of fuses or a subset of a group of fuses. The fuse circuit 2100 includes a contactor (C1) in parallel with the fuse (F1). During normal operations the contactor is open, and the current in the fuse circuit 2100 passes through the fuse. In certain embodiments, the contactor may include physical components (e.g., a solenoid and/or coil-based switch or relay), and/or the contactor may be a solid state relay. In certain embodiments, the contactor may be normally-open (e.g., power applied closes the contactor) or normally-closed (e.g., power applied opens the contactor). The example fuse circuit 2100 allows for the contactor to selectively bypass the fuse circuit, for example in accordance with operations of an apparatus 1900 (reference FIG. 20 and the corresponding disclosure).

Figure 26:
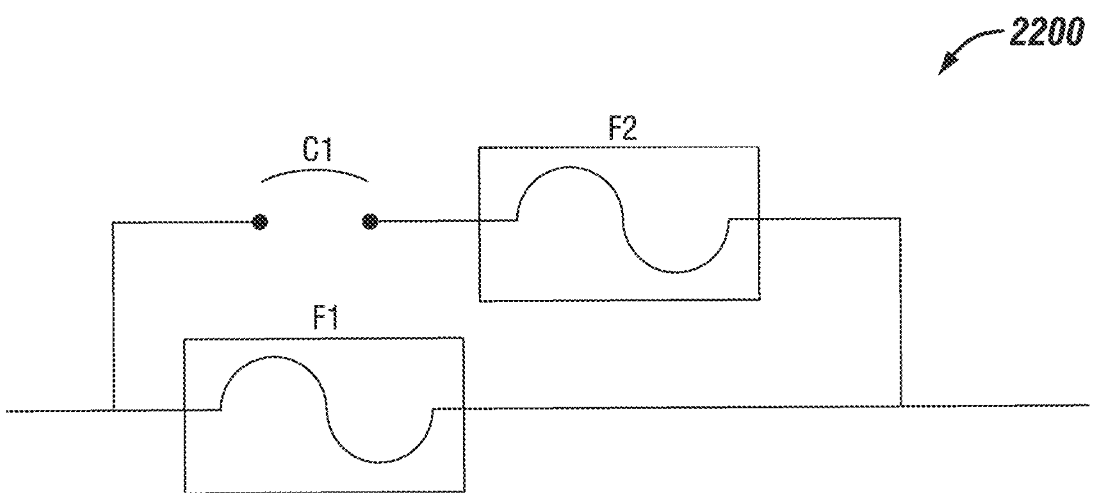
FIG. 26 depicts an embodiment of a fuse circuit with a contactor.

Referencing FIG. 26, another embodiment of a fuse circuit 2200 is disclosed, with a contactor (C1) in series with a second fuse (F2), and the C1-F2 branch in parallel with a first fuse F1. The fuse circuit 2200 provides for additional flexibility and a number of additional features for operations of an apparatus 1900. For example, normal operation may be performed with the contactor closed, dividing current between F1 and F2 (in the resistance ratios of the two fuses). An example includes a fuse F2 with a low current threshold value, set such that the divided current would fail fuse F2 if the system design current is exceeded by a designed amount (e.g., between 135% and 300% of system design current—although any value is contemplated herein). The fuse F1 may be set at a very high value, allowing for the opening of the contactor to briefly increase the fusing capacity of the circuit but still be fused. Additionally or alternatively, fuse F2 may be a relatively cheap and/or accessible fuse, and being at a lower current threshold F2 is likely to suffer greater mechanical and thermal fatigue, and act as the failure point for the fuse circuit 2200, which may greatly extend the life of the fuse F1 which may be more expensive and/or less accessible. Additionally or alternatively, normal operation may be performed with the contactor open, with fuse F1 defining the ordinary fusing of the circuit. When a high transient or other current event occurs, the contactor is closed, and the branch C1-F2 shares the current load, keeping the fuse F1 within normal or lower wear operating conditions. In certain embodiments, fuses F1 and F2 may be similarly sized—for example to allow fuse F2 to operate as a backup fuse and to keep similar failure conditions in place for F1 and F2. Alternatively, fuse F2 may be smaller than fuse F1, allowing for alternate operations as described, the intermittent use of the C1-F2 circuit to take up some current to protect fuse F1, and/or to provide back-up fusing for F1—which may be at a reduced power limit for the system if the fuse F2 is smaller (e.g., as a de-rated mode of operation, and/or a limp-home mode of operation). Alternatively, fuse F2 may be larger than fuse F1, for example to allow fuse F2 to manage very high transient current conditions where it is desired that operation still continues. The utilization of a fuse circuit 2200 allows for a high degree of control of the fusing system, to be protective of the power system during nominal operation and still provide a high degree of capability during failure modes, for off-nominal operation, and/or during transient operation. In certain embodiments, a resistor may be provided on the C1-F2 branch, for example to control the current sharing load between F1 and F2 when the contactor C1 is closed.

Figure 27:
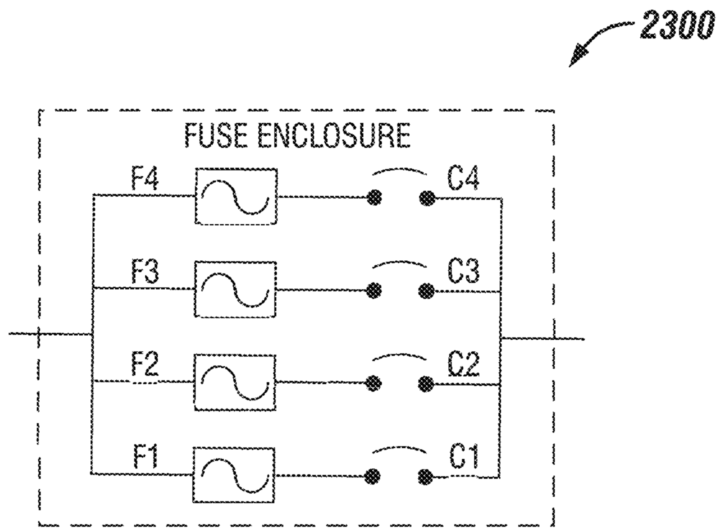
FIG. 27 depicts an embodiment fuse circuit including a plurality of fuses.

Referencing FIG. 27, a fuse circuit 2300 includes a plurality of fuses F1, F2, F3, F4 depicted in parallel, with a corresponding contactor in series with each. An example fuse circuit 2300 is for auxiliary fuses, although fuse circuit 2300 can be any fuse, including a main fuse. The example fuse circuit 2300 allows for either the removal of fuses from operation—for example where one of the fuses is experiencing a transient event—or for the addition of fuses, such as when a high transient event occurs to share the current load. In certain embodiments, one or more of the fuses in the fuse circuit 2300 does not have an associated contactor, and is a primary load bearing fuse for the fuse circuit 2300. The relative sizing of the fuses in the fuse circuit 2300 may be according to any selected values, and will depend upon the purpose of the fuse circuit 2300 (e.g., to provide a limp-home feature, to provide additional capacity, to act as a back-up, and/or to allow for the cut-off of individual fuses in the system). Additionally or alternatively, any one or more of the fuses in fuse circuit 2300 may be positioned serially with a resistor, for example to control current load balancing. In certain embodiments, the fuses F1, F2, F3, F4 are not in parallel, and/or one or more of the fuses is not in parallel. Accordingly, the opening of a contactor for such a fuse will not shunt current to another one of the fuses. An example embodiment includes the contactors for fuses individually to allow for shutting down of certain system capability (e.g., due to a failure, high transient, or the like) without shutting down all system capability (e.g., a fuse supporting braking may remain active even in a high transient event, while an accessory fuse for non-critical systems may be cut off to protect the fuse and/or the system).

Figure 28:
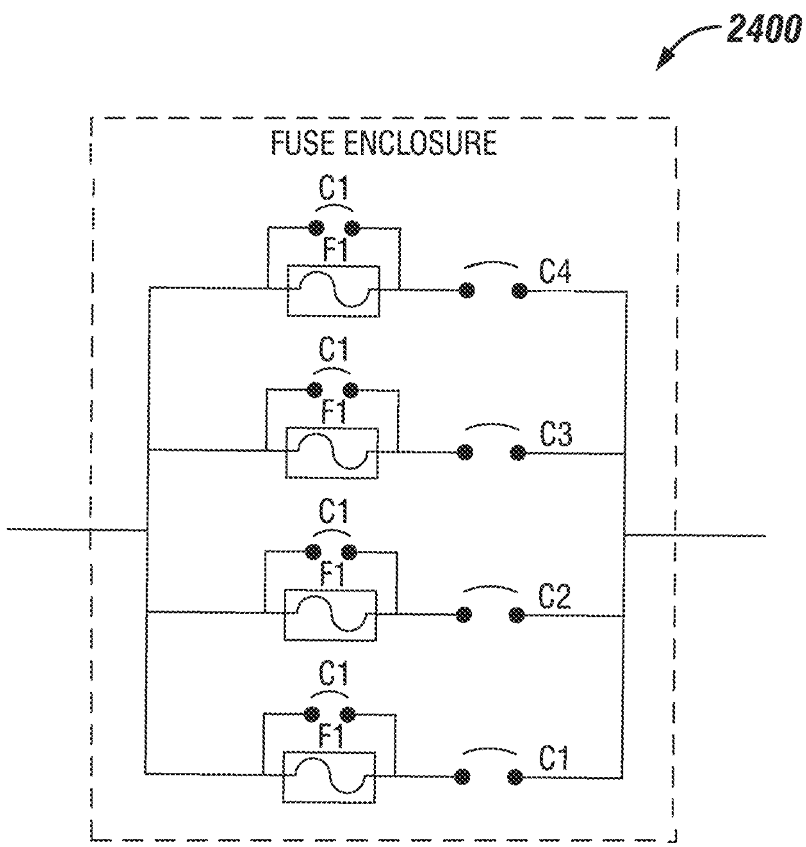
FIG. 28 depicts a fuse circuit with fuses in parallel with a contactor.

Referencing FIG. 28, a fuse circuit 2400 is depicted, similar to fuse circuit 2300, except that each fuse has a contactor in parallel, allowing for the shorting of the particular fuse while keeping current flowing on that fuse's path. In certain embodiments, the parallel path for each fuse may include an additional fuse and/or a resistor, such that when the fuses are connected in parallel, the load across each fuse circuit remains at least partially balanced. The embodiments of FIGS. 25 to 28 may be referenced as current protection circuits, and embodiments such as those depicted in FIGS. 25 to 28, and/or as described, allow for selectable configuration of the current protection circuit. Selectable configuration of the current protection circuit may include run-time operations (e.g., reconfiguring the current protection circuit in response to events or operating conditions) and/or design-time operations (e.g., allowing a same hardware device to support multiple power ratings, electrical connection configurations, and/or service event or upgrade changes).

Figure 29:
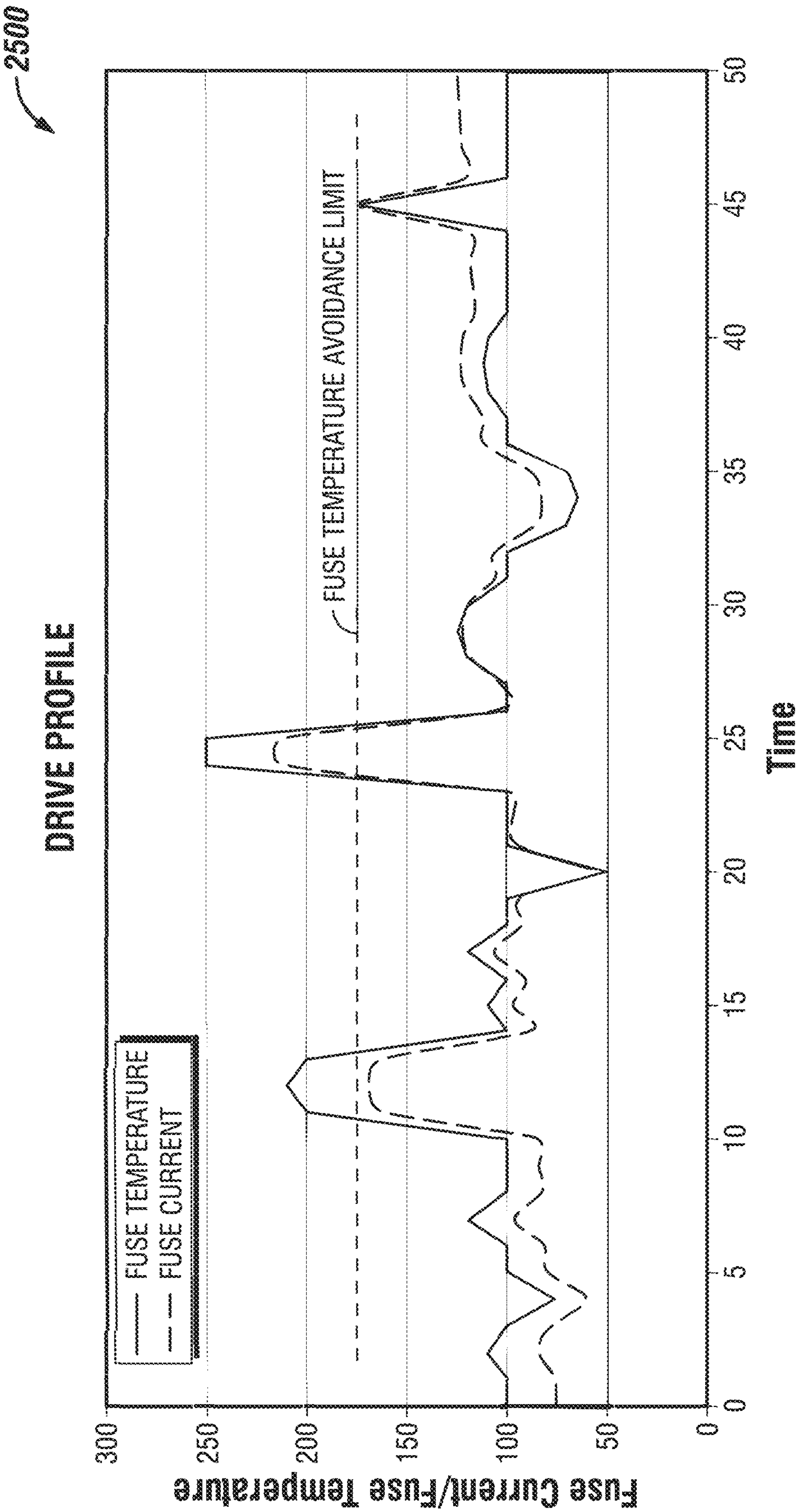
FIG. 29 depicts illustrative data showing a fuse response to a drive cycle for a vehicle.

Referencing FIG. 29, illustrative data 2500 showing a fuse response to a drive cycle for a vehicle is depicted. In the example, fuse current (e.g., the dashed line lower curve at times of 12 and 25 units) and fuse temperature (e.g., the solid line upper curve at times of 12 and 25 units) are depicted. It will be understood that another parameter describing the fuse performance and/or limits may be utilized, including at least any values described in the portion referencing FIG. 21. The operations of the drive cycle exhibit high transients where, in the example, the fuse temperature is expected to exceed the "fuse temperature avoidance limit"—for example, a temperature or temperature transient at which the fuse experiences mechanical stress. An apparatus 1900 may consider a number of thresholds for the fuse—for example a light wear threshold, a heavy wear threshold, and a potential failure threshold, which may be set at distinct values of the fuser performance indicator being utilized (e.g., temperature). In certain embodiments, more than one type of threshold value may be utilized—for example a threshold or set of thresholds for temperature, a second threshold or set of thresholds for temperature change with time (e.g., dT/dt), etc. In the example, an apparatus 1900 may take mitigating action at the transient points, for example bypassing the corresponding fuse briefly to avoid the transient and/or control the rate of transient experienced by the fuse.

Figure 30:
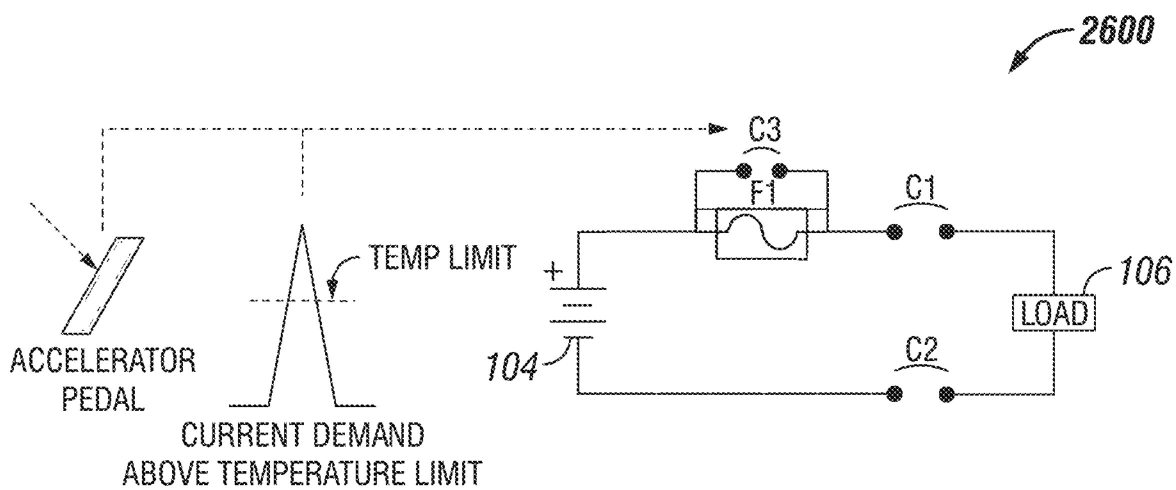
FIG. 30 depicts a non-limiting example system including a power source and s load with a fuse electrically disposed between the load and the source.

Referencing FIG. 30, an example system 2600 include the power source 104 and load 106, with a fuse (F1) electrically disposed between the load 106 and the source 104. An operator provides a power request (accelerator pedal input), and an apparatus 1900 determines that the load request will exceed a threshold for the fuse (e.g., according to the current demand above temperature limit, or some other determination) but may further determine that the transient event will not otherwise exceed system operating condition limits. In the example, apparatus 1900 commands the contactor (C3) to close for a period of time before or during the transient to protect the fuse. The system 2600 depicts the high-side (C1) and low-side (C3) high voltage contactors (e.g., 216, 218 from system 100), which are distinct from the fuse bypass contactor C3.

Referencing FIG. 21, illustrative data 2000 for implementing a system response value 1910 is depicted. The illustrative data 2000 includes a threshold value 2002—for example a current, temperature, index parameter, or other value at which fuse wear and/or failure is expected to occur, and utilized as a threshold by the current event determination circuit 1902—at least under certain operating conditions at a point in time for the system. It is understood that the current event determination circuit 1902 may utilize multiple thresholds, and/or dynamic thresholds, as described throughout the present disclosure. The curve 2004 represents the nominal system performance, for example the current, temperature, index parameter, or the like that will be experienced by the fuse in the absence of operations of the apparatus 1900. In the example, the response determination circuit 1906 determines that the threshold value 2002 will be crossed, and accounts for a contactor connection/disconnection time 2008 (e.g., to bypass the fuse, engage a second fuse branch, and/or close off a more vulnerable fuse branch), commanding the contactor to connect or disconnect in time to avoid crossing the threshold value 2002. Additionally or alternatively, the response determination circuit 1906 may nevertheless allow the threshold value 2002 to be crossed, for example according to any operations or determinations described throughout the present disclosure—for example when a more critical system parameter requires the fuse to remain connected, and the fuse is allowed to experience the wear and/or failure event.

In certain embodiments, the operation to determine that the current event is exceeding the wear threshold value and/or the fuse failure value is based upon a calculation such as: 1) determining the current through the fuse exceeds a threshold value (e.g., an amp value); 2) determining a rate of change of the current through the fuse exceeds a threshold value (e.g., an amp/second value); 3) determining that an index parameter exceeds a threshold value (e.g., the index including accumulated amp-seconds; amp/sec-seconds; a counting index for periods above a threshold value or more than one threshold value; a counting index weighted by the instantaneous current value; an integrated current, heat transfer, and/or power value; and/or counting down or resetting these based on current operating conditions).

In certain embodiments, the operation to determine that the current event is exceeding the wear threshold value and/or the fuse failure value includes or is adjusted based upon one or more of: 1) a trip curve (e.g., a power-time or current-time trajectory, and/or an operating curve on a data set or table such as that represented in FIG. 3); 2) a fuse temperature model, including a first or second derivative of the temperature, and one or more temperature thresholds for scheduled and/or escalating response; 3) a measured battery voltage (e.g., current values may be higher as battery voltage lowers, and/or dynamic response of current may change causing changes for the wear threshold value, system failure value, and/or current event determination); 4) first derivative of current, temperature, power demand, and/or an index parameter; 5) second derivative of current, temperature, power demand, and/or an index parameter; 6) information from a battery management system (e.g., voltage, current, state of charge, state of health, rate of change of any of these, which parameters may affect current values, expected current values, and/or dynamic response of current values, causing changes for the wear threshold value, fuse failure value, and/or current event determination); 7) determination of and monitoring of contactor connection or disconnection times, and accounting for the contactor connection or disconnection time in determining the response to the current event; 8) utilizing ancillary system information and adjusting the response (e.g., collision avoidance system active—allow the fuse to fail, and/or bypass the fuse allowing potential damage to the system, to keep power flowing; anti-lock brake system and/or traction control system active—keep power flowing for maximum system control (degree of activation may also be considered, and/or system status communicated to the PDU—for example the system may report critical operation requiring power as long as possible, or shut-down operations requiring power to be cut as soon as possible, etc.)).

Referencing FIG. 20, an example apparatus 1900 to reduce or prevent fuse damage and/or a fuse failure is depicted. The example apparatus 1900 includes a current event determination circuit 1902, which may determine that current event 1904 indicates that a fuse threshold value (wear, failure, fatigue, or other threshold value) is exceeded or is predicted to be exceeded. The current event 1904 may be a current, temperature, or any other parameter described, for example, in relation to FIGS. 21, 29, and 30. The example apparatus 1900 further includes a response determination circuit 1906 that determines a system response value 1910—for example opening or closing one or more contactors in a fuse circuit (e.g., 2100, 2200, 2300, 2400, or any other fuse circuit or current protection circuit). The apparatus 1900 further includes a response implementation circuit 1908 that provides network communications 1912 and/or actuator commands 1914 in response to the system response value 1910. For example, the system response value 1910 may determine to close one or more contactors, and the actuator commands 1914 provides commands to the selected contactors which are responsive to the actuator commands 1914.

In certain embodiments, operations to bypass and/or engage one or more fuses are performed in coordination with a vehicle battery management system and/or an accelerator pedal input (or other load request indicator)—for example to time inrush currents that would be experienced on the fuses, to provide an indication to the battery management system or other vehicle power systems that momentary un-fused operation is going to occur, and/or that a higher fuse limit will be briefly applicable. In certain embodiments, during un-fused operation and/or higher fuse limit operation, the apparatus 1900 may operate a virtual fuse—for example if the experienced current is higher than predicted (e.g., it was predicted to exceed a fuse wear limit but be less than a system failure limit, but in fact appears that a system failure limit will be exceeded), the apparatus 1900 may operate to open a main high voltage contactor, re-engage the fuse, or make another system adjustment to protect the system in the absence of ordinarily available fusing operations.

Figure 31:
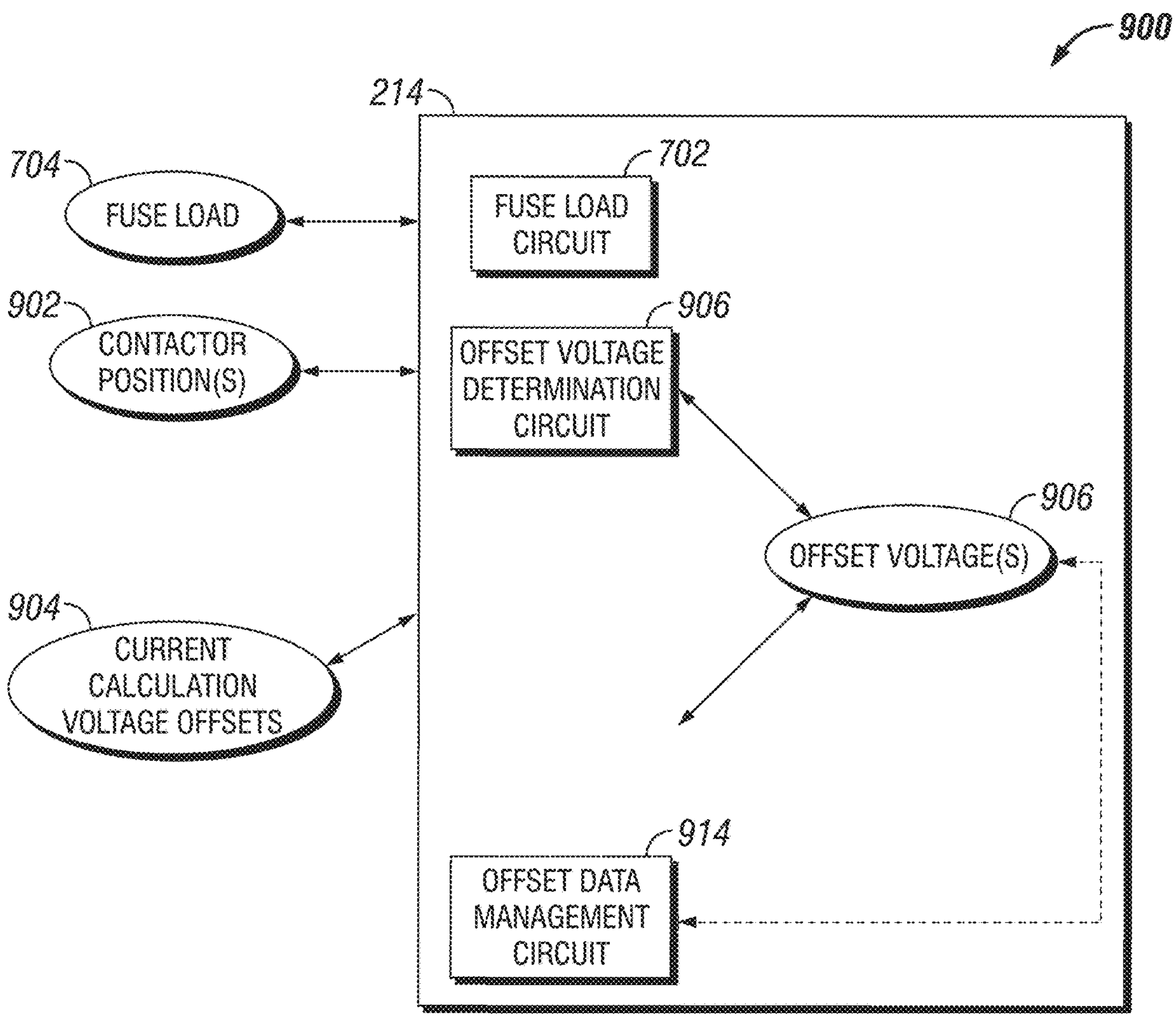
FIG. 31 depicts a non-limiting example apparatus to determine an offset voltage to adjust a fuse current determination.

Referencing FIG. 31, an example apparatus 900 to determine an offset voltage to adjust a fuse current determination are schematically depicted. The example apparatus 900 includes a controller 214 having a fuse load circuit 702 that determines that no current is demanded for a fuse load 704, and further determines that contactors associated with the fuse are open. The example apparatus 900 further includes an offset voltage(s) determination circuit 906 that determines offset voltages for components in the fuse circuit observed during the no current demanded portion of the operating cycle. In certain embodiments, the contactors remain open while pre-charge capacitors are still charging after a key-on cycle, whereupon the fuse load circuit 702 determines that no current is demanded for the fuse load 704. In certain embodiments, the contactors are opened during an operation of the system, and an example fuse load circuit 702 determines that no current is demanded for a fuse load 704, including potentially waiting for observed voltages to settle before determining that no current is demanded for the fuse load 704.

The example apparatus 900 further includes an offset data management circuit 914 that stores the offset voltages 906, and communicates current calculation offset voltages 904 for use in the system to determine current flow through the one or more fuses in the system. The current calculation offset voltages 904 may be the offset voltages 906 for the applicable components, and/or may be processed or conditioned values determined from the offset voltages 906.

An example procedure to determine an offset voltage for a fuse current measurement system is described following. The example procedure may be performed by a system component such as an apparatus 900. Offset voltages occur in a controller 214 due to individual offsets of op-amps and other solid state components in the controller 214, as well as due to part-to-part variations, temperature drift, and degradation of one or more components in the system over time. The presence of an offset voltage limits the accuracy with which current measurement through a fuse is available, and can thereby limit the types of controls and diagnostics that can be performed in the system.

An example procedure includes an operation to determine that no current is demanded for a fuse load. Example operations to determine that no current is demanded for a fuse load include a recent key-on or key-off event for a vehicle (e.g., the vehicle is starting, powering down, is in an accessory position, and/or has not yet engaged power to the fuse of interest), observation of the fuse circuit, and/or by a status observation provided by another controller in the system (e.g., a powertrain controller is explicitly indicating that no power is being provided, is indicating a status inconsistent with power being provided, etc.). An example operation determines that no current is demanded for a fuse during a key-off event, and/or within a time period after a key-on event.

The example procedure further includes an operation to determine the offset voltage in response to determining that no current is demanded for the fuse load, and an operation to store the offset voltage. In certain embodiments, the stored offset voltage is stored in non-volatile memory, for example to be utilized in a subsequent operation of the system. In certain embodiments, the offset voltage is stored in a volatile memory and utilized for a current operation cycle. The stored offset voltage may be replaced when a new value is determined for the offset voltage, and/or updated in a scheduled manner (e.g., by averaging in or filtering in updated values, by holding new values for subsequent confirmation before being applied, etc.).

According to the present description, operations to provide an offset voltage for components in the fuse circuit, for high confidence determination of a fuse current and a fuse resistance value in a PDU 102 are described. In certain embodiments, the high confidence determination of the fuse resistance can be utilized to determine the fuse condition, to provide a high accuracy or high precision determination of current through the fuse and of power consumption by the system 100, and/or to perform system diagnostics, fault management, circuit management, or the like.

Figure 32:
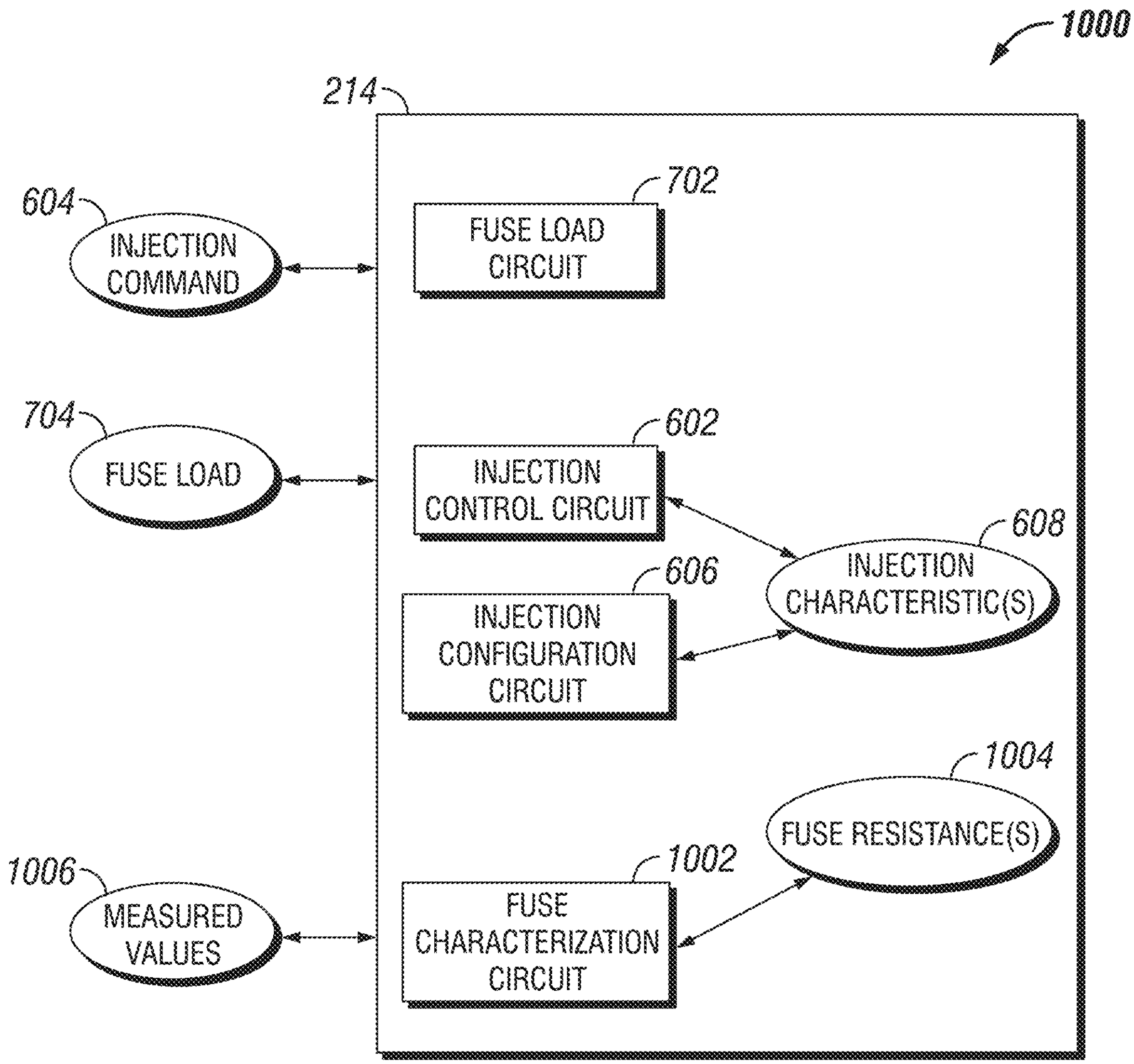
FIG. 32 depicts a non-limiting example apparatus is depicted to provide unique current waveforms to improve fuse resistance measurement for a PDU.

Referencing FIG. 32, an example apparatus 1000 to provide unique current waveforms to improve fuse resistance measurement for a PDU 102 is schematically depicted. The example apparatus 1000 includes a fuse load circuit 702 that determines that no current is demanded for a fuse load 704, and further determines that contactors associated with the fuse are open. The example apparatus 1000 further includes an injection configuration circuit 606 that determines injection characteristics 608, including frequency, amplitude, and waveform characteristics for test injection currents through one or more fuses to be tested. The example apparatus 1000 further includes an injection control circuit 602 that injects current through the fuses according to the injection characteristics 608, and a fuse characterization circuit 1002 that determines one or more fuse resistance(s) 1004 in response to the measured values 1006 during the test. An example injection control circuit 602 waits for the determination of voltage offset values while the fuse load 704 is still zero, and the fuse characterization circuit 1002 further utilized the voltage offset values in determining the fuse resistance(s) 1004 for the fuses. In certain embodiments, the injection configuration circuit 606 determines injection characteristics 608 in response to the characteristics of the system (e.g., the inherent capacitance and/or inductance of the system, the size of the fuse, the current ranges of the system during operation, and/or the resistance range and/or desired precision to support operations determinations utilizing the fuse resistance value). In certain embodiments, a high accuracy of the fuse resistance supports diagnostics, fuse protection control, and/or high accuracy on battery state of charge determinations.

In certain embodiments, the fuse characterization circuit 1002 determines the fuse resistance(s) 1004 for a given response based upon a number of current injection events, each of which may have a distinct one or more of an amplitude, frequency, and/or waveform. Additionally or alternatively, frequency sweeping, amplitude sweeping, and/or waveform shape management may be manipulated between injection events and/or within a given injection event. The fuse characterization circuit 1002 determines the fuse resistance 1004 by determining, for example, an averaged resistance value determined over the course of the tests. In certain embodiments, the fuse characterization circuit 1002 utilizes only a portion of each test window—for example to allow circuit settling time after an injection characteristic 608 switch, to allow for the injection provision circuit (e.g., a solid state op-amp, PWM, relay, or the like, which is configured to provide a selected current through the fuse circuit) to settle after switching the injection characteristic 608, to utilize a selected amount of data from each of the tests (e.g., for weighting purposes), and the like. In certain embodiments, the fuse characterization circuit 1002 may exclude outlying data (e.g., two of the tests agree, but a third test provides a far different value), and/or data which appears to indicate a rapid change which may appear to not be valid data. In certain embodiments, filtering, moving averages, rolling buffers, counters for delay in switching values (e.g., to confirm that a new value appears to be a real change) and the like are applied by the fuse characterization circuit 1002 to the fuse resistance 1004 to smooth changing values of the fuse resistance 1004 over time and/or to confirm that new information is repeatable. In certain embodiments, each period or a group of periods of a given injection waveform may be treated as a separate data point for resistance determinations. In certain embodiments, for example where the amplitude is swept for a given waveform, and/or where the frequency is swept for a given waveform, the resistance contribution for a given period may also be weighted (e.g., higher amplitudes and/or lower frequencies provide for a lower designed area under the current-time curve—see, e.g. FIG. 35—which may provide a higher quantity of information about the resistance relative to a lower amplitude and/or higher frequency period of the same waveform). Additionally or alternatively, measurement confidence may be dependent upon the frequency and/or amplitude of the current injection, and accordingly resistance determinations for those injection events may be weighted accordingly (e.g., given lower weight with lower confidence, and higher weight with higher confidence). Additionally or alternatively, conformance of the current injection source may be dependent upon the frequency, amplitude, and/or waveform of the current injection, and accordingly resistance determinations for those injection events may be weighted accordingly, and/or adjusted by feedback on the injector outlet about what frequency, amplitude, and/or waveform was actually provided relative to what was commanded.

In certain embodiments, the resistance determinations made by the fuse characterization circuit 1002, including how the resistance is determined and the average indicated by a given test, depend upon the waveform and other parameters. For example, if a sine wave waveform is utilized, resistance may be determined from the area under the voltage and current curves, from an rms determination (for current and/or voltage), and/or from high resolution time slices within the voltage determinations utilizing the injected current characterization. Other waveforms will utilize similar techniques for determining the resistance. If the circuit exhibits significant impedance (e.g. from latent capacitance and/or inductance, and/or from components in communication with the circuit that exhibit impedance), the impedance can be calculated by varying the frequency and determining the common impedance effects between the tests. The availability of multiple tests utilizing varying amplitudes, waveforms, and/or frequency values ensures that high accuracy can be determined even for circuits with complex effects or that exhibit changes due to age, degradation, or component servicing or replacing. Further, adjusting the frequency throughout the tests, and/or sweeping the frequency for a given amplitude or waveform can assist in de-coupling the phase-shifted aspects of impedance (e.g., capacitance effects versus inductance effects) to more confidently determine a resistance for the fuse. Typically for a fuse circuit having a closely coupled current source, impedance will be minimal. The desired degree of accuracy for the resistance measurement, which may depend upon the diagnostics, battery state of charge algorithms, and/or fuse protection algorithms in use on the system, may also affect whether impedance must be accounted for, and accordingly the selection of injection characteristics 608 utilized.

It can be seen that the use of multiple injection characteristics 608 during a test leverages comparisons between the tests to de-couple system characteristics from the resistance determination, provides for a range of system excitement parameters to ensure that system characteristics do not dominate a single test, and overall increase the amount of information available for a test to develop statistical confidence in the determined resistance value. Also, manipulation of injection characteristics 608 allows for better averaging—for example to prepare waveforms with high confidence that the resistance calculation is correct such as utilizing frequency values that avoid resonant or harmonic frequencies in the system, provide a large area under the current-time (or voltage-time) curve, and/or provide for a stabilized system during the test to ensure that measurement is correct.

Additionally or alternatively, the fuse characterization circuit 1002 adjusts digital filter values before the test, between changes in injection characteristics 608 for the test, and/or dynamically during the test (e.g., where a frequency sweep, amplitude sweep, and/or waveform change is utilized during a given injection event). In certain embodiments, the measurement of the voltage out of the filter circuit utilizes a high-pass filter to determine the injection voltage (and/or current), and the filter characteristics can be manipulated in real time to provide for an appropriate filter, such as cutoff frequencies. The utilization of digital filters for measurement can also eliminate phase lags between different filter types—such as a low pass filter and a high pass filter (e.g., where the low pass filter determines base power current during operation, and/or confirms that base power current remains zero or negligible during the test).

Figure 35:
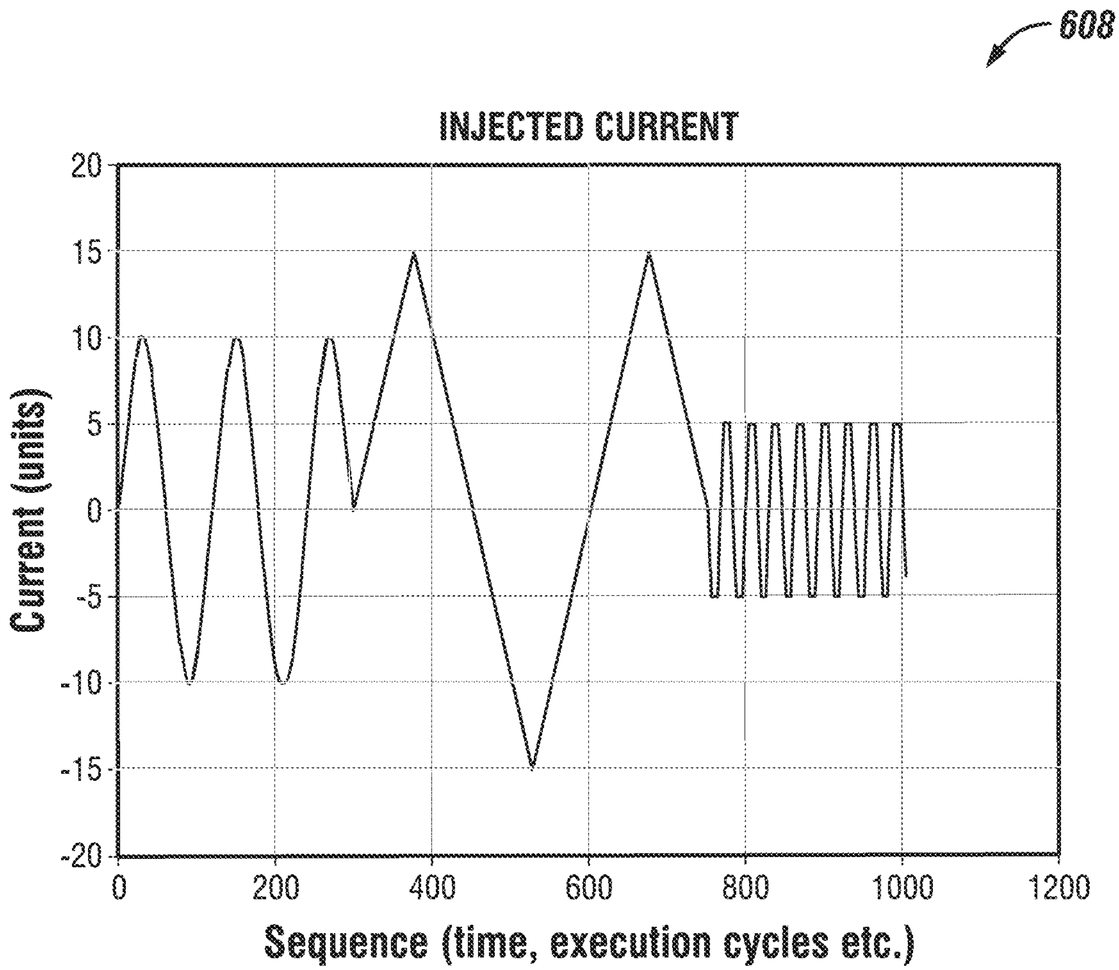
FIG. 35 depicts an illustrative injection characteristic for an example test.

Referencing FIG. 35, an illustrative injection characteristic 608 is depicted for an example test. The injection characteristic 608 includes a first injection portion having an amplitude of 10 current units (e.g., amps—but any current units are contemplated herein), a sinusoidal waveform, and a period of approximately 150 time units (e.g., execution cycles of the controller 214, milliseconds, seconds, or any other parameter). The units and values depicted in FIG. 35 are non-limiting examples, and are used to illustrate that sequential changes in the injection characteristic 608 can be applied. The injection characteristic 608 includes a second injection portion having an amplitude of 15 current units, a sawtooth waveform, and a period of approximately 250 time units. The injection characteristic 608 further includes a third injection portion having an amplitude of 5 current units, a near square waveform (a slightly trapezoidal waveform is depicted), and a period of approximately 80 time units. The embodiment depicted in FIG. 35 is non-limiting, and other features may be added to the test, including more or less than three distinct waveforms, gaps between waveforms, and adjustments within a waveform (including sweeping, stepping, or otherwise adjusting frequency or amplitude, and/or adjusting the waveform itself). The example of FIG. 35 shows a trajectory reversal between the first and second injection characteristic (e.g., decreasing sine wave to increasing sawtooth wave) and a continuation of the trajectory between the second and third injection characteristic (e.g., decreasing sawtooth wave to an increasing square wave), although any possibilities, including step changes of the current and the like, are contemplated herein.

Figure 33:
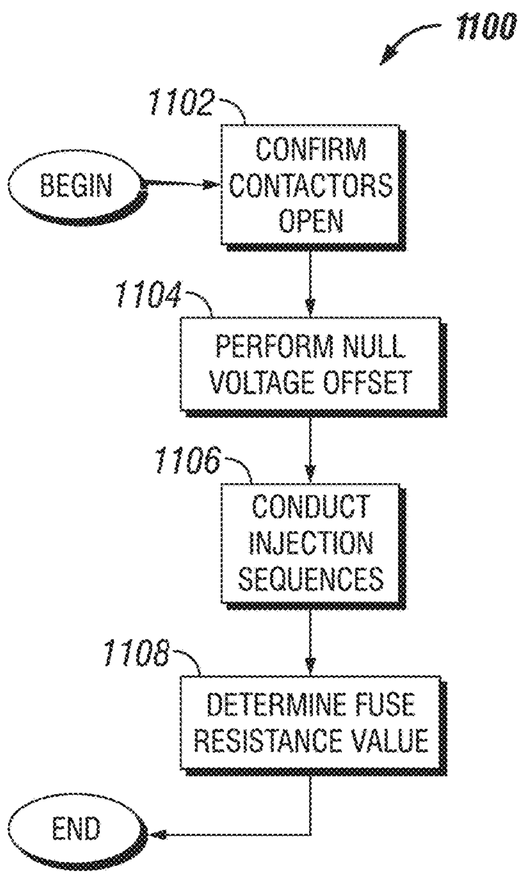
FIG. 33 depicts a non-limiting example procedure to provide unique current waveforms to improve fuse resistance measurement for a PDU.

Referencing FIG. 33, an example procedure 1100 to provide unique current waveforms to improve fuse resistance measurement for a PDU 102 is schematically depicted. The procedure 1100 includes an operation 1102 to confirm that the contactors are open (and/or to confirm that the fuse load is zero or intended to be zero), and an operation 1104 to perform a null voltage offset determination—for example to determine offset voltage of op-amps and other components of the controller 214 and/or in the system 100 electrically coupled to the fuse circuit. An example operation 1102 is commenced during a key-on or system startup event with the contactors open, although any operating condition meeting the criteria for operation 1102 may be utilized. The procedure 1100 further includes an operation 1106 to conduct a number of injection sequences—for example three sequences each having a distinct frequency, amplitude, and waveform. The operation 1106 may include more than three sequences, and one or more of the sequences may share a frequency, an amplitude, and/or a waveform. The operation 1106 may be configured to perform as many sequences as desired, and may be carried over multiple tests (e.g., where a test is interrupted by operations of the system or exceeds a desired time, the test may be continued on a later sequence initiated by operation 1102). The procedure 1100 further includes an operation 1108 to determine fuse resistance values for one or more of the fuses in the system. The procedure 1100 may be operated on individual fuses where hardware in the system is configured to support that, including across subsets of the fuses or the like.

Figure 34:
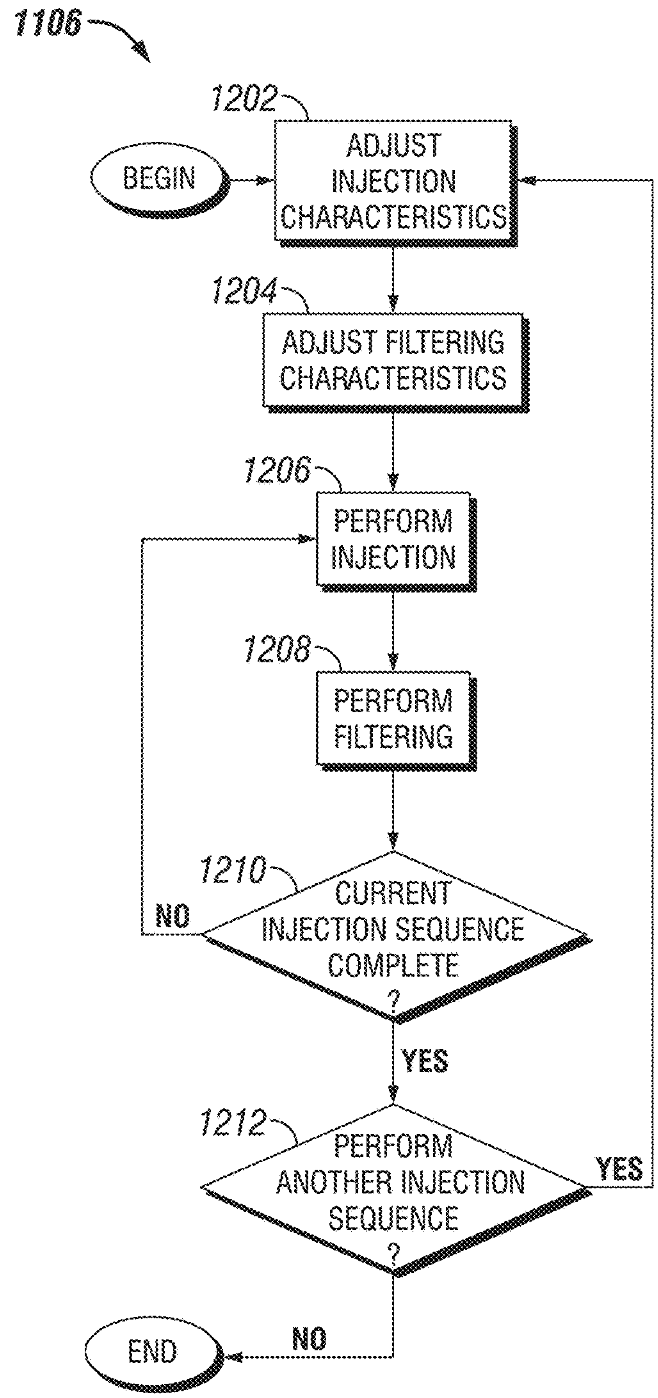
FIG. 34 depicts a non-limiting example procedure to conduct a number of injection sequences.

Referencing FIG. 34, an example procedure 1106 to conduct a number of injection sequences is depicted. The example procedure 1106 includes an operation 1202 to adjust injection characteristics for a current injection source associated with the fuse(s) to be tested, and an operation 1204 to adjust filtering characteristics for one or more digital filters associated with measuring voltage and/or current values on the filtering circuit. The procedure 1106 further includes an operation 1206 to perform the injection sequence in response to the injection characteristic, and an operation 1208 to perform the filtering (e.g., thereby measuring the current and/or voltage on the fuse circuit in response to the injection events). The procedure 1106 further includes an operation 1210 to determine if the current injection sequence is completed, returning to continue the injection event at operation 1206 until the sequence is complete (at operation 1210 determining YES). For example, referencing FIG. 35, at time step 200 the operation 1210 would determine NO, as the sine wave portion of the test is still being performed. If the operation 1210 determines YES (e.g., in FIG. 35, where the sine wave portion transitions to the sawtooth portion), the procedure 1106 includes an operation 1212 to determine whether another injection sequence is desired, and returns to operation 1202 to adjust the injection sequence in response to operation 1212 determining YES (e.g., in FIG. 9, where the sine wave portion is completed and the sawtooth portion commences). In response to the operation 1212 determining NO (e.g., where the square wave portion is completed, and no further sequences are scheduled in the test), the procedure 1106 completes—for example returning to operation 1108 to determine the fuse resistance value from the test.

According to the present description, operations to provide varying waveforms for current injection, thereby enhancing determination of the fuse resistance value in a PDU 102 are described. In certain embodiments, the high confidence determination of the fuse resistance can be utilized to determine the fuse condition, to provide a high accuracy or high precision determination of current through the fuse and of power consumption by the system 100, and/or to perform system diagnostics, fault management, circuit management, or the like.

Figure 36:
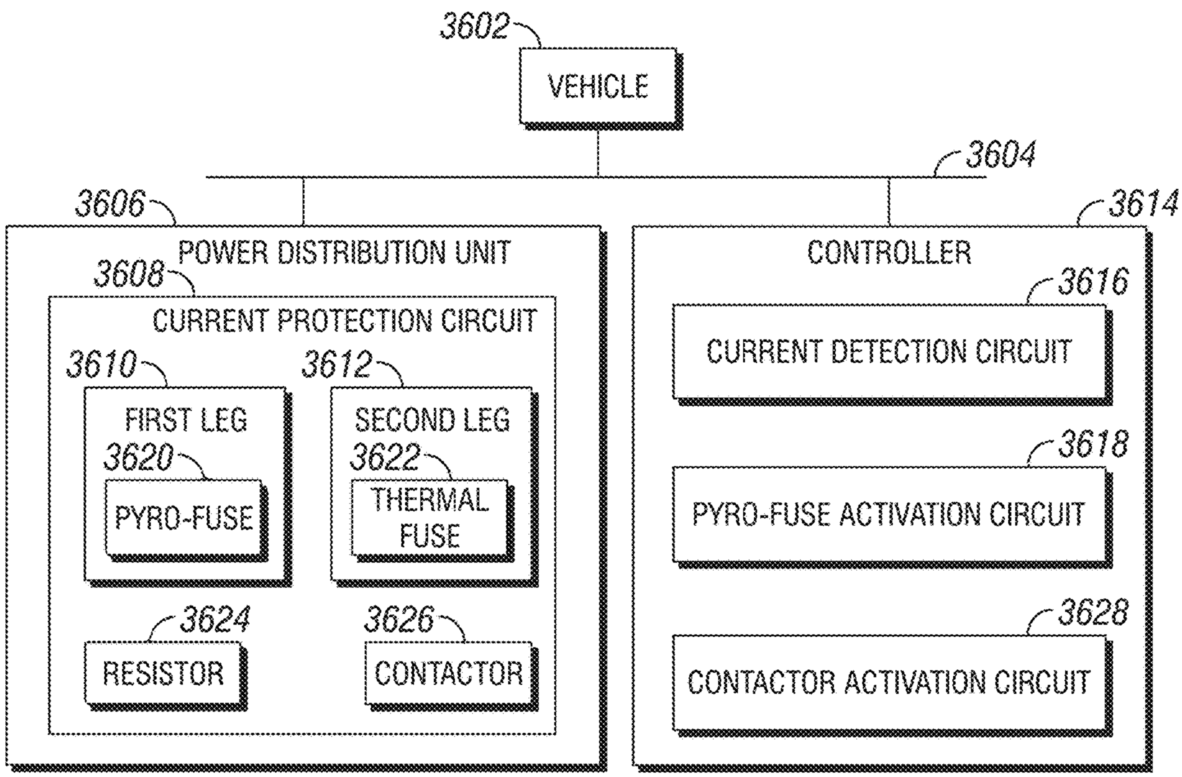
FIG. 36 depicts a schematic diagram of a vehicle having a PDU.

Referencing FIG. 36, an example system includes a vehicle 3602 having a motive electrical power path 3604; and a power distribution unit 3606 having a current protection circuit 3608 disposed in the motive electrical power path 3604. The example current protection circuit 3608 includes a first leg 3610 of the current protection circuit 3608 including a pyro-fuse 3620 (e.g., a controllable activated fuse that can be commanded to activate and open the first leg of the current protection circuit; a second leg 3612 of the current protection circuit 3608 including a thermal fuse 3622; and where the first leg 3610 and the second leg 3612 are coupled in a parallel arrangement (e.g., in a similar manner to the depiction of any one of FIGS. 26 to 28). The example system includes a controller 3614 having a current detection circuit 3616 structured to determine a current flow through the motive electrical power path 3614, and a pyro-fuse activation circuit 3618 structured to provide a pyro-fuse activation command in response to the current flow exceeding a threshold current flow value. The pyro-fuse 3620 is responsive to the pyro-fuse activation command, for example to activate and open the second leg 3612 upon command Upon activation of the pyro-fuse 3620, the second leg 3612 is opened, providing for normal fused operation on the first leg 3610 (e.g., thermal failure of the thermal fuse 3622 thereby opens the motive electrical power path 3604), and/or opening the motive electrical power path 3604 directly when a contactor 3626 in series with the thermal fuse 3622 is already opened.

Certain further aspects of an example system are described following, any one or more of which may be present in certain embodiments. An example system includes where a first resistance through the first leg 3620 and a second resistance through the second leg 3612 are configured such that a resulting current through the second leg 3612 after the pyro-fuse 3620 activates is sufficient to activate the thermal fuse 3622. For example, a high current event may be experienced such that, if the second leg 3622 were not drawing a portion of the high current event, the thermal fuse 3622 would be activated. In the example, the opening of the second leg 3612 will cause the current in the first leg 3620 to increase and activate the thermal fuse 3622. An example includes a resistor 3624 coupled in a series arrangement with the thermal fuse 3622, such that a resulting current through the second leg 3612 after the pyro-fuse 3620 activates is below a second threshold current flow value. For example, an under-sized thermal fuse 3622 may be utilized in the system, with the operating current through the second leg 3612 reduced by the resistor 3624. When the pyro-fuse 3620 opens, the current through the second leg 3612 is increased, but still reduced by the resistor 3624 to prevent high current transients in the motive electrical power path 3604, and still allowing sufficient current through the second leg 3612 to activate the thermal fuse 3622.

An example system includes a contactor coupled 3626 in a series arrangement with the thermal fuse 3622, the controller further including a contactor activation circuit 3628 structured to provide a contactor open command in response to at least one of the pyro-fuse activation command or the current flow exceeding the threshold current flow value. In certain embodiments, the contactor 3626 coupled in the series arrangement with the thermal fuse 3622 allows for control of the current through the second leg 3612, including opening the second leg 3612 to open the motive electrical power path 3604 in combination with activation of the pyro-fuse 3620. The resistor 3624 may additionally be utilized with the contactor 3626, for example reducing the current through the second leg 3612 when the pyro-fuse 3620 activates (e.g., where contactor 3626 dynamics may be slower than the pyro-fuse 3620 dynamics). An example includes a resistor 3624 coupled in a series arrangement with the pyro-fuse 3620, such that a resulting current through the first leg 3610 after the thermal fuse 3622 activates is below a second threshold current flow value—for example to reduce the current through the motive electrical power path 3604 if the thermal fuse 3622 activates when the pyro-fuse 3620 has not already activated (e.g., an unmeasured current spike, and/or a current spike occurring after a controller has failed and is unable to command the pyro-fuse 3620 to open). An example system includes a second thermal fuse (not shown) coupled in a series arrangement with the pyro-fuse 3620, such that a resulting current through the first leg 3610 after the thermal fuse 3622 activates is sufficient to activate the second thermal fuse. For example, the use of a second thermal fuse provides for all branches of the motive electrical power path 3604 to have fuses with physical responses present, avoiding failures due to loss of ability to detect currents in the system or to command a pyro-fuse 3620 to activate. In the example, the sizing of the thermal fuse 3622 and the second thermal fuse can be made to avoid thermal wear during normal operations, but sufficient such that either thermal fuse 3622 will readily protect the system when the other leg (the first leg 3610 or second leg 3612) is opened during high current events. It can be seen that embodiments of the system depicted in FIG. 36 provide for both the high controllability of a pyro-fuse 3620 to disconnect the power, along with the robust protection of a thermal fuse that will physically respond to high current values regardless of failures in current sensing or controller operation, as may occur during a system failure, vehicle accident, etc. Additionally, the utilization of the two legs 3610, 3612, including potentially current management therethrough with resistor(s) 3624 and/or contactor(s) 3626, allows for the utilization of fuses that can be sized to avoid thermal wear and/or nuisance failures over the life of the vehicle, while still providing for reliable power disconnection for high current events.

Figure 37:
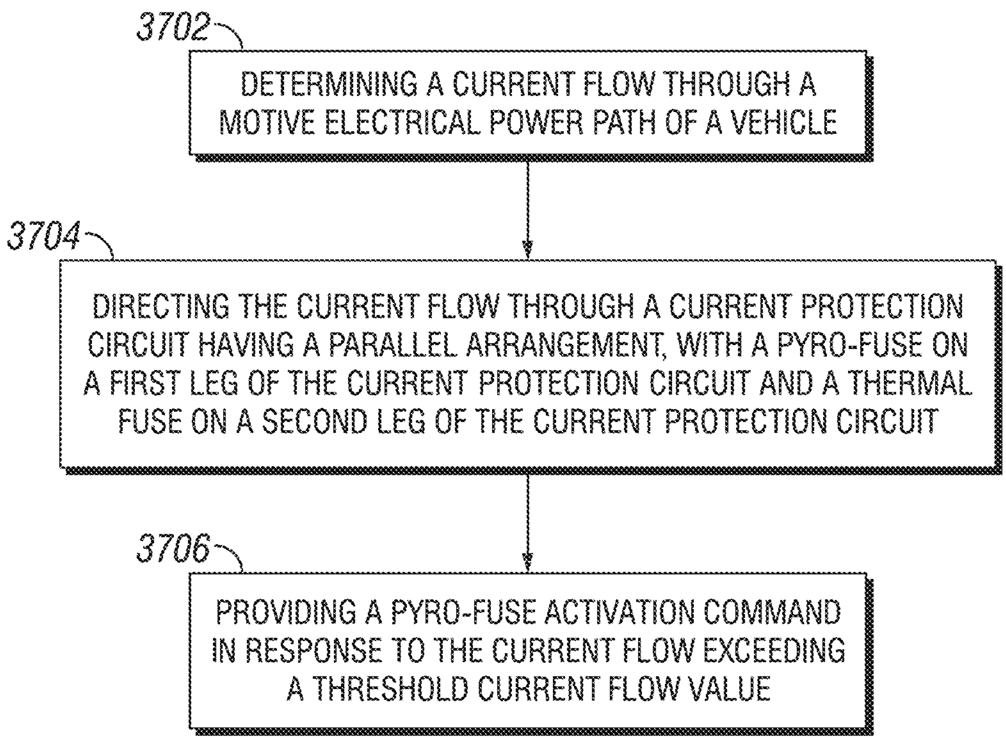
FIG. 37 depicts a schematic flow diagram of a procedure to utilize a parallel thermal fuse and pyro-fuse.

Referencing FIG. 37, an example procedure includes an operation 3702 to determine a current flow through a motive electrical power path of a vehicle; an operation 3704 to direct the current flow through a current protection circuit having a parallel arrangement, with a pyro-fuse on a first leg of the current protection circuit and a thermal fuse on a second leg of the current protection circuit; and an operation 3706 to provide a pyro-fuse activation command in response to the current flow exceeding a threshold current flow value.

Certain further aspects of an example procedure are described following, any one or more of which may be present in certain embodiments. An example procedure further includes an operation to configure a first resistance through the first leg and a second resistance through the second leg such that a resulting current through the second leg after the pyro-fuse activates is sufficient to activate the thermal fuse. An example procedure includes an operation to configure a second resistance through the second leg such that a resulting current through the second leg after the pyro-fuse activates is below a second threshold current flow value. An example procedure includes an operation to a contactor coupled in a series arrangement with the thermal fuse, the procedure further including providing a contactor open command in response to at least one of providing the pyro-fuse activation command or the current flow exceeding the threshold current flow value; and/or an operation to configure a second resistance through the second leg such that a resulting current through the second leg after the pyro-fuse activates is below a second threshold current flow value. An example procedure further including a resistor coupled in a series arrangement with the pyro-fuse such that a resulting current through the first leg after the thermal fuse activates is below a second threshold current flow value; and/or further including a second thermal fuse coupled in a series arrangement with the pyro-fuse, such that a resulting current through the first leg after the thermal fuse activates is sufficient to activate the second thermal fuse.

Figure 38:
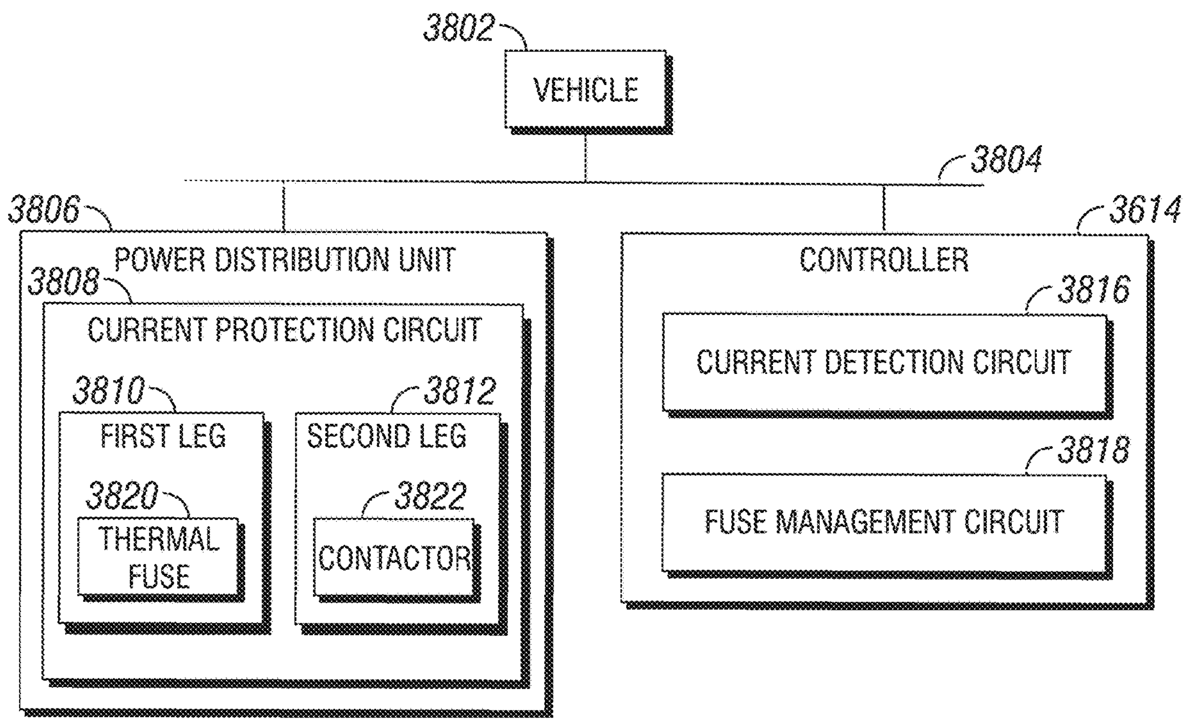
FIG. 38 depicts a schematic diagram of a vehicle having a PDU.

Referencing FIG. 38, an example system includes a vehicle 3802 having a motive electrical power path 3804; a power distribution unit 3806 having a current protection circuit 3808 disposed in the motive electrical power path 3804, where the current protection circuit includes a first leg 3810 of the including a thermal fuse 3820 and a second leg 3812 including a contactor 3822. The first leg 3810 and the second leg 3812 are coupled in a parallel arrangement. The system includes a controller 3614 having a current detection circuit 3816 structured to determine a current flow through the motive electrical power path 3804; and a fuse management circuit 3818 structured to provide a contactor activation command in response to the current flow. The contactor 3822 is responsive to the contactor activation command.

Certain further aspects of an example system are described following, any one or more of which may be present in certain embodiments. An example system includes where the contactor 3822 is open during nominal operations of the vehicle, and where the fuse management circuit is structured to provide the contactor activation command as a contactor closing command in response to determining that the current flow is a above a thermal wear current for the thermal fuse 3820; and/or where the fuse management circuit is further structured to provide the contactor activation command as the contactor closing command in response to determining that the current flow is below a current protection value for the motive electrical power path 3804. An example system includes where the contactor 3822 is closed during nominal operations of the vehicle, and where the fuse management circuit is structured to provide the contactor activation command as a contactor opening command in response to determining that the current flow is above a current protection value for the motive electrical power path 3804. An example system includes where the fuse management circuit is further structured to provide the contactor activation command in response to the current flow by performing at least one operation selected from the operations consisting of: responding to a rate of change of the current flow; responding to a comparison of the current flow to a threshold value; responding to one of an integrated or accumulated value of the current flow; and responding to one of an expected or a predicted value of any of the foregoing. It can be seen that the embodiments of the system depicted in FIG. 38 allow for the utilization of an oversized fuse 3820 that will experience reduced wear and increased life, while still allowing for circuit protection for moderate overcurrent (e.g., utilizing the contactor) and fused protection for high overcurrent values. It can be seen that the embodiments of the system depicted FIG. 38 allow for utilization of a nominally sized or undersized fuse 3820 that can reliably open the circuit at moderate overcurrent values, but experience reduced wear and increased life (e.g., by sharing current through the contactor branch).

Figure 39:
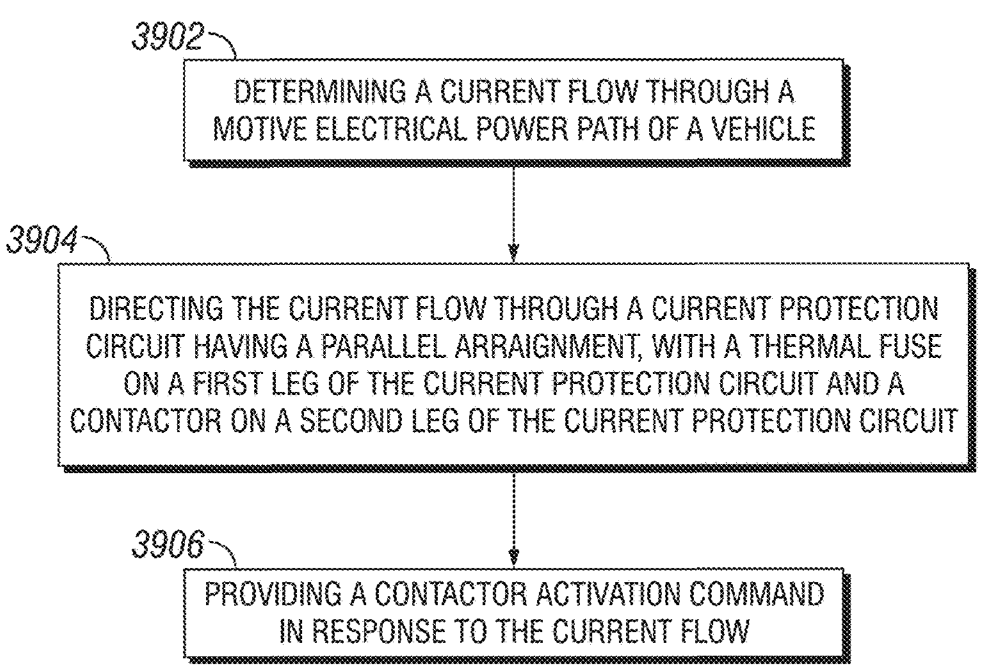
FIG. 39 depicts a schematic flow diagram of a procedure to operate a thermal fuse bypass.

Referencing FIG. 39, an example procedure includes an operation 3902 to determine a current flow through a motive electrical power path of a vehicle; an operation 3904 to direct the current flow through a current protection circuit having a parallel arrangement, with a thermal fuse on a first leg of the current protection circuit and a contactor on a second leg of the current protection circuit; and an operation 3906 to provide a contactor activation command in response to the current flow.

Certain further aspects of an example procedure are described following, any one or more of which may be present in certain embodiments. An example procedure further includes an operation to close the contactor in response to the current flow. An example procedure includes an operation to determine that the current flow is below a current protection value for the motive electrical power path before the closing the contactor. An example procedure includes at least one operation selected from the operations consisting of: responding to a rate of change of the current flow; responding to a comparison of the current flow to a threshold value; responding to one of an integrated or accumulated value of the current flow; and responding to one of an expected or a predicted value of any of the foregoing. An example procedure includes an operation to open the contactor in response to the current flow; an operation to determine that the current flow is above a current protection value for the motive electrical power path before opening the contactor; and/or an operation to open the contactor including performing any one or more of: responding to a rate of change of the current flow; responding to a comparison of the current flow to a threshold value; responding to one of an integrated or accumulated value of the current flow; and responding to one of an expected or a predicted value of any of the foregoing.

Figure 40:
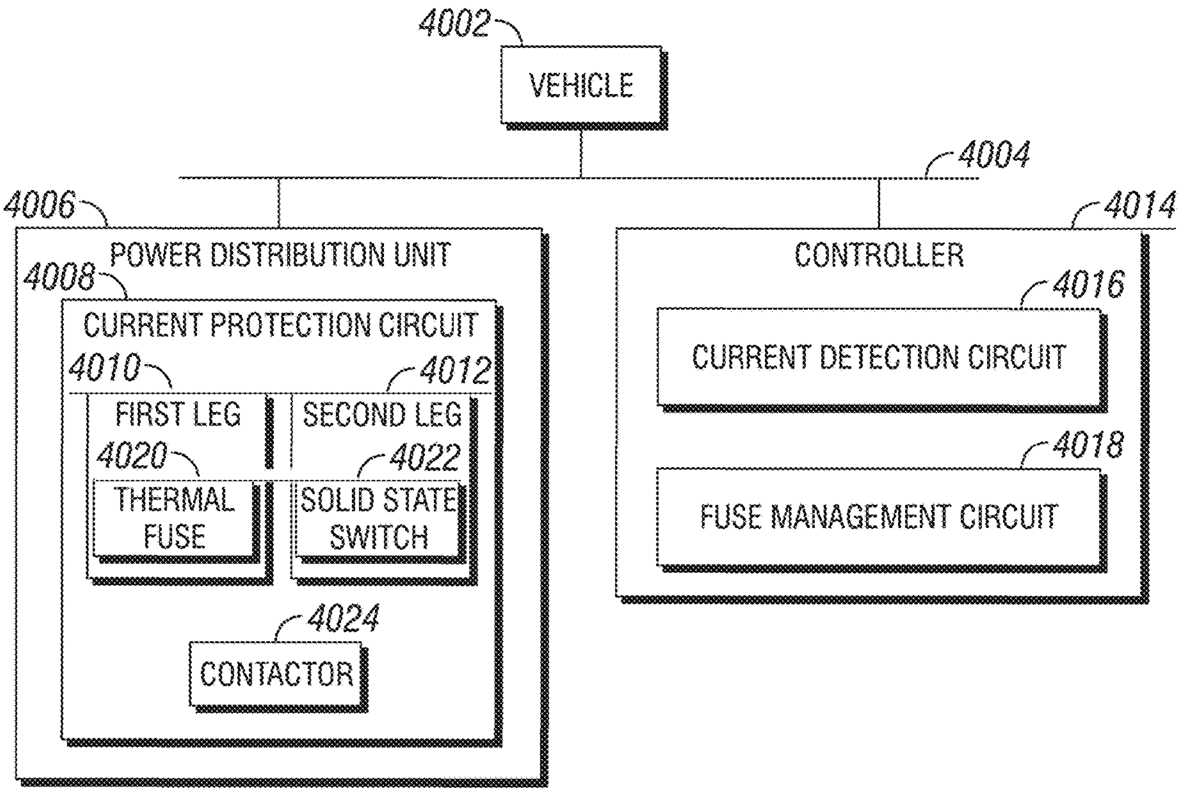
FIG. 40 depicts a schematic diagram of a vehicle having a PDU.

Referencing FIG. 40, an example system includes a vehicle 4002 having a motive electrical power path 4004; a power distribution unit 4006 having a current protection circuit 4008 disposed in the motive electrical power path 4004, where the current protection circuit includes a first leg 4010 of the current protection circuit 4008 including a thermal fuse 4020 and a second leg 4012 of the current protection circuit 4008 including a solid state switch 4022. The first leg 4010 and the second leg 4012 are coupled in a parallel arrangement. The example system includes a controller 4014 including a current detection circuit 4016 structured to determine a current flow through the motive electrical power path 4004 and a fuse management circuit 4018 structured to provide a switch activation command in response to the current flow. The solid state switch 4022 is responsive to the switch activation command In certain embodiments, the system includes a contactor 4024 coupled to the current protection circuit 4008, where the contactor 4024 in the open position disconnects the current protection circuit 4008 (e.g., the contactor 4024 in series with both legs 4010, 4012), and/or the contactor 4024 in series with the solid state switch 4022 on the second leg 4012). Any contactor described throughout the present disclosure may, in certain embodiments, be a solid state switch instead of, or in series with, a conventional contactor device. Solid state switches are known to have rapid response and are robust to opening during high current events. However, solid state switches also experience a small leakage current, which may be acceptable in certain embodiments, or not acceptable in other embodiments. In certain embodiments, the utilization of a conventional contactor with a solid state switch allows for the rapid response time and survivability of the solid state switch, as well as the enforced zero current of a conventional contactor. In certain embodiments, the solid state switch is utilized to open the circuit first, and then the conventional contactor opens the circuit second, allowing for the avoidance of conditions where the conventional contactor opens under high current conditions.

Figure 41:
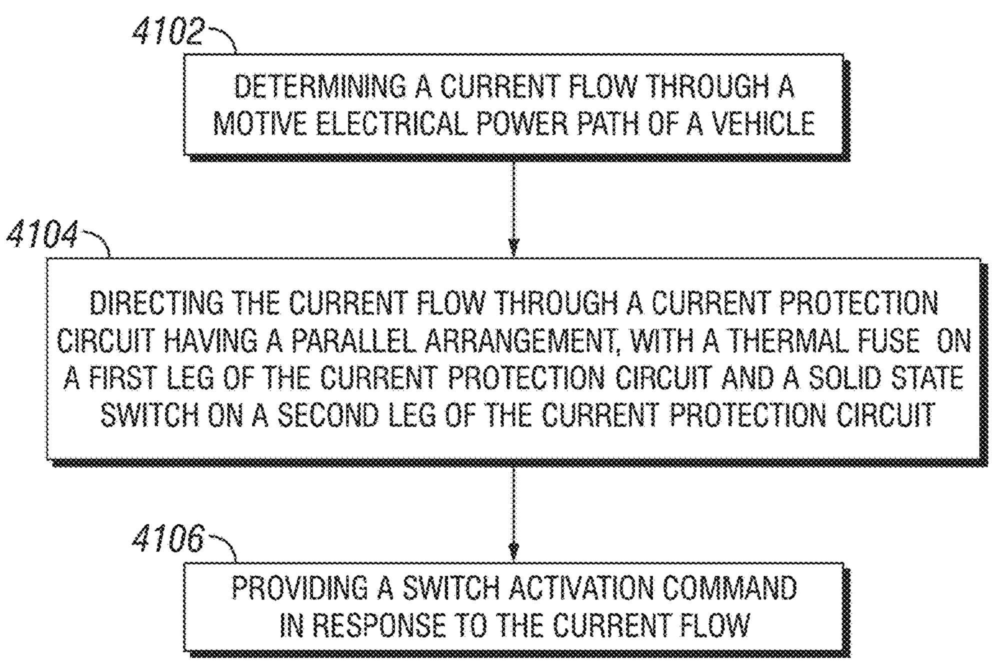
FIG. 41 depicts a schematic flow diagram of a procedure to operate a thermal fuse bypass.

Referencing FIG. 41, an example procedure includes an operation 4102 to determine a current flow through a motive electrical power path of a vehicle; an operation 4104 to direct the current flow through a current protection circuit having a parallel arrangement, with a thermal fuse on a first leg of the current protection circuit and a solid state switch on a second leg of the current protection circuit; and an operation 4106 to provide a switch activation command in response to the current flow.

Certain further aspects of an example procedure are described following, any one or more of which may be present in certain embodiments. An example procedure further includes an operation to close the solid state switch in response to the current flow; and/or determine that the current flow is below a current protection value for the motive electrical power path before the closing the solid state switch. For example, a current flow value or transient may be sufficiently high to cause degradation of the thermal fuse, but lower than a threshold where a system protection response from the thermal fuse is required. In certain embodiments, closing the solid state switch reduces the current flow and/or transient through the thermal fuse, reducing the wear and/or a nuisance failure of the thermal fuse. An example procedure includes an operation to close the solid state switch includes performing at least one operation such as: responding to a rate of change of the current flow; responding to a comparison of the current flow to a threshold value; responding to one of an integrated or accumulated value of the current flow; and responding to one of an expected or a predicted value of any of the foregoing. An example procedure includes an operation to open the solid state switch in response to the current flow; and/or determine that the current flow is above a current protection value for the motive electrical power path before opening the solid state switch. An example procedure includes an operation to open the solid state switch includes performing at least one operation selected from the operations consisting of: responding to a rate of change of the current flow; responding to a comparison of the current flow to a threshold value; responding to one of an integrated or accumulated value of the current flow; and responding to one of an expected or a predicted value of any of the foregoing. An example procedure includes an operation to open a contactor after the opening the solid state switch, where opening the contactor disconnects one of the current protection circuit or the second leg of the current protection circuit.

Figure 42:
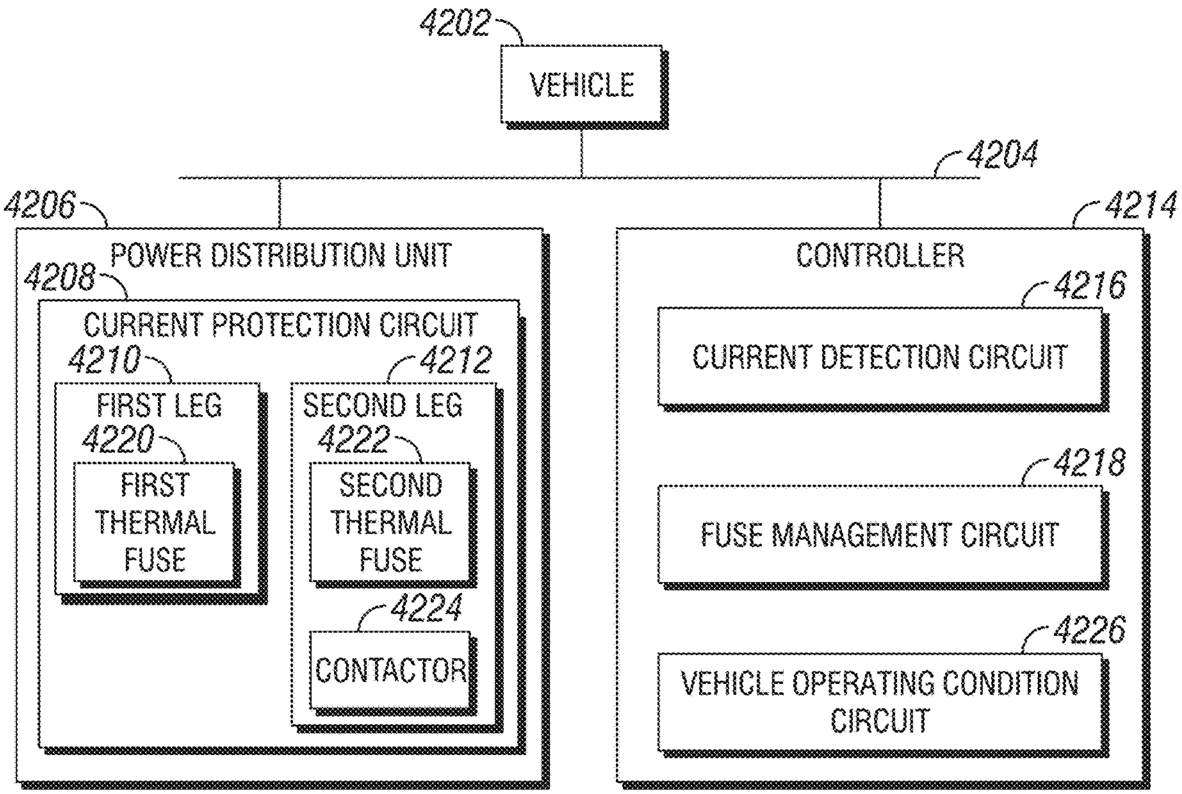
FIG. 42 depicts a schematic diagram of a vehicle having a PDU.

Referencing FIG. 42, an example system includes a vehicle having a motive electrical power path 4204; a power distribution unit 4206 having a current protection circuit 4208 disposed in the motive electrical power path 4204, where the current protection circuit includes a first leg 4220 of the current protection circuit 4208 including a first thermal fuse 4220, a second leg 4212 of the current protection circuit 4208 including a second thermal fuse 4222 and a contactor 4224, and where the first leg 4220 and the second leg 4212 are coupled in a parallel arrangement. The example system includes a controller, including: a current detection circuit 4216 structured to determine a current flow through the motive electrical power path 4204; and a fuse management circuit 4218 structured to provide a contactor activation command in response to the current flow. The contactor 4224 is responsive to the contactor activation command.

Certain further aspects of an example system are described following, any one or more of which may be present in certain embodiments. An example system includes where the contactor 4224 is open during nominal operations of the vehicle, and where the fuse management circuit 4218 is structured to provide the contactor activation command as a contactor closing command in response to determining that the current flow is a above a thermal wear current for the first thermal fuse 4220. An example system includes the fuse management circuit 4218 further structured to provide the contactor activation command as a contactor closing command in response to determining that the current flow is below a current protection value for the motive electrical power path 4204. An example system includes a vehicle operating condition circuit 4226 structured to determine an operating mode for the vehicle (e.g., moving, stopped, high performance, high economy, charging, quick charging, etc.), and where the fuse management circuit 4218 is further structured to provide the contactor activation command in response to the operating mode. An example system includes the fuse management circuit 4218 further structured to provide the contactor activation command as a contactor closing command in response to the operating mode including at least one operating mode selected from the operating modes consisting of: a charging mode; a quick charging mode; a high performance mode; a high power request mode; an emergency operation mode; and/or a limp home mode. An example system includes where the contactor 4224 is closed during nominal operations of the vehicle, and where the fuse management circuit 4218 is structured to provide the contactor activation command as a contactor opening command in response to determining that the current flow is above a current protection value for the motive electrical power path 4204. An example system includes where the contactor is closed during nominal operations of the vehicle, and where the fuse management circuit 4218 is structured to provide the contactor activation command as a contactor opening command in response to the operating mode; and/or where the fuse management circuit 4218 is further structured to provide the contactor activation command as a contactor opening command in response to the operating mode including at least one of an economy mode or a service mode. For example, during certain operating conditions such as an economy mode or during a service event, a reduced maximum power throughput through the motive electrical power path 4204 may be enforced, where the opening of the contactor 4224 is utilized to provide configured fuse protection for the reduced maximum power throughput.

Figure 43:
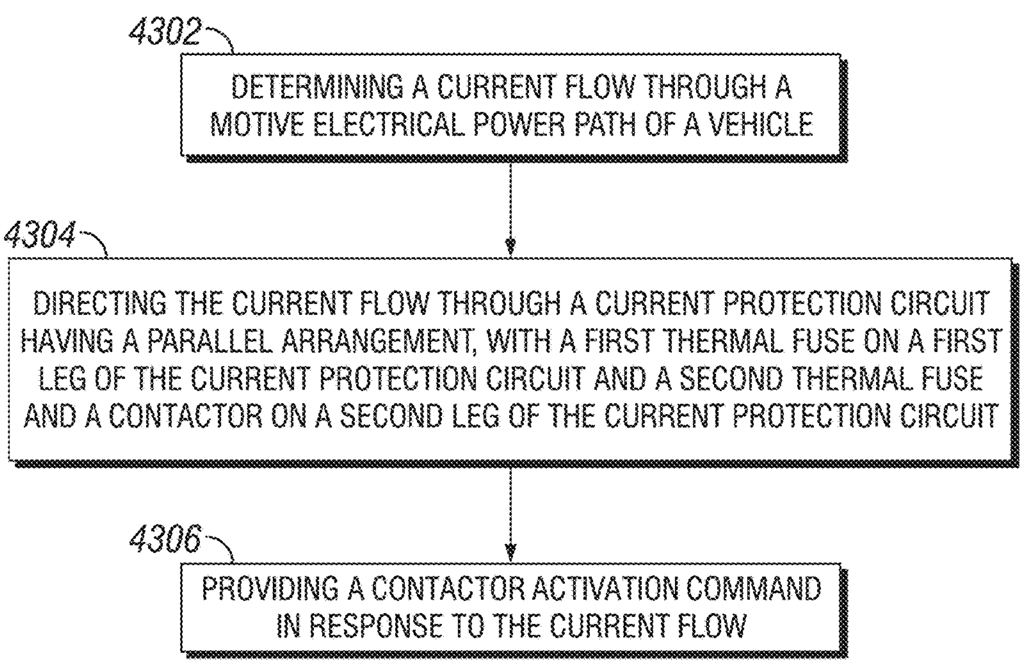
FIG. 43 depicts a schematic flow diagram of a procedure to operate parallel thermal fuses.

Referencing FIG. 43, an example procedure includes an operation 4302 to determine a current flow through a motive electrical power path of a vehicle; an operation 4304 to direct the current flow through a current protection circuit having a parallel arrangement, with a first thermal fuse on a first leg of the current protection circuit and a second thermal fuse and a contactor on a second leg of the current protection circuit; and an operation 4306 to provide a contactor activation command in response to the current flow.

Certain further aspects of an example procedure are described following, any one or more of which may be present in certain embodiments. An example procedure further includes an operation to close the contactor in response to the current flow being above a thermal wear current for the first thermal fuse; and/or closing the contactor further in response to the current flow being below a current protection value for the motive electrical power path. An example procedure includes an operation to determine an operating mode for the vehicle, and providing the contactor activation command further in response to the operating mode. An example procedure includes an operation to provide the contactor activation command as a contactor closing command in response to the operating mode including at least one operating mode selected from the operating modes consisting of: a charging mode; a high performance mode; a high power request mode; an emergency operation mode; and a limp home mode. An example procedure includes an operation to provide the contactor activation command as a contactor opening command in response to determining that the current flow is above a current protection value for the motive electrical power path; and/or provide the contactor activation command as a contactor opening command in response to the operating mode including at least one of an economy mode or a service mode.

Figure 44:
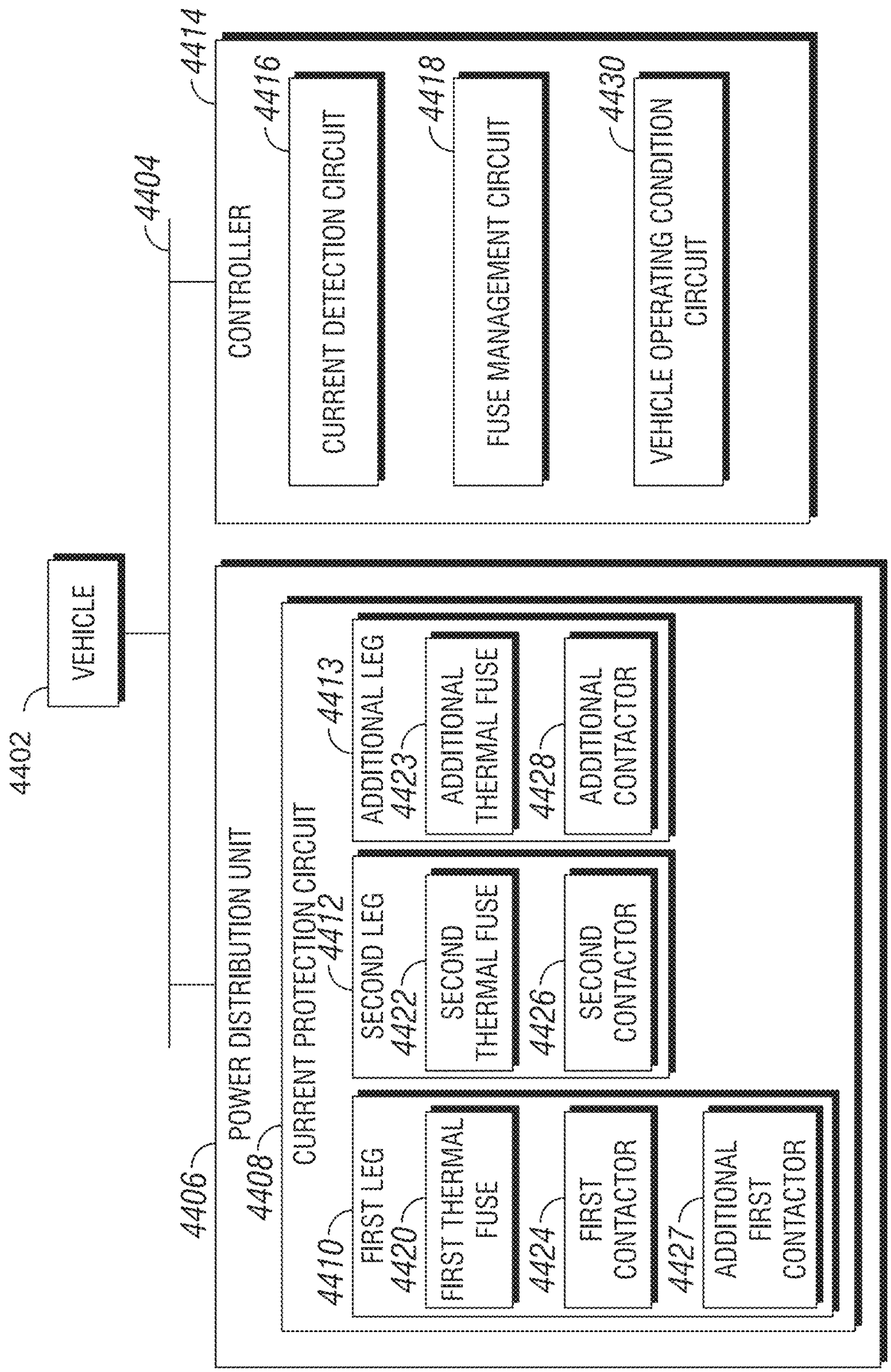
FIG. 44 depicts a schematic diagram of a vehicle having a PDU.

Referencing FIG. 44, an example system includes a vehicle 4402 having a motive electrical power path 4404; a power distribution unit 4406 having a current protection circuit 4408 disposed in the motive electrical power path 4404, where the current protection circuit includes: a first leg 4410 of the current protection circuit 4408 including a first thermal fuse 4420 and a first contactor 4424; a second leg 4412 of the current protection circuit 4408 including a second thermal fuse 4422 and a second contactor 4426; and where the first leg 4410 and the second leg 4412 are coupled in a parallel arrangement. The example system includes a controller 4414 including a current detection circuit 4416 structured to determine a current flow through the motive electrical power path 4404; and a fuse management circuit 4418 structured to provide a plurality of contactor activation commands in response to the current flow. The first contactor 4424 and the second contactor 4426 are responsive to the contactor activation commands, thereby providing a selected configuration of the current protection circuit 4408.

Certain further aspects of an example system are described following, any one or more of which may be present in certain embodiments. An example system includes where the current protection circuit further includes: one or more additional legs 4413, where each additional leg 4413 includes an additional thermal fuse 4423 and an additional contactor 4428; and where each additional contactor 4428 is further responsive to the contactor activation commands, thereby providing the selected configuration of the current protection circuit 4408. An example system includes a vehicle operating condition circuit 4430 structured to determine an operating mode for the vehicle, and where the fuse management circuit 4418 is further structured to provide the contactor activation commands in response to the operating mode. An example fuse management circuit 4418 is further structured to determine an active current rating for the motive electrical power path 4404 in response to the operating mode, and to provide the contactor activation commands in response to the active current rating. An example system includes where the first leg 4410 of the current protection circuit 4408 further includes an additional first contactor 4427 in a parallel arrangement with the first thermal fuse 4420, where the current detection circuit 4416 is further structured to determine a first leg current flow, where the fuse management circuit 4418 is further structured to provide the contactor activation commands further in response to the first leg current flow, and where the additional first contactor 4427 is responsive to the contactor activation commands. An example system includes the additional first contactor 4427 being open during nominal operations of the vehicle, and where the fuse management circuit 4418 is structured to provide the contactor activation commands including an additional first contactor closing command in response to determining that the first leg current flow is a above a thermal wear current for the first thermal fuse 4420. An example system includes the fuse management circuit 4418 structured to provide the additional first contactor closing command in response to determining at least one of: that the first leg current flow is below a first leg current protection value, or that the current flow is below a motive electrical power path current protection value. An example system includes where the additional first contactor 4427 is closed during nominal operations of the vehicle, and where the fuse management circuit 4418 is structured to provide the contactor activation commands including an additional first contactor opening command in response to determining at least one of: that the first leg current flow is above a first leg current protection value, or that the current flow is above a motive electrical power path current protection value. The example system may further include additional contactors 4428 positioned on any one or more of the legs 4410, 4412, 4413. Any one or more of the contactors 4424, 4426, 4428 may be configured in series and/or parallel with the associated thermal fuse 4420, 4422, 4423 on the associated leg.

Figure 45:
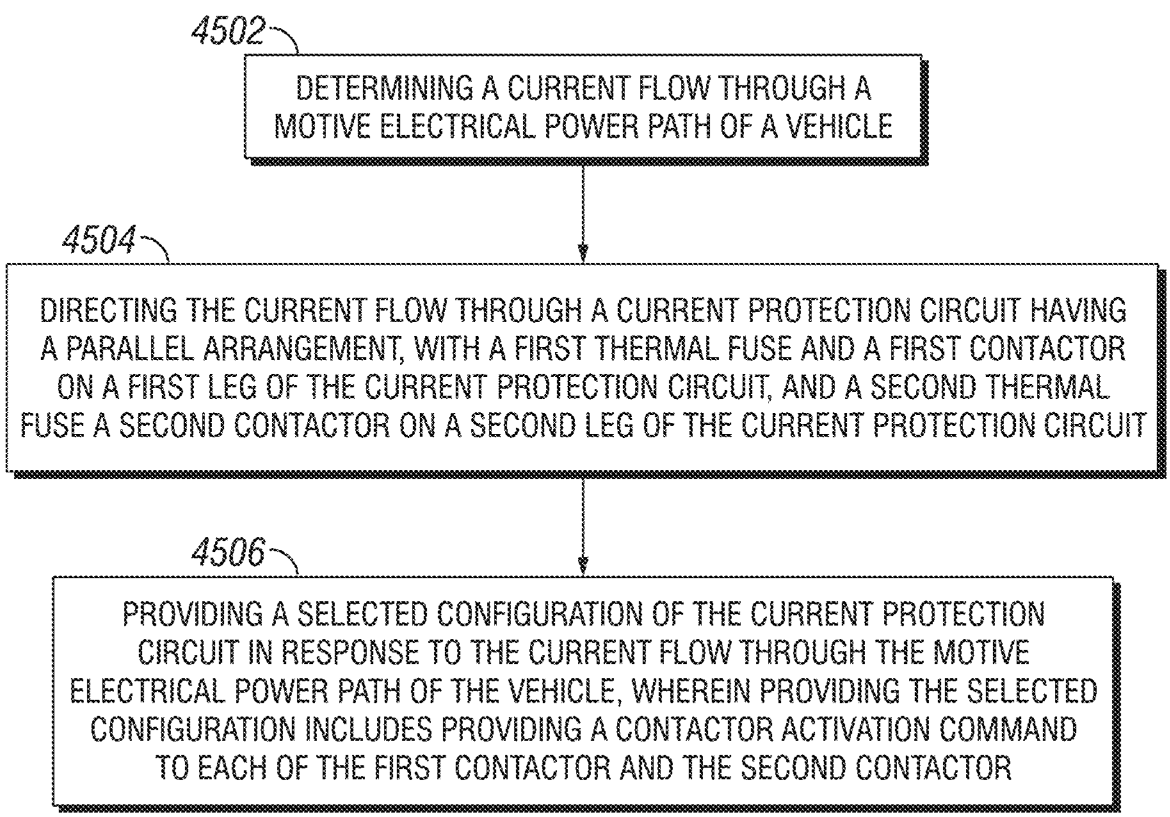
FIG. 45 depicts a schematic flow diagram of a procedure to selectively configure a current protection circuit.

Referencing FIG. 45, an example procedure includes an operation 4502 to determine a current flow through a motive electrical power path of a vehicle; an operation 4504 to direct the current flow through a current protection circuit having a parallel arrangement, with a first thermal fuse and a first contactor on a first leg of the current protection circuit, and a second thermal fuse and a second contactor on a second leg of the current protection circuit; and an operation 4506 to provide a selected configuration of the current protection circuit in response to the current flow through the motive electrical power path of the vehicle, where providing the selected configuration includes providing a contactor activation command to each of the first contactor and the second contactor.

Certain further aspects of an example procedure are described following, any one or more of which may be present in certain embodiments. An example procedure includes an operation further including at least one additional leg of the current protection circuit, each additional leg of the current protection circuit having an additional thermal fuse and an additional contactor, and where the providing the selected configuration of the current protection circuit includes providing a contactor activation command to each additional contactor. An example procedure includes an operation to determine an operating mode for the vehicle, and providing the selected configuration further in response to the operating mode; and/or an operation to determine an active current rating for the motive electrical power path in response to the operating mode, and where providing the selected configuration of the current protection circuit is further in response to the active current rating. An example procedure includes an operation to determine an active current rating for the motive electrical power path, and where providing the selected configuration of the current protection circuit is further in response to the active current rating. An example procedure includes an operation where the first leg of the current protection circuit further includes an additional first contactor in a parallel arrangement with the first thermal fuse, the procedure further including: determining a first leg current flow, and where providing the selected configuration further includes providing a contactor activation command to the additional first contactor; an operation to close the additional first contactor in response to determining that the first leg current flow is a above a thermal wear current for the first thermal fuse; an operation to close the additional first contactor further in response to determining at least one of: that the first leg current flow is below a first leg current protection value, or that the current flow is below a motive electrical power path current protection value; and/or an operation to open the additional first contactor in response to determining at least one of: that the first leg current flow is above a first leg current protection value, or that the current flow is above a motive electrical power path current protection value.

Figure 46:
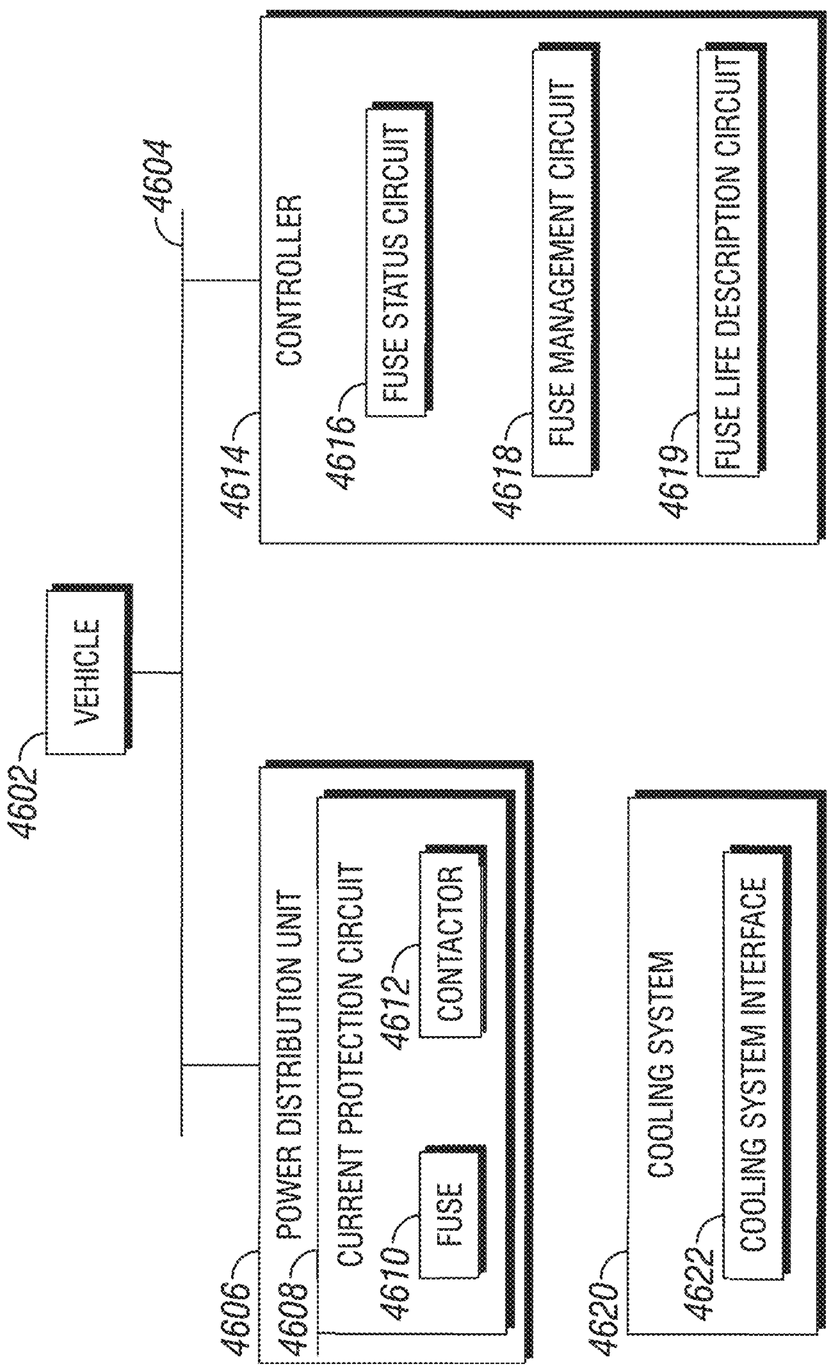
FIG. 46 depicts a schematic diagram of a vehicle having a PDU.

Referencing FIG. 46, an example system includes a vehicle 4602 having a motive electrical power path 4604; a power distribution unit 4606 having a current protection circuit 4608 disposed in the motive electrical power path 4604, where the current protection circuit 4608 includes a fuse 4610. The example system further includes a controller 4614 including a fuse status circuit 4616 structured to determine a fuse event value; and a fuse management circuit 4618 structured to provide a fuse event response based on the fuse event value.

Certain further aspects of an example system are described following, any one or more of which may be present in certain embodiments. An example system includes a fuse life description circuit 4619 structured to determine a fuse life remaining value, where the fuse event value includes a representation that the fuse life remaining value is below a threshold value, and where the fuse management circuit 4618 is further structured to provide the fuse event response further based on the fuse life remaining value. Example and non-limiting operations to provide the fuse event include providing a fault code and/or a notification of the fuse event value, for example to a datalink, another controller in the system, as a service notification, to a fleet owner (e.g., a maintenance manager), stored as a fault code for service access, and/or as a notification to an operator, a mobile device, a service report, or the like. Example and non-limiting operations to provide the fuse event response include: adjusting a maximum power rating for the motive electrical power path; adjusting a maximum power slew rate for the motive electrical power path; and/or adjusting a configuration of the current protection circuit. An example system includes where the current protection circuit 4606 further includes a contactor 4612 coupled in a parallel arrangement to the fuse 4610; and/or where the fuse management circuit 4618 is further structured to provide a contactor activation command in response to the fuse event value. In the example, the contactor 4612 is responsive to the contactor activation command. An example system includes where the fuse management circuit 4618 is further structured to provide the contactor activation command as a contactor closing command in response to the fuse event value being one of a thermal wear event or an imminent thermal wear event for the fuse 4610. An example system includes where the fuse management circuit 4618 is further structured to adjust a current threshold value for the contactor activation command in response to the fuse life remaining value (e.g., open the contactor at a lower or higher threshold as the fuse ages). An example system includes a cooling system 4620 at least selectively thermally coupled to the fuse, and a cooling system interface 4622 (e.g., hardware interfaces such as flow couplings, valves, etc., and/or communication interfaces such as network commands, electrical couplings, etc.); and/or where providing the fuse event response includes adjusting a cooling system interface 4622 for the cooling system 4620 in response to the fuse life remaining value (e.g., increasing active cooling capability to the fuse as the fuse ages).

Figure 47:
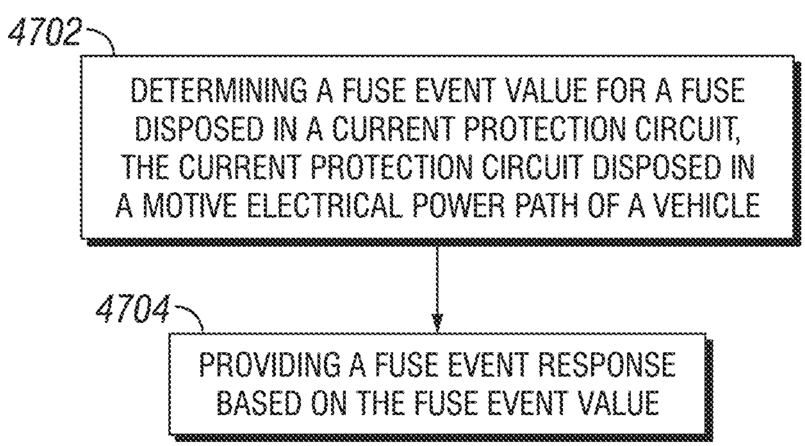
FIG. 47 depicts a schematic flow diagram of a procedure to determine a fuse event value, and to respond thereto.

Referencing FIG. 47, an example procedure includes an operation 4702 to determine a fuse event value for a fuse disposed in a current protection circuit, the current protection circuit disposed in a motive electrical power path of a vehicle; and an operation 4704 to provide a fuse event response based on the fuse event value.

Certain further aspects of an example procedure are described following, any one or more of which may be present in certain embodiments. An example procedure further includes an operation to determine a fuse life remaining value, where the fuse event value includes a representation that the fuse life remaining value is below a threshold value, and providing the fuse event response further based on the fuse life remaining value; an operation to provide the fuse event response includes providing at least one of a fault code or a notification of the fuse event value; an operation to provide the fuse event response includes adjusting a maximum power rating for the motive electrical power path; an operation to provide the fuse event response includes adjusting a maximum power slew rate for the motive electrical power path; an operation to provide the fuse event response includes adjusting a configuration of the current protection circuit. An example procedure includes an operation where the current protection circuit further includes a contactor coupled in a parallel arrangement to the fuse; where the fuse management circuit is further structured to provide a contactor activation command in response to the fuse event value; and where the contactor is responsive to the contactor activation command; where the fuse management circuit is further structured to provide the contactor activation command as a contactor closing command in response to the fuse event value including one of a thermal wear event or an imminent thermal wear event for the fuse; and/or where the fuse management circuit is further structured to adjust a current threshold value for the contactor activation command in response to the fuse life remaining value. An example procedure includes an operation to provide the fuse event response includes adjusting a cooling system interface for a cooling system at least selectively thermally coupled to the fuse in response to the fuse life remaining value. An example procedure includes an operation to provide the fuse event response includes providing at least one of a fault code or a notification of the fuse event value. An example procedure includes an operation to determine an accumulated fuse event description in response to the fuse event response, and storing the accumulated fuse event description. An example procedure includes an operation to provide the accumulated fuse event description, where providing the accumulated fuse event description includes at least one of providing at least one of a fault code or a notification of the accumulated fuse event description; and an operation to provide the accumulated fuse event description in response to at least one of a service event or a request for the accumulated fuse event description.

Figure 48:
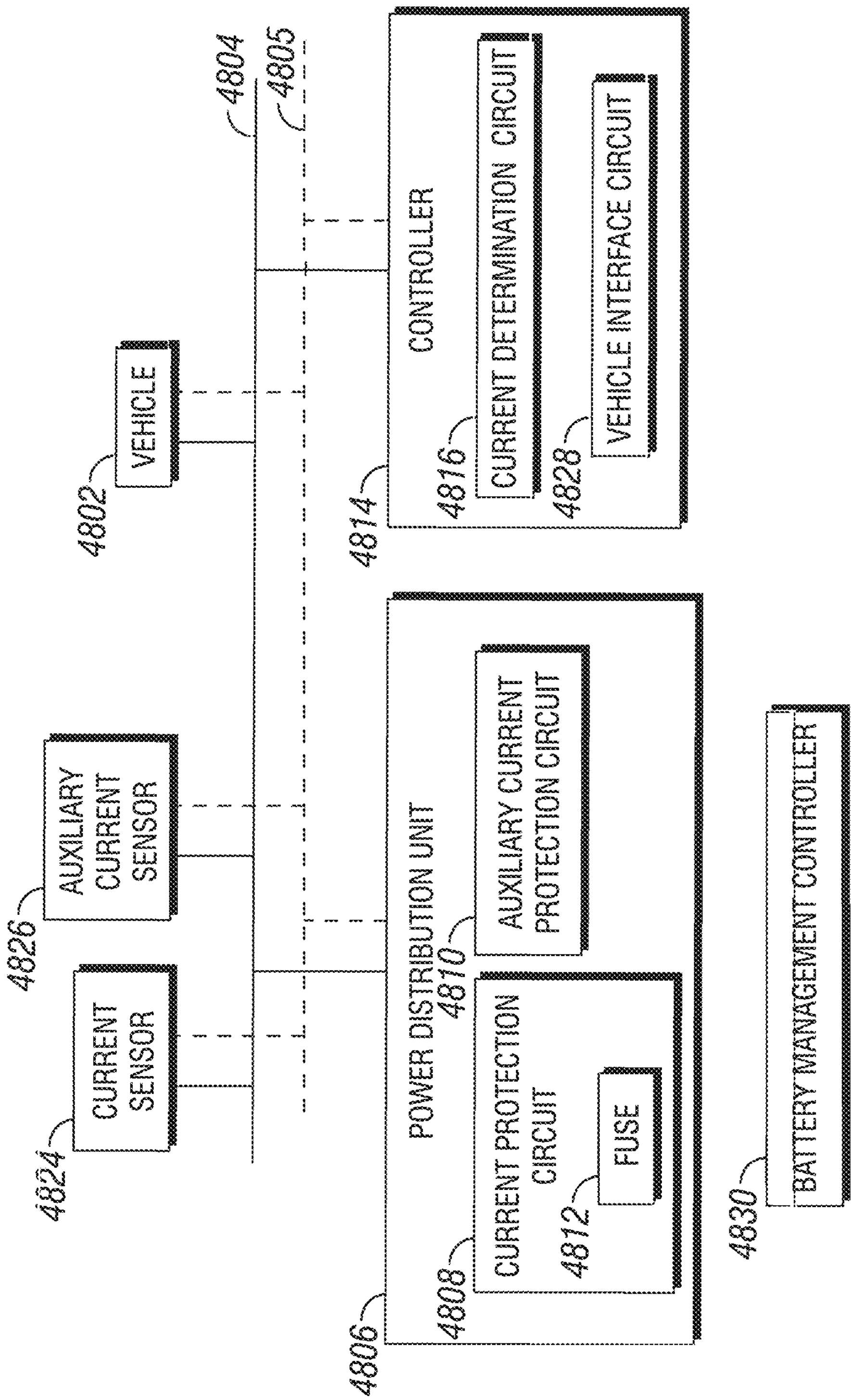
FIG. 48 depicts a schematic diagram of a vehicle having a PDU.

Referencing FIG. 48, an example system includes a vehicle 4802 having a motive electrical power path 4804 and at least one auxiliary electrical power path 4805; a power distribution unit 4806 having a motive current protection circuit 4808 disposed in the motive electrical power path 4804, the motive current protection circuit including a fuse; and an auxiliary current protection circuit 4810 disposed in each of the at least one auxiliary electrical power paths 4805, each auxiliary current protection circuit 4810 including an auxiliary fuse (not shown). The system includes a controller 4814 including: a current determination circuit 4816 structured to interpret a motive current value corresponding to the motive electrical power path, and an auxiliary current value corresponding to each of the at least one auxiliary electrical power paths.

Certain further aspects of an example system are described following, any one or more of which may be present in certain embodiments. An example system includes a motive current sensor 4824 electrically coupled to the motive electrical power path 4804, where the motive current sensor 4824 is configured to provide the motive current value. An example system includes at least one auxiliary current sensor 4826 each electrically coupled to one of the at least one auxiliary electrical power paths, each auxiliary current sensor 4826 configured to provide the corresponding auxiliary current value. An example system includes where the controller 4814 further includes a vehicle interface circuit 4828, the vehicle interface circuit structured to provide the motive current value to a vehicle network (not shown); where the vehicle interface circuit 4828 is further structured to provide the auxiliary current value corresponding to each of the at least one auxiliary electrical power paths 4805 to the vehicle network; and/or further including a battery management controller (not shown) configured to receive the motive current value from the vehicle network. In certain embodiments, one or more of the motive current value and/or the auxiliary current value(s) are provided by a fuse current model, for example determined in accordance with a load voltage drop across the fuse and/or a fuse resistance (and/or fuse dynamic resistance or fuse impedance) value determined from an injected current operation across the fuse. The utilization of a fuse current model can provide for higher accuracy (e.g. relative to a moderately capable or inexpensive current sensor) and/or faster response time for current determination than a sensor. In certain embodiments, a current sensor may be combined with the utilization of a fuse current model, for example favoring one or the other of the sensor or the model depending upon the operating conditions, and the expected accuracies of the sensor or the model in view of the operating conditions.

Figure 49:
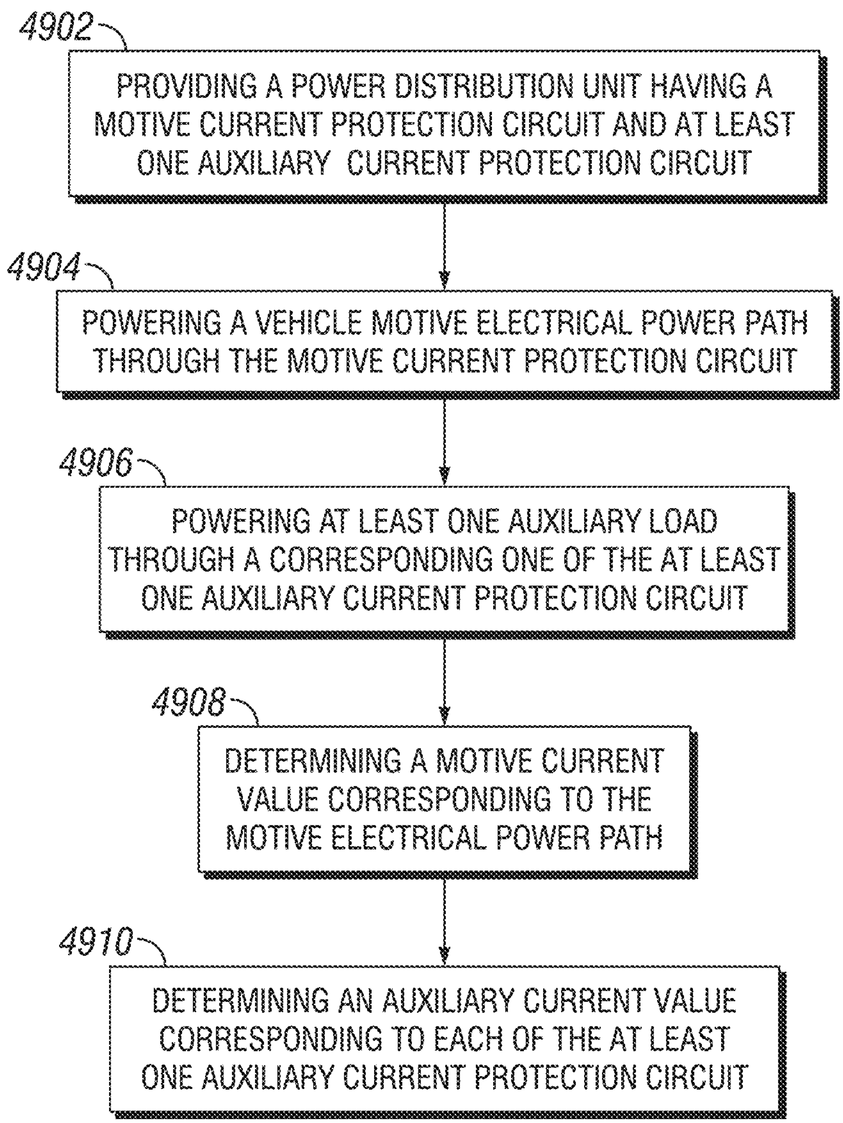
FIG. 49 depicts a schematic flow diagram of a procedure to determine current flow through a number of fuses.

Referencing FIG. 49, an example procedure includes an operation 4902 to provide a power distribution unit having a motive current protection circuit and at least one auxiliary current protection circuit; an operation 4904 to power a vehicle motive electrical power path through the motive current protection circuit; an operation 4906 to power at least one auxiliary load through a corresponding one of the at least one auxiliary current protection circuit; an operation 4908 to determine a motive current value corresponding to the motive electrical power path; and an operation 4910 to determine an auxiliary current value corresponding to each of the at least one auxiliary current protection circuits.

Certain further aspects of an example procedure are described following, any one or more of which may be present in certain embodiments. An example procedure further includes an operation to provide the motive current value to a vehicle network; and/or an operation to receive the motive current value with a battery management controller.

Figure 50:
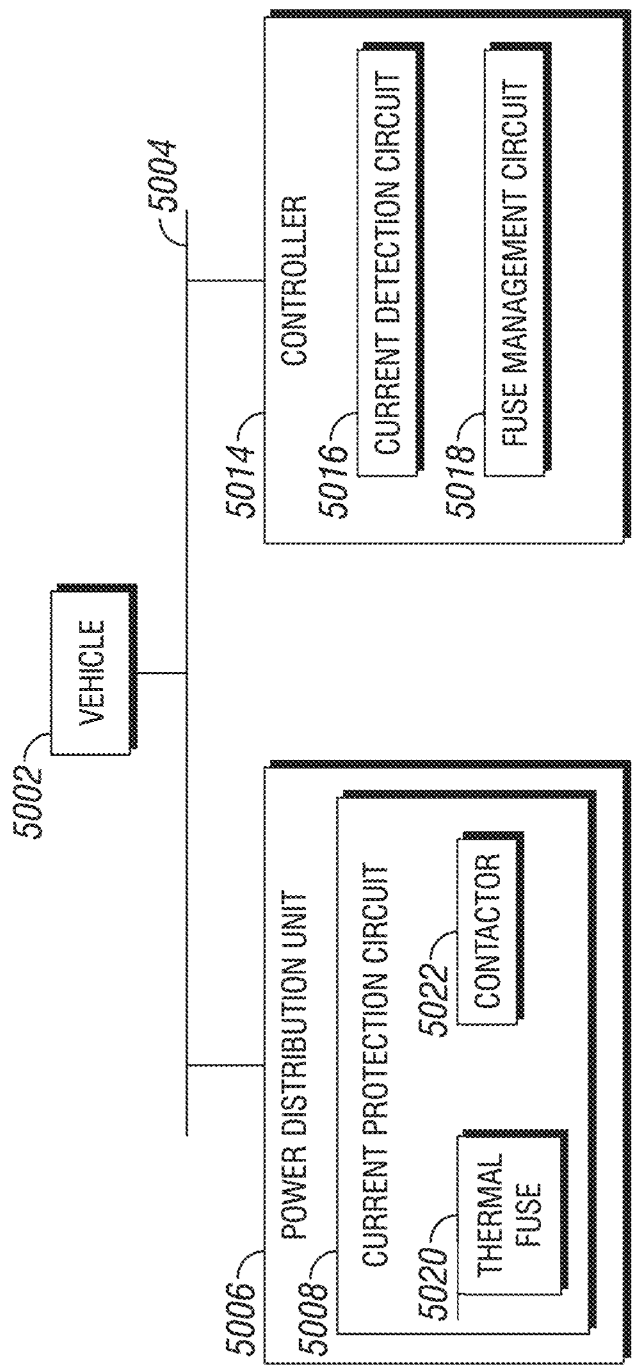
FIG. 50 depicts a schematic diagram of a vehicle having a PDU.

Referencing FIG. 50, an example system includes a vehicle 5002 having a motive electrical power path 5004; a power distribution unit 5006 having a current protection circuit 5008 disposed in the motive electrical power path 5004, where the current protection circuit includes: a thermal fuse 5020; and a contactor 5022 in a series arrangement with the thermal fuse 5020. The system further includes a controller 5014, including: a current detection circuit 5016 structured to determine a current flow through the motive electrical power path 5004; and a fuse management circuit 5018 structured to provide a contactor activation command in response to the current flow; and where the contactor 5022 is responsive to the contactor activation command.

Certain further aspects of an example system are described following, any one or more of which may be present in certain embodiments. An example system includes where the thermal fuse 5020 includes a current rating that is higher than a current corresponding to a maximum power throughput of the motive electrical power path 5004 (e.g., where the fuse is sized to avoid wear or degradation up to the maximum power throughput, where the fuse is sized to accommodate a higher power rating and/or a quick charging power throughput, etc.). An example system includes where the thermal fuse 5020 includes a current rating that is higher than a current corresponding to a quick charging power throughput of the motive electrical power path 5004. An example system includes where the contactor 5020 includes a current rating that is higher than a current corresponding to a maximum power throughput of the motive electrical power path 5004. In certain embodiments, the current corresponding to the maximum power throughput of the motive electrical power path 5004 may correspond to a current at nominal voltage, and/or a current at a degraded and/or failure mode voltage (e.g., as the battery pack ages, and/or if one or more cells are deactivated). An example system includes where the contactor 5022 includes a current rating that is higher than a current corresponding to a quick charging power throughput of the motive electrical power path 5004. An example system includes where the fuse management circuit 5018 is further structured to provide the contactor activation command as a contactor opening command in response to the current flow indicating a motive electrical power path protection event. An example current detection circuit 5016 determines the motive electrical power path protection event by performing at least one operation such as: responding to a rate of change of the current flow; responding to a comparison of the current flow to a threshold value; responding to one of an integrated or accumulated value of the current flow; and/or responding to one of an expected or a predicted value of any of the foregoing.

Figure 51:
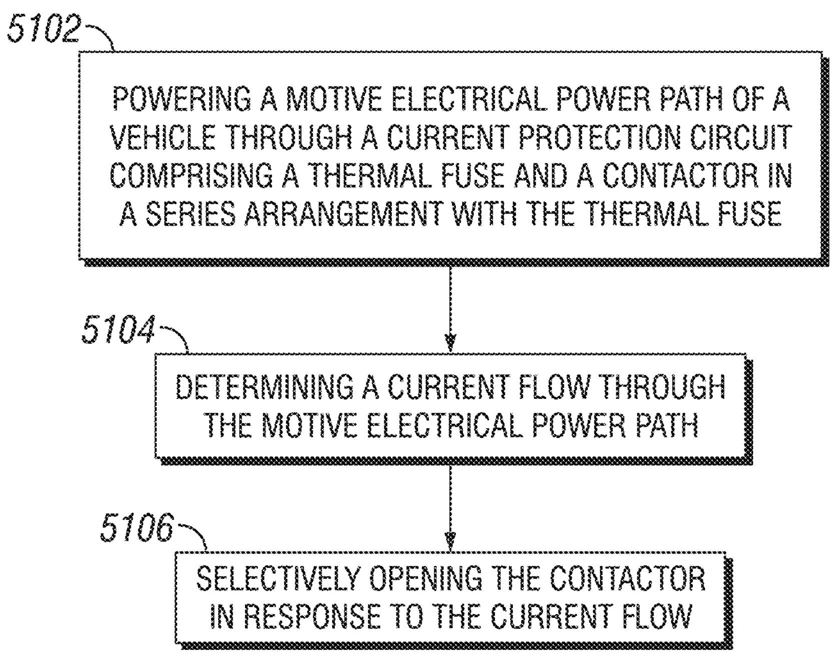
FIG. 51 depicts a schematic flow diagram of a procedure to operate a thermal fuse in series with a contactor.

Referencing FIG. 51, an example procedure includes an operation 5102 to power a motive electrical power path of a vehicle through a current protection circuit including a thermal fuse and a contactor in a series arrangement with the thermal fuse; and an operation 5104 to determine a current flow through the motive electrical power path; and an operation to selectively open the contactor in response to the current flow.

Certain further aspects of an example procedure are described following, any one or more of which may be present in certain embodiments. An example procedure further includes an operation to provide the thermal fuse having a current rating that is higher than a current corresponding to a maximum power throughput of the motive electrical power path. An example procedure includes an operation to provide the thermal fuse having a current rating that is higher than a current corresponding to a quick charging power throughput of the motive electrical power path. An example procedure includes an operation to provide the contactor having a current rating that is higher than a current corresponding to a maximum power throughput of the motive electrical power path. An example procedure includes an operation to provide the contactor having a current rating that is higher than a current corresponding to a quick charging power throughput of the motive electrical power path. An example procedure includes an operation to open the contactor is further in response to at least one of: a rate of change of the current flow; a comparison of the current flow to a threshold value; one of an integrated or accumulated value of the current flow; and/or an expected or predicted value of any of the foregoing.

Figure 52:
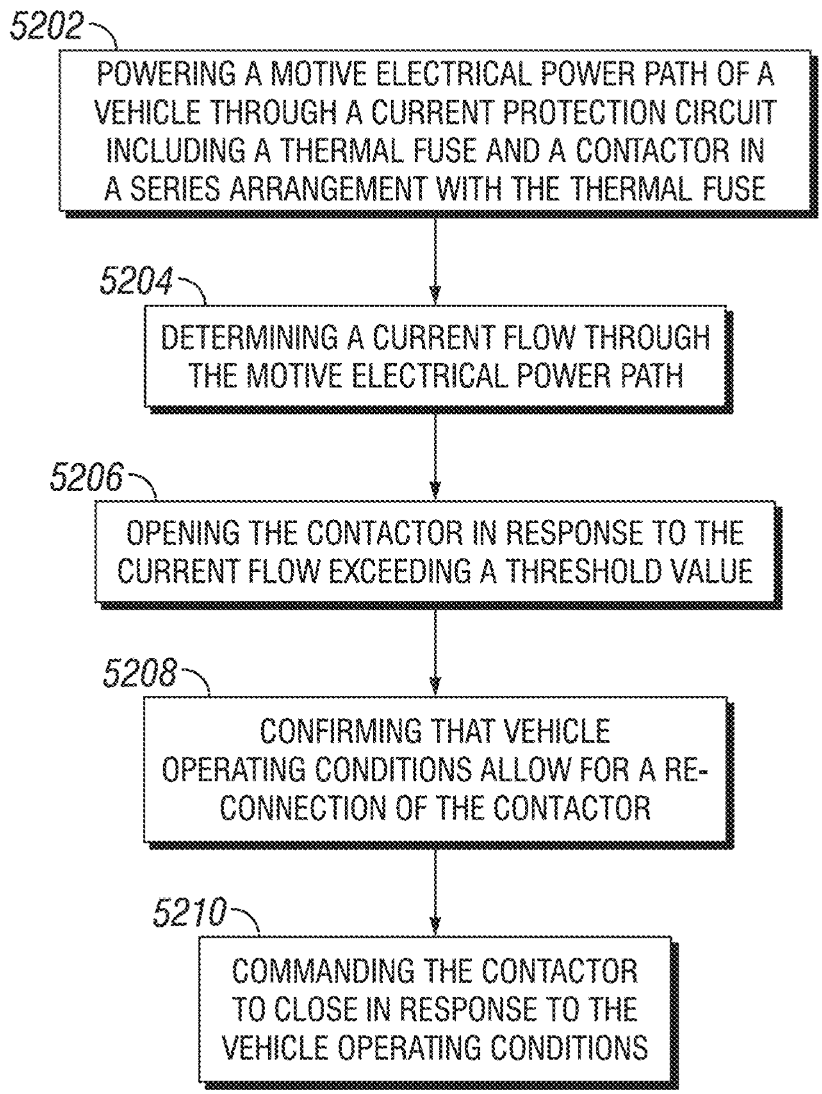
FIG. 52 depicts a schematic flow diagram of a procedure to re-connect a contactor.

Referencing FIG. 52, an example procedure includes an operation 5202 to power a motive electrical power path of a vehicle through a current protection circuit including a thermal fuse and a contactor in a series arrangement with the thermal fuse; an operation 5204 to determine a current flow through the motive electrical power path; an operation 5206 to open the contactor in response to the current flow exceeding a threshold value; an operation 5208 to confirm that vehicle operating conditions allow for a re-connection of the contactor; and an operation 5210 to command the contactor to close in response to the vehicle operating conditions. Previously known fused system, including systems having a controllable pyro-fuse, are not capable of restoring system power after an overcurrent event, as the fuse has opened the circuit and cannot be restored. Certain example embodiments throughout the present disclosure provide for a system that can open the circuit without activation of the fuse under certain circumstances. Accordingly, in certain embodiments, power can be restored after a high current event, providing for additional capability. However, in certain embodiments, it may be undesirable to restore power to the system, for example if the system is being accessed by emergency personnel and/or service after the overcurrent event. In certain embodiments, the controller is configured to perform certain checks, including checking current operating conditions and permissions, before attempting to restore power. Additionally or alternatively, the controller is configured to determine, during the attempted restoration of power and/or shortly thereafter, whether a condition causing an overcurrent event is still present. Additionally or alternatively, the controller is configured to determine whether the contactor or another electrical device has been damaged during the overcurrent event, or during the disconnection process being performed to halt the overcurrent event.

Certain further aspects of an example procedure are described following, any one or more of which may be present in certain embodiments. An example procedure further includes an operation to confirm the vehicle operating conditions, and in certain embodiments further includes determining at least one vehicle operating condition such as: an emergency vehicle operating condition; a user override vehicle operating condition; a service event vehicle operating condition; and a re-connection command communicated on a vehicle network. In certain embodiments, an emergency vehicle operating condition may indicate that a reconnection is desirable—for example where continued operation of the vehicle is more important than damage to the electrical system of the vehicle. In certain embodiments, an emergency vehicle operating condition may indicate that a reconnection is undesirable—for example where the vehicle has experienced an accident, and disconnection of power is desired to protect vehicle occupants and/or emergency response personnel. In certain embodiments, a service event vehicle operating condition indicates that a reconnection is desirable—for example where a servicing operator is requesting re-powering of the vehicle. In certain embodiments, a service event vehicle operating condition indicates that a reconnection is undesirable—for example when service personnel are performing service, maintenance, or repairs on the vehicle.

An example procedure includes an operation to monitor the motive electrical power path during the commanding the contactor to close, and re-opening the contactor in response to the monitoring (e.g., where the post-closing current and/or a current transient indicates that a condition causing the overcurrent may still be active). An example procedure includes an operation to determine an accumulated contactor open event description in response to the opening the contactor, and/or an operation to prevent the commanding the contactor to close in response to the accumulated contactor open event description exceeding a threshold value. For example, the accumulated contactor open event may be determined from a number of contactor open events under load, and/or according to a severity of those events. Where a number of open events under load are experienced, and/or where one or more severe open events are experienced, re-connection of the contactor may be undesirable to avoid the risk of further damage, overheating of the contactor, and/or sticking or welding of a damaged contactor that may prevent a subsequent re-opening of the contactor. An example procedure includes an operation to adjust the accumulated contactor open event description in response to the current flow during the opening of the contactor. An example procedure includes an operation to diagnose a welded contactor in response to one of the current flow during the opening the contactor, and/or a monitoring of the motive electrical power path during the commanding the contactor to close. An example procedure includes an operation to diagnose a welded contactor in response to a monitoring of at least one of a contactor actuator position (e.g., a failure of the actuator to respond as expected on command), a contactor actuator response, and/or the motive electrical power path during the opening the contactor. An example procedure further includes an operation to prevent the commanding the contactor to close in response to the diagnosed welded contactor.

Figure 53:
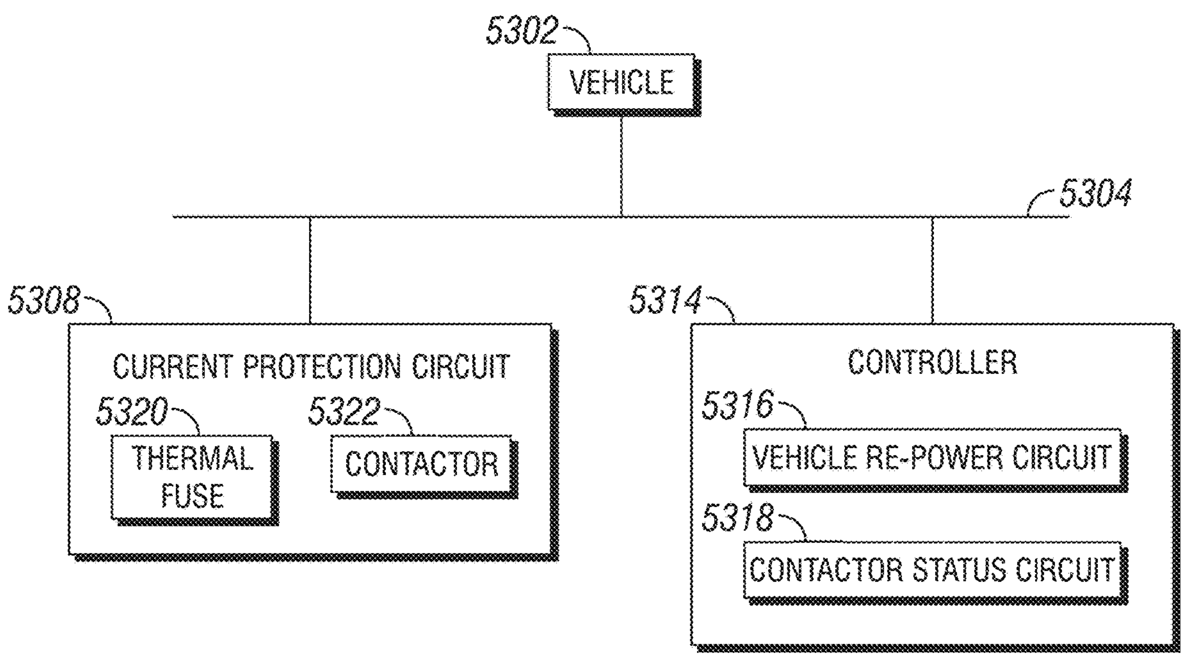
FIG. 53 depicts a schematic diagram of a vehicle having a PDU.

Referencing FIG. 53, an example apparatus includes a motive electrical power current protection circuit 5308 structured to: determine a current flow through a motive electrical power path 5304 of a vehicle; and open a contactor 5322 disposed in the current protection circuit 5308 including a thermal fuse 5320 and the contactor 5322 in a series arrangement with the thermal fuse 5320 in response to the current flow exceeding a threshold value. The apparatus further includes a vehicle re-power circuit 5316 structured to: confirm that vehicle operating conditions allow for a re-connection of the contactor; and to close the contactor 5322 in response to the vehicle operating conditions.

Certain further aspects of an example apparatus are described following, any one or more of which may be present in certain embodiments. An example apparatus includes where the vehicle re-power circuit 5316 is further structured to confirm the vehicle operating conditions by confirming at least one vehicle operating condition such as: an emergency vehicle operating condition; a user override vehicle operating condition; a service event vehicle operating condition; and a re-connection command communicated on a vehicle network (not shown). For example, a system may include an operator override interface (e.g., a button, a sequence of control inputs, or the like) that provide an input for the operator to request continued power operations where the motive electrical power current protection circuit 5308 has opened the contactor 5322 to protect the motive power system. In certain embodiments, operator access to the override is utilized by the vehicle re-power circuit 5316 to command a re-connection of the contactor. In certain embodiments, the re-connection by an operator input includes only allowing a re-connection for certain applications (e.g., an emergency or military vehicle), and/or only allowing a re-connection for a period of time (e.g., 10 seconds or 30 seconds), and/or only allowing a re-connection when the electrical conditions after the re-connection do not indicate that another overcurrent event is occurring. In certain embodiments, the vehicle re-power circuit 5316 additionally or alternatively may de-rate maximum power, de-rate the maximum power slew rate, provide a notification or warning to the operator during re-connection operations, and/or provide a notification or warning to the operator when a re-connection time period is about to expire (e.g., a first light or light sequence during re-connection operations, and a different light or light sequence when the re-connection time period is about to expire).

An example apparatus includes where the motive electrical power current protection circuit 5308 is further structured to monitor the motive electrical power path during the closing the contactor to close, and where the vehicle re-power circuit 5316 is further structured to re-open the contactor in response to the monitoring. An example apparatus includes a contactor status circuit 5318 structured to determine an accumulated contactor open event description in response to the opening the contactor 5322; where the vehicle re-power circuit 5316 is further structured to prevent the closing the contactor 5322 in response to the accumulated contactor open event description exceeding a threshold value; and/or where the contactor status circuit 5318 is further structured to adjust the accumulated contactor open event description in response to the current flow during the opening the contactor. An example apparatus includes a contactor status circuit 5318 structured to diagnose a welded contactor in response to one of, during the commanding the contactor to close: the current flow during the opening the contactor 5322, and/or a monitoring of the motive electrical power path by the motive electrical power current protection circuit 5308. An example apparatus includes a contactor status circuit 5318 structured to diagnose a welded contactor in response to a monitoring of, during the opening of the contactor, at least one of: a contactor actuator position by the vehicle re-power circuit 5316; a contactor actuator response by the vehicle re-power circuit 5316; and the motive electrical power path by the motive electrical power current protection circuit 5308; and/or where the contactor status circuit 5318 is further structured to prevent the closing the contactor in response to the diagnosed welded contactor.

An example system (e.g., referencing FIGS. 1 and 2) includes a vehicle having a motive electrical power path; a power distribution unit including: a current protection circuit disposed in the motive electrical power path, the current protection circuit including a thermal fuse and a contactor in a series arrangement with the thermal fuse; a high voltage power input coupling including a first electrical interface for a high voltage power source; a high voltage power output coupling including a second electrical interface for a motive power load; and where the current protection circuit electrically couples the high voltage power input to the high voltage power output, and where the current protection circuit is at least partially disposed in a laminated layer (e.g., referencing FIGS. 12 through 17) of the power distribution unit, where the laminated layer includes an electrically conductive flow path disposed between two electrically insulating layers.

Certain further aspects of an example system are described following, any one or more of which may be present in certain embodiments. An example system includes where current protection circuit includes a motive power bus bar disposed in the laminated layer of the power distribution unit. An example system includes where the vehicle further includes an auxiliary electrical power path; where the power distribution unit further includes: an auxiliary current protection circuit disposed in the auxiliary electrical power path, the auxiliary current protection circuit including a second thermal fuse; an auxiliary voltage power input coupling including a first auxiliary electrical interface for a low voltage power source; an auxiliary voltage power output coupling including a second auxiliary electrical interface for a an auxiliary load; and where the auxiliary current protection circuit electrically couples the auxiliary voltage power input to the auxiliary voltage power output, and where the auxiliary current protection circuit is at least partially disposed in the laminated layer of the power distribution unit. An example system includes where the laminated layer of the power distribution unit further includes at least one thermally conductive flow path disposed between two thermally insulating layers; where the at least one thermally conductive flow path is configured to provide thermal coupling between a heat sink (e.g., a cooling system, a housing or other system aspect having a high thermal mass, and/or ambient air), and a heat source, where the heat source includes at least one of the contactor, the thermal fuse, and the second thermal fuse; where the heat sink includes at least one of a thermal coupling to an active cooling source and a housing of the power distribution unit; and/or further including a thermal conduit disposed between the at least one thermally conductive flow path and the heat source.

Figure 55:
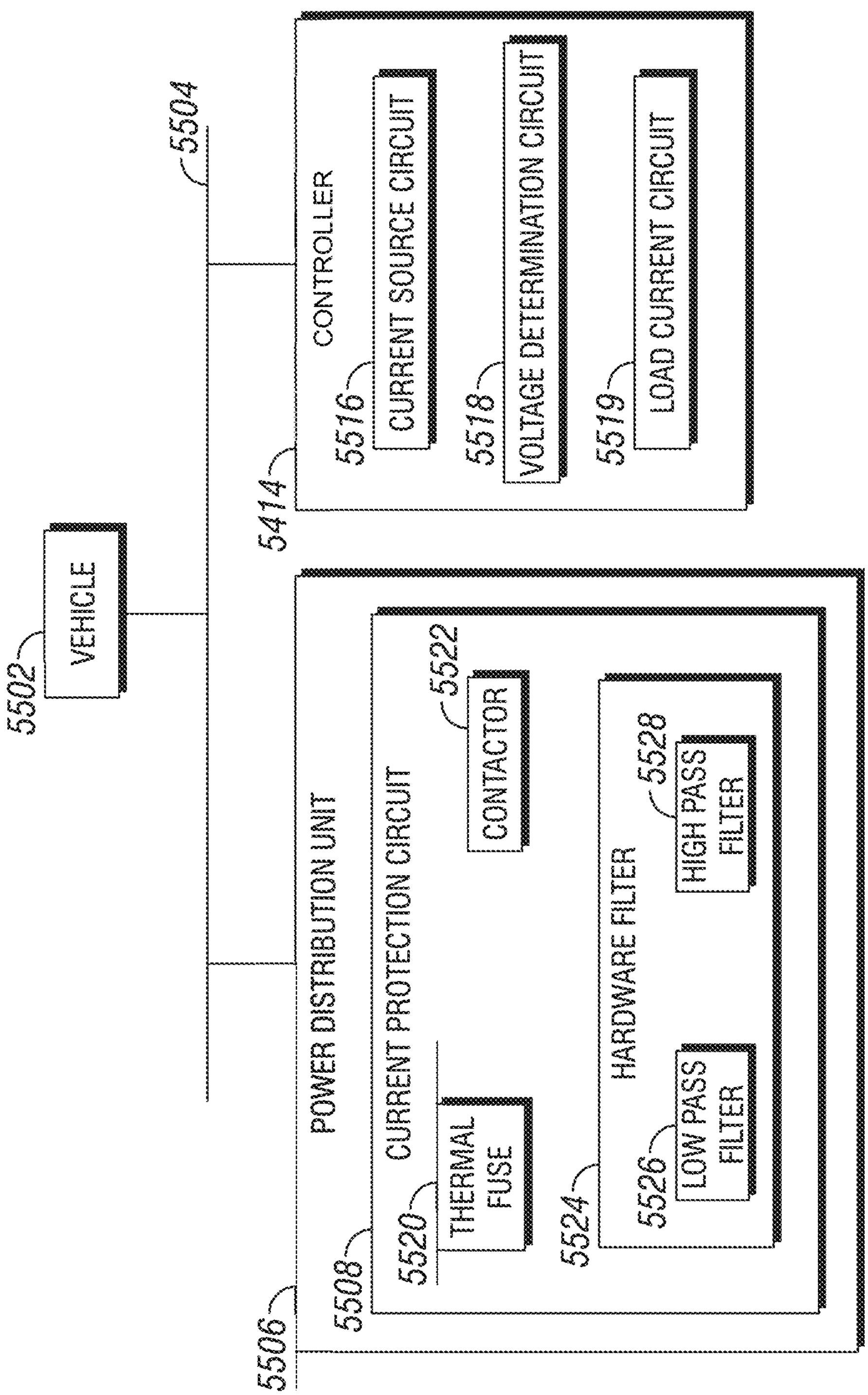
FIG. 55 depicts a schematic diagram of a vehicle having a PDU.

Referencing FIG. 55, an example system includes a vehicle 5502 having a motive electrical power path 5504; a power distribution unit 5506 including a current protection circuit 5508 disposed in the motive electrical power path 5504, the current protection circuit 5508 including a thermal fuse 5520 and a contactor 5522 in a series arrangement with the thermal fuse 5520; a current source circuit 5516 electrically coupled to the thermal fuse 5520 and structured to inject a current across the thermal fuse 5520 (e.g., using an op-amp driven current source); and a voltage determination circuit 5518 electrically coupled to the thermal fuse 5520 and structured to determine at least one of an injected voltage amount and a thermal fuse impedance value.

Certain further aspects of an example system are described following, any one or more of which may be present in certain embodiments. An example system includes where the motive electrical power path 5504 includes a direct current power path (e.g., the motive power path); where the current source circuit 5516 includes at least one of an alternating current source and a time varying current source, and further including a hardware filter 5524 electrically coupled to the thermal fuse 5520. In the example, the hardware filter 5524 is configured in response to an injection frequency of the current source circuit 5516; where the hardware filter 5524 includes a high pass filter 5526 having a cutoff frequency determined in response to the injection frequency of the current source circuit 5516 (e.g., to remove voltage fluctuations that are significantly lower than the injection AC frequency). An example system includes the hardware filter 5524 having a low pass filter 5528 having a cutoff frequency determined in response to at least one of the injection frequency of the current source circuit (e.g., to remove voltage fluctuations induced by the current injection) or a load change value of the motive electrical power path 5504 (e.g., to remove transient fluctuations caused by a change in the load). In certain embodiments, the high pass filtered voltage is analyzed separately from the low pass filtered voltage—e.g., where the base voltage signal is analyzed separately with a low pass filter applied and with a high pass filter applied, allowing for a separate determination of the response voltage to the injected current, and of the base voltage due to the current load. In certain embodiments, the voltage determination circuit 5518 is further structured to determine to determine an injected voltage drop of the thermal fuse in response to an output of the high pass filter; and/or where the voltage determination circuit 5518 is further structured to determine the thermal fuse impedance value in response to the injected voltage drop. In certain embodiments, the voltage determination circuit 5518 is further structured to determine a load voltage drop of the thermal fuse 5520 in response to an output of the low pass filter, and/or where the system further includes a load current circuit 5519 structured to determine a load current through the fuse in response to the thermal fuse impedance value (e.g., determined from the response voltage to the injected current), and further in response to the load voltage drop from the low pass filter.

Figure 54:
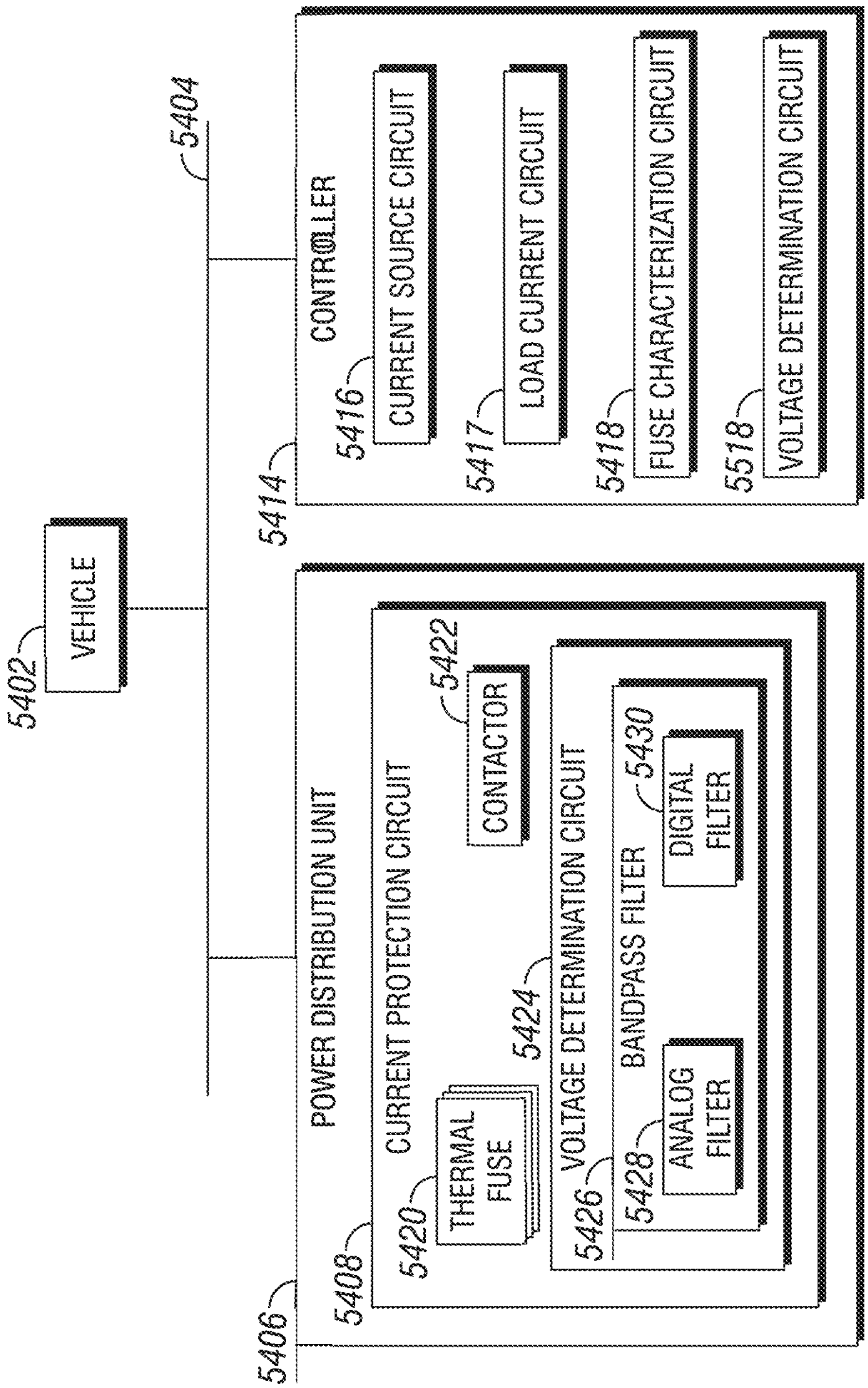
FIG. 54 depicts a schematic diagram of a vehicle having a PDU.

Referencing FIG. 54, an example system includes a vehicle 5402 having a motive electrical power path 5404; a power distribution unit 5406 including a current protection circuit 5408 disposed in the motive electrical power path 5404, the current protection circuit 5408 including a thermal fuse 5420 and a contactor 5422 in a series arrangement with the thermal fuse 5420. The example system further includes a current source circuit 5416 electrically coupled to the thermal fuse 5420 and structured to inject a current across the thermal fuse 5420; and a voltage determination circuit 5518 electrically coupled to the thermal fuse 5420 and structured to determine at least one of an injected voltage amount and a thermal fuse impedance value, where the voltage determination circuit 5518 includes a high pass filter (e.g., analog filter 5428, depicted in a bandpass filter 5426, but which may additionally or alternatively include a high pass filter) having a cutoff frequency selected in response to a frequency of the injected current.

Certain further aspects of an example system are described following, any one or more of which may be present in certain embodiments. An example system includes where the voltage determination circuit 5518 further includes a bandpass filter 5426 having a bandwidth selected to bound the frequency of the injected current. For example, where the frequency of the injected current is 200 Hz, the bandpass filter 5426 may be configured with cutoff frequencies of 190 Hz to 210 Hz, 195 Hz to 205 Hz, 199 Hz to 201 Hz, within 5% of the injected frequency, and/or within 1% of the injected frequency. One of skill in the art, having the benefit of the disclosures herein, can determine an appropriate injection frequency and/or range of injection frequencies to be utilized, and values for the high pass filter and/or the band pass filter to provide an appropriately conditioned voltage response determination to the injected current. Certain considerations for selecting an injected frequency and the band pass filter range include, without limitation, frequency components in electrical communication with the motive electrical power system including base frequencies and harmonics, the noise environment of the system, the desired accuracy of the thermal fuse impedance value determination, the dynamic response and capability of the current injector, the dynamic response and attenuation capability of the filters, the time available for performing an injection event, a number of fuses coupled to the current injector(s) that are to be checked, the desired time response for determining changes in the fuse impedance value, and/or the amount of statistical and/or frequency component analysis post-processing that is available on the controller 5414.

An example system includes where the high pass filter includes an analog hardware filter 5428, and where the bandpass filter 5426 includes a digital filter 5430. For example, the analog hardware filter 5428 may perform the high pass filtering function, and a downstream digital filter 5430 may perform a digital or analytical bandpass filtering function on the high pass filtered input. An example system includes where the high pass filter and the bandpass filter are both digital filters 5430. An example voltage determination circuit 5518 is further structured to determine the thermal fuse impedance value in response to the injected voltage drop from the high pass and band pass filtered input. An example system includes a fuse characterization circuit 5418 that stores a fuse resistance value and/or a fuse impedance value, and/or the fuse characterization circuit 5418 further updates the stored one of the fuse resistance value and the fuse impedance value in response to the thermal fuse impedance value. An example system includes where the fuse characterization circuit 5418 is further updates the stored one of the fuse resistance value and the fuse impedance value by performing at least one operation such as: updating a value to the thermal fuse impedance value (e.g., instantaneously or periodically replacing the stored value with the determined value); filtering a value using the thermal fuse impedance value as a filter input (e.g., moving continuously toward the determined value, such as with a selected time constant); rejecting the thermal fuse impedance value for a period of time or for a number of determinations of the thermal fuse impedance value (e.g., where a low trust and/or anomalous value is determined, setting the value aside or ignoring it for a period of time or selected number of determinations, and/or later confirming the value if it appears to be consistent over time); and/or updating a value by performing a rolling average of a plurality of thermal impedance values over time (e.g., utilizing a rolling buffer or other memory construct to replace older determinations with updated determinations). An example system includes where the power distribution unit 5406 further includes a number of thermal fuses 5420 disposed therein, and where the current source circuit 5416 is further electrically coupled to the number of thermal fuses (which maybe a single current source selectively coupled to various fuses, and/or separate current sources controllable by the current source circuit 5416). the example current source circuit 5416 further configured to sequentially inject a current across each of the number of thermal fuses (e.g., to check the thermal fuse impedance value and/or resistance for each of the fuses in a selected sequence). An example voltage determination circuit 5518 is further electrically coupled to each of the number of thermal fuses, and further structured to determine at least one of an injected voltage amount a thermal fuse impedance value for each of the number of thermal fuses. An example current source circuit 5416 is further configured to sequentially inject the current across each of the number of thermal fuses in a selected order of the fuses (e.g., the fuses need not be checked in any particular order, and need not be checked with the same frequency or the same number of times). An example current source circuit 5416 further structured adjusts the selected order in response to at least one of: a rate of change of a temperature of each of the fuses (e.g., a fuse that is changing temperature more quickly may be checked more frequently); an importance value of each of the fuses (e.g., a motive power fuse may be checked more frequently than a non-critical accessory fuse); a criticality of each of the fuses (e.g., a mission disabling fuse may be checked more frequently than another fuse); a power throughput of each of the fuses (e.g., similar to the rate of change of temperature, and/or indicative of the potential for increased wear or aging of the fuse); and/or one of a fault condition or a fuse health condition of each of the fuses (e.g., a fuse having a suspected or active fault, and/or a fuse that is worn or aged, may be checked more frequently to track the progress of the fuse, confirm or clear the diagnostic, and/or to more rapidly detect or respond to a failure). An example current source circuit 5416 is further structured to adjust the selected order in response to one of a planned duty cycle and an observed duty cycle of the vehicle (e.g., adjusting the fuse checking order and/or frequency based on the planned duty cycle of the vehicle or the motive power circuit, and/or based on the observed duty cycle of the vehicle or the motive power circuit, allowing adjustment for various applications and/or observed run-time changes). An example system includes where the current source circuit 5416 is further structured to sweep the injected current through a range of injection frequencies (e.g., ensuring robustness to system noise, informing a multi-frequency impedance model of the fuse, and/or passively or actively avoiding injected noise onto the power circuit including the fuse). An example current source circuit 5416 is further structured to inject the current across the thermal fuse at a number of injection frequencies (e.g., similar to a sweep, but using a selected number of discrete frequencies, which achieves some of the benefits of the sweep with more convenient filtering and processing, and includes updating the selected injection frequencies based on system changes such as loads, observed noise, and/or observed value of selected frequencies in characterizing the fuse). An example system includes where the current source circuit 5416 is further structured to inject the current across the thermal fuse at a number of injection voltage amplitudes. The injection voltage amplitude may be coupled with the injection current amplitude. Wherever an injection amplitude is described throughout the present disclosure, it is understood that an injection amplitude may be a current injection amplitude and/or a voltage injection amplitude, and in certain operating conditions these may be combined (e.g., selecting a voltage amplitude until a current limit in the current source is reached, selecting a current amplitude until a voltage limit in the current source is reached, and/or following an amplitude trajectory that may include a combination of voltage and/or current). An example system includes where the current source circuit 5416 is further structured to inject the current across the thermal fuse at an injection voltage amplitude determined in response to a power throughput of the thermal fuse (e.g., injecting a greater amplitude at high load to assist a signal-to-noise ratio, and/or a lower amplitude at high load to reduce the load on the fuse). An example system includes where the current source circuit 5416 is further structured to inject the current across the thermal fuse at an injection voltage amplitude determined in response to a duty cycle of the vehicle.

Figure 56:
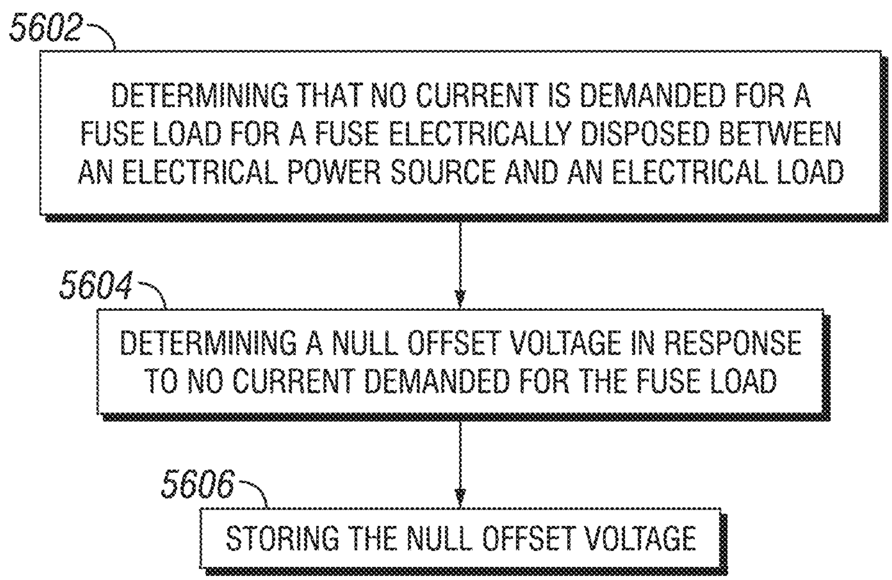
FIG. 56 depicts a schematic flow diagram of a procedure to determine a null offset voltage.

Referencing FIG. 56, an example procedure includes an operation 5602 to determine null offset voltage for a fuse current measurement system, including an operation 5604 to determine that no current is demanded for a fuse load for a fuse electrically disposed between an electrical power source and an electrical load; and the operation 5604 including determining a null offset voltage in response to the no current demanded for the fuse load; and an operation 5606 to store the null offset voltage.

Certain further aspects of an example procedure are described following, any one or more of which may be present in certain embodiments. An example procedure further includes an operation to update a stored null offset voltage in response to the determined null offset voltage. An example procedure includes an operation to diagnose a component in response to the null offset voltage, for example where a high null offset voltage indicates that a component in the system may not be operating properly. An example procedure includes an operation to determine which one of a plurality of components is contributing to the null offset voltage (e.g., by performing a null offset voltage determination with selected components coupled or de-coupled from the circuit having the fuse being checked). An example procedure includes an operation to determine that no current is demanded for the fuse load by performing at least one operation such as: determining that a key-off event has occurred for a vehicle including the fuse, the electrical power source, and the electrical load; determining that a key-on event has occurred for the vehicle; determining that the vehicle is powering down; and/or determining that the vehicle is in an accessory condition, where the vehicle in the accessory condition does not provide power through the fuse (e.g., a keyswitch accessory position for an application where the motive power fuse is not energized in the accessory position).

Figure 57:
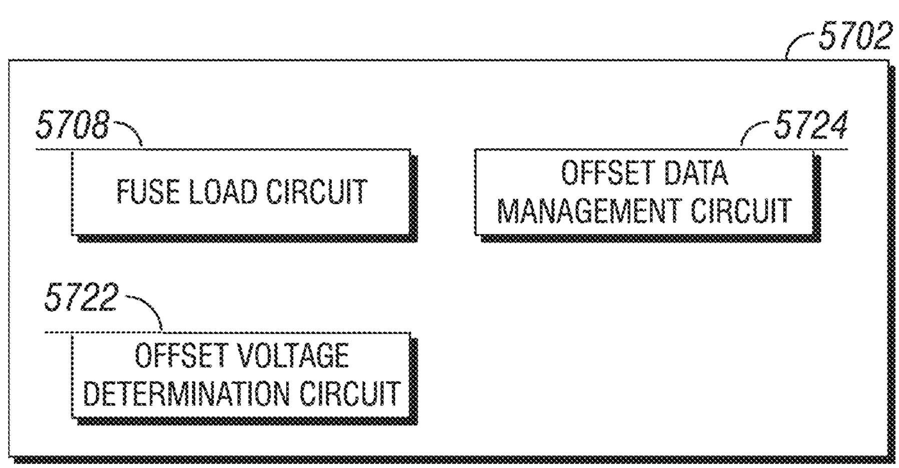
FIG. 57 depicts a schematic diagram of an apparatus for determining an offset voltage.

Referencing FIG. 57, an example apparatus to determine offset voltage to adjust a fuse current determination includes a controller 5702 having a fuse load circuit 5708 structured to determine that no current is demanded for a fuse load, and to further determine that contactors associated with the fuse are open; an offset voltage determination circuit 5722 structured to determine an offset voltage corresponding to at least one component in a fuse circuit associated with the fuse, in response to the determining that no current is demanded for the fuse load; and an offset data management circuit 5724 structured to store the offset voltage, and to communicate a current calculation offset voltage for use by a controller to determine current flow through the fuse.

Figure 58:
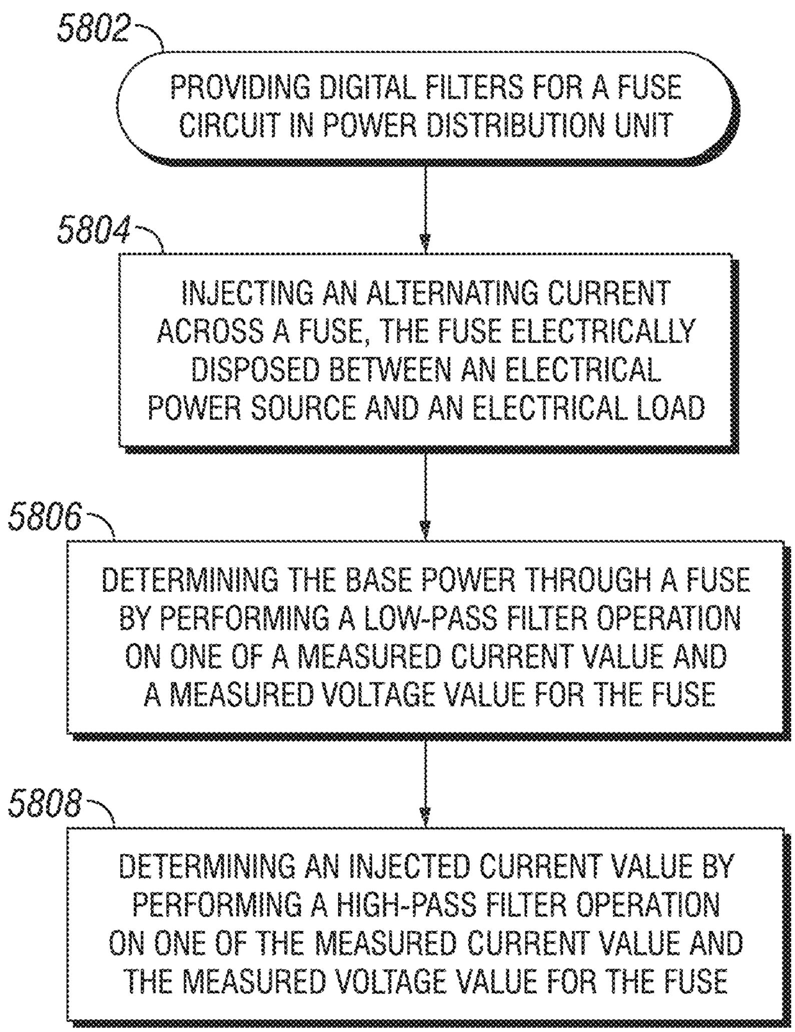
FIG. 58 depicts a schematic flow diagram of a procedure to determine an injected current value.

Referencing FIG. 58, an example procedure includes an operation 5802 to provide digital filters for a fuse circuit in a power distribution unit, including an operation 5804 to inject an alternating current across a fuse, where the fuse is electrically disposed between an electrical power source and an electrical load; an operation 5806 to determine the base power through a fuse by performing a low-pass filter operation on one of a measured current value and a measured voltage value for the fuse; and an operation 5808 to determine an injected current value by performing a high-pass filter operation on one of the measured current value and the measured voltage value for the fuse.

Certain further aspects of an example procedure are described following, any one or more of which may be present in certain embodiments. An example procedure further includes an operation to adjust parameters of at least one of the low-pass filter and the high-pass filter in response to a duty cycle of one of power and current through the fuse. An example procedure includes an operation to sweep the injected alternating current through a range of injection frequencies. An example procedure includes an operation to inject the alternating current across the fuse at a number of injection frequencies. An example procedure includes an operation where the current source circuit is further structured to inject the current across the fuse at a number of injection voltage amplitudes. An example procedure includes an operation where the current source circuit is further structured to inject the current across the fuse at an injection voltage amplitude determined in response to a power throughput of the fuse. In certain embodiments, the low-pass filter and/or the high-pass filter are digital filters, and where the adjusting parameters of the digital filters includes adjusting values for the digital filter(s). An example procedure includes further processing the measured voltage value with a digital bandpass filter after performing the high-pass filter, and determining a fuse resistance, fuse dynamic resistance, and/or fuse impedance value based on the high-pass and then bandpass filtered measured voltage value.

Figure 59:
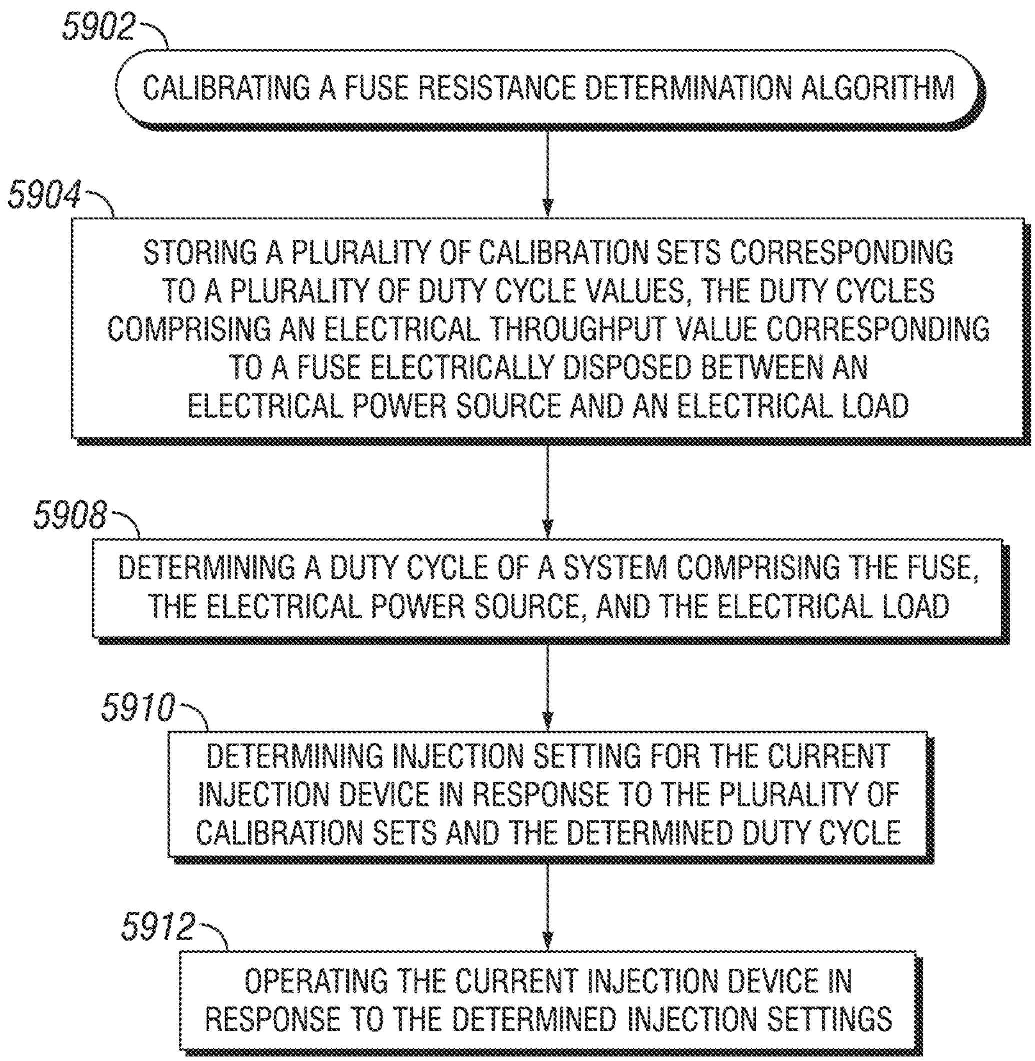
FIG. 59 depicts a schematic flow diagram of a procedure to calibrate a fuse resistance algorithm.

Referencing FIG. 59, an example procedure includes an operation 5902 to calibrate a fuse resistance determination algorithm, including: an operation 5904 to store a number of calibration sets corresponding to a number of duty cycle values, the duty cycles including an electrical throughput value corresponding to a fuse electrically disposed between an electrical power source and an electrical load. Example calibration sets include current source injection settings for a current injection device operationally coupled to the fuse, including injection frequencies, injection duty cycles (e.g., on-time for each cycle), injection waveform shapes, fuse sequence operations (e.g., the order and frequency to check each fuse), injection amplitudes, and/or injection run-times (e.g., the number of seconds or milliseconds for each injection sequence for each fuse, such as 130 ms, 20 ms, 1 second, etc.). The example procedure includes an operation 5908 to determine a duty cycle of a system including the fuse, the electrical power source, and the electrical load; an operation 5910 to determine injection settings for the current injection device in response to the number of calibration sets and the determined duty cycle (e.g., using the indicated calibration set according to the determined duty cycle, and/or interpolating between calibration sets); and an operation 5912 to operate the current injection device in response to the determined injection settings.

An example procedure further includes an operation where the calibration sets further comprise filter settings for at least one digital filter, where the method further includes determining the fuse resistance utilizing the at least one digital filter.

Figure 60:
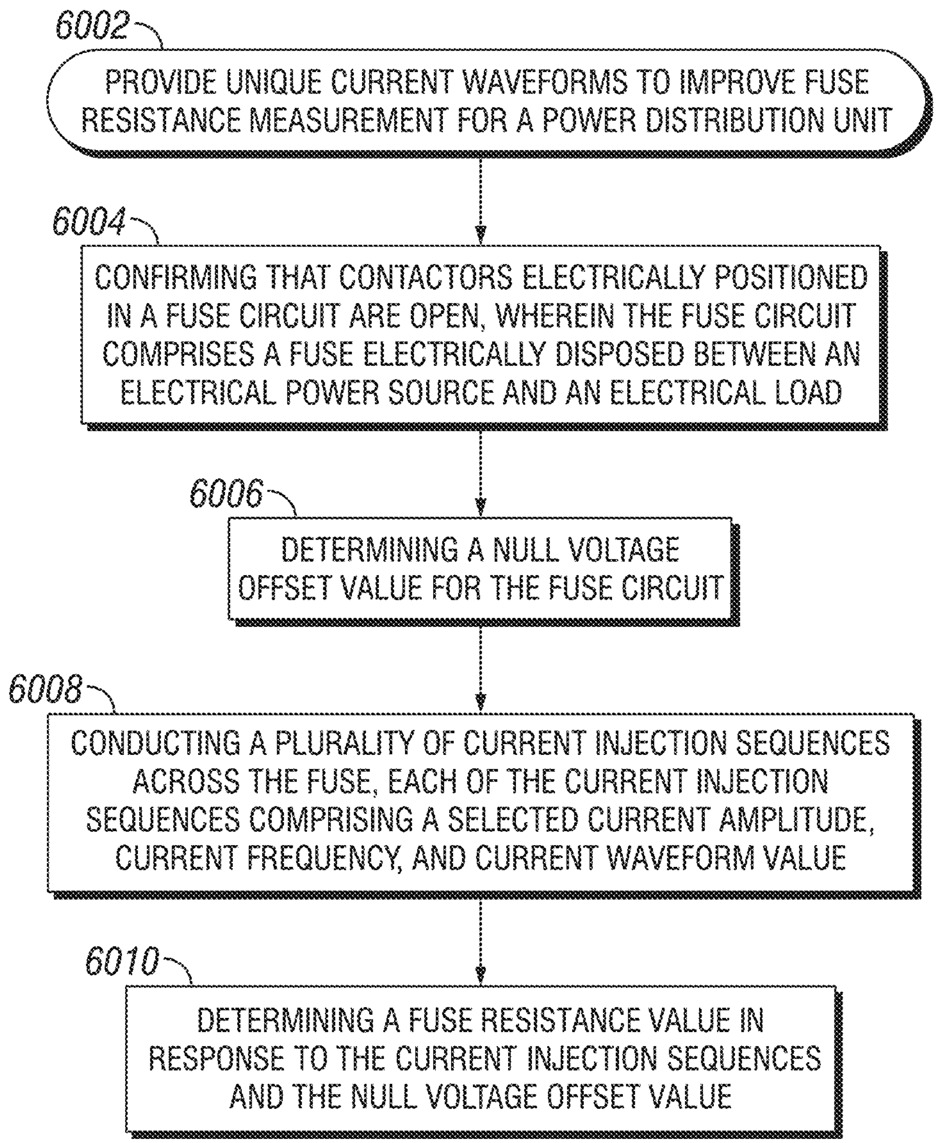
FIG. 60 depicts a schematic flow diagram of a procedure to determine a fuse resistance using a unique current waveform.

Referencing FIG. 60, an example procedure includes an operation 6002 to provide unique current waveforms to improve fuse resistance measurement for a power distribution unit. In certain embodiments, the procedure includes an operation 6004 to confirm that contactors electrically positioned in a fuse circuit are open, where the fuse circuit includes a fuse electrically disposed between an electrical power source and an electrical load, and/or an operation 6006 to determine a null voltage offset value for the fuse circuit. An example procedure includes an operation 6006 to conduct a number of current injection sequences across the fuse, where each of the current injection sequences includes a selected current amplitude, current frequency, and current waveform value. An example procedure further includes an operation 6010 to determine a fuse resistance value in response to the current injection sequences and/or the null voltage offset value.

Certain further aspects of an example procedure are described following, any one or more of which may be present in certain embodiments. An example procedure further includes an operation to adjust filtering characteristics for a digital filter in response to each of the number of current injection sequences, and to measure one of the fuse circuit voltage or the fuse circuit current with the digital filter during the corresponding current injection sequence using the adjusted filtering characteristics.

Figure 61:
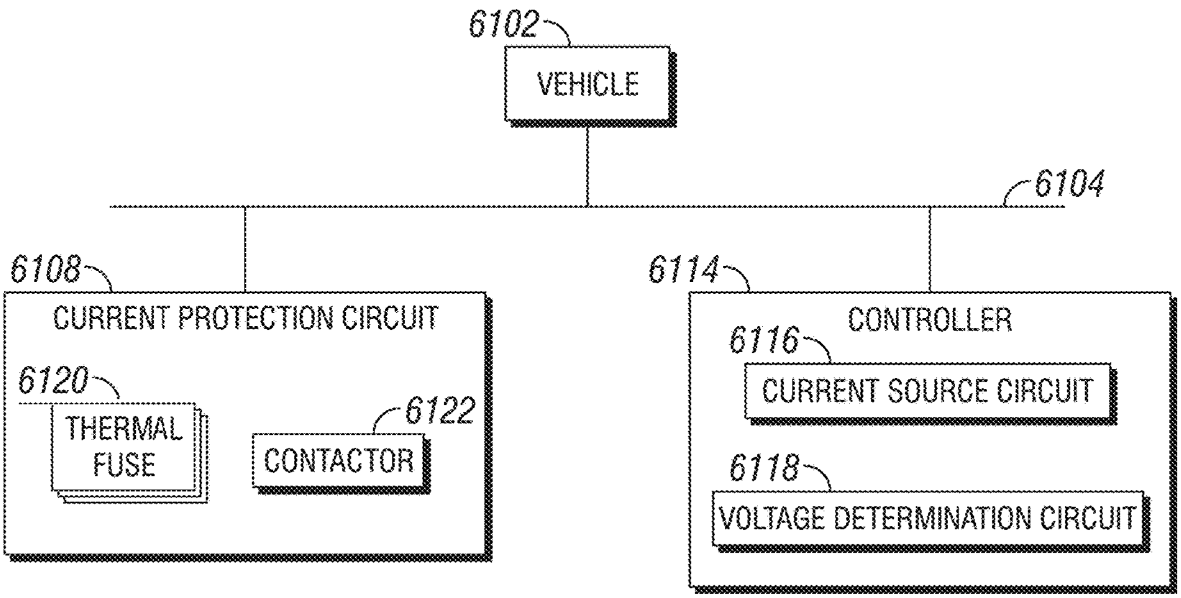
FIG. 61 depicts a schematic diagram of a vehicle having a current protection circuit.

Referencing FIG. 61, an example system includes a vehicle 6102 having a motive electrical power path 6104; a power distribution unit including a current protection circuit 6108 disposed in the motive electrical power path 6104, where the current protection circuit 6108 includes a thermal fuse 6120 and a contactor 6122 in a series arrangement with the thermal fuse 6120. The example system includes a controller 6114 having a current source circuit 6116 electrically coupled to the thermal fuse 6120 and structured to inject a current across the thermal fuse 6120, and a voltage determination circuit 6118 electrically coupled to the thermal fuse 6120 and structured to determine an injected voltage amount and a thermal fuse impedance value. The example voltage determination circuit 6118 is structured to perform a frequency analysis operation to determine the injected voltage amount. Example and non-limiting frequency analysis operations include applying analog and/or digital filters to remove frequency components of the fuse voltage that are not of interest and/or that are not related to the injected frequency. Example and non-limiting frequency analysis operations include utilizing at least one frequency analysis technique selected from the techniques such as: a Fourier transform, a fast Fourier transform, a Laplace transform, a Z transform, and/or a wavelet analysis. In certain embodiments, a frequency analysis operation is performed on filtered and/or unfiltered measurements of the thermal fuse voltage.

Certain further aspects of an example system are described following, any one or more of which may be present in certain embodiments. An example system includes where the voltage determination circuit 6118 further structured to determine the injected voltage amount by determining an amplitude of a voltage across the fuse at a frequency of interest; and/or where the frequency of interest is determined in response to a frequency of the injected voltage. An example system includes where the current source circuit 6116 is further structured to sweep the injected current through a range of injection frequencies. An example system includes where the current source circuit 6116 is further structured to inject the current across the thermal fuse 6120 at a number of injection frequencies. An example system includes where the current source circuit 6116 is further structured to inject the current across the thermal fuse 6120 at a number of injection voltage amplitudes. An example system includes where the current source circuit 6116 is further structured to inject the current across the thermal fuse 6120 at an injection voltage amplitude determined in response to a power throughput of the thermal fuse 6120. An example system includes where the current source circuit 6116 is further structured to inject the current across the thermal fuse 6120 at an injection voltage amplitude determined in response to a duty cycle of the vehicle 6102.

Figure 62:
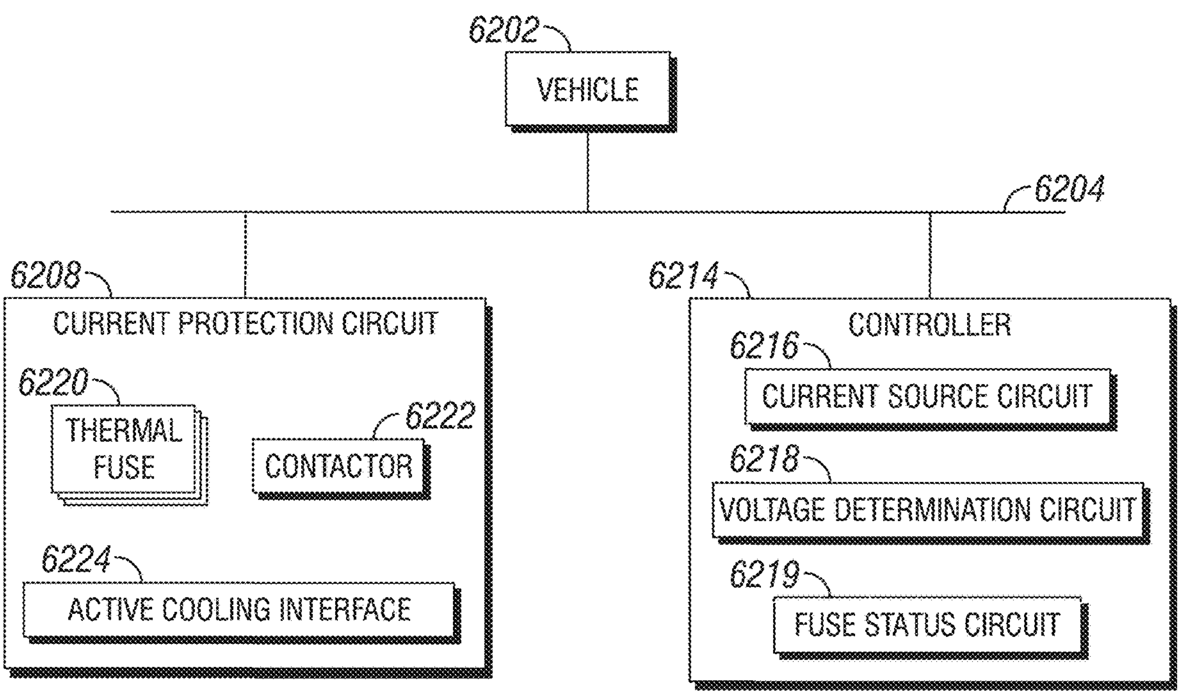
FIG. 62 depicts a schematic diagram of a vehicle having a current protection circuit.

Referencing FIG. 62, an example system includes a vehicle 6202 having a motive electrical power path 6204; a power distribution unit including a current protection circuit 6208 disposed in the motive electrical power path 6204, the current protection circuit 6208 including a thermal fuse 6220 and a contactor 6222 in a series arrangement with the thermal fuse. The example system further includes a controller 6214 having a current source circuit 6216 electrically coupled to the thermal fuse and structured to determine that a load power throughput of the motive electrical power path 6204 is low, and to inject a current across the thermal fuse 6220 in response to the load power throughput of the motive electrical power path 6204 being low. The controller 6214 further includes a voltage determination circuit 6218 electrically coupled to the thermal fuse 6220 and structured to determine at least one of an injected voltage amount and a thermal fuse impedance value, and where the voltage determination circuit 6218 includes a high pass filter having a cutoff frequency selected in response to a frequency of the injected current.

Certain further aspects of an example system are described following, any one or more of which may be present in certain embodiments. An example system includes where the current source circuit 6216 is further structured to determine the load power throughput of the motive electrical power path 6204 is low in response to the vehicle being in a shutdown state. An example system includes where the current source circuit 6216 is further structured to determine the load power throughput of the motive electrical power path 6204 is low in response to the vehicle being in a keyoff state. An example system includes where the current source circuit 6216 is further structured to determine the load power throughput of the motive electrical power path 6204 is low in response to a motive torque request for the vehicle being zero. An example system includes where the power distribution unit further includes a number of fuses, and where the current source circuit 6216 is further structured to inject the current across each of the fuses in a selected sequence; and/or where the current source circuit 6216 is further structured to inject the current across a first one of the plurality of fuses at a first shutdown event of the vehicle, and to inject the current across a second one of the plurality of fuses at a second shutdown event of the vehicle (e.g., to limit run-time of the controller 6214 during shutdown events that may be of limited duration, an example current source circuit 6216 checks only one or a subset of the fuses during a given shutdown event, only checking all of the fuses over a number of shutdown events).

Referencing FIG. 62, an example system includes a vehicle 6202 having a motive electrical power path 6204; a power distribution unit including a current protection circuit 6308 disposed in the motive electrical power path 6204, where the current protection circuit 6208 includes a thermal fuse 6220 and a contactor 6222 in a series arrangement with the thermal fuse 6220. An example system further includes a controller 6214 having a current source circuit 6218 electrically coupled to the thermal fuse 6220 and structured to inject a current across the thermal fuse 6220; and a voltage determination circuit 6218 electrically coupled to the thermal fuse 6220 and structured to determine at least one of an injected voltage amount and a thermal fuse impedance value. The example voltage determination circuit 6218 includes a high pass filter having a cutoff frequency selected in response to a frequency of the injected current. The example controller 6214 further includes a fuse status circuit 6219 structured to determine a fuse condition value in response to the at least one of the injected voltage amount and the thermal fuse impedance value. For example, a correlation between the fuse resistance (and/or dynamic resistance or impedance) may be established for a particular fuse or type of fuse, and the example fuse status circuit 6219 determines the fuse condition value in response to the observed fuse resistance or other related parameter. In certain embodiments, the fuse status circuit 6219 may additionally include other information, such as the power throughput accumulated through the fuse, power transient events accumulated and/or power excursion events accumulated through the fuse, temperature events and/or temperature transients accumulated by the fuse, and/or an operational longevity parameter such as hours of operation, miles of operation, hours of powered operation, or the like.

Certain further aspects of an example system are described following, any one or more of which may be present in certain embodiments. An example system includes where the fuse status circuit 6219 is further structured to provide the fuse condition value by providing at least one of a fault code or a notification of the fuse condition value (e.g., storing a parameter, communicating a fault parameter to a datalink, and/or providing a fault parameter to a service tool). An example fuse status circuit 6219 further adjusts a maximum power rating for the motive electrical power path 6204, a maximum power slew rate for the motive electrical power path; and/or adjusts a configuration of the current protection circuit in response to the fuse condition value (e.g., sharing a load between parallel fuses, bypassing the fuse at lower thresholds for power or power transients, etc.). An example power distribution unit further includes an active cooling interface 6224, and where the fuse status circuit 6219 further adjusts the active cooling interface 6224 in response to the fuse condition value (e.g., providing additional cooling for an aging fuse, and/or lowering a threshold for an active cooling increase request for an aging fuse). An example fuse status circuit 6219 is further structured to clear the at least one of the fault code or the notification of the fuse condition value in response to the fuse condition value indicating that the fuse condition has improved (e.g., where a previous indication from the fuse condition value indicated degradation, but continued observations indicate that degradation of the fuse is not present; upon a reset by an operator or a service technician, such as an indication that the fuse has been checked or changed, etc.). An example fuse status circuit 6219 is further structured to clear the at least one of the fault code or the notification of the fuse condition value in response to a service event for the fuse (e.g., through a service tool, planned sequence of inputs, or the like); where the fuse status circuit 6219 is further structured to determine a fuse life remaining value in response to the fuse condition value (e.g., through a correlation of the fuse condition value to the fuse life remaining value, and/or using a cutoff or threshold value of the fuse condition value to trigger an end-of-life condition or warning; for example it may be determined that a particular value of the fuse condition value indicates that the fuse is at 90% of a planned life, has 500 hours of operation remaining, etc.); where the fuse status circuit 6219 is further structured to determine the fuse life remaining value further in response to a duty cycle of the vehicle (e.g., in certain embodiments a heavier vehicle duty cycle will consume the remaining fuse life more quickly, which may be accounted for in determining the fuse life remaining value, and which may depend upon the units of fuse life remaining such as operating hours versus calendar days, and/or upon the notification type—e.g., a service light, a quantitative time remaining, etc.—to a service technician, operator, or the like); and/or where the fuse status circuit 6219 is further structured to determine the fuse life remaining value further in response to one of: an adjusted maximum power rating for the motive electrical power path, an adjusted maximum power slew rate for the motive electrical power path, and/or an adjusted configuration of the current protection circuit (e.g., where the fuse status circuit 6219 has adjusted system parameters such as power throughput, fuse loading and/or bypass configurations or thresholds, and/or cooling strategies, the fuse status circuit 6219 may account for the estimated life extension of the fuse due to these or any other mitigating strategies in place).

Figure 63:
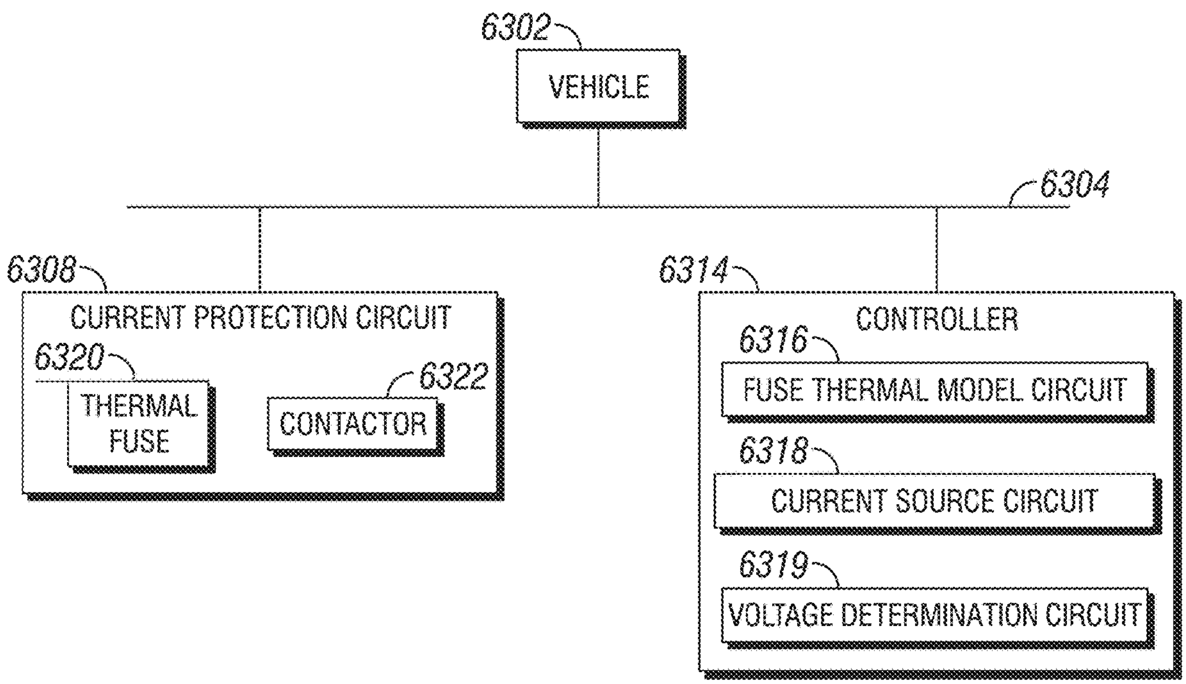
FIG. 63 depicts a schematic diagram of a vehicle having a current protection circuit.

Referencing FIG. 63, an example system includes a vehicle 6302 having a motive electrical power path 6304; a power distribution unit including a current protection circuit 6308 disposed in the motive electrical power path 6304, where the current protection circuit further includes a thermal fuse 6320 and a contactor 6322 in a series arrangement with the thermal fuse 6320. The example system further includes a controller 6314 having a fuse thermal model circuit 6316 structured to determine a fuse temperature value of the thermal fuse 6320, and to determine a fuse condition value in response to the fuse temperature value. An example system includes a current source circuit 6318 electrically coupled to the thermal fuse 6320 and structured to inject a current across the thermal fuse 6320; a voltage determination circuit 6319 electrically coupled to the thermal fuse 6320 and structured to determine at least one of an injected voltage amount and a thermal fuse impedance value, and where the voltage determination circuit 6319 includes a high pass filter having a cutoff frequency selected in response to a frequency of the injected current. An example fuse thermal model circuit 6316 further determines the fuse temperature value of the thermal fuse further in response to the at least one of the injected voltage amount and the thermal fuse impedance value. An example system includes where the fuse thermal model circuit 6316 is further structured to determine the fuse condition value by counting a number of thermal fuse temperature excursion events. Example thermal fuse temperature excursion events include: a temperature rise threshold value within a time threshold value, a temperature of the thermal fuse exceeding a threshold value, and/or more than one threshold of these (e.g., counting more severe occurrences as more than one temperature excursion event). An example system includes the fuse thermal model circuit is further determining the fuse condition value by integrating the fuse temperature value, integrating a temperature based index (e.g., based on temperatures and/or temperature change rates), and/or integrating the fuse temperature value for temperatures above a temperature threshold.

Figure 64:
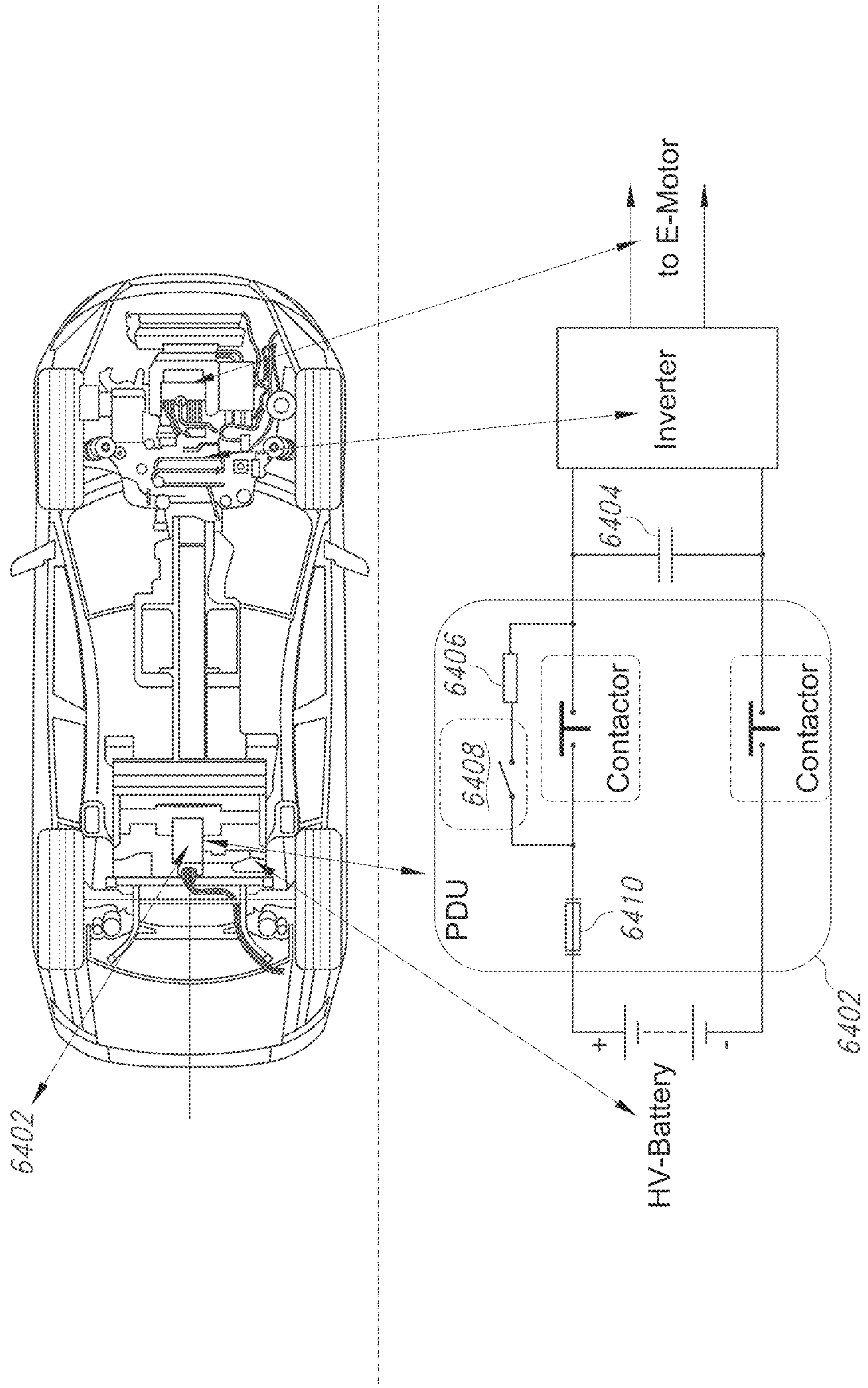
FIG. 64 depicts a schematic diagram of a vehicle having a PDU.

Referencing FIG. 64, an example previously known system is depicted having a contactor and fuse combination. The example system, for purposes of illustration, is provided as a part of a power distribution unit (PDU) 6402 for an electric or partially electric vehicle. The system includes electrical storage (e.g., a battery) and a motor providing motive power for the vehicle. The electrical storage (or power storage) device may be of any type, including a battery, a fuel cell, and/or a capacitor (e.g., a super-capacitor or a hyper-capacitor), and combinations of these (e.g., a capacitor included in the circuit to assist in peak power production or management of transient operations). In certain embodiments, the electrical storage device is rechargeable (e.g., any rechargeable battery technology such as lithium ion, nickel metal-hydride, or nickel-cadmium) or recoverable (e.g., a chemical based fuel cell having reversible chemistry to recover charge generating capability). In the example system, the battery operates as a DC device and the motor operates as an AC device, with an inverter positioned therebetween to condition power for the motor. The example system includes filter capacitors 6404 providing conditioning for the main power circuit. The example system includes a low side contactor and a high side contactor. The high side contactor is in series with a fuse 6410 providing overcurrent protection for the circuit. The example system further includes a pre-charge circuit, depicted as a pre-charge relay 6408 and a pre-charge resistor 6406. In certain embodiments, the pre-charge relay 6408 is engaged before the high side contactor is engaged, allowing capacitive elements of the overall circuit to energize through the pre-charge resistor 6406, limiting in-rush currents or other charge-up artifacts on system start-up. It can be seen that overcurrent protection is provided by the system through the fuse 6410, and the characteristics of the fuse 6410 set the overcurrent protection for the motive circuit through the PDU. Additionally, the contactors are exposed to connection and disconnection events, including arcing, heating, and other wear.

Figure 65:
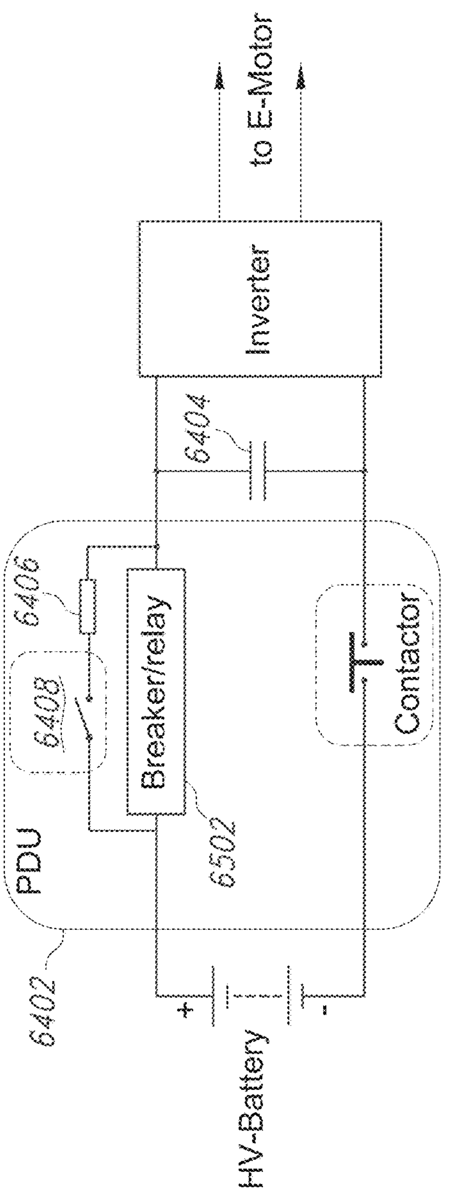
FIG. 65 depicts a schematic diagram of a breaker-relay and pre-charge relay.

Referencing FIG. 65, an example PDU 6402 of the present disclosure is schematically depicted. The example PDU 6402 is utilizable in a system such as that depicted in FIG. 64. The example PDU of FIG. 65 includes a breaker/relay 6502 component on the high side. The example arrangement of FIG. 65 is non-limiting, and any arrangement of the breaker/relay 6502 that provides designed overcurrent protection for a system using any of the principles described throughout the present disclosure is contemplated herein. The example PDU 6402 of FIG. 65 omits a fuse in series with a contactor, utilizing the breaker/relay 6502 for overcurrent protection. Any breaker/relay 6502 as described throughout the present disclosure may be utilized in a system such as that depicted in FIG. 65. The PDU 6402 of FIG. 65 additionally utilizes a pre-charge relay 6408 and a pre-charge resistor 6406, similar to that depicted in FIG. 64. In the example of FIG. 65, the breaker/relay 6502 is in parallel with the pre-charge circuit, and the relay portion of the breaker/relay 6502 may be engaged after the system has charged through the pre-charge circuit. As described throughout the present document, the breaker/relay 6502 provides for continuous and selectable overcurrent protection, while providing for full rated operation throughout range of designed operating current for the system. In previously known systems, a contactor/fuse arrangement necessarily provides for a gap in the operating range, either pushing fuse activation at least partially down into the operating current range, or moving fuse activation away from the rated range and providing for a gap in overcurrent protection above the rated current for the system. Additionally, as described throughout the present disclosure, the breaker/relay 6502 can provide for multiple current protection regimes, selectable current protection based on operating conditions, and provides for reduced wear on the contact elements of the breaker/relay relative to previously known contactors. Accordingly, a system such as that depicted in FIG. 65 can provide reliable, responsive, and recoverable overcurrent protection relative to previously known systems.

Figure 66:
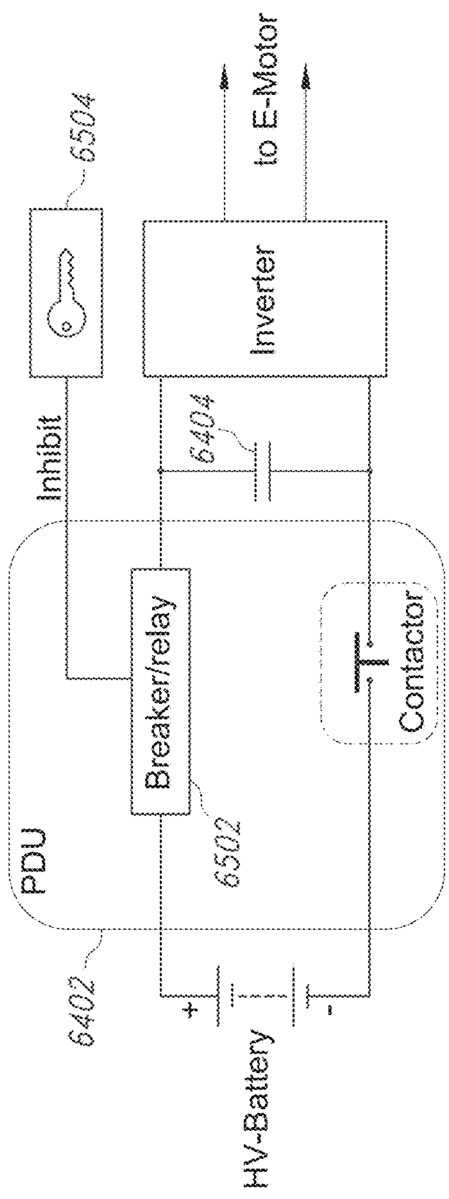
FIG. 66 depicts a schematic diagram of a breaker-relay and inhibit.

Referencing FIG. 66, an example PDU 6402 is schematically depicted. The example PDU 6402 is utilizable in a system such as that depicted in FIG. 1, and has features that may be additional to or alternative to features described with regard to FIG. 65. The example of FIG. 66 depicts an external input to the breaker/relay 6502 (Inhibit, with a schematic depiction of a keyswitch input 6504, in the example). The breaker/relay 6502 is responsive to the external signal in a configurable manner. For example, a keyswitch ON operation may be utilized to energize the breaker/relay 6502—either directly (e.g., hard-wiring the keyswitch circuit through a coil of the breaker/relay) or indirectly (e.g., receiving a network value representing the keyswitch position, receiving a voltage signal representing the keyswitch position, etc.), thereby charging the motive power circuit. In another example, a keyswitch OFF operation may be utilized to de-energize the breaker/relay 6502, thereby removing power from the motive power circuit. The external signal may be of any type or of several types, including external commands generated from any portion of the system, calculated values indicating whether power should be supplied or cut (e.g., a service event, a maintenance event, an accident indicator, an emergency shutdown command, a vehicle controller request, a device protection request for some device on the vehicle, a calculation that a temperature, voltage value, or current value has exceeded a threshold, etc.). The external signal may be supplied as a hard-wired signal (e.g., an electrical connection with a voltage representing the signal value), and/or as a communication (e.g., a datalink or network communication) which may be a wired or wireless communication, and may be generated by a controller on the PDU 6402 or external to the PDU 6402 (e.g., a vehicle controller, a power management controller, or the like). The example of FIG. 66 does not depict a pre-charge circuit for convenience of illustration, but embodiments such as those depicted in FIG. 65 or FIG. 66 may have a pre-charge circuit or omit a pre-charge circuit depending upon the characteristics of the system, the design goals and requirements for the system, and the like.

Figure 67:
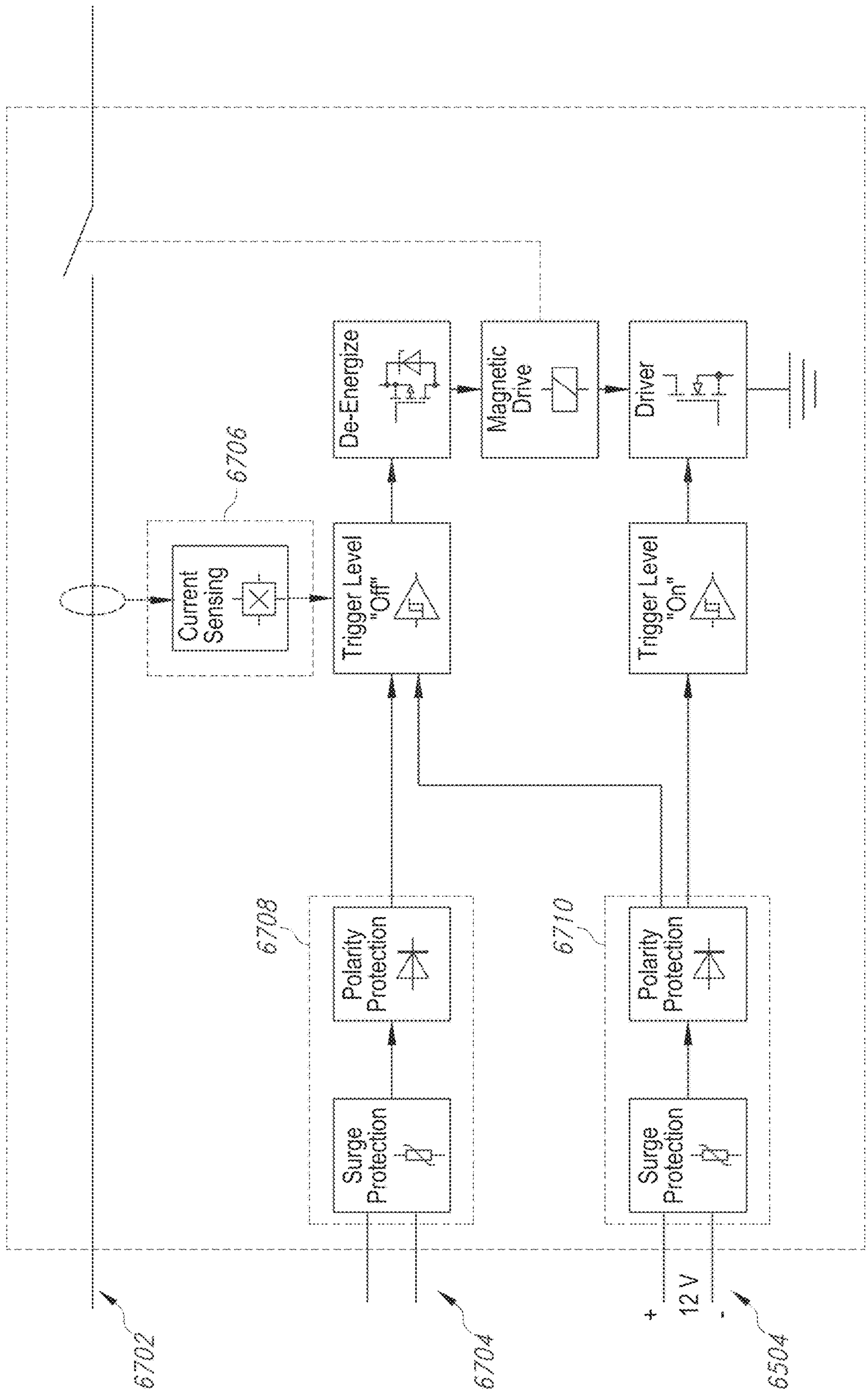
FIG. 67 depicts a schematic diagram of a power bus protection configuration.

Referencing FIG. 67, an example schematic block diagram of a breaker/relay is depicted. The example breaker/relay of FIG. 67 includes a power bus 6702 (e.g., the high voltage, motive power, load power, etc.) that operates the high voltage throughput and is connected or disconnected through a contact which is schematically depicted. A voltage that is a "high voltage" on the power bus may be any value, and depends upon the load being driven and other selection parameters for the system. In certain embodiments, a high voltage is any voltage above 42V, above 72V, above 110V, above 220V, above 300V, and/or above 360V. The voltage range may be different for a motive power load versus an auxiliary load (e.g., a PTO device, pump, or the like) and may be higher or lower than these ranges. In the example, the standard on/off 6504 or control voltage is depicted on the left side (depicted as 12 V, although any value such as 6 V, 12 V, 24 V, 42 V may be utilized). The standard voltage 6504 is depicted for purposes of illustration, although the standard voltage may additionally or alternatively be a datalink or network input (e.g., where the breaker/relay has independent access to control power) in communication with a controller of the breaker/relay. In certain embodiments, the standard voltage 6504 will be the same voltage as experienced at the keyswitch, by a vehicle controller, by auxiliary (e.g., not-motive or non-load) components in a system, or the like. In certain embodiments, the standard voltage 6504 will be the keyswitch 6504 signal. The standard voltage 6504 may be configured to be received through an input control isolation 6710.

Further in the example of FIG. 67, an auxiliary off isolation 6708 is depicted, which provides an input for auxiliary control of the breaker/relay. In certain embodiments, the auxiliary off isolation 6708 is coupled to an electrical input 6704, such as a selectable input at the standard voltage, an output from a controller (e.g., the controller providing electrical power as an output at a selected voltage to the auxiliary off isolation). In certain embodiments, the auxiliary off isolation 6708 may utilize a datalink or network input. In certain embodiments, for example where the breaker/relay has an internal controller, the standard on/off 6504 and the auxiliary off isolation input 6704 may be the same physical input—for example where a datalink input, network input, and/or controllable electrical signal (e.g., a controlled voltage value) provide the breaker/relay with information to determine the current requested state of the breaker/relay. In certain embodiments, the breaker/relay is a hardware only device that accepts a first voltage value at the standard on/off position, a second voltage value at the auxiliary off position, and responds through the hardware configuration of the breaker/relay to perform selected operations.

In the example of FIG. 67, the standard on/off input 6504 and the auxiliary off input 6704 include circuit protection components (e.g. isolations 6708, 6710), such as surge protection and polarity protection. The example breaker/relay includes a logic circuit that provides for energizing the relay (closing the contact on the power bus) when the standard on/off input 6504 is high, and de-energizing the relay (opening the contact on the power bus) when either the standard on/off input 6504 is low or the auxiliary off input is low 6704. In the example of FIG. 67, the logic circuit is depicted schematically, and may be implemented as hardware elements in the breaker/relay. Additionally or alternatively, a controller in the breaker/relay may interpret input voltages, datalink signals, and/or network communications to implement the logic and determine whether to open or close the relay. The logic in the present system is depicted as a "normally-open" relay that utilizes power to close (make contact), although the breaker/relay may be configured as a "normally-closed", latching, or any other logical configuration. Additionally or alternatively, the standard on/off inputs 6504 and/or the auxiliary off inputs 6704 may utilize logical highs or logical lows to implement operations of the breaker/relay.

The example breaker/relay of FIG. 67 additionally depicts a current sensing device 6706 ("current sensing") which may be a current sensor on the bus, a calculated current value based on other system parameters, a current value passed to the breaker/relay and/or a controller operatively coupled to the breaker/relay, or any other device, mechanism, or method to determine current values on the bus. In the example of FIG. 67, the current sensing device 6706 is coupled to the "trigger level 'off'" portion of the logical circuit, and operates to de-energize the relay when a high current value is sensed. The sensed high current value may be either a single threshold, for example as determined by the hardware in the logic circuit, and/or a selectable threshold, for example determined by a controller based on operating conditions or other values in the system. It can be seen that, either through hardware or utilizing a controller, functions of the sensed current value such as a rate of change, accumulated current value over a threshold, etc. may be utilized additionally or alternatively to the single sensed current value. It can be seen that a breaker/relay such as that depicted in FIG. 67 provides for controllable opening of the power bus circuit at a selected threshold current value and/or functions thereof, allowing for continuous operation throughout the range of rated current for the system. Additionally, a breaker/relay such as that depicted in FIG. 67 provides for a controllable disconnection of the power bus for any selected parameter which may not be current related, such as emergency shutdown operations, a request from somewhere else in the system (e.g., a vehicle controller), service or maintenance operations, or any other selected reason. Certain embodiments throughout the present disclosure provide for additional features of the breaker/relay, any one or more of which may be included in an embodiment such as that depicted in FIG. 67.

Figure 68:
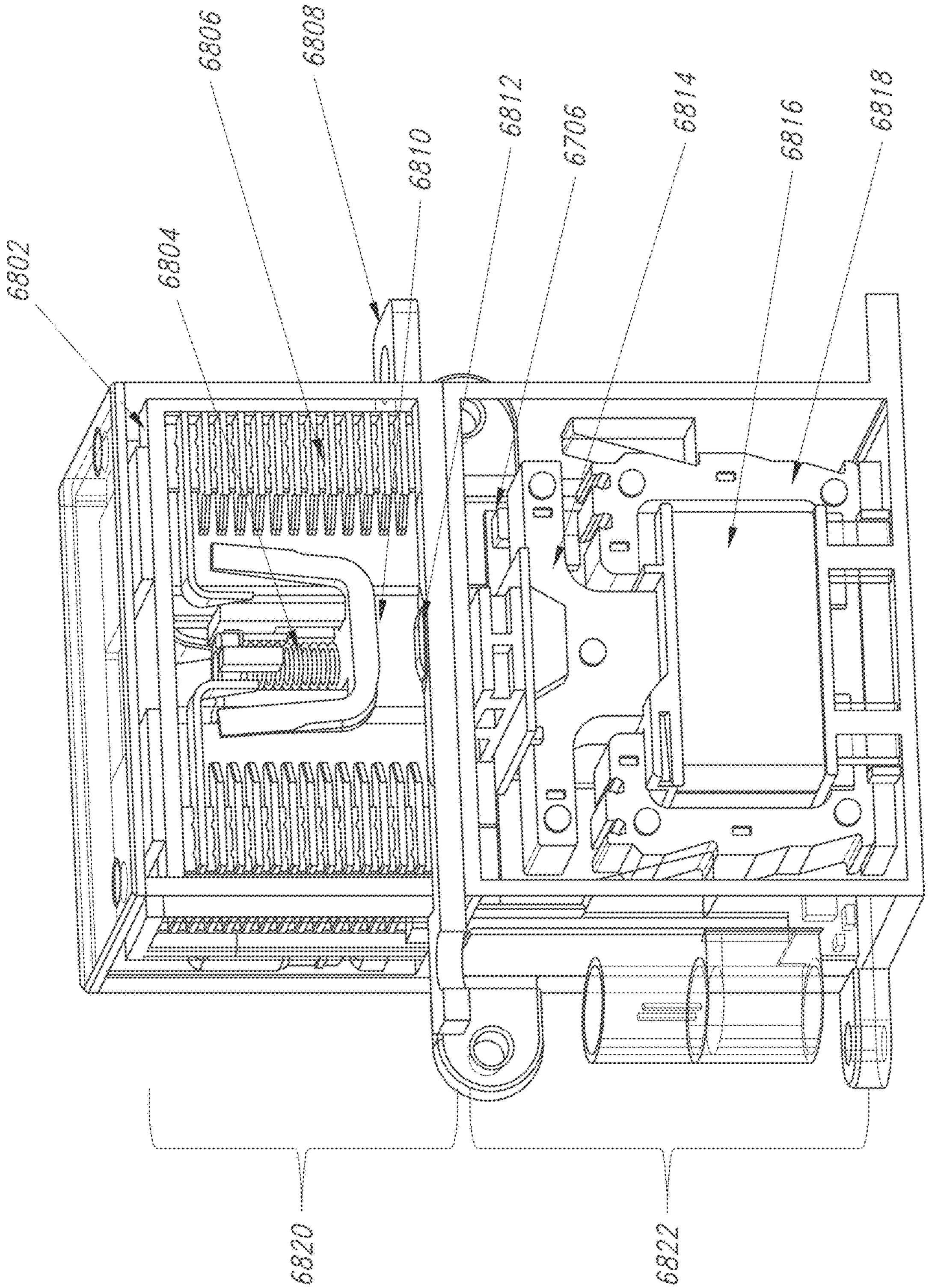
FIG. 68 depicts an embodiment detail of a breaker-relay component.

Referencing FIG. 68, an example breaker/relay is depicted schematically in a cutaway view. The example breaker/relay includes generally a switching portion 6820 (upper half, or "breaker") and an actuating portion 6822 (lower half, or "relay"). A few example components of the breaker/relay are depicted and described for illustration. The example breaker/relay includes a coil 6816 and magnet core 6818 in the relay portion. In the example, energizing the coil 6816 actuates the relay, pulling the armature 6814 down to the magnet core 6818. The armature 6814 is coupled to the movable contact 6810 in the upper portion, and is thereby moved into contact with the fixed contact 6812, completing the circuit and allowing current flow through the power bus. In the example of FIG. 68, the movable contact 6810 is pressed into the fixed contact 6812 by a contact force, which is a biasing spring 6804 of a selectable biasing force in the example of FIG. 68. The movable contact 6810 can be lifted from the fixed contact 6812 with sufficient force, compressing the contact force spring 6804, even if the armature 6814 is in the engaged (lower) position. The example of FIG. 68 depicts the armature 6814 in the disengaged (upper) position, where the movable contact 6810 is open or not in contact with the fixed contact 6812.

The breaker portion 6820 of the breaker/relay includes a number of splitter plates 6806 in proximity to a body of the main contact, and a permanent magnet system 6802 surrounding the splitter plates 6806 and/or the arcing path between the contact gap and the splitter plates 6806. During engagement or disengagement of the movable contact 6810 when the power bus is energized, the body of the main contact cooperates with the splitter plates 6806, in the presence of the magnetic fields provided by the permanent magnet system 6802, to dissipate and distribute the resulting arc, greatly reducing wear, degradation, and damage of the contacts. It has been shown that the combined aspects of the breaker portion greatly extend the life of the contacts and the switching chamber (e.g., due to lower arcing heat load over the life of the breaker/relay).

The current passing through the power bus generates a repulsive force between the contacts, or a Lorentz force. The Lorentz force is a complex function of the contact area of the contacts and the current value through the power bus. When the current is very high, the Lorentz force between the contacts sufficiently compresses the contact force spring 6804 to force the movable contact 6810 to lift off of the fixed contact 6812 and cause the relay to momentarily open. It has been found that the contact force spring 6804 can be readily tuned to provide for a physical disconnect of the contacts at a selectable value. Additionally or alternatively, the contact area between the contacts and other geometric aspects of the contacts can be manipulated to select or adjust the physical disconnect current. However, in certain embodiments, selection of the contact force spring 6804 provides for a straightforward tuning of the physical disconnect current. In certain embodiments, selection of the contact force spring 6804 includes changing the spring to change the physical disconnect current. Additionally or alternatively, the contact force spring 6804 can be adjusted in situ (e.g., compressing or releasing the spring axially) to adjust the physical disconnect current.

In certain embodiments, after the physical disconnect event (e.g., the movable contact 6810 is forced away from the fixed contact 6812, compressing the contact force spring 6812, while the armature 6814 is in the lower or contact position), the current through the power bus falls rapidly, and the Lorentz force decreases, causing the movable contact 6810 to be pushed by the contact force spring 6804 back toward an engaged position. In certain embodiments, the current sensor 6706 will have detected the high current event, triggering the coil 6816 to de-energize, and moving the armature 6814 back up to the disengaged position. Accordingly, as the movable contact 6810 returns to the engaged position, the armature 6814 has already moved it away such that the movable contact 6810 does not touch the fixed contact 6812 after a physical disconnect event. In certain embodiments, the threshold detected by the current sensor 6706 to disengage the armature 6814 is lower than the physical disconnect current, giving the armature 6814 a "head start" and decreasing the likelihood of a re-contact of the movable contact 6810 with the fixed contact 6812. In many systems, a re-contact between the movable contact 6810 and the fixed contact 6812 during a very high current event can result in significant damage to the breaker/relay and/or welding of the contacts.

Figure 69:
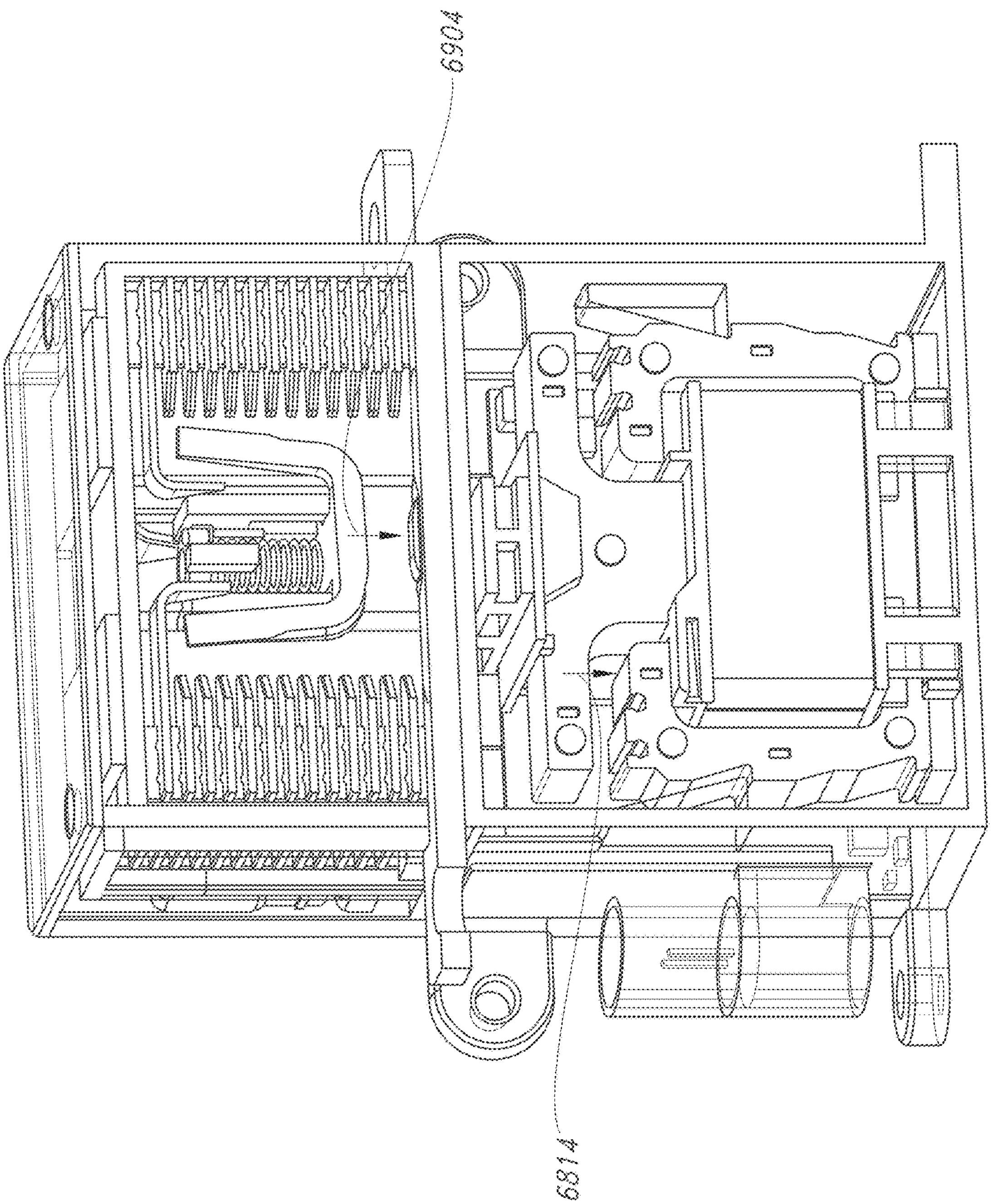
FIG. 69 depicts an embodiment detail of a breaker-relay component.

Referencing FIG. 69, an example breaker/relay is depicted showing the relative movement of the armature and the movable contact. In the example, the armature at the top enforces the movable contact away from the fixed contact, resulting in a disconnection of the power bus. The armature at the bottom pulls the moving contact down to engage the fixed contact, resulting in a connection of the power bus. The motion arrow 6904 in FIG. 69 references the movement of the armature that will occur as the armature moves from the open state to the closed state after the coil is energized. Any reference throughout the disclosure to "up" or "down" are for clarity of description, and do not reference actual vertical relationships of any components of the breaker/relay. A breaker/relay may be positioned such that movement of the armature is along any axis, including up-down, down-up, a horizontal orientation, and/or any other orientation. In certain embodiments, the armature returns to the up or disengaged position utilizing a passive element, such as a biasing spring or reverse spring (e.g., positioned between the armature and the permanent magnet, and/or a housing of one or more of these), resulting in a "normally-open" logical operation for the breaker/relay. The biasing spring or reverse spring does not appear in the schematic cutaway view of FIG. 69. As described throughout the present disclosure, the breaker/relay may be normally-open, normally-closed, latching, or in any other logical configuration, with appropriate adjustments to the hardware and/or control elements to provide such a configuration.

Figure 69A:
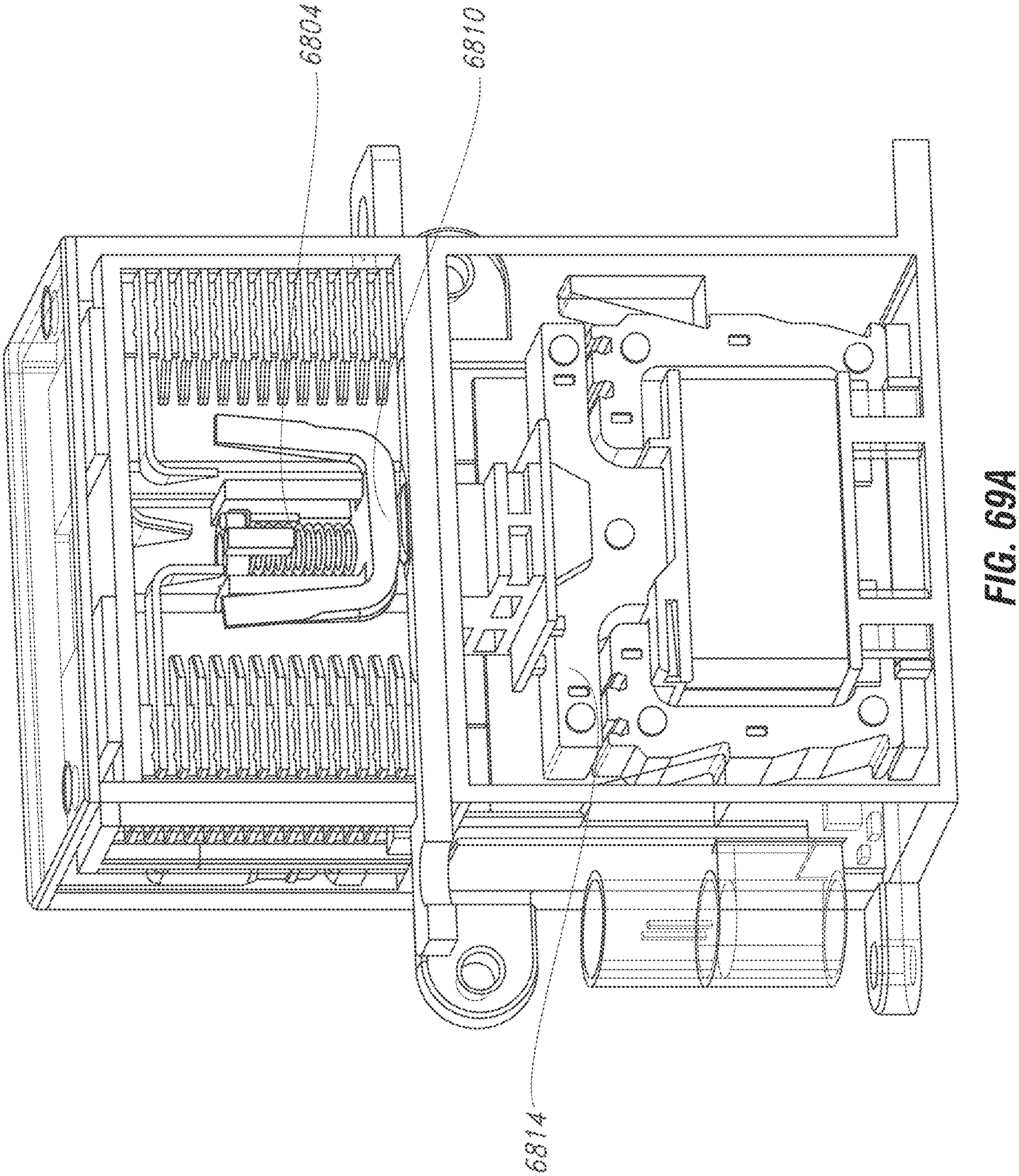
FIG. 69A depicts an embodiment detail of a breaker-relay component.

Referencing FIG. 69A, an example breaker/relay is depicted in a closed position. The armature in the example of FIG. 69A has moved down, and the movable contact 6810 has additionally moved down with the armature 6814 to an engaged position with the fixed contact, closing the circuit and allowing power to pass through the power bus. The contact force spring 6804 in the position depicted in FIG. 69A is compressed, providing a contact force to the movable contact 6810 against the fixed contact. It can be seen that the movable contact is provided with movement space, where a force sufficient to overcome the contact force 6804 spring can lift the movable contact 6810 off of the fixed contact, thereby opening the circuit and preventing power to pass through the power bus.

Figure 70:
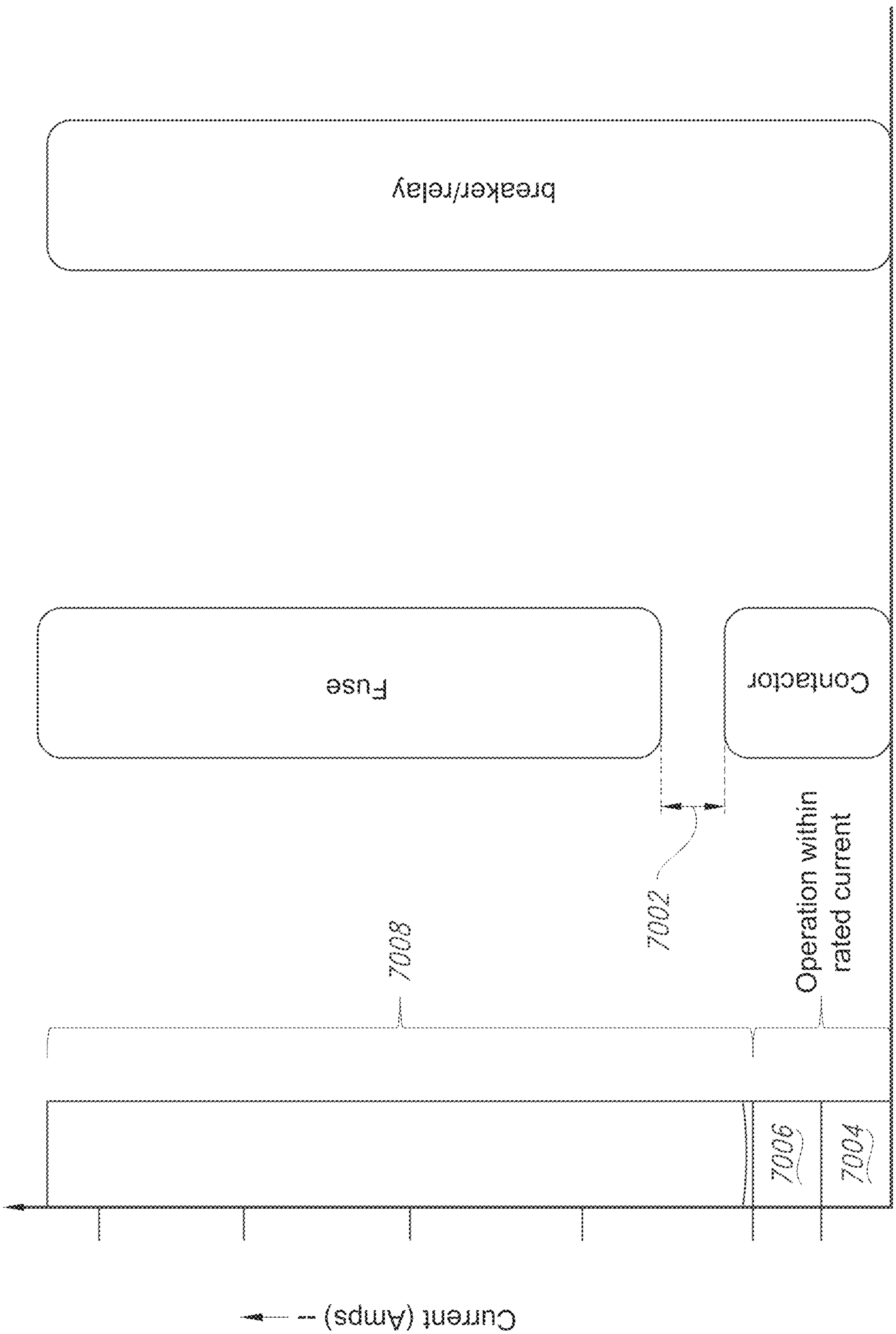
FIG. 70 depicts a current plot for a contactor-fuse and breaker-relay.

Referencing FIG. 70, an operating diagram for a previously known contactor-fuse system and a breaker/relay system consistent with embodiments of the present disclosure are depicted schematically. In the example of FIG. 70, an operating current bar is depicted at the left, having two general operating regimes—operation within rated current values (e.g., within designed current limits for a system, such as regions 7004, 7006) and operation above rated current values (e.g., region 7008). Additionally, in the example of FIG. 70, operations within the rated current are sub-divided into a lower region 7004 and an upper region 7006. In the example of FIG. 70, the lower region 7004 and upper region 7006 are illustrative examples to depict operating modes within the rated current region—for example the lower region 7004 may be associated with lower power operation such as operation of accessories and the upper region 7006 may be associated with higher power operation such as provision of motive power or pumping power. The regions 7004, 7006 provide for a notional distinction between operating conditions, and the actual operations that occur within the lower region 7004 and upper region 7006 are not important for the illustration of FIG. 70. For example, an upper region 7006 for one illustrative system may be motive power to move a vehicle (e.g., where the lower region 7004 is another function such as power to communications or accessories), where a lower region 7004 for another illustrative system may be motive power to move a vehicle (e.g., where the upper region 7006 is another function such as charging or high performance motive power).

In the example of FIG. 70, an operation region for the contactor-fuse system is depicted in the middle. The contactor provides for full operation up to the rated power. A design choice may allow for the contactor to provide operation slightly above rated power (e.g., where system risk is accepted to provide higher capability) or slightly below rated power (e.g., where system performance is compromised to protect the system components). The contactor-fuse system further includes an operating region for the fuse, where the fuse activates at a selected current value. It can be seen that an operational gap 7002 occurs, where the fuse does not activate due to the low current value, but the contactor also does not support operations in the gap 7002 region. The gap 7002 can only be closed by overlapping operation of the contactor and/or the fuse, necessarily compromising the system risk profile or performance. If the fuse region is extended lower, then rated operation under certain duty cycles may trigger a fuse event and loss of mission. Additionally, as the contactor and fuse experience wear or degradation, the operating region for the contactor-fuse system will move, resulting in inconsistent system performance, loss of protection, and/or unnecessary fuse events. Additionally, the failure mode of a fuse results in extended exposure of the system to high currents due to the fuse melt period and extended arcing time through the activating fuse. Finally, operations of the contactor at the upper range of the contactor operating region results in undesirable heating and degradation of the contactor.

In the example of FIG. 70, an operating region for a breaker/relay consistent with certain embodiments of the present disclosure is depicted. The breaker/relay provides for a smooth and selectable functionality throughout the operating current bar. The breaker/relay provides for a highly capable contact that does not operate near the upper region of its current capacity, reducing heating and degradation from high, within rated range, operations, such as in the upper region 7006. Additionally, the current sensor and related disconnect operations allow for a selectable disconnection when operation is above the rated current for the system. Further, a physical disconnect current is available (e.g., reference FIG. 68 and the associated disclosure) that provides for immediate disconnection of the power bus at very high current values. In certain embodiments, arc dissipation features of the breaker/relay additionally provide for a faster and less damaging disconnect event than experienced by previously known contactor-fuse arrangements. Additionally, the breaker/relay provides for a recoverable disconnect operation, where a mere command to the breaker/relay will again provide connection without a service event. Accordingly, if the system failure causing the high current event is resolved or consistent with a restart, the system can resume operations with the breaker/relay as soon as desired, without having to diagnose a fuse event or change out the fuse.

Figure 71:
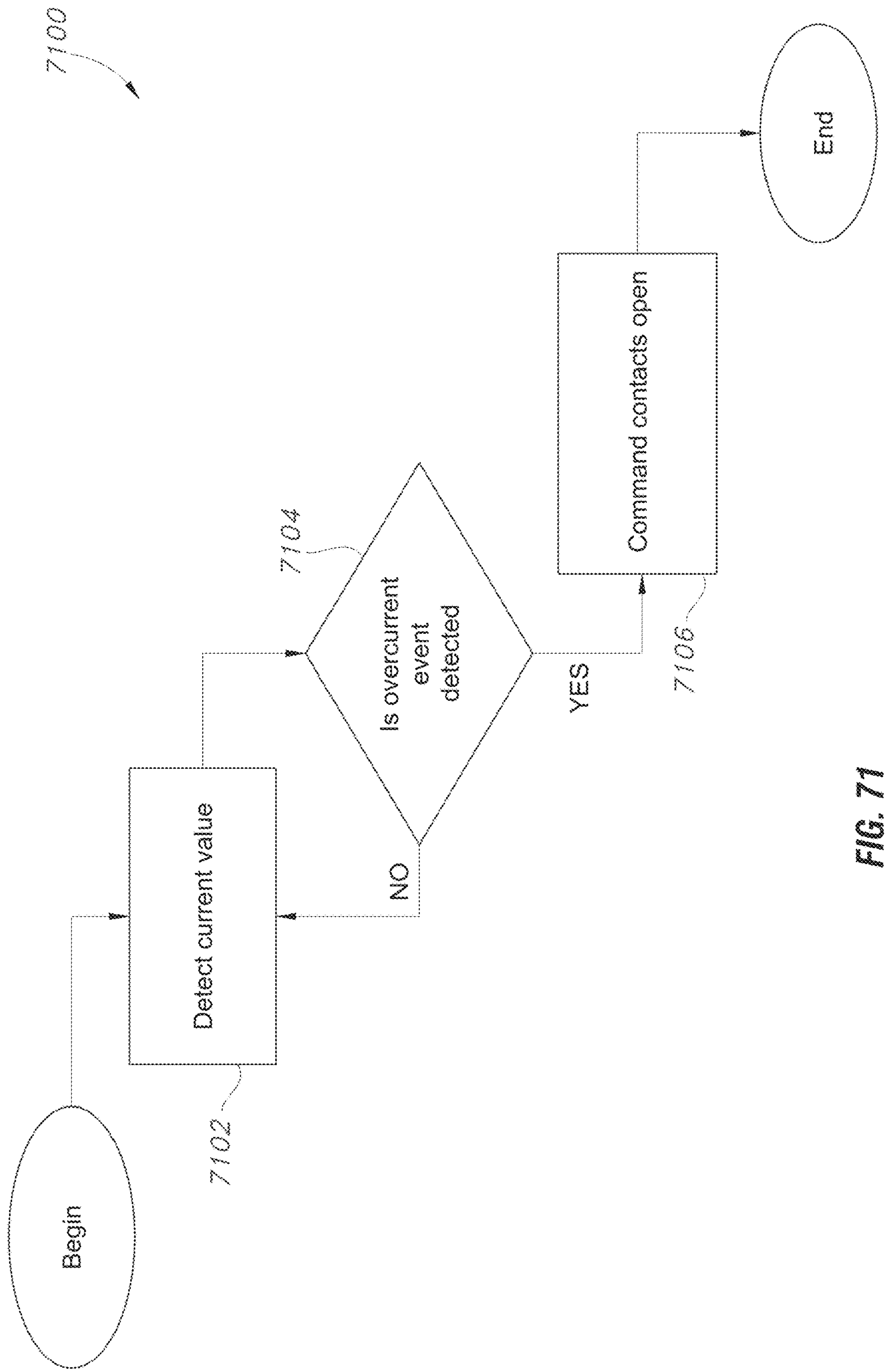
FIG. 71 depicts an embodiment flow diagram for current protection.

Referencing FIG. 71, an example procedure 7100 is depicted to disconnect a power bus. The example procedure 7100 includes an operation 7102 to detect a current value, for example utilizing a current sensor (reference FIG. 68). The procedure 7100 further includes an operation 7104 to determine if an overcurrent event is detected. For example, the detected current value, a function thereof, or a calculated parameter determined in response to the current value, can be compared to a threshold value to determine if an overcurrent event is detected. The example procedure 7100 further includes an operation 7106 to command the contacts open, for example by de-energizing a coil and thereby moving an armature to a position that opens the contacts. The overcurrent threshold may be any value, and may be modified in real-time and/or in accordance with operating conditions. The value for the overcurrent threshold depends upon the application and the components in the system. Example and non-limiting overcurrent values include 100 A, 200 A, 400 A, 1 kA (1,000 amps), 1.5 kA, 3 kA, and 6 kA.

Figure 72:
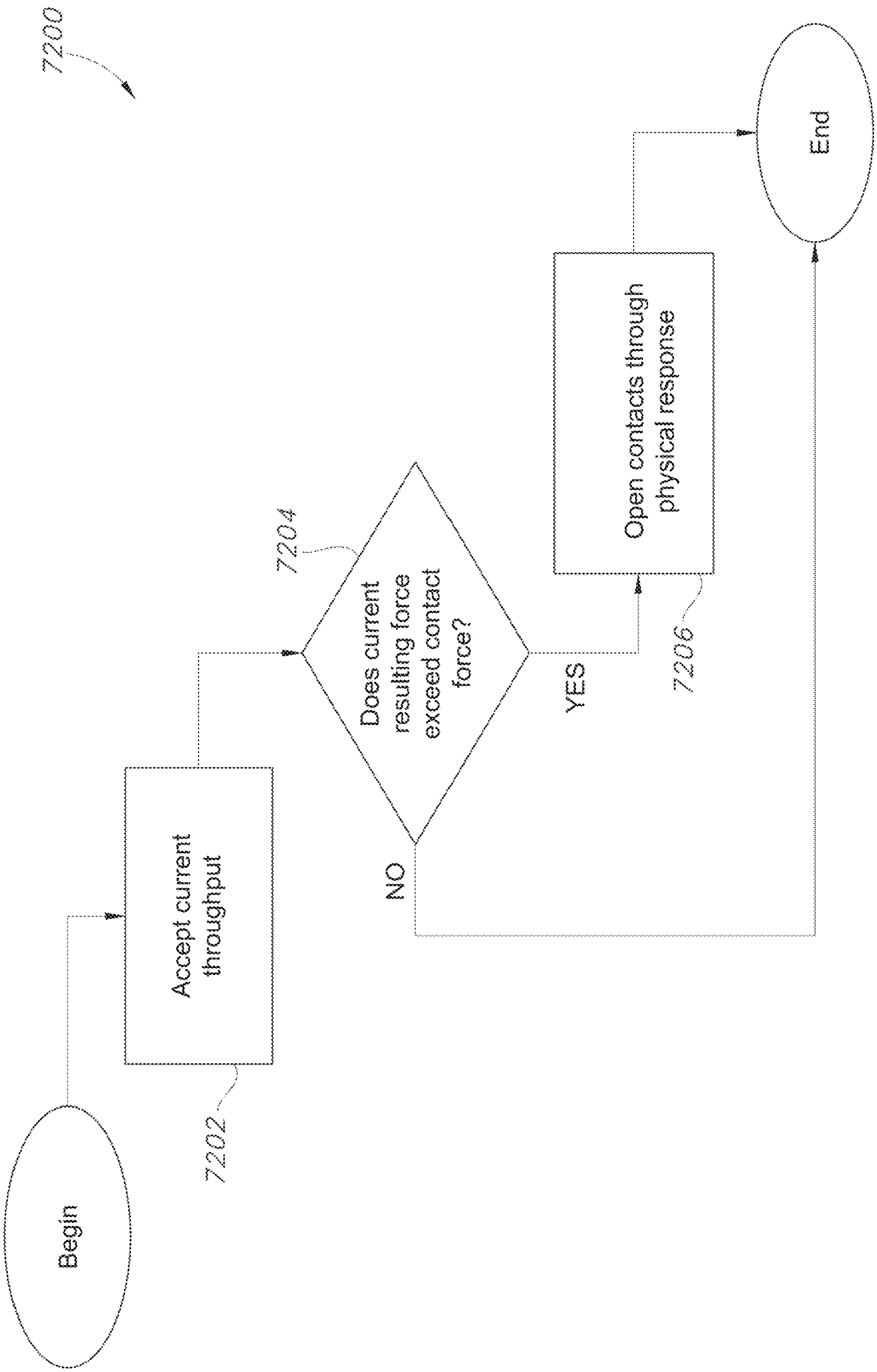
FIG. 72 depicts an embodiment flow diagram for current protection.

Referencing FIG. 72, an example procedure 7200 is depicted to perform a physical disconnect. The example procedure 7200 includes an operation 7202 to accept current throughput, for example as current passing through coupled contacts in a power bus. The example procedure 7200 further includes an operation 7204 to determine whether the current resulting force (e.g., a Lorentz force between a movable contact and a fixed contact) exceeds a contact force (e.g., as provide by a contact force spring). The example procedure 7200 further includes an operation 7206 to open the contacts through a physical response—for example as the Lorentz force overcoming the contact force spring and moving the movable contact away from the fixed contact. The physical disconnect current may be any value, and depends upon the application and the components in the system. Example and non-limiting physical disconnect currents include 400 A, 1 kA, 2 kA, 4.5 kA, 9 kA, and 20 kA.

Figure 73:
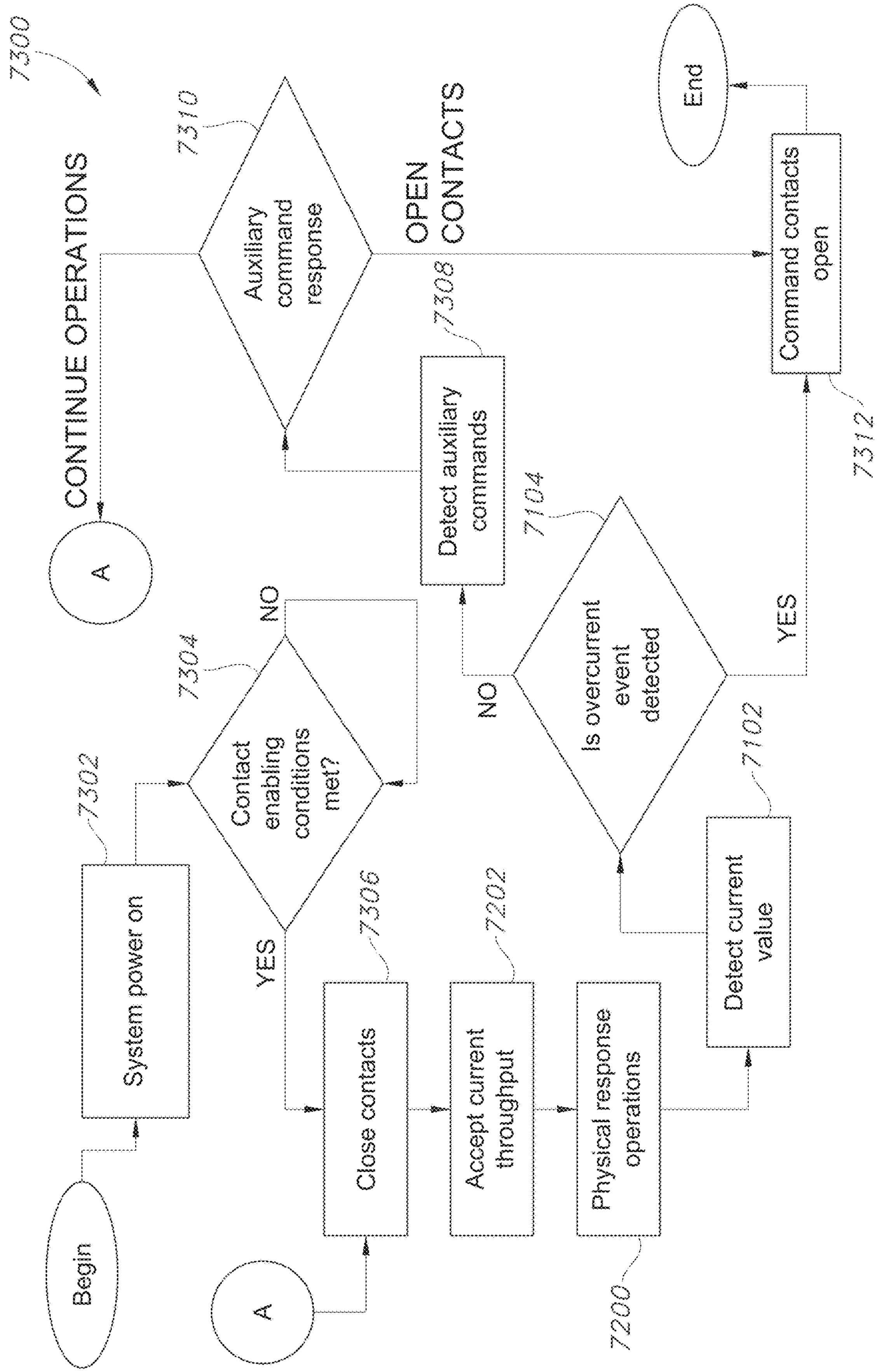
FIG. 73 depicts an embodiment flow diagram for current protection.

Referencing FIG. 73, an example procedure 7300 is depicted to open contacts in response to an overcurrent event, and/or in response to any other selected parameters. The example procedure 7300 includes an operation 7302 to power a system on, for example via a keyswitch or other circuit, and/or via recognition of a keyswitch ON condition. The procedure 7300 further includes an operation 7304 to determine whether contact enabling conditions are met, for example immediately after the keyswitch ON, after a selected time period, after a system pre-charge event is determined to be completed, and/or according to any other selected conditions. In certain embodiments, where the operation 7304 determines that contact enabling conditions are not met, the procedure 7300 holds on operation 7304 until contact enabling conditions are met. Any other response to operation 7304 determining that contact enabling conditions are not met is contemplated herein, including requesting a permission to enable contact conditions, setting a fault code, or the like. In response to operation 7304 determining that contact conditions are met, procedure 7300 further includes an operation 7306 to close the contacts (e.g., energizing a coil to move an armature), and an operation 7202 to accept current throughput. The example procedure 7300 further includes operation 7200 performing a physical disconnect if the accepted current is high enough, and proceeds to operation 7102 to detect a current value through the power bus. The procedure 7300 further includes an operation 7104 to determine if an overcurrent event is detected (operation 7104, in certain embodiments, may be set at a lower current value than the physical disconnect current tested at operation 7200). In response to the operation 7104 determining that an overcurrent event is detected, procedure 7300 includes an operation 7312 to command the contacts open. In response to operation 7104 determining that an overcurrent event is not detected, procedure 7300 includes an operation 7308 to detect auxiliary commands (e.g., an auxiliary off input), and an operation 7310 to determine if an auxiliary command is present to open the contacts (e.g., a logical high, logical low, specified value, lack of a specified value, etc.). In response to the operation 7310 determining that an auxiliary command is present to open the contacts, procedure 7300 includes the operation 7312 to command the contacts open. In response to the operation 7310 determining that an auxiliary command is not present to open the contacts (e.g., branch "CONTINUE OPERATIONS" in the example of FIG. 73) procedure returns to operation 7306.

Figure 74:
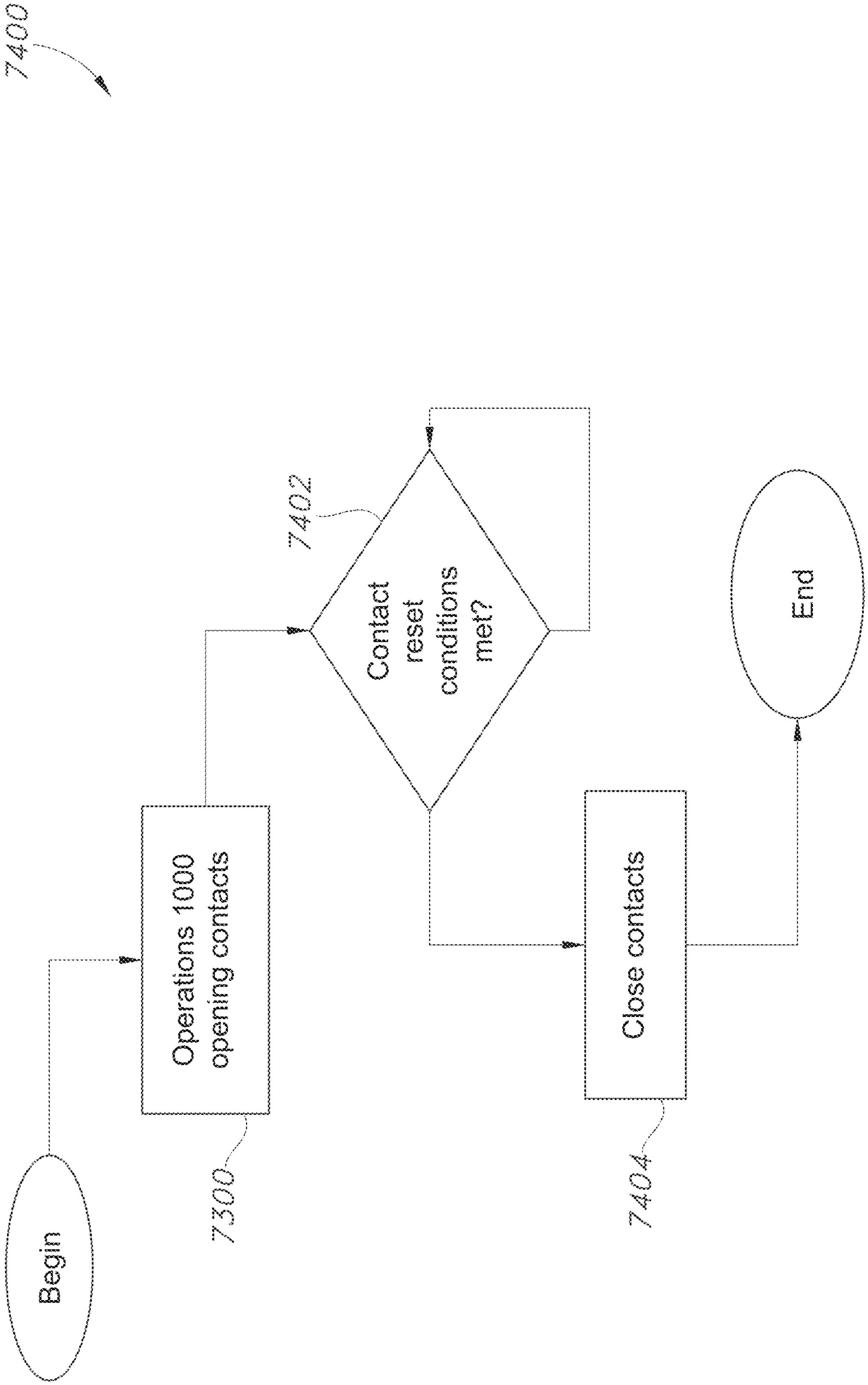
FIG. 74 depicts an embodiment flow diagram for current protection.

Referencing FIG. 74, an example procedure 7400 to restore operations of a breaker/relay after a contact opening event. The example procedure 7400 includes an operation 7300 to open the contacts of the breaker/relay, for example an operation wherein the contacts are opened due to a physical disconnect, an overcurrent detection, and/or an auxiliary off command. The procedure 7400 further includes an operation 7402 to determine if contact reset conditions are present. Example and non-limiting operations 7402 include determining that contact enabling conditions are met, determining that a fault code value has been reset, determining that a system controller is requesting a contact reset, and/or any other contact reset conditions. The procedure 7400 further includes an operation 7404 to close the contacts, for example by providing power to the coil to move the armature.

Figure 75:
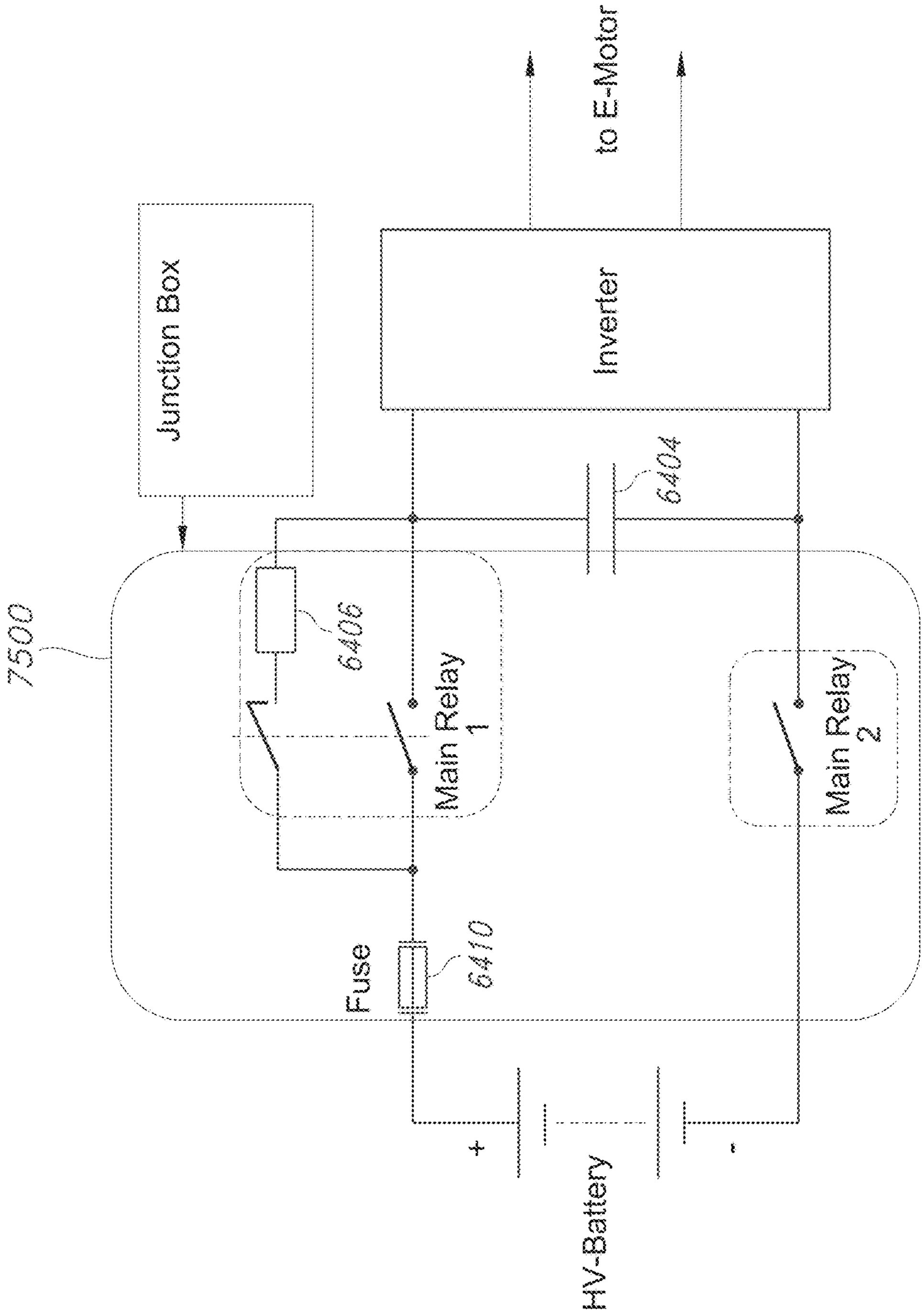
FIG. 75 depicts a schematic diagram of a power protection configuration between a battery and an inverter.

Referencing FIG. 75, an example previously known mobile power circuit is depicted. The example mobile power circuit is similar to the mobile power circuit depicted in FIG. 64. The example of FIG. 75 includes a junction box housing the pre-charge circuit, a high side relay, and a low side relay. In certain embodiments, the pre-charge circuit and the high side relay are provided in a housing within the junction box. In the example of FIG. 75, a fuse 6410 provides overcurrent protection on the high side, and is housed with the main relays and the precharge resistor 6406 within a PDU housing 7500.

Figure 76:
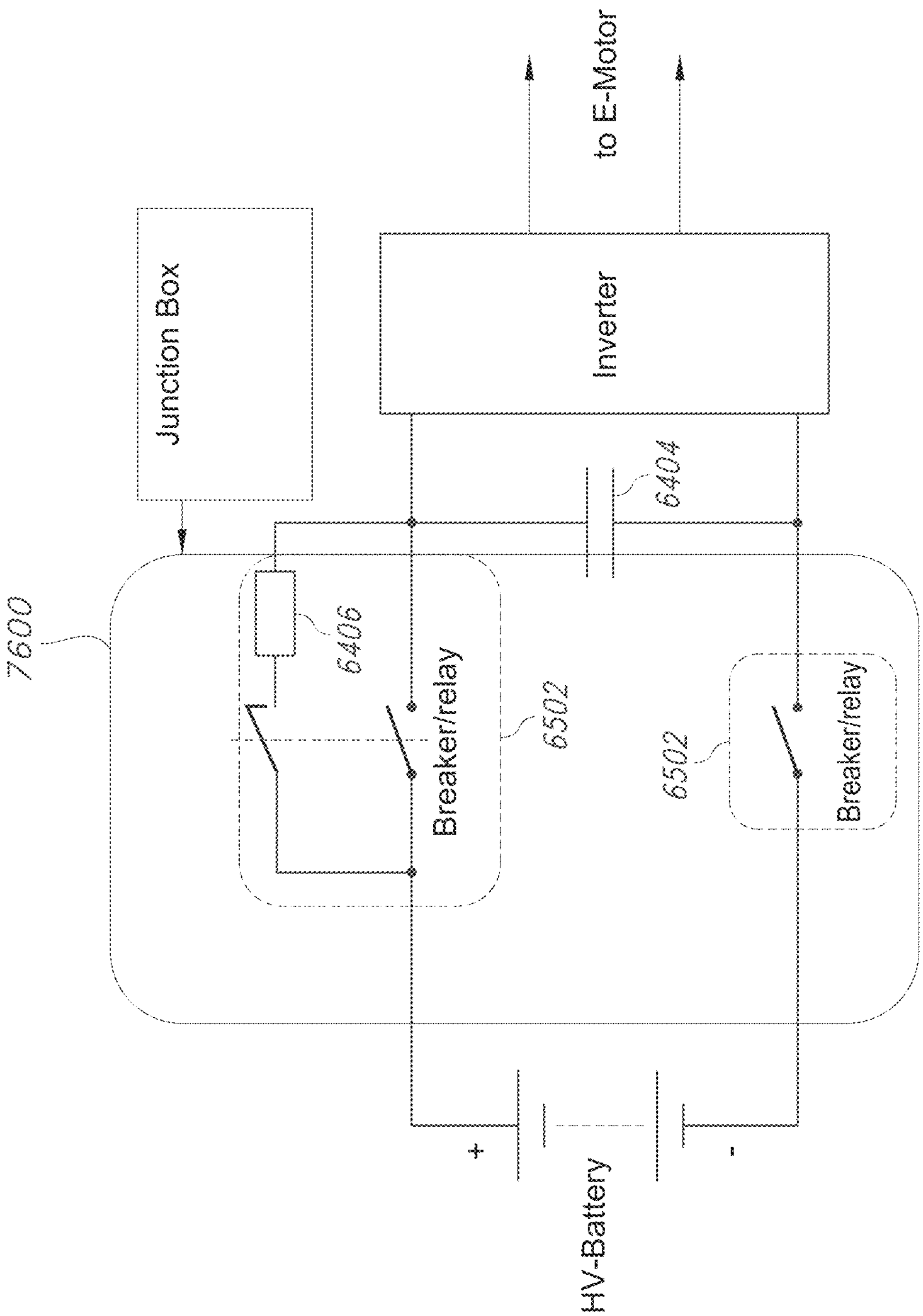
FIG. 76 depicts a schematic diagram of a power protection configuration between a battery and an inverter.

Referencing FIG. 76, an example mobile power circuit including a breaker/relay 6502 disposed in the high side circuit, and a second breaker/relay 6502 positioned in the low side circuit. Each breaker/relay 6502, in certain embodiments, provides continuous overcurrent control throughout the operating region of the mobile application as described throughout the present disclosure. Additionally, it can be seen that the low side breaker/relay 6502 provides for overcurrent protection in all operating conditions, including during a pre-charge operation when the high side breaker/relay 6502 may be bypassed so the mobile power circuit can pre-charge through the pre-charge resistor 6406. In certain embodiments, both the high side breaker/relay 6502 and the low side breaker/relay 6502 provide additional benefits such as rapid arc dispersion, low wear during connection and disconnection events, and improved heating characteristics during high, but in rated range, current operation of the mobile circuit.

Figure 77:
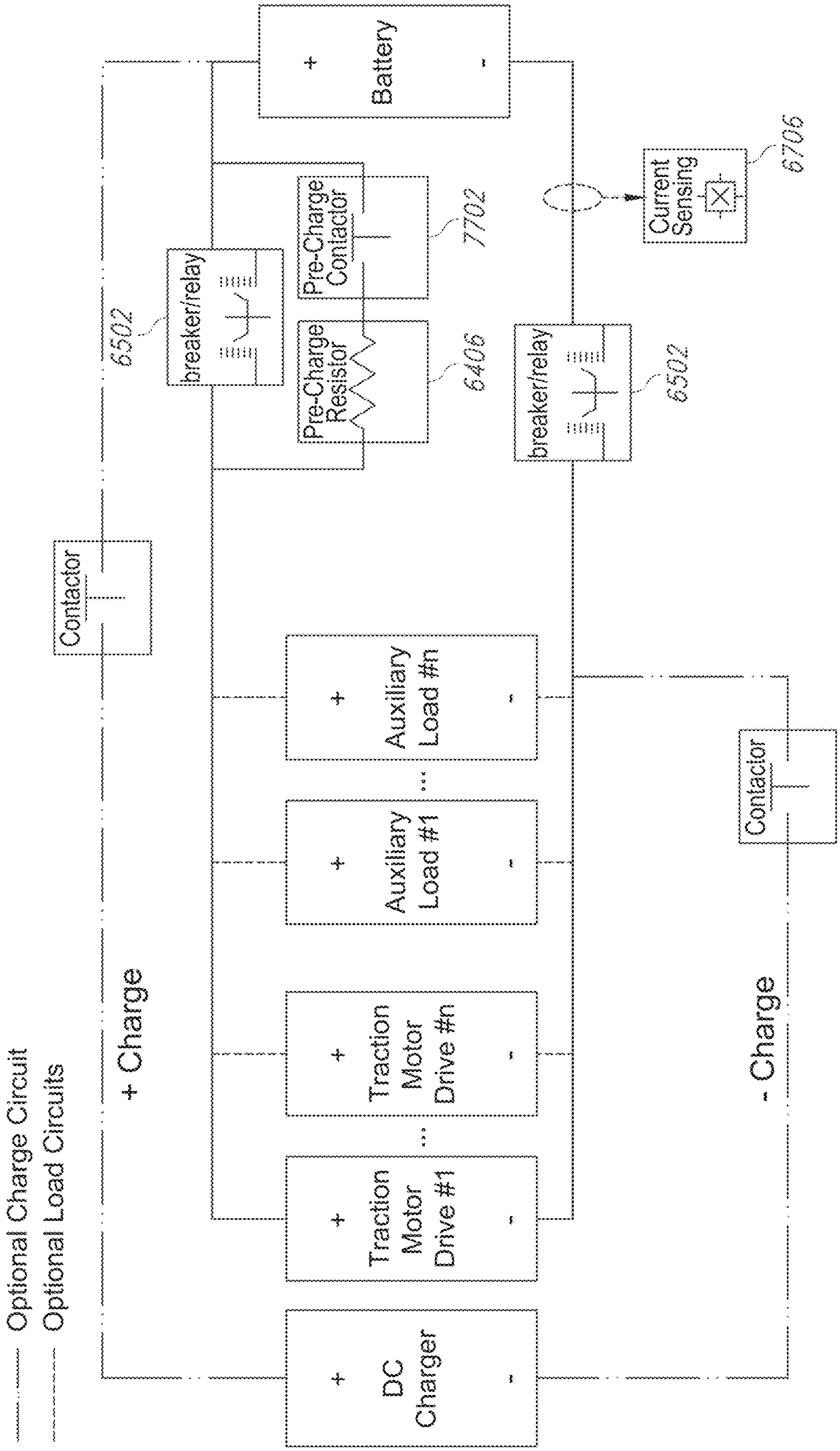
FIG. 77 depicts a schematic diagram of a power protection configuration between a battery and loads.

Referencing FIG. 77, an example power distribution arrangement for a mobile application is depicted. The embodiment of FIG. 77 is similar to the embodiment of FIG. 76, with a high side breaker/relay 6502 and a low side breaker/relay 6502. Four operating regimes of the embodiment of FIG. 77 are described herein, including pre-charge operations (e.g., at system power-on for the mobile application), powering operations for loads (e.g., providing motive power or auxiliary power for the mobile application), regeneration operations (e.g., recovering power from a motive load or auxiliary load), and charging operations (e.g., connection of a dedicated charger to the system). In the example of FIG. 77, the low side breaker/relay 6502 has an associated current sensor 6706. In the example of FIG. 77, the low side breaker/relay 6502 is in the loop during all operations, and can provide current protection for any operating conditions. To save costs, a current sensor for the high side breaker/relay 6502 can be omitted. In certain embodiments, for protection of the breaker/relay contacts 6502, a local current sensor may be included for each breaker/relay 6502, to provide for operations to protect the contacts in the event of a physical current disconnection (e.g., reference FIG. 70). It can be seen that additional contactors and/or breaker/relays may be provided beyond those shown—for example to isolate the charge circuit, to route power through selected ones of the motive loads and/or auxiliary loads, and/or to prevent power flow through an inverter (not shown) during charging operations. Additionally or alternatively, certain components depicted in FIG. 77 may not be present in certain embodiments. For example, a low-side contactor on the charge circuit may not be present, and any one or more of the motive loads (traction motor drive) or auxiliary loads may not be present. During a pre-charge operation, a pre-charge contactor 7702 may be closed while the high-side breaker/relay 6502 is open, where the low-side breaker/relay 6502 provides for current protection (in addition or as an alternative to a pre-charge fuse) during pre-charge operations. During charging operations, the low-side breaker/relay 6502 provides current protection, while the high-side breaker/relay 6502 is bypassed by the charging circuit.

Figure 78:
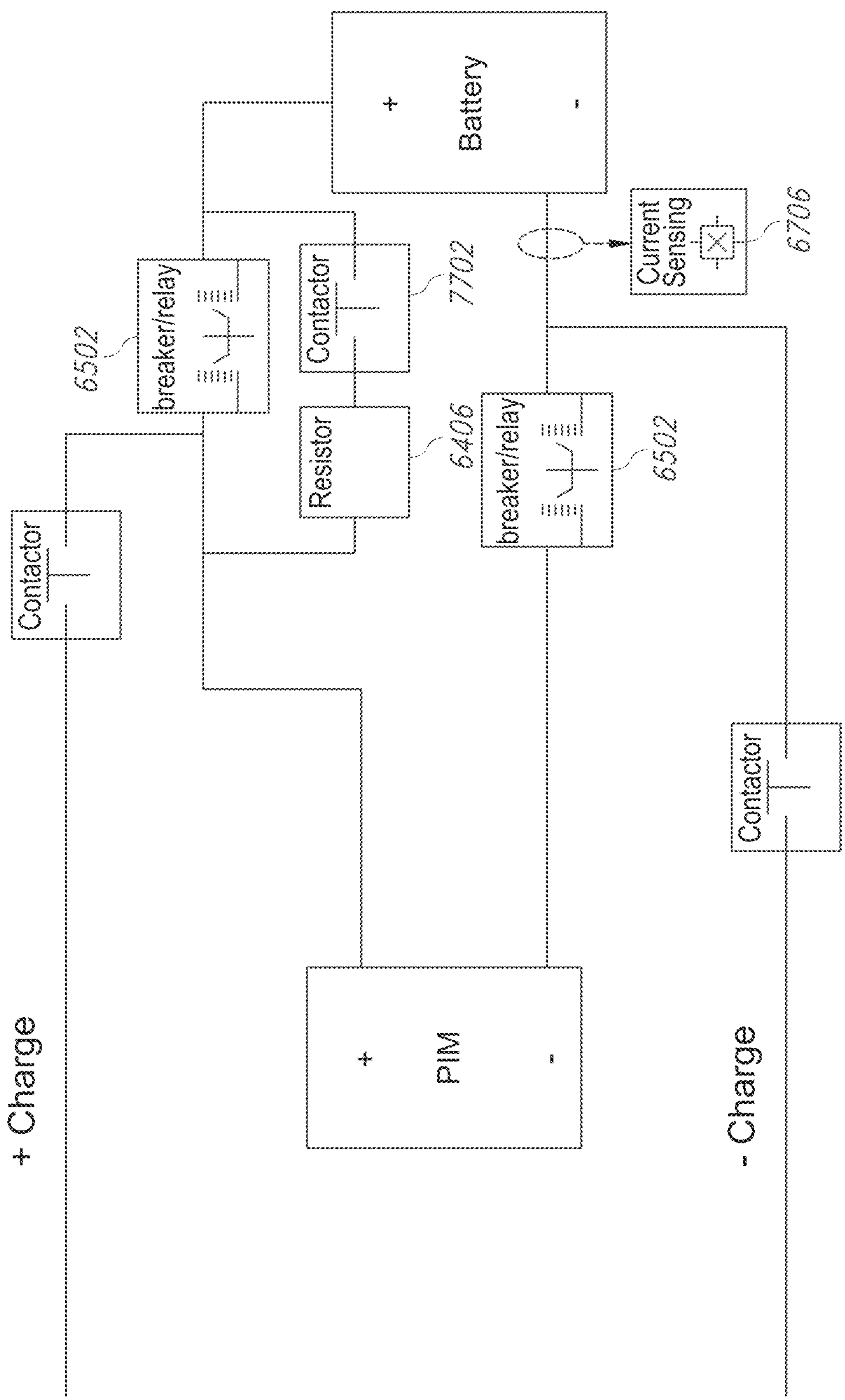
FIG. 78 depicts a schematic diagram of a power protection configuration.

Referencing FIG. 78, an example power distribution management for a mobile application is depicted. The embodiment of FIG. 78 is similar to the embodiment of FIG. 77, except that the high side breaker/relay 6502 is in the loop during all operations, and the low side breaker/relay 6502 is not in the loop during charging operations. In the example of FIG. 78, the high side breaker/relay 6502 may include current sensing associated therewith to provide protection for the contacts during a physical current disconnection. In certain embodiments, depending upon the circuit dynamics of the mobile application, the current sensor 6706 depicted on the low side may be sufficient to provide protection for the contacts of the high side breaker/relay 6502 without a dedicated current sensor for the high side breaker/relay 6502. During pre-charge operations for the embodiment of FIG. 78, current protection is not present, or is provided by a pre-charge fuse. During charging operations for the embodiment of FIG. 78, current protection is provided by the high-side breaker/relay 6502.

Figure 79:
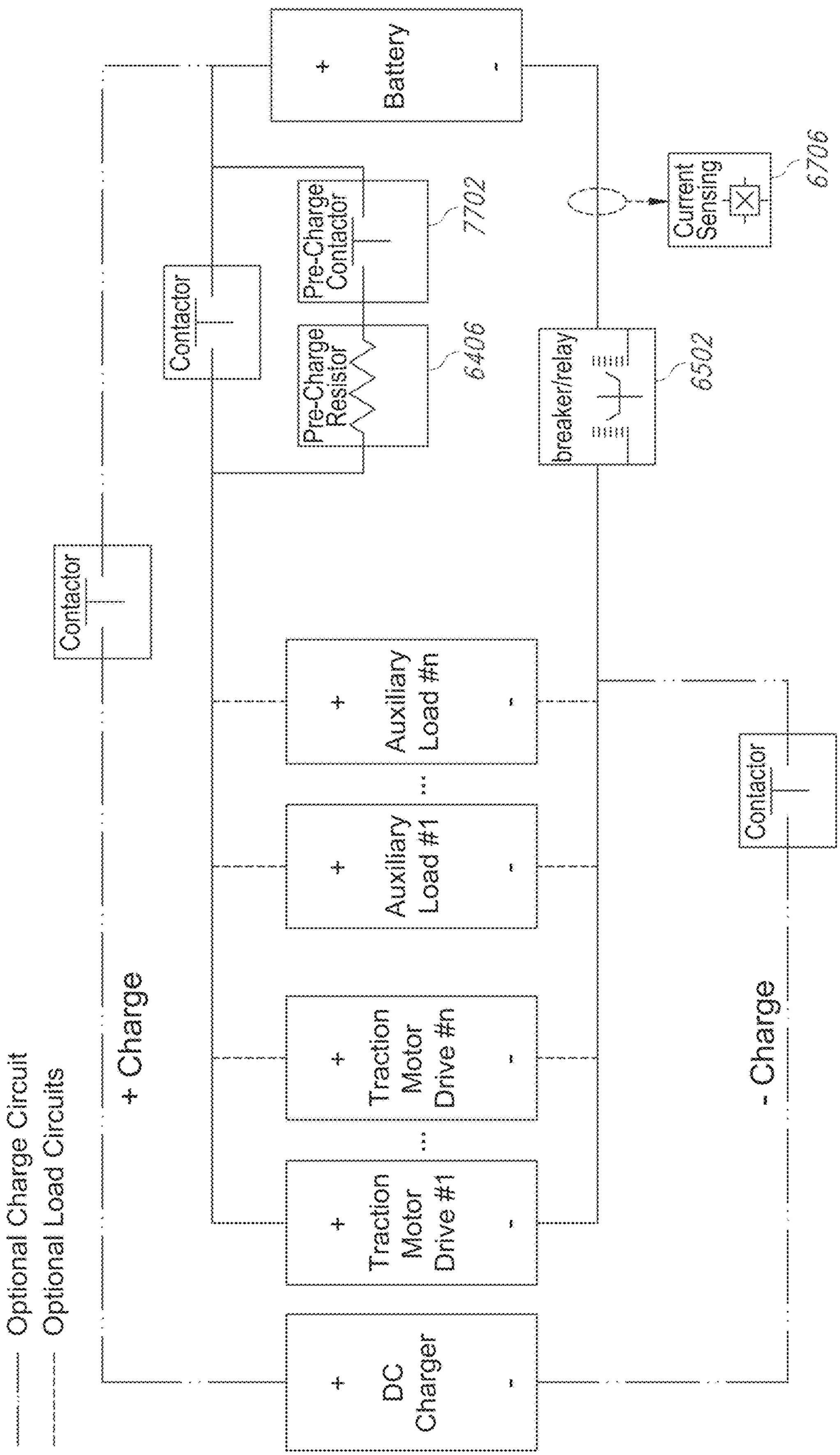
FIG. 79 depicts a schematic diagram of a power protection configuration between a battery and loads.

Referencing FIG. 79, an example power distribution management for a mobile application is depicted. The embodiment of FIG. 79 is similar to the embodiment of FIG. 77, except that the high side breaker/relay 6502 is exchanged for a standard contactor. In the example of FIG. 79, the low side breaker/relay 6502 provides for current protection during all operating conditions, and the system otherwise uses conventional components. In certain embodiments, improved current protection capability is desirable, but contactor wear may not be as much of a concern, and a trade-off for inexpensive contactors at other positions in the mobile power circuit away from the low side breaker/relay 6502 may be an acceptable solution. Additionally, the presence of the low side breaker/relay 6502 in the circuit for all operating conditions can reduce the wear on the conventional contactors in the mobile power circuit through timing of connections such that the low side breaker/relay 6502 reduces the number of connection and disconnection events on other contactors while the system is charged.

Figure 80:
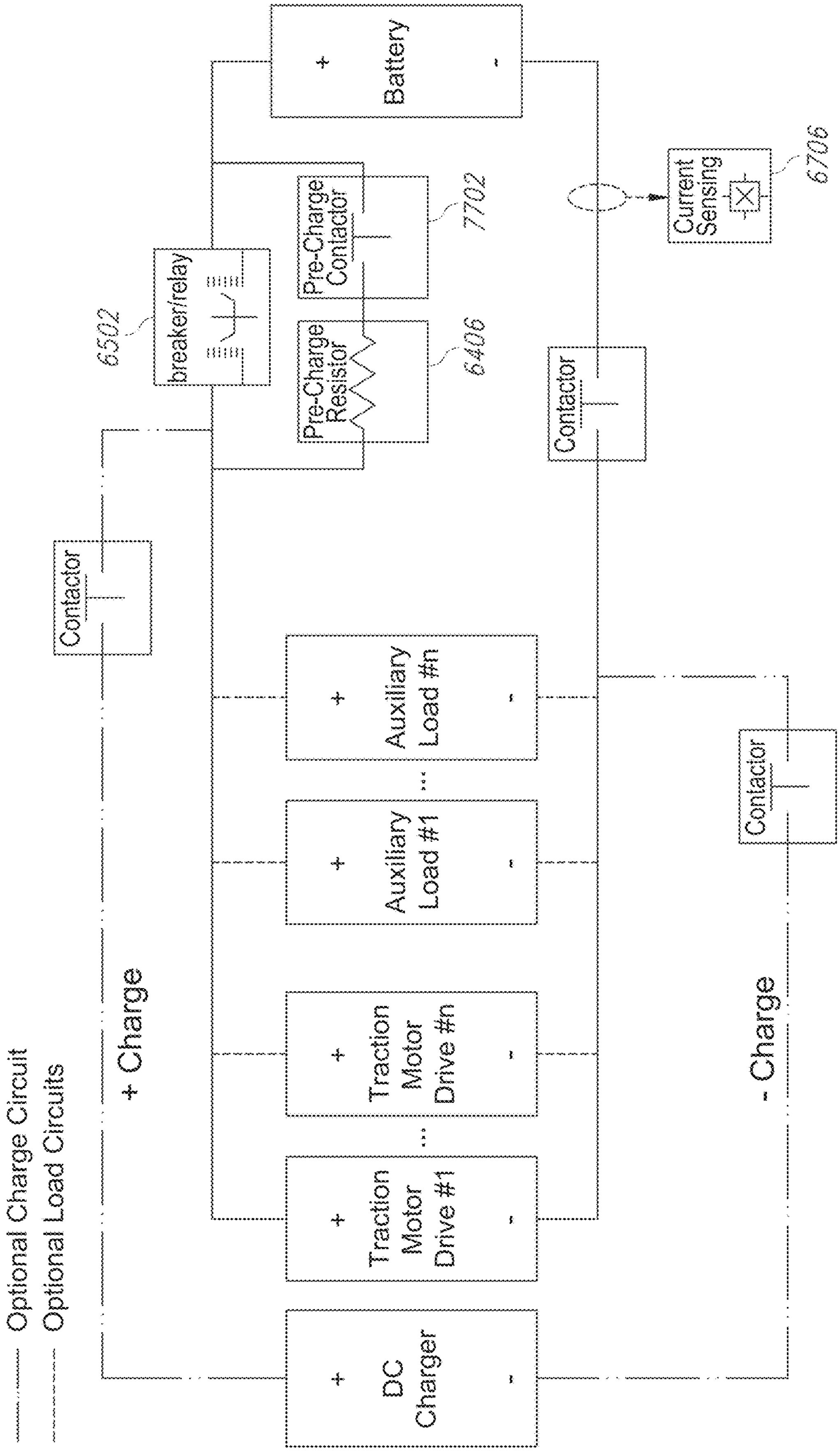
FIG. 80 depicts a schematic diagram of a power protection configuration between a battery and loads.

Referencing FIG. 80, an example power distribution management for a mobile application is depicted. The embodiment of FIG. 80 is similar to the embodiment of FIG. 78, except that the low side breaker/relay is replaced with a contactor, and the low side charging circuit is routed through the low side contactor. The low side charging circuit may bypass the low side contactor in certain embodiments, similar to the embodiment of FIG. 78. It can be seen in FIG. 80 that a circuit path lacking short-circuit protection exists through the pre-charge circuit during pre-charging operations when the high side breaker/relay 6502 is being bypassed, unless protection is provided by a pre-charge fuse. In certain embodiments, a fuse in the pre-charge circuit (not shown) may be provided to provide for short-circuit protection during the pre-charge operating condition, and/or the unprotected pre-charge operation may be an acceptable risk. In any of the embodiments depicted throughout the present disclosure, fuses may be included, potentially in-line with a breaker/relay 6502, depending upon the benefits sought from the breaker/relay 6502 for the particular embodiment. In certain embodiments, an included fuse with a breaker/relay 6502 may be configured to activate at a very high current value that is expected to be higher than the physical disconnection current of the breaker/relay 6502, for example as a redundant protection for the circuit, and/or to provide for a long-life fuse that is expected to last for a selected period, such as the service life of the electric mobile application.

Figure 81:
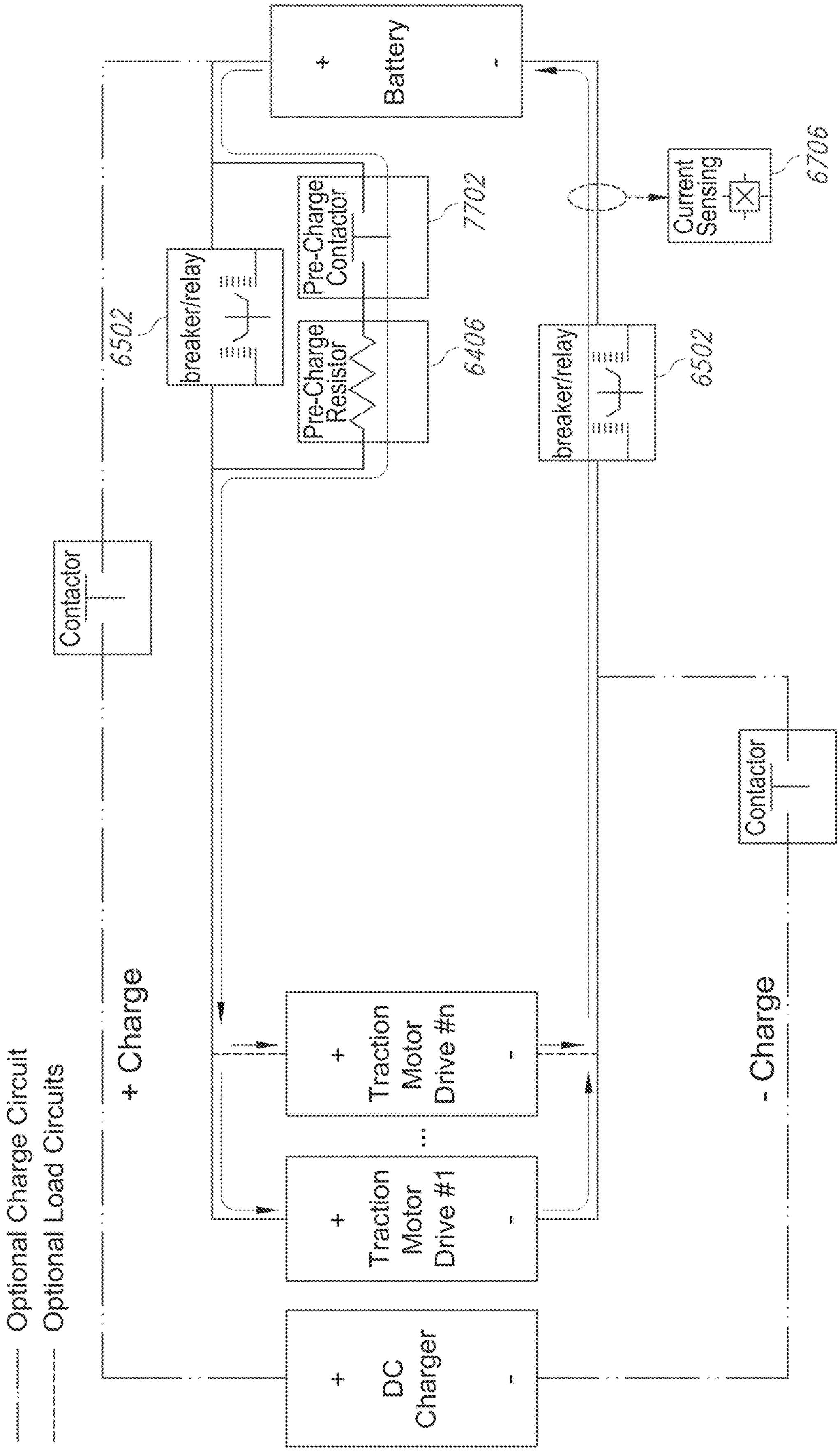
FIG. 81 depicts a schematic diagram of a power protection configuration between a battery and loads with current path depiction.

Referencing FIG. 81, an example power distribution management for a mobile application is depicted, consistent with the embodiment depicted in FIG. 77. Power flow during pre-charge operations is depicted schematically in FIG. 81, with arrows showing the power flow path. The operations described in relation to FIG. 81 can be understood in the context of any of the embodiments described throughout the present disclosure. During pre-charge operations, the pre-charge contactor 7702 is closed and the low side breaker/relay 6502 is closed, providing power through the mobile circuit and through the pre-charge resistor 6406. The pre-charge operation allows for capacitive elements of the mobile circuit to be charged before the high side breaker/relay 6502 is closed. During pre-charge operations in the embodiment of FIG. 81, the low side breaker/relay 6502 provides for overcurrent protection of the circuit. After the pre-charge operation is complete, which may be determined in an open loop (e.g. using a timer) manner or in a closed loop (e.g., detecting a voltage drop across the batter terminals, or detecting the current through the circuit), the high side breaker/relay 6502 is closed and the pre-charge contactor 7702 may be opened.

Figure 82:
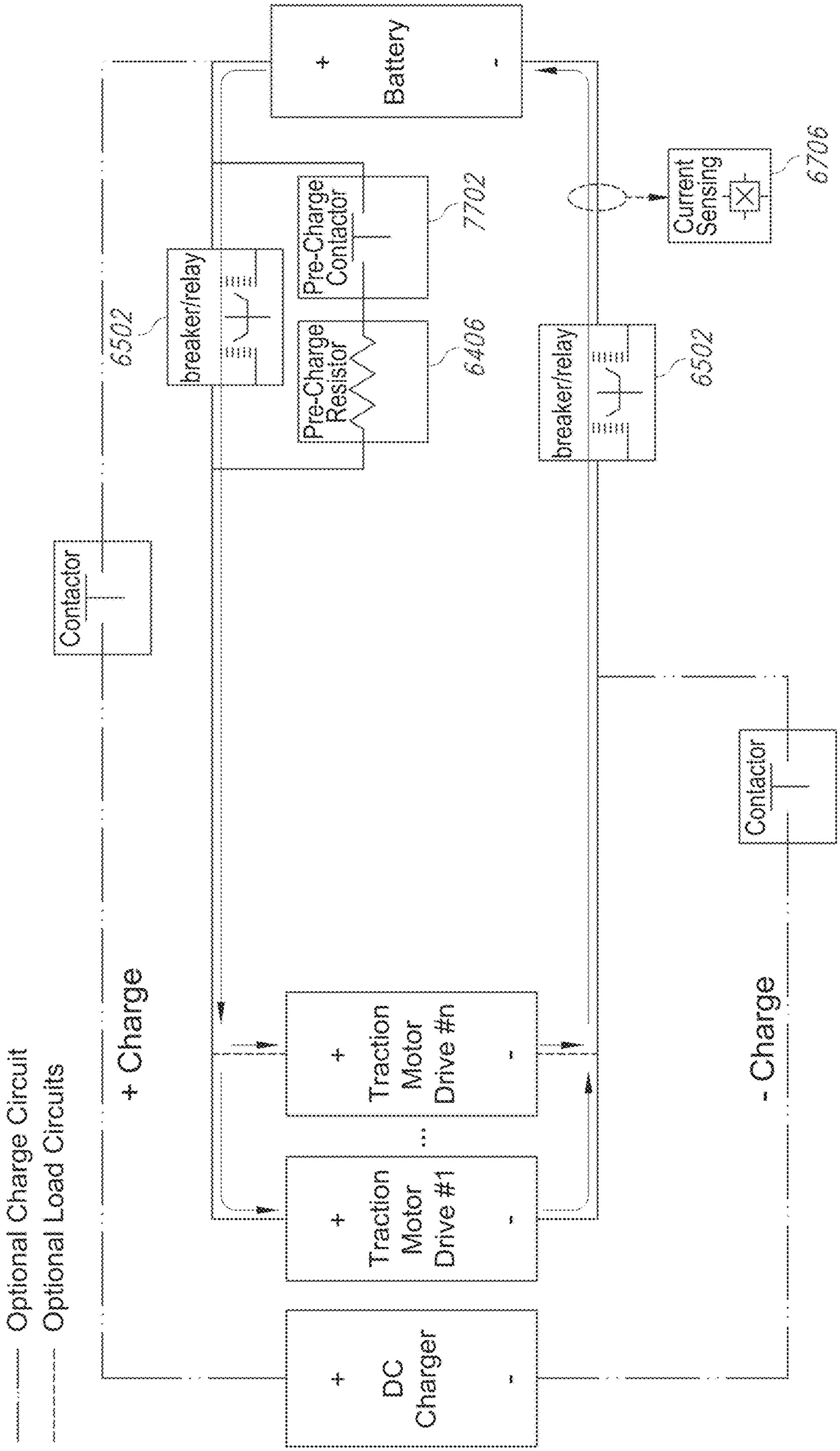
FIG. 82 depicts a schematic diagram of a power protection configuration between a battery and loads with current path depiction.

Referencing FIG. 82, an example power distribution management for a mobile application is depicted, consistent with the embodiment depicted in FIG. 77. Power flow during load powering operations is depicted in FIG. 82, with arrows showing the power flow path. The operations described in relation to FIG. 82 can be understood in the context of any of the embodiments described throughout the present disclosure. During load powering operations, in the example the pre-charge contactor 7702 is open, and power flows through the high side breaker/relay 6502 and the low side breaker/relay 6502. The embodiment of FIG. 82 depicts a traction motor load being powered, but one or more auxiliary loads may additionally or alternatively be powered in a similar manner. During load powering operations, both the high side breaker/relay 6502 and the low side breaker/relay 6502 provide overcurrent protection. In certain embodiments, the high side breaker/relay 6502 and the low side breaker/relay 6502 may have the same or distinct current ratings. For example, where one of the high side breaker/relay 6502 or low side breaker/relay 6502 are easier to service or less expensive, that one of the breaker/relays 6502 may have a lower overall current rating to provide for a system where a predictable one of the breaker/relays 6502 fails first. Additionally or alternatively, certain operations on the system may have a higher current rating—for example charging operations where the charging circuit is routed only through one of the breaker/relays 6502 (e.g., the low side breaker/relay in the embodiment of FIG. 82), and thus one of the breaker/relays 6502 may have a higher current rating than the other. In certain embodiments, a breaker/relay 6502 current rating may be reflected in the contact materials of the movable contact and the fixed contact, by a contact surface area of the movable contact and the fixed contact, by threshold settings for the controlled operations in response to detected current, by a number or arrangement of splitter plates, by splitter plate materials and geometry, by the magnet strength and geometry of the permanent magnet system around the splitter plates, by the contact force of the contact force spring, and/or by the breaker/relay design elements (e.g., contact surface area and contact spring force) determining the physical disconnection current due to the Lorentz force on the contacts.

Figure 83:
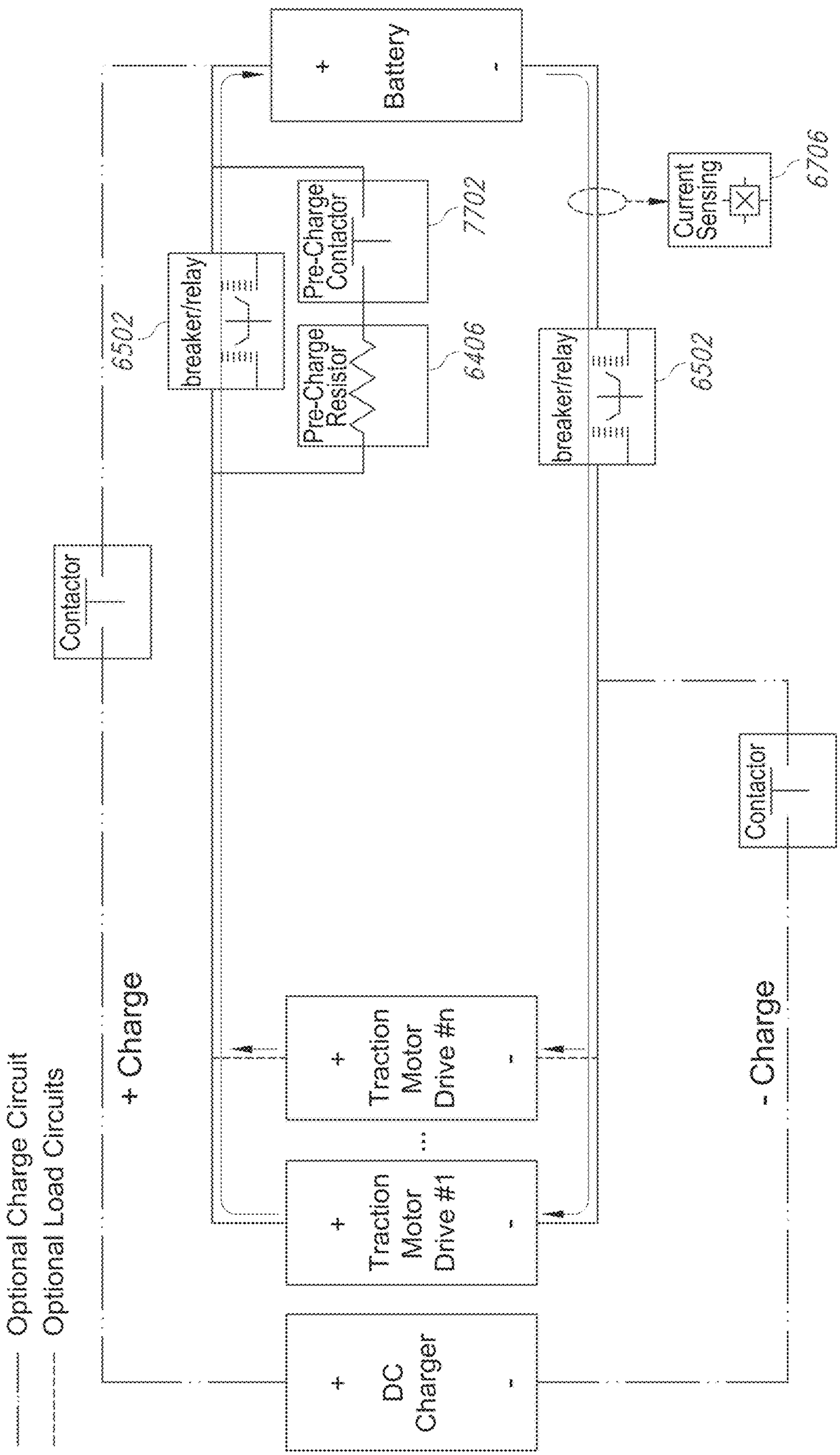
FIG. 83 depicts a schematic diagram of a power protection configuration between a battery and loads with current path depiction.

Referencing FIG. 83, an example power distribution management for a mobile application is depicted, consistent with the embodiment depicted in FIG. 77. Power flow during regeneration operations is depicted in FIG. 83, with arrows showing the flow path. Regenerative operations from motive loads are depicted, for example as might be experienced during regenerative braking, but any regenerative operations from any loads in the system are contemplated herein. During regeneration operations, the high side breaker/relay 6502 and the low side breaker/relay 6502 are closed, and the pre-charge contactor 7702 may be open. Accordingly, both the high side breaker/relay 6502 and the low side breaker/relay 6502 provide overcurrent protection during regeneration operations of the system.

Figure 84:
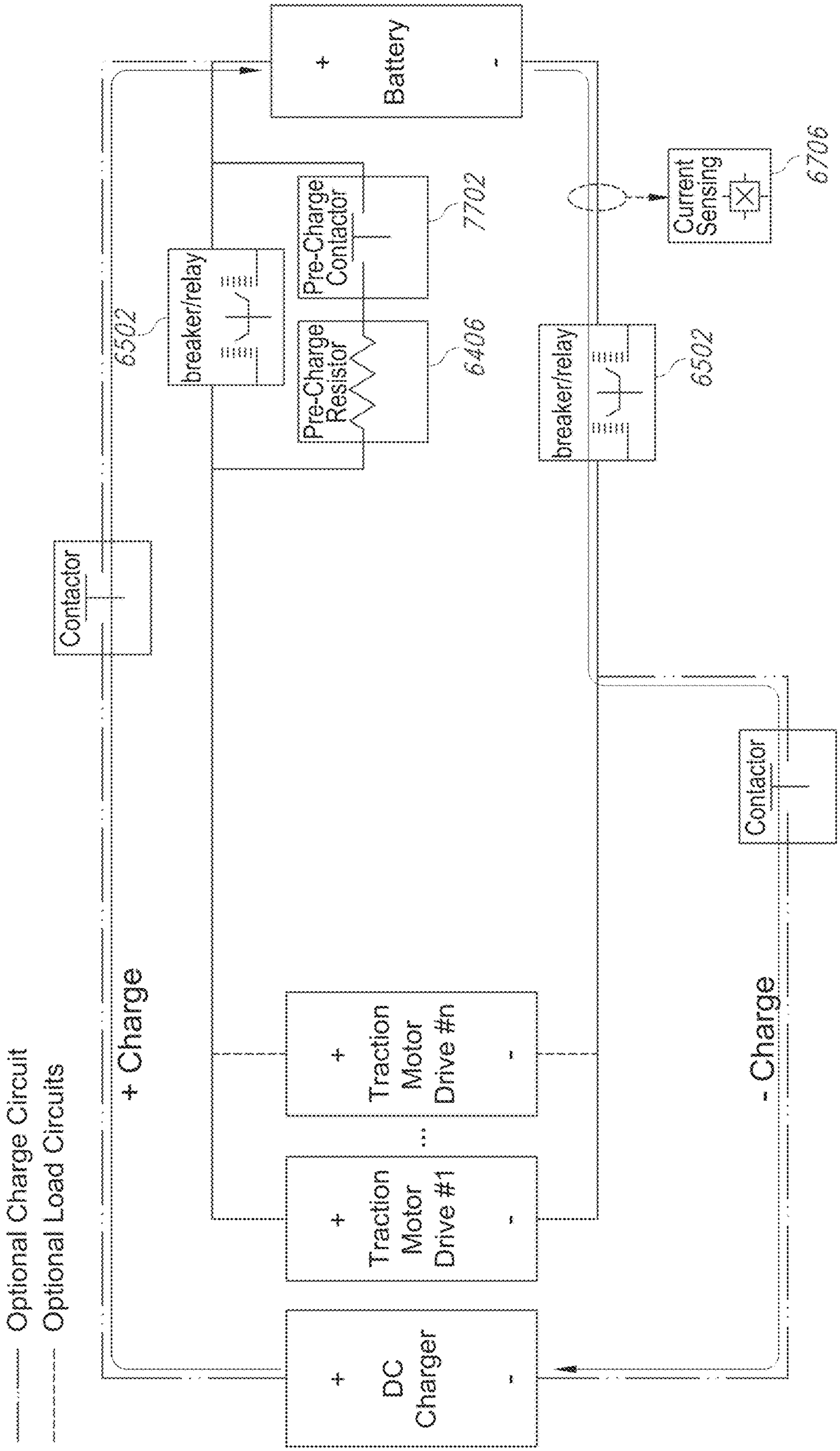
FIG. 84 depicts a schematic diagram of a power protection configuration between a battery and loads with current path depiction.

Referencing FIG. 84, an example power distribution management for a mobile application is depicted, consistent with the embodiment depicted in FIG. 77. Power flow during charging operations is depicted in FIG. 84, with arrows showing the flow path. Charging may be with an external charging device, and may include a high current quick charging operation which may provide for higher current operations than is associated with a rated power for the load(s). In the operations depicted in FIG. 84, the low side breaker/relay 6502 is closed, and contactors in the charging circuit are closed, providing the power flow path as depicted. In certain embodiments, the high side breaker/relay 6502 and the pre-charge relay 7702 may be open, for example to isolate an inverter (not shown) from the circuit during charging operations. In certain embodiments, the high side breaker/relay 6502 may be closed, for example where isolation of the inverter during charging operations is not required, and/or where rapid operation without a pre-charging cycle after the charging may be desired. During charging operations, the low side breaker/relay 6502 provides overcurrent protection in the example of FIG. 84.

Figure 85:
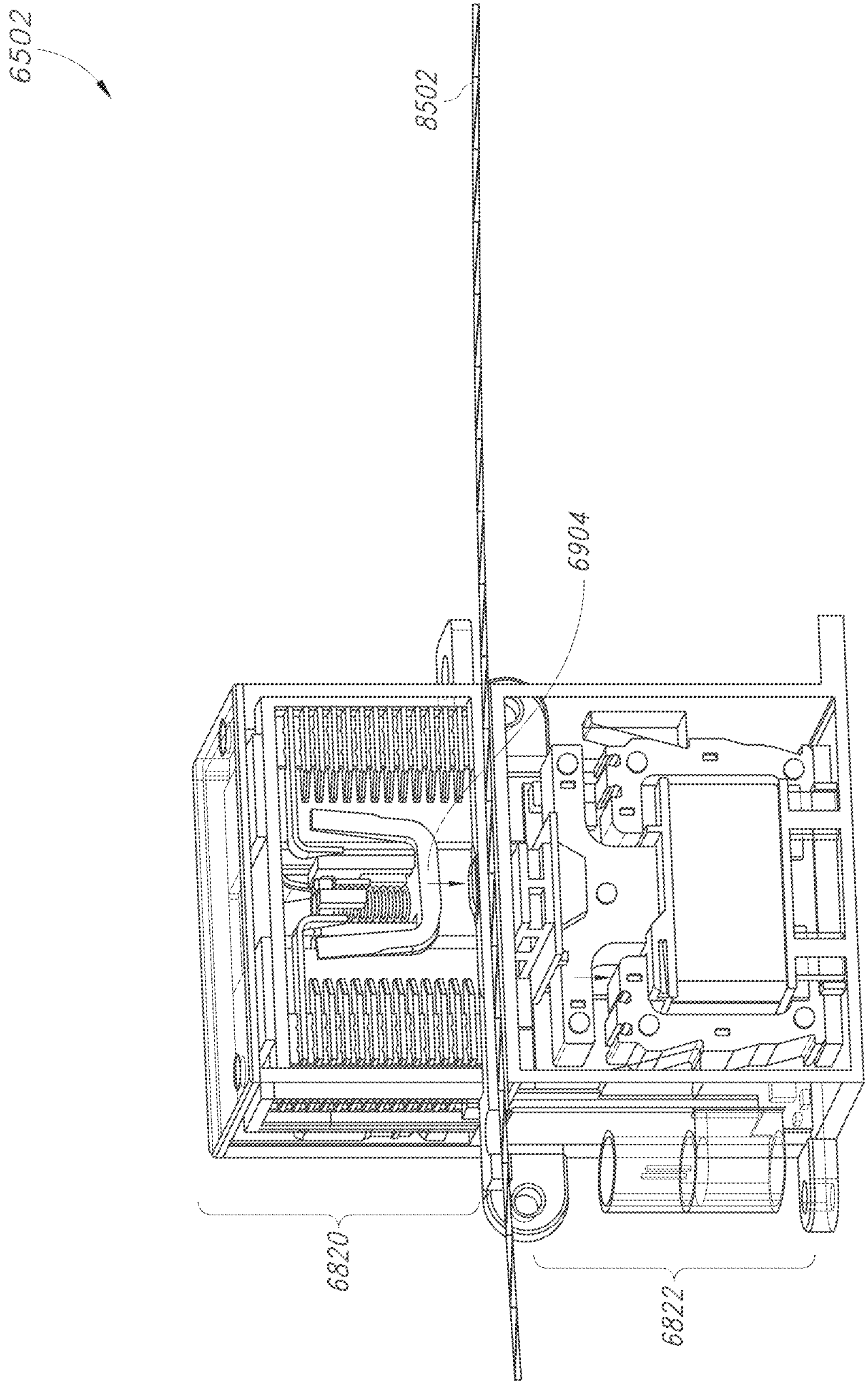
FIG. 85 depicts an embodiment detail of a breaker-relay component.

Referencing FIG. 85, another cutaway schematic view of a breaker/relay is depicted. In the example of FIG. 85, circuit breaking and connecting components are depicted on the breaker side 6820, and contactor operation components are depicted on the relay side 6822. The depicted breaker/relay is an example and depicts a single pole, single throw breaker relay. Additionally or alternatively, a breaker/relay may be a dual pole (e.g., operating two distinct circuits, a parallel path for one of the circuits to provide additional current capability, and/or one pole providing high-side coupling and the other pole providing low-side coupling). In certain embodiments, a breaker/relay having more than one pole can control the poles independently, or they may be operated together utilizing the same armature. In certain embodiments, both poles have arc diffusion protection provided by the same splitter plates, or by independent sets of splitter plates. In certain embodiments, both poles have arc diffusion protection provided by the same permanent magnet system, or by independent permanent magnet systems.

Figure 86:
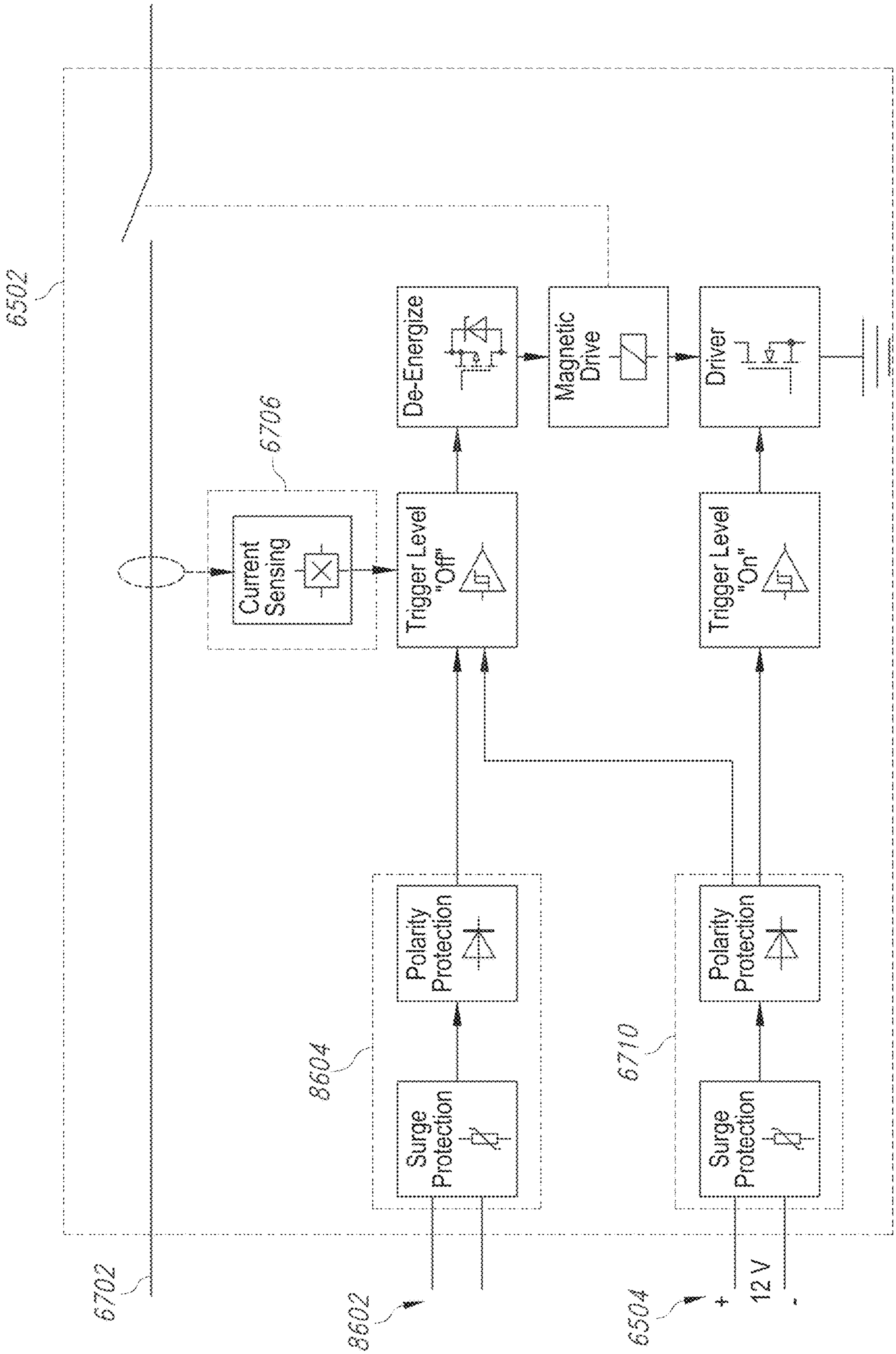
FIG. 86 depicts a schematic diagram of a power bus protection configuration.

Referencing FIG. 86, another example of a schematic logic diagram for a breaker/relay is depicted. The example of FIG. 86 includes an emergency or auxiliary input 8602, which is processed by an input isolation 8604. The emergency or auxiliary input 8602 may replace or be in addition to any other auxiliary input, and provides for the capability of a particular application to control operations of the breaker/relay for a selected response to any desired aspect of the system—including without limitation, allowing for a disconnect assurance during service, during an emergency, and/or according to any desired control logic.

Figure 87:
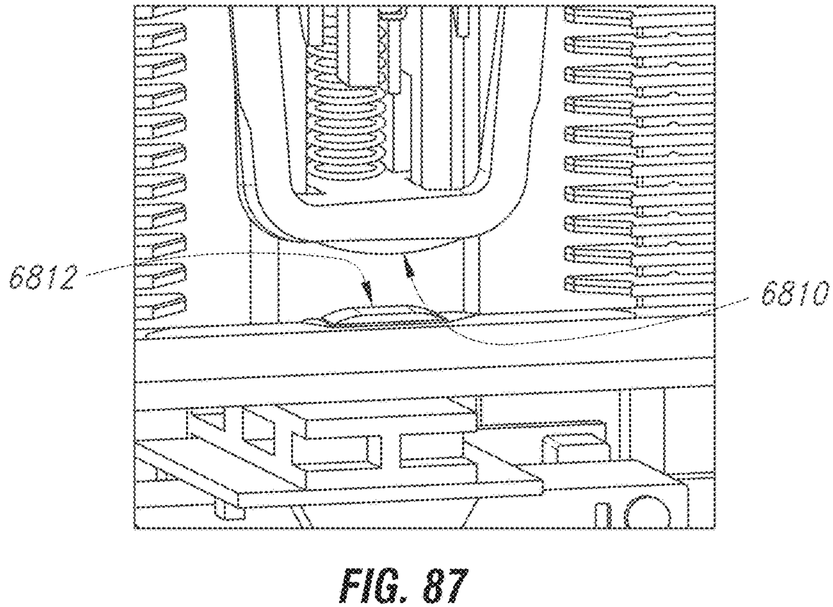
FIG. 87 depicts an embodiment detail of a contact in a breaker-relay component.

Referencing FIG. 87, a detailed cutaway view of a contact portion of an example breaker/relay is depicted. The contact portion of FIG. 87 includes an example configuration for the contact surface of the moveable contact 6810 and the fixed contact 6812. The configuration of the contacts is a part of the system that contributes to the physical opening force of the contacts, and can be configured with any shape or area to provide the desired response to high currents occurring in the associated circuit.

Figure 88:
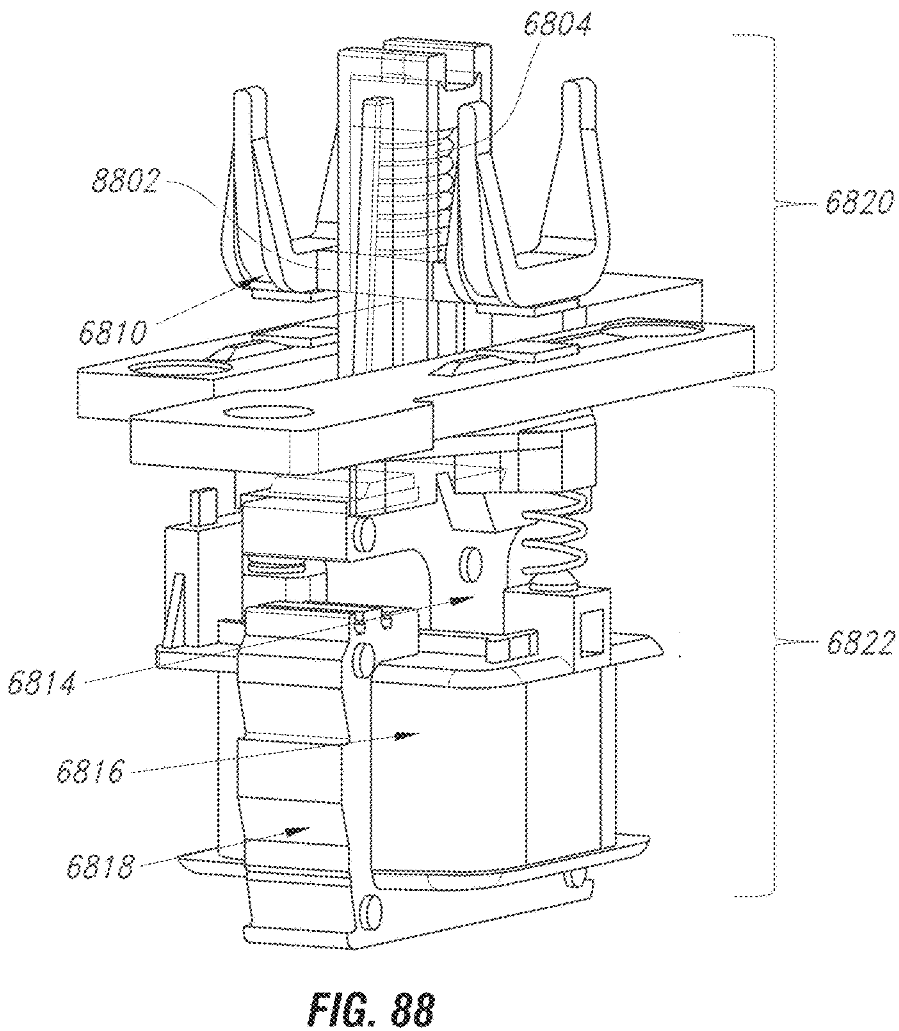
FIG. 88 depicts an embodiment detail of a breaker-relay component.

Referencing FIG. 88, an example breaker/relay is depicted with portions of the housing removed for illustration. The example breaker/relay includes two moveable contacts engaging two fixed contacts. In the example of FIG. 88, the moveable contacts are coupled and operated by the same armature 6814, with contact force provided by the contact spring 6804. In the example of FIG. 88, the contacts are electrically coupled through a bus bar 8802. In the example, the bus bar 8802 transitions directly between the contacts, and is not significantly exposed to the current carrying portion of the bus bar including the fixed contacts. In certain embodiments, the bus bar 8802 can include a trajectory that exposes a portion of the bus bar 8802 into proximity with the current carrying member of the fixed contacts, thereby contributing to the Lorentz force that provides the physical disconnect of the breaker/relay. In certain embodiments, both of the area of the bus bar 8802 exposed to the fixed contact current carrying portion, and the proximity of the bus bar 8802 to the fixed contact current carrying portion are design elements that allow for configuration of the Lorentz force response.

Figure 89:
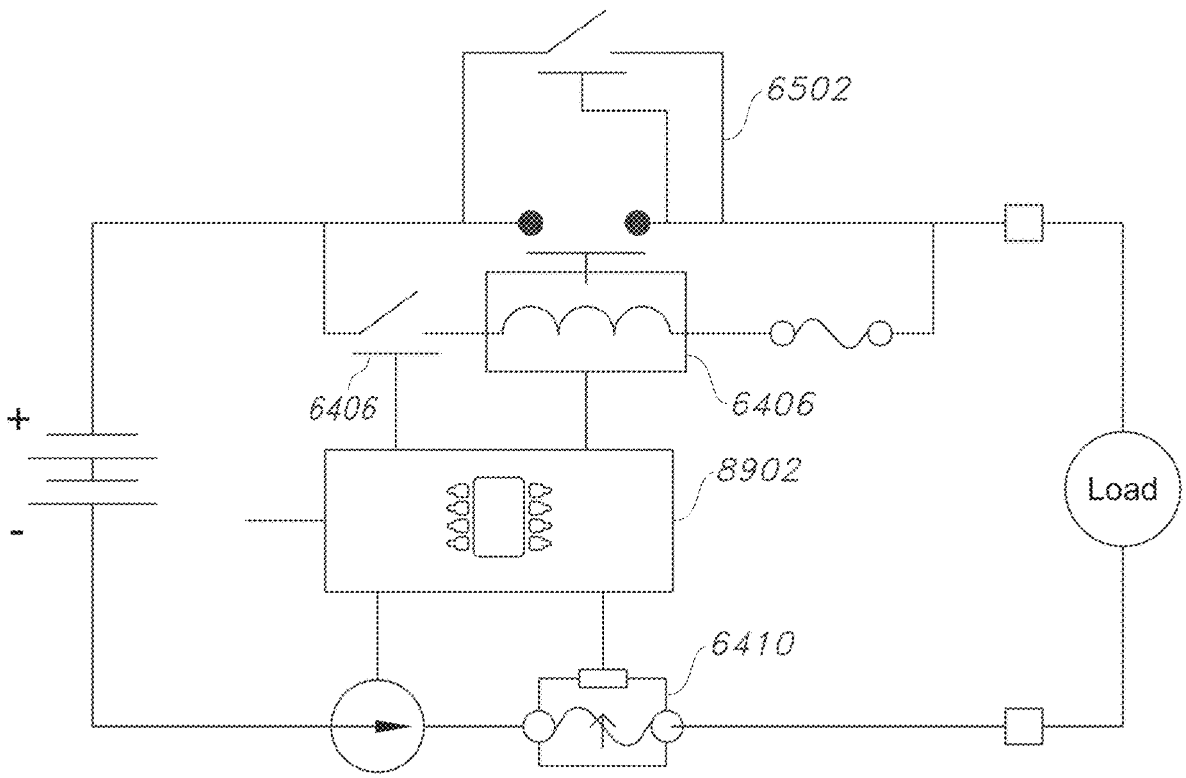
FIG. 89 depicts a schematic diagram of a power protection configuration with controller.

Referencing FIG. 89, an example power management arrangement for a mobile application is depicted. The example of FIG. 89 includes a breaker/relay 6502 disposed on the high side of the power circuit, and a pre-charge contactor, resistor, and fuse, coupled in parallel to the high side breaker/relay 6502. In the example of FIG. 89, the breaker/relay 6502 is a dual pole breaker/relay 6502, for example to provide additional current capability through the contacts for the power circuit. In the example of FIG. 89, a controller 8902 is depicted that performs control functions for the breaker/relay 6502 and for the power management arrangement. For example, the controller 8902 receives a keyswitch input, performs pre-charge operations, operates the closing of the breaker/relay, and responds to a high current event by opening the contacts of the breaker/relay. In another example, the controller 8902 performs shutdown operations of the power management arrangement, such as opening the breaker/relay after the keyswitch is off, or in response to an auxiliary, emergency, or other input requesting that power be disconnected.

Further referencing FIG. 89, an example power distribution management for a mobile application is depicted schematically, which may be utilized in whole or part with any other systems or aspects of the present disclosure. An example power distribution management system includes a dual pole breaker/relay—the example of FIG. 89 includes a dual pole breaker/relay (e.g., using one set of contacts per pole) having a single magnetic drive (e.g., a magnetic actuator). In certain embodiments, both contacts are mechanically linked such that they open or close together (e.g., operating as a dual pole single throw contactor). In certain embodiments, the contactors may share one or more arc suppression aspects (e.g., splitter plates and/or permanent magnet), and/or may have individual arc suppression aspects. In certain embodiments, arc suppression aspects may be partially shared (e.g., some splitter plates in proximity to both contacts) and/or partially individual (e.g., some splitter plates in proximity to only one or the other of the contacts). In certain embodiments, various features of the contactors may be shared and other features of the contactors individually supplied—such as control commands or actuation (e.g., a dual pole, dual throw arrangement), arc suppression aspects, and/or housings. The example of FIG. 89 additionally depicts a separate contactor (e.g., the lower left of the three (3) depicted contacts) which is separately controllable to provide contact management for a pre-charge circuit for the power distribution management system. In certain embodiments, the pre-charge contactor may be integrated with the dual pole contacts—for example within a same housing as the dual pole contacts and/or with pre-charge coupling provided as one of the dual pole contacts. The example of FIG. 89 depicts a fuse on the pre-charge circuit, and a further overall fuse on a battery low side. The presence of fuses depicted is optional and non-limiting, and fuses may be present in other locations, omitted, and/or replaced (e.g., by a breaker/relay as described throughout the present disclosure, and/or as a pole on a dual pole or multi-pole breaker/relay). In certain embodiments, a pre-charge circuit may be contained within a power distribution unit separate from the breaker/relay and/or containing the breaker/relay, as a solid state pre-charge circuit, and/or as a mechanical/electrical circuit positioned elsewhere in the system and/or within the breaker/relay housing.

The electrical arrangement of poles in FIG. 89 is a schematic example, and not limiting to arrangements of the system for particular embodiments. In certain embodiments, each pole of the dual pole breaker/relay (and/or each pole or a subset of poles in a multi pole breaker/relay) may provide selectable electrical coupling for a same circuit, for separate circuits, and/or for a selected circuit (e.g., using controllable switches or connectors elsewhere in the system—not depicted). In certain embodiments, the power distribution management system further includes a high resolution current sensor, and/or current sensing on more than one pole of the dual pole or multi pole breaker/relay. In certain embodiments, a controller is communicatively coupled to the one or more high resolution current sensors, and utilizes the one or more high resolution current sensors for any operations described throughout the present disclosure (e.g., to command one or more of the contacts to an open position to avoid re-contact after opening) and/or to communicate information determined from the current sensor (e.g., the electrical current, or other information derived therefrom) to another controller in the system such as a vehicle controller. In certain embodiments, each contactor of the dual pole or multi-pole breaker/relay includes an arrangement configured to open the contact with a Lorentz force response due to high current through the circuit of the contactor as described throughout the present disclosure. In certain embodiments, one contact has an arrangement to open with a Lorentz force response, and the other contactor opens due to mechanical linkage to the responding contactor. In certain embodiments, each contact has an arrangement to open with a Lorentz force response, for example to provide circuit protection redundancy. In certain embodiments, each contact has an arrangement to open with a Lorentz force response, where each contact has a separate configured threshold for opening response, and/or where each contact is separably controllable (e.g., with a separate magnetic actuator or other controlled actuator).

Figure 90:
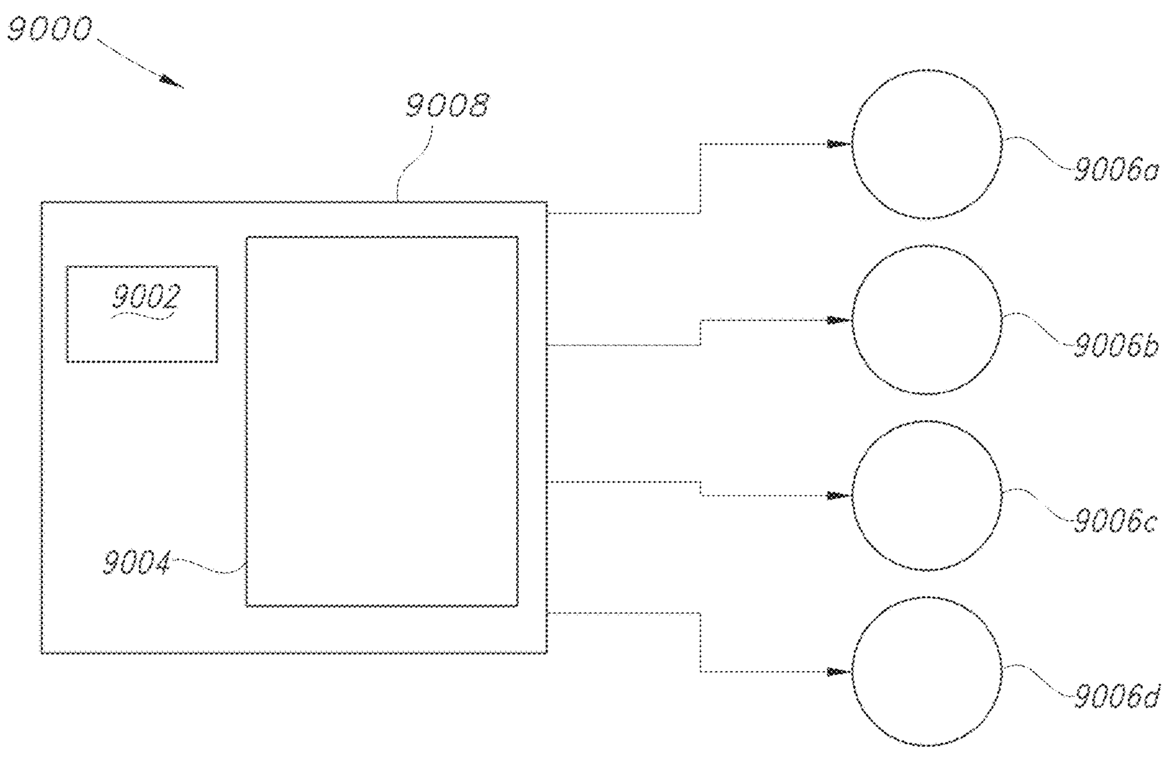
FIG. 90 depicts a schematic diagram of an adaptive system using a multi-port power converter.

Referencing FIG. 90, a schematic depiction of an adaptive system using a multi-port power converter is depicted for hybrid vehicles. The utilization of the terms multi-port, X port, and/or X-in-1 port indicate that a power converter includes one or more ports that can serve distinct power loads and/or power sources with one or more varying electrical characteristics. A configurable power converter may have one or more fixed ports, one or more configurable ports, or combinations of these. The example system 9000 includes a multi-port power converter 9008, having a number of ports structured to connect to electrical sources and/or loads. The multi-port power converter 9008 in the example of FIG. 90 is coupled to four electrical loads/sources 9006 (9006*a*-9006*d*), although any number of loads and/or sources may be connected to as described throughout the present disclosure. In the example, each load/source 9006*a* to 9006*d* has a distinct electrical characteristic, for example current type (e.g., AC, DC), frequency components (phase(s) and/or frequencies), and/or voltage. In certain embodiments, the load/source 9006 may have additional electrical characteristics or requirements—for example a load which is a motor may have rise time and/or response time requirements. The example multi-port power converter 9008 is able to configure the electrical characteristics to the multi-port connections without a change to the hardware of the multi-port power converter 108, and further is able to support configuration changes for the multi-port power converter 108 at various selectable stages of manufacture, application selection, and/or in-use operation as described throughout the present disclosure.

The example system 9000 includes a converter/inverter bank 9004. The converter/inverter bank 9004 includes a plurality of solid state components that can be converted to various configurations of DC/DC conversion interfaces, and/or DC/AC conversion interfaces, to selected ones of the ports on the multi-port power converter 9008. An example configuration includes a plurality of half-bridge components having connectivity selected by a plurality of solid state switches in the converter/inverter bank 9004. Accordingly, each of the ports on the multi-port power converter 9008 can be configured for the selected DC/DC and/or DC/AC interface according to the electrical load/sources 9006 in the application. In certain embodiments, the half-bridge components include silicon carbide (SiC) half-bridges. SiC half-bridges, in certain embodiments, can operate at very high switching frequencies and high efficiencies with low electrical losses in the converter/inverter components.

The selection of the components in the converter/inverter bank 9004 may be made according to the number of different load types to be supported. Accordingly, one of skill in the art can design a particular converter/inverter bank 9004 to support a wide variety of contemplated applications, each of which can be supported by manipulating only solid state switches and drive controls for the components of the converter/inverter bank 9004, without changes to the hardware of the multi-port power converter 9008. For example, if a given class of off-road vehicles can be supported by 4 distinct DC voltage interactions for loads and power sources (e.g., a high voltage battery, a 12-V circuit, a 24-V circuit, and a 48-V circuit), and 2 distinct AC voltage interactions (including potentially driving the load and accepting regenerative inputs), then a configurable bank of components for the converter/inverter bank 9004 and a sufficient number of ports are packaged that will support the entire class of off-road vehicles without changes to the hardware of the multi-port power converter 9008. Accordingly, a given application can be supported at a selected point in the manufacturing cycle—either through calibration in a controller 9002 at design time of the multi-port power converter 9008 (e.g., before integration with an OEM), by an OEM assembling a vehicle and/or driveline for the vehicle, and/or by a bodybuilder assembling a final vehicle for a particular application. The controller 9002 may be accessible by the use of a manufacturing tool, a service tool, or the like, to configure the component bank 9004 in the multi-port power converter 9008, and/or to define the drive controls for the components in the component bank 9004 to meet the electrical characteristics of the loads/sources 9006 in the application.

In certain embodiments, a DC/DC conversion can be supported by a half-bridge having 4 MOSFET switches, and an AC/DC conversion can be supported by a half-bridge having 6 MOSFET switches. In certain embodiments, the half-bridges may be modular and can be combined as needed to support a particular electrical input, output, or interface. Additionally or alternatively, H-bridge circuits, H-bridge circuits supporting a three-phase output, or other components may be included in the component bank 9004, depending upon the requirements for the class of applications to be supported by a particular multi-port power converter 9008.

The utilization of a multi-port power converter 9008 provides for a number of benefits and features that allow for integration of a system 9000 with a wide variety of applications without changes to the hardware. For example, the multi-port power converter 9008 allows for centralization of power management on a given application, rather than having a number of converters and/or inverters distributed throughout the vehicle or application. Accordingly, cooling requirements can be reduced, especially in the number of interfaces and connections for cooling to be supplied. Additionally, the electrical connections for power conversion throughout the vehicle or application can be standardized, and the number of connections reduced. Each connection drives a point of potential failure or environmental intrusion, and requires specification, testing, and other integration requirements. The use of a multi-port power converter 9008 greatly simplifies integration, and allows for electrification and hybridization of many applications, such as off-road applications with a wide variety of load types, that have not adopted electrification and/or hybridization in previously known systems. Further, the ability of the multi-port power converter 108 to configure port outputs and inputs allows for a wider variety of loads on a particular system to be readily integrated into an electrification and/or hybridization scheme, increasing the overall efficiency gains that can be achieved for the application, and enabling use cases for electrification and hybridization that would otherwise be prohibitive to due design and integration challenges that do are not commercially justifiable for complex designs and/or low volume applications. The ability to configure the multi-port power converter 108 without changes to hardware, interfaces, and at selected points in the manufacturing cycle additionally supports providing electrification and/or hybridization for many applications where design control and integration responsibilities may vary across the industry. Further, the multi-port power converter 9008 is configurable after initial use by an end user—for example to allow changes to a power rating or other systemic change for the vehicle or application (which could be accomplished remotely via an update to the controller 9002), changes in electrical components on the vehicle or application that a customer may implement, and/or changes in electrical components made during service, remanufacture, or other post-use events.

Figure 91:
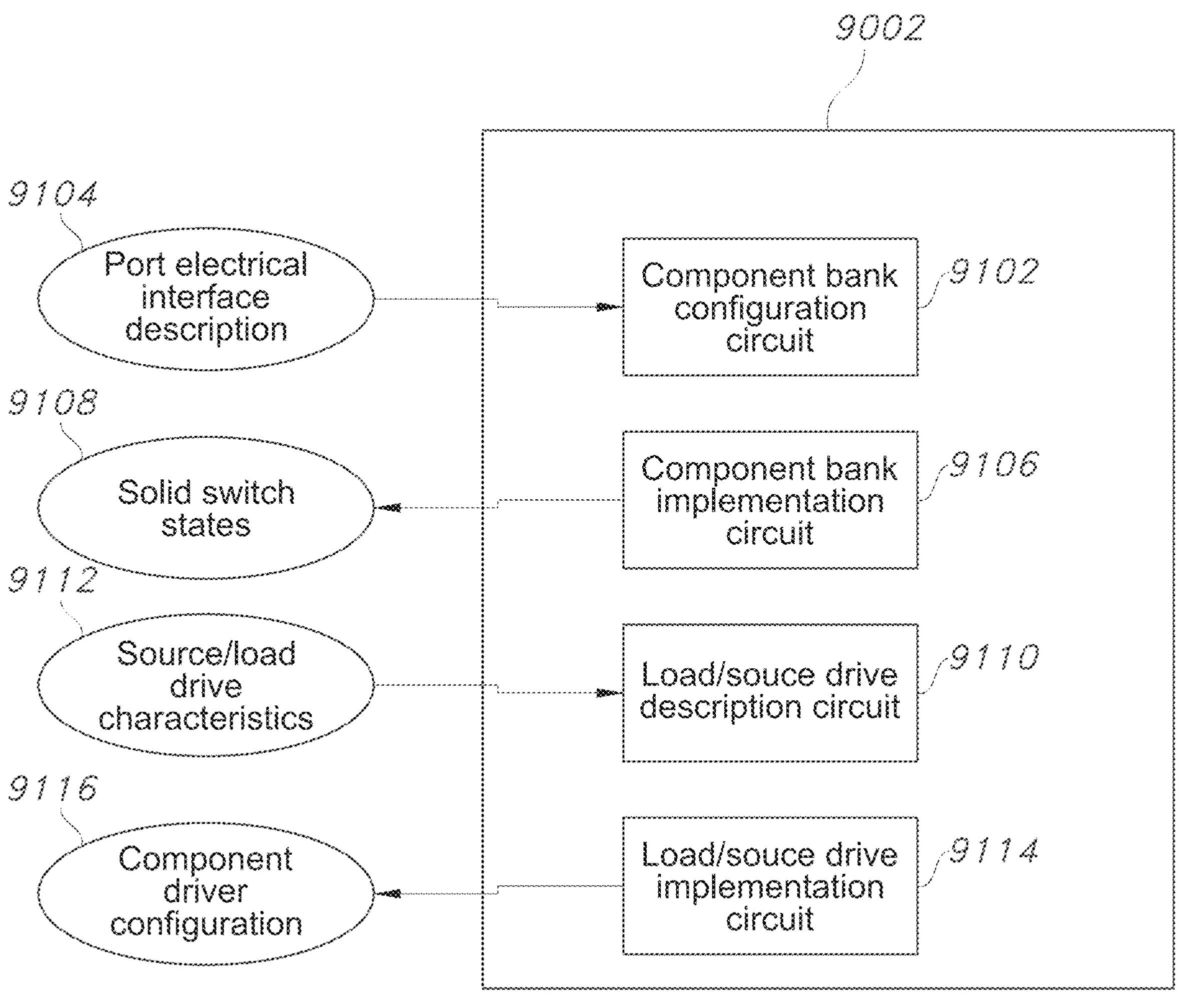
FIG. 91 depicts a schematic diagram of a controller.

Referencing FIG. 91, an example controller 9002 is depicted having a number of circuits structured to functionally execute certain operations and aspects of the controller 9002. The controller 9002 is depicted as a single device positioned on the multi-port power converter 108, but the controller 9002 may be a distributed device having portions positioned on a vehicle controller, in a manufacturing or service tool, on a server (e.g., a cloud-based or internet accessible server), or combinations of these. In certain embodiments, aspects of the controller 9002 may be implemented as computer readable instructions stored on a memory, as logic circuits or other hardware devices structured to perform certain operations of the controller 9002, and/or as sensors, data communications, electrical interfaces, or other aspects not depicted. The example controller 9002 includes a component bank configuration circuit 9102 structured to interpret a port electrical interface description 9104. The example of FIG. 91 depicts the port electrical interface description 9104 communicated to the component bank configuration circuit 9102, but the port electrical interface description 9104 may additionally or alternatively be stored in a memory on or in communication with the controller 9002. The example controller 9002 further includes a component bank implementation circuit 9106 that provides solid switch states 9108 in response to the port electrical interface description 9104, where the component bank 9004 is responsive to the solid switch states 9108, thereby setting up the connections between components on the component bank and the ports on the multi-port power converter 9008 to provide the desired electrical interfaces, including varying DC voltage inputs/outputs and/or varying AC voltage inputs/outputs.

The example controller 9002 further includes a load/source drive description circuit 9110 structured to interpret source/load drive characteristics 9112. The source/load drive characteristics 9112 are depicted as being communicated to the controller 9002, but may additionally or alternatively be stored in a memory on or in communication with the controller 9002. The source/load drive characteristics 9112 provide for any characteristics for driving a particular load, such as required phases, frequencies, rise time parameters, and/or may include qualitative functions such as emergency shutoff commands required to be supported or the like. The example controller 9002 further includes a load/source drive implementation circuit 9114 that provides a component driver configuration 9116. The component driver configuration 9116 may be, for example, the actual gate driver controls utilized to drive the components of the component bank 9004. In certain embodiments, components of a component bank 9004, such as SiC solid state inverter/converter components, are provided with gate driver controls from the manufacturer. In certain embodiments, the component driver configuration 9116 provides interface commands and requests that are passed to the manufacturer gate driver controls to make appropriate requests for driving the components such that the source/load drive characteristics 9112 are met. The actual arrangement and location of the gate driver controls is not limiting, and any arrangement is contemplated herein and can be accommodated for a particular system. It can be seen that the example controller 9002 of FIG. 91 provides for rapid configuration of electrical characteristics at the ports of a multi-port power converter 9008, including configured driver controls that are motor agnostic (e.g., able to scale across a range of motor capabilities, and meet the mechanical requirements of the motor), without hardware changes to the multi-port power converter 9008.

Referencing FIG. 151, an example component bank configuration circuit 9102 may be further structured to interpret a port configuration service request value (e.g., port configuration request 15102), and wherein the component bank implementation circuit 9106 further provides the solid switch states 9108 in response to the port configuration service request value 15102. The component bank configuration circuit 9102 may be further structured to interpret a port configuration definition value 15104, and wherein the component bank implementation circuit 9106 further provides the solid switch states in response to the port configuration definition value 15104. Accordingly, the controller 9002 for a system may be responsive to configuration requests and/or configuration definitions for events such as: service, integration, manufacture, remanufacture, upgrades, upfits, and/or changes to an application of the of the system.

Figure 92:
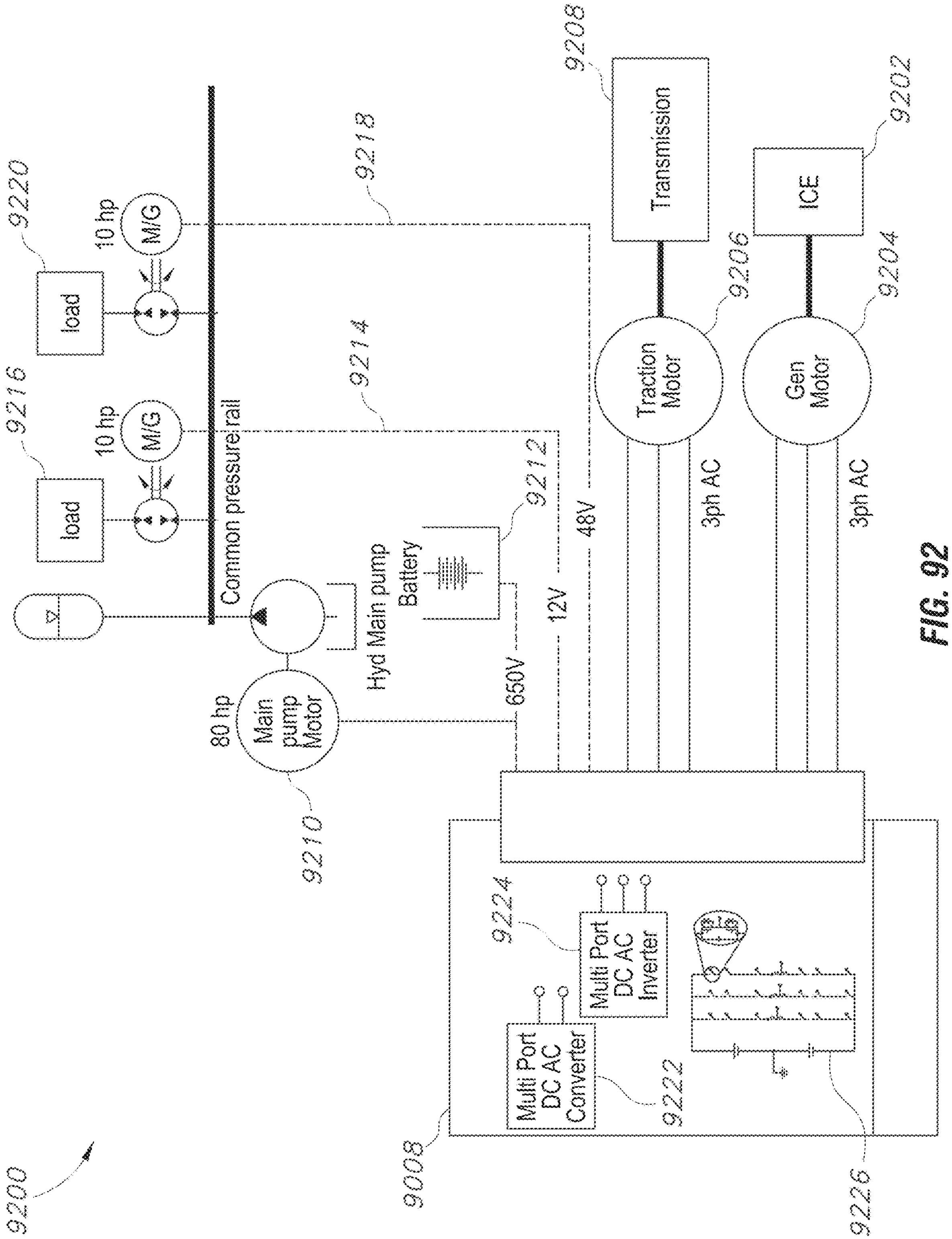
FIG. 92 depicts a schematic diagram of a controller with multi-port power converter.

Referencing FIG. 92, an example system 9200 is depicted including a multi-port power converter 9008. The example system 9200 may be an actual contemplated system—for example a serial hybrid vehicle having a plurality of DC loads, a traction motor, an internal combustion engine with a motor/generator interface to the multi-port power converter 9008, and a high voltage battery. In certain embodiments, a system 9200 may be a representative system for a class of applications—for example including a sufficient number of interfaces and loads such that, if the example system 9200 can be sufficiently supported, then a multi-port power converter 9008 to support that system would be capable to support an entire class of applications without hardware changes. In certain embodiments, a multi-port power converter 9008 may be designed in more than one version, for example to support a similar number of electrical interfaces and number of types of interfaces, but have distinct components such as to support a high voltage level in one version, and a lower voltage level in another version. It can be seen that an example system 9200 will still be useful as an actual system to be built that can be repeated with few hardware changes to support similar classes of applications, or as a representative system where a limited number of selected hardware changes in the multi-port power converter 9008 can support a large class of applications.

The example system 9200 includes an internal combustion engine 9202. The internal combustion engine 9202 represents any prime mover or power source, and may additionally or alternatively include a grid power connector, fuel cell, or other device. In certain embodiments, the internal combustion engine 9202 provides power to the multi-port power converter 9008 during certain operating conditions, and can accept power from the multi-port power converter 9008 during other operating conditions. The example system 9200 further includes a motor/generator 9204 that electrically interfaces the internal combustion engine 9202 with the multi-port power converter 9008, and is typically (but may not be) an AC device having a relatively high power rating (e.g., 80 hp in the example). Where necessary for the application or the class of applications under consideration, the motor/generator 9204 is capable to transfer power in either direction—accepting power from the internal combustion engine 9202 and/or returning power to the internal combustion engine 9202. The example depicts the multi-port power converter 9008 having a 3-wire interface to the motor/generator 9204, although any interface may be supported.

The example system 9200 further includes a traction motor 9206, which may be an AC motor and/or motor/generator, and is depicted with a 3-wire interface to the multi-port power converter 9008. In the example of FIG. 92, the traction motor 9206 drives a transmission 9208, but the traction motor 9206 may drive any traction device, for example providing motive power to the vehicle or other device. The transmission 9208 represents conceptually any primary powered component for the system 9200, and may additionally or alternatively be a pump or other high power requirement device in the system. Additionally, the transmission 9208 may not be present, and the traction motor 9206 may interface directly with the primary powered component. The example of FIG. 92 is a "serial hybrid" example, where the prime mover 9202 and the primary load 9208 are electrically separated, although a given system 9200 (whether an actual designed system or a representative system for designing in appropriate capability to a multi-port power converter 9008) may be a "parallel hybrid" (e.g., the prime mover 9202 is capable to fully or partially drive the primary load 9208 directly, at least intermittently), a fully electrical system (e.g., where the prime mover 9202 is not present, and/or is only utilized as a backup power supply), and/or any other arrangement (e.g., where shaft power from some other source is provided in addition to or at the position of the prime mover 9202 depicted in FIG. 92). In certain embodiments, an arrangement such as the serial hybrid arrangement of FIG. 92 is contemplated for a system or a representative system, because the serial hybrid arrangement provides a number of interface requirements to the multi-port power converter 9008 that are sufficient to also support other systems (e.g., serial hybrid or fully electric), and accordingly a multi-port power converter 9008 capable to support a serial hybrid arrangement is capable to support a large class of systems, vehicles, and applications without hardware changes to the multi-port power converter 9008.

The example system 9200 of FIG. 92 further depicts a number of DC loads and sources. In the example of FIG. 92, a high voltage DC interface (650 V, in the example) couples to a high voltage battery 9212 and a main pump motor 9210 (e.g., supporting a hydraulic pump for an off-road vehicle having a large hydraulic system). The main pump motor 9210 and the high voltage battery 9212 are depicted as coupled to the same 650V circuit, although a large DC load (e.g., the main pump motor 9210) and a high voltage battery 9212 need not be at the same voltage on a particular system. In the example of FIG. 92, the main pump motor 9210 is also rated at 80 hp—which in the example allows for the motor/generator 9204 to fully support either traction loads or main pump loads, which may be a contemplated arrangement for a particular system or a contemplated system to support a class of applications. However, in certain embodiments, a main DC load and/or the traction load may differ, and the motor/generator 9204 may support only a highest one of the available loads, all of the available loads simultaneously, and/or support some other load value (e.g., an expected average load over the operating cycle of the application, a load value that is expected to rely upon net battery 9212 discharging during some operating periods, or the like). In certain embodiments, the motor/generator 9204 may not be present, or may have a load capability unrelated to the DC and/or traction loads on the application.

In the example of FIG. 92, a 12 V DC interface 9214 is depicted, which in the example of FIG. 92 drives an actuator to operate a load 9216 using the hydraulic pressure from the main pump motor 9210. In the example, the 12 V DC interface 9214 is coupled to the load 9216 allowing for both actuation and regenerative recovery from the load 9216. The directional operation of power on the 12 V DC interface 9214 drives a configuration of the components in the multi-port power converter 9008 to allow for both powering the 12 V DC interface 9214 and recovering energy from the 12 V DC interface 9214, and can be utilized for any 12 V DC operations (e.g., vehicle accessories, low power devices, etc.). In certain embodiments, power recovered on the 12 V DC interface 9214 may be returned to the high voltage battery 9212, provided to a low voltage battery interface (not shown), and/or used for other loads in the system.

In the example of FIG. 92, a 48 V DC interface 9218 is depicted, which in the example of FIG. 92 drives an actuator to operate a second load 9220 using the hydraulic pressure from the main pump motor 9210. In the example, the 48 V DC interface 9218 is coupled to the load 9220 allowing for both actuation and regenerative recovery from the load 9220. The directional operation of power on the 48 V DC interface 9218 drives a configuration of the components in the multi-port power converter 9008 to allow for both powering the 48 V DC interface 9218 and recovering energy from the 48 V DC interface 9218, and can be utilized for any 48 V DC operations (e.g., vehicle accessories, refrigeration, PTO devices, etc.). In certain embodiments, power recovered on the 48 V DC interface 9218 may be returned to the high voltage battery 9212, provided to a low voltage battery interface (not shown), and/or used for other loads in the system.

It can be seen that a system 9200 such as depicted in FIG. 92 can readily provide for integration and support to a large number of applications with minimal changes for design of the interface to the multi-port power converter 9008, and with no changes to hardware or selected versions from a small number of hardware versions of the multi-port power converter 9008. Certain application differences can be supported without changes—for example the types of loads on a 12 V interface 9214 can be changed without any hardware or even calibration changes in the controller 9002. Certain application differences can be supported with only calibration changes in the controller 9002—for example switching a 12 V interface 9214 to a 24 V interface (or some other value). Certain application differences can be supported with only a minor hardware version change—for example switching a high voltage DC from 650 V to 900 V may require only a different version of the multi-port power converter 9008 having a more capable SiC component that can interface with the higher voltage. It can also be seen that many application changes can be accommodated at selected points in the manufacturing cycle, including at design time of the multi-port power converter 9008, at a OEM phase (e.g., integrating the multi-port power converter 9008 with a selected driveline), at a bodybuilder phase (e.g., integrating a particular vehicle or specific loads with the multi-port power converter 9008), and/or after the application has been in use (e.g., changing or upgrading an electrical system of the vehicle, changing a power rating, performing a remanufacture or upgrade of the application, and/or changing a basic use scenario or duty cycle for the system, vehicle, or application). Additionally or alternatively, versions of the multi-port power converter 9008 may be configured for different applications that are electrically similar (e.g., the same or similar number of distinct voltages, electrical types, and power ratings required) but have different certifications or regulations applicable, where the configuration of the multi-port power converter 9008 is otherwise similar, but the components, diagnostics, or other aspects of the multi-port power converter 9008 are configured in each version for the different certifications, regulations, or other requirements of each class of applications. For example, an electrically similar on-road and off-road application may have distinct requirements for certifications and/or a different regulatory requirement for components on the multi-port power converter 9008.

Figure 107:
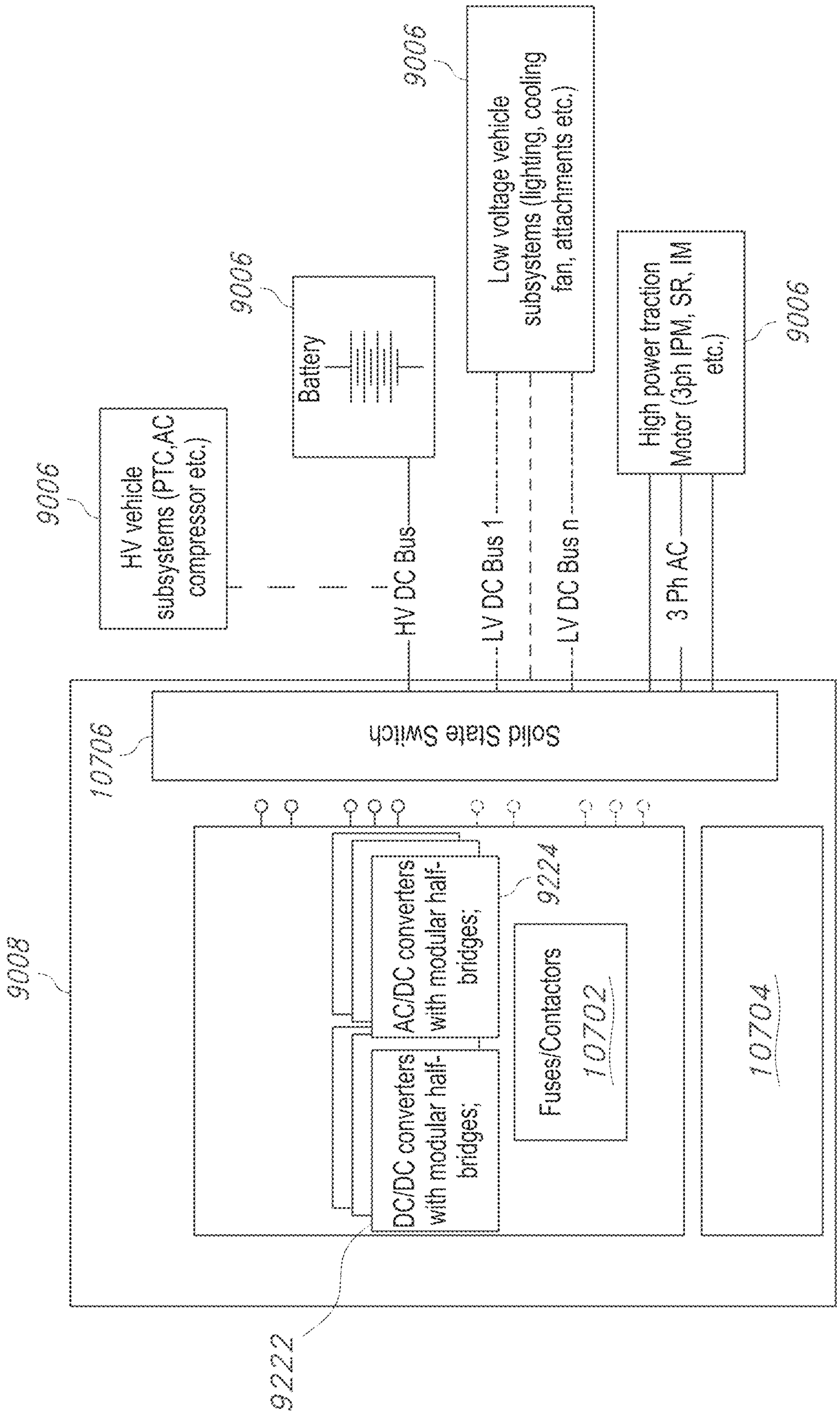
FIG. 107 depicts a schematic diagram of a multi-port converter with solid state switch.
Figure 108:
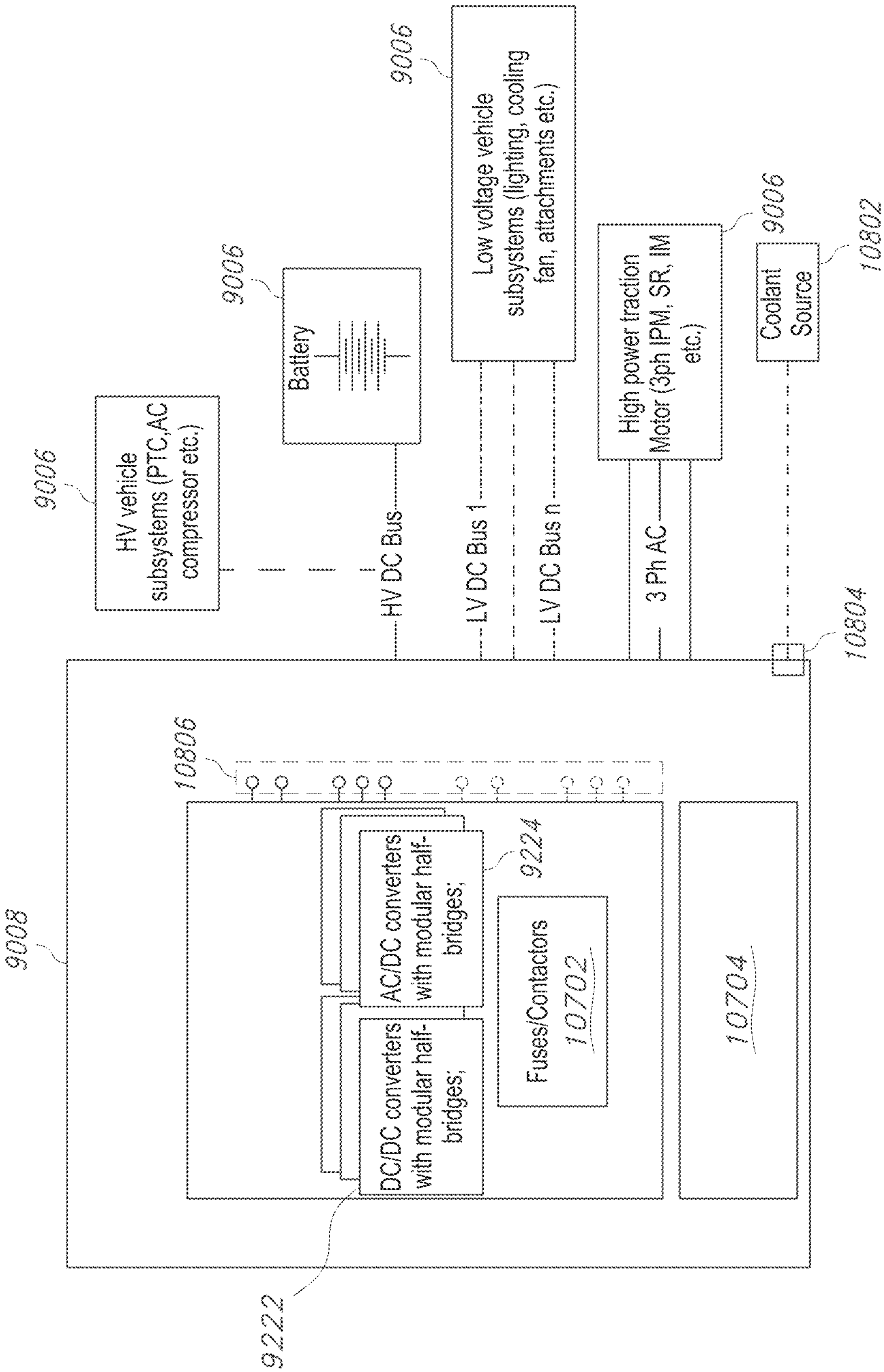
FIG. 108 depicts a schematic diagram of a multi-port converter.

Referencing FIG. 107, an example X-port converter 9008 is depicted, which is similar to the embodiment depicted in FIG. 92. In the example of FIG. 107, the X-port converter 9008 further includes fuses/contactors 10702, which may be provided on circuits to be used for power connections, and/or may be configured to be coupled into selected circuits by solid state switches. The example X-port converter 9008 further includes a solid state switch bank 10706 positioned between the power electronics 9222, 9224 and coupling ports on the housing of the X-port converter 10706, allowing for configured power electronics, fuses, and/or contactors to be directed into the circuit associated with any selected port. The example X-port converter 9008 further includes a controller 10704, which may be responsive to commands to configure the converter, to interrogate electrical sources and loads to determine their electrical characteristics, and/or to determine power exchange parameters (e.g., regenerative loads received, etc.) and improve the efficiency of operations of the converter to support the loads and sources. Referencing FIG. 108, an example X-port converter 9008 is depicted, which is similar to the embodiment depicted in FIG. 107. In the example of FIG. 108, the port bank 10806 may not include a solid state switch bank. In the example of FIG. 108, ports of the converter 9008 have configurable electrical characteristics, but may have less flexibility than the example of FIG. 107. For example, a given port may be a dedicated AC port in the example of FIG. 108, with configurable voltage, frequency, and phase ratings, where in the example of FIG. 107 a given port may be switchable between AC and DC. The example converter 9008 of FIG. 108 additionally includes a coolant port (e.g., a coolant inlet coupling and a coolant outlet coupling) for coupling to a coolant source 10802 (e.g., the primary cooling system for an electric mobile application). In the example, the coolant coupling 10804 provides for a consistent cooling interface to all power electronics. The coolant coupling 10804 may be present in any embodiment of the converter 9008.

It can be seen that the systems described herein provide for a high machine level efficiency for systems, vehicles, and applications at a lower cost than previously known systems. Additionally, the ease and selectability of integration of the systems herein enable the use of hybrid, fully electric, and/or regenerative systems for applications not previously available due to the difficulty of integration and/or low volumes of such applications that prohibit development of a hybrid, fully electric, and/or regenerative system for such applications. The systems described herein are scalable to different power ratings and voltage levels on both DC and AC portions of the system. Additionally, energy recovery systems for a wide variety of loads, such as for hydraulic loads, motive loads, PTO loads, pneumatic loads, and/or any other type of load that is capable of interfacing with an electrical system of any type can readily be supported, including as a class of applications that are supported without hardware changes to a multi-port power converter 9008. Additionally, the systems herein are agnostic to the motor and/or motor/generator requirements for a particular application, and can support any type of electrical interface without hardware changes and/or with only minimal calibration changes in a controller 9002 at a selected point in a manufacturing cycle, and including post-use changes such as for upgrades, remanufacture, service, and/or maintenance. The systems herein provide for a ready interface and integration with prime movers or power sources, traction drive, and system loads. Both load support and energy recovery are readily supported on any interface of the multi-port power converter 9008. A wide variety of previously known applications do not utilize hybridization and/or electrification due to the integration, certification, and/or number of diverse loads on those systems that prohibit reasonable integration of hybrid and/or electrified actuation and energy recovery of various loads—such as pumps, cranes, heavy-duty work vehicles, wheel loaders, aerial lift trucks, and tractors. The systems herein provide for ease of design and integration with any such applications, including the support of classes of applications with a configurable multi-port power converter 9008 able to accommodate the classes of applications without hardware changes, and/or using a small selected number of hardware versions. The use of SiC components in a multi-port power converter 9008 can provide 5-10% power conversion efficiency improvement in electrical conversion, and the addition of energy recovery and prime mover optimization (e.g., operating a prime mover in efficient operating regions a greater percentage of the time during operations) can result in overall machine level efficiency gains of >50% for applications where previously known systems do not enable adoption of hybridization and/or electrification of loads and energy recovery. The systems herein provide for ready adoption of hybridization and electrification of loads on an application where previously known systems are not feasible for integration, and provides for selected engagement of the design of the multi-port power converter 9008 in the manufacturing and supply chain to further improve ease of integration and enable adoption for applications where previously known systems are not viable.

Figure 93:
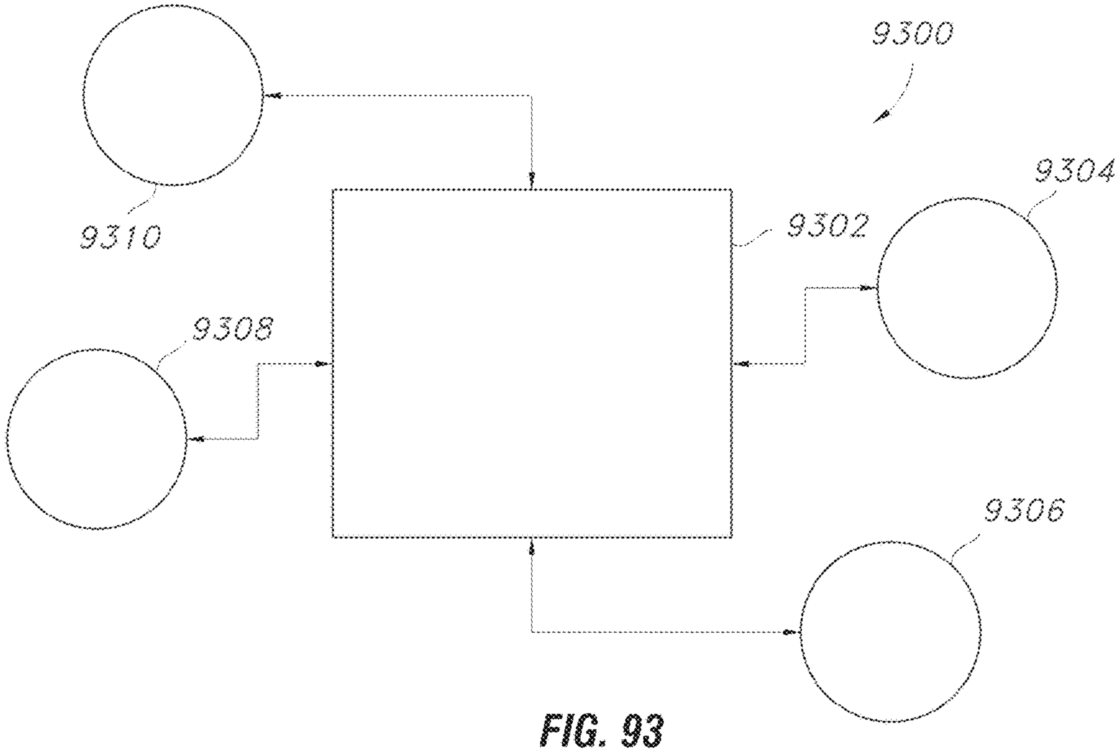
FIG. 93 depicts an embodiment functional diagram of a breaker-relay.

Referencing FIG. 93, an example breaker/relay 9302 is schematically depicted in a context 9300. The example context 9300 includes a regulatory interface 9304, for example including legal or industry regulations, policies, or other enforceable frameworks for which the breaker/relay 9302 is responsible to maintain certain performance characteristics. The example regulatory interface 9304 may be physically manifested during run-time operations of an application having the breaker/relay 9302 thereon—for example as a network communication, calibrated value for a response, selection of a sizing of a component of the breaker/relay 9302 or the like, and/or the regulatory interface 9304 may represent one or more design time considerations made during the selection, installation, repair, maintenance, and/or replacement of a breaker/relay 9302 that are not physically manifested during run-time operations of the application having the breaker/relay 9302 thereon.

The example context 9300 further includes a command and/or control interface 9306, which may include signals, voltages, electrical couplings, and/or network couplings over which commanded functions (e.g., connector open or closed commands) are received by the breaker/relay 9302. In certain embodiments, the breaker/relay 9302 includes only electromechanical components—for example where the breaker/relay 9302 does not include a microprocessor, controller, printed circuit board, or other "intelligent" features. In certain embodiments, the breaker/relay 9302 includes some functions controller locally on the breaker/relay 9302, and other functions controller elsewhere on an application having the breaker/relay 9302 thereon—for example on a battery management system controller, vehicle controller, power electronics controller, and/or having aspects distributed across one or more controllers. In certain embodiments, certain command or control aspects are provided as physical or electrical commands, and other command or control aspects are provided as communicative elements (e.g., datalink or network commands) and/or as intelligent aspects of the breaker/relay 9302 determined in accordance with programmed logic in response to detected or otherwise determined parameters during run-time operations.

The example context 9300 further includes an environmental interface 9308, such as the vibration, temperature events, shock, and other environmental parameters experienced by the breaker/relay 9302. Aspects of the environmental interface 9308 may be physically manifested in the breaker/relay 9302, for example through material design selections, sizing and location of parts, connector selections, active or passive cooling selections, and the like. Additionally or alternatively, the planned or experienced duty cycle, power throughput, or the like may be a part of the environmental interface 9308 of the breaker/relay 9302.

The example context 9300 further includes a high voltage interface 9310, for example a coupling to the high voltage battery of a system, to system loads, to a charger, or the like. In certain embodiments, the high voltage interface 9310 is physically manifested on the breaker/relay 9302, for example with voltage ratings, sizes of components, ratings of current sensors (where present), material selections, and the like. Any example features of a breaker/relay as described throughout the present disclosure may be included herein for an example breaker/relay 9302, including without limitation arc extinguishing features, contactor design elements, connector contact force affecting aspects, and the like. Any aspects of the context 9300 may be included or omitted, and the described aspects of the context 9300 are not limiting to the contemplated context 9300 of a particular breaker/relay 9302. Additionally, it will be understood that the organization of context 9300 aspects is an example for clarity of description, but that particular aspects 9304, 9306, 9308, 9310 may be omitted, separated, and/or present on other aspects 9304, 9306, 9308, 9310 in certain embodiments. For example, a voltage limit, time limit for response, etc. may be understood to originate from a regulatory interface 9304 in one embodiment, from a command/control interface 9306 in another embodiment, and from both interfaces 9304, 9306 in yet another embodiment.

Figure 94:
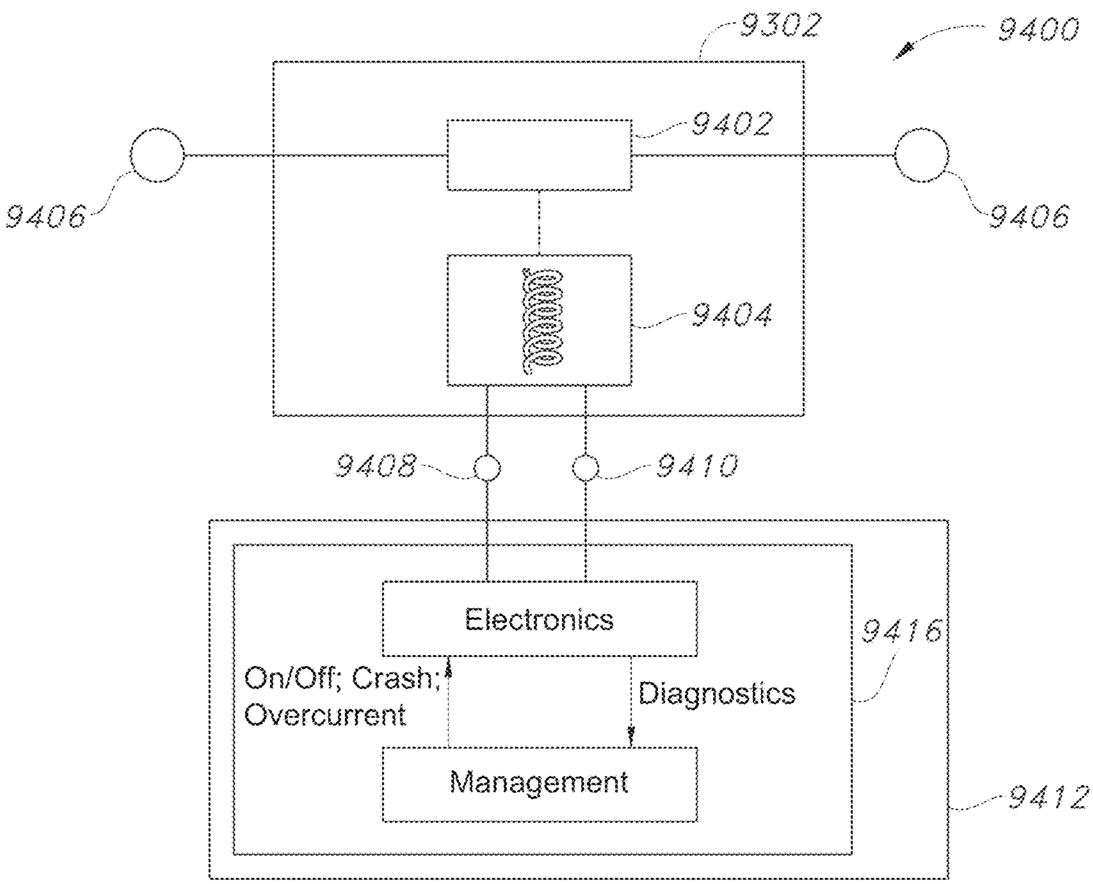
FIG. 94 depicts an embodiment schematic diagram of a breaker-relay.
Figure 96:
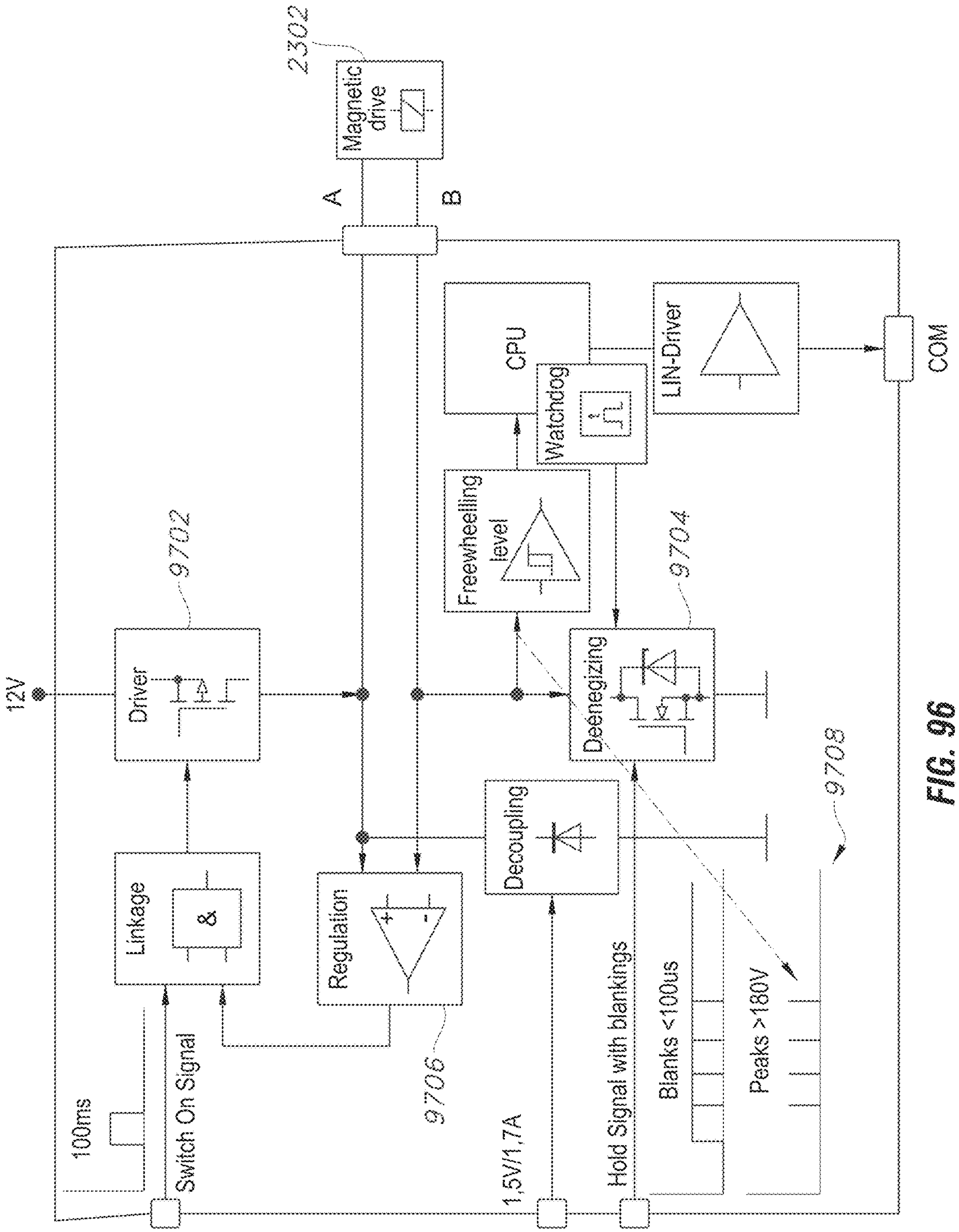
FIG. 96 depicts an embodiment schematic diagram of breaker-relay operations.

Referencing FIG. 94, an example breaker/relay architecture 9400 is depicted. The example breaker/relay 9302 includes all electronic control functions positioned away from the breaker/relay 9302, with only electro-mechanical hardware remaining on the breaker/relay 9302. The example breaker/relay 9302 includes a contactor 9402 movably operated by a coil 9404, for example a high voltage contactor that is normally open or normally closed, and wherein power to the coil 9404 provides for opening or closing force to the contactor 9402. In certain embodiments, the contactor 9402 is normally open, and power to the coil 9404 closes the contactor 9402. The example architecture 9400 further includes a high voltage circuit 9406 switched by the contactor 9402, and a pair of input signals—for example an A input 9408 and a B input 9410, although any number and type of input signal is contemplated herein. An example system is depicted in FIG. 96 showing example operations of the Electronics to control the example breaker/relay 9302 (Magnetic drive 2302 in the depiction of FIG. 96). The example architecture 9400 further includes an external controller 9412, for example a battery management controller, vehicle controller, or other controller present on an application, the external controller 9412 including the Electronics portion and a Management portion. For the example architecture 9400, the Electronics portion schematically depicts a controller configured to manage direct opening and closing control of the breaker/relay 9302 and to communicate diagnostic information about the breaker/relay 9302. The Management portion schematically depicts the sourcing of external commands to the breaker/relay 9302, for example to command the breaker/relay 9302 on or off, to implement an over-current shutdown, and/or to implement an auxiliary or safety shutdown (e.g., a crash signal, service event signal, or the like). The Electronics and Management portions are depicted in an arrangement for clarity of description, but it is understood that aspects of the Electronics and Management portions may be distributed throughout a system, and/or portions of the Electronics may be positioned on a breaker/relay 9302.

Figure 95:
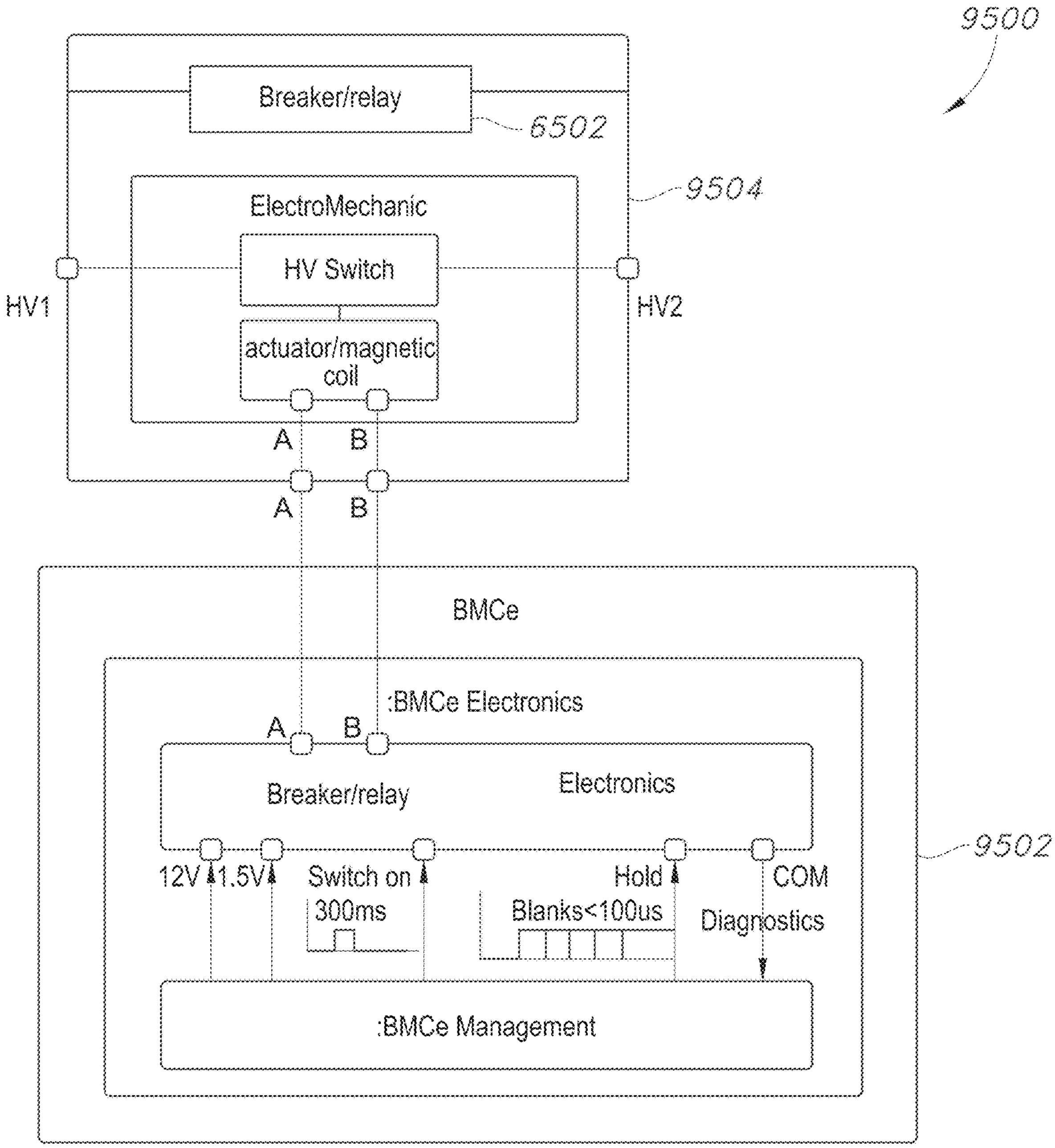
FIG. 95 depicts an embodiment schematic diagram of a breaker-relay configuration showing certain voltage, amperage, and time-based values.

Referencing FIG. 95, an example system 9500 is depicted showing certain voltage, amperage, and time-based values for an example system. The example system 9500 includes a switch on signal having certain electrical characteristics and a hold signal having certain electrical characteristics, which are non-limiting examples. The example system 9500 is consistent with certain embodiments of the architecture 9400 depicted in FIG. 94. An example breaker/relay consistent with certain embodiments of the system of FIG. 95 is responsive to an 8.2V switch-on voltage, a holding voltage of 1.5V, and includes a 3 Ohm resistance in the actuating coil.

Referencing FIG. 96, operations of an example Electronics portion of an architecture 9400 such as that depicted in FIG. 94 are shown for purposes of illustration. It will be understood that components of a system such as in FIG. 96 may be implemented in hardware, software, logic circuits, and/or may be combined or distributed about a system. The example Electronics include a Switch On response, with a 12 V control voltage applied to the module. The actual drive coil of the breaker/relay can be switched to the control voltage via a deenergizing circuit and driver. The switch-on driver 9702 is controlled at approximately 65% of the minimum nominal voltage (e.g., rated value <70% or 8.2 V) for 100 ms. The timing, voltage, and switching logic of Switch On operations are non-limiting examples. During Switch On operations, the drive coil is energized with the pull-in current, so that the drive can switch on.

An example Electronics includes a Regulation response. An example Regulation response includes linearly regulating the voltages during the Switch On process, for example using a control circuit (Regulation) and Linkage for the duration of the switch-on process (e.g., 100 ms) thereby applying a selected actuating voltage to the drive coil.

An example Electronics includes a Hold response. The example Hold response includes disabling the Driver after the Switch-on time period, and providing the drive coil with a hold signal (e.g., 1.5 V) that remains on constantly, and/or constantly with diagnostic interruptions (e.g., see schematic voltage graph 9708).

In certain embodiments, the deenergizing transistor is checked at selected intervals (e.g., depending upon the Fault Tolerant Time Interval, a regulatory or policy interval, and/or an interval of interest). If the deenergizing transistor is defective (e.g., if it is permanently conductive), the breaker/relay will be reliant on turning off the 1.5V supply to de-energize the magnetic drive. While the system can still be turned off, the operations with a defective deenergizing relay may be slower than anticipated, and/or too slow for the breaker/relay to be compliant. In certain embodiments, the frequent blanking pulses (or diagnostic interruptions) lead to cut-off voltage peaks at the coil connection (Freewheeling level, approx. 180V in the example system). If the voltage peaks remain off, the deenergizing transistor can be diagnosed as defective. In certain embodiments, the blanking pulses are kept short, thereby keeping the energy in the freewheeling circuit low, reducing waste energy and heating, and also keeping the holding energy low to reduce noise emissions. In certain embodiments, 100 micro-second blanking pulses are sufficient. In certain embodiments, faster or slower blanking pulses may be utilized In certain embodiments, diagnostics of the deenergizing relay and/or system responses (e.g., a more conservative shut-off to account for slower response) may be utilized, in the Electronics, the Management, or elsewhere in the system.

An example Electronics includes a Switch-off and/or deenergizing response. In the example, turning off the 1.5V holding voltage deactivates the deenergizing circuit above a trigger voltage of about 4.5V (nominal <50%*Urated=6V).

Certain further example embodiments of systems having a breaker/relay device incorporated therein are set forth following. Any one or more aspects of the following systems may be included within any other systems or portions of a system described throughout the present disclosure. Any one or more aspects of the following systems may be utilized in performing any procedure, operations, or methods herein.

Figure 97:
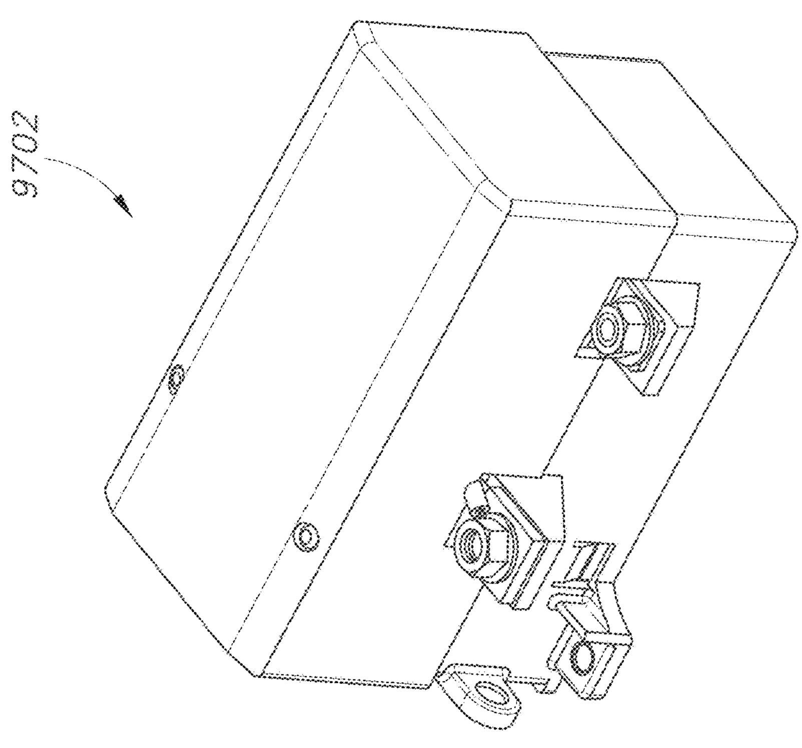
FIG. 97 depicts an embodiment breaker-relay device with pre-charge circuit.

Referencing FIG. 97, an example system 9702 includes a breaker/relay device having a pre-charge circuit, a current sensor, and a pyro-switch device positioned within a single housing. Referencing FIG. 98, the system 9207 is depicted with a transparent housing for convenience of illustration. The example system 9702 includes the breaker/relay 6502, a current sensor 6706, a pre-charge fuse 6406, and a pre-charge contactor 6408 positioned within the housing and arranged to electrically interface with a power circuit, such as a mobile power circuit for a mobile electric application.

Figure 98:
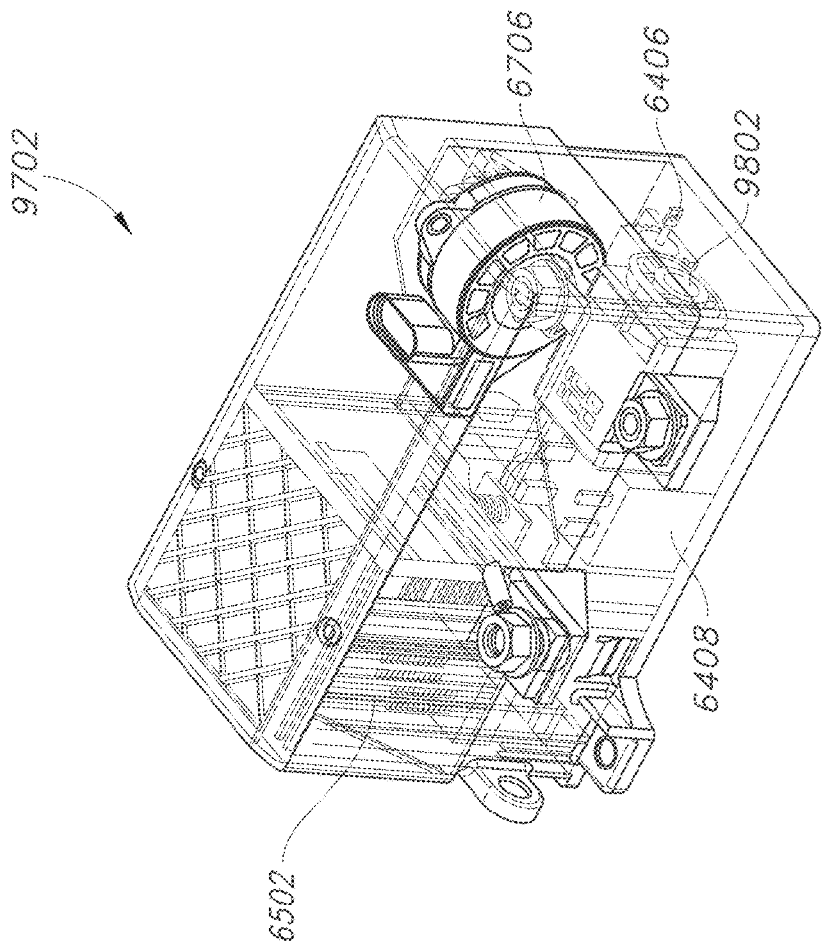
FIG. 98 depicts an embodiment breaker-relay device with pre-charge circuit.
Figure 99:
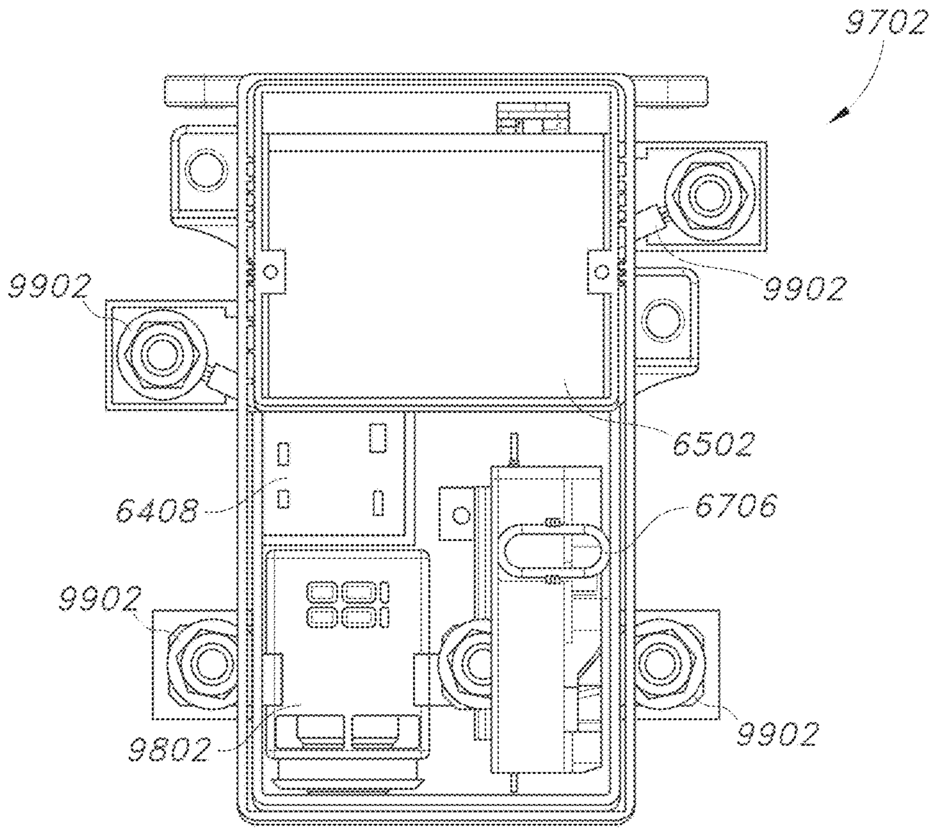
FIG. 99 depicts an embodiment breaker-relay device with pre-charge circuit.
Figure 100:
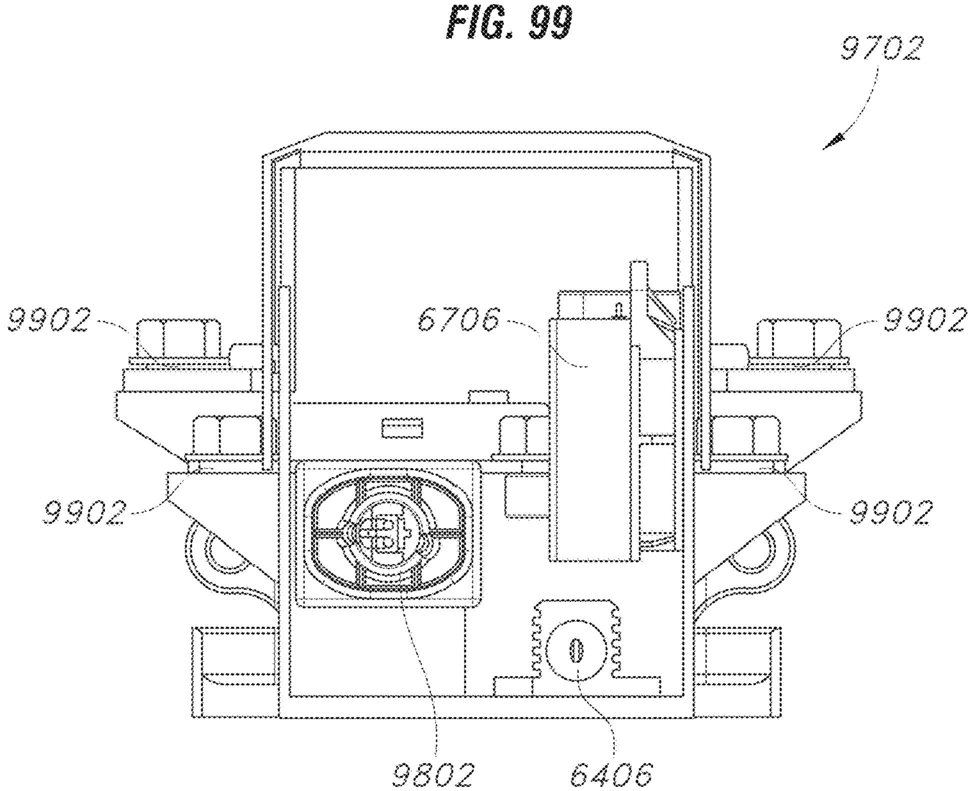
FIG. 100 depicts an embodiment breaker-relay device with pre-charge circuit.

In certain embodiments, the breaker/relay device includes any combined breaking and contacting device, for example as described throughout the present disclosure. In certain embodiments, the breaker/relay device includes a single contact (e.g., as compared with a dual contact embodiment). In certain embodiments, the breaker/relay device includes two contacts operated utilizing a single actuator. In certain embodiments, the system includes a fuse, which in the embodiment of FIG. 98 is depicted as a pyro-switch 9802 (or pyro-fuse), such as a pyrotechnically activated fuse (e.g., a fuse separated at a selected time by operating a small explosive device to break the circuit). In certain embodiments, the pyro-switch is operated on a circuit in line with one leg of the circuits controlled by the breaker/relay device 6502, for example to provide pyro-switch protection for a high side or a low side of a circuit. For convenience of illustration, the pre-charge circuit wiring is not depicted. The pre-charge circuit may be wired in parallel with a contactor of the breaker/relay 6502, and/or in parallel with the pyro-switch 9802. Referencing FIG. 99, a top schematic view of the system 9702 is depicted, showing an illustrative arrangement of the components in the system. The example system 9702 includes high voltage connections 9902, such as a low and high side connection to a power source (e.g., a high voltage battery) and a low and high side connection to a load (e.g., a motor providing motive power). Referencing FIG. 100, a side schematic view of the system is depicted, from an end having the pyro-switch 9802 and the pre-charge fuse 6406.

In certain embodiments, the system 6702 (e.g., a "breaker/relay PDU") has a mass that does not exceed 5 kg, and/or does not exceed 1.5 kg. In certain embodiments, a dimension of the breaker/relay PDU is smaller than one or more of: a 600 mm length, a 140 mm width, and/or a 110 mm height. In certain embodiments, a dimension of the breaker/relay PDU is smaller than one or more of: a 160 mm length, a 135 mm width, and/or a 105 mm height. In certain embodiments, the breaker/relay PDU is capable to support operating at 300 A or greater continuous current flow. In certain embodiments, the breaker/relay PDU is capable to interrupt 1100 A and/or over 400 V without assistance. In certain embodiments, breaker/relay PDU is capable to interrupt 8,000A and/or over 400 V. In certain embodiments, the breaker/relay PDU is capable to passively interrupt a short circuit condition (e.g., no outside control signal or communication required), and/or is further capable to actively interrupt other operating conditions (e.g., an active trigger command for any reason). In certain embodiments, the pyro-switch 9802 is on the negative leg of the overall circuit, although the pyro-switch may be anywhere it is desirable. In certain embodiments, the pyro-switch is actively controlled with a trigger to command an interrupt. In certain embodiments, the breaker/relay, the pyro-switch 9802, and/or both may be actively commanded to interrupt the circuit. In certain embodiments, the breaker/relay PDU is capable to support dual amp ratings, such as 90 A and 1000 A (non-limiting example).

Figure 101:
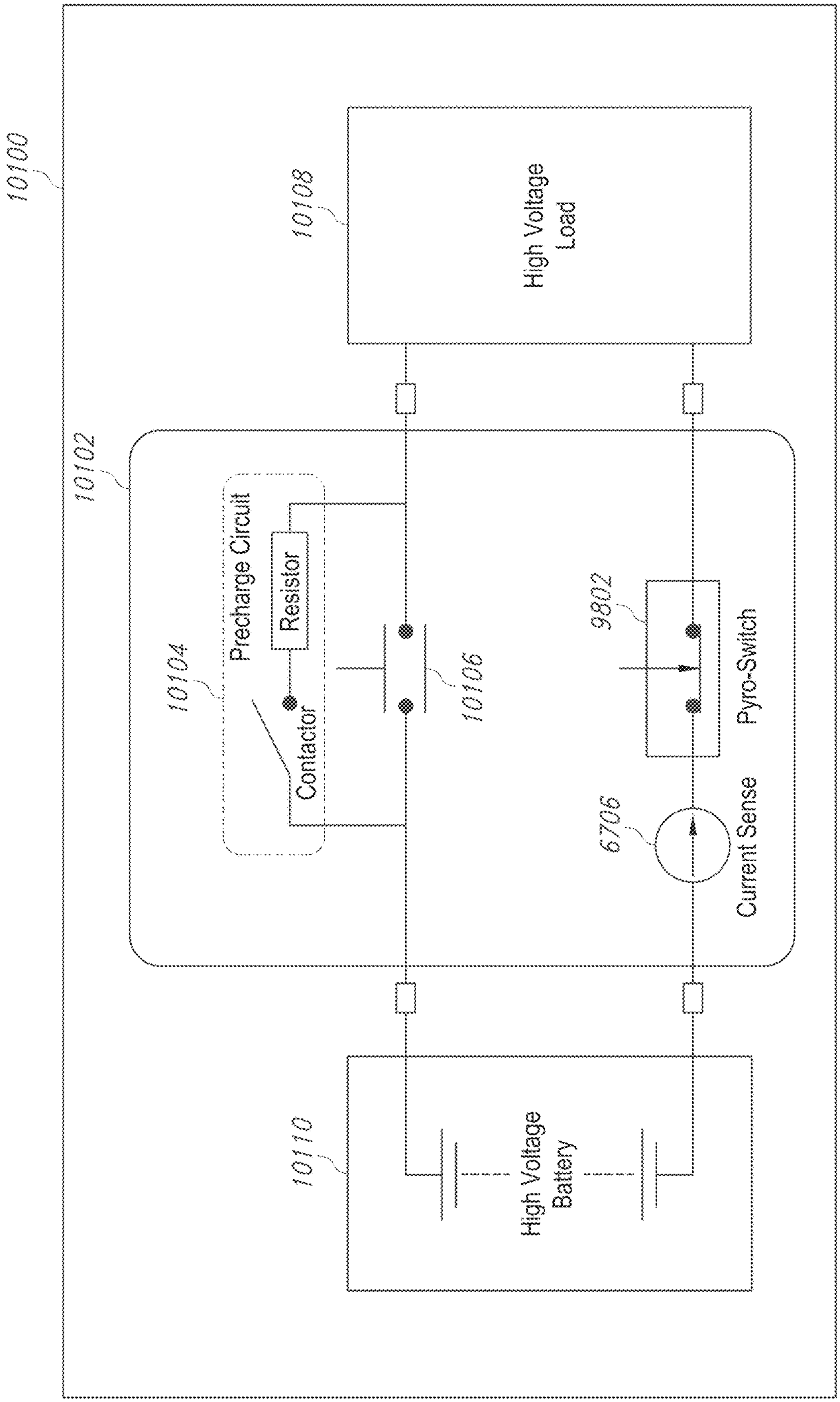
FIG. 101 depicts an embodiment schematic diagram of a single-pole breaker/relay device.

Referencing FIG. 101, an example system 10100 includes a power circuit protection arrangement for a high-voltage load, such as for a motive power circuit for a mobile application. The example system 10100 includes a breaker/relay PDU 10102, where the breaker/relay 10106 is disposed in the high-side of the motive power circuit. The example system 10100 includes a pre-charge circuit 10104, including a pre-charge resistor and a pre-charge contactor, positioned within the housing of the breaker/relay PDU 10102. The example system further includes a current sensor 6706 and a pyro-switch 9802 positioned within the housing of the breaker/relay PDU 10102. The system includes the breaker/relay PDU 10102 interfaced with a high-voltage battery 10110 on a first side, and with a high-voltage load 10108 on a second side.

Figure 102:
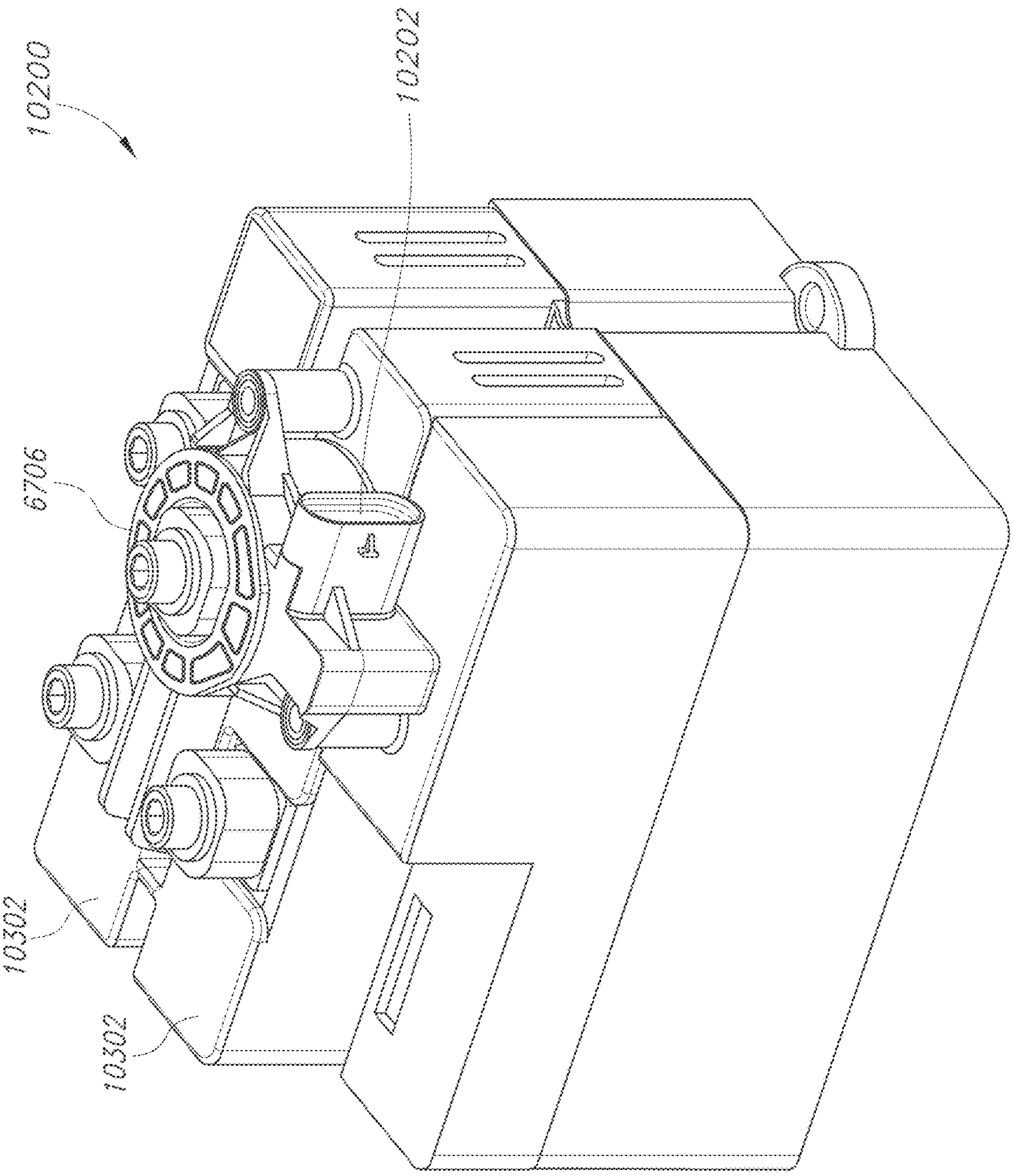
FIG. 102 depicts detail of an embodiment dual-pole breaker/relay device.
Figure 103:
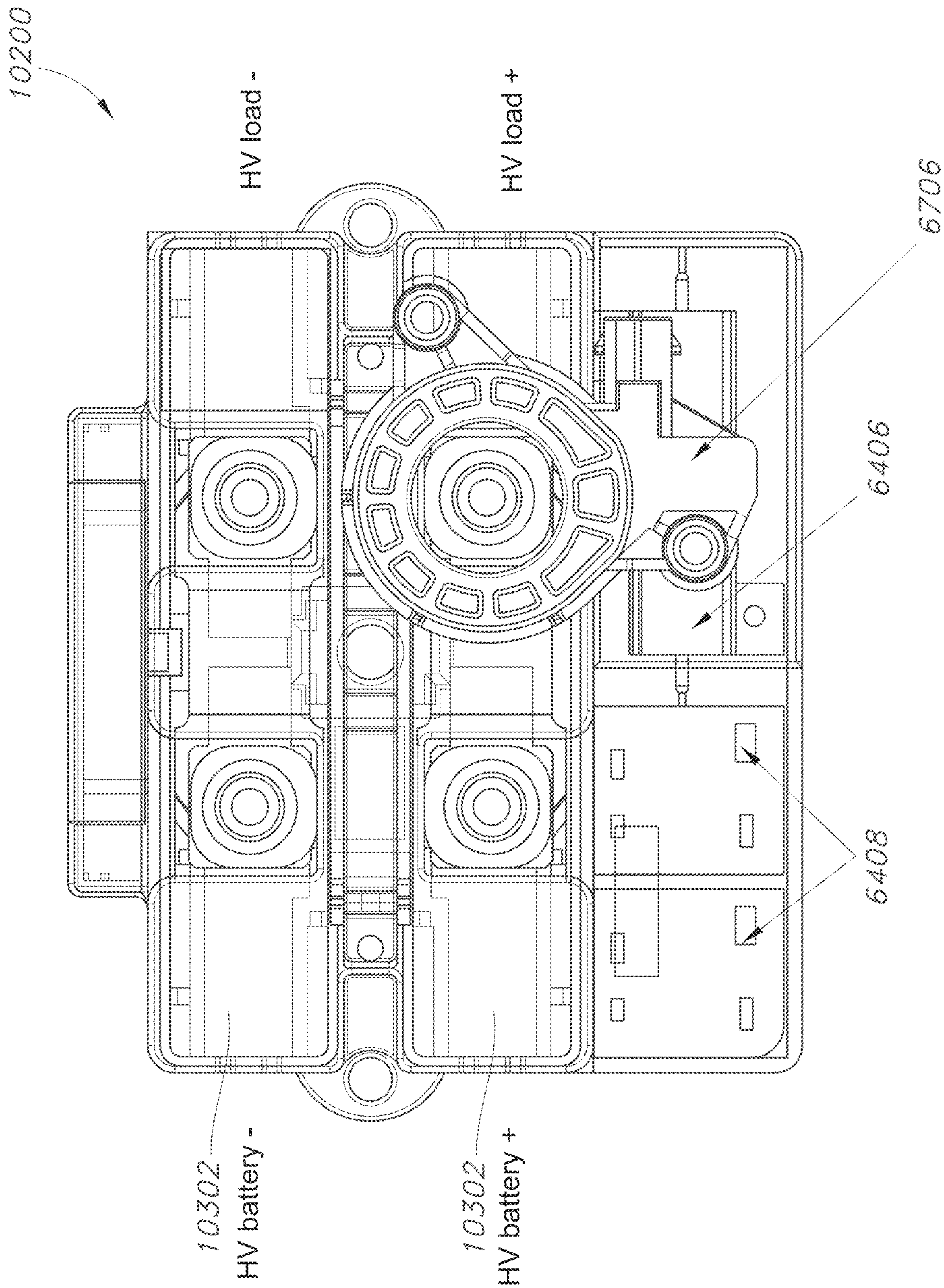
FIG. 103 depicts detail of an embodiment dual-pole breaker/relay device.
Figure 104:
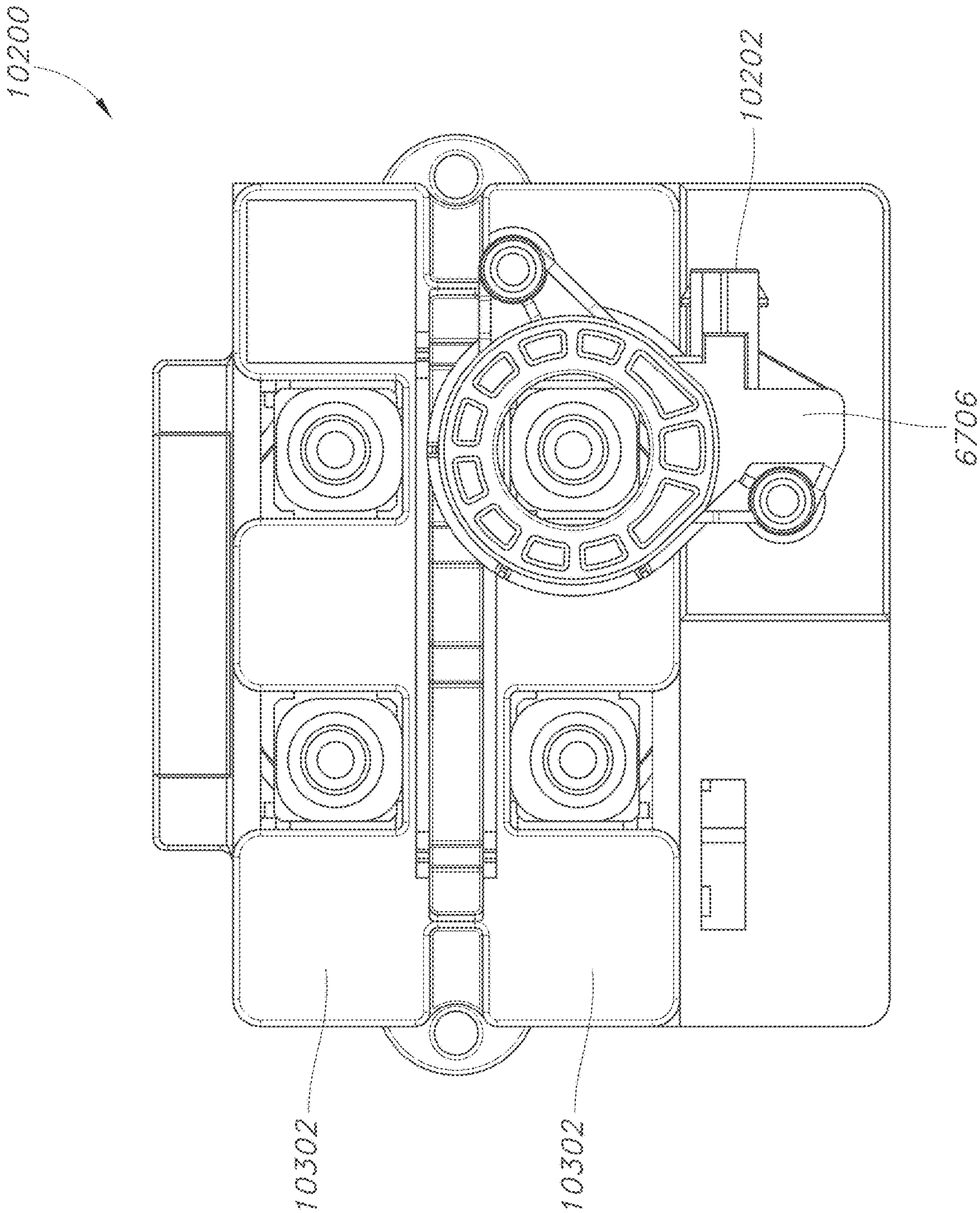
FIG. 104 depicts detail of an embodiment dual-pole breaker/relay device.
Figure 105:
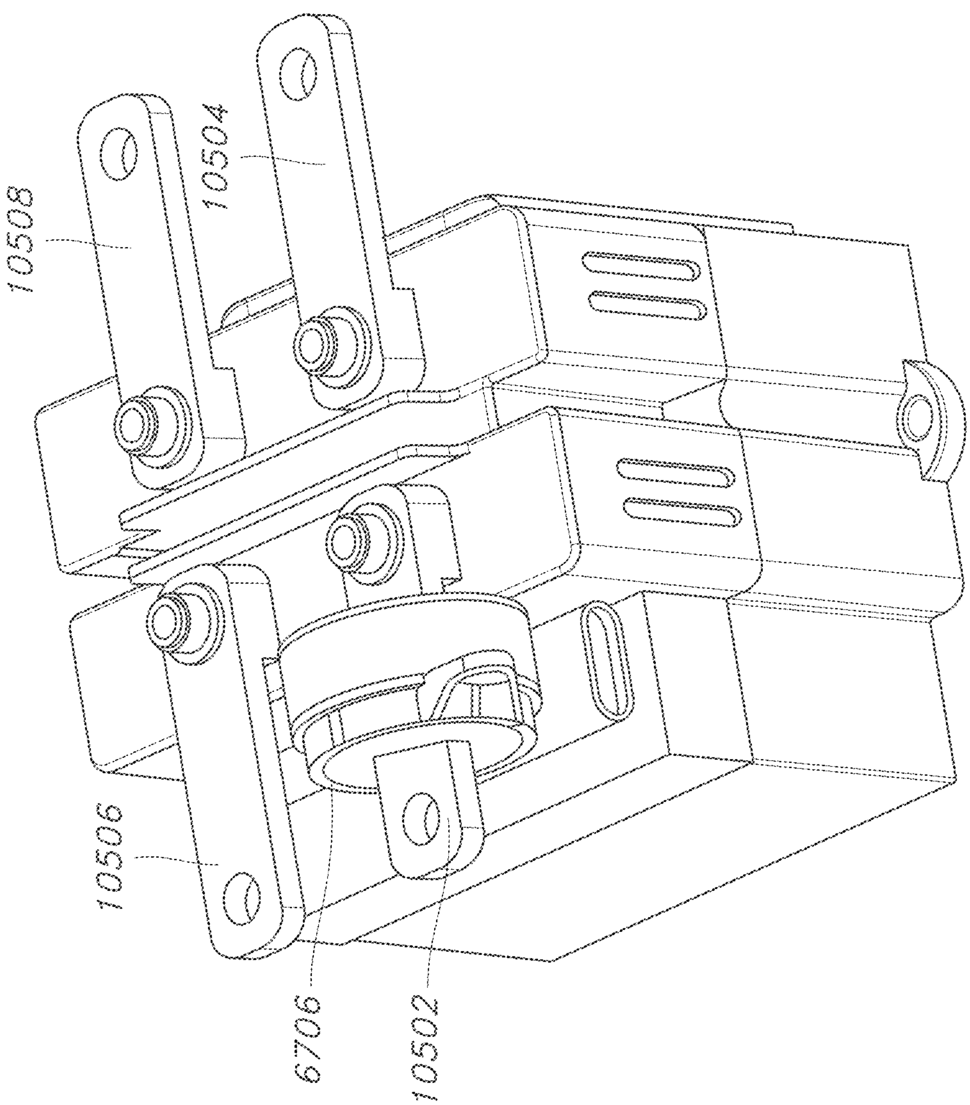
FIG. 105 depicts detail of an embodiment dual-pole breaker/relay device depicting current connection components.

Referencing FIG. 102, an oblique view of a system 10200 having a dual pole breaker/relay 10302 is depicted, with a coupled current sensor 6706 connected thereto. The example current sensor 6706 is shown with a connector 10202 for communicative coupling to a controller. Referencing FIG. 103, a top view of the system 10200 is depicted having a partially transparent top side of a housing of the system 10200. Example positions for the pre-charge fuse 6406 and pre-charge connector 6408 are shown, and coupling locations for a high voltage battery (HV battery + and −) and for a high voltage load (HV load + and −) are illustrated. Referencing FIG. 104, a system 10200 consistent with the system of FIG. 103 is depicted, with the top side of the housing of the system normally positioned. Referencing FIG. 105, an example breaker/relay PDU is depicted showing high voltage bus bar couplings 10502, 10504, 10506, 10508 to the breaker/relay PDU. In the example of FIG. 105, connection 10508 is the battery low side, connection 10506 is the battery high side, connection 10502 is the high voltage load high side, and connection 10504 is the high voltage low side. However, any arrangement of high voltage source and load connections is contemplated herein.

Figure 106:
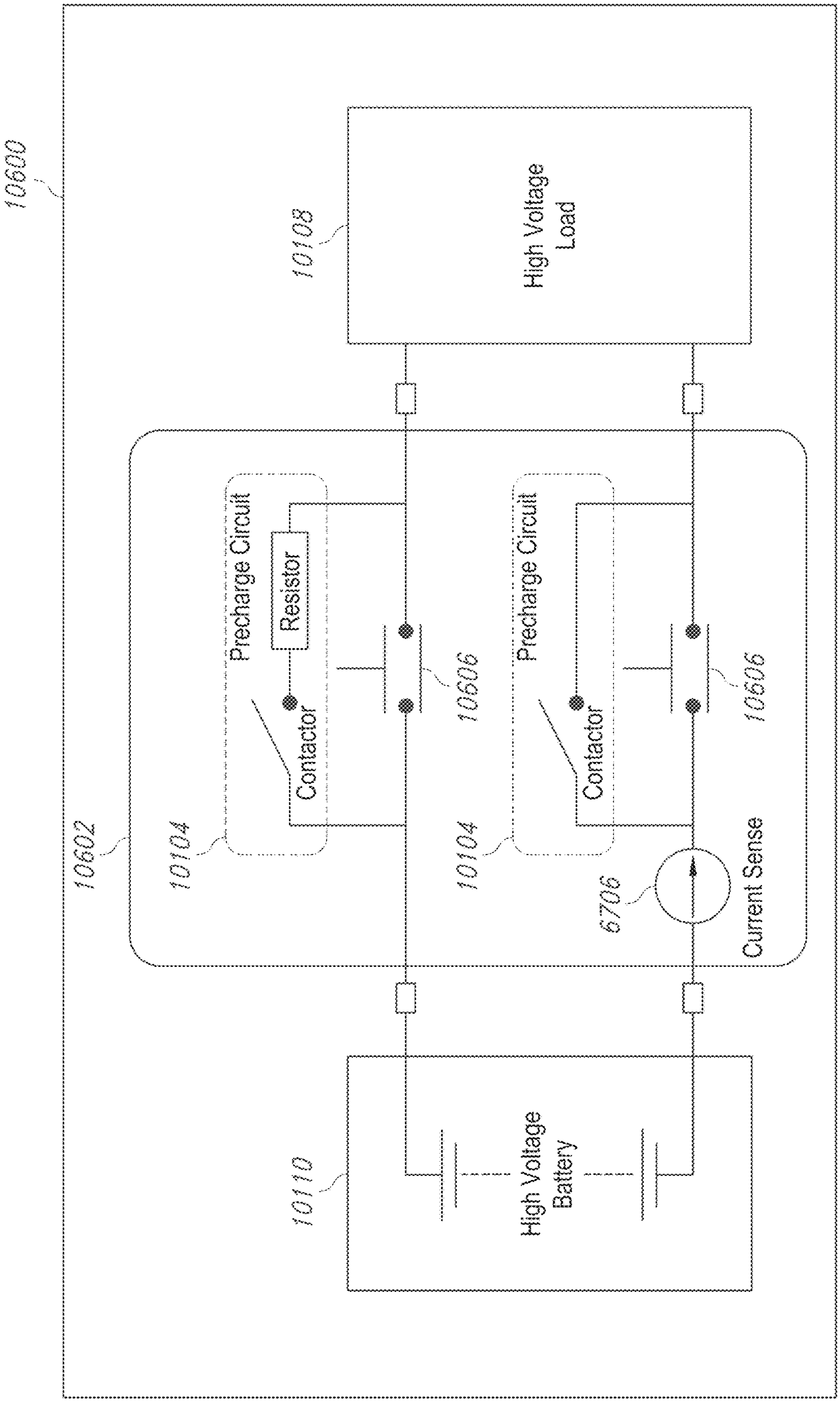
FIG. 106 depicts a schematic diagram of a breaker/relay device.

Referencing FIG. 106, an example system 10600 includes a power circuit protection arrangement for a high-voltage load, such as for a motive power circuit for a mobile application. The example system 10600 includes a dual pole breaker/relay PDU 10602, where the breaker/relay 10606 includes a first pole disposed on the high-side of the motive power circuit, and a second pole disposed on the low-side of the motive power circuit. The example system 10600 includes a pre-charge circuit 10104, including a pre-charge resistor and a pre-charge contactor, positioned within the housing of the breaker/relay PDU 10602. The example system further includes a current sensor 6706. The example system 10600 does not include a fuse or a pyro-switch, although a fuse or pyro-switch may be present in certain embodiments. The system includes the breaker/relay PDU 10602 interfaced with a high-voltage battery 10110 on a first side, and with a high-voltage load 10108 on a second side.

The example dual-pole breaker/relay device includes separate breaker/relay contactors responsive to active and passive interruption operations, having arc suppression, and/or one or more of the poles having a current sensor. In certain embodiments, each pole is disposed in a high side or a low side circuit of a system. In certain embodiments, one or more of the poles includes an integrated precharge circuit in parallel therewith.

It can be seen that the example single-pole and dual-pole breaker/relay devices provide for highly capable interruption systems, as well as systems with high flexibility on the capability. Additionally, the systems have resettable interruption (with the breaker/relay), and the integration as depicted significantly reduces the footprint from previously known systems.

Example embodiments include a high voltage electric vehicle battery power distribution system architecture that includes a breaker/relay with a precharge circuit integrated in the same housing. These two elements distribute power from one side of the battery. In addition to these two elements, the housing also contains a current sensor and pyro disconnect (e.g., pyro-switch), that are in series with each other on the opposite side of the battery.

High voltage batteries in mobile applications contain a large amount of energy, making it desirable that the rest of the vehicle and operators to be protected in the event of overload, short circuit, or emergency conditions. Previously known systems include a contactor and a fuse on the high side of the battery, a precharge circuit in parallel of the high side contactor, and a contactor and current sensor on the low side of the battery. Certain example systems of the present disclosures have at least one or more of the following benefits over previously known systems: Efficiency (e.g., power transfer, losses, reduced cooling requirements) by reducing the number of contactor poles from two to one; providing active and passive protection in overcurrent, short circuit, or emergency events, because the breaker/relay or pyro can both be actively triggered; additional break protection in an overload or short circuit event, such as physical breaking operations that do not rely upon an active and properly operating controller; size and weight advantages, because of the shared housing and combined component footprint being smaller; and the like.

Figure 109B:
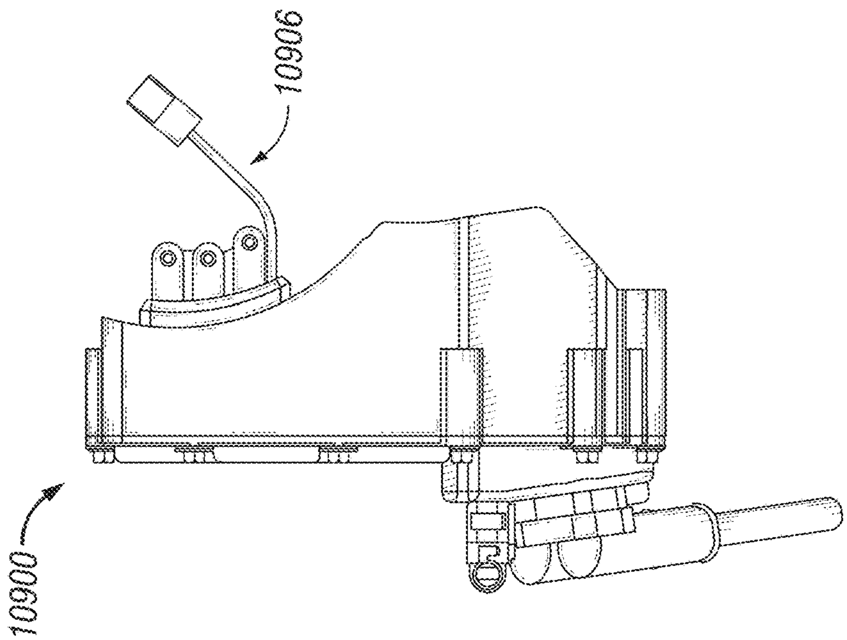
FIGS. 109A and 109B depict an integrated inverter assembly.
Figure 109A:
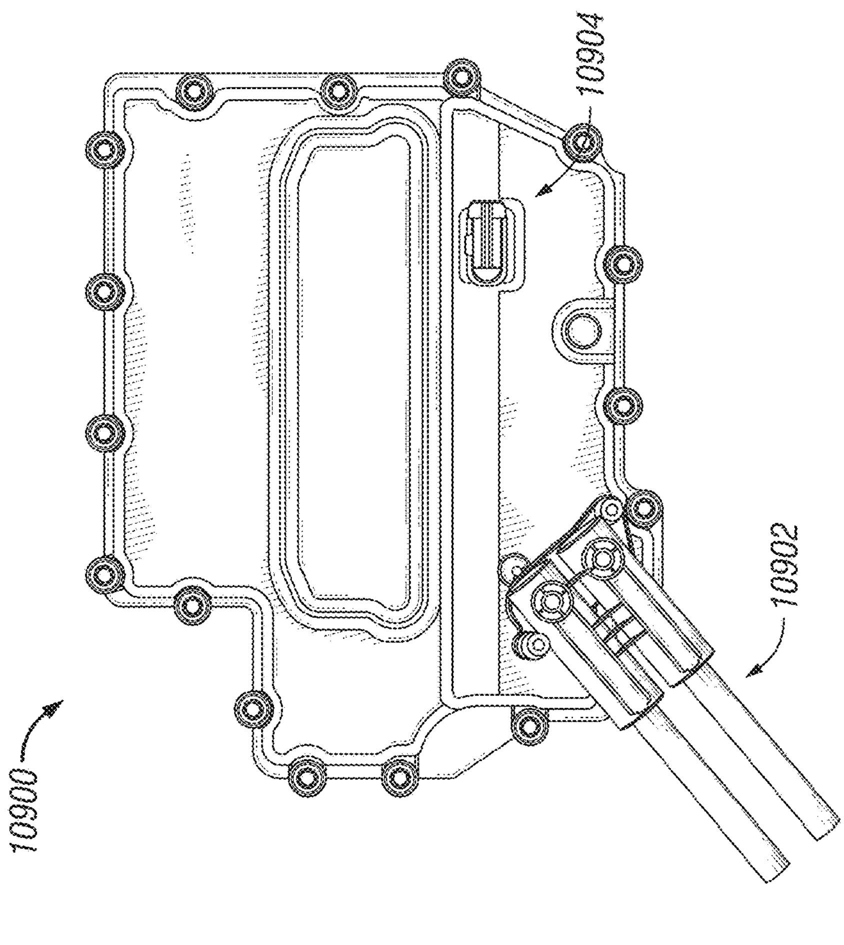

Referencing FIG. 109A, a top view and in FIG. 109 B a side view (right) of an example embodiment of an integrated inverter assembly 10900 is schematically depicted. The example of FIG. 109A, 109B includes a high voltage DC battery coupling 10902 and a vehicle (or mobile application) coupling 10904. The vehicle coupling 10904 provides for data communications, keyswitch state, sensor communications, and/or any other desired coupling aspects. Referencing FIG. 109A, 109B, a battery connector 10902 and vehicle connector 10904 are provided, which may be any type of connector known in the art and selected for the particular application. An example battery connector 10902 includes a Rosenberger HPK series connector, however any battery connector may be utilized. An example vehicle connector 10904 includes a Yazaki connector part number 7282885330, however any vehicle connector may be utilized In the example of FIGS. 109A, 109B the main cover is visible, which may be on the vertically upper portion of the integrated inverter assembly 10900 as installed on a vehicle or mobile application, although other orientations of the integrated inverter assembly 10900 are contemplated in certain embodiments of the present disclosure. In the example of FIG. 109A, 109B, a harness 10906 is depicted, which provides a connection for a motor temperature and/or position sensor. The harness 10906 may be shielded as determined according to the specific EMI environment, sensor characteristics, and/or communication mechanism between the sensor(s) and the integrated inverter assembly 10900. In the side view of FIG. 109B, the base (or back cover) can be seen.

Figure 110:
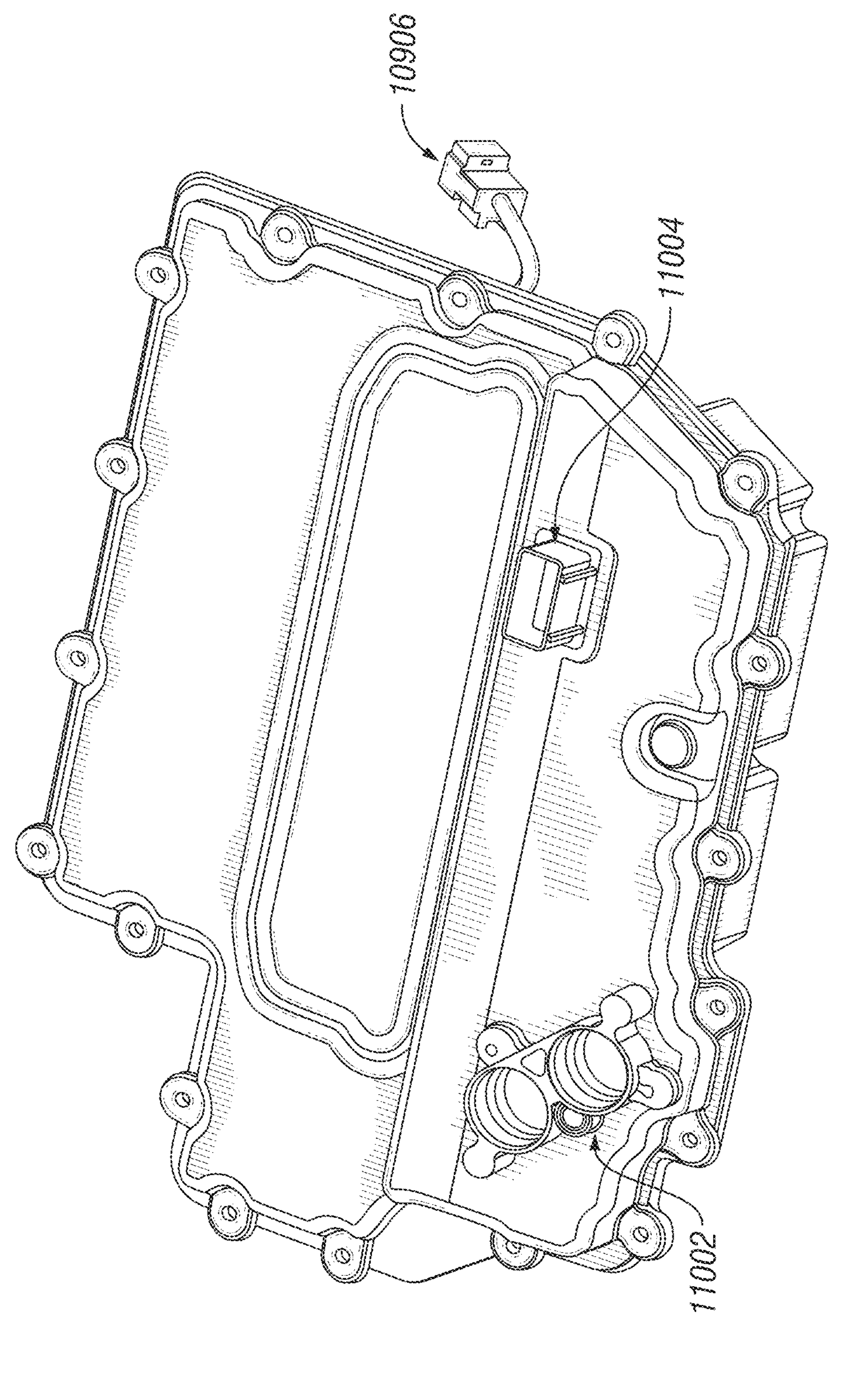
FIG. 110 depicts an integrated inverter assembly with a battery connector and vehicle connector.

Referencing FIG. 110, an underside view of the main cover of the integrated inverter assembly 10900 is schematically depicted, with certain aspects removed for clarity of the description. The integrated inverter assembly 10900 includes coolant inlet and outlet connections 11002, which may be blind connections, and/or which may be sized to accommodate an SAEJ2044 Quick Connect Coupling. The coolant connections provide for coolant flow through one or more coolant channels, as described in the present disclosure. In the example of FIG. 110, the main cover is coupled to the back cover using a cure-in-place-gasket.

Figure 111:
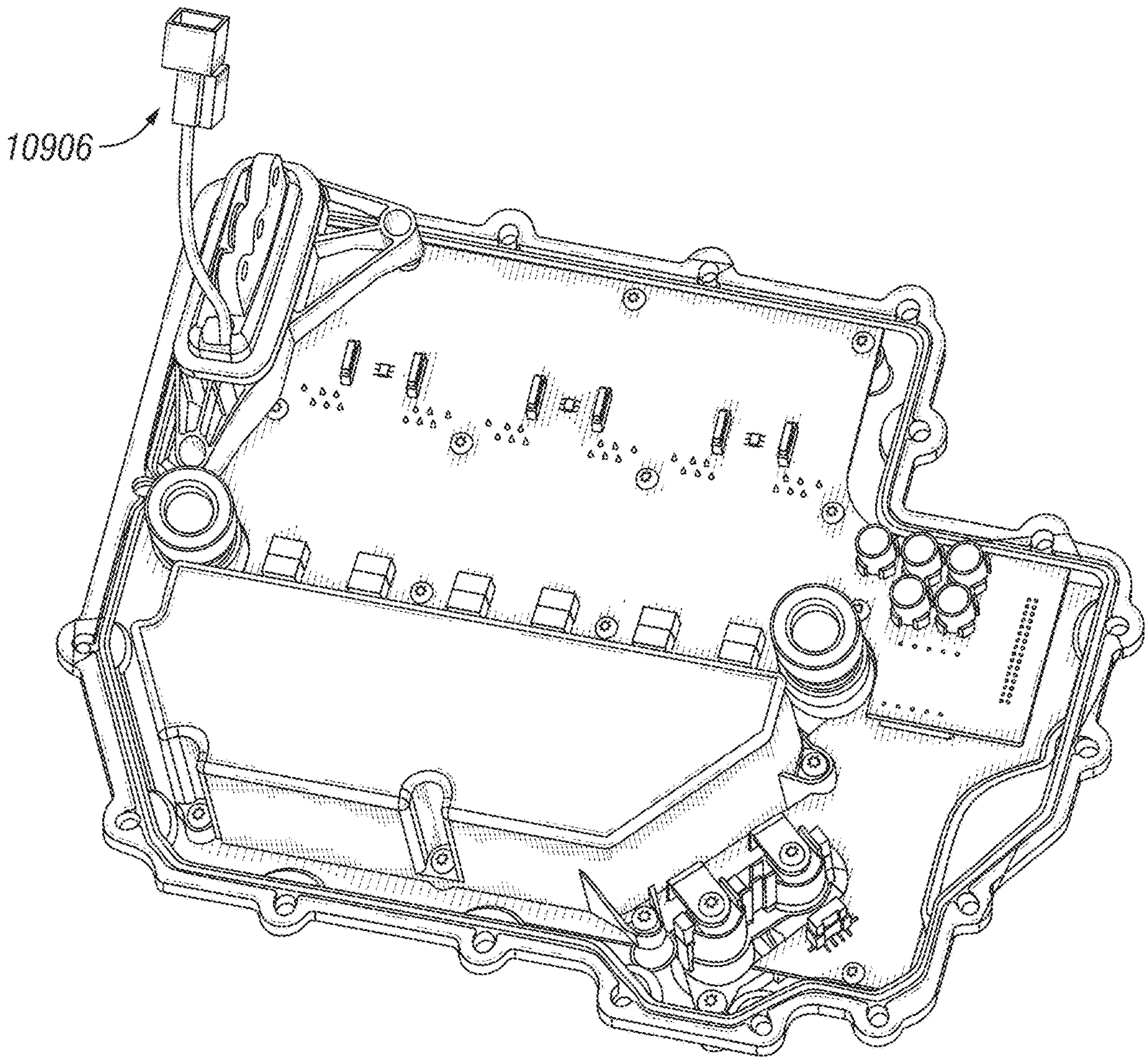
FIG. 111 depicts a view of an integrated inverter assembly.
Figure 112:
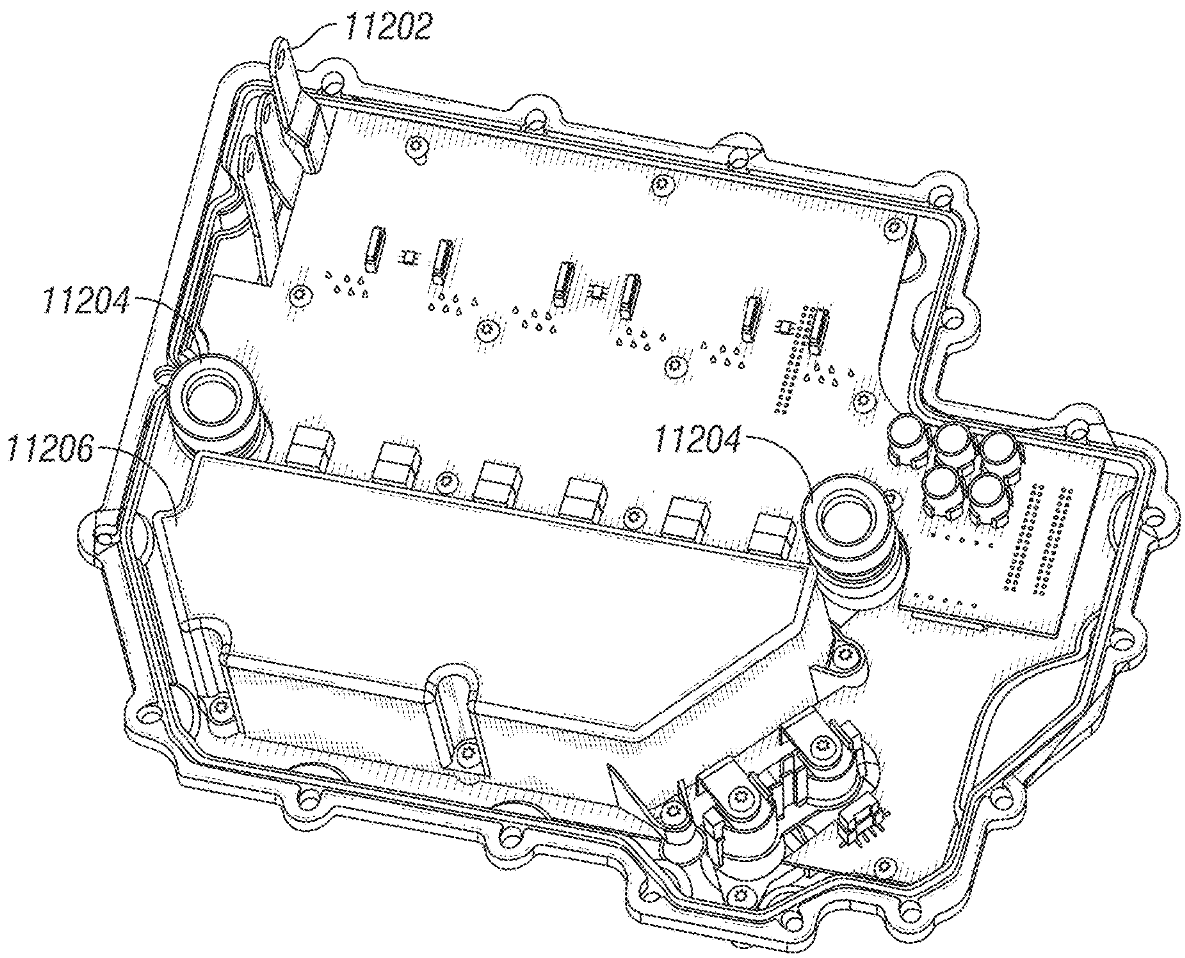
FIG. 112 depicts a view of an integrated inverter assembly.

Referencing FIG. 111, the underside view of the main cover of the integrated inverter assembly 10900 is schematically depicted, with certain aspects of the electronics packaging of the integrated inverter assembly 10900 included for reference. Referencing FIG. 112, motor connections 11202 configured for a 3-phase high voltage motor connection, for example as blades that interface with the motor connector 10906 of FIG. 111. The example of FIG. 112 depicts a printed circuit board (PCB) where the gate drivers for the inverter are mounted, as well as a current sensor corresponding to each phase of the gate drivers. The example of FIG. 112 depicts a second PCB (partially obscured by the DC link capacitor 11206) for control of the inverter, including interfaces with the vehicle, power control operations, diagnostics, and the like. The DC link capacitor 11206 provides for coupling between the DC high voltage system (e.g., the battery) and the gate drivers. In certain embodiments, the DC link capacitor 11206 may include certain power conditioning aspects, such as a capacitor, a bus bar, and/or a choke. Referencing FIG. 113, an embodiment having a coolant channel 11304 is depicted, with connector 11306 for an inverter drive of the inverter assembly 10900.

Figure 113:
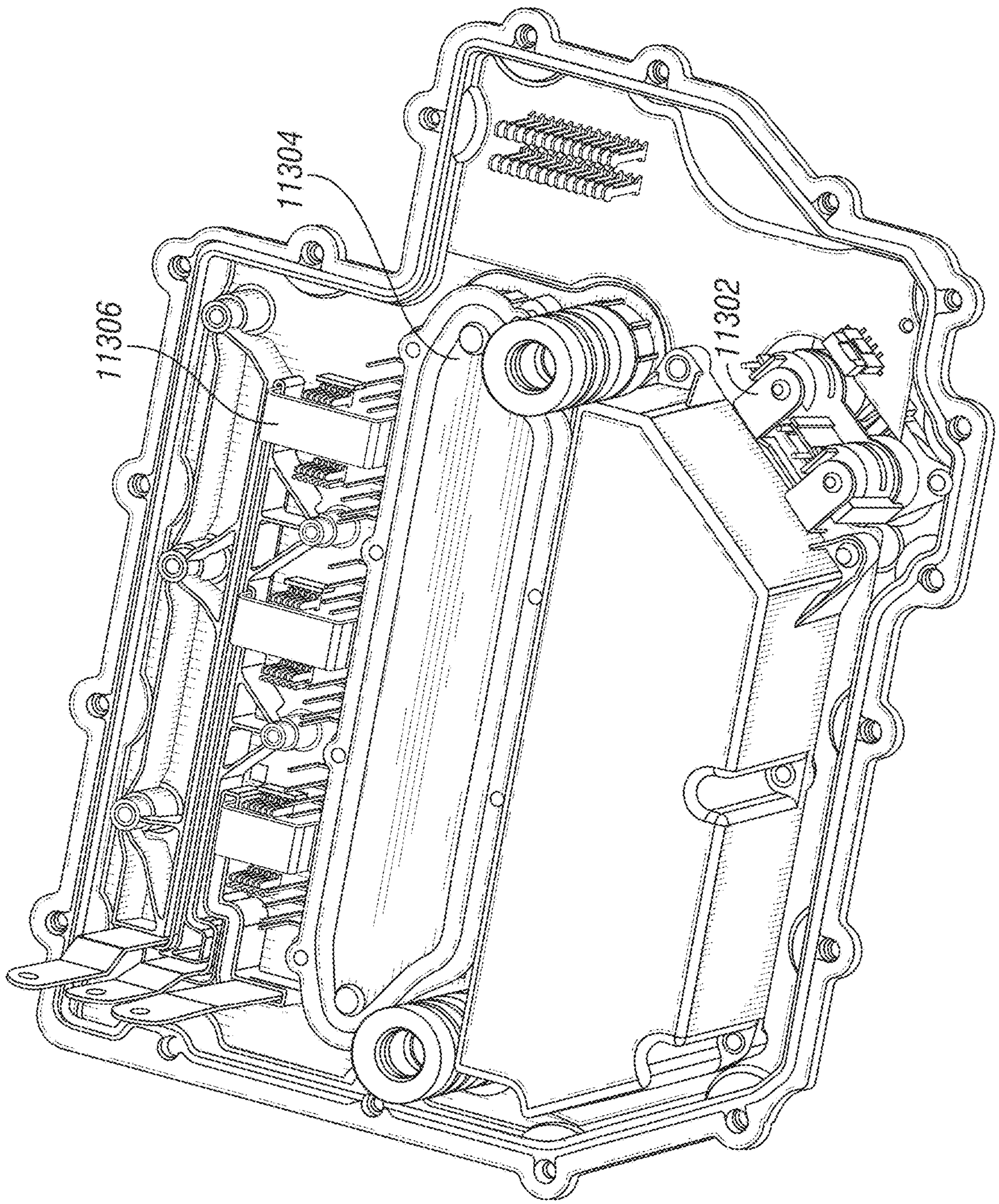
FIG. 113 depicts a view of an integrated inverter assembly with coolant channel.

Referencing FIG. 113, a top surface 11402 of a coolant channel (the upper coolant channel in the example of FIG. 113) is depicted. The gate drivers (e.g., IGBTs) are mounted in thermal contact with the coolant channel, such that coolant flowing through the coolant channel thermally communicates with the inverter power electronics.

Figure 114:
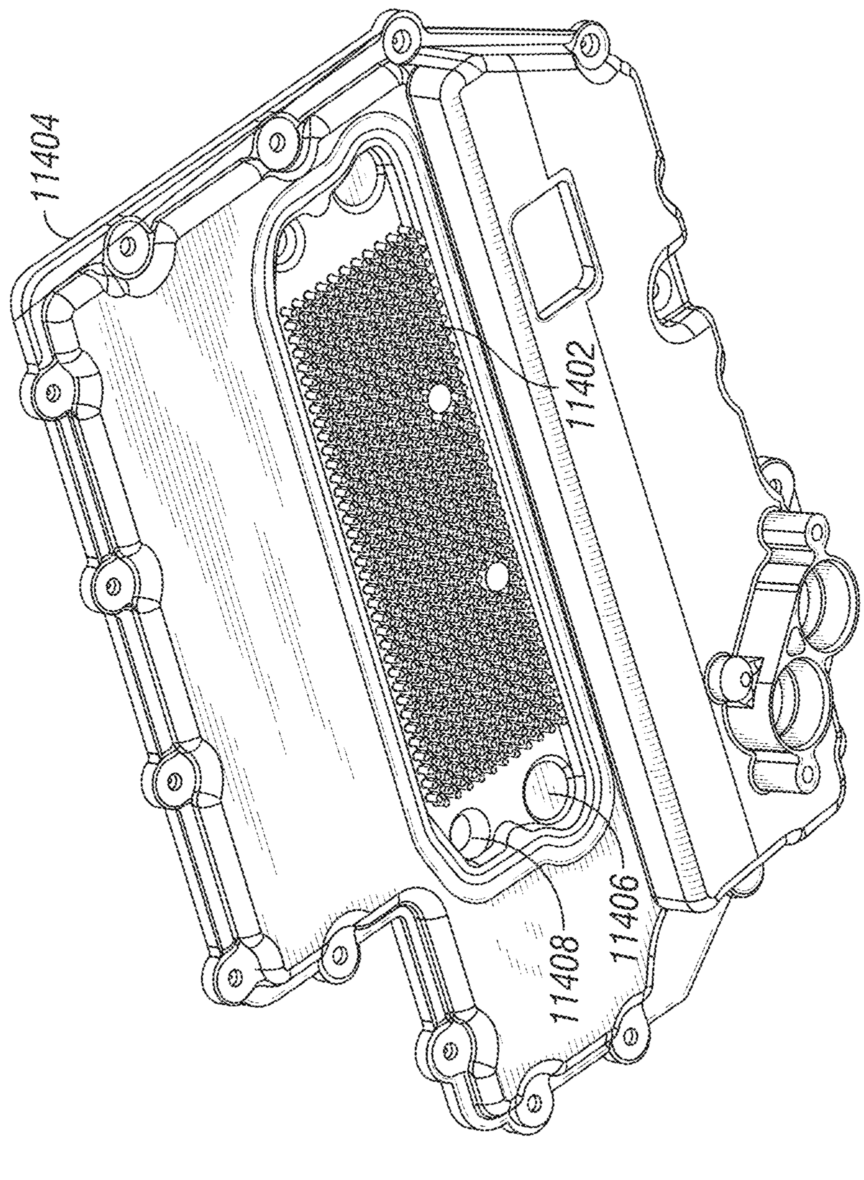
FIG. 114 depicts a view of an integrated inverter assembly with coolant channel.
Figure 115:
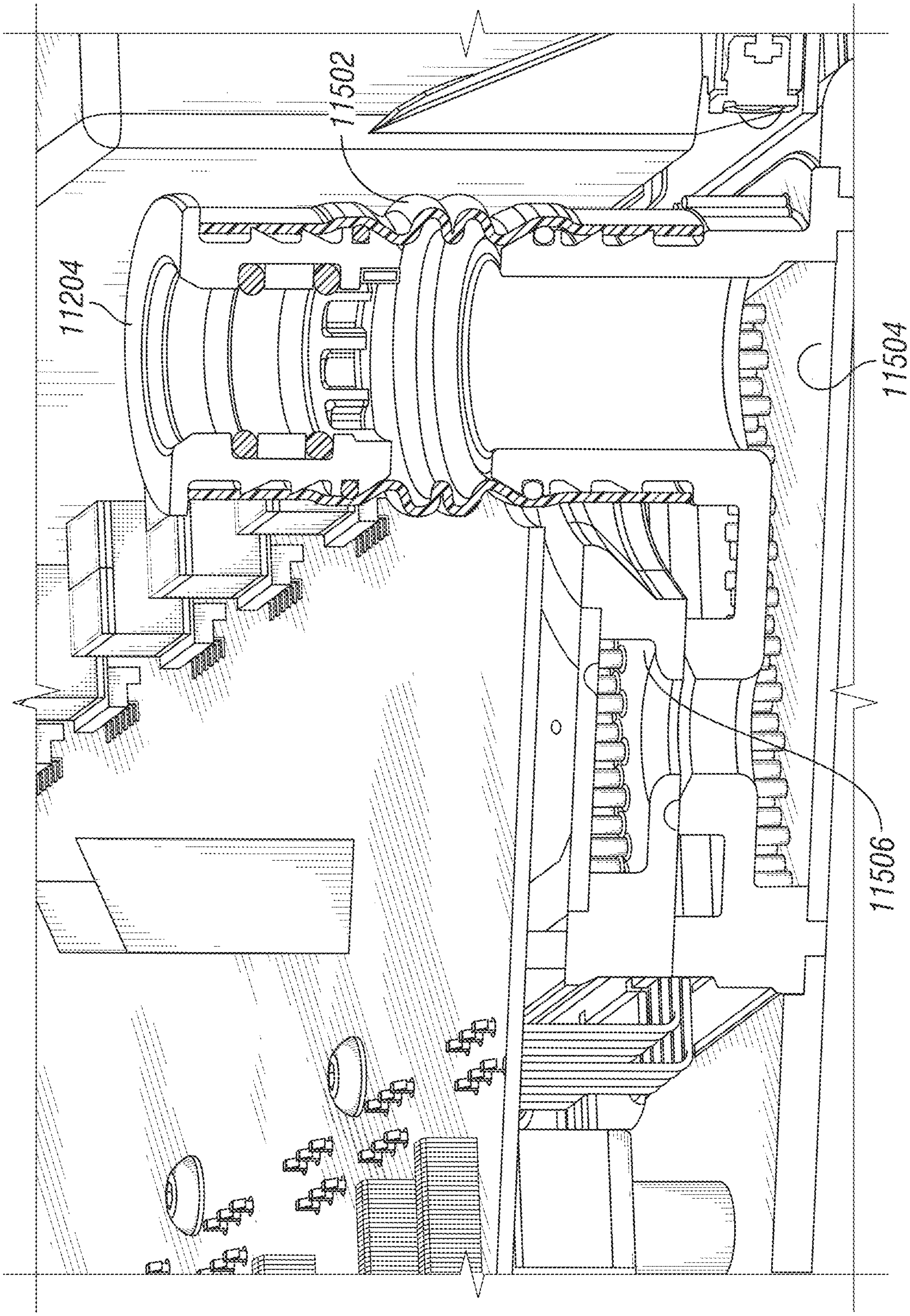
FIG. 115 depicts a view of an integrated inverter assembly with coolant channels.

Referencing FIG. 114, an underside (relative to FIG. 113) of the main cover is depicted to show aspects of the coolant channels 11402, with the lower coolant channel being depicted in FIG. 114. The coolant channel includes heat transfer features (pins, in the example of FIG. 114) to provide the desired heat transfer environment between the coolant flowing in the channel and cooled components of the integrated inverter assembly 10900. Two of the holes defined in the lower coolant channel of FIG. 114 provide inlet and outlet communication to coolant into the inverter. Two of the holes defined in the lower coolant channel of FIG. 114 provide fluid communication between an upper coolant channel and a lower coolant channel. Referencing FIG. 115, an example relationship between the upper coolant channel 11506 and the lower coolant channel 11504 is depicted. In the example of FIG. 115, each of the coolant channels includes heat transfer features such as pins. The utilization of two parallel coolant channels provides for increased heat transfer capacity and greater ease in communication with all cooled components within a compact integrated package. The description of coolant channels as "upper" and "lower" is for convenience and clarity of description to identify the separate channels. The actual vertical positioning of channels may vary with the specific design of the integrated inverter assembly, and the orientation of the integrated inverter assembly as installed. FIG. 115 additionally depicts an external coolant coupling port 11204, having a baffled stem 11502 in the example of FIG. 115.

Figure 116:
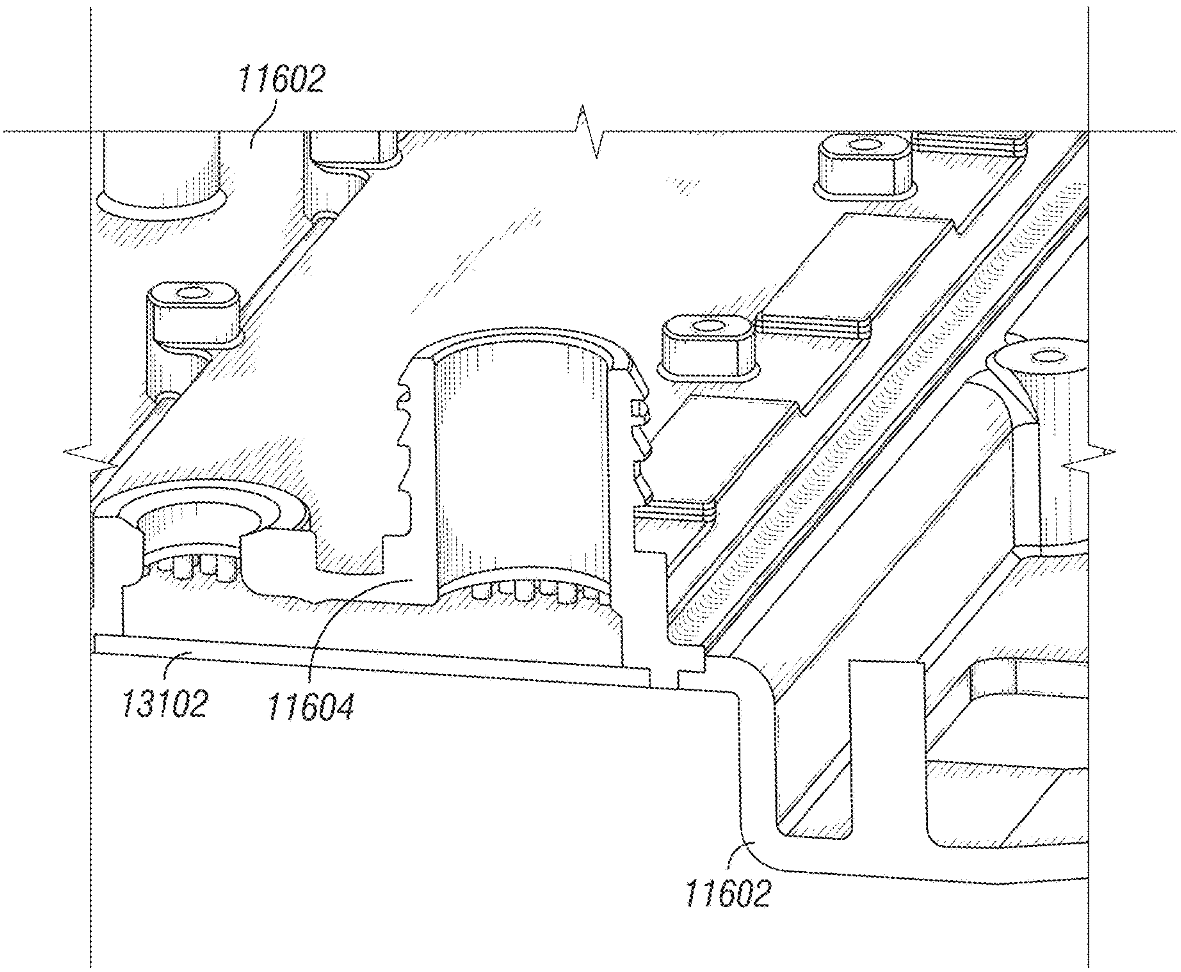
FIG. 116 depicts a view of an integrated inverter assembly with coolant channels.
Figure 131:
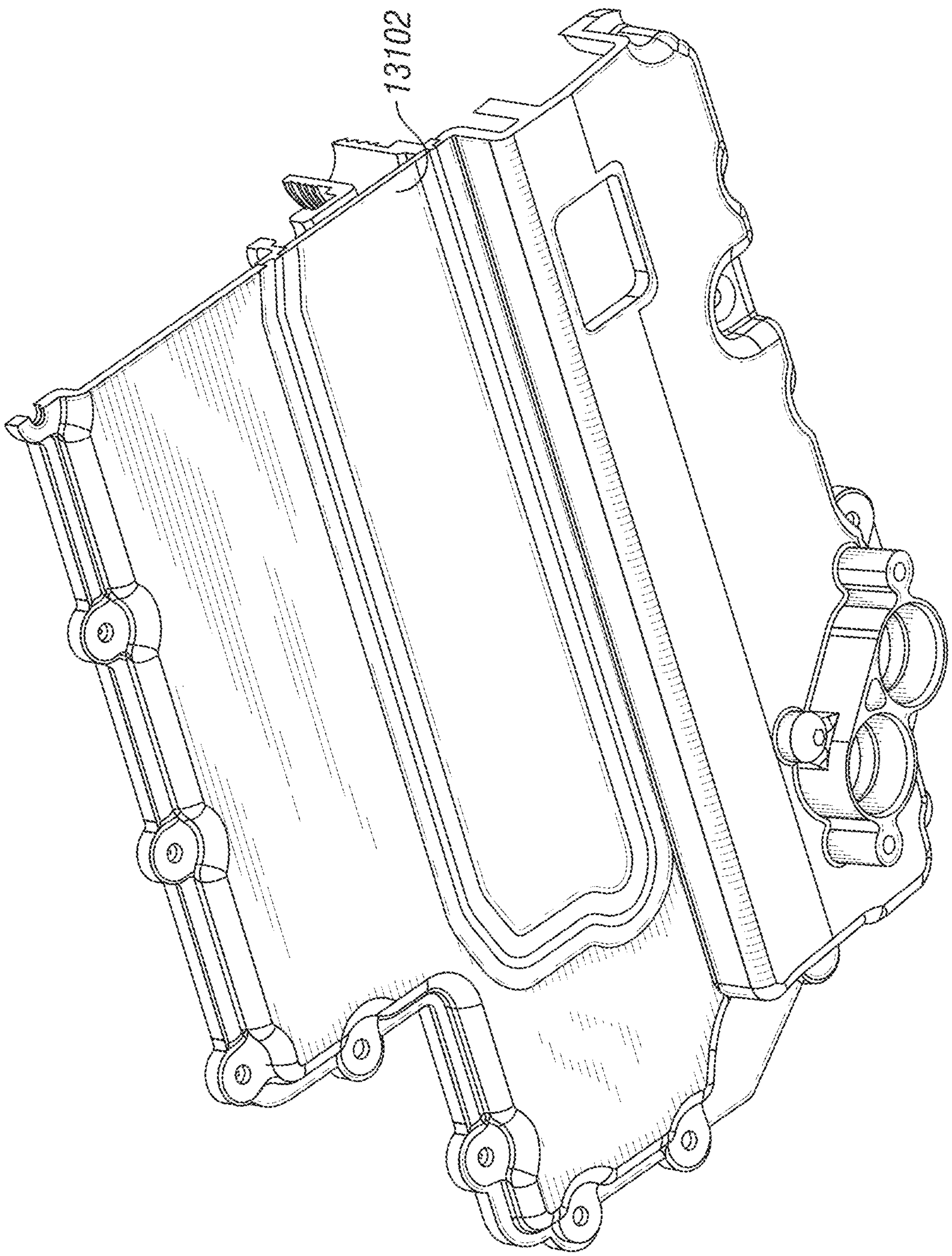

Referencing FIG. 116, an assembly example for coupling the coolant channels with the main cover is depicted. In the example, a coolant channel separating body 11604 (having the lower coolant channel on the underside, and the upper coolant channel on the upper side) is assembled with a lower coolant channel cover 13102 (e.g., the portion of the coolant channel visible in FIG. 109A) and the main cover body. In certain embodiments, the assembly of FIG. 116 is formed using friction-stir welding (FSW), which is a low cost process that provides for sealed seams forming the coolant channel. Other assembly techniques are contemplated herein. Each component of the assembly may be formed by any known techniques. It is desirable that the coolant channel separating body be thermally conductive, and may be formed, for example, from aluminum In certain embodiments, the coolant channel separating body is forged, although it may be cast, machined, or formed by any other technique. In certain embodiments, the lower coolant channel cover is stamped. In certain embodiments, the main cover body is cast. Referencing FIG. 131, an example embodiment is depicted with the lower coolant channel cover depicted in position, integrated with the main cover and the coolant channel separating body.

Figure 117:
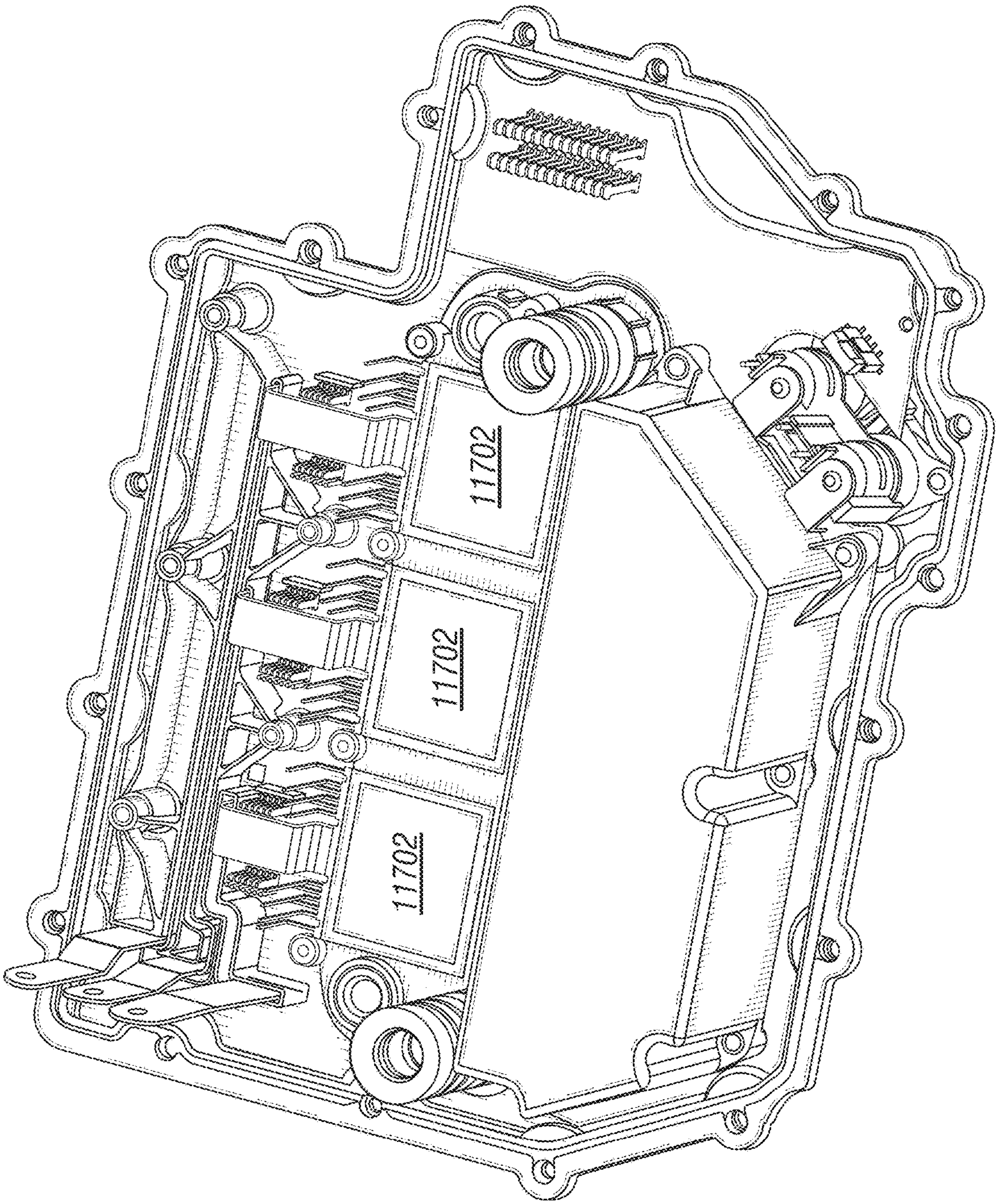
FIG. 117 depicts a view of an integrated inverter assembly with insulated-gate bipolar transistors (IGBTs).

Referencing FIG. 117, the underside of the main cover is depicted with insulated-gate bipolar transistors 11702 (IGBTs) installed. The IGBTs 11702 are thermally coupled (e.g., using thermal adhesive) to the surface of the upper cooling channel, and accordingly have a high heat transfer capacity to the coolant to support high power density installations.

Figure 118B:
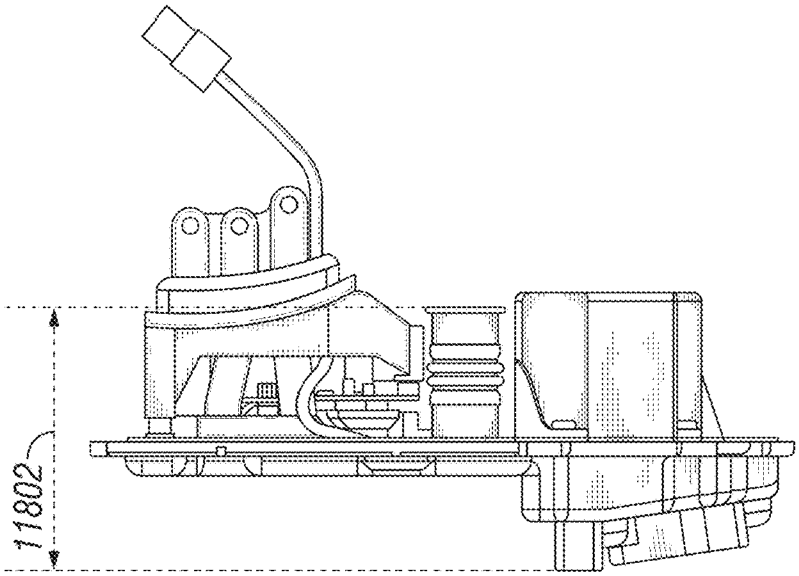
Figure 118A:
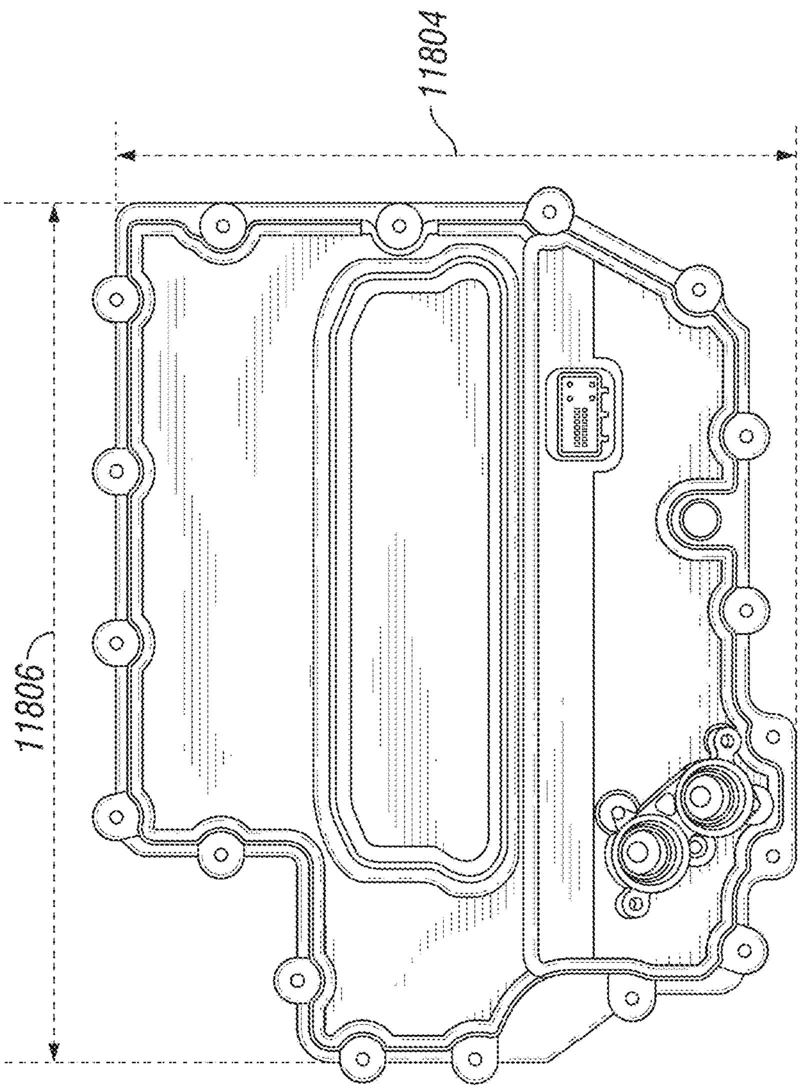

Referencing FIG. 118A, the dimensions and weight of an example integrated inverter assembly 10900 are shown, where a width 11806 is about 118 mm, and wherein a length 11804 is about 277 mm. Referencing FIG. 118B, an example embodiment includes a depth 11802 of about 87 mm. An overall mass of an example inverter assembly 10900 is below about 5 kg. The example of FIG. 118A is based upon various aspects of the present disclosure, and is believed to describe one example of achievable dimensions having sufficient power capacity for an automotive passenger car application.

Figure 119:
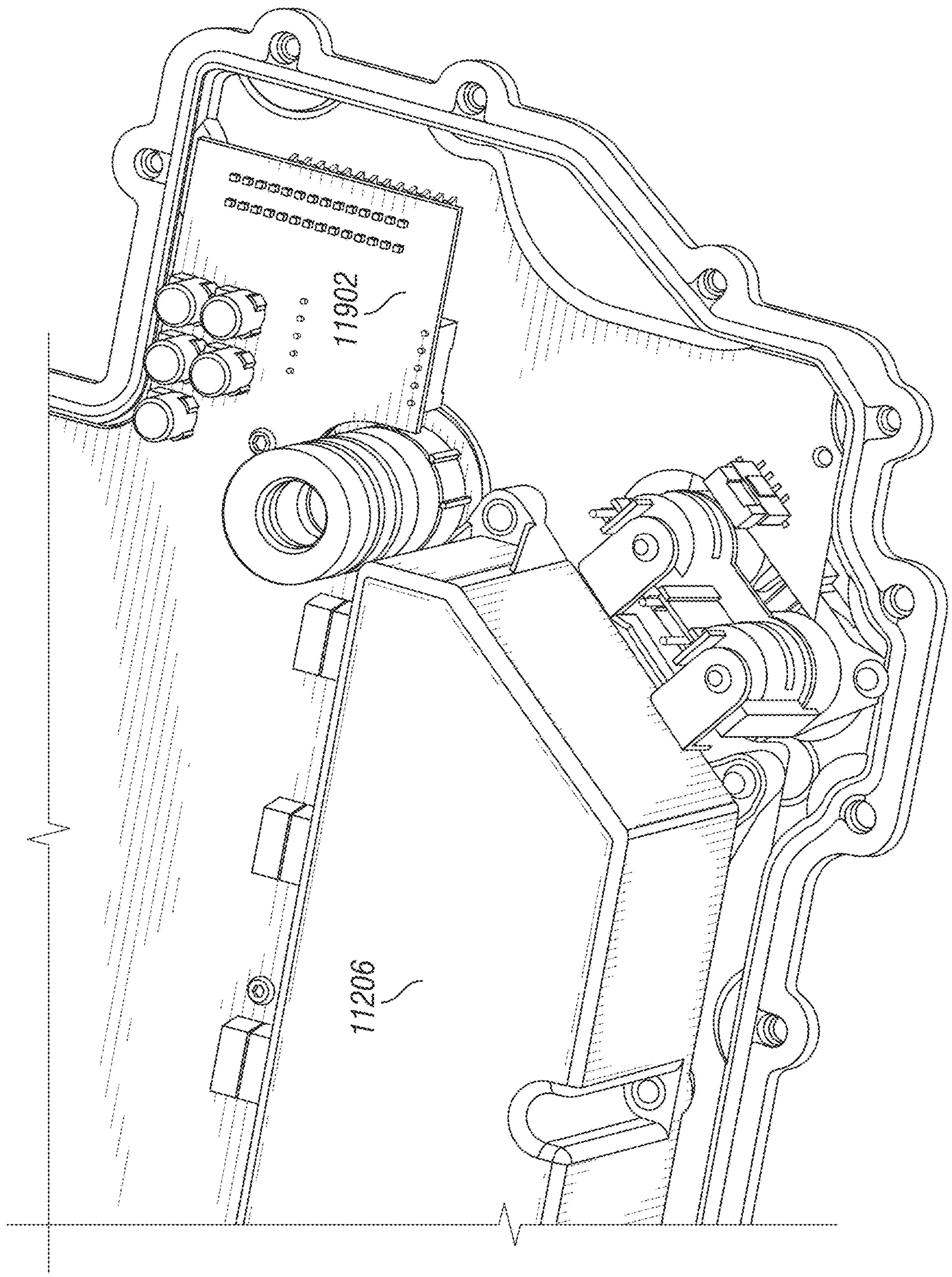
Figure 120:
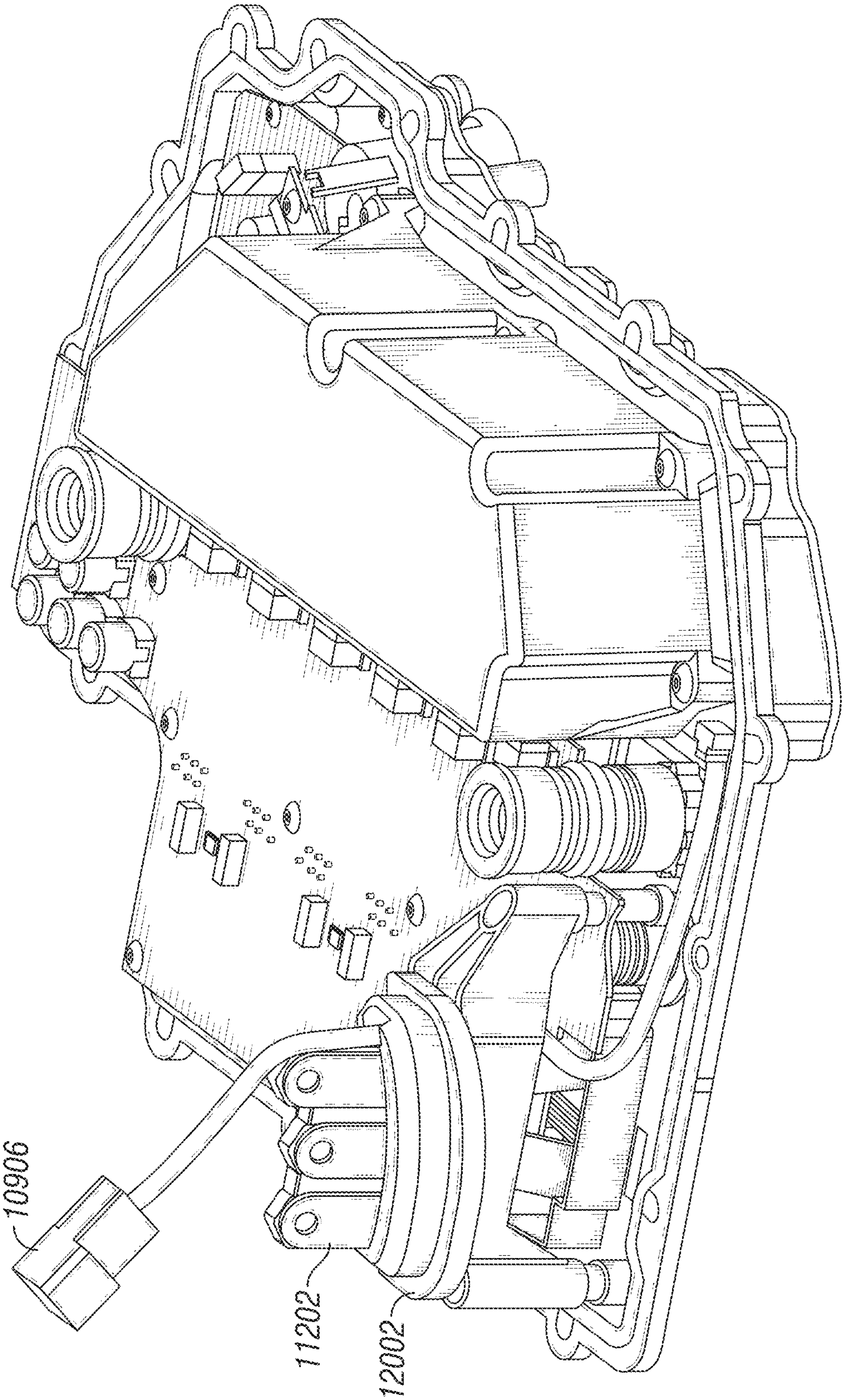
Figure 121:
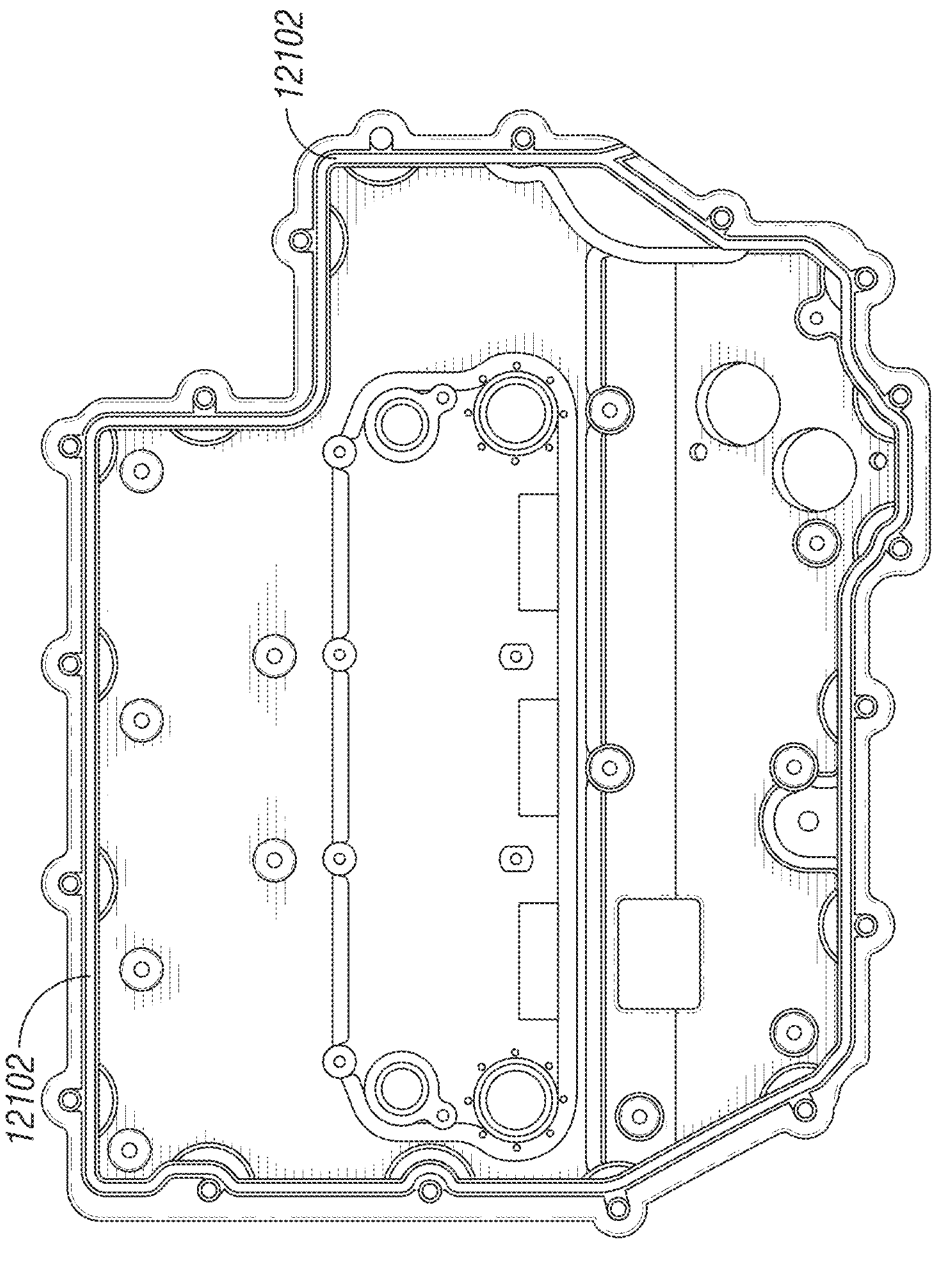

Referencing FIG. 119, a perspective view depicting the gate driver PCB 11902 and the DC link capacitor 11206 is shown. Referencing FIG. 120, a perspective view for an example embodiment depicts the AC bus bars 11202, the motor temperature/position sensor 10906. The AC connection utilizes two foam seals 12002 and replaceable captive nuts 13502 (also reference FIG. 35). Referencing FIG. 121, an underside view of the main cover is depicted. In the example of FIG. 121, a curable in-place gasket (CIPG) 12102 is dispensed and cured on the cover, and is reusable after a service event if the gasket is not damaged during the service event.

Figure 122:
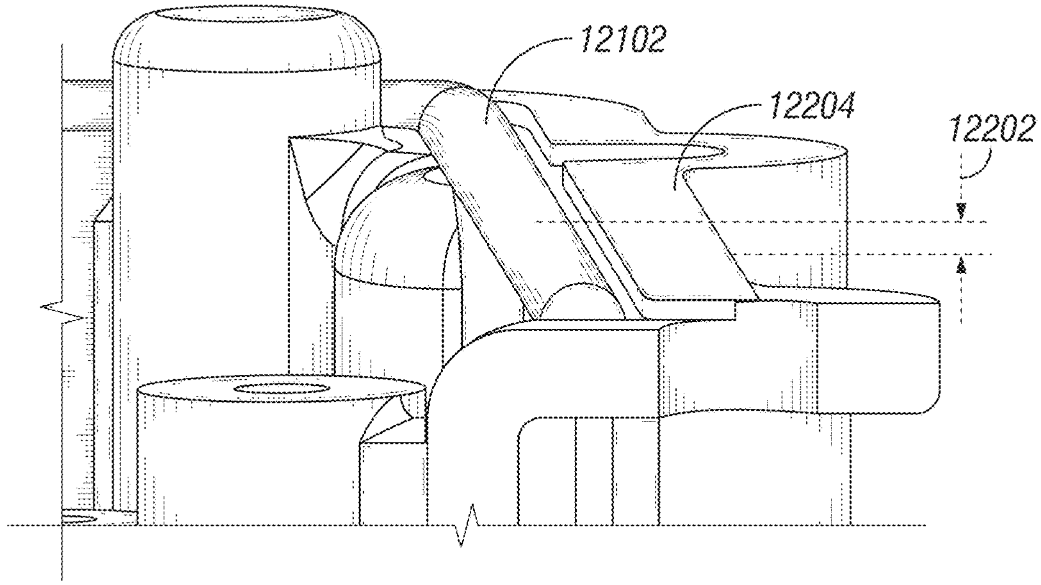
Figure 123:
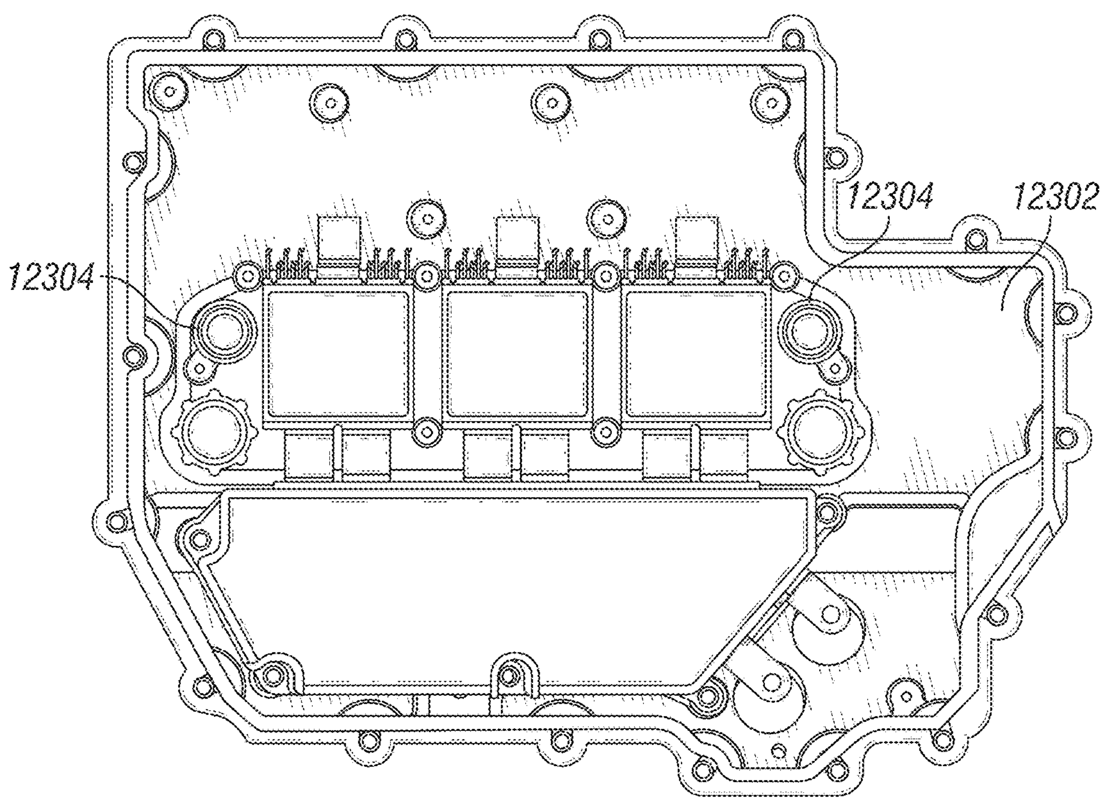
Figure 124:
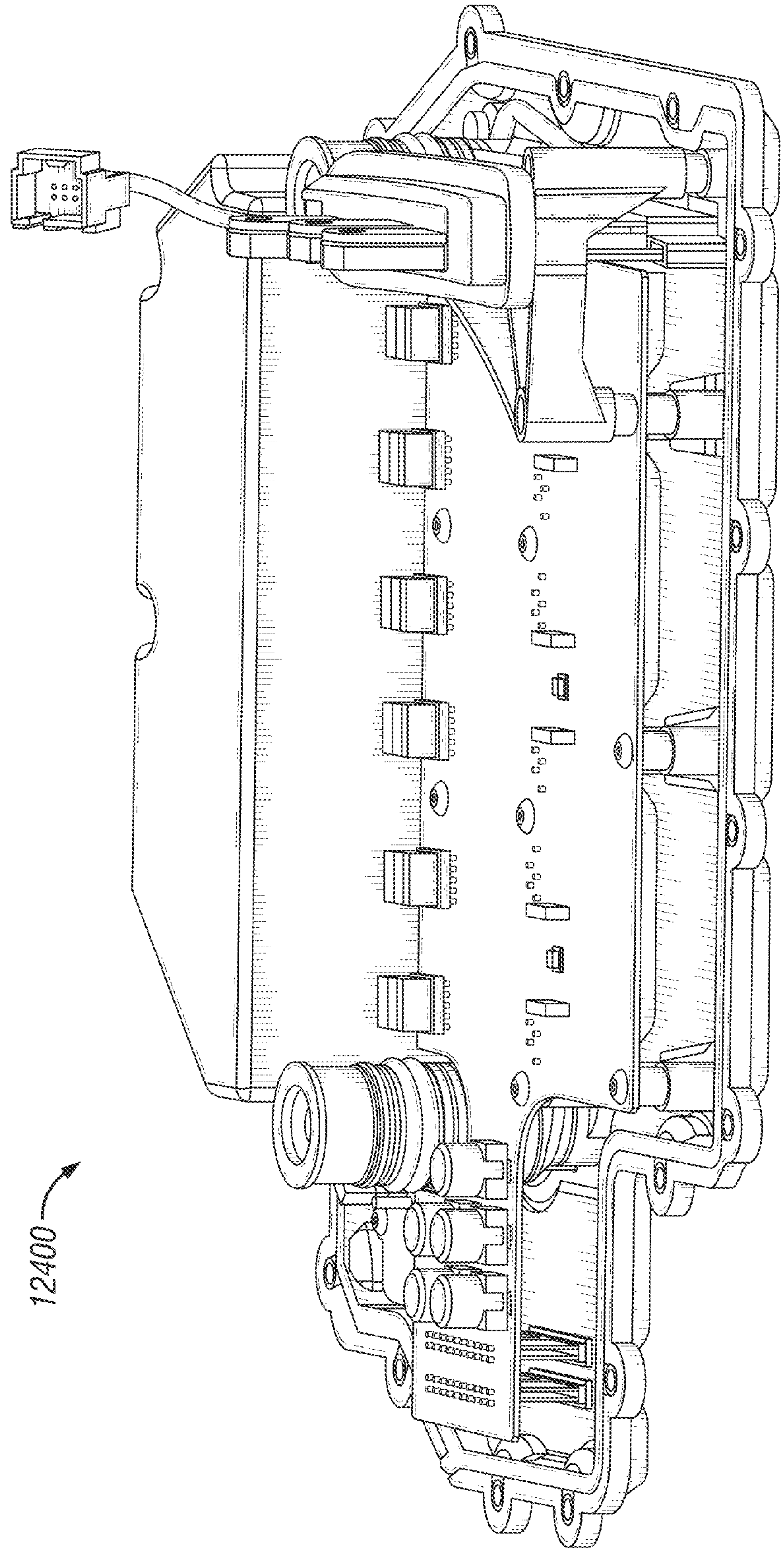
Figure 125:
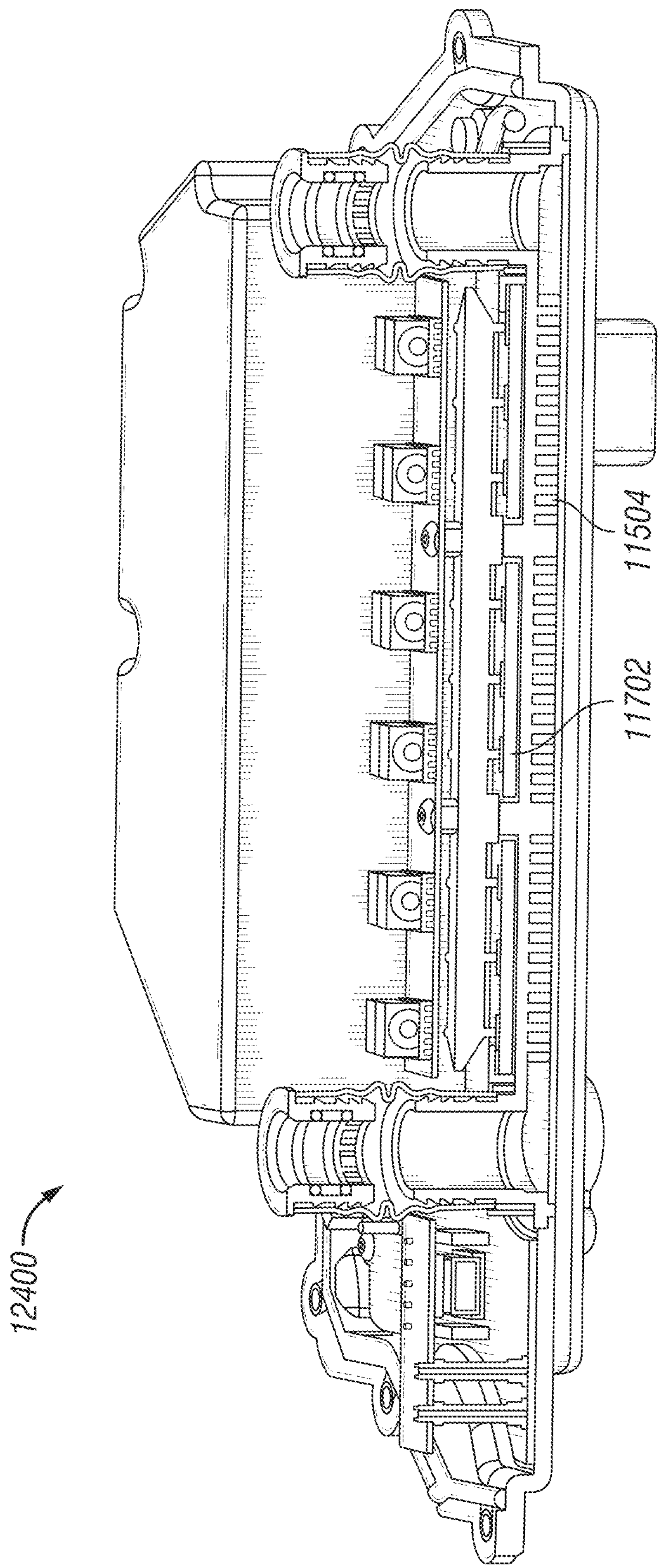
Figure 126:
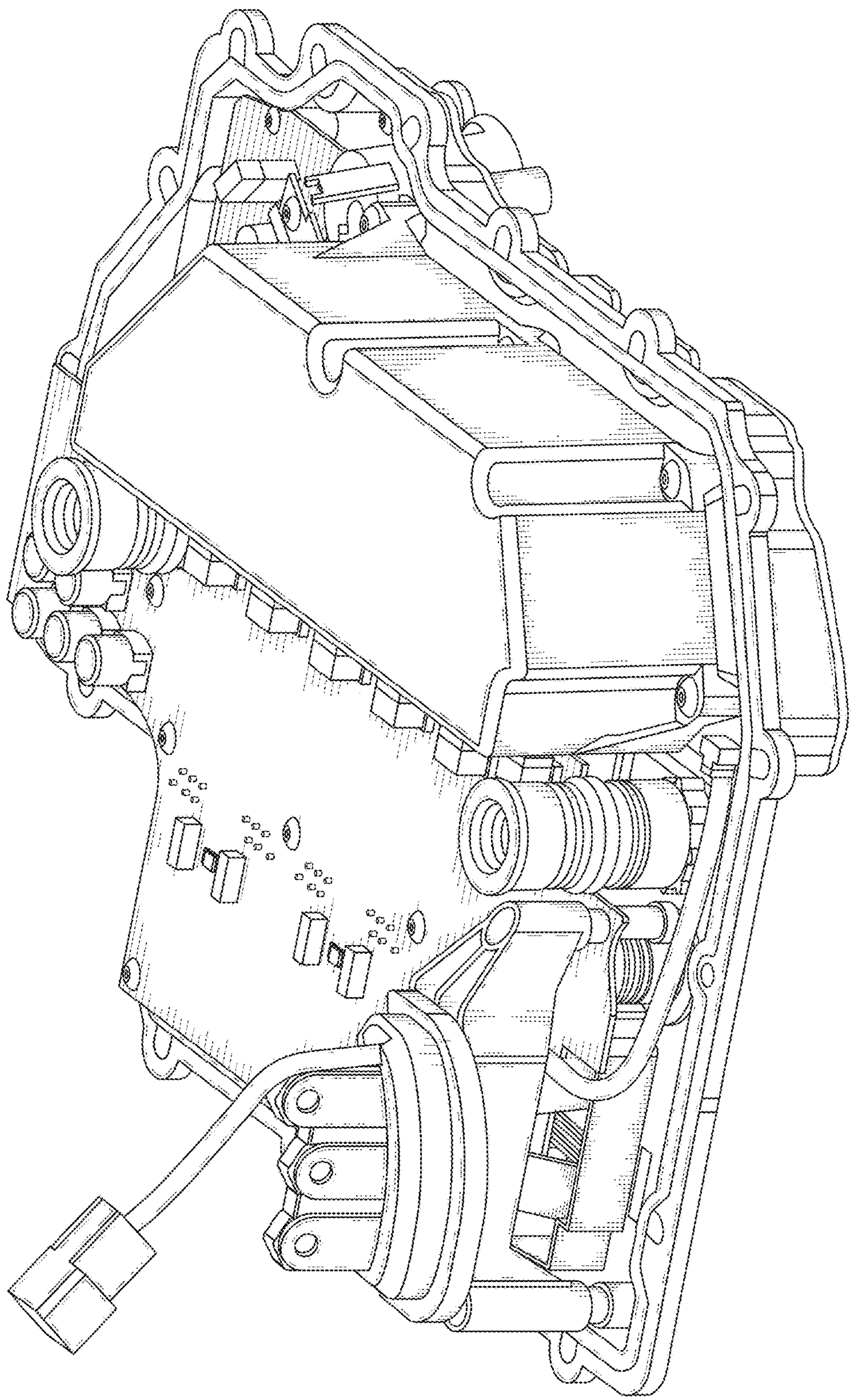
Figure 127:
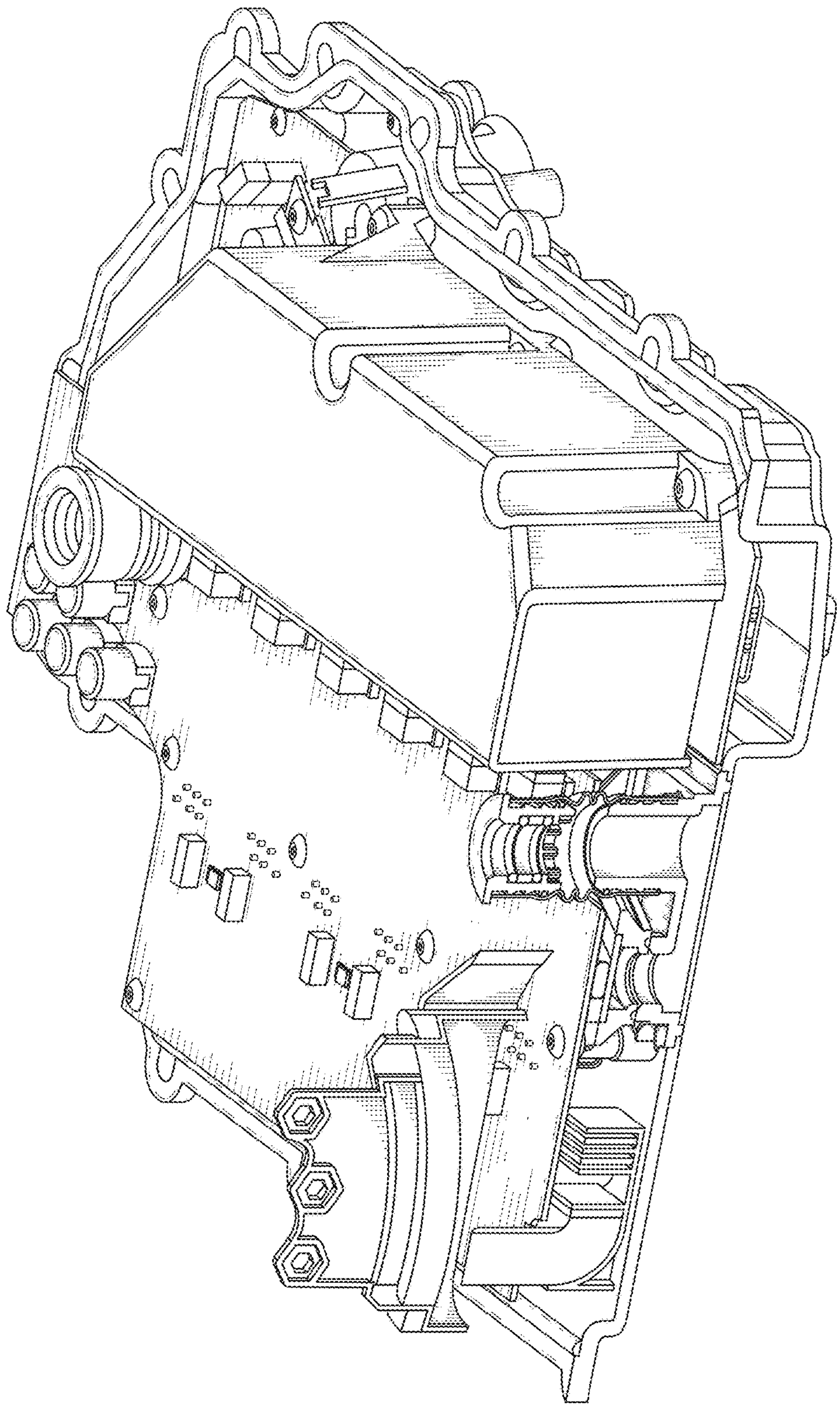
Figure 128:
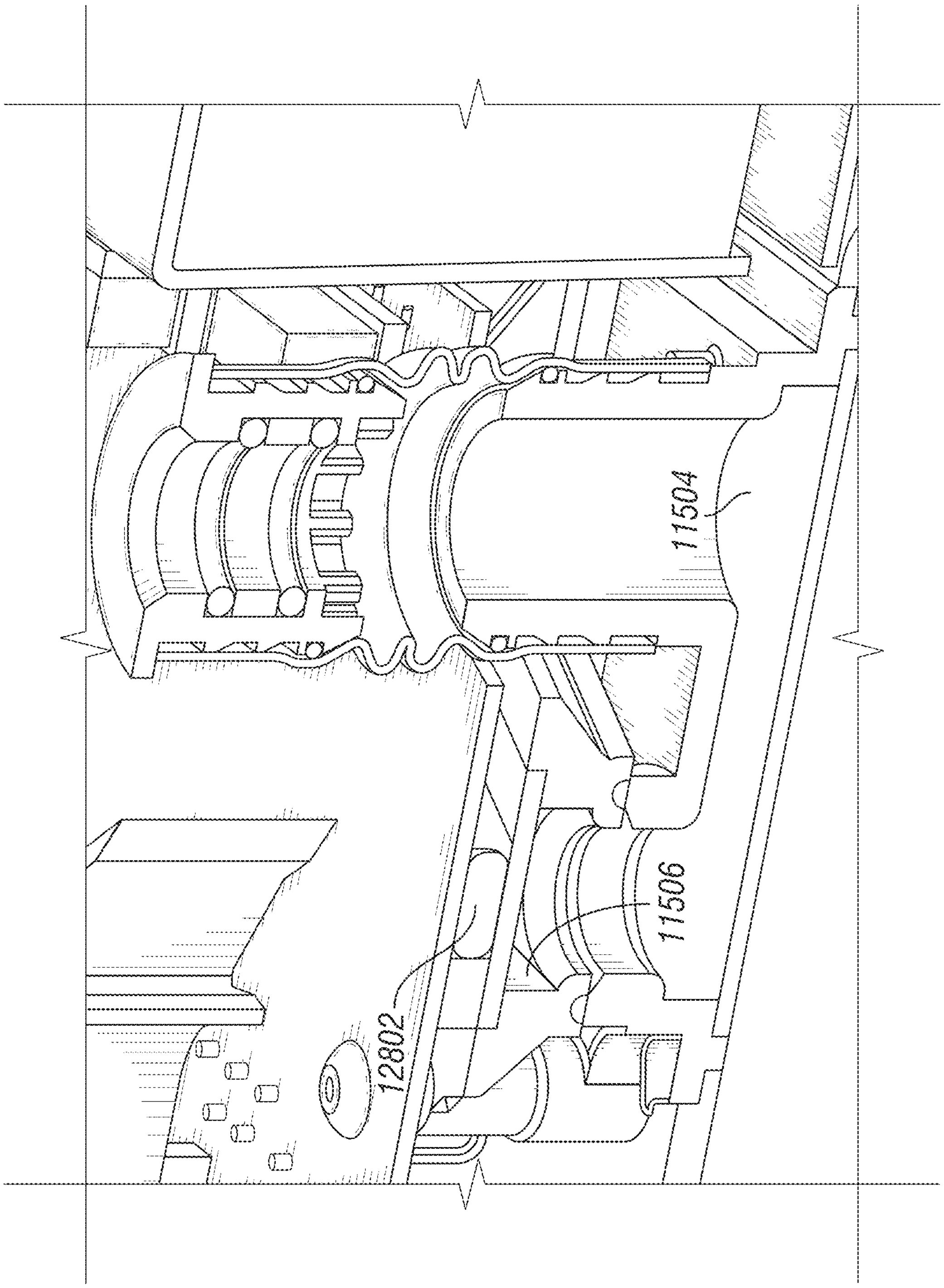

Referencing FIG. 122, a close-up of one corner of the example main cover is depicted. In the example of FIG. 122, a ledge 12204 is provided that provides for controlled compression of the CIPG 12102, through selection of the ledge height and CIPG dispensation (height difference 12202 provides selectable compression), and accordingly provides for ease and reliability in proper installation and sealing of the main cover. Referencing FIG. 123, certain aspects of an example installation for the IGBTs is depicted, with thermal paste 12302 providing thermal coupling for the IGBTs and the PCBs, and with formed-in-place-gaskets 12304 providing reliable sealing for coolant flows between the cooling channels. FIGS. 124-127 depict a number of views of an example embodiment of a main cover portion, with installed components, of an integrated inverter assembly 12400 consistent with various aspects of the present disclosure. Referencing FIG. 125, a lower cooling channel 11504 and side cutaway view of an IGBT 11702 provides an illustrative heat transfer environment for the IGBTs 11702 of the integrated inverter assembly. Referencing FIG. 128, an example embodiment depicts the upper 11506 and lower 11504 cooling channels, with an example location for a temperature sensor 12802 (a thermistor, in the example) which may be utilized, for example, to control active cooling, and/or to monitor the power electronics.

An example IGBT consistent with certain embodiments of the present disclosure is a dual side cooling half-bridge power module, capable of 750V, 800 A operation, and having an operating temperature capability of 175° C. for continuous operation. Certain commercially available FS4 IGBTs using a half-bridge configuration exhibit low losses at light loads, and in certain embodiments are favorable to applications tending to have a low duty cycle, such as passenger car applications.

Figure 129:
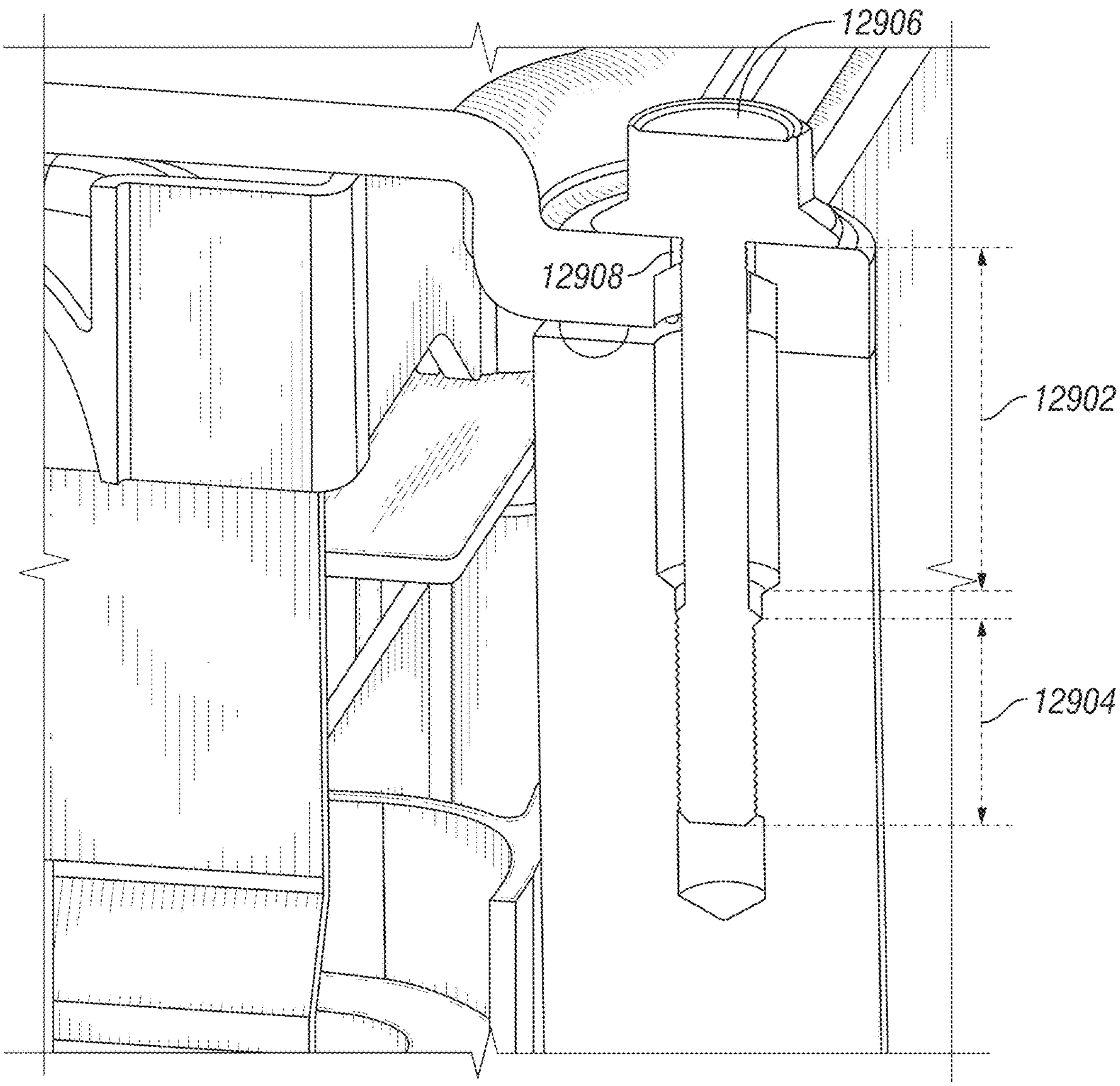
Figure 130:
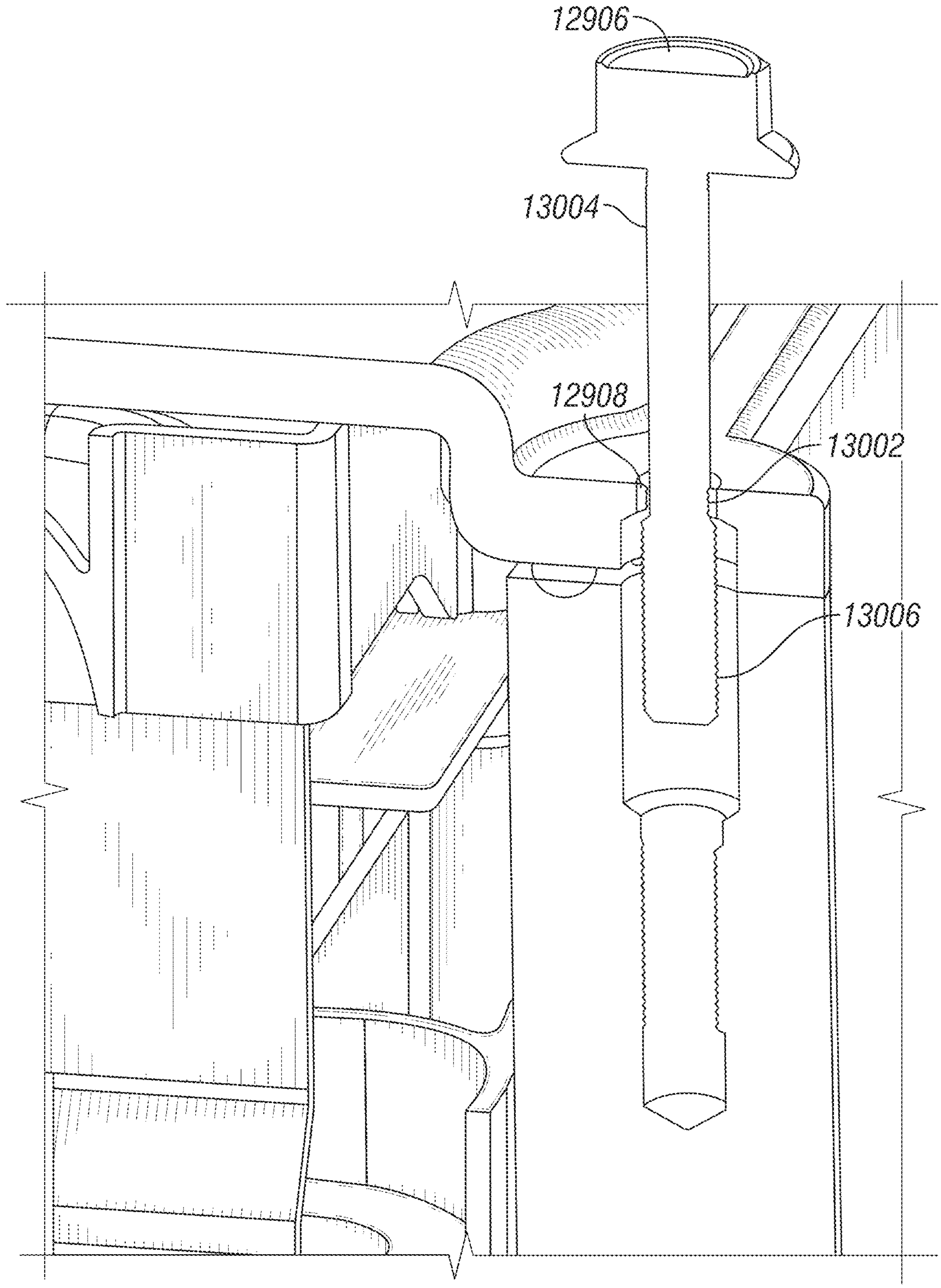
Figure 132:
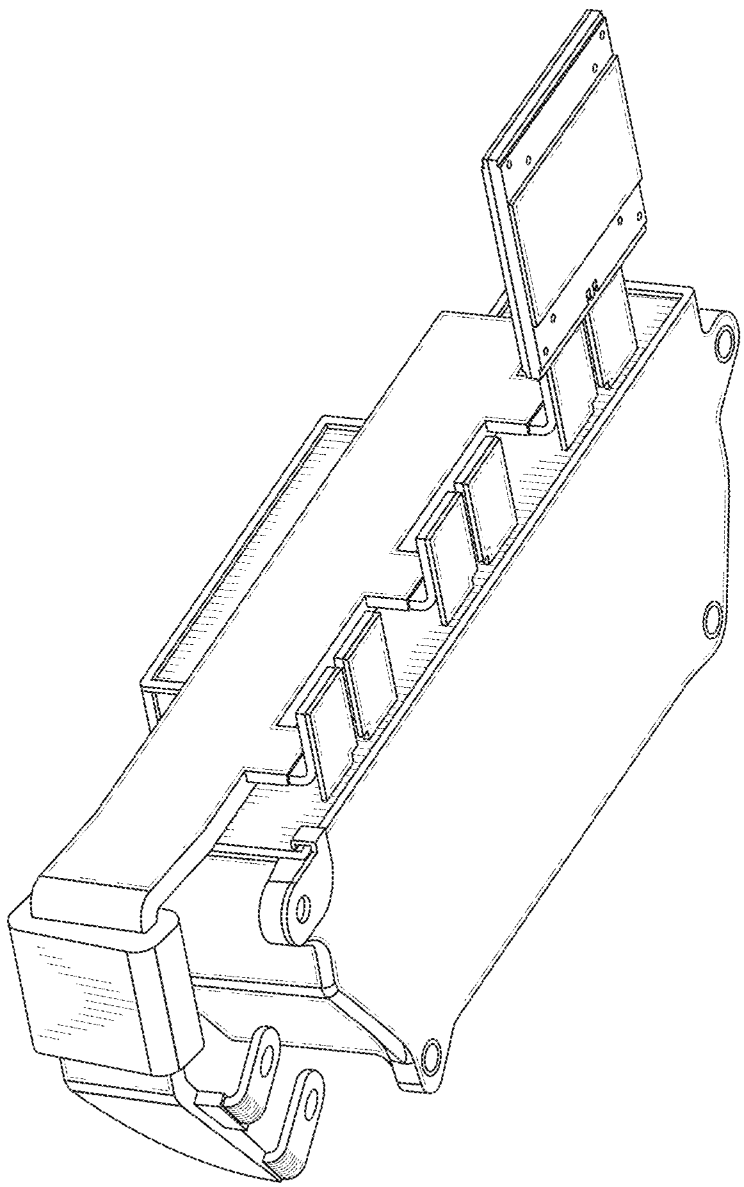

Referencing FIG. 129, an example coupling mechanism for the main cover to the back cover is depicted. The example coupling mechanism includes a threaded area 12908 in the main cover to retain the coupling screw 12906 when disengaged, and where the height 12902 of the unthreaded portion in the motor casting (back cover) is greater than the threaded engagement portion 12904 of the screw 12906. Thus, the screw can be backed into the threaded area 12908 in the main cover, and ensure that the threads remain disengaged from the motor casting. Referencing FIG. 130, the example coupling mechanism includes a reduced diameter portion 13004 for a portion of the coupling screw, providing for a convenient captive screw mechanism. In the example of FIG. 130, the screw main threads 13006 are disengaged from the motor casting, and a second threaded portion 13002 of the screw is engaged with the threaded area 12908 of the main cover. Referencing FIG. 131, a cutaway side view depicting Referencing FIG. 132, a previously known DC Link Capacitor is depicted. The DC Link Capacitor includes a bus bar, common-mode choke, and capacitors (Y-caps) as external elements to the DC Link Capacitor. The bus bar is a laminated bus bar to provide isolation of the three AC phases, and the bus bar external to the DC Link Capacitor housing is required to be as long as the housing, with a full thickness along the length of the housing.

Referencing FIG. 133, an example DC Link Capacitor 11206 is depicted, with the bus bar, common-mode choke, and Y-caps included in the housing of the DC Link Capacitor 11206. The bus bar, choke, and Y-caps are potted within the DC Link Capacitor, providing for a compact design and enhanced mechanical integrity. In certain embodiments, the DC Link Capacitor 11206 of the example in FIG. 133 can be utilized in an integrated inverter assembly 10900 consistent with any other aspect of the present disclosure. The DC Link Capacitor 11206 further includes an IGBT interface 13302 providing power to each of the IGBTs, and a DC interface 13304 providing an interface to DC power, such as to the battery. Referencing FIG. 134, an example embodiment depicts the potted DC Link Capacitor 11206 coupled to the three phases of the AC motor connector through the IGBTs 11702. In the example of FIG. 134, the connections are welded, providing for reduced assembly complexity and reduced contact resistance. In certain embodiments, the utilization of an integrated inverter assembly 10900, with a fixed, small, footprint, and with limited external interfaces to the rest of the vehicle and/or electrical drive system, enables one or both of the potted DC Link Capacitor 11209 and the welded connections—for example by providing a consistent geometric positioning allowing the parts to be assembled using potting and welding without having to arrange or assemble the positioning of the DC Link Capacitor, the bus bar, the common-mode choke, the Y-caps, and/or the spatial arrangement of the IGBTs and AC connector blades. Referencing FIG. 135, another view of the embodiment depicted in FIG. 126, where FIG. 135 is a cutaway view of the embodiment of FIG. 126, and can be used to reference the positioning of the DC Link Capacitor assembly within the example integrated inverter assembly 10900.

Referencing FIGS. 136 and 137, a previously known quick connector consistent with the SAEJ2044 quick connect coupling standard is depicted. The quick connector of FIG. 136 includes a lock 13608 with a retaining spring, and two internal o-rings 13602 for sealing the fluid coupling. A spacer is provided between the two internal o-rings. The quick connector of FIG. 136 is configured to receive a fluid coupling such as an end piece having an end form (13702 of FIG. 137) such as that depicted in FIG. 26. The quick connector of FIG. 136 includes ribbing ("fir tree") 13606 on the outer diameter of the tube connection, with an external o-ring 13604 on the tube-side for sealing.

Referencing FIG. 138, a first embodiment of a fluid connector of the present disclosure is depicted. The fluid connector of FIG. 138 does not include a locking element, but is configured to receive an end piece having a standard SAEJ2044 end form. The example fluid connection includes two internal o-rings 13804 and a spacer 13806 therebetween. The connector further includes a shaped receiving portion 13802 and does not include a lock. the connector further includes an external o-ring 13808. In certain embodiments, fluid connections within the integrated inverter assembly 10900 have a tight spacing and poor access (or no access) to portions of a quick connector to manipulate the lock and thereby operate the quick connector. Additionally, in certain embodiments, the integrated inverter assembly 10900 provides for a fixed geometry of fluid coupling positions, which are at least partially internal to the housing of the integrated inverter assembly 10900, and thereby provide for a secure fluid connection without the lock. Accordingly, it can be seen that a quick connector embodiment such as that depicted in FIG. 138, improves and/or enables certain aspects of the integrated inverter assembly 10900.

Referencing FIG. 139, a second embodiment of a fluid connector of the present disclosure is depicted. The fluid connector of FIG. 139 does not include a locking element, but is configured to receive an end piece having a standard SAEJ2044 end form. Additionally, it can be seen that the fluid connector of the example in FIG. 139 omits the right extension, utilizing the housing of the fluid connector to form the ribbing 13902 and support the seal. The fluid connector of the example in FIG. 139 further includes the o-ring 13808 on the outer body. Again referencing FIG. 115, it can be seen that the fluid connector for the coolant outlet depicted in FIG. 115 is consistent with the quick connector embodiment of FIG. 139. It can further be seen that the quick connector depicted in FIG. 139 provides for a greatly reduced vertical footprint of the fluid connection, allowing for a more compact footprint of the integrated inverter assembly. The embodiment of FIG. 115 additionally depicts a hose coupled to the quick connector that provides for compliance in the horizontal and vertical planes (using baffled hose 11502), further enhancing the ease of installation of the coolant connection. It can further be seen that the coolant channel separating body 11604 (e.g. reference FIG. 116) includes an integrated hose nipple configured to couple with the quick connector, thereby further reducing the footprint and the assembly complexity of the integrated inverter assembly 10900. A given embodiment of the integrated inverter assembly 10900 may utilize one or both of the quick connector embodiments of FIGS. 138 and 139, or neither of these.

An example breaker/relay may include a fixed contact electrically coupled to a power bus for a mobile application, a moveable contact selectively electrically coupled to the fixed contact, an armature operationally coupled to the moveable contact, such that the armature in a first position prevents electrical coupling between the moveable contact and the fixed contact, and the armature in a second position allows electrical coupling between the moveable contact and the fixed contact. The example breaker/relay further includes a first biasing member biasing the armature into one of the first position or the second position, a standard on/off circuit having at least two states, wherein the standard on/off circuit in a first state provides an actuating signal and in a second state prevents the actuating signal. Referencing FIG.

140, an example current response circuit 14002 is depicted that may be utilized with any system or to perform any operations described throughout the present disclosure. The example current response circuit 14002, determines a current in the power bus 14004, and further blocks an actuating signal 14006 of the standard on/off circuit in response to the current in the power bus 14006 indicating a high current value 14003. The actuating signal may be provided as an armature position command 14008, where an armature is responsive to the actuating signal to electrically couple the moveable contact to the fixed contact. In embodiments, the mobile application may include at least two electrical current operating regions. The current response circuit 14002 may be further structured to adjust the high current value 14003 in response to an active one of the at least two electrical current operating regions.

Referencing FIG. 141, an example procedure 14100 for opening a contact is schematically depicted. Operations of the procedure 14100 may be performed by any controllers, circuits, and/or hardware arrangements as described throughout the present disclosure, and further may be performed in relation to any of the systems or hardware arrangements described throughout the present disclosure. In an aspect, the procedure 14100 includes an operation 14102 to select contact force for a breaker/relay such that the opening the contacts occurs at a selected current flow value of the electrical current flow through the contacts. The procedure 14100 further includes an operation 14104 to apply a contact force to the moveable contact of the breaker/relay, and an operation 14106 to determine a current value through the contacts. The procedure 14100 further includes an operation 14108 to determine whether the current value exceeds a threshold value, and an operation 14110 to command an armature or actuator to open the contacts in response to the current value exceeding the threshold. The example procedure 14100 further includes an operation 14112 to open the contacts in response to a repulsive force on the contacts—for example as a physical response of the moveable contact at the selected current flow value. In certain embodiments, the operation 14110 may be commenced before the operation 14112. In certain embodiments, the operation 14110 is performed such that the moveable contact does not return to the closed position after the operation 14112 to open the contacts (e.g., relieving the return force of the moveable contact that may otherwise drive the contact back to a closed position after the physical opening operation 14112).

Referencing FIG. 142, an example procedure 14200 for opening a contact is schematically depicted. Operations of the procedure 14200 may be performed by any controllers, circuits, and/or hardware arrangements as described throughout the present disclosure, and further may be performed in relation to any of the systems or hardware arrangements described throughout the present disclosure. The example procedure 14200 includes an operation 14202 to determine a first threshold (for current in an electric load circuit) in response to a first physical current opening value (e.g., based on the opening characteristics for a contactor), an operation 14204 to determine a second threshold in response to a second physical current opening value, an operation 14206 to determine a first current value in a first electric load circuit, and an operation 14208 to determine a second current value in a second electric load circuit. The procedure 14200 further includes an operation 14210 to determine whether the first current value exceeds the first threshold, and/or whether the second current value exceeds the second threshold. The example procedure 14200 includes an operation 14214 to command an armature (or actuator) for the first contactor to open if the first threshold is exceeded, and an operation 14212 to diffuse an arc from the first contact (e.g., using splitter plates and/or a magnet). The example procedure 14200 includes an operation 14216 to command an armature for the second contactor to open if the second threshold is exceeded, and an operation 14218 to diffuse an arc of the second contactor. In certain embodiments, determining the first or second threshold includes providing components configured to provide a selected value for the first or second threshold (e.g., selected contact areas, contact force values, and/or bus bar configurations). In certain embodiments, procedure 14200 is utilized in relation to a system having more than one contactor, where each contactor is separately controllable.

In an aspect, a system may include a housing; a breaker/relay device positioned in the housing, wherein the breaker/relay device may be configured to interrupt a motive power circuit for an electrical vehicle system, where the housing may be disposed on the electrical vehicle system; wherein the breaker/relay device may include a physical opening response portion responsive to a first current value in the motive power circuit, and a controlled opening response portion responsive to a second current value in the motive power circuit; and a precharge circuit electrically coupled in parallel to the breaker/relay device. In embodiments, the precharge circuit may be positioned within the housing. The first current value may be greater than the second current value. The physical opening response portion may include a first biasing member biasing an armature of the breaker/relay device into an open position for a contactor of the motive power circuit, and a selected difference between a first force of the armature closing the contactor and a second force of the first biasing member opening the contactor. The controlled opening response portion may include a current sensor providing a current value through the motive power circuit, and a current response circuit 14304 (reference FIG. 143) structured to command an armature to open a contactor in response to the current value 14314 exceeding the second current value 14316. The breaker/relay device may include a dual-pole breaker/relay device. The breaker/relay device may include a single-pole breaker/relay device. The breaker/relay device may be positioned on one of a high side circuit or a low side circuit of the motive power circuit. The system may further include a pyro-switch device positioned on the other of the high side circuit or the low side circuit.

Referencing FIG. 143, an example system includes a physical opening response adjustment circuit 14302 that determines a first current value adjustment 14312, and adjusts the physical opening response portion in response to the first current value adjustment 14312. The physical opening response adjustment circuit 14302 may be further structured to adjust the physical opening response portion by providing an adjustment implementation command 14310, which may include adjusting a compression of the first biasing member; adjusting the first force (e.g., the force applied by the armature); and/or adjusting the second force (e.g., the force of the compression spring). The physical opening response adjustment circuit 14302 may be further structured to adjust the physical opening response portion in response to an operating condition 14308 of the electrical vehicle system. Example and non-limiting operating conditions 14302 include a time-current profile of the motive power circuit; a time-current trajectory of the motive power circuit; a time-current area value of the motive power circuit; a rate of change of a current value through the motive power circuit; and/or a difference between a current value through the motive power circuit and the second current value.

Referencing FIG. 144, an example procedure 14400 for opening a contact is schematically depicted. Operations of the procedure 14400 may be performed by any controllers, circuits, and/or hardware arrangements as described throughout the present disclosure, and further may be performed in relation to any of the systems or hardware arrangements described throughout the present disclosure. The example procedure 14400 includes an operation 14402 to determine a physical opening response adjustment for a contactor—for example where operating conditions of an electric mobile application indicate that the current flow through a load circuit should be permitted to be increased, or reduced, including during high performance operation, charging operation, and/or emergency operation. The example procedure 14400 further includes an operation 14404 to adjust a physical opening response value for a contactor, and an operation 14406 to determine a current in a load circuit (e.g., a motive power circuit) of the electric mobile application. The example procedure 14400 further includes an operation 14408 to determine whether a current value in the load circuit exceeds a controlled open threshold value, and an operation 14410 to command an armature (or actuator) of the contactor to an open position in response to the current exceeding the controlled open threshold value. In certain embodiments, the controlled open threshold value is distinct from, and may be lower than, the physical open threshold value. The example procedure 14400 further includes an operation 14412 to determine whether the current value exceeds a physical open threshold, and an operation 14414 to open the contacts in response to a repulsive force in the contactor in response to the determination 14412 indicating a YES value. In certain embodiments, operations described throughout the present disclosure to determine whether a physical open current value is exceeded include operation to configure a contactor (e.g., within a breaker/relay) to open at a selected current value, to expose the contactor to a load current, where the contact responds to the load current according to the configuration made in response to the selected current value. The order of determinations 14408, 14412 may be reversed, and/or one or more determinations 14408, 14412 may be omitted. Operations 14402 to determine a physical opening response adjustment may be performed during run-time operations or design-time operations of a system, and similarly operations 14404 to adjust the physical opening response may be performed during run-time operations or design-time operations.

Referencing FIG. 145, an example procedure 14500 for opening a contact is schematically depicted. Operations of the procedure 14500 may be performed by any controllers, circuits, and/or hardware arrangements as described throughout the present disclosure, and further may be performed in relation to any of the systems or hardware arrangements described throughout the present disclosure. The example procedure 14500 includes an operation 14502 to configure a physical response opening portion of a breaker/relay of a mobile power circuit to provide for an opening of the contactor of the breaker/relay based on a physical opening response threshold current. Example and non-limiting operations 14502 include an operation 14502A to select a mass (e.g., of the moving portion of a moveable contact), a Lorentz force area (e.g., contact area, bus bar area in the region of the contact, etc.), and/or to select a contact force (e.g., adjust a strength or number of engaged biasing members, and/or to change an amount of compression on a biasing member, and/or to change a movement position of an actuator for the moveable contact). In certain embodiments, configuring the physical opening response portion may include selecting a bus bar configuration, wherein the bus bar couples two moveable contacts, and wherein the bus bar configuration may include at least one of a bus bar area in proximity to a current providing portion of the mobile power circuit or a positioning of a portion of the bus bar in proximity to the current providing portion of the mobile power circuit. The example procedure 14500 further includes an operation 14504 to operate a moveable contact of the breaker/relay between open and/or closed positions—for example moving to the closed position to allow for power flow through the contactor, and to the open position to prevent power flow through the contactor. The example procedure 14500 further includes an operation 14506 to determine a current value in the mobile power circuit, and an operation 14508 to command the moveable contact to an open position based on a separate current threshold from the physical opening current threshold. In certain embodiments, the separate current threshold utilized in operation 14508 is a lower current threshold than the configured physical opening response threshold current.

In an aspect, referencing FIG. 146, a system may include a vehicle having a motive electrical power circuit 14600 (or power path) between a power source 14601 and a load 14608, and a power distribution unit having a current protection circuit disposed in a motive electrical power circuit 14600. an example current protection circuit includes a breaker/relay 14602, a breaker/relay including a fixed contact electrically coupled to a motive power circuit for a mobile application, a moveable contact selectively electrically coupled to the fixed contact, and where the moveable contact in a first position allows power to flow through the motive power circuit, and the moveable contact in a second position does not allow power to flow through the motive power circuit, and a physical opening response portion responsive to a current value in the motive power circuit, wherein the physical opening response portion may be configured to move the moveable contact to the second position in response to the current value exceeding a threshold current value. The example current protection circuit 14600 includes a contactor 14604 in parallel with the breaker/relay 14602; a pair of breaker/relays 14602, 14702 in parallel (e.g., reference FIG. 147) and/or a dual pole breaker relay 14602 providing two parallel electrical paths; and/or a breaker/relay 14602 in parallel with a contactor 14604 and a fuse 14802 (e.g. reference FIG. 148). In certain embodiments, the current protection circuit 14600 includes a contactor in series with a breaker/relay.

In an aspect, referencing FIG. 146, a system may include a vehicle having a motive electrical power circuit 14600 (or power path) between a power source 14601 and a load 14608, and a power distribution unit having a current protection circuit disposed in a motive electrical power circuit 14600. an example current protection circuit includes a breaker/relay 14602, a breaker/relay including a fixed contact electrically coupled to a motive power circuit for a mobile application, a moveable contact selectively electrically coupled to the fixed contact, and where the moveable contact in a first position allows power to flow through the motive power circuit, and the moveable contact in a second position does not allow power to flow through the motive power circuit, and a physical opening response portion responsive to a current value in the motive power circuit, wherein the physical opening response portion may be configured to move the moveable contact to the second position in response to the current value exceeding a threshold current value. The example current protection circuit 14600 includes a contactor 14604 in parallel with the breaker/relay 14602; a pair of breaker/relays 14602, 14702 in parallel (e.g., reference FIG. 147) and/or a dual pole breaker relay 14602 providing two parallel electrical paths; and/or a breaker/relay 14602 in parallel with a contactor 14604 and a fuse 14802 (e.g. reference FIG. 148). In certain embodiments, the current protection circuit 14600 includes a contactor 14604 in series with a breaker/relay 14902 (e.g., reference FIG. 149). The utilization of a breaker/relay in series with a contactor allows the breaker/relay to open the circuit, thereby allowing the contactor to open when the circuit is not powered. The utilization of a breaker/relay in parallel with a contactor allows the contactor to open when the circuit is powered, and to allow the breaker/relay to open the circuit.

Referring to FIG. 150, the power distribution unit further may include a plurality of breaker/relay devices disposed therein, and wherein the current source circuit 15002 may be further electrically coupled to the plurality of breaker/relay devices, and to sequentially inject a current across each fixed contact of the plurality of breaker/relay devices; and wherein the voltage determination circuit 15006 may be further electrically coupled to each of the plurality of breaker/relay devices, and further structured to determine at least one of an injected voltage amount and a contactor impedance value for each of the plurality of breaker/relay devices (e.g., voltage drop determinations 15008). The current source circuit 15002 may be further structured to sequentially inject the current across each of the plurality of breaker/relay devices in a selected order of the breaker/relay devices. The current source circuit 15002 may be further structured to adjust the selected order in response to one or more operating conditions 15016 or stored properties 15018 such as: a rate of change of a temperature of each of the fixed contacts of the breaker/relay devices; an importance value of each of the breaker/relay devices; a criticality of each of the breaker/relay devices; a power throughput of each of the breaker/relay devices; and/or a fault condition or a contactor health condition of each of the breaker/relay devices. The current source circuit 15002 may be further structured to adjust the selected order in response to an operating condition 15016 such as a planned duty cycle and/or an observed duty cycle of the vehicle. The current source circuit 15002 may be further structured to sweep the injected current through a range of injection frequencies. The current source circuit 15002 may be further structured to inject the current across the fixed contact at a plurality of injection frequencies. The current source circuit 15002 may be further structured to inject the current across the fixed contact at a plurality of injection voltage amplitudes. The current source circuit 15002 may be further structured to inject the current across the fixed contact at an injection voltage amplitude determined in response to an operating condition 15106 such as a power throughput of the breaker/relay devices. The current source circuit 15002 may be further structured to inject the current across the fixed contact at an injection voltage amplitude determined in response to a duty cycle of the vehicle.

In an aspect, a system may include a vehicle having a motive electrical power path; a power distribution unit including a current protection circuit disposed in the motive electrical power path, the current protection circuit including breaker/relay, the breaker/relay including a fixed contact electrically coupled to a motive power circuit for a mobile application; a moveable contact selectively electrically coupled to the fixed contact, wherein the moveable contact in a first position allows power to flow through the motive power circuit, and the moveable contact in a second position does not allow power to flow through the motive power circuit; and a physical opening response portion responsive to a current value in the motive power circuit, wherein the physical opening response portion may be configured to move the moveable contact to the second position in response to the current value exceeding a threshold current value; a current source circuit 15002 electrically coupled to the breaker/relay and structured to inject a current (injection command 15004) across the fixed contact; and a voltage determination circuit 15006 electrically coupled to the breaker/relay and structured to determine an injected voltage amount and a contactor impedance value (voltage drop determination 15008), wherein the voltage determination circuit 15006 may be structured to perform a frequency analysis operation to determine the injected voltage amount. In embodiments, the voltage determination circuit 15006 may be further structured to determine the injected voltage amount by determining an amplitude of a voltage across the fixed contact at a frequency of interest. The frequency of interest may be determined in response to a frequency of the injected voltage. The current source circuit 15002 may be further structured to sweep the injected current through a range of injection frequencies. The current source circuit 15002 may be further structured to inject the current across the fixed contact at a plurality of injection frequencies. The current source circuit 15002 may be further structured to inject the current across the fixed contact at a plurality of injection voltage amplitudes. The current source circuit 15002 may be further structured to inject the current across the fixed contact at an injection voltage amplitude determined in response to a power throughput of the breaker/relay. The current source circuit 15002 may be further structured to inject the current across the fixed contact at an injection voltage amplitude determined in response to a duty cycle of the vehicle.

Referencing FIG. 152, an example procedure 15200 for configuring an X-in-1 power converter is schematically depicted. Operations of the procedure 15200 may be performed by any controllers, circuits, and/or hardware arrangements as described throughout the present disclosure, and further may be performed in relation to any of the systems or hardware arrangements described throughout the present disclosure. In certain embodiments, the procedure 152 may be utilized with any system having configurable power electronics, a multi-port power converter, an "X" port power converter, and/or an X-in-1 port power converter. The utilization of the terms multi-port, X port, and/or X-in-1 port indicate that a power converter includes one or more ports that can serve distinct power loads and/or power sources with one or more varying electrical characteristics. A configurable power converter may have one or more fixed ports, one or more configurable ports, or combinations of these.

The example procedure 15200 includes an operation to interpret a port electrical interface description (or specification), where the port electrical interface description includes a description of (or a specification of) electrical characteristics for at least one of a plurality of ports of a power converter for an electric mobile application. The example procedure 15200 further includes an operation 15204 to provide solid switch states in response to the port electrical interface description, thereby configuring at least one of an AC inverter or a DC/DC converter to provide power to the at least one of the plurality of ports according to the port electrical interface description. In certain embodiments, operation 15204 provides solid switch states to configure at least one of a rectifier or a DC/DC converter to interface with a power source (e.g., a battery, capacitor, regenerative state of a load, or the like), and/or to configure a port to accept power under certain operating conditions, and to provide power under other operating conditions. Without limitation, configurable electrical characteristics include voltage levels, frequency values, phase values (including a number and arrangement of phases), and/or tolerances to one or more of these.

The example procedure 15200 further includes an operation 15206 to interpret a source/load drive characteristic (e.g., frequency, phase, or other characteristics of an electric motor, motor/generator, or other device), and an operation 15208 to provide a component driver configuration (e.g., gate drivers for an insulated-gate bipolar transistor) in response to the source/load drive characteristic. In certain embodiments, one or more aspects of the procedure 15200 may be performed at various periods in the life cycle of the power converter and/or an electric mobile application having the power converter, such as: design time (e.g., specifying setting for a power converter), at installation time (e.g., configuring settings for the power converter according to a specification and/or needs of a particular installation), as a service operation (e.g., adjusting the configuration as a part of a test, to correct a failed or faulted component, and/or as a diagnostic operation), as a remanufacture operation (e.g., testing and/or confirming operations of the power converter, configuring the power converter to a standard state or a planned state for installation, etc.), as an upfit operation (e.g., providing an electric mobile application with an uprated capability such as a greater power rating, changing of a voltage and/or current rating through a port, addition of power inputs or outputs, changing one of the power inputs or outputs, and/or addition of phases or other capabilities to interface with loads or power sources), at a manufacture time (e.g., configuring settings for the power converter according to a specification and/or needs of a particular installation, testing and/or confirming operations of the power converter, configuring the power converter to a standard state or a planned state for installation, etc.), and/or as an application change operation (e.g., a conversion of an electric mobile platform to a different service operation, duty cycle, and/or the addition or removal of one or more loads or power sources).

Referencing FIG. 153, an example procedure 15300 for integrating a power converter into an electric mobile application is depicted. Operations of the procedure 15300 may be performed by any controllers, circuits, and/or hardware arrangements as described throughout the present disclosure, and further may be performed in relation to any of the systems or hardware arrangements described throughout the present disclosure. The example procedure 15300 includes an operation 15302 to provide a power converter having a number of ports for interfacing to electrical loads and/or sources, an operation 15304 to determine an electrical interface description for an electric mobile application, and an operation 15306 to provide solid state switch states in response to the electrical interface description. The example procedure 15300 further includes an operation 15308 to install the power converter in the electric mobile application, and an operation 15310 to couple coolant ports of the power converter to a cooling system of the electric mobile application. It can be seen that procedure 15300 provides for rapid and low cost integration with a number of electric mobile applications, including both the design and engineering for the integration, as well as simplified installation operations. The example procedure 15300 provides for the capability to meet multiple applications with a single power converter device, and/or with a small number of power converter devices having a similar (or identical) footprint and interface locations. The procedure 15300 further includes the capability to provide for a simple cooling interface to power electronics for the electric mobile application without having a number of cooling connections and cooling fluid routing challenges to provide cooling for multiple power electronics components distributed around the electric mobile application.

Referencing FIG. 154, an example procedure 15400 for adjusting motor operations in response to a motor temperature is schematically depicted. Operations of the procedure 15400 may be performed by any controllers, circuits, and/or hardware arrangements as described throughout the present disclosure, and further may be performed in relation to any of the systems or hardware arrangements described throughout the present disclosure. The example procedure 15400 includes an operation 15402 to operate a motor for an electric mobile application, and an operation 15404 to determine a motor temperature value (e.g., a modeled motor temperature, inferred motor temperature, and/or a motor temperature determined from a virtual sensor). Example operations 15404 to determine the motor temperature include, without limitation, determining and considering parameters such as: a power throughput of the motor, determining a voltage and/or current input value to the motor, adjusting the motor temperature value based on ambient temperature values, determining a motor efficiency value at the current operating conditions (e.g., to separate useful work energy from potentially heat generating energy throughput), and/or utilizing the rates of change of these.

The example procedure 15400 further includes an operation 15406 to determine a sensed temperature value for the motor. Example operations 15406 to determine the sensed motor temperature include, without limitation: determining a temperature from a sensor positioned to provide a temperature representative of the motor; determining a temperature from a sensor positioned to provide a temperature associated with the motor (e.g., having a known offset from the motor temperature, and/or from which the motor temperature can be derived); and/or determining a temperature from a sensor positioned to provide a temperature from which a temperature of interest of the motor is determined. For example, an operation 15406 includes applying a hot spot adjustment correction to the sensed motor temperature (e.g., where a temperature of interest is of a hottest location in the motor, which may not be reflected in a bulk temperature reading by a sensor). In certain embodiments, a hot spot adjustment correction may be calibrated as an offset from a detected temperature (which may be scheduled, e.g., as a function of the detected temperature), and/or from a calibrated relationship between the detected temperature and the hot spot temperature. In certain embodiments, the hot spot adjustment correction may further include dynamic information related to the sensed temperature, such as rates of change of the sensed temperature or power through the motor, and/or integration based parameters of the sensed temperature or power through the motor (e.g., accumulators, time values relative to threshold values, etc.).

The example procedure 15400 further includes an operation 15408 to adjust an operating parameter for the motor in response to the temperature values (e.g., the motor temperature value and the sensed motor temperature value). Example and non-limiting operations 15408 include: adjusting a rating of the motor (e.g., de-rating the motor, allowing greater power output of the motor, adjusting a voltage parameter of the motor to reduce heat production, etc.); adjusting a rating of a load of the electric mobile application (e.g., limiting the requested power and/or torque based on a temperature-induced limitation of the motor); adjusting an active cooling amount for the motor (e.g., engaging active cooling and/or changing a flow rate of active cooling to the motor); and/or adjusting an operating space of the motor based on an efficiency map of the motor (e.g., shifting the motor to a more efficient operating point to reduce heat generation, allowing the motor to operate at a less efficient operating point—for example to allow for a system-level optimization or efficiency routine, etc.).

Referencing FIG. 155, an example procedure 15500 to determine reliability values for the sensed motor temperature value and/or the modeled/estimated motor temperature value is schematically depicted. The procedure 15500 includes an operation 15502 to determine a first reliability value for the motor temperature value (e.g., the modeled, estimated, or virtual motor temperature value) in response to a first operating condition for the motor. For example, a model or estimator may have a valid range, a known relationship to uncertainty based on operating condition regions, and/or depend upon other sensors or determined values having a fault or failure condition. The example procedure 15500 further includes an operation 15504 to determine a second reliability for the sensed motor temperature value. For example, the sensed motor temperature value may have a fault condition or a failure condition for the associated sensor, the sensor may have a time constant that is slower than currently observed temperature changes, and/or the sensor may be saturated, have a low resolution, and/or have a reduced accuracy in certain temperature or other operating conditions. Example and non-limiting operating conditions to determine the first reliability value include: a power throughput of the motor; a rate of change of power throughput of the motor; a defined range value for a model used to determine the motor temperature value; and/or a rate of change of one of the motor temperature value or the effective motor temperature value. Example and non-limiting operating conditions to determine the second reliability value include: a power throughput of the motor; a rate of change of power throughput of the motor; a defined range value for a temperature sensor providing the sensed motor temperature value; a defined temperature-accuracy relationship for a temperature sensor providing the sensed motor temperature value; a response time for a temperature sensor providing the sensed motor temperature value; and a fault condition for a temperature sensor providing the sensed motor temperature value.

The example procedure 15500 further includes an operation 15506 to determine an effective motor temperature value in response to the motor temperature value and the sensed motor temperature value, and in certain embodiments the operation 15506 further determined the effective motor temperature in response to the first reliability value and the second reliability value. An example operation 15506 includes choosing one or the other of the motor temperature value or the sensed motor temperature value as the effective motor temperature value based on the first reliability value and the second reliability value; and/or utilizing one or the other of the motor temperature value or the sensed motor temperature value as a target for the effective motor temperature value based on the first reliability value and the second reliability value (e.g., where the effective motor temperature value is a filtered value moving toward the target). In certain embodiments, the effective motor temperature value, or the target for the effective motor temperature value, use a mixing of the motor temperature value and/or the sensed motor temperature value (e.g., a weighted average as a function of the reliability values). In certain embodiments, for example where one or the other of the motor temperature value or the sensed motor temperature value are utilized to drive the effective motor temperature value, the operation 15506 may further include hysteresis or other processing (e.g., filtering, averaging, rate-limiting, etc.), for example to avoid dithering of the effective motor temperature value. In certain embodiments, procedure 15500 is utilized in combination with procedure 15400—for example utilizing the effective motor temperature value as an input to operation 15408, and adjusting an operating parameter of the motor in response to the effective motor temperature value.

The term a motor temperature value, or a temperature of the motor, should be understood broadly. A motor temperature value may be any temperature value of interest that is related to the motor—for example a hottest position within the motor, a component of the motor that is most prone to failure in response to temperature excursions, a component of the motor that is most prone to affect some other component of the system in response to temperature excursions, and/or a temperature related to the motor that correlates with an effective efficient power conversion of the motor. Example and non-limiting motor temperature values include, without limitation: a winding temperature of the motor, a bus bar temperature for a bus bar providing power to the motor, a connector temperature related to the motor, and/or a hot spot temperature of the motor.

Referencing FIG. 156, in an aspect, an apparatus 15600 may include a motor control circuit 15602 structured to operate a motor for an electric mobile application; an operating conditions circuit 15604 structured to interpret a sensed motor temperature value 15608 for the motor, and further structured to interpret at least motor temperature relevant operating condition 15620 such as: a power throughput of the motor; a voltage input value to the motor; a current input value to the motor; an ambient temperature value; and/or an active cooling amount for the motor. An example apparatus 15600 includes a motor temperature determination circuit 15606 structured to determine a motor temperature value 15614 in response to the motor temperature relevant operating condition(s) 15620. An example motor temperature determination circuit 15606 further determines a motor effective temperature value 15612 in response to the motor temperature value 15614 and the sensed motor temperature value 15608; where the motor control circuit 15602 may be further structured to adjust at least one operating parameter for the motor (e.g., as an updated motor command 15610) in response to the motor effective temperature value 15614. In embodiments, the motor temperature determination circuit 15606 may be further structured to determine a first reliability value for the motor temperature value in response to a first operating condition for the motor and determine a second reliability value for the sensed motor temperature value in response to a second operating condition for the motor (reliability values 15616), and determine the motor effective temperature value 15612 further in response to the reliability values 15616.

The motor temperature determination circuit 15606 may be further structured to use the sensed motor temperature value 15608 as the motor effective temperature value in response to the second reliability value exceeding a threshold value. The motor temperature determination circuit 15606 may be further structured to apply a temperature adjustment 15618 such as an offset component adjustment or a hot spot adjustment to the sensed motor temperature value 15608, and determine the motor effective temperature value 15612 further in response to the adjusted sensed motor temperature value. The motor temperature determination circuit 15606 may be further structured to determine the first reliability value in response to at least one operating condition 15620 such as: the power throughput of the motor; a rate of change of power throughput of the motor; a defined range value for a model used to determine the motor temperature value; and a rate of change of one of the motor temperature value or the effective motor temperature value. The motor temperature determination circuit 15606 may be further structured to determine the second reliability value in response to at least one operating condition 15620 such as: the power throughput of the motor; a rate of change of power throughput of the motor; a defined range value for a temperature sensor providing the sensed motor temperature value; a response time for a temperature sensor providing the sensed motor temperature value; and a fault condition for a temperature sensor providing the sensed motor temperature value. The motor control circuit 15606 may be further structured to adjust at least one operating parameter (e.g., an adjusted motor command 15610) for the motor such as: a rating of the motor; a rating of a load of the electric mobile application; the active cooling amount for the motor; and an operating space of the motor based on an efficiency map of the motor.

In an aspect, a system may include an electric mobile application having a motor and an inverter, wherein the inverter may include a plurality of driving elements for the motor. Referencing FIG. 157, the example system further includes a controller 15700 having a motor control circuit 15702 structured to provide driver commands (driving element commands 15704), and where the plurality of driving elements may be responsive to the driver commands 15704. The controller 15700 further includes an operating conditions circuit 15706 structured to interpret a motor performance request value 15708 such as a power, speed, and/or torque request for the motor. The controller 15700 further includes a driver efficiency circuit 15710 that interprets a driver activation value 15712 for each of the plurality of driving elements of the inverter in response to the motor performance request value 15708, and where the motor control circuit 15702 may be further structured to provide the driver commands 15704 to de-activate at least one of the driving elements for the motor in response to the driver activation value 15712 for each of the plurality of driving elements of the inverter. In embodiments, the motor may include a three-phase AC motor, wherein the plurality of driving elements include six driving elements, and wherein the driver efficiency circuit 15710 provides the driver activation value 15712 to de-activate three of the six driving elements in response to the motor performance request value 15708 being below a threshold value.

Referencing FIG. 158, an example procedure 15800 for selectively de-activating portions of a power inverter for an electric mobile application is depicted. Operations of the procedure 15800 may be performed by any controllers, circuits, and/or hardware arrangements as described throughout the present disclosure, and further may be performed in relation to any of the systems or hardware arrangements described throughout the present disclosure. The example procedure 15800 includes an operation 15802 to provide driver commands to a plurality of driving elements of an inverter electrically coupled to a motor for an electric mobile application, and an operation 15804 to interpret a motor performance request value for the electric mobile application. Example and non-limiting motor performance request values include, without limitation, a power, a speed, and/or or a torque request for a motor powered by the power inverter. The example procedure 15800 further includes an operation 15806 to interpret a driver activation value for each of the plurality of driving elements in response to the motor performance request value. For example, if the motor performance request value includes a power request requiring all of the driving elements (e.g., IGBTs on an inverter) to be active to accommodate the power request, then operation 15806 may determine that the driver activation value for each driving element is "TRUE". In another example, if the motor performance request value includes a power request where only a portion of the driving elements are required to meet the power request, the operation 15806 may include determining whether some of the driving elements may be deactivated. In a further example, the operation 15806 may include determining an efficiency of the driving elements in a first condition (e.g., all driving elements active), and the efficiency of the driving elements in a second condition (e.g., some driving elements inactive), and determining the driver activation values that meet the desired goals (e.g., power conversion efficiency, temperature targets for driving elements, planned life cycle of the driving elements, noise or electrical characteristic requirements of the motor or load, etc.). The example procedure 15800 further includes an operation 15806 to provide driver commands to the driving elements in response to the driver activation values, including deactivating one or more driving elements in response to the driver activation value(s). An example procedure 15800 includes the operation 15806 to deactivate three out of six total driving elements (e.g., retaining capability to support three balanced phases to drive a motor). A further example procedure 15800 includes the operation 15806 to deactivate a first three out of six total driving elements during a first de-activation operation, and de-activating a second three out of the six total driving elements during a second de-activation (e.g., to balance the life cycles of driving elements, to balance heat generation within the inverter over time, to utilize banks of driving elements having distinct capabilities such as power ratings, etc.).

Referencing FIG. 159, an example system 15900 may include an electric mobile application having a plurality of electric motors 15904, 15908, 15912, 15916, each one of the plurality of electric motors operationally coupled to a corresponding one of a plurality of electric loads 15906, 15910, 15914, 15918. The example system 15900 includes four motors coupled to four loads, although a system may include any number of motors coupled to any number of loads, and the motors and loads may have more than one motor for a given load, and/or more than one load for a given motor. The system includes a controller 15902, where the controller 15902 includes (Reference FIG. 160) an application load circuit 16002 structured to interpret an application performance request value 16010; a performance servicing circuit 16004 structured to determine a plurality of motor commands 16020 in response to a motor capability description (motor performance capability 16016), and the application performance request value 16010. The controller 15902 further includes a motor control circuit 16006 structured to provide the plurality of motor commands 16014 to corresponding motors 15904, 15908, 15912, 15916 of the plurality of electric motors; and wherein the plurality of electric motors 15904, 15908, 15912, 15916 may be responsive to the plurality of motor commands 16014. The determined motor commands 16020 may differ from the communicated motor commands 16014, for example to account for system dynamics, rate change limits, and/or other constraints not related to meeting performance requests of the system.

In embodiments, the performance servicing circuit 16004 may be further structured to determine the plurality of motor commands 16020 in response to one of a fault condition or a failure condition 16012 for at least one of the plurality of electric motors, and/or for a component related to one of the plurality of electric motors (e.g., a local inverter, local controller, sensor, and/or the load). The performance servicing circuit 16004 may be further structured to determine the plurality of motor commands 16020 to meet the application performance request value 16010 by at least partially redistributing load requirements from one of the plurality of electric motors having the fault condition or the failure condition 16012, to at least one of the plurality of electric motors having available performance capacity (but which may have a separate fault condition or failure condition 16012). The performance servicing circuit 16004 may be further structured to derate one of the plurality of electric motors in response to the one of the fault condition or the failure condition 16012. The system may further include a first data store 16024 associated with a first one of the plurality of electric motors, a second data store 16026 associated with a second one of the plurality of electric motors, and wherein the controller 15902 further may include a data management circuit 16008 structured to command at least partial data redundancy (e.g., redundant data value(s) 16022) between the first data store 16024 and the second data store 16026, and/or between one of the data stores 16024, 16026, and another data store in the system (not shown) and/or to an external data store. The at least partial data redundancy may include at least one data value selected from the data values consisting of: a fault value, a system state, and a learning component value. The data management circuit 16008 may be further structured to command the at least partial data redundancy in response to one of a fault condition or a failure condition 16012 related to, without limitation, at least one of: one of the plurality of electric motors, an inverter operationally coupled to one of the plurality of electric motors; a sensor operationally coupled to one of the plurality of electric motors; and/or a local controller operationally coupled to one of the plurality of electric motors. The performance servicing circuit 16004 may be further structured to determine the plurality of motor commands 16020 in response to the one of the fault condition or the failure condition 16012, and further in response to data 16022 from the at least partial data redundancy. The performance servicing circuit 16004 may be further structured to suppress an operator notification 16018 of one of a fault condition or a failure condition 16012 in response to a performance capability 16016 of the plurality of electric motors being capable of delivering the application performance request value 16010. The performance servicing circuit 16004 may be further structured to communicate the suppressed operator notification 16018 to at least one of a service tool 16030 or an external controller 16028, wherein the external controller 16028 and/or the service tool 16030 may be at least intermittently communicatively coupled to the controller 15902. The performance servicing circuit 16004 may be further structured to adjust the application performance request value 16010 in response to a performance capability 16016 of the plurality of electric motors being incapable of delivering the application performance request value 16010.

Referencing FIG. 161, an example procedure 16100 for controlling an electric mobile application having a number of distributed motors is schematically depicted. In certain embodiments, the procedure 16100 may be utilized with an electric mobile application having one or more distributed driving elements (e.g., inverters) associated with one or more of the distributed motors, and/or one or more distributed controllers for the inverters and/or motors. The distributed motors may be configured to power various loads within the electric mobile application, and in certain embodiments, more than one motor may be capable to provide power to a particular load (e.g., motors associated with the wheels may be combined to provide overall motive power). Operations of the procedure 16100 may be performed by any controllers, circuits, and/or hardware arrangements as described throughout the present disclosure, and further may be performed in relation to any of the systems or hardware arrangements described throughout the present disclosure. The example procedure 16100 includes an operation 16102 to interpret an application performance request value. Example and non-limiting application performance request values include a motive or load power request, a motive or load torque request, and/or a motive or load speed request. The application performance request may be related to the entire application (e.g., a vehicle speed) and/or any portion of the application (e.g., a pump speed, a fan torque, etc.). The example procedure 16100 includes an operation 16104 to determine a fault and/or failure condition for one or more motors, inverters, and/or local controllers of the electric mobile application. The determination of a fault and/or failure condition may further include determining a capability for the faulted or failed component (e.g., a de-rated motor may still be capable to provide some increment of power, and/or a motor having a failed inverter related to that motor may have some capability to receive power provided by another inverter in the system). In certain embodiments, for example where a motor is related to a local controller for the motor, and the local controller has failed, the motor may nevertheless be able to be controlled by another controller in the system and/or another local controller related to another motor in the system. In certain embodiments, the control of the motor by another controller in the system may be de-rated—for example where the distant controller does not have one or more parameters available such a temperature value, a speed value, or another feedback value for the motor, and/or has a degraded version of any such parameter (e.g., slower, lower resolution, and/or lower certainty), the distant controller may control the motor at a reduced power limit to protect the motor and/or the electric mobile application.

The example procedure 16100 further includes an operation 16106 to determine motor commands in response to a motor capability description (e.g., motor ratings, including de-rates according to fault or failure conditions for related components, and/or due to the type of control such as when a distant controller is operating the motor), the application performance request value, and the fault/failure conditions of the motors. In certain embodiments, operation 16106 includes providing sufficient performance across the available motors such that the application performance request value can be met. In certain embodiments, operation 16106 further includes providing commands to one or more of the motors, local controllers, and/or related inverters in response to the determined motor commands.

In certain embodiments, the procedure 16100 further includes an operation 16108 to command a data redundancy storage operation. For example, critical operating information such as motor or inverter calibrations, operating states, limitations, or the like, may be stored in more than one location. In certain embodiments, the operation 16108 is responsive to fault or failure conditions in the electric mobile application, for example where a local controller, sensor, or other component has a fault or failure condition, the operation 16108 may include commanding data redundancy storage related to the component (or related components) having the fault or failure condition. In certain embodiments, the operation 16108 may include commanding data redundancy storage for components that do not have a fault or failure condition, and further enhancing the data redundancy storage in response to the occurrence of a fault or failure condition. In certain embodiments, the operation 16108 provides for data redundancy storage regardless of the fault or failure condition of components in the electric mobile application. Accordingly, operation 16108 provides for protection from the loss of data in response to the loss of a data storage component (e.g., parameters stored on a local controller), and provides for improved control of components (e.g., inverters and/or motors) if an associated local controller has a fault or failure and is not able to control the related component and/or communicate out control parameters for the local component after the fault or failure. In certain embodiments, data redundancy may include at least one data value selected from the data values consisting of: a fault value, a system state, and a learning component value (e.g., control parameters related to a machine learning operation and/or real-time calibration values). In certain embodiments, operation 16106 includes determining the motor, inverter, or local controller commands in response to the data in the data redundancy storage. The operation 16108 to provide for data redundancy storage includes distributing data in any manner within a data store available beyond the host data store, including at least a data store associated with any one or more of the following: another local controller, a master controller and/or a distributed (e.g., virtual) controller, a powertrain controller, a vehicle controller, and/or an external controller (e.g., a manufacturer server, a fleet server, a cloud-based server, a personal device such as an operator's smart phone, etc.).

The example procedure 16100 includes an operation 16110 to suppress an operator notification (e.g., a warning or maintenance light, a vehicle response based notification, an app-based notification, or the like) of a failure or fault (e.g., as determined in operation 16104) in response to the available motor commands being capable to meet the application performance request value. For example, if a motor derate occurs where the mission of the electric mobile application can still be met (e.g., rated power is achievable, and/or a power request exceeding the current capability of the motors has not occurred or is not likely to occur), then operation 16110 may suppress the operator notification of the fault or failure indication that would normally occur. The example procedure 16100 further includes an operation 16112 to communicate the suppressed operator notifications (and/or the underlying fault or failure condition(s)) to a service tool or external controller. For example, if a motor derate occurs where the mission of the electric mobile application can still be met, the procedure 16100 may include suppressing an operator notification, and notifying an external controller (e.g., a fleet maintenance server, manufacturer server, or other external server) and/or a service tool (e.g., an OBD device connecting to a communications port of the electric mobile application, a Wi-Fi based device in a service shop, etc.). Accordingly, inconvenient and/or expensive service events can be avoided, and/or servicing parties can be notified such that the fault or failure can be addressed at a convenient time and/or when the electric mobile application is already being serviced. In certain embodiments, the procedure 16100 includes an operation (not shown) to receive parameters defining the types of faults and/or failures that can be suppressed from operator notification, and/or performance limits and/or component types (relating to the faults/failures) that can be suppressed from operator notification. Additionally or alternatively, the procedure 16100 includes an operation (not shown) to receive parameters defining the types of faults and/or failures that are to be communicated to an external controller, and/or performance limits and/or component types that are to be communicated to the external controller. Additionally or alternatively, the procedure 16100 includes an operation (not shown) defining operator notification types that should be suppressed (e.g., where one type of operator notification is suppressed and another is executed), and/or the timing or locations of external controller notifications.

An adaptive inverter control method may be provided for efficiency improvement by at least in part adjusting a driver board power supply voltage, such as based on the inverter frequency, electric vehicle speed, and the like, to obtain optimized efficiency of the traction inverter and to increase fuel economy and/or range (e.g., for an electric vehicle). Traction inverters for electric vehicle are controlled with variable switching frequencies and under different DC link voltage level. Typically, the inverter (e.g., using IGBT or MOSFET) utilizes a driver board power supply voltage (DBPSV) that is fixed during whole product life operation on vehicles. This voltage DBPSV may be referred to as the gate control signal shown in FIG. 162, as VGE for IGBT) and as VGS MOSFET. This power supply voltage may for instance be in the range of 13V to 19V depending on the IGBT/MOSFET technologies and suppliers. Also the turn off voltage may vary from −10V to 0V depending on IGBT/MOSFET or Silicon or Silicon Carbide based. In this instance, it is fixed, such as after offline design and optimization, but it is not optimized during real time running.

In embodiments, optimization of the inverter efficiency may be further based on operating conditions, such as where the driver board has an optimized loss at multiple working conditions. For example, when a vehicle is running at high speed the vehicle inverter could run in six step modes, where the conduction losses will be dominant. For instance, $Pcon=V_{ce}*I_c$ for IGBT (similar to MOSFET). Based on the vehicle cruise control information and the output frequency information, as soon as inverter determines that it is going cruise at 6 step modes, the inverter driver board can increase the supply voltage to reduce $V_{ce}$. For example, with reference to FIG. 163, under the same Ic condition, at higher $V_{GE}$, the $v_{ce}$ (on) is $V_{ce1}$ 16302 so the conduction loss during the same operation condition is the smallest and the inverter efficiency is improved (Pcon=Vce*Ic).

A control method is shown in FIG. 164, where an inverter controller is monitoring vehicle mode and modulation index closely. In a first aspect, a control method can comprise: the vehicle is monitored for whether (a) it is put into cruise mode, (b) there are no faults, and (c) the signal becomes irregular as by the modulation index going to six step or deep pulse reduction ranges. The irregular signal may also be verified by monitoring the inverter output frequency through current measurement. If all three a, b, c are satisfied, the DBPSV is changed to the highest possible of the system to reduce the $V_{ce}$ during "on" status, which reduces the overall inverter losses and improves inverter and system efficiency. In another aspect, a control method can comprise:

the vehicle is monitored for whether (d) it is not put into cruise mode, (e) there are no fault modes, but (d) the signal is within a threshold irregular range (e.g., between 0.87 and 1). The threshold irregular range indicates that the modulation index has mostly gone to six step or deep pulse reduction ranges. This can mean for instance that the driver is driving in high speed as by manually pushing the pedal. In embodiments, the driver behavior, in this instance that he is driving high speed, can be confirmed by a machine learning algorithm. The machine learning algorithm may also be configured to calculate the best high DBPSV for this use case and change the DBPSV to improve the inverter efficiency. In embodiments, a method may begin with a vehicle mode 16402, a modulation index 16404, and the like. The process may then proceed to determining if the vehicle is in cruise mode 16406. If yes, then the process determines if the vehicle is in six step mode and/or deep pulse reduction mode 16408, and if yes, additionally proceeds to adjusting the DBPSV to reduce $V_{ce}$ or $V_{as}$ per an optimization algorithm 16410. If no, then the process determines if the inverter is in six step mode and/or deep pulse reduction mode 16412. If yes, the process determines if the inverter is predicted to continue working on this mode 16416, and if no, or if the step of 16412 is no, proceeding to keep the existing optimized power supply voltage 16414.

The calculation can be better understood with reference to FIG. 165. Here, $E_{off}$ turns off loss of power semiconductor switches (IGBT or MOSFET for example). Eon turns on loss of power semiconductor switches (IGBT or MOSFET for example). If the vehicle runs in a pulse reduction mode, $V_{ge}$ can be increased step by step. If the total loss estimated is reduced, then the algorithm can continue to increase $V_{ge}$ stepwise until $V_{ge}$ reaches a maximum $V_{ge}$. In embodiments, the $V_{ge}$ can be defined by a design engineer and a predetermined setting. If the inverter losses reduce, the efficiency increases. The methods may be applied to any operating point of the inverter to make sure an optimized gate driver voltage is chosen for the best system efficiency. In embodiments, a method may begin with setting a plurality of operating parameters, such as a modulation index 16502, vehicle speed 16504, $E_{off}$ and $E_{on}$ 16506, $V_{ce}$ vs. $I_c$ tables 16508, switching frequency 16510, junction temperature estimation 16512, and the like. The process may then determine actual switching frequency based on the modulation index and switching frequency 16514, adjust the drive $V_{ge}$ reference value 16516, calculate a switching loss 16518, calculate a conduction loss 16520, calculate a total inverter loss 16522, and determine if the loss is optimized is the smallest 16524. If yes, the process sets a drive $V_{ge}$ value 16526. If no, then the process jumps back to adjust the drive $V_{ge}$ reference value 16516.

An Adaptive Inverter Control Method may have a number of advantages, such as (1) improving traction inverter efficiency at vehicle high speed region to improve vehicle fuel economy or range (such as in electric vehicles); (2) simplifying control change that can be implemented with a driver board having embedded power supply control function; being capable of online optimization of the power supply voltage based on individual vehicle driving behavior; (4) the same method can be applied to Silicon/Silicon Carbide IGBT and Silicon/Silicon Carbide MOSFET based inverters; and the like.

In an aspect, a control system and method may include monitoring the vehicle monitored for whether (a) it is put into cruise mode, (b) there are no faults, and (c) the signal becomes irregular as by the modulation index going to six step or deep pulse reduction ranges, or the irregular signal is verified by monitoring the inverter output frequency through current measurement; when all three a, b, c are satisfied, the DBPSV is changed to the highest possible of the system to reduce the $V_{ce}$ during "on" status, which reduces the overall inverter losses and improves inverter and system efficiency.

In an aspect, a control system and method may include monitoring the vehicle monitored for whether (d) it is not put into cruise mode, (e) there are no fault modes, and (d) the signal is within a threshold irregular range indicating that the modulation index has mostly gone to six step or deep pulse reduction ranges; calculating the best high DBPSV for this use case; and changing the DBPSV to improve the inverter efficiency. In embodiments, the method may include monitoring vehicle mode and modulation index via an inverter controller. The optimizing of the gate driver voltage at any operating point of the inverter may ensure an optimized gate driver voltage is chosen for the best system efficiency.

In embodiments, a hybrid power connection for electric vehicle traction inverters with multiple devices in parallel may be provided. Traction inverters rated with higher power capabilities may be used in an electrical vehicle. However, a single power device or power module may not handle the required current, so power devices may need to be connected in parallel. Insulated-gate bipolar transistor (IGBT) switches can be used as the power device in traction inverter. Wide-bandgap (WBG) semiconductor devices, such as Silicon Carbide, is an attractive candidate to replace IGBT, where WBG devices feature lower conduction and switching losses and can improve the efficiency and power density of the inverter. Paralleling devices may be an effective way to increase inverter capacity, such as with small devices. However, a challenge for paralleled power devices (e.g., IGBT, SiC MOSFET) is current sharing performance. Layout of the circuit is critical to ensure good current sharing between devices. The higher the paralleling of device is, the more difficult the layout is. Using WBG devices may make the paralleling more difficult due to fast switching speed. Symmetric DC power loop and AC power loop may also be critical for the layout.

Implementing a power connection design for a traction inverter with multiple paralleled devices may have advantages. The design may be applicable to paralleling devices with otherwise standard packages. Examples of embodiment packages and package configurations are shown in FIGS. 166A-C. The number of the paralleled devices may not be limited by the design. For instance, six in parallel per switch is shown in FIG. 167-B, where the design of one phase leg (consisting of upper and lower switch) assembly is shown. In this configuration, the top switch devices and bottom switch devices are mounted on opposite sides of two liquid cooling plates (LCP), respectively. A laminated DC busbar may be inserted in the middle connecting area. The DC pin of each device may be bended and connected to the laminated DC busbar, such as through laser welding.

An example three-phase assembly is shown in FIG. 168, consisting of four LCPs 16802 interfacing with the printed circuit board (PCB) 16804 and a laminated DC bus 16812 through a connector device 16808. In this example the AC power loop of all three phases are connected via a power PCB. Three phase output bars 16806 are shown placed at the end of the PCB. This design may ensure minimum and symmetrical stray impedance for the DC loop, and minimize stray impedance unbalance for AC power loop.

The power connection configuration for a traction inverter may be provided with multiple paralleled devices. The configuration may be applicable to paralleling devices with typical standard packages, where the number of the paralleled devices is not limited by the configuration. The parallel connection configuration may include a hybrid connection of DC and AC power loop for parallel connected devices. Multiple paralleled devices may be mounted vertically on an LCP. Each phase may use one LCP with devices on both sides. For DC power loop, busbars may be used. For AC power loop, a PCB may be used. In the configuration, the DC capacitors may be placed on the bottom of the 3-phase assembly. For DC power loop, DC busbars may be directly integrated with a DC capacitor bank to remove any external connections to reduce the cost and minimize the stay inductances. No screws or bolts may be needed. DC busbars may be connected to pins of paralleled devices through laser welding. The distance from the DC cap 16810 to paralleled devices may be symmetrical. For AC power loop, a PCB may be used to connect the AC loop of all 3-phases. Through proper layout of the PCB traces, proper symmetricity can be achieved.

An example circuit of a three-phase two-level inverter is shown in FIG. 169. In this example, each phase may consist of a top switch and bottom switch, and each switch may use six semiconductor devices in parallel. For instance, for a 400V system, 650V IGBTs or SiC MOSFETs may be used. For 800V system, 1200V IGBTs or SiC MOSFETs may be used. The details of one phase with six devices in parallel per switch is shown in FIG. 170, where parasitic inductances for DC and AC loops are noted.

Referring to FIGS. 171A-C, a hybrid power connection configuration with multiple devices in parallel may be illustrated through an exploded view of a three-phase assembly, a DC busbar connection, and an AC printed circuit board connection. The three-phase assembly 17102 illustrates a DC cap 16810 on the bottom, laminated DC bus 16812 integrated in DC cap, Devices 16808 and LCPs 16802 in the middle, and an AC power PCB 16804 on top. The DC busbar connection 17104 illustrates laminated DC buses 16812 (+DC 16812A and −DC 16812B), laser welding DC pins 17110 to DC bus, bended top on DC bus for better welding contact surface, and small and symmetric stray inductances (e.g., on the order of 2 nH). The AC printed circuit board connection 17106 illustrates a PCB is designed to connect the AC pins of all 3-phase devices, with stray inductance approximately symmetrical for paralleled devices (e.g., on the order of 1-15 nH). FIGS. 172A-B depict embodiments of a multiple busbar connection arrangement. FIG. 173A-B depict embodiments of a multiple busbar connection arrangement. FIGS. 174A-B depict embodiments of a multiple busbar connection arrangement in connection with a AC printed circuit board.

Other Benefits may include enabling driving a multiphase motor with minimum design change. Multiphase motors are often used in an electrical vehicle drivetrain to improve power density and reduce torque ripple. Driving a multiphase motor can result in the inverter having multi-phase AC outputs. For conventional inverter design with power modules, driving the multi-phase motor may require a new configuration of the inverter. A hybrid power connection configuration with multiple devices in parallel may enable driving a multi-phase motor with minimum configuration change, where the cooling system, devices, DC cap, DC bus connection, and overall mechanical design stay the same. The re-configured portions may be limited to AC power PCB and driver boards. The configuration may minimize the cost of design changing when driving a multi-phase motor is required.

FIGS. 175A-C depict embodiment options for driving a multi-phase motor. In a first option 17502, the configuration drives a 3-phase motor, where six devices are all assigned to one phase, with six devices in parallel per switch. In a second option 17504, the configuration drives a 6-phase motor, where six devices are divided into two phases, with three devices in parallel per switch. In a third option 17506, the configuration drives a 9-phase motor, where six devices are all assigned to three phases, with two devices in parallel per switch.

In embodiments, an active current balancing method may be provided for paralleled power devices that detects the voltage of thermal resistance and regulates the gate voltage of a device. Normally, paralleled power devices may have unbalanced current that can easily cause thermal issues or over current and damage the devices. With active current balancing, paralleled power devices with higher temperature will flow lower current and then decrease the temperature. Industrial applications may include traction inverters with higher power in the electrical vehicle market, single power devices or power modules that cannot handle all of the current, single power devices that otherwise need to be connected in parallel, IGBT devices that are normally used as the power device in traction inverter replacing a normally used power device, a SiC MOSFET device to replace an IGBT device which has lower switching loss and will contribute to higher power density, and the like. Paralleled power devices face various challenges, including current sharing performance. Unbalanced currents may result from unequal internal parameters of device (e.g., threshold voltage, miller capacitor, and the like), unsymmetrical layout of an inverter (e.g., unequal parasitic inductance, unequal parasitic resistance, and the like). In an example, assuming a 250 kW traction inverter with 450 A phase current, the following data shows how many devices need to be connected in parallel according to their rated current, noting that the more devices in parallel, the worse the sharing performance: a discrete IGBT/SiC device type with a current rating 50 A would need ten devices in parallel, a discrete IGBT/SiC device type with a current rating 100 A would need 5 devices in parallel, and a modular IGBT/SiC device type with a current rating 200 A would need three devices in parallel.

Referring to FIGS. 176 and 177, for both IGBT and SiC MOSFET, higher gate drive voltage will lead to higher current when voltage drop on the device remains the same. When the gate voltage of paralleled devices are different, current on each device will also be different. Changing the gate voltage of the device enables its current to be regulated. A higher device current will cause higher junction temperature, and detecting the temperature enables prediction of which device shares the highest current. Decreasing the gate voltage of device with highest temperature enables balancing the current.

Referring to the illustrative process flow diagram of FIG. 178, if a device module with a negative temperature coefficient (NTC) are used, directly detect NTC voltage in a first process step 17802, which reflects the module's junction temperature. If modules without an integrated NTC or discrete power device are used, the NTC may be placed close to the device to reflect the case temperature. In a next process step 17804, an NTC threshold resistance is determined according to an resistance-temperature curve, where a resistance lower than a threshold value means the temperature of the device is too high. In a next process step 17806, the gate voltage of the device is decreased. In a next process step 17808, the gate voltage is decreased to a minimum value (although in terms of life time and power loss, the gate voltage should not be too low). Then, in a next process step 17810, the gate voltage is kept constant.

Referring to an illustrative circuit in FIG. 179, a circuit is presented that provides active current balancing. In the circuit, $V_{in}$ is the input voltage, $Q_1$ is an NPN transistor, $Z_1$ is a three-terminal regulator, $R_1$ and $R_2$ are resistors to regulate the gate voltage, and $R_{NTC}$ is the thermal resistance to reflect the temperature of the device. If the temperate increases, the $R_{NTC}$ decreases along with the gate voltage and current, which then results in a decreasing of the temperature, thus providing stability. In an example, a TL431 can be used as the three-terminal regulator, and a reference voltage of the device (at pin 2 of the TL431) is set to 2.5V so that: $Vg=2.5((R_1+R_2+R_{NTC}/R_1)$, where NTC varies with temperature, wherein the higher temperature corresponds to lower NTC resistance (when $R_{NTC}<R_{th}$, $V_g$ will begin to be regulated; when $R_{NTC}=R_{th}$, device temperature is highest and $V_g$ should be minimum) Assuming normal input voltage $V_{in}$=18V and the minimum input voltage is 15V, $18V=2.5((R_1+R_2+R_{th})/R_1)$ and $15V=2.5((R_1+R_2+R_{min})/R_1)$, where $R_1$ and $R_2$ then be calculated.

Referring to FIGS. 180A-B, two functional block diagrams for an overall structure with active current balancing are shown, where functional block diagram 18002 illustrates a gate driver structure without active current balancing, and functional block diagram 18004 illustrates a gate driver structure with active current balancing with active balancing functions 18006 are inserted between the drive circuit and the buffer to the device.

In embodiments, a high power electric heater configuration for applications in a mobile electrical application may be provided, where the configuration enables improved efficiency, adjustability, and initiation response. Previously known electric heaters for mobile applications suffer from a number of drawbacks, including: low resolution control; low capability fuse protection having either high current fuses that are not protective, or low current fuses subject to nuisance opening events; additional hardware including dedicated power distribution and/or additional fuses for each power line; over-designed hardware to manage in-rush current and oscillations during operation; and/or limited or non-existent monitoring and diagnostics.

Example embodiments of the present disclosure provide for a number of benefits relative to previously known systems. Embodiments herein provide for high resolution variable temperature (and/or heating power) operation, selected variability (e.g., linear or proportional), reduced component count, reduced integration interfaces, a reduced physical footprint, improved fuse matching to the system, and diagnostic and/or monitoring capability. Embodiments herein provide for improved efficiency by, without limitation, managing in-rush currents on startup, providing variable heating control to maintain cabin temperature stability, and/or control operations to reduce overdesign of physical components such as inductor coils and/or fuses. Example embodiments of the present disclosure include: utilization of a DC-DC converter with controlled duty cycle (PWM) operation; utilization of a 2-phase interleaved buck converter; thermal power dissipation; soft start control to minimize inrush current; power sharing between phases during overlap operation (e.g., operating conditions where both phases are active); integration with an application-level (e.g., vehicle) power distribution unit (PDU) which can leverage an available controller, interfaces, and/or thermal management hardware and controls, and which can reduce the system-level number of components and footprint.

Example embodiments are capable to provide power for a 5.5 kW system with 50 W power increments, although any power capability and resolution is contemplated herein. Example embodiments include a PTC (positive temperature coefficient) heating element, and/or a PTC/NTC control element that is adjustable (e.g., using a PWM control scheme). Example embodiments include utilizing a contactor or relay (electrical component and/or solid state) to power the heater, potentially configured as a 2-phase interleaved buck converter. Example embodiments include current sensing for heater power, and/or for each phase of the heater. Example embodiments include an integrated box having power distribution, current protection, and heater control within a single housing. Example embodiments include incorporating the power distribution, current protection, and heater control within an application-level PDU. Example embodiments include accepting a heater control command (power output and/or temperature based) over a local network or CAN. Example embodiments include diagnostic operations, fault management operations, and/or prognostic operations for the heater and/or related components (e.g., fuses and/or power circuitry).

In embodiments, a configured intelligent combination device having distribution, protection and heater control mechanism may be accommodated together, incorporating heater (PTC/NTC) controller (e.g., into a junction box), fully variable/proportional current output (e.g., to a cabin heater). A power output to the heater may be controlled via CAN/communication protocol. Advantages may include a variable output to allow a wide range of heater set points for improved cabin comfort, OEM programmable electronic control of heater system, an integrated architecture that provides control over diagnostic and prognostic, and the like.

Referring to FIG. 181, an example previously known circuit and positive temperature coefficient (PTC) resistance-temperature (R-T) curve, with high cabin temperature variability and low capability to manage inrush currents.

Referring to FIG. 182, an example circuit of the present disclosure, which minimizes inrush current at starting, controls duty such that no significant oscillation and peak current in inductor current occur (thereby no over design of the inductor is required), achieving equal current sharing in both phases of operation, power shares between both phases in case of overlapping operation. FIG. 183 presents an integrated PTC heating element and a power distribution unit (PDU), which may be applicable to vehicles or other mobile applications, such as passenger cars, commercial, heavy duty, vocational, and/or industrial vehicles. FIG. 184 presents an example electrical architecture, including a battery voltage provided to PDU functionality (e.g., protection, filtering, power control, power distribution circuitry, current and control circuitry) and a PTC heater function.

Advantages of the system include linear control throughout the range of operation, high temperature (e.g., on the order of 85 degrees operation because of high quality thermal management and high efficiency), linear operation of battery currents and heater currents, and less EMI and shielded cables required. Other benefits include fine and/or proportional control, such as with respect to performance: power distribution for high voltage auxiliary & traction load, CAN command controlled PTC Heater fine control operation, efficient PTC control (e.g., >98% efficiency), DC Fast charger connector integrated, motor contactor open-close operation based on CAN command, ambient operating range of −40° C.–85° C. (PTC Operation: −40 to 55° C.), and partial networking CAN wakeup capability to save power; Diagnostics with respect to: battery voltage monitoring (e.g., under and/or over voltage), PTC voltage motoring (e.g., under and/or over voltage), fuse blown detection, relay current sensing, and PCB and housing temperature sensing capability; protection: PTC over voltage protection, PTC short circuit protection, and high-voltage interlock (HVIL) protection for cover; qualification capabilities: Automotive Electronics Council (AEC) qualified components, EMC protection on high voltage and low voltage battery line, UDS capability, and IP67 for Enclosure; and the like.

Referring to FIGS. 185A-B, illustrates overshoot current as controlled through overshoot current management, such as the balancing of inrush current between the phases (unequal in previously known systems). Soft start control operations (e.g., limited duty cycle) can further reduce the inrush current. Managing the inrush current can reduce or eliminate overdesign, reducing the cost, and the form factor. Referring to FIGS. 186A-B, illustrates an uncontrolled previously known dynamic response.

Referring to FIG. 187, illustrates an example control architecture, which employs a two loop control. First the output power of the heater is calculated and fed back to the outer power controller along with a reference power command. The output power controller in turn sets a reference current command for each leg. Two current controllers may be configured to maintain current in each leg. Although the example uses P* (power) as a reference, temperature or other reference parameters are contemplated herein, with appropriate transfer functions and/or feedback introduced into the control. In embodiments, an example control architecture may include current control that provides for equal current sharing in each phase; MOSFET currents sensed for feedback control of the current balancing; PTC current regulated via a feedback loop (e.g., combined and/or each phase); soft start operation implemented to limit inrush current, high dynamic response in current achieved to improve system safety, reduce oscillation, and/or improve component life; hardware components enabled to be off-the shelf, and accordingly high volume, high reliability, and reduced cost; controllable response, including variable temperature settings, reduced over-design of fuses and coils, and availability of selected reference scheme (e.g., power, temperature, or other control variable); and controller execution rate less than PWM frequency. FIG. 188 provides a Bode plot (frequency response) and transfer function with respect to an example control architecture based on modeling and simulation, illustrating that the example controller may provide adequate gain margin and phase margin. FIGS. 189A-C provides current-time plots illustrating how the example controller exhibits greatly reduced oscillation both at startup and in response to a reference step change, based on modeling and simulation. FIG. 190A-E provides a comparison of a previously known time profile response and the time profile response of the present disclosure. The example controller start-up results for the time profile response of the present disclosure indicate no inrush current, and showing equal current sharing results in improved thermal management in power components (e.g., inductors, MOSFETs, and the like.

Benefits and features of certain embodiments of the example system and controls include: control architecture with linear and/or proportional heater control over complete heater wattage range; profile not needing to be linear (any selected profile is contemplated herein); continuous or discrete profile (previously known only coarse discrete, such as high/medium/low); and profile may be on any selected parameter, such as power, temperature, current, or other selected reference parameter. Other benefits and features include an integrated architecture responsive to other system failures such as battery, output, short to ground, and the like. to protect the system; the example control algorithm protective of the control board (but can be tailored for the system to protect any selected hardware related to the current and/or voltage measured by the example controller); improved inrush current management due to current balancing and availability of soft start; equal current sharing in each leg; architecture provides greater control over diagnostics and prognostics for related components using current and voltage feedback; improved electrical circuit response, mechanical housing (e.g., size, cost, and the like), and interfaces (e.g., consistency and reduction in the number of interfaces); improved cost of hardware (e.g., standardization of components, reduced overdesign) and thermal dissipation (e.g., better control of overall heat generation, balancing between components, and control of transients).

In embodiments, a design and manufacturing processes for additively printing fuses used for high power applications such as battery charging in electric vehicles may be provided. The current state of the art utilizes a stamped, Copper foil with designed-in "weak spots" formed in the stamping operation. The weak spots 19102 are created by removing Copper in specific areas across the width of the foil such that the cross-sectional area is reduced thus increasing the local stance in those areas, such as depicted in FIG. 191, showing a stamped formed foil fuse element 19104 and packaged fuse with foil elements 19106. When current travels through the foil, the current density in the weak spot area increases at the higher resistance with smaller cross section resulting in a local temperature rise. When the current is increased above the design intent value, the temperature increases above the Copper foil melting point causing the foil to separate and complete the fusing action. The geometry of the weak spots may be tailored to provide fusing at different currents.

The current technology utilizes stamped Copper foils with designed-in weak areas. In applications such as electric vehicle battery charging, these weak areas are subjected to thermal induced cyclic fatigue which may result in reduced lifetime.

The subject of the present disclosure pertains to design and fabrication processes of fuses associated with higher power applications such as electric vehicle battery charging or similar. This fuse typically protects the contactor in the charging circuit from high current overload fault conditions.

This fuse design works well for many high current applications, however, the demands for the electric vehicle battery charging application have changed due to customer demands for shorter battery charge times. To achieve this, higher voltages and currents are used raising the fuse foil temperature causing the foil to expand and contract during the cycle. When exposed to these conditions, the expansion and contraction may expose the narrow weak spots 19102 to cyclic fatigue and premature mechanical failure, such as shown in FIG. 192.

A second problem occurs when the fuse actuates at the higher voltage under fault current conditions such that arcing occurs at the point where the fuse melts and separates. Unquenched, the arc plasma consumes the available metal in the fuse package resulting in extremely rapid gas expansion within the fuse mechanical housing. This may cause the fuse package to violently burst. FIG. 193 depicts an embodiment of arc induced fuse damage.

The proposed solution utilizes an additive, thick film printing approach to create weak spot geometries on a ceramic based substrate. The printed films are fired at high temperatures (as is commonly done with thick film technology) to form a metallurgical bond with the substrate. This bonding fully supports the fired films (mechanically) to mitigate the cyclic fatigue problem. Effectively, the mechanical exposure due to the cycling is applied to the total dimension of the printed substrate as compared to the narrow weak spot geometries enabling the printed fuse to far exceed the cycle life of the stamped foil fuse.

Examples of thick film, printed fuses exist and are readily available for lower current applications. Typically, these designs utilize printed geometries in the form of meandering conductor traces to vary the resistance of the printed film to adjust to the various current requirements.

Printing process may include screen, ink jet, aerojet, pad, offset/flexo as typical methods to apply electrical inks.

Construction of weak spots using electrically conductive, thick film materials (such as Copper, Silver, Silver-Palladium, Nickel, Gold, Platinum and various alloys of these materials) may mimic stamped geometries to create areas of high resistance. The benefit of printed weak spots over stamped foil is the ability to generate virtually any pattern or shape which cannot be achieved using stamping (due to mechanical stamping limitations). The resistance of the printed weak spot geometries is dependent on the electrical properties of the fired film (resistivity) as well as the calculation of the cross-sectional areas (thickness×width) in the weak spot as shown in the equation below.

$$R=(\rho*L)/(t*W)$$

Where R=resistance of the weak spot

ρ=resistivity of the fuse conductor material t=thickness of the conductor

W=width of the conductor in the weak spot L=Length of the conductor in the weak spot As indicated, using the printed approach, virtually any geometry may be obtained. One may then utilize the geometry to control the location of where the weak spot melting will occur. Examples of these are shown in FIGS. 194A-B along with their calculated resistances, showing a widened bridge weak spot 19402.

An example of a printed fuse using a circular geometry weak spot of similar resistance which has been tested is shown in FIGS. 195A-B. Note that the failure locations 19502 occur in the weak spot bridges as designed.

Forming weak spot geometries using only printed, electrically conductive materials, though functional, may also be problematic. When the metal melts in a fusing condition, the material may separate and then reconnect thus enabling the circuit to reconnect. To minimize this possibility, a layer of dielectric, glass-based material is deposited under the weak spot geometry. This material is selected such that it processes at a higher temperature than the conductor but at a low enough temperature which will allow the material to diffuse into the conductor during the conductor firing process. Normally this temperature is approximately 25° C.-50° C. above the maximum processing temperature of the conductor. This may vary depending on materials. The temperature range allows the dielectric layer to be mechanically stable during the firing (to support the conductor) while allowing the dielectric material to diffuse into the conductor. The diffusion is desired because 1) it allows another means of adjusting the weak sport resistance (the more you fire this results in more diffusion and higher resistivity), 2) the diffused glass changes the wetting characteristics of the conductor and will not allow melted conductor to reattach, and the like.

From a resistance perspective, the diffusion between layers is predictable and may be controlled by the thickness of the glass layer, the thickness of the deposited conductor and conductor firing or temperature processing profile. A cross section of a typical weak spot is provided in FIG. 196 and shows the glass diffusion layer 19602, glass layer 19604, and ceramic substrate 19606. This distance (and the weak spot resistance) may be changed by adjusting the firing process for the materials.

Once fuses of this type (stamped foil or printed design) perform the separation of the fusing element through the high resistance melting (i.e. successful fusing), they should also be robust against the propagation of arcing. This condition may occur if the fusing is accompanied by a high voltage potential at the separation point on the element. The high voltage accompanied by a melting and vaporizing fuse material may generate an intense plasma arc capable of severely damaging the fuse package. If the arc can be rapidly cooled to mitigate the plasma intensity, then the fuse may complete its designed function without damage. There are several ways that improved cooling of the printed element may be improved using printing concepts. First, the substrate material may be chosen such that it's thermal conductivity (Tc) is high as compared to other types of electrically insulative substrates. For example, Aluminum Nitride (Tc~150 W/(m-K)) and Aluminum Oxide (Tc=32 W/(m-K)) are vastly superior to Zirconia (Tc=3 W/(m−K)) or FR4 (Tc=0.25 W/(m-K)). This allows the substrate to remove heat from the weak spot area very quickly.

Referring to FIG. 197, the cross-sectional thickness of the printed conductors may be changed in the areas adjacent to the weak spots. This allows heat to sink away from the arc and cool the plasma. One may accomplish this by selectively building up the layers via printing but at some point, this may become cost prohibitive. By supplementing the thick, printed layers with soldered, thick sections of Copper or similar, high Tc materials, the heat sinking may be further enhanced. FIG. 197 illustrates a weak spot 19102 made from a first layer of copper 12704 and locally thinned with an underlying glass layer 12712 adjacent to a second layer of copper 12702 all overlaying a substrate 12706. Further illustrated, high conductivity metal 19708 is shown with a solder or brazed interconnect 19710 connecting between areas with weak spots 19102.

Packaged fuses of this type often utilize sand compressed around the stamped foil fuse element as an additional method to help quench high voltage arcs which may occur. The sand conducts heat away from the foil or printed element and energy is consumed from the arc to fuse and vitrify the sand grains (similar to fulgurite observed resultant from lightning strikes). In a foil element, packing of the sand on both sides of the foil utilizes the entire surface to form the fulgurite. With the printed element, similar performance may be obtained by building the printed weak spot 19102 element on both sides of the substrate, such as illustrated in FIG. 198 shown with thinning glass underlay 12712 and multiple successively thickening layers of copper 19802 further from the location of the weak spot 19102.

Another "hybrid" approach utilizes a combination of the formed, soldered foil concept (as indicated above) with the printed weak spot. In this example, the foil is formed to extend into the compressed sand such that both sides are utilized to mitigate the arc through fulgurite formation while the weak spot geometries control the fusing function. Different shapes of the formed foil may be used both to enhance the arc mitigation and to enable high speed, automated assembly of the structure using standard surface mount practices. FIG. 199 shows three types of discrete, formed foils 19902A-C that may be attached to the printed substrate in the described manner. In this example, all of the foils are placed as individual components. This approach isolates the weak spot function from the current carrying/arc mitigation function. In this manner, one may optimize each function independently.

Referring to FIG. 200, an alternative approach to placement of the discrete foil jumpers is to form the current carrying element in one formed sheet 20002, attach the sheet to the substrate 20004 (using solder or braze) and then removing the sections 20006 above the weak spots.

In an aspect, a system may include a printed fuse with designed weak spot construction, including: cycle fatigue improvements due to printed element concept (vs. stamped foil); geometry (e.g., shapes vs resistance); materials (e.g., types and thicknesses); processing hierarchy and parameters; and material inter-diffusion for resistance control.

In an aspect, a method may include a printed process for improvement of arc mitigation, including: printing on substrates with improved thermal conductivity; variable cross-sectional thickness of printed conductors; variable cross-sectional thickness using soldered metal; printed fuses on two sides of the substrate which fully utilize the compressed sand cooling media; and "hybrid" design which uses printed weak spots and soldered, shaped foils which fully utilize the compressed sand cooling media.

In embodiments, an integrated fuse and pyro device may be produced through 2D/3D printing techniques as described herein. An integrated device that can provide functionality of a fuse along with precision in response time of a pyro device, the pyro device created by adding a layer of highly energetic material that can be activated by a low power signal. This configuration can provide protection in an electrical system, such as protection to electric vehicles. Electric vehicle circuits need protection at quick response time but have to last a long time. Current fuse based technologies can not address both. In embodiments, a printed fuse-pyro device may utilize 2D/3D printing technology to print copper over ceramic elements. At certain precisely controlled locations, high energy materials (including but not limited to plastic explosives, TNT, and the like) are introduced that serve the pyro functionality. In embodiments, circuits needed to trigger the pyro may also be printed, such as in the same device.

In embodiments, an isolated high voltage sensor may be provided, such as in support of electronics in an electrical mobile application. The isolated high voltage sensor is a device used to measure voltage from a high voltage bus that protects the low voltage circuits and provides for high accuracy in voltage determination. An example isolated high voltage sensor provides galvanic isolation up to 7 kV on the high voltage input during operation. The magnetic isolation barrier of the high voltage sensor separates the high voltage circuitry from the low voltage circuitry to allow for connection to low voltage systems (e.g., to controllers, communication circuits, and the like). The example high voltage sensor may operate within 1% accuracy through a range of 0-1000V.

An electric vehicle and electric mobile applications may utilize higher voltages for a number of reasons, including wire sizing, power density, efficiency of operations, and the like. Near term applications may for instance utilize voltages in the 400V to 800V range or even higher. High voltages provide risk factors, for example to personnel servicing the system, and for lower voltage circuits present in the system for controls, actuating low voltage components, communications, and the like. Accordingly, high voltage isolation within the high voltage system, and away from low voltage circuits or other unexpected systems is critical. Due to the increasing voltages, and the increasing number of components and circuits on electric mobile applications, both need for such isolation, and the challenges presented in accomplishing the isolation, are also therefore increasing.

The isolated high voltage sensor allows for high voltage sensing on multiple busses. Although example embodiments depict three high voltage busses, a given system may utilize even more. The isolated high voltage sensor provides for independent voltage sensing on each bus. In the application of a high-power distribution high voltage junction box, the isolated high voltage sensor may be utilized to monitor voltage levels of plug-in chargers, opportunity chargers, battery voltage levels, plug-in auxiliary devices, and the like. The provided examples are non-limiting, and any high voltage circuit in the system may have voltage sensed using the isolated high voltage sensor. The isolated high voltage sensor provides for integration of high voltage systems and low voltage systems within a single device, reducing the footprint (e.g., weight and/or size), the number of interfaces that must be integrated, and/or the engineering design time that would be required to integrate multiple devices instead. The isolated high voltage sensor may provide for monitoring and control of high voltage busses, while maintaining isolation and protection of low voltage circuits from the high voltage system.

The following capabilities and specifications of the isolated high voltage sensor are a non-limiting example for an example configuration. A given system or application may have values configured for the requirements, limitations, or priorities of the particular system or application.

Power supply: 8-32 V DC
Input range: 0-1000V DC
Power consumption: <1 VA (Volt-Amp, and/or Watt)
Output: 0.5-4.5V DC (sensed voltage output signal)
Response Time: 20 ms
Accuracy: <1% (and/or within selected ranges, the example system is across the range 0-1000V)
Sensitivity: 4V/mV
Isolation Voltage: 5 kV
Mounting: Panel mount
Reverse polarity protection:
  High voltage: 1200 V DC (configurable according to input range)
  Low voltage: 36 V DC (configurable according to system low voltage value(s))
Dielectric Withstand (standard: IEC60664)
  High voltage: 7 kV DC
  Low Voltage: 1100V AC
Vibration rating: ISO16750-3
Temperature range: −40° C.-+85° C.

With reference to FIG. 201, an example physical structure of the high voltage sensor is depicted, showing an example printed circuit board layout. Strategic placement of high voltage and low voltage components was implemented to achieve isolation between high voltage circuits and low voltage circuits. In the example, a minimum clearance of 8 mm was implemented for high voltage circuits. High precision components as well as high temperature automotive grade components were used throughout the implementation. The printed circuit board is strategically layered to achieve maximum isolation between high voltage circuits, both for circuit protection and to ensure that detected voltages are representative of the respective high voltage circuit. Isolation between high voltage and the low voltage circuitry is further depicted herein.

All examples and naming conventions are non-limiting and may be configured according to the particular application.

- J1 connector 20106
  - 5 Pins utilized
  - 1: low voltage sense 1 (low voltage representation of the high voltage input value on the first high voltage bus)
  - 2: low voltage sense 2 (low voltage representation of the high voltage input value on the second high voltage bus)
  - 3: low voltage sense 3 (low voltage representation of the high voltage input value on the third high voltage bus)
  - 4: Low voltage power high (e.g., 12V or 24V DC)
  - 5: Low voltage ground
- J2 connector 20102
  - 3 Pins utilized
  - 1-3: Each pin electrically coupled to a corresponding high voltage bus
- J3 connector 20104
  - 3 Pins utilized
  - 1-3: Each pin electrically coupled to a corresponding ground for each high voltage bus FIG. 202 depicts an embodiment block diagram of an isolated high voltage sensor for an electric mobile application as depicted with a high voltage power distribution system 20202, the system including a first high voltage bus 20206, a second high voltage bus 220208, a third high voltage bus 22010, where the three high voltage busses provide power to an isolated high voltage sensor assembly 20204 that provides isolated low voltage values to the electrical vehicle motor control unit (MCU). The example isolated high voltage sensor is installed in a high voltage system, such as the high voltage system of an electric vehicle or electric mobile application. The high input side of the high voltage sensor is coupled to the high voltage bus (or busses), and the high voltage sensor is powered by a low voltage system (e.g., 6V, 12V, 24V, 42V, etc.). During operation, the isolated low voltage sense output (providing a representation of the sensed high voltage) is provided to a system level controller (e.g., electric vehicle controller, or MCU). The example system level controller utilizes the voltage sense output for monitoring, diagnostics, or control of the high voltage system. FIG. 203 provides a more detailed embodiment block diagram showing, for instance, the first high voltage bus 20206 and a first isolated power supply low voltage bus 20212 providing power to a first high voltage input phase 20218 which provides a reduced power level to a first isolated sensor phase 20226 that generates a first phase voltage value 20232. Similarly, the second high voltage bus 20208 and a second isolated power supply low voltage bus 20214 providing power to a second high voltage input phase 20220 which provides a reduced power level to a second isolated sensor phase 20228 that generates a second phase voltage value 20234; and the third high voltage bus 20210 and a third isolated power supply low voltage bus 20216 providing power to a third high voltage input phase 20222 which provides a reduced power level to a third isolated sensor phase 20230 that generates a third phase voltage value 20236. In this implementation, the first isolated sensor phase 20226, second isolated sensor phase 20228, and the third isolated sensor phase 20230 are mounted in a module 20224 which is provided power, such as without limitation, an 0.5V reference 20240, a 5.0V reference 20242, and a 3.3V source.

FIG. 204 depicts an embodiment schematic for a representative isolated power supply 20212, 20214, and 20216 in an isolated high voltage sensor for an electric mobile application, and FIG. 205 depicts an embodiment schematic for a representative high voltage input 20218, 20220, and 20222 and representative sensor phase 20226, 20228, and 20230 in an isolated high voltage sensor for an electric mobile application. Without limitation, a description of the example isolated high voltage sensor scheme, and certain circuit details are here provided.

The isolated high voltage sensor design has complete isolation between low voltage circuitry and high voltage circuitry. High voltage isolation between high voltage and low voltage circuits is achieved through the implementation of a reinforced isolated amplifier, for example an AMC1311. The benefit of implementing a magnetic isolation barrier using a reinforced isolated amplifier, is that a user can safely connect to a high voltage system to a low voltage system without having to worry that the high voltage system will affect the low voltage system in the event of an unforeseen event or a fault.

The example isolated high voltage sensor is powered by a single power supply. The input power supply was implemented to withstand reverse voltage at the input without affecting the low voltage components. This single power supply is maneuvered to provide all the voltage input voltage levels that will allow the system to operate with an efficient and accurate state. The voltage levels in the schematic diagrams are non-limiting examples, and they can be configured for the particular system. In certain embodiments, the voltage levels may be maneuvered to provide for sufficient accuracy for certain ranges of the high voltage input range (e.g., 200V-400V), for example to enhance accuracy or resolution for ranges of interest according to the particular application.

A voltage divider at the input reduces the high voltage in the range of 0-1000V and divides it down to a proportional 0-2V. The proportional output taken from the high voltage bus is then fed to the reinforced isolated amplifier to generate a differential output that is proportional to the difference between the two input voltages. The high voltage input range is a non-limiting example, and the dividing proportion is selected to be applicable to many high voltage electric mobile applications, but the ranges can be adjusted according the particular characteristics of the system having the Isolated High Voltage Sensor.

In this scheme the differential output of the reinforced isolated amplifier is then fed to an Op Amp circuit to provide for offset, gain, and accuracy determination In the example, an OPA2192 (36-V, precision, rail-to-rail I/O, low offset voltage, low input bias current) is utilized for each stage of a two stage Op Amp circuit. In a first stage of the Op Amp circuit, an accurate gain of two and an offset of 0.5V is applied to the differential input coming from the reinforced isolated amplifier. This stage amplifies the output voltage to the range 0-4 V (using the example voltage dividing and gain values), and the offset of 0.5V provides for an output voltage of 0.5-4.5V, providing an accurate representation of the 0-1000V high voltage input. The gain and offset ranges can be adjusted according to the desired low voltage range representation of the high voltage input. Certain considerations for the range, which will be known to one of skill in the art, having the benefit of the present disclosure, include: the control voltage ranges for controllers in the system, standardization of the voltage with comparable systems (e.g., to match or be within ranges provided by alternative sensors), selection of ranges and boundaries to preserve diagnostic and/or rationality capabilities (e.g., minimum voltage, saturation voltage, etc.). The described example provides for a linear/proportional representation of the high voltage input on the low voltage output signal, although other configurations are contemplated herein (e.g., gain scheduling, non-linear signals) In certain embodiments, certain voltage ranges may not require specific determination (e.g., above a high voltage threshold, below a low voltage threshold, within a specified voltage range, and/or outside a specified voltage range), and the Isolated High Voltage Sensor may be configured to provide an output low voltage signal accordingly—for example having selected accuracy, resolution, and/or linearity of representation within certain ranges, and outputting values outside of those ranges that may include one or more of: not as accurate, having reduced resolution, having reduced linearity, and/or providing values that indicate a default value, state value, or fault value (e.g., a fixed voltage value, a frequency pulsed value, or other selected characteristic).

In a second stage of the Op Am circuit, a voltage follower with a scheme for short circuit protection is implemented. A diode placed in reverse bias is placed on the feedback loop of the voltage follower. The reverse bias diode is enabled in case of a short circuit fault, and may be omitted depending upon the characteristics of the particular system. This diode redirects the power from a short circuit fault to a sink source. This scheme protects the Op Amp of the second stage from a short circuit current, and protects the voltage sensor circuitry from burning out in case of a short circuit fault at the output pins.

Based on testing, the following accuracy information was determined from a representative system. It is believed this data is representative of achievable accuracy for an example system configured according to the present disclosure. The data indicates less than 1% error across the range from 0-1000V.

TABLE 1

| Accuracy Data | | | |
|---|---|---|---|
| Actual Input | Theoretical Output | Actual Output | Percent Error (%) |
| 0 | 0.5 | 0.496 | 0.8 |
| 100 | 0.9 | 0.898 | 0.222222 |
| 200.1 | 1.3004 | 1.3 | 0.03076 |
| 300 | 1.7 | 1.702 | 0.117647 |
| 400 | 2.1 | 2.103 | 0.142857 |
| 499.99 | 2.49996 | 2.505 | 0.201603 |
| 600.1 | 2.9004 | 2.907 | 0.227555 |
| 700 | 3.3 | 3.309 | 0.272727 |
| 800 | 3.7 | 3.711 | 0.297297 |
| 900 | 4.1 | 4.114 | 0.341463 |
| 1000 | 4.5 | 4.515 | 0.333333 |

In embodiments, an architecture for detecting coil faults in relays may be utilized, such as used in an electric mobile application. Relays are used for switching high voltage and low voltage electrical signals through isolated mechanical contacts. Relays work on the principle of electromagnetic effect, with an electromagnetic switch operated by a relatively small electric current that can turn on or off a much larger electric current. The heart of a relay is an electromagnet (e.g., a coil of wire that becomes a temporary magnet when electricity flows through it). As such, a relay acts as a kind of electric lever, switching it on with a tiny current and it switches on ('leverages') another appliance using a much bigger current. Many sensors are sensitive pieces of electronic equipment and produce only small electric currents. But often there is a need to drive devices with pieces with larger currents. Relays bridge the gap, making it possible for small currents to activate larger ones. That means relays can work either as switches (turning things on and off) or as amplifiers (converting small currents into larger ones).

Relays are associated with two types of faults, electrical and mechanical. Electrical faults can be associated with a primary driving coil becoming stuck in an open position that results in no switching. A primary relay coil may also experience a short circuit condition (e.g., a full or partial short) that results in a very high current flowing through system that leads to a malfunction in the relay or in the associated circuit. Mechanical faults can be due to arching or wear that can lead to contacts becoming shorted or welded together.

One way to mitigate against faults in a relay is to monitor the relay in real time to establish real-time health monitoring of the relay coils, such as monitoring for coil-open and coil-short fault detections for relay. Using the dedicated electronics sensing and control mechanisms a system can be configured to detect relay faults. A relay fault detection algorithm may monitor a current passing through (or a resulting voltage across) an input coil and using a processor with a dedicated timing interval to measure a time-based signature and compare the it with the time-based signature of a properly functioning relay. The algorithm may enable the detection of a fault and synchronize with other systems components, such as through a communication channel. As a fault may be the result of an aging of the relay, the pattern of the signature may change over time, such as associated with a changing time delay that varies. Further, the patterns may change due to mechanical vibrations in a vehicle and external environmental conditions, and so continuous learning techniques may be employed. As a result, a number of parameters may need to be monitored both due to events, such as a coil failing in an open position (e.g., due to a disconnect, an excessive current, manufacturing process defect (e.g., crimping or assembly fault) or a coil failing due to a short circuit (e.g., temperature, assembly fault, magnetic wire insulation fault), or due to changing conditions over time, such as aging or environmental effects such as temperature and/or vibration. The fault detection algorithm may benefit an original equipment manufacturer, service provider, user, and the like, by enabling the system to detect the location of a fault condition, such as in an electric vehicle configuration, by enabling a localization of the fault and address the fault and reduce system downtime and decrease the total cost of ownership.

Using an initial performance signature for a relay coil may allow the system to detect fault conditions, such as a coil open fault condition or coil short fault condition. With utilization of this method, each individual relay coil, such as in a switch matrix configuration, is monitored by a periodic test signal. At the end of each test signal, an admittance signature is calculated, and the coil-open and coil-short faults are determined (such as though calculation comparison between the real-time measurement and a pre-stored signature or model for a properly functioning relay. These calculations are then communicated to a processor, such as a vehicle electronic control unit for further action and operations.

In embodiments, a control process may include a control architecture generating voltage signal and measuring an instantaneous admittance for a coil and evaluating a coil health condition. A voltage signal is then applied momentarily at periodic intervals as per demand. Instantaneous current flowing through the coil is measured after a time delay once a voltage command is given. The instantaneous admittance value (e.g., a current and/or voltage) at a decided time delay is calculated. If the coil is opened, then the admittance value is zero. If the coil is shorted, the admittance value will differ from the healthy coil value and a decision will be made based on a pattern-based comparison (e.g., through comparator logic). As such, without actual actuation, the system is able to perform a diagnostic to determine coil faults by through sending a diagnostic pulse. The diagnostic pulse will help to determine the fault before an actual operation has occurred. A diagnostic pulse can also be tuned for the time delay most effective for different types of relays. The detection system can thus help avoid relay operational malfunctions.

FIG. 206 depicts an embodiment architecture block diagram for an AC selector switch matrix relay, where the depicted system includes four-relay single pole double throw configuration and having miniature circuit breaker (MCB) board and monitoring apparatus.

In an aspect, the architecture may address coil faults using an admittance measurement along with addressing temperature and supply voltage variations. In embodiments, machine learning systems may be utilized to monitor changes in the relay parameters, such as using a continuous learning mechanism for developing a signature and/or operational pattern. Using a diagnostic pulse, the system may determine the health of a relay coil and/or relay contact without actual operation of the relay. A diagnostic pulse may provide a source amount of current for health measurement, which will not be sufficient to excite a relay contact switching. The diagnostic algorithm may be placed inside the MCB board or in general in microcontroller for performing the data diagnostic.

In embodiments, a system, method, and apparatus for adaptive switch control for paralleled power devices in a mobile electric application may be provided. Electric mobile application may require driving traction inverters to operate with higher power capacity and higher power density. Available discrete devices are not capable to handle the high current and power demands. Newly developed devices capable to handle the high current and power demands would be expensive, and require development and validation of new parts. Some applications, such as the automotive market, is sensitive to costs and requires high reliability. Adaptive switch control for paralleled power devices may provide driving traction inverters with higher power throughput, increased useful life, improved fault tolerance, mitigation of inverter damage, and/or utilization of lower capability, less expensive, and/or more readily available components. Example embodiments include devices and procedures for performing adaptive switch control of power devices according to load conditions to meet power requirements for an application.

Paralleled power devices may be any type of solid state transistor/switch, including a MOSFET, IGBT, JFENT, or BJT, without limitation. Paralleled devices may be at least two (2) devices, but may be any number of devices (6, 12, 24, 60, and the like). FIG. 207 depicts embodiment configurations for parallel device switching. The example utilizes an additional gate control to provide for a separate on/off switch for a device, and an auxiliary switch to bypass one or more paralleled devices (e.g., if damaged, to load balance, life balance, etc.). Adaptive switch control may utilize controlled operations of the gate control and/or auxiliary switch. For example, utilization of four and five devices (or other non-factor number of the total) may rotate through inactive devices for load/life balancing, to support current load requirement, and the like. Factors of the total (e.g., 2 or 3 devices out of 6) may rotate through active device blocks (e.g., rotating through which two devices are active, such as 1&2, then 3&4, then 5&6), or may mix between blocks for load/life balancing (e.g., 1&2 at a first time, and then 1&3 at a second time). Rotation or a mixing schedule may be implemented to be responsive to total throughput, total on-time, and the like. In an example, for a group of six switches in a pool of available switches, two switches may be switched on 20702, three switches may be switched on 20704, four switches may be switched on 20706, or five switches may be switched on 20708. In embodiments, a sixth switch in a group of six may be reserved in an idle state to switch in for a device experiencing a fault condition. For the example group of six, any switch or combination of switches may be designated, such as for switching in two switches the first two switches 207710 may be turned on, the second and third switches 207712 may be turned on, the third and fourth switches 207714 may be turned on, or the fourth and fifth switches 207712 may be turned on.

FIG. 208 presents an embodiment flow process diagram for adaptive switch control. In a first process step 20802 a load configuration may be set to specify load condition categories, such as output power levels, motor torque levels, motor speed levels, voltage levels, or combinations of these. In a next processing step 20804 determination is made for the number of devices to meet efficiency requirements (or desired efficiency levels). For example, high speed/low torque regions may utilize fewer devices, and high torque/low speed regions may utilize more devices. In a next processing step 20806 check if all devices are being switched (e.g., there may be no options available through adaptive switch control in operating regions where all devices are active). If yes, then operation time is accumulated for the devices. If no, then in subsequent processing steps the example procedure accumulates total operation time of devices, and drives them to a similar total operation time by calculating total operation time 20808 and choosing devices with the lowest operating time 20810. Additionally or alternatively, the process may adapt to total power throughput, total temperature accumulation, combinations of these, or another wear/life parameter of the devices.

FIG. 209 depicts embodiment switching zones used in adaptive switch control. The example is divided into torque and speed zones for an example 800V embodiment, with 'case 1' 20902 is defined by a region of high torque and low speed, 'case 2' and 'case 3' 20904 are defined by a region of low torque and low speed, and 'case 4' 20906 is defined by a region of high torque and high speed. Divisions may be made on any available criteria, and may further depend upon the efficiency map of the devices and/or the motor. FIG. 210 depicts embodiment efficiency in adaptive switch control based on the example switching zones depicted in FIG. 209. The example results listed provide an example device switching scheme to improve the overall operating efficiency and life/wear balancing of switched devices for an example application. Requirements are an example for a particular application, and may vary depending upon the efficiency goals for a given application. For the example zones defined in FIG. 209, 'case 1' 20902 has the highest efficiency with 5 devices running in parallel, 'case 2' 20904 has the highest efficiency with 6 devices running in parallel, and 'case 4' 20906 has the highest efficiency with 3 devices running in parallel. As a result, the adaptive switch control process may move between the different cases as the torque-speed conditions changing, managing to increase efficiency. At the same time, the adaptive switch control may manage the switched in devices to equalize operational time for the different devices.

FIG. 211 depicts an embodiment switching circuit 21102 with example gate driver configurations 21104 and 21106, which include configurations for providing an 'on/off' signal to the switch (e.g., to turn on or off the operation of the device to optimize efficiency) and a 'gate' signal to the switch (e.g., to disable the device if a fault condition is detected). Additional components needed for each sub gate drive circuit may include one signal to control paralleled devices separately, and one on/off switch to cut the gate drive signal.

FIG. 212 illustrates an embodiment lifetime plot with respect to reduced operation time, where longer lifetime is contributed by less operation time of device. In an example, assuming five years life time of device with six hours of operation per day, lifetime can increase to ten years if each device operates only 50% of the total operation time.

FIG. 213 depicts an embodiment switching scheme for failed switching devices. In this example, six switching devices are connected in parallel, with a current operating condition (e.g., to maximize efficiency) calling for the section of three operating switches and three left in an idle condition (e.g., for a combination of reserve capacity to maximize efficiency and reserve capacity for failure conditions). In this instance, a failed first device 21302 is detected, the gate signal opens 21304 up for the first switch to stop operating, and a gate signal 21306 opens up an forth previously idle device to switch in for the failure to the first device. With paralleled connection, idle devices can be regarded as backup. If one device is damaged by over current, over voltage, or over temperature conditions, it will be blocked and idle devices will be switched in. The inverter may have an at least N+1 backup configuration to maintain at least one device in an idle condition. Additionally or alternatively, this switching scheme may be utilized to provide fault response, additional capability (e.g., exceeding power rating during selected operating conditions), limp-home operations (e.g., when one or more devices fail), and/or can adapt to failed devices by re-mapping switched blocks, and the like.

In embodiments, an architecture topology and method for a charger and DC-TO-DC combined module may be provided, such as for an electric mobile application. The topology provides bi-directional high voltage ("HV") power flow that enables (1) AC power grid to HV battery power flow, (2) HV battery to AC power grid, and (3) HV battery to AC loads. The topology also provides HV to Low Voltage ("LV") DC-to-DC conversion functions.

An electric vehicle (e.g., battery electric vehicle (BEV) or plug-in hybrid electric vehicle (PHEV)) can have an on-board charger to charge the battery from the power grid or can have an on-board generator to provide power from HV battery to AC loads. This may be referred to as a bidirectional on-board charger (OBC). By adding a grid synchronization function, the bi-directional charger may also send power to the grid. In BEV or PHEV vehicles, a DC-TO-DC converter can be included to convert HV battery voltage to low voltage for controllers, and the like, such as a typical low voltage bus is 9V to 14V for passenger vehicles. In embodiments, a DC-to-DC converter and bi-directional OBC may be separate parts, with separate cooling systems and control board/driver boards, and the like.

In embodiments, an architectural topology may combine a bi-directional OBC and a DC-TO-DC converter into one package by simplifying the electrical and electronic circuitry, such as depicted in FIG. 214. A Switch S0 21406 is added with a DC-TO-DC converter 21408 connected to bidirectional OBC circuitry as shown in the Figure. Switch S0 can be controlled to make sure there is no interference of the electric circuitry operations. Power can be flowing from grid 21402 to HV battery 21404, HV battery 21404 to AC loads or grid 21402 (where element 21402 represents a connection point to the AC power grid and/or to AC loads). A DC-TO-DC converter 21408 function is provided, which allows power flow from HV battery 21404 to LV DC loads (not shown, but connected to the output of the DC-to-DC converter 21408). Driver board & control board 214010 and cooling system 21412 may be further simplified since the bi-directional OBC and LV DC-TO-DC are integrated into one package 21414, where at least three power electronics switches can be saved. Although FIG. 214 shows a single phase application, the teachings herein can also be applied to the AC input of a three phase circuit with or without neutral.

In an aspect, a power control circuit may include a combined bi-directional OBC and DC-TO-DC converter. A control method for a combined charger and DC-TO-DC converter 21408 may be provided that can switch between modes: Mode 1 (Driving): the OBC will not be used. Mode 1 may be enabled by disabling the operation of left side of FIG. 214 (the AC side) by closing switch S0 21406, allowing power to flow to the DC-TO-DC converter 21408 by right side circuit. Mode 2 (Charging to HV battery): In mode 2 the system relies on the low voltage battery (e.g., 12V) to power the driver board and controller board for the OBC function. Switch S0 21406 is open to fully disconnect the DC-TO-DC converter 21408 from the circuit. Control of the OBC may be in a resonant mode, such as an LLC resonant mode. If the low voltage battery voltage is too low, it is possible to switch to Mode 1 to charge the 12V battery system. When the state of charge is high enough, it is possible to switch back to Mode 2 to use the OBC to charge the HV battery. Mode 3: HV battery to grid or AC load.

In an aspect, a power control method may be provided for a combined charger and DC-TO-DC converter 21408 that can switch between modes. Mode 1 (Driving): OBC will not be used. By disabling the operation of left side of FIG. 214 (the AC side) by closing switch S0 21406, allowing power to flow to the DC-TO-DC converter 21408 by right side circuit. Mode 2.1: Charging the HV battery (e.g., when the low voltage battery's state of charge (SOC) is high and relying on the low voltage battery in the system to power the driver board and control board for the OBC function. Switch S0 21406 is open to fully disconnect the DC-TO-DC converter 21408 from the circuit, and control of the OBC is in a resonant mode. Mode 2.2: If the low voltage battery voltage is below a threshold SOC, switch S0 is closed to operate the DC-TO-DC converter 21408 to charge the low voltage battery and pause HV battery charging. Mode 2.1 and Mode 2.2 can be switched back and forth depending on SOC level of LV battery. Mode 3.1 HV battery to grid or AC load: Power is flowing from HV battery to the grid or AC loads 21402 and switch S0 21406 is open when the LV battery SOC is high Mode 3.2 HV battery charges the LV battery by closing switch S0 21406, which pauses the power flowing back to grid or AC load 21402. When the LV battery SOC is high, the system transitions back to Mode 3.1 to resume power back to the grid or AC load 21402.

In embodiments, an intelligent power distribution unit may be provided having device protection and heater control. With reference to FIG. 215, an example previously known power distribution unit (PDU), or junction box, for an electric mobile application is depicted. The example PDU includes connectors for various loads (e.g., an AC load, a DC load, a main load such as motive power, and an auxiliary load), and coupling for each load to a battery connector. The example PDU includes a charging port, depicted as coupled to the ++ on the battery connector to indicate that the charger may be coupled to a separate high-side circuit (e.g., with a distinct voltage and/or current capacity) than other loads in the system. Any or all loads may additionally or alternatively be coupled to separate circuits. The example PDU includes a heater or climate control circuit (PTC/NTC—positive temperature coefficient and/or negative temperature coefficient) that powers a climate control device, such as a thermoelectric heating or cooling device. The example PDU includes a PTC switch 21504 responsive to a heating command 21502 (e.g., a heating request, a voltage value, etc.) that switches on the climate control device on command Previously known PTC systems for electric mobile applications include an on/off command, and/or a low/medium/high command, providing for limited ability to provide climate control for the cabin of the vehicle. Each circuit in the PDU includes device protection (e.g., a fuse), depicted on the high-side in the example.

Referencing FIG. 216, an example PDU of the present disclosure is depicted, having a PTC controller 21604 and climate control communications 21602—for example a networked or data linked request for a climate control. In the example of FIG. 216, the PDU further includes one or more sensors to determine electrical characteristics of the PTC/NTC circuit, such as voltage values, current values, and/or rates of change or frequency components of these. The PTC/NTC circuit may be divided (e.g., separate circuits for PTC and NTC), and/or device protection may be on the high side, the low side, and/or positioned between the battery connector and the PTC controller 21604. In certain embodiments, the sensors may be positioned within the PTC controller 21604.

Referencing FIG. 217, an example PTC controller 21604 is depicted, having various circuits configured to functionally execute operations of the PTC controller 21604. The example PTC controller 21604 includes a PTC request circuit 21710 structured to interpret a heater request value 21702. The heater request value 21702 may additionally or alternatively include a cooling request value, and further may include any type of request, such as a heater output request and/or a temperature request (e.g., a cabin temperature). The example PTC controller 21604 further includes an operating conditions circuit 21714 structured to determine PTC/NTC commands 21708 that are responsive to the heater request value 21702. In certain embodiments, the operating conditions circuit 21714 determines heater feedback value(s) 21704, such as cabin temperature, heating or cooling output values for a heating or cooling device, response times of these, or the like, to determine the PTC/NTC commands 21708. In certain embodiments, the operating conditions circuit 21714 accesses a PTC/NTC current conditions to command map 21712 to determine the PTC/NTC commands 21708. The map 21712 may include any mapping of commands to current conditions, including at least parameters such as: a heating or cooling power value (and/or voltage value, current value, etc.) that is responsive to the heater request value 21702; a heating or cooling power value that is responsive to a current cabin temperature to acceptably progress toward a target cabin temperature; and/or a heating or cooling power value that is responsive to a target cabin temperature and/or an ambient temperature value. The example PTC controller 21604 further includes a PTC command circuit 21718 that provides the PTC/NTC commands 21708 to a downstream device, such as a heating and/or cooling device, solid state switch(es), and/or breakers or relays, where the downstream device is responsive to the PTC/NTC commands 21708 to provide the heating and/or cooling power value commanded by the PTC controller 21604. In certain embodiments, the PTC controller 21604 is responsive to provide a scheduled heating or cooling output (e.g., a linear output), and to provide for a selected resolution in the heating or cooling output. An example PTC controller 21604 is capable to provide power increments of $1/10^{th}$ of available power, $1/100^{th}$ of available power, and/or $1/1000^{th}$ of available power. In certain embodiments, an example PTC controller 21604 is capable to provide selected power increment values (e.g., 10 W increments, 25 W increments, 50 W increments, 100 W increments, etc.). In certain embodiments, an example PTC controller 21604 is capable to provide 10 to 100 W increments within a total power rating of 5 kW to 10 kW, and/or to provide 50 W increments within a total power rating of 5.5 kW. All described examples are non-limiting illustrations of an example PTC controller 21604.

An example PTC controller 21604 includes a PTC electrical response circuit 21720 structured to determine PTC/NTC electrical response 21706 values, and to perform diagnostics and/or prognostics of the PTC/NTC hardware and/or circuit in response to the PTC/NTC electrical response 21706 values. An example PTC electrical response circuit 21720 includes a PTC/NTC response definition 21716, which may be a description of expected electrical characteristics of the PTC/NTC hardware and/or circuit, such as expected voltage and/or current values, time trajectories of these, or the like. In certain embodiments, the PTC/NTC response definition 21716 further includes values based on ambient conditions, vehicle cabin temperature, and/or on-time or off-time of the PTC/NTC hardware (e.g., to diagnose a failure to progress in heating or cooling even where the electrical response appears to be correct). In certain embodiments, the PTC electrical response circuit 21720 determines a PTC/NTC diagnostic value 21722, such as the determination of a failed, off-nominal, or improperly responding PTC/NTC hardware based on the electrical characteristics and/or based on progress (or lack thereof) in climate control conditions. In certain embodiments, the PTC electrical response circuit 21720 provides a PTC/NTC prognostic value 21724, such as the determination that the PTC/NTC hardware is degraded, degrading, is progressing toward failure, or the like, for example based on the electrical characteristics (e.g., increasing resistance, reduced effective power consumption, changes in in-rush characteristics, etc.). The PTC electrical response circuit 21720 may set fault codes, light lamps, provide network communications, and/or store memory values for retrieval by other systems (e.g., a service tool, a vehicle controller, or the like). In certain embodiments, the operating conditions circuit 21714 may be responsive to the PTC/NTC diagnostic value 21722 and/or PTC/NTC prognostic value 21724 to change the PTC/NTC commands 21708, for example to reduce total power usage and/or dynamic response times in response to a degraded and/or failing PTC/NTC hardware.

It can be seen that the PDU and PTC controller 21604 of the present disclosure provides for a wide range of climate control set points and/or responses, provide for programmable control of climate control operations in an electric mobile application, and provide for an integrated PDU with greater control over diagnostics and prognostics of the PTC/NTC hardware and circuits. The present disclosure provides a PDU having an integrated PTC control, a linear, proportional, and/or a high-resolution climate control mechanism with device protection. The PDU and PTC controller 21604 may be utilized with any type of PTC and/or NTC heating and cooling hardware.

In embodiments, methods and systems may be provided to minimize electromagnetic interference in an inverter by changing switching frequency. Conductive electromagnetic interference (EMI) issues have been investigated, and methods and systems developed to reduce the EMI in inverters. Implementation may be applied to existing hardware without any modification or addition of the hardware. Theoretical explanation behind the inventive concept is explained herein, and the MATLAB simulation is being carried out and results presented to validate the implementation concept. It has been found that the new implementation can reduce the EMI up to 15 db.

An electric vehicle inverter is required to meet conducted electromagnetic emission (common & differential mode noise on DC bus) requirements. In the present configuration, simulation and analysis anticipates possible issues with non-compliance of electromagnetic interference (EMI) requirements for electric vehicle applications. In previous configurations, switching frequency has been kept as constant where inverter PWM techniques used are of fixed frequency (e.g., 10 KHz). As a result, strong EMI peaks are observed at harmonics of 10 KHz and its sideband.

The present disclosure describes a method to reduce conductive EMI by changing switching frequency of the inverter around base frequency. The proposed method may be implemented in existing hardware without any hardware modification or addition with minor adjustments at low level firmware. The proposed configuration is very effective in reducing both common mode and differential mode EMI up to 10 db and 15 db, respectively. Thus, compliance to EMI requirement can be achieved. The proposed configuration minimizes the EMI issue by spreading the switching frequency around the base frequency. In embodiments, the base frequency is chosen as 10 KHz. As a result, instead of having the EMI getting concentrated at harmonics of 10 KHz and its sideband, it will be distributed at harmonics of different frequency and its sidebands. For example, if two switching frequencies, 9 KHz and 11 KHz, are used, then the EMI peaks will be distributed at harmonics of 9 KHz and 11 KHz and its sideband. The configuration can be implemented in the existing hardware, such as without modifications or additions and with minor changes in the firmware of the PWM module.

FIGS. 218A-D depict views of an embodiment inverter configured to determine conducted emissions, including a side view, bottom view, and with a polymer packaging, where the inverter is required to meet conducted emission (common & differential mode noise on DC bus) requirements as per requirements specified by PSA. Switching frequency is kept as constant, and ss a result, strong EMI peaks are observed at harmonics of switching frequency and its sideband. This configuration is used to investigate EMI issues, mitigate the EMI issues, and develop an explanation for the mitigation results (such as through MATLAB simulations carried out to validate the concepts).

FIG. 219 depicts a circuit implementation for determining conducted emissions in an inverter for investigating conductive EMI issues in an inverter, where $I_{cm}$ is common mode current (such as due to parasitic capacitance), and $I_{dm}$ is differential mode current (such as due to inefficient filtering (DC link capacitor) and switching. In conventional inverter PWM techniques used are of fixed frequency (e.g., 10 KHz). As a result, strong EMI peaks are observed at harmonics of 10 KHz and its sideband. The proposed configuration is to minimize EMI issue by spreading the switching frequency around base frequency, where in this example investigation the base frequency has been chosen to be 10 KHz. As a result, instead of having EMI concentrated at harmonics of 10 KHz and its sideband, it is distributed at harmonics of different frequency and its sidebands. For example, if two switching frequencies 9 KHz and 11 KHz are used, EMI peaks will be distributed at harmonics of 9 KHz and 11 KHz and its sideband.

FIG. 220 depicts a frequency hopping configuration for inverter control. Vsw is the switching node voltage, Vc1 and Vc2 are two different frequencies (2 hopping), and P1 and P2 are modulating signal for Vc1 and Vc2. Vsw is the sum of two components Vc1*P1 and Vc2*P2. P1 and P2 is to modulate different switching frequency, e.g., Vc1 and Vc2. For N hopping frequency spurs level would be theoretically reduced by 20*log(N). For 2 switching frequencies it would be 6 db reduction.

FIG. 221 depicts a MATLAB simulation configuration for determining emissions, which takes an fast Fourier transform (FFT) of common mode (CM) and differential mode (DM). DM EMI is simulate, though the method is also valid for CM EMI.

FIG. 222 depicts frequencies used in a first iteration of emissions determination, where space vector pulse width modulation (SVPWM) with frequency hopping is implemented, with five switching frequencies around 10 KHz used to simulate, and where the frequency is changed after four full cycle of individual period.

FIG. 223 depicts a first result from the first iteration of differential emissions determination showing differential mode EMI. Upper and lower bands along the graph shown are for EMI without frequency hopping, with higher frequency 3 db EMI reduction is observed at 22302 and with frequency hopping 7 db EMI reductions is observed at 22304.

FIGS. 224A-B depict a second result from the first iteration of conducted emissions determination, with frequency components getting spread around 10 KHz at 22402, and frequency components concentrated around 10 KHz and its harmonics at 22404.

FIG. 225 depicts frequencies used in a second iteration of conducted emissions determination. SVPWM with frequency hopping is implemented, with five switching frequencies around 10 KHz used to simulate, and frequency changed after four full cycles of individual period.

FIG. 226 depicts a result from the second iteration of conducted emissions determination showing differential mode EMI, with upper and lower bands shown for EMI without frequency hopping, where higher frequency 15 db EMI reduction is observed at 22602, and with frequency hopping 13 db EMI reductions is observed at 22604. The middle portion shown is for EMI with frequency hopping.

FIG. 227 depicts frequencies used in a third iteration of conducted emissions determination. SVPWM with frequency hopping is implemented, with five switching frequencies around 10 KHz used to simulate, and frequency changed after four full cycle of individual period.

FIG. 228 depicts a first result from the third iteration of conducted emissions determination showing differential mode EMI. Upper and lower bands shown are for EMI without frequency hopping, the upper and lower bands shown are for EMI without frequency hopping at 22802, with frequency hopping 13 db EMI reductions is observed at 22804. Middle portion shown in red line is for EMI with frequency hopping.

FIG. 229 depicts a second result from the third iteration of conducted emissions determination showing common mode EMI. Parasitic capacitances extracted from the inverter design using are used for common mode EMI simulation. Upper and lower bands shown are for EMI without frequency hopping with frequency hopping 10 db EMI reductions observed at 22902. The middle portion shown is for EMI with frequency hopping.

FIG. 230 lists a comparison of results from the first iteration, second iteration, and third iteration of conducted emissions determination. Iteration C 23002 may be selected for hardware implementation as switching frequency variation from base frequency is less in comparison.

With respect to implementation (and secondary simulations), for EMI/EMC reduction in the inverter, changing PWM frequency in run time to spread out energy and reduced emission. Different hopping bandwidth on EMI were analyzed, and MATLAB and ANSYS based simulation were carried out for analysis. Different implementation methods and frequency sideband spreading were implemented. With larger sideband and spread, promising results are obtained and EMC noise reduction is around ~12-15 dB. It was determined that implementation may be in limited sideband spreading, such as frequencies varying between 11.1 KHz and 9.09 KHz. Improvement on EMC noise was comparatively low but still promising around ~7-10 dB. A challenge was to implement the variable frequency PWM and synchronizing FOC ISRs with it, and applying an implementation to address the challenge was determined. In embodiments, a determined example implementation is summarized as follows. Allocate 1 channel out of 8 channel in a generic timer module (GTM) submodule for field-oriented control (FOC). Counter of this channel will be of fixed at 100 us and will operate in up down count mode. Configure interrupt which will be used to execute FOC or other 100 us Software. Frequency and duty information updated in a way so that it does not get out of synchronization with PWM. Allocate 6 channel out of the remaining 7 channels in the GTM submodule for PWM generation. These 6 channels will be used for PWM generation. Different Count value (PWM duty and frequency) may be updated by 100 us software. Configure center triggered hardware interrupt to FOC trigger of ADC. Enable all channels by calling single API.

FIG. 231 depicts a timing diagram in embodiments of the present disclosure. Implementation concept in GTM module may include a counter group 1 that will fall by 10 us each cycle when it is at 90 us. Counter group 2 will advance by 10 us each cycle when it is at 110 us. Implementing run time PWM frequency change portion in software controller evaluation boards enables the observation of varying frequency PWM without compromising and degrading other functionality. FIGS. 232 and 233 depict related timing diagrams.

FIG. 234 depicts a phased pulse-width modulated timing diagram in embodiments of the present disclosure, showing a baseline configuration 23402 and an improved configuration 23404. The baseline 23402 includes software with 6 PWM's (Phase A, B, C high and low side) and an ADC trigger PWM in synchronization. The control loop ran periodically in 100 us. After applying frequency hopping technique the control loop and other tasks (1 ms, 10 ms) did not run in synchronization and may add to system instability if PWM synchronized task is used. The improved configuration 23404—Implementation may utilize making the control loop fixed at different PWM frequencies (hopping), and creating one additional trigger (virtual PWM) in synchronization with existing PWM's. The period of this trigger was fixed (100 us) and may generate a high priority interrupt and used for control loop execution. The submodule of the GTM module utilized PWM (6 ch) and a 100 us trigger (1 ch) generation. For synchronization channels will enabled simultaneously. Fixed 100 us trigger may be generated from 1 channel out of 8 channel of the submodule. The ADC may be triggered at the middle of each PWM without interrupting CPU.

FIGS. 235 and 236 depict an effect of frequency hopping on a first controller gain in embodiments of the present disclosure. The controller may be implemented in an analog domain and then discretized in different loop rate. A small drop in PM is observed at 23502 and 23602, where PM (~70 degree) is well above the 45 degree limit provided.

FIG. 237 depicts a complete implementation timing diagram in embodiments of the present disclosure.

Methods and systems are shown to minimize electromagnetic interference in an inverter by changing switching frequency. The theoretical reason behind EMI minimization due to change in frequency has been investigated and a new configuration has been simulated in MATLAB environment. It is found that the new configuration is very effective (up to 15 db in differential mode and up to 10 db in common mode EMI reduction) to reduce conducted EMI. Simulated results confirm the theoretical explanation provided. Thus compliance to EMI regulation can be met through changing switching frequency. The configuration can be implemented in existing hardware without any hardware modification or addition with minor adjustments at low level firmware. Hence the solution is cost effective and does not require significant resource. Frequencies of 9.09 KHz to 11.11 KHz (iteration c) spread may be chosen for a hardware implementation as switching loss will be less compared to 8.33 to 12.5 KHz frequency spread with the mentioned EMI noise reduction benefits as described herein. An interrupt service routine (ISR) loop for field oriented control (FOC) can be kept at slowest of all the frequency used, such as for iteration c 110 us (9.09 KHz) as described herein could be used, which would not impact performance as variation is less and change of frequency is well within the requirements (e.g., 5 KHz-12 KHz). The proposed configuration may be implemented in OBC, DC-to-DC converters, and the like, to solve EMI issues.

In an aspect, a method may include minimizing electromagnetic interference (EMI) in inverters as described herein. A method may be provided for minimizing or reducing EMI in inverters, may include changing switching frequency to reduce the conductive EMI in inverters, where the switching frequency is spread around base frequency, and the EMI get distributed at harmonics of different frequency and its sidebands. A method may be provided for minimizing or reducing EMI in inverters by changing switching frequency wherein the base frequency and the switching frequency are selected to distribute the EMI peaks at harmonics of the switching frequency and its sideband. A method may be provided for minimizing or reducing EMI in inverters, wherein the method may be implemented in the existing hardware without any hardware modification or addition with minor tweaking at low level firmware. A method may be provided for minimizing or reducing EMI in inverters, wherein the method may be implemented in OBC, DC-DC converter, and/or inverter to solve EMI issues. Methods may be applied to inverters with minimized or reduced EMI using the method described herein. A module driver including an inverter with minimized or reduced EMI may utilize the method as described herein. A microcontroller including a module driver having the inverter with minimized or reduced EMI may utilize the method as described herein.

In a supplemental evaluation, FIG. 238 depicts frequencies used in a fourth iteration of conducted emissions determination SVPWM with frequency hopping is implemented, with three switching frequencies around 10 KHz is used to simulate, and where frequency is changed after four full cycles of individual period. FIG. 239 depicts a first result from the fourth iteration of conducted emissions determination showing differential mode EMI. Upper and lower bands shown are for EMI without frequency hopping, where higher frequency 6 db EMI reduction is observed at 23902, and with frequency hopping 12 db EMI reductions observed at 23904. The middle portion shown is for EMI with frequency hopping. FIG. 240 depicts a second result from the fourth iteration of conducted emissions determination showing common mode EMI.

In embodiments, an integrated on-board charger (OBC) and DC-to-DC converter configuration may be provided. An integrated topology may be configured for charging of a low voltage (LV) battery on the same magnetic transformer as used for charging a high voltage (HV) battery. Two transformers may be included and control logic may switch between upper and lower circuits connected to the transformers. Grid power may be supplied to an upper transformer and then switched to a lower transformer when a threshold temperature is reached. Package reduction may be achieved through shared magnetics. In an example, the circuit can be configured to switch between 400V & 800V. The switch may be moved real-time or may be hard-wired. The switch may configure the upper circuit parallel to the lower circuit, or the switch may configure the upper circuit serial with the lower circuit. There may be a linear reduction of OBC power when the DC-to-DC converter is working. It may be possible to upgrade the combined OBC and DC-to-DC power when the charging station supports upgrade and when the cooling temp is acceptable. The combined OBC and DC-to-DC may provide improved DC-to-DC efficiency at low loads. The circuit may provide OBC phase switching between one and three-phase, where the same combined OBC and DC-to-DC circuit may be used in both one-phase and three-phase circuits. Grid power may be divided to charge the LV and HV batteries. Rather than run both an upper and a lower circuit inefficiency at a divided power, the upper circuit may receive grid power for charging the LV and HV batteries. When the upper circuit is at or near its set point for handling grid power, or when the on-board charging requires more power than the upper circuit can provide, then the lower circuit may be used to complete charging of the HV and LV batteries. In this way, the upper circuit can be run efficiently at its highest power setting, and inefficient use of the lower circuit can be delayed or avoided. The lower circuit can be used in instances when the upper circuit is not enough to charge the batteries.

FIGS. 241A-B depict an embodiment block diagram for the integrated on-board charger and DC-to-DC converter. The integrated OBC and DC-to-DC converter magnetics may reduce size, support one and three phase inputs, provide full operation with or without neutral connection, be limited to AC input power, have OBC power linearly reduced by DC power requirement, be compatible with 400V or 800V battery systems, have bidirectional OBC and DC-to-DC converter, have improved 12V DC converter efficiency with light loads, and the like.

FIGS. 242-250 depict embodiment schematic representations for the integrated on-board charger and DC-to-DC converter.

In embodiments, a topology for electric vehicle power conversation system that enables multiple functions to be integrated in the same circuitry may be provided, such as where the topology reduces cost and weight of the system. FIG. 251 depicts an embodiment topology for charging and power generation in an electric mobile application, which illustrates an electric vehicle (BEV or PHEV) with a module called an on board charger (OBC), which converts the power from grid (120V/240V) to vehicle high voltage battery 25106 through an OBC AC-DC converter 25102 and DC link 25104. This topology may also permit two way power flow design by allowing power to flow from the high voltage battery 25106 to the grid through the DC link 25104, on board generator (OBG) DC-AC converter 25114 and 120/240V converter 25110. Commercial vehicle and passenger trucks/SUV may provide an OBG function, which is to provide power socket 120V/240V AC for tools or consumer electronics. It is shown in FIG. 251 that the OBC and OGB are separate components and use two sets of power electronics components and controllers and cooling systems 25108 and 25112.

FIG. 252 depicts an alternate embodiment topology for charging and power generation in an electric mobile application with a combined OBC/OBG converter 25202. This configuration provides a simplified topology to achieve FIG. 251 functions as shown in FIG. 252. The same OBC/OBG AC/DC/DC converter (Bi-directional) component 25202 can be used both for charging and power generation, so one set of AC/DC/DC converter hardware is saved. To make the system work, a multi-pole contactor/switch 25204 is added into the system, which can be a separate part or can be integrated to OBC/OBG AC/DC/DC converter component 25202. So the power can flow from grid to HV battery, or can flow from HV battery to 120/240V distribution or grid. In the topology of FIG. 251, two cooling systems 25108 and 25112 have to be used to cool OBC and OBG. Since OBC and OBG functions shown in FIG. 252 are not used at the same time, one cooling system 25206 is needed and system cost is dropped and efficiency is improved.

FIG. 253 depicts an embodiment control method for the alternate embodiment topology, where the control algorithm is waiting to receive a higher level charging command or power generation command (to grid and to consumers). This control method may be described with respect to four working modes. Mode 1: charging only, with power flow to battery pack, and only grid side contactor closed. Mode 2: consumer power generation only, where power flows to distribution from the high voltage battery, and where the power generation contactor is closed. Mode 3: High voltage battery generating power to the consumer and the grid at the same time, with both contactors closed. Mode 4: no power flow. In embodiments, the higher level command may be a charging command 25302, a power generation to grid command 25304, a power generation to consumer command 25306, and the like. Once the command is received the algorithm walks though determining the appropriate response and configuration, such as for example first determining if the charging command is active 25308, and if yes, closing the contactor for the circuit to grid with power generation side open 25310 and invoke charging and protection routines 25312. If no, then the algorithm may then determine if a power generation command to grid command is active 25314, and if yes, closing the contactor for the circuit to power generation with the grid side open 25316 and invoke generation and protection routines 25318. If no, then the algorithm may then determine if a power generation command to grid is active 25320, and if yes, closing the contactor for circuit to power generation and close the grid side contactor 25322. If no, to keep both sides open.

Advantages to the alternate topology with integrated to OBC/OBG AC/DC/DC converter component 25202 may include a simplified vehicle high voltage topology, shared circuitry and major component for both on board charger and on board power generator for cost reduction and weight reduction, simplified cooling system for cost reduction and weight reduction, adding less expensive contactors for robust control and meet multiple power flow management, and the like.

FIG. 254 depicts an embodiment functional block diagram for the alternate embodiment topology, and FIG. 255 depicts an embodiment representational schematic diagram for the alternate embodiment topology.

In embodiments, a method for junction temperature detection based on Kelvin-source may be provided, where the method enables the detection of a power electronic device junction temperature when a device is operating. The method leverages the device operating on-state resistance and current which can be obtained by Kelvin-source voltage, thus enabling a sensor-less device online junction temperature measurement.

A traction inverter with high power may be used in electric vehicles, but a single power device or power module may not handle all the current, so power devices often need to be connected in parallel. Insulated-gate bipolar transistor (IGBT) devices are normally used as the power device in traction inverter. Wide band-gap (WBG) devices, such as Silicon Carbide (SiC), is an attractive candidate to replace IGBT, WBG devices feature lower conduction and switching losses and can improve the efficiency and power density of the inverter. A Kelvin-source terminal decouples the path of load current from the gate control loop and may improve the switching characteristics in WBG devices.

However, detection of online operational junction temperatures may be challenging. Current sharing performance is a big challenge for paralleled devices (IGBT, SiC MOSFET) and unbalanced current will finally result in thermal unbalance and may damage the devices. There are a number of paralleled device control strategies or protection and diagnostics methods that leverage the operation junction temperature ($T_j$) as a feedback or criterion. Physical-contact based online $T_j$ detecting methods that puts the die in direct contact with a thermo-sensitive material such as thermocouples or thermistors has a limited accuracy and dynamic response and requires mechanical access inside the device package or heatsink. Optical based $T_j$ detecting methods often use a thermal camera or optical probe and need a visual access to chip that is not suitable for online $T_j$ measurement especially in a narrow space. Thermo-sensitive electrical parameters (TSEPs) based methods may also be used. Many TSEPs have been utilized to estimate $T_j$ and are divided into two categories as static ones (short circuit current, leakage current, saturation voltage, and the like) and dynamic ones (Miller plateau voltage, max di/dt, max dv/dt, turn on/off time, and the like). Most of the TSEPs are difficult to use because of little sensitivity, anomalous principles, or complex calibration. On-state resistance ($R_{dson}$) can be directly calculated by detecting drain-source voltage ($V_{ds}$) and drain current ($I_d$) in operation and has a strong relation with $T_j$ which can be obtained on a device datasheet or lookup table made by experiment. Ids is difficult to detect without a current sensor, while a Kelvin-source based method is a much cheaper and easier method.

For both IGBT and SiC MOSFET, Rdson is related to $T_j$ & $I_d$, such as shown on FIGS. 256-258. FIG. 256 depicts a typical normalized on-resistance vs. temperature curve for a switching device. FIG. 257 depicts a typical on-resistance vs. drain current for various temperatures for a switching device. FIG. 258 depicts a typical on-resistance vs. temperature for various gate voltages for a switching device. A lookup table/map or an equation for $T_j$ based on Rdson and Id (e.g., $y=(-1E\text{-}08x^3+3E\text{-}05x^2+0.0007x+0.9668)*16E\text{-}3$, where $y=R_{dson}$ and $x=Tj(C°)$) with the data. FIG. 259 depicts a derived relationship for temperature vs. drain current vs. on-resistance for a switching device. FIG. 260 depicts a derived relationship for temperature vs. drain current vs. on-voltage for a switching device.

Detecting online junction temperature by Kelvin-source may be thus determined. Since $R_{dson}=V_{ds}/I_d$, $V_{ds}$ and Id can be tested for. $V_{ds}$ can be observed by analog amplification circuit. Id is tested by measuring the voltage cross Kelvin-source and Source in real-time. With reference to FIG. 261, which depicts an embodiment testing configuration 26102, packaging 26104, and resulting waveform 26106 for detecting junction temperature by Kelvin-source, $R_L$ stands for the resistance between the Kelvin-source and source including package bonding wires and PCB layout. The induced voltage over $R_L$ ($V_{ks}$) is changing linearly with $I_d$. $I_d$ can be calculated by $I_d=V_{ks}/R_L$.

FIG. 262 depicts an embodiment circuit configuration for measuring drain voltage with high insolation. This circuit must isolate high voltage, since the $V_{ds}$ is equal to DC link high voltage when the device is at off state. In following the $V_{ds}$ measurement circuit, when the gate signal is off, Q1, Q2 and Q3 are off, so the output is 0. D6 is used to protect the circuit from high DC link voltage, and D7 compensates the voltage drop of D6. When the gate signal is on, Q1, Q2 and Q3 are on, and $V_{ds}$ is transit to the differential amplification circuit, thus obtaining the $V_{ds}$.

FIG. 263 depicts an embodiment circuit configuration for measuring Kelvin source voltage with high accuracy. This circuit must have large voltage gain coefficient and high accuracy, since the $V_{ks}$ is often a small voltage. Following the $V_{ks}$ measurement circuit, there is a differential amplification circuit to obtain the $V_{ks}$ based on U1. The signal is amplificated again by U2, and then transit to ADC sampling.

FIGS. 264A-B depict an embodiment process flow diagram for junction temperature detection based on Kelvin-source. In an overall flow, the process begins with directly leveraging the original data from a supplier/datasheet for the device and making a table and/or map of $T_j$ 26402. Alternately, establish the mathematic relation among Tj, Rdson and Id by thermal cycle testing. In a next step 26404, $R_L$ testing or $V_{ks}$ and $I_d$ relation calibration 26404 with analog differential amplification circuits or other isolated circuits. In a next step 26406, design $V_{ds}$ and $V_{ks}$ sampling analog circuits and test $V_{ks}$ and $I_d$ in designed package and layout and calculate RL or calibrate the lookup table between $V_{ks}$ and $I_d$. And then code a controller 26408, including an ADC sampling and filter program, calculation of $R_{dson}$ and $I_d$, and outputting $T_j$. In a non-limiting example program, in a first step 26410, determine if the gate is on. If yes, than delay 200 ns 26412, sample $V_{ds}$ 26414, filter $V_{ds}$ 26416, sample $V_{ks}$ 26418, filter $V_{ks}$ 26420, and then output $T_j$ such as through a look-up table and/or map 26422. Then decide if the gate is still on at 26424, and if no, go back to start, and if yes, jump back to sampling/filtering and output.

In embodiments, a low-cost junction box with centralized control may be provided, which includes a simplified junction box architecture including where a controller is replaced with a data selection module. With this architecture, the cost of a junction box may be reduced significantly while not impacting the main functions of the associated central processor. FIG. 265 depicts an embodiment junction box architecture, including at least one PDE 26502, a data selection multiplexer 26504, and a central processor (such as handling multiple PDEs and connected to a CAN bus). In the simplified configuration, only the core components including contactor, fuse, current sensor, voltage sensor are retained, while replacing the controller with a data selection module. In this configuration, the central processor is not impacted. FIG. 266 depicts an embodiment of a one PDE controller configuration, illustrating an integrated fuse 26602, voltage sense 26604, current sensor 26606, current switching interrupting device 26608, and analog signal conditioning circuitry 26610. The more compact architecture uses the input-output port of the central processor to collect current, voltage and control port information. Besides the cost effectiveness, another advantage of architecture is that the system will be more compact, and system level diagnosis will be performed without communication between the supervisor controller and the PDE controller, therefore the firmware architecture may also be compacted.

In embodiments, and referring to FIG. 267, a new topology for combined OBC and DC-to-DC converter may be provided to reduce cost and weight and to improve power density, where the topology configuration enables different modes for different operational conditions, and including separate circuit isolation circuits 26710 and 26712 for providing independent power flow paths. In embodiments, there may be a first mode for charging the high voltage battery 26714 from the AC side 26718 of the circuit, a second mode for simultaneously charging the high voltage battery 26714 from the AC side 26718 of the circuit and the high voltage battery supplying power to the low voltage batter side 26716 of the circuit, a third mode (e.g., for driving an electric vehicle) where the high voltage battery 26714 supplies power to the low voltage battery side 26716 of the circuit, a fourth mode for a low voltage battery from the low voltage battery side 26716 of the circuit suppling power to the high voltage battery 26714, and the like. The separate circuit isolation circuits 26710 and 26712 for providing independent power flow paths enable greater control of power flow during operational modes. Mode switching is executed through configuration of switch one 26701 (e.g., a 2-pole switch), switch two 26702 (e.g., a 3-pole switch), and switch three 25703 (e.g., a 2-pole switch, and although switch three is depicted on the −DC side of the low voltage batter side of the circuit, switch three may also be operated on the +DC side).

In reference to FIG. 267, an embodiment switching topology is depicted with combined bi-directional on-board charger and bi-directional DC-to-DC converter control topology in a first mode for charging the high voltage battery 26714 from the AC side 26718 of the circuit, where through the depicted switching configuration for switch one 25701, switch two 25702, and switch three 25703, power is enabled to flow through both circuit isolation circuits 26710 and 26712 from the AC side 26718 to the high voltage battery 26714. As depicted, in the first mode switch three is closed to the high voltage DC−, and switches one and two are operating to charge the high voltage battery, such as per single or three phase inputs. In embodiments, this mode of operation may enable the high voltage battery of an electric vehicle to be charged from an external charging source connected to the AC side of the circuit, where the low voltage battery currently does not need charging due to the low voltage battery currently having a high state of charge.

In reference to FIG. 268, an embodiment switching topology is depicted with the combined bi-directional on-board charger and bi-directional DC-to-DC converter control topology in a second mode for simultaneously charging the high voltage battery 26714 from the AC side 26718 of the circuit and the high voltage battery supplying power to the low voltage battery side of the circuit 26716 (e.g., to a DC-to-DC converter and connected to a low voltage battery and low voltage loads). As depicted, in the second mode switch three 26703 is closed to low voltage DC−, switch one 26701 is closed to high voltage DC−, and switch two closes to full bridge DC+. In embodiments, the second mode may be utilized when the low voltage battery is in a low state of charge, and where the switching configuration allows for power to simultaneously flow from the AC side 26718 of the circuit to the high voltage battery 26714 through the upper isolation circuit 26710 while also allowing power to flow from the high voltage battery 26714 to the low voltage battery side 26716 of the circuit through the lower isolation circuit 26712. In embodiments, the second mode may be maintained until the low voltage battery's state of charge reaches a threshold level, at which point the configuration is switched to another mode of operation (e.g., back to the first mode to fully charge to the high voltage battery).

In reference to FIG. 269, an embodiment switching topology is depicted with the combined bi-directional on-board charger and bi-directional DC-to-DC converter control topology in a third mode for driving an electric vehicle where the high voltage battery 26714 supplies power to the low voltage battery side of the circuit 26716. As depicted, in the third mode switch three 26703 is closed to low voltage DC−, switch one 26701 is closed to high voltage DC−, switch two 26702 is closed to full bridge DC+, where the high voltage battery 26714 is charging the low voltage battery through the lower isolation circuit 26712 while the vehicle is driving (and thus unplugged from an external AC charging source).

In reference to FIG. 270, an embodiment switching topology is depicted with the combined bi-directional on-board charger and bi-directional DC-to-DC converter control topology in a fourth mode for the low voltage battery side 26716 supplies power from the low voltage side 26716 to the high voltage battery 26714 such as in a pre-charge configuration. As depicted, in the fourth mode switch three 26703 is closed to low voltage DC−, switch one 26701 is closed to high voltage DC−, switch two 26702 is closed to full bridge DC+.

FIG. 271 depicts an embodiment combined bi-directional on-board charger and bi-directional DC-to-DC converter control topology in a first alternate configuration with low voltage connections on the top portion of the circuit.

FIG. 272 depicts an embodiment combined bi-directional on-board charger and bi-directional DC-to-DC converter control topology in a second alternate configuration with the DC-to-DC converter connections on the both the top and bottom portions of the circuit.

FIG. 273 depicts an embodiment combined bi-directional on-board charger and bi-directional DC-to-DC converter control topology in a third alternate configuration that adds a non-isolated buck-boost converter as the DC-to-DC converter providing low voltage power to low voltage loads.

Referencing FIG. 241, an example system for power distribution includes a mobile electric application 24102, including a high voltage (HV) energy storage device 24112 (e.g., a high-voltage battery), a low voltage (LV) energy storage device 24114 (e.g., a relatively low-voltage battery, and a controller 24104 including an alternating current (AC) external interface 24106 configured to selectively couple a plurality of AC load/source components 24110, wherein the AC external interface comprises a switch 24108 having a first position that electrically couples the plurality of AC load/source components to the high voltage energy storage device, and a second position that electrically isolates the plurality of AC load/source components from the high voltage energy storage device. The example system may be representative of an architectural topology, system, and method for an electric vehicle combined module that provides bi-directional high voltage power flow (e.g., grid to HV battery, HV battery to Grid, HV battery to AC loads, and the like) through the same power electronics, or at least partially through shared power electronics. The topology may also provide high voltage to low voltage DC-to-DC conversion functions, AC/DC conversion (e.g., with a rectifier, inverter, and the like), cooling system 24120, a modular structure, a housing 24122, and the like.

An electric vehicle, such as a battery electric vehicle (BEV) or plug-in hybrid electric vehicle (PHEV), can have an on-board charger to charge the HV energy storage device from the power grid or can have an on-board generator to provide power from HV energy storage device to AC loads. This sometimes can be called a bidirectional on-board charger (OBC). Adding a grid synchronization function, the bi-directional charger can also send the power to the grid, such as through the AC external interface. In BEV or PHEV vehicles, a DC-to-DC converter may be included to convert HV energy storage device voltage to low voltage for controllers, and the like. For instance, a low voltage bus may include 9V to 14V for passenger vehicles. The DC-to-DC converter and bi-directional OBC may be separate parts, with separate cooling system, electronics (e.g., control board, driver board, and the like), housing, and the like. The DC-to-DC converter and bi-directional OBC may be combined (e.g., into one package), which may lead to simplified and/or reduced component count for electrical and electronic circuitry in the system. For instance, a switch CV4-1-08 may be added with a DC-to-DC converter connected to bidirectional OBC circuitry. Switch 24108 may be controlled to make sure there is no interference of the electric circuitry operations, and to allow for sharing of power electronics by separating aspects of the system depending upon the current operating mode. Power can be flowing from the grid to the HV energy storage device, HV energy storage device to AC loads or grid. A DC-to-DC converter function may be provided which allows power flow from HV energy storage device to LV DC loads. In this instance, a driver board, control board, and/or cooling system may be further simplified since the bi-directional OBC and LV DC-to-DC converter may be integrated into one package. In this instance, several power electronics switches can be eliminated.

Certain further aspects of an example system are described as follows, any one or more of which may be present in certain embodiments. An example system includes a plurality of AC load/source components 24110 such as including a grid connection, an AC load connection, and the like. The grid connection may include a charging connection, a 3-phase AC connection, a consumer AC access, and the like. The switch 24108 in the second position may electrically couple the HV energy storage device to the LV energy storage device. The second position of the switch 24108 may include a closed position, such as where the closed position of the switch bypasses a coupling inductor between the HV energy storage device and the AC external interface.

Referencing FIG. 242, an example system for controlling power distribution includes a controller 24204 in control communication with a mobile application circuit 24202 structured to interpret an electrical distribution mode, a distribution switch circuit 24216 structured to provide a switch position command in response to the electrical distribution mode; and a switch 24208 configured to be responsive to the switch position command, where the switch 24208 includes a first position that electrically couples a HV energy storage device 24212 to an AC external interface 24206 and electrically isolates the HV energy storage device from a LV energy storage device 24214, and a second position that electrically couples the HV energy storage device to the LV energy storage device and electrically isolates the HV energy storage device from the AC external interface. In embodiments, the controller 24204 may include a cooling system 24220, a housing 24222, and the like. The example system depicted in FIG. 242 is compatible with certain embodiments of the mobile electric application 24102 depicted in FIG. 241, and/or with other mobile applications depicted throughout the present disclosure.

Certain further aspects of an example controller are described as follows, any one or more of which may be present in certain embodiments. An example electrical distribution mode may include at least one mode, such as selected from a discharging mode providing power from the HV energy storage device to the AC external interface, a charging mode providing power from the AC external interface to the HV energy storage device, a low voltage charging mode providing power from the HV energy storage device to the LV energy storage device, and the like. The electrical distribution mode may include a discharging mode providing power from the HV energy storage device to the AC electrical interface, the controller further including a power configuration circuit structured to synchronize power provided from the HV energy storage device with a grid electrically coupled to the AC external interface.

Referencing FIG. 243, a detailed example of the controller 24204, consistent with the depiction of FIG. 242, includes a switch 24208 in control communication with an AC external interface 24206, a HV energy storage device 24212, and a LV energy storage device 24214. Although FIG. 243 depicts a single-phase application, one skilled in the art will appreciate that the configuration can also be applied to the AC input of a three-phase circuit with or without neutral. Operations of an example electronics portion of an architecture such as depicted are shown for purposes of illustration. It will be understood that components of a system such as in FIG. 243 may be implemented in hardware, software, logic circuits, and/or may be combined or distributed about a system.

In embodiments, an example power distribution system, method, and controller may comprise a number of operating modes. For instance, a first example mode may be utilized when a vehicle is driving, where the OBC is not utilized, and by disabling the operation of AC external interface portion of the system (e.g., the left side of FIG. 243) by closing the switch 24208, the controller 24204 can control power flow with the DC-to-DC converter 24216 such as for charging the LV energy storage device 24214. A second example mode may be for charging the HV energy storage device 24212 in the system, such as to power electronics (e.g., a driver board and controller board) for the OBC function. In this example second mode, the switch 24208 is open to fully disconnect the DC-to-DC converter 24216 from the OBC and to enable control of the OBC in a resonant mode (e.g., in an LLC resonant mode). However, if the LV energy storage device voltage is too low, it may be possible to switch modes, such as to the first example mode, to charge the LV energy storage device. When the state of charge of the LV energy storage device is high enough, it is possible to switch back to the example second mode to use the OBC to charge the HV energy storage device. In embodiments, while the system is charging to HV energy storage device, such as when the LV energy storage device is in a high state of charge, the system may rely on the LV energy storage device in the system to power the electronics for the OBC function, where the switch is open to fully disconnect the DC-to-DC portion from the OBC circuit. If the LV energy storage device voltage is below a certain threshold state of charge, the switch may be closed to operate the DC-to-DC converter to charge the LV energy storage device and pause charging the HV energy storage device. These two modes may be switched back and forth depending on the state of charge level of the LV energy storage device. A third example mode may be for connecting the HV energy storage device to provide power to the AC external interface, where power is flowing from the HV energy storage device to the grid or AC components and where the switch is open (e.g., when LV energy storage device state of charge is high). By then closing the switch, the system can pause power being provided to AC external interface (e.g., to the grid or AC load) to charge the LV energy storage device. When the LV energy storage device stage of charge is sufficiently high (reaching a predetermined threshold), the system can re-open the switch to resume power flow back to the grid or AC load.

Referencing FIG. 244, an example procedure for controlling the distribution is depicted, including in a first step 24402 operating a mobile electric application having a HV energy storage device, a LV energy storage device, and an alternating current (AC) external interface. In a second step 24404 selectively operating a switch between (1) a first position 24406 that electrically couples the HV energy storage device to the AC external interface and electrically isolates the HV energy storage device from the LV energy storage device, and (2) a second position 24408 that electrically couples the HV energy storage device to the LV energy storage device and electrically isolates the HV energy storage device from the AC external interface. Alternately, a procedure may switch off all external AC with a single switching action while not necessarily changing or isolating a low voltage relationship at the same time.

Certain further aspects of an example procedure may include operating in a driving mode by selectively operating the switch to the first position, and controlling direct current conversion between the HV energy storage device and the LV energy storage device, such as controlling the DC-to-DC conversion by powering a controller with the HV energy storage device, controlling the DC-to-DC conversion by powering a controller with the LV energy storage device, and the like. The operating mode may include a charging mode by selectively operating the switch to the second position and controlling charging from the AC external interface to the HV energy storage device, such as by controlling the charging by powering a controller with the LV energy storage device. Controlling the charging by pausing the charging in response to the LV energy storage device state of charge may be determined by detecting a state of charge below a threshold state of charge, operating the switch in the second position to charge the LV energy storage device, and returning to the charging mode in response to the LV energy storage device having a state of charge exceeding a second threshold state of charge. Operations may include a discharging mode by selectively operating the switch to the second position and controlling discharging from the HV energy storage device to the AC external interface, such as by controlling the discharging by synchronizing the discharging to a grid coupled to the AC external interface. Controlling the discharging may be implemented by providing power to the grid or an AC load coupled to the AC external interface.

The term power distribution (and similar terms) as utilized herein should be understood broadly. Without limitation to any other aspect or description of the present disclosure, a power distribution system, such as related to a mobile electric application, includes components such as an on-board charger, DC-to-DC converter, HV energy storage device, and LV energy storage device. Certain components may not be considered power distribution individually, but may be considered power distribution in an aggregated system—for example an energy storage device (e.g., a battery) may not be considered a power distribution system, but may be a part of a larger system and/or be accumulated with a number of other related components to be considered a power distribution system and/or a part of a power distribution system. In certain embodiments, a system may be considered a power distribution system for some purposes but not for other purposes—for example an alternating current (AC) external interface may not be considered a power distribution system, but when used to interface a power source (e.g., a high-voltage storage device) through an inverter and AC external interface to an AC power load or a grid connection would be considered part of a power distribution system. Additionally, in certain embodiments, otherwise similar looking systems may be differentiated in determining whether such systems are power distribution systems, and/or which type of power distribution system. For example, a switch used to connect and disconnect a low-voltage energy storage device from a circuit may not be considered part of a power distribution system, but when the switch connects the LV energy storage device to on-board charging components in a mobile electric application, the switch would be considered part of a power distribution system. Accordingly, the benefits of the present disclosure may be applied in a wide variety of systems, and any such systems may be considered a power distribution system herein, while in certain embodiments a given system may not be considered a power distribution system herein. One of skill in the art, having the benefit of the disclosure herein and knowledge about a contemplated system ordinarily available to that person, can readily determine which aspects of the present disclosure will benefit a particular system, how to combine processes and systems from the present disclosure to enhance operations of the contemplated system. Certain considerations for the person of skill in the art, in determining whether a contemplated system is a power distribution system and/or whether aspects of the present disclosure can benefit or enhance the contemplated system include, without limitation: the accessibility of portions of the system to energy storage devices; connectivity to power loads; connectivity to power conversion components; the presence of an on-board charger, the use of an inverter between DC and AC power components; and the like. While specific examples of power distribution systems and considerations are described herein for purposes of illustration, any system benefiting from the disclosures herein, and any considerations understood to one of skill in the art having the benefit of the disclosures herein, are specifically contemplated within the scope of the present disclosure.

Referencing FIG. 245, an example vehicle 24502 (or mobile application) includes a motive electrical power path 24504, and a power distribution unit (PDU) 24506 having a motive current protection circuit disposed on the motive electrical power path 24504. The motive electrical power path 24504 is a simplified schematic depiction in the example of FIG. 245, including a high power battery pack 24510 providing power for a motive load 24508 (e.g., drive motors, a vocational load, or the like). The example PDU 24506 may include aspects from any PDU examples of the present disclosure, including fuses, contactors, breaker/relays, cooling, or other components. Additionally or alternatively, the PDU 24506 may be positioned on the high side or the low side of the motive electrical power path 24504, and may additionally or alternatively be positioned within a housing of another device, such as the high power battery pack 24510. The example PDU 24506 further includes a fuse having a number of printed restrictive conductive elements defining repeating geometry gaps. Restrictive conductive elements as utilized herein, and without limitation to any other aspect of the present disclosure, include positions and configured conductive elements within the fuse that are intended to provide a controlled position for the fuse to fail in an overcurrent condition, for example by providing for a lower cross-sectional area for conduction through the restrictive conduction region.

Referencing FIG. 246, a more detailed schematic depiction of an element of a fuse 24602 having a number of printed restrictive conductive elements 24604 defining repeating geometry gaps 24606 is shown for illustration. The example of FIG. 246 includes square or diamond geometry gaps, although any selected gap shapes may be utilized. In certain embodiments, the gaps 24606 may be hexagonal, circular, elliptical, and/or slots (of any shape). The gaps 24606 are depicted as defined holes, where conductive material is missing. Additionally or alternatively, the gaps 24606 may include areas where less conductive material is present (e.g., a thin layer), and/or where a less conductive and/or non-conductive material is present. The utilization of printed restrictive conductive elements 24604 allows for greater control over the geometry and the close positioning of features having variable material compositions relative to previously known fuse arrangements.

The restrictive conductive element may be considered to be the current flowing area between the gaps 24606 (e.g., for current flowing through the fuse from top-to-bottom, or perpendicular to the gap progression) or as the resulting current flowing area along the gaps 24606 (e.g., for current flowing from right-to-left, or along the gap progression). The gaps 24606 are depicted as having the same shape and size, although the repeating geometry of the gaps may include a sequence of gap geometries along the gap progression or the like, and the gaps may increase or decrease in size along the gap geometry. Referencing FIG. 247, an example element of a fuse 24702 includes a gap progression with increasing gap sizes toward a center position, and decreasing gap sizes toward an edge position. The manipulation of the gap sizes and/or shapes allows for manipulation of desired mechanical properties (e.g., allowing structural strength in selected locations, changing resonant frequencies and/or the mass of vibrating elements, etc.) and further allows for greater control over the failure trajectory when the fuse element is activated (e.g., manipulating the first failure point to a given position, controlling where an arc initiation will occur, etc.). Without limitation to any other aspect of the disclosure, additional gap progression examples are depicted in FIGS. 191A, 191B, 192, 194A, 194B, 195A, and 195B. The utilization of printed elements to define the gaps 24606 and form the restrictive conductive elements 24604 provides for a number of benefits over previously known techniques, including improved control over variable shapes with high tolerances, formation of the elements without induced stresses such as in mechanical processes such as stamping or punching, and ease of developing a three-dimensional geometry (e.g., a curvature in the fuse element, or the like). Accordingly, fuse elements can be designed with more accurate and precise current specifications, extended life of the fuse while still meeting a target current specification, and improved tolerance to aging, shocks, or the like that cause the current tolerance band of the fuse to increase, leading to premature failure, nuisance failures, or reduced protection performance (e.g., allowing higher than designed current incidents before activating). In certain embodiments, improved control of the mechanical configuration of the fuse element, including allowing for distribution of the material to be varied along the fuse to support target vibration or deflection responses provides for a more robust fuse element that lasts longer and within specified operating parameters. Mobile applications have high volumes, cost pressure on components, are especially sensitive to service events, down time, and nuisance failures, and incur high levels of operational challenges for fuse elements (e.g., high duty cycle variance; vibration profiles with high amplitudes, duration, and variability; and high environmental variability). Accordingly, aspects of printed fuse elements from FIGS. 246, 247, and throughout the present disclosure, are particularly beneficial for mobile applications relative to previously known fuse elements.

Referencing FIG. 248, an example fuse includes a substrate 24804 (e.g., a ceramic substrate), with a printed glass layer 24802 positioned between the substrate 24804 and each restrictive conductive elements 24604. The printed glass layer 24802 may be positioned wherever a restrictive conductive element 24604 is to be positioned, although the printed glass layer 24802 may be continuous, or a given layer element may support more than one restrictive conductive element 24604, depending upon the manufacturing techniques and constraints, the conductivity of the glass layer, and/or whether a given glass layer applied to a substrate is supporting just one configuration of the restrictive conductive elements 24604 or multiple configurations (e.g., to utilize common substrate 24804/glass layer 24802 components between different final fuse elements, etc.). The utilization of a printed glass layer 24802 provides for ease of supporting multiple configurations, as well as reliable and consistent placement of the glass layer. In certain embodiments, the printed glass layer 24802 may be a dielectric material, and/or may be coated with a dielectric material.

The example of FIG. 248 further includes restrictive conductive elements 24604 being electrically separated (e.g., reference the geometry depicted in FIG. 200). The defined gaps may be between restrictive conductive element 24604, and/or a restrictive conductive element 24604 may also define gaps within the element itself (e.g., reference FIG. 191A depicting rectangular inter-element gaps, and circular intra-element gaps). The example of FIG. 248 further includes conductive jumper elements 24806 between adjacent electrically separated restrictive conductive elements 24604. The conductive jumper elements 24806 may be individual elements each coupled to the respective restrictive conductive elements 24604, or may be provided as an integrated layer (e.g., reference FIG. 200). Where the conductive jumper elements 24806 are provided as an integrated layer, support bridge elements between the jumpers may be removed after assembly, or left in place as part of the fuse structure (e.g., when support bridge elements are not a conductive material).

The restrictive conductive elements 24604 are coupled to the printed glass layer 24802, for example by soldering. The conductive jumper elements 24806, where present, are coupled to the restrictive conductive elements 24604, for example by brazing. In certain embodiments, restrictive conductive elements 24604 are heated with the printed glass layer 24802 to provide a diffusion layer where the restrictive conductive element 24604 material diffuses into the glass layer. In certain embodiments, the temperatures and times of the soldering and/or brazing processes are adjusted to provide for a selected diffusion layer, and/or separate heating operations (e.g., firing the fuse element) to provide for the selected diffusion layer may be performed. Generally, an increased diffusion layer increases the resistance of the conductive jumper elements 24806, and the diffusion layer changes the wettability of the conductor, reducing the chance of melted conductor to reattach (e.g., improving the activation of the fuse by reducing the chance that an activated fuse will re-connect or extend the time to open).

Referencing FIG. 249, an example procedure for preparing a fuse element having a printed restrictive conductive layer is schematically depicted. The example procedure includes an operation 24902 to print a number of glass elements onto a substrate layer (e.g., at positions to support one or a number of potential restrictive conductive layer configurations), and operation 24904 to print a restrictive conductive layer onto the glass elements. It is noted that operation 24904 may not utilize all of the glass elements, for example where operation 24902 is provided to support multiple configurations. Each of the restriction elements of the restrictive conductive layer will correspond to one, or be associated with one of the glass elements, but a given glass element may support more than one restriction element and/or may not have any restriction elements associated with it for a given embodiment. The example procedure includes an operation 24906 to solder the printed restrictive conductive layer to the glass elements, and an operation 24908 to braze a conductive bridging layer to the printed restrictive conductive layer. The example procedure includes an operation 24910 to remove support bridge elements from the conductive bridging layer after operation 24908. The example procedure includes an operation 24912 to diffuse the printed restrictive conductive layer into the glass elements. As with all descriptions of procedures, methods, operations, and the like throughout the present disclosure, operations of the procedure of FIG. 249 can be combined, divided, omitted, re-ordered, and/or additional operations can be added, except where explicitly stated otherwise. For example, and without limitation, diffusion operation 24912 may be performed as a separate heating/firing operation and/or performed as a part of soldering or brazing operations 24906, 24908; operation 24910 may not be performed where support bridge elements are not present, and/or where they are left in place, etc. An example procedure includes operation 24904 to apply the printed restrictive conduction layer as a continuous layer having variable thickness. An example procedure includes an operation (not shown) to apply an additional printed conductive layer, and/or one or more additional laminated conductive layers (e.g., reference 197-199), to apply a selected conductive capacity trajectory (e.g., conductive capacity along the fuse element, across the fuse element, over the area of the fuse element, and/or throughout a volume of the fuse element) to the printed fuse. An example procedure includes the operation 24904 to provide the printed restrictive conduction layer as a number of discrete, separated restriction elements.

Referencing again FIG. 245, an example PDU 24506 includes a fuse having a laminate restrictive conductive layer, and a laminate structural layer. The utilization of laminate layers for the fuse, in whole or part, provides for convenient manufacturing of fuses having configurable specifications, enhancing the capabilities of a fuse and/or utilizing common parts between fuses by adding, removing, or changing the properties of a layer. The laminate layers may be manufactured by any technique, including but not limited to fabrication of a layer as a foil, stamped material, and/or a printed layer. In certain embodiments, a layer may be printed in whole or part separately from the fuse element, and then placed on the fuse element, or may be printed in whole or part in place on the fuse element. A laminate construction or layer describes the progression in a selected dimension through the fuse element (e.g., vertically, relative to the substrate, etc.), but a layer need not be flat, and a given layer in a first portion of the fuse element may not have a same relationship to another layer in a second portion of the fuse element (e.g., a layer may be folded over another layer or a portion of the other layer).

Referencing FIG. 250, a more detailed schematic depiction of an element of a fuse 24602 having a laminate restrictive conductive layer 25002 and a laminate structural layer 25004 is depicted. The example of FIG. 250 includes the restricted portions 25006 (or weak spots) provided as a variable thickness portion of the layer 24602. The restricted portions 25006 may be proved in the proximity of another layer, such as a glass layer 25008 (e.g., a printed glass layer) to provide mechanical support, desired resistance characteristics, and/or desired response during activation of the fuse. The example laminate structural layer 25004 may be formed of a desired substrate, such as compacted sand, a ceramic material, or the like. The restricted portions 25006 may be affixed to the glass layer 25008, such as by soldering, and/or may be diffused with the glass layer 25008. An example laminate restrictive conductive layer 25002 may be foil layer and/or a printed layer.

Referencing FIG. 301, an example fuse 24602 includes a laminate conductive layer 30102 provided as a separate layer from the laminate restrictive conductive layer 25002. In the example of FIG. 301, the laminate conductive layer 30102 may be fixed to the laminate restrictive conductive layer 25002 after positioning, for example by brazing. In the example of FIG. 301, the laminate conductive layer 30102 forms bridging elements between each of the restricted portions 25006.

Referencing FIG. 302, an example fuse 24602 includes a laminate thermal layer 30202 having an enhanced thermal conductivity—for example providing a high thermal conductivity path to a cooler, heat exchanger, coolant flow access, or the like. The laminate thermal layer 30202 is depicted with elements positioned near the restricted portions 25006, for example to ensure a consistent temperature environment such that activation of the fuse is dominated by the immediate current condition of the fuse, rather than historical current conditions through the build-up of heat, and to provide for reduced degradation of the fuse over time during transient current events that may heat cycle the fuse. However, the laminate thermal layer 30202, where present, may be provided at any selected positions within the fuse, or throughout the fuse. The example laminate thermal layer 30202 is depicted between the support/substrate layer 25004 and the glass layer 25008, but may be a part of either layer, and/or the substrate layer 25004 may be fully formed of a high thermal conductivity material, thereby providing the laminate thermal layer 30202. It will be recognized that, in general, thermal conductivity and electrical conductivity are related, and accordingly the provision of a laminate thermal layer 30202 should be consistent with the planned conductivity trajectory for the fuse. In certain embodiments, the support layer 25004 is electrically isolated from the conductive elements by the glass layer 25008 and/or dielectric glass layer, and therefore a laminate thermal layer 30202 formed as a part of the support layer 25004, and/or having the glass layer 25008 interposed between the laminate thermal layer 30202 and the laminate restrictive conductive layer 25002 will generally not interfere with the planned conductivity trajectory. In certain embodiments, the laminate thermal layer 30202 may include a number of elements associated with each restricted portion 25006, and/or configured to avoid adding conductive capacity across a restricted portions 25006, such as depicted in FIG. 303. In certain embodiments, a laminate thermal layer 30202 may include a number of elements positioned between one or more restricted portions 25006, and/or the conductive layer (thicker portions of 25002, and/or 30102) may function as the laminate thermal layer 30202, for example by thermally coupling the conductive layer to a coolant flowing through, or in thermal connection with, the PDU 24506.

Referencing FIG. 304, an example fuse 24602 includes laminated elements on a second side of the substrate layer 25004. The example of FIG. 304 includes the second laminated elements in a similar configuration as the first laminated elements, although they may be distinct as well. In certain embodiments, the laminated layers may be staggered (as shown in FIG. 304), or they may be aligned. The utilization of a second set of laminated elements allows for more efficient utilization of the substrate, the provision of smaller parts (e.g., restricted portions 25006) which may provide for lower cost, lower fabrication costs, utilization of similar components across a range of operating capabilities, improved heat transfer, improved activation characteristics (e.g., ensuring that the fuse opens the circuit quickly and completely during activation), or the like.

Referencing FIG. 305, an example procedure to assembly a laminated fuse is schematically depicted. The example procedure includes an operation 30502 to print a number of glass elements onto a substrate layer, an operation 30504 to apply a laminate restrictive conductive layer to the number of glass elements, wherein the restrictive conductive layer includes a number of restriction elements, and where each of the number of restriction elements corresponds to one of the glass elements. The operation 30504 may further include soldering restricted portions of the laminate restrictive conductive layer to glass elements. Each glass element may not be utilized, and a given glass element may be associated with more than one of the restriction elements. An example procedure further includes an operation 30506 to braze a conductive bridging layer to the laminate restrictive conductive layer, and an operation 30508 to remove supporting bridge elements from the conductive bridging layer. An example procedure includes an operation 30510 to diffuse the laminate restrictive conductive layer to the glass elements.

Referencing FIG. 306, an example inverter 30602 (e.g., for powering a motor for an electric mobile application) includes a number of transistor drivers 30604 (e.g., gate drivers for the inverter to convert high voltage DC power from a battery pack to AC power for the motor), and a DC capacitor 30606 (e.g., a DC link capacitor such as depicted throughout the present disclosure), and a cooling plate 30610 thermally coupled to each of the transistor drivers 30604 and the DC capacitor 30606. The example cooling plate 30610 is fluidly coupled to an external coolant source 30612, such as a main cooling system for a vehicle. The example inverter 30602 includes a controller 30608 having a number of circuits configured to functionally execute operations of the controller 30608. An example controller 30608 includes a power demand circuit that interprets a power demand value for the mobile application including the inverter 30602, and a load balancing circuit that provides driver command values in response to the power demand value. In the example inverter 30602, the transistor drivers 30604 are responsive to the driver command values. Further details of an example controller 30608 are provided in the section referencing FIG. 307. The balancing of the load between the drivers 30604 provides for even wear and thus longer life of the inverter 30602, and reduction of maximum temperatures as the drivers 30604 share the loads.

The example inverter 30602 depicts four drivers 30604, but any number of drivers may be present, depending upon the maximum power throughput of the motor, the number of phases of the motor, the maximum current, power throughput, and/or voltage supported by each driver 30604, or the like. In certain embodiments, drivers 30604 can change mapping to which phases are supported, and/or an excess of drivers 30604 may be present, at least for certain operating conditions away from a maximum power output of the motor, allowing for load balancing between drivers 30604 without disruption to the delivered power to the motor or other load. Example embodiments depicting driver changes between phases or load components are depicted, without limitation, in the embodiments depicted in FIGS. 207-213 and the related description.

In the example of FIG. 306, the drivers 30604 are depicted as geometrically distributed about the DC capacitor 30606. The geometric distribution, where present, does not need to be an equal distribution. Additionally, while the depiction of FIG. 306 is two-dimensional for clarity of description, a geometric distribution may be 3-dimensional (e.g., where four elements are tetrahedrally distributed), or a combination of these. The geometric distribution provides for a compact interface, providing for convenient positioning for thermal contact with the cooling plate 30610, and reduces the overall length of power connections, minimizing emitted and/or received EMI (electro-magnetic interference). In certain embodiments, provision may be made for a connection of the DC capacitor 306 to a DC source, for example using a vertical connection, and/or positioning the drivers 30604 to make an allowance for the DC bus connection(s).

Referencing FIG. 307, an example controller 30608 includes a power demand circuit 30702 that interprets a power demand value 30706 (e.g., a motor torque or power request, or other load description) for the mobile application, and a load balancing circuit 30704 that provides driver command values 30708 in response to the power demand value 30706. The driver command values 30708 may include current, frequency, and/or voltage values to be provided by the drivers 30604, and/or may further include switch commands or the like to change mapping between drivers 30604 and loads (e.g., phases of a motor). The load balancing may be provided as available, and/or the load balancing circuit 30704 may track utilization of the drivers

30604 over time, and configure the load balancing to occur over a longer time scale (e.g., updating per trip, per operating hour, per calendar period, etc.). In certain embodiments, load balancing may be performed even where the number of drivers and phases is the same (e.g., three of each)—for example by having a first driver perform a lower power portion of some of the phases, and a second driver perform a higher power portion of those phases, depending upon how quickly the driver-phase mapping can be swapped, the frequency of the phases, etc. The load balancing circuit 30704 may determine the utilization of drivers 30604 according to power throughput, hard usage determinations (e.g., high temperature, high throughput, or other operations that enhance the speed of wear). Additionally or alternatively, the load balancing circuit 30704 may change the balancing in response to detected driver 30604 conditions, such as the presence of a fault code, an indication of driver wear (e.g., degrading switching times, voltage rise times, temperature generation, etc.), or the like. The load balancing circuit 30704 may track lifetime parameters for the drivers 30604, and/or may summarize tracking parameters, re-zero parameters (e.g., at a point in time where the driver 30604 utilization conditions are balanced, removing historical information), and/or normalize utilization parameters (e.g., utilizing one of the drivers as a baseline, such as the least utilized, and tracking relative wear for the other drivers to the baseline). Additionally or alternatively, the load balancing circuit 30704 may reset driver utilization values, for example in response to a feedback determination determining the driver utilization value (e.g., a service test, wear or performance test, or the like), in response to a maintenance event (e.g., resetting according to service command, a default serviced value, or the like), and/or in response to replacement event (e.g., resetting to a new condition, a refurbished condition, or a service command value).

An example load balancing circuit 30704 provides the driver command values 30708 to at least partially distribute (among the drivers) a power throughput 30710 of the drivers, and/or a thermal energy generation 30712 of the drivers. An example load balancing circuit 30704 provides the driver command values 30708 in response to a temperature value 30714 of the drivers (e.g., adjusting estimated utilization based on the temperature, and/or providing for lower temperature drivers to deliver more of the load, where the temperature value may be a bulk temperature for all drivers, temperatures for subsets of the drivers, and/or individualized temperatures. Temperatures may additionally or alternatively be an average temperature of the driver, a representative temperature, and/or a hot spot temperature), and/or in response to a cooling capacity 30716 of the cooling plate (e.g., due to available coolant flow, temperature of the cooling medium, ambient temperatures, availability of external heat rejection, and/or a command from an external controller such as a vehicle controller that limits or allows a given heat rejection from the inverter 30602 under the current operating conditions).

An example load balancing circuit 30704 provides the driver command values 30708 such that a first one of the drivers provide a voltage contribution to a first phase of a motive power input (e.g., power provided to a drive motor for the mobile application) at a first time, and provides a voltage contribution to a second phase of the motive power input at a second time.

An example inverter 30602 includes at least two of the drivers 30604 electrically coupled to a phase of a motive power input in parallel (e.g., reference FIGS. 207, 213). An example inverter 30602 includes one or more drivers 30604 as an IGBT, a MOSFET, or a WBG. In certain embodiments, one or more drivers 30604 may be a SiC transistor.

Referencing FIG. 308, an example inverter 30602 is shown schematically in a side view, in an embodiment that is consistent with the depiction of FIG. 306. The example of FIG. 308 includes each of the drivers 30604 thermally coupled to a cooling extension member 30804, each cooling extension member 30804 having a cooling path therethrough, and fluidly coupled to a main cooling path in the cooling plate 30610. The cooling extension members 30804 are depicted between the drivers 30604 and the DC capacitor 30606, although they may additionally or alternatively be positioned away from the DC capacitor 30606. The cooling extension members 30804 may be associated with individual drivers 30604, or more than one driver 30604, and/or may be partially associated with one or more drivers 30604. The cooling extension members 30804 may be individually fluidly isolated (except through the cooling plate 30610), and/or may be fluidly coupled in subsets or all together. An example cooling extension member 30804 (not shown) is a sleeve at least partially surrounding the DC capacitor 30606 and thermally coupled to a number of (or all of) the drivers 30604. In the example of FIG. 308, linking electrical components 30802 between the drivers 30604 and the DC capacitor 30606 are depicted above the cooling extension members 30804 as a non-limiting example. An example load balancing circuit 30704 may further consider cooling capabilities of the cooling extension members 30804 in determining utilization values for the associated drivers 30604, and/or to provide the driver command values 30708 to balance the loads and/or utilization of the drivers 30604. The drivers 30604 may be in differential cooling capability environments, due to variances in the thermal relationship to the cooling plate 30610, and/or differential capabilities of the cooling extension members 30804. The differential cooling capability environments may further depend upon the operating conditions of the mobile application (e.g., varying ambient temperatures, temperatures of nearby radiant bodies to the inverter 30602, coolant temperatures, cooling flow rates, and the like).

Referencing FIG. 309, an example procedure to provide a configurable cooling scheme for an inverter is depicted. The example procedure allows for flexible cooling arrangement to meet a given footprint (e.g., geometric spacing, interface options such as coolant availability, information regarding operating conditions, and/or authority for a controller related to the inverter to request operating conditions) for the inverter. Any of the example aspects, components, and/or operations related to inverters as set forth herein may be utilized as a part of the example procedure. Numerous embodiments provided throughout the present disclosure support operations, such as in the example procedure of FIG. 309, to provide for a flexible cooling arrangement for the inverter. Without limitation, aspects that support providing a flexible cooling arrangement include: operations to improve an energy efficiency of the inverter (e.g., adjusting temperature generation), simplified coolant interfaces, improved utilization of coolant capability (e.g., improving thermal contact between heat generating components and available coolant), operations to balance loads and/or utilization between inverter components, improved circuit protection to improve thermal fuse reliability and/or obviate a thermal fuse (e.g., reducing an overall footprint burden on the mobile application to provide cooling and control support for a thermal fuse), reduction in the size of the inverter to provide a particular arrangement (e.g., compact provision of drivers as in a geometric arrangement of FIG. 308, or other compact arrangement such as in FIG. 127), and/or robustness of the inverter to external electrical noise (e.g., increasing the options for arranging emitting components).

The example procedure includes an operation 30902 to determine power demand profile for a mobile application (or vehicle), such as power ratings, duty cycles, sequential descriptions of load requirements, or the like, and an operation 30904 to determine a transistor driver configuration for an inverter of the mobile application in response to the power demand profile (e.g., a number of phases to be supported, a power throughput to be supported, and a number and/or rating for drivers to support the power demand profile). The example procedure further includes an operation 30906 to determine a cooling configuration for the inverter in response to the power demand profile and the driver configuration. The cooling configuration may include one or more of: a requirement for active cooling, cooling flow rates and/or temperature values required, cooling fins or other aspects for the inverter, a heat transfer rate for a cooling plate (including plate flow configuration, number and configuration of cooling pins, etc.), a position and/or configuration of a DC capacitor, drivers, and/or cooling extension members. In certain embodiments, the operation 30906 is responsive to an integration footprint description (e.g., a geometric size, interface availability, length of cooling lines, etc.), and may include constraints (e.g., not to exceed values, or unavailable interfaces) and/or competing considerations (e.g., a cost function between aspects, and/or a prioritization of aspects). In certain embodiments, operation 30906 includes re-performing operation 30904 to update the transistor driver configuration (e.g., providing additional drivers to provide for additional load balancing for the system thereby reducing the cooling requirement) as a part of determining the cooling configuration.

An example operation 30906 includes determining the cooling configuration as an air cooled configuration. An example operation 30906 includes determining the cooling configuration as a coolant plate, and/or determining a cooling extension member(s) configuration, a coolant flow rate capacity, and/or a coolant distribution (e.g., flow regime, sequence, and/or thermally coupled components of the inverter) of the coolant plate. An example operation 30906 includes determining the cooling configuration as an air cooled configuration in response to an excess transistor driver capacity, a coolant flow rate capacity, a predetermined coolant distribution of a coolant plate, and/or a load balancing scheme for the vehicle.

An example operation 30904 includes determining a number of drivers in response to a number of motive power motors, a number of phases for the motors, a motive power voltage, and/or a motive power throughput. An example operation 30904 includes determining a number of drivers in response to a vocational load for the mobile application, a number of phases to support the vocational load, a vocational load voltage, and/or a vocational load power throughput.

In certain embodiments, the example procedure further includes operations to provide the driver configuration and/or cooling configuration to an output device (e.g., to a computing device, application, mobile device, or the like), and/or to provide an alert or notification to an output device (e.g., indicating that a compliant configuration is available, and/or providing a score, match criteria, list of deficiencies, or the like). In certain embodiments, a user of the output device may be a vehicle designer, manufacturer, an original equipment manufacturer (OEM), a body builder, a supplier to any one or more of the foregoing, and/or an end customer (e.g., an individual purchaser, fleet owner, supply chain personnel, etc.) for the mobile application. In certain embodiments, the example procedure includes operations to: assemble an inverter consistent with the determined driver configuration and/or cooling configuration; assemble at least a portion of an inverter consistent with the determined driver configuration and/or cooling configuration (e.g., a power electronics portion, a housing, a kit having a portion of selected parts such as connectors, seals, sensors, etc.); to assemble at least a portion of the mobile application in response to the determined driver configuration and/or cooling configuration (e.g., assembling adjacent parts with space reserved for the inverter, assembling a wiring harness, assembling a cooling line, providing a radiator capacity, providing a coolant system capacity, etc.); and/or approving a design of at least a portion of the mobile application in response to the determined driver configuration and/or cooling configuration (e.g., where approving includes progressing a design designator to a next development gate or stage, ordering related parts, and/or finalizing a design).

Referencing FIG. 310, an example mobile application 31002 is schematically depicted, including a motive power circuit. The motive power circuit includes a power storage device 31004 (e.g., a high voltage battery), a power distribution unit (PDU) 31008, and an electrical load 31012 (e.g., a motive power load or vocation load) that is selectively electrically coupled through a power bus 31014. In the example, the PDU 31008 provides contacting operations to provide power to selected power busses and/or components in the mobile application 31002, circuit protection such as fusing and/or other circuit opening techniques in response to high current occurrences, and may additionally or alternatively provide further operations such as determining current values for motive/vocational power control. The example mobile application 31002 includes the PDU 31008 and the power storage device 31004 positioned within a common housing 31006, and cooled by a shared coolant system 31016 (e.g., with a single coolant loop 31018 to the common housing 31006). An example mobile application 31002 includes the PDU 31008 having cooled components in series with the power storage device 31004, including either the PDU 31008 components or the power storage device 31004 components being cooled first. An example mobile application 31002 includes the PDU 31008 and power storage device 30114 having a parallel cooling arrangement, for example with the coolant inlet 31018 divided inside the common housing 31006. The divided coolant inlet 31018 may be recombined within the common housing 31006 to provide a single outlet, or provided at separate outlets (not shown). An example PDU 31008 includes a laminated board thermally coupled to the coolant inlet 31018 and to selected components of the PDU 31008 (e.g., reference FIGS. 13-17).

An example PDU 31008 includes a contactor 31010, which may be a breaker/relay having a physical response portion (e.g., opening in response to a Lorentz force on the contactor at high current values) and a controlled response portion (e.g., an actuator configured to controllably open the contactor in response to a command from a controller). Any aspects, features, components, and/or operations of a breaker/relay as set forth throughout the present disclosure may be included on the contactor 31010. The PDU 31008 (and contactor 31010) is electrically interposed between the electrical load 31012 and the power storage device 31004, and further between the power storage device 31004 and an electrical load output port 31020 mounted to the housing 31006. Accordingly, the PDU 31008 is capable to prevent battery voltage from being present on the electrical load output port 31020, for example if a connector to the electrical load output port 31020 is disconnected (intentionally such as in a service event, or accidentally).

Numerous features set forth throughout the present disclosure enhance the ability to provide the PDU in a common housing relative to previously known mobile applications, including aspects to reduce the size and/or number of interfaces of PDU components, to improve efficiency of components (and therefore heat generation), to allow for both physical response and controlled response operations to high current events without requiring a fuse withing the common housing, to allow for the containment of a fuse within a common housing 31008 without excessive cost or inconvenience (e.g., allowing for an over-sized fuse while still providing over-current protection, and/or determining a fuse life to allow for a scheduled maintenance rather than an unexpected fuse failure event), and/or to recover from a physical response operation (e.g., with a breaker/relay) without requiring access to the housing (where recovery can be a full operational recovery, an emergency operation allowing for controlled closure of the contact, and/or a limp-home operation to get the mobile application to a service location and/or off of a roadway).

Referencing FIG. 311, an example controller 31102 for a mobile application includes a mobile application operating condition circuit 31104 that interprets an operating condition 31108 of a mobile application, a contactor threshold circuit 31106 that determines a contactor operating threshold value 31110 in response to the operating condition 31108, and a contactor command circuit 31112 that provides a contactor open command 31114 (e.g., to command the contactor to open, to close, or to remain in a present open or closed state) in response to a current value 31116 through the motive power circuit, and in response to the contactor operating threshold value 31110. The example controller 31102 is operable, in whole or part, as an aspect of any mobile application system as set forth throughout the present disclosure. An example mobile application includes the contactor as a breaker/relay device, including any one or more aspects of a breaker/relay device as set forth throughout the present disclosure. An example controller 31102 is in a mobile application having a contactor configured to provide a physical open response at a selected current value 31118 through the motive power circuit, where the contactor operating threshold value 31110 is lower than the selected current value 31118 (e.g., to protect the contactor, and/or to prevent a re-closing of the contactor after the physical open response). An example controller 31102 is in a mobile application having a fuse electrically coupled to the contactor in a series arrangement, and where the contactor operating threshold value 31110 is higher than a fuse current rating 31120 of the fuse (e.g., to enforce the fuse current rating, and/or to utilize the contactor as a back-up if the fuse does not operate properly).

Example and non-limiting operating conditions 31108 include: a limp-home operating condition (e.g., where the allowed current is set to a low value to provide some motive capability, and/or to a non-zero value where a shutdown of the system is otherwise indicated); a performance power operating condition (e.g., to raise or lower an allowed current rating based on a performance condition, such as a driver reward, a performance option, an operating mode configured for a performance rating, etc.); an emergency power operating condition (e.g., where a system condition, such as a user input or a vehicle controller command, has indicated that emergency power is to be made available, where emergency power may be non-zero power where zero power is indicated, and/or where a higher power rating where nominal power is otherwise indicated); a de-rated operating condition (e.g., due to a system failure, fault value, vehicle controller instruction, regulatory requirement, operation of a fleet or owner policy, etc.); a charging operating condition (e.g., to configure available current to the expected charging current, which may be higher or lower than motive power); a quick-charging operating condition (e.g., to configure available current to the expected quick-charging current, which may be higher or lower than motive power); an operator request condition (e.g., an operator input provided for power requests); an off nominal operating condition (e.g., any abnormal operating condition wherein power increase or decrease is indicated); an emergency shutdown command (e.g., where an interlock, vehicle controller command, or other input indicates a shutdown); a service event indicator (e.g., removing power during service, applying scheduled power during service, and/or providing a requested current availability in response to a service request such as a test procedure); a maintenance event indicator; an accident indicator (e.g., in response to a vehicle controller command, and/or in response to an accident indication separate from or in addition to a vehicle controller command); a vehicle controller request (e.g., a commanded current value); and a device protection request (e.g., de-rating to protect a device that may have a lower current capability due to a failure, fault, high temperature, or other condition).

Example and non-limiting operating conditions 31108 include a current value of the motive power circuit (e.g., adjusting the current threshold for response based on observed current values in the system, such as increasing or decreasing a limit in view of consistent high demand), a current-time value of the motive power circuit (e.g., utilizing one or more thresholds for current values, and time above those values, including a non-linear response such as counting high current values more quickly, and a combined response such as continuing to accumulate a count or index as higher current thresholds are exceeded); a power value of the motive power circuit (e.g., accumulating power throughput of the motive power circuit to determine the current threshold for response); and/or a voltage value of the motive power circuit (e.g., raising or lowering the current threshold for response based on the voltage in the motive power circuit, such as to account for a potential failure indication based on the voltage, and/or changes in the heat generation within the motive power circuit due to voltage changes). In certain embodiments, the operating conditions 31108 can include an accumulation of any of the foregoing (e.g., counting events, time values, weighted values, integrated values, and/or creating an index based on accumulated values, where the accumulation can be increased, decreased, reset, and/or set to a selected value based on the response of the system), and/or a combination of any two or more of the foregoing (e.g., operating in parallel and using a lowest indicated current threshold, highest indicated current threshold, weighted or averaged current threshold, and/or combined into an index or the like).

An example controller 31102 is in a mobile application having a fuse electrically coupled to the contactor in a series arrangement, and where the contactor operating threshold value 31110 is lower than a fuse current rating 31120 of the fuse (e.g., to enforce a current rating with an over-sized fuse, to allow for a recoverable condition after the over-current event, and/or to utilize the fuse as a back-up if contactor does not operate properly).

An example contactor may be a solid state switch, and the mobile application may further include a physical contactor coupled to the solid state switch. For example the solid state switch may be operated as a primary contacting device (e.g., closing last, and opening first), with the physical contactor utilized as a backup for the solid state switch, and/or to prevent leakage current through the solid state switch.

Referencing FIG. 312, an example procedure for operating a contactor, including adjusting a contactor opening threshold value in response to operating conditions of the mobile application, is depicted. The example procedure includes an operation 31202 to interpret an operating condition of a mobile application having a motive power circuit, an operation 31204 to determine a contactor opening threshold value in response to the operating condition, and an operation 31206 to operate a contactor between an open or closed position in response to a current value of the motive power circuit, and the contactor opening threshold value.

Referencing FIG. 313, an example controller 31102 for a mobile application includes a mobile application operating condition circuit 31104 that interprets a time-current value 31302 corresponding to a motive power load of the mobile application, a contactor threshold circuit 31106 that determines a contactor operating threshold value 31110 in response to the time-current value 31302, and a contactor command circuit 31112 that provides a contactor open command 31114 (e.g., to command the contactor to open, to close, or to remain in a present open or closed state) in response to a current value 31116 through the motive power circuit, and in response to the contactor operating threshold value 31110. The example controller 31102 is operable, in whole or part, as an aspect of any mobile application system as set forth throughout the present disclosure. An example mobile application includes the contactor as a breaker/relay device, including any one or more aspects of a breaker/relay device as set forth throughout the present disclosure. An example controller 31102 is in a mobile application having a contactor configured to provide a physical open response at a selected current value 31118 through the motive power circuit, where the contactor operating threshold value 31110 is lower than the selected current value 31118 (e.g., to protect the contactor, and/or to prevent a re-closing of the contactor after the physical open response). An example controller 31102 is in a mobile application having a fuse electrically coupled to the contactor in a series arrangement, and where the contactor operating threshold value 31110 is higher than a fuse current rating 31120 of the fuse (e.g., to enforce the fuse current rating, and/or to utilize the contactor as a back-up if the fuse does not operate properly). An example controller 31102 is in a mobile application having a fuse electrically coupled to the contactor in a series arrangement, and where the contactor operating threshold value 31110 is lower than a fuse current rating 31120 of the fuse (e.g., to enforce a current rating with an over-sized fuse, to allow for a recoverable condition after the over-current event, and/or to utilize the fuse as a back-up if contactor does not operate properly).

Example and non-limiting time-current values 31302 include: a time-current area above a current threshold value (e.g., time spent above a predetermined current value, or a current value threshold adjusted according to the present operating conditions of the mobile application); a time-current area above a current threshold trajectory (e.g., a progression of current values over time, which may be increasing, decreasing, or both, such as an expected current trajectory based on operating conditions, pre-determined trajectories based on observed component failures, or the like; and which may be scaled, offset, or adjusted based on the present operating conditions of the mobile application); a time-current rate of change value (e.g., based on a rate of change for the current expected for a properly operating system, to account for current overshoot in response to a sudden demand change, or the like); and/or a time-current second derivative value (e.g., based on a rate of change of the rate of change for a properly operating system, based on observed values for failed or suspect components, or the like).

In certain embodiments, the mobile application operating condition circuit 31104 further interprets an operating condition 31108 (e.g., reference FIG. 311) of the mobile application, where the contactor threshold circuit 31106 further adjusts the contactor opening threshold value 31110 in response to the operating condition 31108 of the mobile application. Example and non-limiting adjustments to the contactor opening threshold value 31110 are described in relation to FIG. 311, and similar considerations apply for the example controller 31102 of FIG. 313, with the change in the contactor opening threshold value 31110, which may be combined with, utilized in a max-wins or min-wins, provided as a weighted average, and/or utilized instead of the contactor opening threshold value 31110 determined based on the time-current value 31302. In certain embodiments, certain operating conditions 31108 may be utilized to replace the contactor opening threshold value 31110 (e.g., emergency shutdown, a service defined threshold, etc.) with an operating condition 31108 defined contactor opening threshold value 31110, while other operating conditions 31108 may be used to determine a contactor opening threshold value 31110 that is combined with, utilized in a max-wins or min-wins, provided as a weighted average, with an operating condition 31108 determine in response to the time-current value 31302.

An example contactor may be a solid state switch, and the mobile application may further include a physical contactor coupled to the solid state switch. For example the solid state switch may be operated as a primary contacting device (e.g., closing last, and opening first), with the physical contactor utilized as a backup for the solid state switch, and/or to prevent leakage current through the solid state switch.

Referencing FIG. 314, an example procedure for operating a contactor, including adjusting a contactor opening threshold value in response to a time-current value of mobile power circuit of the mobile application, is depicted. The example procedure includes an operation 31402 to interpret a time-current value of the mobile power circuit, an operation 31204 to determine a contactor opening threshold value in response to the time-current value, and an operation 31206 to operate a contactor between an open or closed position in response to a current value of the motive power circuit, and the contactor opening threshold value.

Referencing FIG. 315, an example controller 31102 for a mobile application includes a mobile application operating condition circuit 31104 that interprets an electrical condition 31502 of a motive power circuit, and/or an operator input value 31504, a contactor threshold circuit 31106 that determines a contactor operating threshold value 31110 in response to the electrical condition 31502 and/or the operator input value 31504, and a contactor command circuit 31112 that provides a contactor open command 31114 (e.g., to command the contactor to open, to close, or to remain in a present open or closed state) in response to a current value

31116 through the motive power circuit, and in response to the contactor operating threshold value 31110. The example controller 31102 is operable, in whole or part, as an aspect of any mobile application system as set forth throughout the present disclosure. An example mobile application includes the contactor as a breaker/relay device, including any one or more aspects of a breaker/relay device as set forth throughout the present disclosure. An example controller 31102 is in a mobile application having a contactor configured to provide a physical open response at a selected current value 31118 through the motive power circuit, where the contactor operating threshold value 31110 is lower than the selected current value 31118 (e.g., to protect the contactor, and/or to prevent a re-closing of the contactor after the physical open response). An example controller 31102 is in a mobile application having a fuse electrically coupled to the contactor in a series arrangement, and where the contactor operating threshold value 31110 is higher than a fuse current rating 31120 of the fuse (e.g., to enforce the fuse current rating, and/or to utilize the contactor as a back-up if the fuse does not operate properly). An example controller 31102 is in a mobile application having a fuse electrically coupled to the contactor in a series arrangement, and where the contactor operating threshold value 31110 is lower than a fuse current rating 31120 of the fuse (e.g., to enforce a current rating with an over-sized fuse, to allow for a recoverable condition after the over-current event, and/or to utilize the fuse as a back-up if contactor does not operate properly).

An example contactor may be a solid state switch, and the mobile application may further include a physical contactor coupled to the solid state switch. For example the solid state switch may be operated as a primary contacting device (e.g., closing last, and opening first), with the physical contactor utilized as a backup for the solid state switch, and/or to prevent leakage current through the solid state switch.

Example and non-limiting electrical condition(s) 31502 and/or operator input value(s) 31504 include one or more of: an operator torque request (e.g., an operator input that indicates a torque demand, and/or an electrical response consistent with a torque demand, where the current threshold may be increased or decreased to provide the desired response, protect the system, return to nominal operation, and/or implement an owner or regulatory policy); an operator power request (e.g., an operator input that indicates a power demand, and/or an electrical response consistent with a power demand, where the current threshold may be increased or decreased to provide the desired response, protect the system, return to nominal operation, and/or implement an owner or regulatory policy); an operator control input value (e.g., an accelerator pedal position, a brake pedal position, a cruise set point value, a repeated actuation of an input (e.g., indicating urgency, frustration, or a lack of operator attention), where the adjustment may be made to provide additional acceleration or braking power, to return to nominal operation, and/or to implement an owner or regulatory policy); a power throughput of the motive power circuit; a current throughput of the motive power circuit; and/or a vehicle result value of the motive application (e.g., vehicle speed drifting away from set point, failure or insufficient acceleration or braking relative to a desired condition, etc.). Example and non-limiting vehicle result values include a vehicle speed value, a load shaft speed value (e.g., a shaft within the driveline, a shaft associated with a vocational load, etc.), and/or a torque achieved value. Example and non-limiting operator control input values include one or more of a torque request value, a speed request value, a power request value, a performance state request value (e.g., high performance, sport performance, economy performance, etc.), and/or a set point adjustment value (e.g., a cruise control set point, a following distance set point, a shaft speed set point, etc.).

In certain embodiments, the mobile application operating condition circuit 31104 further interprets an operating condition 31108 (e.g., reference FIG. 311) of the mobile application, where the contactor threshold circuit 31106 further adjusts the contactor opening threshold value 31110 in response to the operating condition 31108 of the mobile application. Example and non-limiting adjustments to the contactor opening threshold value 31110 are described in relation to FIG. 311, and similar considerations apply for the example controller 31102 of FIG. 315, with the change in the contactor opening threshold value 31110, which may be combined with, utilized in a max-wins or min-wins, provided as a weighted average, and/or utilized instead of the contactor opening threshold value 31110 determined based on the electrical condition 31502 and/or the operator input value 31504. In certain embodiments, certain operating conditions 31108 may be utilized to replace the contactor opening threshold value 31110 (e.g., emergency shutdown, a service defined threshold, etc.) with an operating condition 31108 defined contactor opening threshold value 31110, while other operating conditions 31108 may be used to determine a contactor opening threshold value 31110 that is combined with, utilized in a max-wins or min-wins, provided as a weighted average, with an operating condition 31108 determine in response to the electrical condition 31502 and/or the operator input value 31504.

Referencing FIG. 316, an example procedure for operating a contactor, including adjusting a contactor opening threshold value in response to an electrical condition of the motive power circuit and/or the operator input value, is depicted. The example procedure includes an operation 31602 to interpret an electrical condition of the motive power circuit and/or the operator input value, an operation 31604 to determine a contactor opening threshold value in response to the electrical condition of the motive power circuit and/or the operator input value, and an operation 31606 to operate a contactor between an open or closed position in response to a current value of the motive power circuit, and the contactor opening threshold value.

Referencing FIG. 317, an example controller 31702 for providing a contactor operating threshold value 31704 in response to a condition of a contactor of the mobile application is depicted. The example controller 31702 is operable, in whole or part, as an aspect of any mobile application system as set forth throughout the present disclosure. In certain embodiments, the contactor operating threshold value 31704 may be provided as in input to another controller managing the contactor opening operations, such as controller 31102 (reference FIG. 311). In certain embodiments, the contactor wear condition 31706 may be provided to another controller managing the contactor opening operations, such as controller 31102 (reference FIG. 311), for example as an operating condition 31108. An example mobile application includes the contactor as a breaker/relay device, including any one or more aspects of a breaker/relay device as set forth throughout the present disclosure. An example controller 31702 is in a mobile application having a contactor configured to provide a physical open response at a selected current value 31118 through the motive power circuit, where the contactor operating threshold value 31704 is lower than the selected current value 31118 (e.g., to protect the contactor, and/or to prevent a re-closing of the contactor after the physical open response). An example controller 31702 is in a mobile application having a fuse electrically coupled to the contactor in a series arrangement, and where the contactor operating threshold value 31704 is higher than a fuse current rating 31120 of the fuse (e.g., to enforce the fuse current rating, and/or to utilize the contactor as a back-up if the fuse does not operate properly). An example controller 31702 is in a mobile application having a fuse electrically coupled to the contactor in a series arrangement, and where the contactor operating threshold value 31704 is lower than a fuse current rating 31120 of the fuse (e.g., to enforce a current rating with an over-sized fuse, to allow for a recoverable condition after the over-current event, and/or to utilize the fuse as a back-up if contactor does not operate properly).

An example controller 31702 contactor monitoring circuit 31708 that interprets a contactor wear parameter 31710 for the contactor, and a contactor condition circuit 31712 that determines a contactor wear condition 31706 in response to the contactor wear parameter 31710. The example controller 31702 includes a contactor threshold circuit 31714 that adjusts a contactor opening threshold value 31704 in response to the contactor wear condition 31706. An example controller 31702 further includes a contactor command circuit 31716 the provides a contactor open command 31718 in response to the contactor opening threshold value 31704 (and/or the motive power current 31116), where the contactor is responsive to the contactor open command 31718.

An example contactor wear parameter 31710 includes a parameter representative of a contactor opening event under load (e.g., an opening of the contactor occurs when a threshold current value and/or threshold power throughput value is present on the motive power circuit at the time of the opening). In certain embodiments, the contactor wear parameter 31710 further includes a parameter representative of a severity of the contactor opening event under load (e.g., a value responsive to the current and/or power on the motive power circuit at the time of the opening, which may be a non-linear value, a number of values associated with thresholds for the current and/or the power, a function based on the current and/or the power, a lookup table value based on the current and/or the power, or the like). In certain embodiments, the contactor wear parameter 31710 further includes a parameter representative of a contactor re-closing event related to the contactor opening event under load (e.g., based on an actuator position value associated with a moveable contact, a current or voltage trajectory across the contactor measured following the opening event, or the like).

In certain embodiments, the contactor wear parameter 31710 includes one or more parameters such as: contactor opening events (e.g., accumulating normal usage); contactor closing events (e.g., accumulating normal usage); contactor power throughput (e.g., integrated over time, and/or a weighted accumulation based on power thresholds, a power function, or the like); contactor current throughput (e.g., integrated over time, and/or a weighted accumulation based on current thresholds, a current function, or the like); contactor circuit voltage values (e.g., based on the voltage level in the motive power circuit at a selected position, such as battery high voltage); a contact temperature value; and/or a contactor feedback value (e.g., a determined resistance or impedance value for the contactor, a shift in contactor actuator position at the closed position, contactor response time to perform an open or close operation, etc.). In certain embodiments, the contactor condition circuit 31712 accumulates one or more contributions from the contactor wear parameter(s) 31710 to determine the contactor wear condition 31706, for example comparing the accumulated contributions to individual thresholds for each wear parameter, and/or into a combined value or index for comparison to one or more thresholds. In certain embodiments, wear parameters are utilized in combination—for example adjusting a severity of an event based on the voltage, current, power, and/or temperature related to the contactor at the time of the event. In certain embodiments, a wear parameter 31710 may be determinative of the contactor wear condition—for example a particularly severe opening and/or re-closing event, and inability of the contactor to actuate following the event, or the like.

An example contactor threshold circuit 31714 may increase the contactor opening threshold value 31704 and/or lower the contactor opening threshold value 31704 in response to the contactor wear condition 31706 indicating that the contactor is worn, aged, damaged, or failed. For example, the contactor opening threshold value 31704 may be raised to protect the contactor from further opening events under load (e.g., transitioning primary circuit protection to another contactor in the system, or to a fuse), to provide for emergency operation, and/or to raise the threshold to a mission-enabling value where the threshold would otherwise be set unacceptably low based on the condition of the contactor. In another example, the contactor opening threshold value 31704 may be lowered to protect the contactor from excessive high-load opening events, and/or to reflect a reduced capability of the degraded contactor (e.g., thermal generation at high current values, reduced opening speed, etc.).

An example controller 31702 further includes a contactor management circuit 31722 that provides a contactor wear indication 31720 in response to the contactor wear condition 31706. Example and non-limiting contactor wear indications 31720 include indications such as: an alert provided to an external computing device (e.g., a device associated with an operator, owner, service manager, fleet manager, manufacturer, warranty implementer, etc.), a notification provided to an external computing device (e.g., an alert may be marked as urgent and/or use a first communication method such as text or intrusive notification, where a notification may be an unmarked message, and/or passive information available for access via an application, service tool, web portal, status page, or the like); a fault code value (e.g., provided to a vehicle controller, CAN, etc., which may light an operator visible lamp, and/or which may be available for querying from an OBD device, service tool, or the like); a fault code increment or decrement value (e.g., providing a progression toward setting or clearing a fault value related to the contactor); a service request value (e.g., notifying a service operator, owner, fleet operator, and/or service location that a service and/or check of the contactor is indicate); and/or a contactor life value (e.g., a description of contactor life remaining, in terms of operating hours, calendar time, or the like).

Referencing FIG. 318, an example procedure for providing a contactor operating threshold value in response to a condition of a contactor of the mobile application is depicted. The example procedure includes an operation 31802 to interpret a contactor wear parameter for a contactor of a motive power circuit of a mobile application, an operation 31804 to determine a contactor wear condition in response to the contactor wear parameter, and an operation 31806 to adjust a contactor opening threshold value in response to the contactor wear condition. In certain embodiments, the procedure includes an operation 31808 to operate a contactor of a motive power circuit in response to a current value through the motive power circuit and the contactor operating threshold value. In certain embodiments, the operation 31804 to determine the contactor wear condition includes determining the contactor wear parameter is representative of a contactor opening event under load, and/or further determining the contactor wear parameter is representative of a contactor re-closing event related to the contactor opening event. In certain embodiments, the procedure includes an operation 31810 to provide a wear indication, for example to an external computing device, in response to the contactor wear condition.

Referencing FIG. 319, an example mobile application 31902 includes a motive power circuit, including a power storage device 31904, an electrical load 31905, where the power storage device 31904 and electrical load 31905 are selectively electrically coupled through a power bus 31906. The example mobile application 31902 further includes a pyro fuse 31908 positioned on the power bus 31906, and a breaker/relay 31910 positioned on the power bus 31906 in series with the pyro fuse 31908. The breaker/relay 31910 may be a breaker/relay having a physical response portion (e.g., opening in response to a Lorentz force on the contactor at high current values) and a controlled response portion (e.g., an actuator configured to controllably open the contactor in response to a command from a controller). Any aspects, features, components, and/or operations of a breaker/relay as set forth throughout the present disclosure may be included on the breaker/relay 31910.

The example mobile application 31902 includes a circuit protection controller 31907 that commands the first breaker/relay 31910 to open (e.g., command an associated contactor to open) at a first current threshold value, and commands the pyro fuse 31908 to open (or activate) at a second current threshold value. A further example includes the first threshold current value being lower than the second current threshold value (e.g., utilizing the breaker/relay for primary protection, which may allow for a recoverable condition and/or simplify a service event by avoiding replacement of the pyro fuse). In certain embodiments, for example where both the first current threshold value and the second current threshold value are exceeded (e.g., a very sudden rise in current), the circuit protection controller 31907 may command only the pyro fuse 31908 to open (e.g., to protect the breaker/relay against a current value that may exceed it's opening rating), and/or command both the pyro fuse 31908 and breaker/relay 31910 to open (e.g., to ensure a successful break of the motive power circuit, and/or to simplify implementation of the circuit protection controller 31907 response). In certain embodiments, the breaker/relay 31910 includes a physical response opening at a selected current value. The second current threshold value (associated with the pyro fuse 31908) may be above the selected current value (e.g., where the physical response opening of the breaker/relay 31910 is expected to activate before the pyro fuse 31908) or below the selected current value (e.g., where the pyro fuse 31908 is expected to activate before the physical response opening of the breaker/relay 31910 occurs). In certain embodiments, the second current threshold value is set above the selected current value to allow the breaker/relay 31910 to provide physical opening protection, and preserve the option to make the circuit opening recoverable. In certain embodiments, the second current threshold value is set below the selected current value to provide for a more certain primary protection response (e.g., not based upon a designed physical response, which may have some variability due to manufacturing tolerances, and/or aging of components such as contactor faces, the biasing member, or other components of the breaker/relay 31910), while still maintaining final physical response in the system (e.g., if a controller has failed and is unable to command the pyro fuse 31908 to activate).

Referencing FIG. 320, an example mobile application 32002, similar to the example mobile application 31902, is depicted. The example mobile application 32002 includes a second power bus path 32004, with the first power bus path 31906 configured as a parallel electrical path to the second power bus path 32004, where the parallel path encompasses at least the circuit protection elements 31908, 31910, 32006. In the example of FIG. 320, the circuit protection elements 31908, 31910, 32006 are positioned on a high side of the circuits 31906, 32004, but the circuit protection elements 31908, 31910, 32006 may alternatively be positioned on a low side of the circuits 31906, 32004. Additionally, the circuits 31906, 32004 are depicted with a shared ground return, although the circuits 31906, 32004 may have separate ground portions. The second power bus path 31910 includes a second breaker/relay 32006 positioned thereon. In certain embodiments, a current rating of the first power bus path 31906 exceeds a motive power current rating of the mobile application (e.g., where the first power bus path 31906 is sufficient to provide motive power for the mobile application 32002). In certain embodiments, a combined current rating of the first power bus path 31906 and the second power bus path 32004 exceeds a quick charge current rating of the mobile application 32002 (e.g., with the second power bus path 32004 utilized to support quick charge operations).

In certain embodiments, a current rating of the first power bus path 31906 is below a motive power current rating of the mobile application, and a combined rating of the first power bus path 31906 and second power bus path 32004 exceeds the motive power current rating of the mobile application. In a further example, a current rating of the second power bus path 32004 may individually exceed the motive power current rating of the mobile application, or be below the motive power current rating of the mobile application (e.g., where the second power bus path 32004 is implemented to provide full motive power).

In certain embodiments, a current rating of the first power bus path 31906 individually, and/or in combination with the second power bus path 32004 exceeds a quick charge current rating of the mobile application 32002. In a further example, a current rating of the second power path 32004 exceeds a limp-home current rating of the mobile application (e.g., where the first power bus path 31906 is sufficient to provide full motive support for the mobile application 32002, and the second power bus path 32004 serves to aid quick charge operations, and/or to provide limp-home capability, such as when the pyro fuse 31908 is activated). In certain embodiments, the second power bus path 32004 includes a resistive load 32012 positioned thereon (e.g., to limit available current through the second power bus path 32004 and/or through the second breaker/relay, and/or to utilize the second power bus path 32004 as a pre-charge circuit for the mobile application 32002, limiting in-rush current when the second power bus path 32004 is utilized).

Referencing FIG. 321, an example power electronic assembly for a mobile application is depicted. The example of FIG. 321 is a schematic depiction, and provides capability for high capacity charging of a high voltage battery, low capacity charging of the high voltage battery, and selective charging of a low voltage battery. The example of FIG. 321 includes a first power electronics component 32102 that selectively couples to high source 32104 (e.g., a high capacity charging device) on a first side, and selectively couples to the high voltage battery 32106 on a second side. The example of FIG. 321 further includes a second power electronics component 32108 selectively coupled to either a low load 32110 or a low voltage battery 32112 on a first side, and to the high voltage battery 32106 on a second side. Example switching arrangement and details that may be utilized to implement the selection operations are depicted, for example, in FIGS. 255 and 267 of the present disclosure.

The example of FIG. 321 further includes a controller 32114 having a number of circuits thereon configured to functionally execute operations of the controller 32114. The example controller 32114 includes an operating mode circuit that determines a discharge operating mode for the mobile application (e.g., high capacity charging, high capacity discharging, charging a low voltage battery, powering a low load, etc.), and a power electronics configuration circuit that provides a switch state value for the first power electronics component and the second power electronics component in response to the discharge operating mode. The first power electronics component 32102 and second power electronics component 32108 are responsive to the switch state value to couple selected ones of the high source 32104, low load 32110, and/or low voltage battery 32112 to the high voltage battery 32106 in a DC/DC converter arrangement. In certain embodiments, the arrangement of FIG. 321 allows for simultaneous high capacity charging of the high voltage battery, and either powering of a low load 32110 or charging of the low voltage battery 32112. In certain embodiments, for example where a voltage of the low voltage battery 32112 and the low load are compatible, the arrangement of FIG. 321 allows for simultaneous high capacity charging of the high voltage battery, and powering of a low load 32110 and charging of the low voltage battery 32112. In certain embodiments, the low voltage battery 32112 and low load 32110 interface to separate winding interfaces in the second power electronics component 32108, and may both be coupled to the high voltage battery 32106 simultaneously, even where the voltages are not compatible. In the example of FIG. 321, the first electronics component 32102 and the second power electronics component 32108 have separate magnetic components 32116. In certain embodiments, for example when the low voltage battery 32112 does not require charging, the arrangement of FIG. 321 allows for high capacity charging of the high voltage battery 32106, and powering of the controller 32114 and switching operations of the electrical components 32102, 32108 from the low voltage battery 32112, and further allows powering of the low load 32110 from the high voltage battery 32106 or from the low voltage battery 32112 (e.g., if the voltages are compatible, and/or are coupled with separate windings, and if the power capacity of the low voltage battery 32112 and requirements of the low load 32110 are appropriate).

An example arrangement includes the first power electronics component 32102 having a higher power rating than the second power electronics component 32108. For example, the first power electronics component 32102 may have a power rating such as 5.5 kW, 8 kW, or 11 kW. In another example, the second power electronics component 32108 may have a power rating such as 3 kW or 5.5 kW. The example ratings are non-limiting, and the charging and load specifications of the mobile application may be supported by other ratings of the power electronics components 32102, 32108.

In certain embodiments, the high source may include one or more of a motive power load for the mobile application (e.g., to provide regenerative braking during motive operations), a grid source and/or charging station source, or a vocational load for the mobile application (e.g., to provide regenerative recovery of working loads, such as lowering heavy objects, releasing stored pressure, and/or recovering kinetic energy such as from spinning components or loads). In certain embodiments, the first power electronics component 32102 may be selectively couplable to a high load (not shown) on the first side, which may be a same coupling as to the high source 32104 (e.g., where the high source 32104 may operate as a source or load). Example and non-limiting high loads include a motive power load (e.g. to provide motive power to the mobile application), a grid load (e.g., providing power to a grid), and/or a vocational load for the mobile application. It will be understood that, in certain embodiments, the configuration of FIG. 321 provides primarily for charging operations and DC/DC conversion operations, and separate electronics may be provided for interfacing with certain loads, such as a motive power load and/or a vocational load. However, the configuration of FIG. 321 is capable of providing or supporting such loads, and/or accepting power from such loads in a regenerative capacity, which may require, for example, additional interfaces to the high load (e.g., rectification, AC inversion, voltage conversion, and the like). An example first power electronics component 32102 includes a power rating sufficient to provide rated power to a motive power motor for the mobile application. An example second power electronics component 32108 includes a power rating sufficient to support a consumer power interface for the mobile application (e.g., an available power outlet or other device), and/or to support an electrical accessory for the mobile application.

In certain embodiments, the second power electronics component 32112 is further selectively couplable to the high source 32104 on the first side (not shown). The selective coupling of the second power electronics component 32108 to the high source 32104 may be provided by a separate winding utilizing the same magnetic components 32116 that are utilized for the low load 32110 and/or low voltage battery 32112 coupling. In certain embodiments, the additional winding of the second power electronics component 32108 is configured for a voltage provided at the high source 32104, and/or particularly for a voltage provided at the high source 32104 during operations when the second power electronics component 32108 is also utilized for high capacity charging. For example, the first power electronics component 32102 may have a first capacity rating such as 5.5 kW or 8 kW, and the second power electronics component 32108 may have a second capacity rating such as 3 kW or 5.5 kW. In the examples, the additional of the second electronics component 32108 to the high capacity charging can provide a total high capacity charging of 8+kW, 11 kW, or higher, and therefore increase the charging speed as well as increase compatibility of the arrangement with a wider array of chargers and charging modes. In one example, an 11 kW charger may have a known voltage rating, and accordingly the additional winding of the second power electronics component 32108 may be configured for the known voltage rating of the 11 kW charger (e.g., with a coupling that is configured to be close to a resonant coupling at the known voltage rating), as the second power electronics component 32108 will only be utilized when charging from the 11 kW (or other charging capacity enabled only with the utilization of the second power electronics component 32108). In certain embodiments, the low voltage battery 32112 and low load 32110 are de-coupled from the second power electronics component 32108 when the second power electronics component 32108 is supporting high capacity charging.

In certain embodiments, the first power electronics component 32112 may be configured with a winding for interfacing with the high source that is configured for a lower capacity charger consistent with the power rating of the first power electronics component 32102, configured for the higher capacity charger (e.g., providing a resonant frequency at a voltage close to a voltage of the higher capacity charger, to maximize charging efficiency at the highest rate charging), or configured for an intermediate voltage value between those voltage values. Additionally or alternatively, the first power electronics component 32102 may have more than one winding (not shown, but see, e.g., FIG. 214 DC-DC coupling 21408 for an example configuration) for coupling with the high source 32104, where the controller 32114 provides appropriate switching commands to the first power electronics component 32102 to couple the appropriate winding to the high source 32104 based on the high source 32104 voltage and/or charging mode. Resonant frequency selections for the first power electronics component 32102 and second power electronics component 32108 may be determined based on a most likely voltage, a most common voltage, a highest voltage value, and/or voltage corresponding to a highest current value (e.g., a high capacity charger may have differing voltages at a similar power throughput, for example where a first high capacity charger is a 3-phase, and a second high capacity charger is a single phase). In certain embodiments, the high source 32104 may be a quick charging source, or a high power charging source.

Example and non-limiting voltage values for the low voltage battery 32112 include nominal voltages such as 12V, 24V, 42V, and 48V. For example, where a nominal voltage is 12V, the low voltage battery 32112 may operate in a range of about 9V to about 14V. Example and non-limiting voltage values for the high voltage battery 32106 include nominal voltages such as: 240V, 400V, 480V, 600V, 800V, 1000V, and 1200V. The high voltage battery 32106 may similarly operate within a range around the nominal voltage, such as between about 225V to 270V for a nominal voltage of 240V.

In certain embodiments, the first power electronic component 32106 is capable to operate bi-directionally, for example passing power between the high voltage battery 32106 and the high source 32104. In certain embodiments, the second power electronic component 32108 is capable to operate bi-directionally, for example passing power between the high voltage battery 32106 and one or more of the low voltage battery 32112, the low load 32110, and/or the high source 32104. In certain embodiments, the second power electronic component 32108 is capable to pass power between the low voltage battery 32112 and the low load 32110. In certain embodiments, a low source (not shown) may be present, for example selectively couplable to the second electronic component 32108 on the first side. In certain embodiments, the low source may include one or more of a trickle charger, a consumer charger, an electrical accessory capable of providing regenerative power, and/or a consumer device capable of providing regenerative power.

Referencing FIG. 322, an example procedure for configuring charging power electronics for a mobile application is depicted. The example procedure includes an operation 32202 to determine whether the mobile application is operating in a first operating condition comprising a motive power condition or a second operating condition comprising a charging power condition. The procedure includes an operation 32204 to provide charging power to a high voltage battery through a first power electronics component from a high power source in response to the second operating condition. The procedure includes an operation 32206 to provide motive power to a motive power motor from the high voltage battery in response to the first operating condition. Operation 32206 may include providing the motive power through the first power electronics component, or through a separate power electronics component. The example procedure further includes an operation 32208 to selectively providing low voltage charging power from the high voltage battery to a low voltage battery through a second power electronics component in response to a state of charge of the low voltage battery, which may be performed during either the first operating condition or the second operating condition. The example procedure further includes an operation 32210 to determine whether the mobile application is operating in a third operating condition such as providing power to a grid and/or vocational load, and to provide power for the grid and/or vocational load from the high voltage battery to a high load in response to the third operating condition. The example procedure further includes an operation 32212 to provide at least a portion of the charging power to the high voltage battery, or to provide at least a portion of the grid and/or vocation load from the high voltage battery, through the second power electronics component.

Referencing FIG. 323, an example procedure to determine and/or update a wear condition of a contactor is depicted. The example procedure includes an operation 32302 to interpret a contactor open event and a contactor load value for a contactor positioned on a motive power circuit for a mobile application, an operation 32304 to determine that a contactor opening event under load has occurred in response to the contactor open event and the contactor load value, and an operation 32306 to update a contactor wear condition in response to the contactor opening event under load.

Example operations 32306 to update the contactor wear condition include accumulating a number of the contactor events under load, and/or determining a severity of the contactor opening event under load in response to the contactor load value, and accumulating at a rate determined in response to the severity (e.g., accumulating the wear condition faster in response to a severe opening event). Example and non-limiting contactor load values include parameter such as: a contactor current flow value, a contactor voltage value, a contactor power throughput value, a contactor exit velocity value (e.g., determined in response to a voltage trajectory upon opening, a determination of the Lorentz force applied to the contactor, a determination of the contactor moving mass, and/or a determination of the biasing force applied to keep the contactor closed), and/or a contactor temperature value.

The example procedure further includes an operation 32308 to determine that a contactor re-closing event related to the contactor opening event has occurred, and updating the contactor wear condition further in response to the contactor re-closing event. An example operation 32308 further includes determining a severity of the contactor re-closing event, and updating the contactor wear condition further in response to the severity (e.g., determining that the wear condition has progressed further toward a worn, aged, or damaged condition for a severe re-closing event compared to a moderate re-closing event). Example and non-limiting operations to determine a severity of the contactor re-closing event include one or more operations such as: monitoring at least one of a voltage value or a current value for the contactor (e.g., observing the re-closing as a feedback parameter); determining a contactor exit velocity value for the contactor opening event (e.g., modeling the contactor trajectory based on the exit velocity, and/or comparing to calibrated values, to determine whether a contactor re-closing is likely, and/or a closing force experienced); determining a contactor opening moving contact trajectory; interpreting a contactor opening command value (e.g., determining if a contactor opening command was given before the physical opening occurred, and/or how long before the physical opening occurred); and interpreting an actuator response value to a contactor opening command value (e.g., determining whether the actuator responded to the contactor opening command value, and/or how much actuator delay may have occurred after the physical opening occurred). In certain embodiments, determinations of the severity may be based upon modeling of parameters, comparison of parameters to calibrated conditions, and/or determinations based upon sensed values (e.g., actuator position of the contactor, voltage values across the contactor before, during, and after the event, observed resistance and/or impedance values of the contactor before and after the event, etc.).

An example procedure includes an operation 32310 to inject a current across the contactor, and to determine at least one of the severity of the contactor reclosing event, or determining the contactor wear condition, in response to the injected current (e.g., observing a failure of the contactor to open or close, observing a resistance value for the contactor, and/or observing an impedance value for the contactor).

An example procedure includes an operation 32312 to determine an arc quenching effectiveness value during the opening event, and updating the contactor wear condition further in response to the arc quenching effectiveness value. Example operations 32312 includes performing operations such as: comparing a contactor voltage signature to at least one contactor voltage profile (e.g., a stored profile or profiles associated with a range of contactor wear condition values); comparing a contactor current signature to at least one contactor current profile; and injecting a current across the contactor, and determining at least one of the arc quenching effectiveness value or the contactor wear condition in response to the injected current.

An example procedure further includes an operation 32314 to adjust an operation of the contactor in response to the contactor wear condition. Example operations 32314 include operations such as: setting a contactor fault value; providing one of an alert or a notification to an external computing device in response to the contactor wear condition; raising or lowering a contactor operating threshold value (e.g., a current value at which the contactor is commanded open); incrementing or decrementing a contactor fault value; and/or at least partially bypassing the contactor with an available parallel circuit (e.g., where a second power path is available in parallel with a first power path having the contactor, as set forth in various embodiments herein).

An example operation 32314 further includes utilizing a contactor back-up mode operation (e.g., configured operations to be utilized in response to the contactor being worn, failed, damaged, suspect, etc.). Example and non-limiting operations to utilize a contactor back-up mode operation include one or more operations such as: operating the motive power circuit in at least one of a de-rated operating mode or a limp-home operating mode; performing open and close operations for the motive power circuit with a solid state switch positioned on the motive power circuit (and/or potentially allowing leakage current conditions to occur); performing open and close operations for the motive power circuit with a second contactor (e.g., a contactor in parallel with the contactor, and/or a contactor in series with the contactor—such as on a high side or low side opposite the contactor—where the contactor is failed closed and/or is capable to close); closing the motive power circuit by controlling a bypass circuit associated with the contactor (e.g., a pre-charge circuit or other available bypass circuit); and/or adjusting a second contactor opening threshold value for a second contactor in response to the back-up mode operation (e.g., to enforce a primary maximum current value with the second contactor, to enforce a de-rated or limp-home maximum current value, or the like).

An example operation 32306 includes utilizing a feedback value indicating the contactor wear condition, and updating the contactor wear condition in response to the feedback value. Example and non-limiting feedback values include values such as: an indication that the contactor is failed in one of a closed or open position, a service value provided by a service tool (e.g., a technician installs a known contactor and updates the contactor wear condition, tests or inspects the contactor and updates the contactor wear condition, and/or a service tool performs an active test on the contactor and updates the wear condition), and/or a resistance value or impedance value (e.g., provided by an operation to inject a current across the contactor).

Referencing FIG. 324, an example apparatus to determine or update a contactor wear condition is schematically depicted. The example apparatus includes a controller 32402 having a number of circuits configured to functionally execute operations of the controller 32402. The example controller 32402 includes a contactor monitoring circuit 32404 structured to interpret a contactor open event 32406 and a contactor load value 32408 for a contactor positioned on a motive power circuit for a mobile application. The example controller 32402 further includes a contactor damage assessment circuit 32410 structured to determine that a contactor opening event under load 32412 has occurred in response to the contactor open event 32406 and the contactor load value 32408. The example controller 32402 further includes a contactor condition circuit 32414 structured to update a contactor wear condition 32416 in response to the contactor opening event under load 32412.

An example contactor damage assessment circuit 32410 further determines a severity 32418 of the contactor opening event under load 32412 in response to the contactor load value 32408, and wherein the contactor condition circuit 32414 is further structured to update the contactor wear condition 32416 further in response to the severity 32418. An example contactor damage assessment circuit 32410 determines that a contactor re-closing event 32420 related to the contactor opening event has occurred, and wherein the contactor condition circuit 32414 is further structured to update the contactor wear condition 32416 further in response to the contactor re-closing event 32420. An example contactor damage assessment circuit 32410 further determines a severity 32422 of the contactor re-closing event 32420, and wherein the contactor condition circuit 32414 is further structured to update the contactor wear condition 32416 further in response to the severity 32422 of the contactor re-closing event 32420.

An example contactor monitoring circuit 32404 further determines at least one re-closing characterization parameter 32424 such as: a monitored voltage value or a monitored current value for the contactor; a contactor exit velocity for the contactor opening event; a contactor opening moving contact trajectory; a contactor opening command value; or an actuator response value to a contactor opening command value. An example contactor damage assessment circuit 32410 further determines the severity 32422 of the contactor re-closing event 32420 in response to the at least one re-closing characterization parameter 32424.

An example contactor monitoring circuit 32404 is further structured to inject a current across the contactor, and wherein the contactor condition circuit 32414 is further structured to update the contactor wear condition 32416 further in response to the injected current. An example contactor damage assessment circuit 32410 further determines at least one of a contactor resistance value or a contactor impedance value in response to the injected current, and the contactor condition circuit 32414 further updates the contactor wear condition 32416 further in response to the at least one of the contactor resistance value or the contactor impedance value.

An example controller 32404 includes a contactor command circuit 32426 that provides adjusted contactor operations 32428 in response to the updated contactor wear condition 32416.

Referencing FIG. 325, an example mobile application 32500 includes a motive power circuit having a power storage device 32502 and an electrical load 32504, where the power storage device 32502 and the electrical load 32504 are selectively electrically coupled through a power bus 32506. The example mobile application 32500 includes a power distribution unit (PDU) 32502 electrically interposed between the power storage device 32502 and the electrical load 32504, and a breaker/relay (not shown) positioned on the motive power circuit, on one of a high side or a low side of the power storage device 32502. The PDU 32508 may be positioned on a low side or a high side of the power storage device 32502. The breaker/relay may be a breaker/relay having a physical response portion (e.g., opening in response to a Lorentz force on the contactor at high current values) and a controlled response portion (e.g., an actuator configured to controllably open the contactor in response to a command from a controller). Any aspects, features, components, and/or operations of a breaker/relay as set forth throughout the present disclosure may be included on the breaker/relay. As described throughout the present disclosure, the example breaker/relay includes a current sensing device positioned on the power bus, wherein the current sensing device provides a contact current value comprising a current flow through the fixed contact of the breaker/relay. The mobile application 32500 includes a motive power controller 32510 configured to control power flow from the power storage device to the electrical load using the contact current value.

In certain embodiments, the breaker/relay and the current sensing device are mounted together in a housing. In certain embodiments, the breaker/relay, the current sensing device, and/or both breaker/relay and the current sensing device, are mounted within a housing of the PDU 32508.

In certain embodiments, the motive power controller 32510 is further configured to use the contact current value in a power diagnostic application. An example power diagnostic application includes determining a fault condition is present on the motive power circuit, and commanding the breaker/relay to an open condition where the movable contact is not electrically coupled to the fixed contact in response to the fault condition.

An example motive power controller 32510 controls one or more operations of the breaker/relay, including providing a normal open command (e.g., command the actuator to open the breaker/relay under nominal conditions), providing a high current open command (e.g., command the actuator to open at a threshold before the physical response operation is expected to occur, to avoid the physical response open and/or to minimize a possibility of a re-close event occurrence), and/or to adjust a physical opening current value (e.g., adjusting a biasing force of the breaker/relay in a closed position) of the breaker/relay.

An example motive application 32500 includes a fuse positioned on the motive power circuit in a series configuration with the breaker/relay. The fuse may be positioned within a housing of the PDU, and/or positioned in the housing of the PDU with the breaker/relay and the current sensing device. An example motive application 32500 having a fuse includes at least one of the high current open command for the breaker/relay being higher than a rated current of the fuse and/or a physical response opening current value of the breaker/relay being higher than the rated current of the fuse. An example motive application 32500 having a fuse includes a rated current of the fuse being higher than both of the high current open command for the breaker/relay or the physical response opening current value of the breaker/relay.

Referencing FIG. 326, an example breaker/relay 32600 is depicted schematically, which may be utilized in a mobile application, including without limitation any mobile application, systems, PDUs, and/or motive power circuits set forth in the present disclosure. Any aspects of a breaker/relay set forth in the present disclosure may additionally be included, or alternatively be included in place of one or more aspects of the example breaker/relay 32600. Without limitation to the present example, or to other aspects set forth in the present disclosure, aspects of the present example may be better understood with reference to FIGS. 2, 65-74, and 85-88, and the related descriptions.

The example breaker/relay 32600 includes a fixed contact 32602 electrically coupleable to a power bus for a mobile application, and a moveable contact 32604 selectively electrically coupled to the fixed contact 32602. The example breaker/relay 32600 includes an armature 32605 operationally coupled to the moveable contact, where the armature 32605 in a first position prevents electrical coupling between the moveable contact 32604 and the fixed contact 32602, and the armature 32605 in a second position allows electrical coupling between the moveable contact 32604 and the fixed contact 32602. The breaker/relay 32600 includes a first biasing member 32610 that biases the armature 32605 into one of the first position or the second position (e.g., providing the breaker/relay 32600 as a normally-open or normally-closed contact). The breaker/relay 32600 further includes a second biasing member 32612 that is compressed in an actuated position (e.g., while closed), providing a selected force that, for example, can be utilized to set a physical response current value for the breaker/relay 32600. The breaker/relay 32600 includes a standard on/off circuit having at least two states, where the standard on/off circuit 32606 in a first state provides an actuating signal, and wherein the standard on/off circuit 32606 is a second state prevents the actuating signal. The armature 32605 is responsive to the actuating signal—for example to allow the normally-open or normally-closed contact in response to the second state of the standard on/off circuit 32606, and to actuate the moveable contact to open or close the contact in response to the first state of the standard on/off circuit 32606. An example standard on/off circuit 32606, without limitation, is electrically coupled to a keyswitch circuit of the vehicle, and/or responsive to a keyswitch value of the vehicle.

An example breaker/relay 32600 further includes a current response circuit 32608 that determines a contact current value through the fixed contact 32602, and blocks the actuating signal of the standard on/off circuit 32606 in response to the current value indicating a high current value. For example, the standard on/off circuit 32606 may be indicating an "on" condition for the vehicle, and the armature 32605 has moved the normally-open contact to a closed position, thereby allowing power to flow in the power bus. In the example condition, where the current response circuit 32608 detects a high current value (e.g., greater than a high current open command), the current response circuit 32608 blocks the standard on/off circuit 32606 signal, and the armature 32605 allows the contact to return to the normally-open condition, opening the motive power circuit. An example breaker/relay 32600 further includes the current response circuit 32608 latching the blocking of the actuating signal of the standard on/off circuit 32606 (e.g., preventing the standard on/off circuit 32606 from immediately re-applying the "on" condition, where the current has dropped in the motive power circuit due to the open condition of the breaker/relay 32600 contact).

The example current response circuit 32608 stops the blocking of the standard on/off circuit 32606 actuating signal when specified conditions are met, and/or according to specified operations. For example, the current response circuit 32608 may stop the blocking by a control command (e.g., from a vehicle controller), and/or a service command indicating that a closing of the breaker/relay 32600 is allowed or desired. In certain embodiments, the current response circuit 32608 may receiving a control command and/or a service command to momentarily or briefly close the contact, and/or to collect diagnostic data (e.g., voltage values, current values, temperatures, or the like) during the closing, and/or to report the diagnostic data and/or diagnostic determinations made in response to the diagnostic data to a vehicle controller, service tool, or the like. In certain embodiments, the current response circuit 32608 may receiving a control command and/or a service command to provide an alternate closing arrangement, such as through an available resistive element (e.g., using a pre-charge circuit, a second power bus path, or other device) during the closing. The utilization of an alternate closing arrangement may provide for protection of components, and/or may improve diagnostic data collection (e.g., slowing dynamic effects and/or scaling values into a detectable range, and/or utilization of a voltage drop across a resistive element as a part of the diagnostic data.

Referencing FIG. 327, an example procedure includes an operation 32706 to detect a contactor current value for a contactor of a breaker/relay positioned in a motive power circuit of a mobile application, and an operation 32704 to control power flow through the motive power circuit in response to the contactor current value. The procedure may further include an operation 32702 to determine a target current value corresponding to an operator request value (e.g., a torque request, speed request, or the like) and/or in response to the operator request value (e.g., a processed request value including slew rate limitations, limit values, or other aspects that are responsive to both the operator request and the capabilities, dynamic response, or other aspects of the motive power circuit and/or associated components), and the operation 37204 may further include controlling the power flow through the motive power circuit in response to the target current value. An example procedure includes the operation 32706 to determine the contactor current value of the motive power circuit utilizing a current sensor positioned in a housing of the breaker/relay, and/or within a housing of a PDU including the breaker/relay.

Referencing FIG. 328, an example mobile application 32802 is schematically depicted. The example mobile application 32802 includes a number of loads 32804 and at least one power bus 32816. The number and type of loads 32804 may be any number and type of loads for a mobile application, including at least a motive power load, an accessory load, a vocational load, auxiliary loads, and/or any other type of load utilizing an electrical system of the mobile application 32802. The power busses 32816 may further be of any type and number, including busses 32816 with varying voltages or electrical characteristics, and/or busses 32816 arranged for convenient integration, and/or load balancing on the busses 32816. The example mobile application 32802 further includes at least two power distribution equipment device (PDEs) 32806, where each PDE 32806 is electrically interposed between one of the power buses 32816 and at least one of the loads 32804. The example of FIG. 328 depicts each PDE 32806 having a corresponding load 32804, although a given PDE 32806 may be associated with more than one load 32804. The arrangement depicted in FIG. 328 is a non-limiting example. The power busses 32816 are depicted with the PDEs 32806 positioned on a high side of the loads 32804, and the power busses 32816 in the example share a common ground 32822. However, a given PDE 32806 may be positioned on a low side of a given load 32804, and/or one or more busses 32816 may have a separate or isolated ground.

The example mobile application 32802 includes a PDE controller 32808 that is operationally coupled to each of the PDEs 32806, where each PDE 32806 includes at least a contactor, and a control input. Each PDE 32806 may additionally or alternatively include a sensor output interface, for example to communicate a contactor position, a current value at the PDE 32806, and/or a sensed value from any other sensor associated with the PDE 32806. One or more PDEs 32806 may additionally or alternatively include a fuse. The PDE controller 32808 is configured to provide a contactor command to the control input of each of the PDEs 32806, and further configured to receive a sensor signal from the sensor output interface of each PDE 32806 having a sensor output interface and at least one sensor associated therewith.

In the example of FIG. 328, the PDE controller 32808 is operatively coupled to each of the PDEs 32806 using multiplexing devices 32818, 32820. The first multiplexing device 32818, in the example, provides the sensed input values from each of the PDEs 32806 (e.g., along communication path A). The utilization of the multiplexing device 32818 allows the PDE controller 32808 to interface with all of the PDEs 32806 using a minimum of I/O capability—for example using just a communication link to the first multiplexing device 32818, which may be electrical and/or a communication protocol supported link, and which may consume 2 or 3 pins of a connector for the PDE controller 32808. The second multiplexing device 32820 provides contactor commands from the PDE controller 32808 to each of the PDEs 32806 (e.g., along communication path B), allowing for the PDE controller 32808 to interface commands to all of the PDEs 32806 using a minimum of I/O capability—again likely 2 or 3 pins of a connector of the PDE controller 32808. Additionally or alternatively, one or more, or all, of the PDEs 32806 may interface directly with the PDE controller 32808, for example utilizing a direct electrical connection with a command voltage (e.g., a low and high voltage, or a zero and fixed voltage, etc.), and direct electrical connection with a sensor signal (e.g., a raw voltage provided by the PDE 32806, possibly with the associated sensor directly wired to the sensor output interface, where the PDE controller 32808 includes processing to convert the electrical value to the sensed value). The embodiment of FIG. 328 provides a highly capable, distributed PDE 32806 system providing the desired circuit arrangement and circuit protection options, while allowing the individual PDE 32806 elements to be very low cost. For example the PDEs 32806 may be purely electro-mechanical devices without any processing, controllers, or other functionality. In certain embodiments, one or more PDEs 32806 may include certain minimal processing, such as a low level A/D processing circuit for the associated sensor. In certain embodiments, a contactor of one or more of the PDEs 32806 may be a solid state contactor, providing for a low-cost contact within the individual PDE 32806, where leakage currents may be acceptable for a given power bus, and/or may be removed from another mechanical contact provided elsewhere in the system (e.g., on a high side or low side of the high voltage battery 32814).

Reference FIGS. 265 and 266 for alternate embodiments of a mobile application having a PDE controller 32808 and a number of distributed, low cost PDEs 32806. In certain embodiments, the mobile application 32802 further includes a battery controller 32810, and/or a vehicle controller 32812. An example mobile application 32802 includes the PDE controller 32808 positioned on the battery controller 32810 and/or on the vehicle controller 32812, in whole or part. Accordingly, in certain embodiments, the PDE controller 32808 can have reduced capability (e.g., limited I/O only capable to interface with a portion of the PDEs 32806, and/or providing only one of the control commands or receiving the sensor inputs). In certain embodiments, the PDE controller 32808 is not a separate hardware device, and the cost of the PDE controller 32808 can be avoided entirely (except any incremental cost the battery controller 32810 and/or vehicle controller 32812 required to host the PDE controller 32808 functions, which may be negligible depending on the mobile application 32802). In the example of FIG. 328, the PDE controller 32808, the battery controller 32810, and the vehicle controller 32812 are communicatively coupled through a network (e.g., along communication path C), which may be a CAN bus or other network.

Referencing FIG. 329, an example high voltage battery pack 32902 for a mobile application is depicted. The example high voltage battery pack 32902 is positioned within a housing 32904, and includes a number of PDEs 32906 positioned within the housing 32904, and interposed between the high voltage battery pack 32902 and a corresponding electrical interface 32908 of the housing 32904. The example of FIG. 329 controls the high side of each power bus 32910 controlled thereby, although in certain embodiments one or more of the PDEs 32906 could control the low side of a given power bus 32910. The electrical interfaces 32908 may include a connector interface, for example allowing a standard or defined connector to plug in to the electrical interface 32908, providing convenient access to the associated power bus 32910. One or more, or all, of the electrical interfaces 32908 include an interlock 32912, such that if a connector is not connected to the electrical interface 32908, the associated PDE 32906 disconnects power from the associated power bus 32910. Accordingly, during a service event or accident disconnection of a connector, the exposed connection surfaces are not energized. It will be understood that, for a power bus 32910 having a PDE 32906 controlling the low side of the power bus 32910, an interlock 32912 would not be effective. The power busses 32910 may have configurable voltage ranges. The PDEs 32906 include at least a contactor, but may additionally or alternatively include a breaker/rely, a current sensor, a fuse, a current injection component (e.g., to determine fuse and/or contactor resistance/impedance values), and/or any other features or aspects described in relation to a PDE and/or a breaker/relay throughout the present disclosure. Additional features that may be present in the example of FIG. 329, without limitation, are set forth in the examples of FIG. 310.

Referencing FIG. 330, an apparatus for measuring a high voltage with high accuracy (e.g., a range of 0-1000V with +/−1% accuracy, and better) is schematically depicted. The example apparatus include a high voltage bus 33002 having a high voltage value of interest (e.g., a voltage bus for a motive power circuit and/or charging circuit for a motive power application). The example apparatus includes a voltage divider 33006 coupled to the high voltage bus 33002 on an input side, and providing a proportionate low voltage 33008 (divided by factor $K_1$ 33018) on an output side. The apparatus further includes an isolated low voltage source 33004. The isolated low voltage source 33004 should be completely electrically independent of the high voltage bus 33002, as the isolated low voltage source 33004 provides a known voltage, and errors in the known voltage of the isolated low voltage source 33004 will be multiplied significantly in the output of the voltage sensor of FIG. 330. The apparatus further includes a voltage comparator 33010 having the isolated low voltage source 33004 and the proportional low voltage 33008 as inputs, and providing an output voltage difference, which is a representation of the high voltage value of interest 33012, as an output. In certain embodiments, the proportionate low voltage 33008 and/or the representation of the high voltage value of interest 33012 could be utilized to determine the high voltage value of interest. However, it has been demonstrated that the representation of the high voltage value of interest 33012 can be processed into an ordinary-range sensor value providing for a convenient interface to presently available algorithms for utilizing sensor voltage determinations, while maintaining both the accuracy and responsiveness of the sensor. Accordingly, in certain embodiments, the apparatus includes a voltage normalizer 33014 the uses the output voltage difference (representation of the high voltage value 33012) as input, and applies a selected gain (factor $K_2$ 33020) and a selected offset (offset $K_3$ 33022), providing a high voltage value of interest 33016. In certain embodiments, the high voltage value of interest 33016 can be provided as a scaled value typical of ordinary sensor outputs, for example a 0-5V value, a 0-6V value, and/or a value with reserved range for diagnostics and other processing (e.g., 0.5-4.5 V, 0.5-5.5 V, etc.).

In certain embodiments, the division factor $K_1$ is selected to provide a comparable value to the isolated low voltage, and to provide an output range of the representation of the high voltage value 33012 that can readily and accurately be scaled by the voltage normalizer 33014 into the desired sensor output equivalent. An example determination for the division factor $K_1$ is $$\frac{Vh2 - Vh1}{Vr2 - Vr1} * k,$$

where Vh2, and vh1 represent the high and low ranges of the detected high voltage (or at least the boundaries wherein accurate sensing is desired), where Vr2 and Vr2 represent the ranges of the high voltage value of interest 33016 to be utilized (e.g., the lowest and highest signal values, excluding reserved ranges), and where k is the $K_2$ 33020 gain factor for the voltage normalizer 33014. For example, where the high voltage range is 0-1000V, where the output sensor value is expected to be 0.5-4.5 V, and where the gain factor $K_2$ is 2, the division factor $K_1$ is accordingly 200.

In certain embodiments, the operation of the voltage divider, voltage comparator, and voltage normalizer are performed as operations by solid state components. Accordingly, the operation of the voltage sensor depicted in FIG. 330 is performed almost instantaneously, and the high voltage value of interest 33016 is provided with sufficient response for motive power control, motive power circuit protection, gate driver control, and other high speed electrical functions relevant to a motive power circuit of a mobile application. An example implementation of an apparatus consistent with the example of FIG. 330 is provided in FIGS. 201-205 and the related description. An example embodiment includes a sensor such as depicted in FIG. 330 for each of a number of high voltage values, for example one for each bus of an inverter providing three-phase power to a motor.

Referencing FIG. 331, an example procedure for providing a high accuracy sensor for a high voltage signal (e.g., a power bus) is depicted. The example procedure includes an operation 33102 to access a high voltage from a high voltage bus having a high voltage value of interest, an operation 33104 to divide the high voltage by a selected division factor, and an operation 33106 to determine a voltage difference between the divided high voltage an isolated low reference voltage. The procedure includes an operation 33108 to provide the voltage as a low voltage representation of the high value voltage of interest. In certain embodiments, the procedure includes an operation 33110 to normalize the low voltage representation, for example by providing a selected gain and offset, and to provide the normalized voltage as a high voltage output value.

Referencing FIG. 332, an example procedure for diagnosing a component fault using a sensed high voltage value is depicted. The example procedure includes an operation 33202 to operate a drive motor for a mobile application using a three-phase power input, and an operation 33204 to determine a high voltage value corresponding to each phase of the three-phase power input. In certain embodiments, the determination of the high voltage value may include utilizing a sensor that operates a voltage divider and compares the divided voltage to a known isolated low voltage. In certain embodiments, the determination of the high voltage value may utilize a shunt resistor voltage sensor in one or more operating regions of each of the three-phase power inputs. The example procedure further includes an operation 33206 to determine a drive motor speed response, and an operation 33208 to diagnose a fault of the drive motor in response to the high voltage value corresponding to each phase of the three-phase power input and the drive motor speed response. In certain embodiments, operations 33206, 33208 utilize the drive motor torque response, either additionally or in the alternative. For example, operation 33208 may include determining that the drive motor is experiencing a lower than expected power or efficiency condition, and/or that the condition relates to a given phase, position, or component of the drive motor (e.g., by determining whether the condition is present overall, present with a time-based frequency response, and/or present in a phase-based response coinciding with one or more of the phases). An example procedure includes an operation 33210 to determine that a DC capacitor fault is present in response to the high voltage value (e.g., depending upon charge/discharge speed of the DC capacitor, voltage rise or drop trajectories against expected trajectories, and/or frequency-based or voltage-based sensitivities to these). An example procedure includes an operation 33212 to determine an inverter driver fault in response to the high voltage value corresponding to each phase of the three-phase power input. For example, where a phase-specific voltage gap is shown on the input bus voltage (e.g., based on generated voltage, voltage rise time, and/or voltage trajectories), it may be determined that an inverter driver has a fault condition. In certain embodiments, for example where multiple inverter drivers are providing power to the deficient phase, operation 33212 may include an operation to adjust the inverter driver to phase mapping, and confirm whether the fault is related to the inverter driver or to electronic components of the phase (e.g., bus damage or the like). Any operations of the procedure may include combining the phase specific high voltage information with other information available in the system, such as active faults, sensor response values and sensor faults or conditions, temperature values related to various components, cross-domain information (e.g., information correlated in a domain besides the time domain, such as frequency domain, phase domain, operating condition domain, etc.) to determine which component is a source or suspected source of a deficiency. An example operation 33208, 33210, 33212 to determine a fault condition may include adjusting an operating condition of the drive motor, for example by reducing a power throughput through the DC capacitor, changing an inverter driver providing power to one of the phases (e.g., shutting down the inverter driver, and/or changing a phase it is contributing to), and/or inducing a transient power event for the drive motor. In certain embodiments, adjusting an operating condition of the drive motor may include determining a desired adjustment, observing nominal operating conditions of the drive motor (e.g., to perform a mission of the mobile application), and performing the determination of the fault code condition once the desired adjustment is performed through nominal operations (e.g., performing an opportunity based diagnostic). In certain embodiments, adjusting an operating condition of the drive motor may include determining a desired adjustment, observing nominal operating conditions of the drive motor (e.g., to perform a mission of the mobile application), and performing the determination of the fault code condition once the desired adjustment can be performed consistent with the mission performance of the drive motor (e.g., performing a transparent diagnostic operation), and/or performing the determination of the fault code condition once the desired adjustment can be performed within an acceptable margin of disruption to the mission performance of the drive motor (e.g., performing a minimally or acceptably disruptive diagnostic operation). In certain embodiments, the determination to perform a diagnostic operation as a passive (or opportunistic), transparent, or minimally/acceptably disruptive (or active) operation may be performed based upon the potential consequences of a failure of the suspected component (e.g., efficiency loss, performance reduction, or mission disabling, etc.), the current operating conditions of the mobile application, and/or the likelihood and/or time frame that an opportunity to perform the diagnostic will ordinarily be presented (e.g., at a steady state condition, shutdown, startup, service or maintenance event, etc.).

Referencing FIG. 333, an example apparatus for providing power to transfer in a DC/DC converter assembly 33302 for a mobile application. The example apparatus includes the DC/DC converter assembly selectively coupled to a power source 33304 on a first side, to a high voltage battery 33306 on a second side, and to a low voltage battery 33308 on a third side. Each side of the DC/DC converter assembly 33302 may include a configurable interface for the coupling of the various sources and/or loads, and further may correspond to a position relative to a magnetic component of the DC/DC converter assembly 33302, and may not correspond to a geometric side of the DC/DC converter assembly 33302. The example DC/DC converter assembly 33302 includes a first winding 33310 positioned on the first side, and configured for a selected power source voltage (e.g., a voltage for a target power source, such as a grid power connection, a particular charging device, or the like). The first winding 33310 configured for the selected power source voltage indicates that the winding configuration and related electronic components (e.g., associated inductors and/or capacitors providing the voltage change and power transfer across the magnetic component 33312) are selected to provide an efficient power exchange, for example providing a resonant frequency that is determined in response to the selected voltage. The voltage at the power source 33304 varies considerably depending upon the charging device, and accordingly a single best winding configuration is not possible. However, the first winding 33310 configuration may be selected intelligently based upon a most likely power source 33304 configuration, to minimize inefficiency (e.g., for a worst reasonable case match of the power source 33304), and/or to maximize efficiency (e.g., for a best reasonable case match of the power source 33304, a most common power source 33304 configuration, and/or a recommended power source 33304 configuration). The example DC/DC converter assembly 33302 further includes a second winding 33314 positioned on a second side, and configured for a selected high voltage battery 33306 voltage. For example, the second winding 33314 and related electronic components may be configured to provide a resonant frequency determined at a voltage of the high voltage battery 33306 corresponding to a mean charging state of the battery (e.g., determined from historical data, related application data, according to a planned duty cycle of the mobile application, and/or a modeled or simulated value), and/or corresponding to a maximum charging rate (e.g., a minimum voltage of the battery that supports a maximum charging rate). The example DC/DC converter assembly 33302 further includes a third winding 33316 positioned on the second side, and configured for a selected low battery voltage 33308. For example, the third winding 33316 and related electronic components may be configured to provide a resonant frequency at a voltage of the low voltage battery 33308 corresponding to a mean charging state of the battery (e.g., determined from historical data, related application data, according to a planned duty cycle of the mobile application, and/or a modeled or simulated value), and/or corresponding to a maximum charging rate (e.g., a minimum voltage of the battery that supports a maximum charging rate). In the example of FIG. 333, the first winding 33310, second winding 33314, and third winding 33316 share magnetic components 33312. In the example of FIG. 333 as depicted, the high voltage battery 33306 cannot charge the low voltage battery 33308 while charging from the power source 33304 without the third winding 33316 exposed to the same voltage variability inherent to the power source 33304. Accordingly, in certain embodiments, a separate magnetic component may be provided that allows isolated power transfer from the high voltage battery 33306 to the low voltage battery 33308 (e.g., reference FIGS. 255, and 321).

Referencing FIG. 334, an example DC/DC converter assembly 33302 further includes a fourth winding 33402 positioned on the first side, where the fourth winding 33402 is configured for a second selected power source voltage. For example, the first winding 33310 configuration may be an optimized configuration for a first power source 33304 (e.g., a high capacity charger, a common charging device, etc.) and the second winding 33402 configuration may be an optimized configuration for a second power source 33304. It can be seen that, with two input windings 33310, 33402, the winding configuration of the first winding 33310 may be distinct in the embodiment of FIG. 334 relative to the embodiment of FIG. 333, because the first winding 33310 of FIG. 333 is necessarily a compromised design to accommodate the possibility of multiple power source 33304 voltages, while at least one of the windings 33310, 33402 can be optimized, if desired, for a target power source 33304. In certain embodiments, for example where multiple significantly distinct voltage levels of power sources 33304 may be applicable to a mobile application, both windings 33310, 33402 may be compromise designs to situate best within the available power source 33304 space. In certain embodiments, each winding 33310, 33402 may be configured to support voltage ratings at each end of a range, and/or close to each end of a range, to minimize the net voltage gain across a range of charging devices and/or charging events. For example a first selected power source voltage (e.g., used to configure the first winding 33310) may be a power source voltage corresponding to a maximum current operation for high voltage battery charging with a single phase power component for a designated power rating, and a second selected power source voltage (e.g., used to configure the fourth winding 33402) may be a power source voltage corresponding to a maximum current operation for high voltage battery charging with a three-phase power component for a designated power rating (the second selected power source voltage would be 2×-3× the first power source voltage for power components having a similar power delivery rating in the example).

Referencing FIG. 321, an example DC/DC converter includes a first winding and a fourth winding (e.g., the power source side windings of the first power electronics component 32102 and the second power electronics component 32108 of FIG. 321) having separate magnetic components 32116, and may share a same power transfer rating, or may have distinct power transfer ratings. In another embodiment, referencing FIG. 335, the first winding 33310 and fourth winding 33402 may have separate magnetic components 33312, 33504, where the DC/DC converter would utilize a fifth winding 33502 on the second side coupling the fourth winding 33402 to the high voltage battery 33306. In the example of FIG. 335, the third winding 33316 is depicted as coupled to the magnetics 33504, but could alternately be coupled to the magnetics 33312, or have a dedicated coupling the to high voltage battery 33306 as described previously. In certain embodiments, the example of FIG. 335 allows partial or full charging capability of the high voltage battery 33306 from the power source 33304 through the first winding 33310, depending upon the rating of the first winding 33310 and the power source 33304.

Referencing FIG. 336, an example DC/DC converter 33302 includes a sixth winding 33602 positioned on the first side, where the sixth winding 33602 is configured for a selected wireless charging source (e.g., the sixth winding 33602 and related components are configured for a wireless charging voltage, and related pickup components are tuned for maximum inductive coupling with a wireless charging device, including location, resonant frequency selection of the pickup, and the like). The sixth winding 33602 is depicted as coupled to the magnetic components 33504, but may be coupled with any of the magnetics in the system, provided with dedicated magnetics, or the like. In the example of FIG. 336, the magnetic components 33504 allow coupling between the wireless charging device and either the low voltage battery 33308 or the high voltage battery 33306.

With reference to any one of FIGS. 334, 335, 336, an example charging circuit (e.g., on a controller—not shown—such as a controller configured to perform switching operations to perform selective coupling functions for power transfers through the DC/DC converter assembly 33302) interprets a high voltage battery charging condition (e.g., which power device 33304 is connected, and/or which charging modes are supported or allowed) and provides charging through a selected one of the first winding 33310 or the fourth winding 33402 in response to the high voltage battery charging condition.

Referencing FIG. 337, an example motive power circuit is depicted, having a high voltage battery 33702, an electrical load 33704, and a power bus 33706 coupling the high voltage battery 33702 to the electrical load 33704. The power bus 33706 is a high current capability electrical path, for example to provide motive power to a mobile electric application. Control of the mobile electric application requires high accuracy current detection across a wide range of voltage values, which are not typically supported by previously known current sensors such as a Hall effect sensor. The example of FIG. 337 includes a PDU 33708 having a current sensor therein, such as a Hall effect sensor. The positioning of the Hall effect sensor in the PDU 33708 is for convenience of the present description, although the Hall effect currents sensor may be positioned anywhere within the motive power circuit, such as within an inverter (e.g., to measure a bus of a phase of a drive motor power input), within a breaker/relay positioned in the motive power circuit, and/or in serial with a fuse positioned in the motive power circuit.

The example motive power circuit further includes a shunt resistor sensor 33710. The shunt resistor sensor 33710 is highly reliable and accurate within the sensing range of the sensor (e.g., until heat generation in the sensor causes drift at a high current, and/or resistance tolerances on the shunt resistor increase the error band at a low current). Accordingly, the shunt resistor sensor 33710 can be configured, with proper resistance selection, to support high accuracy sensing in a selected regime. In certain embodiments, the shunt resistor sensor 33710 is configured to provide accurate current determination at a lower end of a voltage range for the motive power circuit, and the Hall effect sensor is utilized at a higher end of the voltage range for the motive power circuit. In certain embodiments, the shunt resistor 33710 is configured to provide accurate current determination at a higher end, or within a selected range, of the voltage range for the motive power circuit. The circumstances of the system, including duty cycles and high value efficient operating regions, adjust the current ranges where high accuracy sensing is desirable. In certain embodiments, a number of shunt resistor sensors 33710 having a range (or ranges) of interest for high accuracy, are provided. The coordination of the shunt resistor 33710 with the low cost Hall effect sensor provides for improved current sensing performance and efficiency of the mobile application. The position of the example shunt resistor sensor 33710 is for convenience of description, and the shunt resistor sensor 33710 may be positioned at any position of interest in the motive power circuit.

The example of FIG. 337 includes a controller 33712 having a current definition circuit structured to determine a current regime of the high current capability electrical path, a current selection circuit structured to determine a sensor utilization value in response to the current regime (e.g., selection of the shunt resistor sensor value or a Hall effect sensor value), a current determination circuit structured to determine a current value of the high current capability electrical path in response to the current regime and a current signal from at least one of the first hall effect current sensor or the second shunt resistor current sensor. For example, the current selection circuit may utilize the shunt resistor sensor within a selected operating range or a valid operating region, and/or may further consider whether the shunt resistor sensor is presently providing a reliable current indication (e.g., rationality checks, rate of change relative to the conditions of the system, and/or a temperature value of the shunt resistor). In certain embodiments, the current selection circuit may utilize a threshold current value to determine the current regime of the motive power circuit (which may be determined based on the sensed current, a nominal estimated current, or the like). An example current selection circuit provides a hysteresis to the sensor utilization value (e.g., to avoid cycling between sensors), such as requiring a number of consistent sensor changes before applying the sensor change, applying a buffer before exiting a current regime, and/or the hysteresis may favor the shunt resistor sensor or the Hall effect sensor. An example current determination circuit performs a smoothing operation on the current value in response to a change in the sensor utilization value, for example applying a low pass filter, a moving average, or other smoothing operation in a region where the sensor utilization value passes from one sensor to the other sensor.

Referencing FIG. 338, an example system for performing power distribution diagnostics in a mobile electric application is depicted. The system includes a diagnostics circuit 33802 including a diagnostic switching element 33804 in series with an electrical sensor 33806, wherein the electrical sensor 33806 includes a resistive element and monitors at least one electrical characteristic, such as a voltage or a current. The diagnostic circuit 33802 is electrically connected in parallel with a direct current switching element 33810 disposed in a circuit path of a direct current bus (e.g., a motive power circuit). The system includes a controller 33808 configured to generate an output signal to switch the diagnostic switching element from an open position to a closed position, to monitor the at least one electrical characteristic of the electrical sensor, and to determine a diagnostic condition for an electrical load on the direct current bus based on the monitoring of the at least one electrical characteristic.

An example output signal of the controller is modulated to emulate a resistance trajectory—for example where the diagnostic switching element is a solid state switch, where the output signal provides for a pulse width modulated (PWM) operation of the diagnostic switching element to emulate an increasing resistance value, a capacitive element, and/or an inductive element (e.g., emulating a resistance in response to a rate of change of the current through the diagnostic switching element).

An example controller 33808 determines the diagnostic condition as one of a fault condition of the electrical load, or a normal operating condition of the electrical load. An example fault condition an electrical short condition on the direct current bus coupled with a normal operating condition as an electrical overload condition of the electrical load (e.g., where the electrical overload may indicate a separate failure, but is expected operation in response to an exceeded voltage or other condition). An example fault condition is an open condition of the direct current bus, coupled with a normal operating condition as an active condition of the electrical load. An example controller determines the diagnostic condition as a device type of the electrical load.

An example controller 33808 analyzes the monitored electrical characteristic a frequency analysis operation such as a fast Fourier transform to determine the diagnostic condition, where at least one frequency component of from the frequency analysis contributes the diagnostic condition (e.g., helping to identify a source of noise, a device type, a position in the circuit of the device, and/or a proximate circuit configuration (e.g., related to an observed resonant frequency) to the device.

An example controller 33808 analyzes the monitored electrical characteristic to determine an electrical characteristic time profile at least in part to determine the diagnostic condition. An example controller 33808 analyses the monitored electrical characteristic to determine a rate of change, a derivative of the rate of change, to apply a filter, and/or to operate a diagnostic model to the monitored electrical characteristic.

An example controller 33808 generates a second output signal to switch the diagnostic switching element to return from the closed position to the open position, wherein a time interval between generating the output signal and generating the second output signal is a momentary time interval less than a predetermined value, and the resistive element has a power rating less than a required power rating for the direct current bus.

An example controller 33808 includes a secondary diagnostic circuit having a second diagnostic switching element in series with a second electrical sensor comprising a second resistive element, the second electrical sensor structured to monitor at least one secondary electrical characteristic, wherein the secondary diagnostic circuit is electrically connected in parallel with the diagnostic circuit. The example controller 33808 is further structured to generate a second output signal to switch the second diagnostic switching element from an open position to a closed position, to monitor the at least one secondary electrical characteristic of the second electrical sensor, and determine a secondary diagnostic condition for the electrical load based on the monitoring of the at least one secondary electrical characteristic. The example second resistive element has a second resistive value that is less than a resistive value of the resistive element.

Referencing FIG. 339, an example solid state pre-charge circuit for a direct current bus 33910 of a vehicle is depicted. The example of FIG. 339 includes a solid state switching element 33902 that provides a switching resistance therethrough is response to an applied control voltage. The example of FIG. 338 includes a controller 33904 that generates an output signal that is coupled to the solid-state switching element, and an electrical sensor 33906 that monitors an electrical characteristic of the direct current bus (which may include the parallel bypass circuit for a main contactor 33912 during operations of the pre-charge circuit). The example of FIG. 338 includes the solid-state switch as a transistor, such as a MOSFET. The electrical characteristic may be a voltage or a current value. An example embodiment includes a passive resistor 33908 in series with the solid-state switching element 33902. In certain embodiments, the passive resistor 33908 may be omitted, and/or may be sized at a lower resistance than in previously known systems, as the solid state switching element 33902 can provide for current limiting and/or resistance-emulating operations during a pre-charge operation.

An example embodiment includes the controller 33904 providing the output signal to the switching element 33902 during a pre-charge cycle, and/or limiting the current in the direct current bus 33910 during the pre-charge cycle. In certain embodiments, for example depending upon the current rating of the parallel bypass circuit having the solid state switching element 33902, and/or the presence and/or resistance of the passive resistor 33908, the parallel bypass circuit may operate as a main contacting circuit for the direct current power bus 33910, and/or may operate as main contacting circuit providing for limited operating capability such as limp home capability, an emergence power capability, a diagnostic and/or service operation capability, or the like. In certain embodiments, the controller 33904 provides the output signal to the solid state switching element 33902 to provide a PWM signal to operate the parallel bypass circuit. In certain embodiments, the controller 33904 adjusts the duty cycle and/or frequency of the PWM signal to emulate an electrical characteristic with the solid state switch, such as a resistance value, an inductive value, and/or a capacitive value. In certain embodiments, the controller 33904 adjusts the output signal to emulate a resistance trajectory—for example a rising or falling resistance value. In certain embodiments, the controller 33904 adjusts the output signal based at least in part on a capacitance (e.g., designed, designated, and/or detected, and which may be updated over time) of the direct current bus 33910. In certain embodiments, the controller 33904 adjusts the output signal based at least in part on an inductance (e.g., designed, designated, and/or detected, and which may be updated over time) of the direct current bus 33910. In certain embodiments, the controller 33904 adjusts the output signal to increase a duty cycle of the PWM signal in response to an increase in the voltage on the direct current bus 33910, and/or to maintain a current level or current trajectory through the direct current bus 33910. In certain embodiments, the controller 33904 adjusts the output signal to increase a duty cycle of the PWM signal in response to a duration of the pre-charge cycle.

It can be seen that the utilization of a pre-charge circuit as depicted in FIG. 339 provides for numerous improvements over previously known systems. For example, the arrangement of FIG. 339 allows for more rapid completion of a pre-charge operation, improved protection of components of the direct current power bus 33910 during pre-charge operations, determination of system changes over time (e.g., exhibited capacitance, resistance, and/or inductance), flexibility to maintain a consistent pre-charge operation in view of changes in the component configuration of the direct current power bus 33910 (e.g., due to variability in capacitor residual charge, battery voltage, switch states and/or the circuit volume of the direct current power bus 33910, and the like), and/or the ability to execute diagnostic operations through the manipulation of current and/or voltage trajectories, and/or the injection of frequency based components onto the direct current power bus 33910.

Referencing FIG. 340, an example procedure for operating a pre-charge circuit for a mobile application is depicted. The example procedure includes an operation 34002 to provide a power input at an input terminal of the solid-state switching element positioned in a parallel bypass circuit of a main contactor for a direct current power bus of the mobile application. The procedure further includes an operation 34004 to monitor an electrical characteristic of the direct current power bus, and an operation 34006 to generate a control signal to control switching of the solid-state switching element. The example procedure further includes an operation 34008 to modulate an electrical characteristic of the solid-state switching element (e.g., an emulated resistance, inductance, and/or capacitive trajectory), and/or an applied electrical input (e.g., a current and/or voltage trajectory).

In embodiments, a design and manufacturing processes for additively printing fuse elements and pyrotechnic elements used for high power applications such as battery charging in electric vehicles may be provided. Additively printing fuse elements is described herein, and similar processes may be used to print pyrotechnic devices, such as printing fuse elements together with pyrotechnic elements on the same structure (e.g., on the same substrate). In embodiments, an integrated fuse and pyro device may be produced through 2D/3D printing techniques. An integrated device that can provide functionality of a fuse along with precision in response time of a pyro device, the pyro device created by adding a layer of highly energetic material that can be activated by a low power signal. This configuration can provide protection in an electrical system, such as protection to electric vehicles. Electric vehicle circuits need protection at quick response time but have to last a long time. Current fuse-based technologies can not address both. In embodiments, a printed fuse-pyro device may utilize 2D/3D printing technology to print copper over ceramic elements. At certain precisely controlled locations, high energy materials (including but not limited to plastic explosives, TNT, and the like) are introduced that serve the pyro functionality. In embodiments, circuits needed to trigger the pyro may also be printed, such as in the same device.

Referring to FIG. 341, in embodiments a system for a vehicle 34102 may include a power distribution unit 34104 having a motive current protection circuit 34106 disposed in a motive electrical power path 34118, the motive current protection circuit including a thermal fuse circuit element 34108 and a pyrotechnic switch circuit element 34110 disposed in the motive electrical power path, such as where the printed thermal fuse circuit element and the pyrotechnic switch circuit element are electrically coupled in a series arrangement. The fuse circuit element may include a restricted conductive path structure 34112 (e.g., printed structures with reduced conductive pathways, and configured to melt when a predetermined threshold current is maintained through the restricted conductive path structure) disposed in the motive electrical power path and the pyrotechnic switch circuit element may include an active material 34114 (e.g., high energy materials) operationally coupled to the motive electrical power path, such as disposed on, around, or near a second restricted conductive path structure 34116, where the active material is operationally coupled to the second restricted conductive path structure, a and where the restricted conductive path structure is configured to electrically open circuit when the active material is activated (e.g., when the active material is commanded to activate). For example, high energy material may be disposed on or around the motive electrical power path so that when the high energy material is triggered energy is released that opens the circuit. The high energy material and the conductive pathway may be printed into configurations that yield reliable conduction prior to triggering the active material (e.g., during regular operations) and that yield reliable opening of the conductor when the active material is activated (e.g., when the active material is triggered to active). Both the fuse circuit element and the pyrotechnic switch circuit element may include printed elements that enable greater control of the configurations of the fuse element and the pyrotechnic element.

In embodiments, the second restricted conductive path structure for the pyrotechnic element may have a higher current threshold than the first restricted conductive path for the fuse element, such that the fuse element opens due to thermal heating before pyrotechnic element. As such, the thermal fuse element provides protection to the motive electrical path through heating due to current, and the pyrotechnic element provides protection through commanding, such as having a high current capacity. In embodiments, the mechanical restriction may include a plurality of layered conductive structures (e.g., stacked, rings, cylinders, and the like). The active material may then be disposed on or near the restriction. For example, the active material may be encapsulated around the restriction of the motive electrical path, such as where the active material is encapsulated around the motive electrical path in concentric layers, encapsulated around the motive electrical path with radially disposed geometric features (e.g., to increase surface contact between the active material and the motive electrical path), and the like. In embodiments, a pyrotechnic switch trigger circuit may be provided as part of the printing process, such as applied over the substrate by the printing process, where the pyrotechnic switch trigger circuit triggers the active material to activate by a received trigger command.

In embodiments, the printed elements may be applied over a substrate, such as a ceramic-based substrate. The printed elements may include a material that forms a metallurgical bond with the substrate. The substrate may have a high thermal conductivity (as compared to a class of electrically insulative substrates) to promote the removal heat from the restricted conductive path structure. A layer of dielectric (e.g., glass-based material) may be interposed between the restricted conductive path structure and the substrate, and/or between the active material and the substrate. The printing process may include a printing of a first conductive path structure on a first side of the substrate and printing of a second conductive path structure on a second side of the substrate. The substrate may be mounted to a formed metallic structure, such as including a metallic form disposed in a cooling media (e.g., where the cooling media is sand).

In embodiments, the first and second restricted conductive path structures may be configured in a geometric structural configuration, such as a circular structural configuration element, rectangular structural configuration element, hexagonal structural configuration element, slotted structural configuration element, multilayer structural configuration element, and the like. In embodiments, adjacent thickness of a portion of the configuration may be different than a geometric structural configuration element thickness, such as where the connecting conductive material between a fuse element and a pyrotechnic element may be thicker than the restrictive conductive path of the fuse element and/or the pyrotechnic element.

Referring to FIG. 342, an apparatus may include a current detection circuit 34202 structured to determine a current flow through a motive electrical power path 34118 and to selectively provide a pyrotechnic open command in response to the current flow in conjunction with the current protection circuit 34106 disposed in the motive electrical power path including the thermal fuse circuit element 34108 and the pyrotechnic switch circuit element 34110 electrically coupled and disposed in the motive electrical power path, where the pyrotechnic switch circuit element is responsive to the pyrotechnic open command to open the motive electrical power path.

Referring to FIG. 343, in embodiments, a first step 34302 of a method may be provided (e.g., such as during operations of the vehicle) for powering a motive electrical power path of a vehicle through a current protection circuit comprising a printed thermal fuse circuit element having a restricted conductive path structure disposed in the motive electrical power path, and a pyrotechnic switch circuit element comprising a printed pyrotechnic element disposed in the motive electrical power path. In a second step 34304, then selectively opening the motive electrical power path by performing at least one of: 34306 opening the printed fuse circuit element as a thermal response of the printed fuse circuit element to a current flow through the motive electrical power path, or 34308 opening the printed fuse circuit element in response to a pyrotechnic open command In embodiments, the pyrotechnic open command may be in response to a value of the current flow through the motive electrical power path, in response to a shutdown request for the motive electrical power path, and the like.

Referring to FIG. 344, in embodiments, a first step 34402 of a method may be provided (e.g., such as during a manufacturing process) for printing a thermal fuse circuit element having a restricted conductive path structure. In a second step 34404, printing a pyrotechnic switch circuit element including a printed pyrotechnic element. In a third step 34406, electrically coupling the first thermal fuse circuit element and the pyrotechnic switch circuit, thereby forming a current protection circuit, and in a fourth step 34408 integrating the current protection circuit into a motive electrical power path for a motive application. In embodiments, the printing may be a 3D printing process, such as where the 3D printing process includes a process of material deposition/melting, lithography, sintering, laminate layers, and the like. The printing process may be a screen-printing process, such as where the screen-printing process is used successively to provide a laminate 3D layered process. The printing may be an ink jet printing process, such as where the ink jet printing process is used successively to provide a laminate 3D layered process. The printing is a printing in place process (e.g., where electrically coupling is done by the printing). The printing process may include developing a variable cross-sectional thickness structure of at least one of the restricted conductive path structures, such as to create structures that reliably thermally fail based on the variable cross-sectional thickness structure, reliably mechanically fail based on the variable cross-sectional thickness structure, and the like.

Referring again to different configurations for the pyrotechnic element relative to the motive electrical power path, such as disposed on, around, or near the second restricted conductive path structure, the configuration may include layered and/or featured elements that contribute to an improved efficiency of opening the motive electrical power path at the point of the activated active material, such as with layers, rings, cylinders, opening, indents, and the like. In an example, referring to FIG. 345A, a conductor 34512 may be surrounded by the active material 34510, such as in the active material surrounding the conductor at a single location (e.g., a printed sphere on a linear portion of the conductor), along a length of conductor (e.g., a printed cylinder along the length of the conductor), and the like. In another example, referring to FIG. 345B, active material 34514 may be disposed inside a conductor 34518 portion (e.g., such as along a short cylinder section), and optionally and additionally surrounding the conductor, such as in features 34516 (e.g., indents, grooves, valleys, and the like) around the outside of the conductor. In another example, referring to FIG. 345C, multiple active layers of conductor 34520, 34524, and 34528 may be inter-layered with multiple layers of active material 34522 and 34526. These examples are not meant to be limiting in any way but are meant to be illustrative of how a printing process may create configurations that increase the efficiency and/or accuracy and reduce the footprint for a fuse-pyro combined device. Further, the example descriptions may also be described with the conductor and active material reversed, such as where in FIG. 345A the active material is surrounded by the conductor. In another example, referring to FIG. 345D, a window 34534 may be provided through a layer to provide additional function during the activation of the active material. In embodiments, an interior active material (at least to some extent) may increase mechanical integration with the conductor and takes up less of the current carrying capacity of the conductor, as it has less area per unit of radial extent than the radial shells near the surface. There may also be a skin effect to the current flow driving more current capacity to the outer portion (this is generally an AC effect, but in a highly transient current environment it could occur in a DC conductor). In embodiments, the dielectric near the active material may also simplify ignition, by reducing any effects of the power current passing through the area near or (otherwise) in contact with the active material. Note also that the active material may include a first and second material, such as an initiator and a utility material, such as using a primary charge to initiate, and a gas generating charge to suppress the arc. In embodiments, a printed process nature may allow for closely controlled configuration of multiple active materials, allowing each to perform their respective function better and/or allowing better access to the initiator to the electrical control input. In embodiments, the pyrotechnic element may include mechanical aspects in conjunction with the circuit opening action of the pyrotechnic element (e.g., a piston or a blade that is pyro-powered), where the active and conductive elements within a configuration may be closely integrated with or printed around the mechanical element.

Referencing FIG. 274, a schematic perspective view of a DC/DC converter assembly having a number of features and aspects set forth in the present disclosure. The example assembly provides capability to connect to an 11 kW charging device for charging a high voltage battery pack, and provides for 3.7 kW of charging to the low voltage battery. The example DC/DC converter assembly includes breaker/relay circuit protection to provide for controlled power circuit protection response, combined with a physical response, for example if opening controls and/or a current sensor fail to operate properly. The example DC/DC converter assembly provide for compact packaging, and a low number of interfaces. Referencing FIG. 275, a simplified block diagram view of a DC/DC converter assembly is depicted having a number of features and aspects set forth in the present disclosure, and generally consistent with the embodiment depicted in FIG. 274. Referencing FIG. 276, a simplified block diagram view of a DC/DC converter assembly is depicted having a number of features and aspects set forth in the present disclosure. Relative to the embodiment depicted in FIG. 275, the embodiment of FIG. 276 includes breaker/relay circuit protection for the high voltage battery, and the service disconnect has been moved to a high voltage interlock loop to reduce personnel exposure to potential live connections. FIG. 277 provides a simplified view of certain sub-assemblies consistent with the embodiment depicted in FIG. 275.

FIG. 278 provides a perspective view and a simplified top view of a DC/DC converter assembly having a number of features and aspects set forth in the present disclosure. FIG. 279 is a top view showing the layout of certain components of the DC/DC converter, consistent with the embodiment depicted in FIG. 278. FIG. 280 is a top view showing aspects of the power flow through a DC/DC converter assembly consistent with the embodiments depicted in FIGS. 278 and 279. FIG. 281 is a top view showing the communication pathing for certain control signals of the DC/DC converter, consistent with the embodiment depicted in FIG. 281. FIG. 282 is a simplified top view of the DC/DC converter, consistent with the embodiment depicted in FIGS. 278-281, and showing optional positions for some of the terminals for certain embodiments. FIG. 283 depicts an example service configuration of a DC/DC converter consistent with the embodiment depicted in FIGS. 278-282.

FIG. 284 depicts a schematic block diagram of a modular on-board charger consistent with aspects of the present disclosure. FIG. 285 depicts a schematic block diagram of a modular on-board charger consistent with aspects of the present disclosure. FIG. 286 depicts communication flow-paths of an example modular on-board charger consistent with aspects of the present disclosure. FIG. 287 is a schematic block diagram of a DC converter consistent with aspects of the present disclosure. FIG. 288 depicts an auxiliary control board for a DC/DC converter with aspects of the present disclosure. FIG. 289 is a schematic circuit depiction of a DC converter assembly consistent with aspects of the present disclosure. FIG. 290 depicts a perspective view and a portion of a schematic circuit depiction of a DC/DC converter consistent with aspects of the present disclosure. FIG. 291 depicts a schematic block diagram of a DC converter element and a schematic circuit depiction consistent with aspects of the present disclosure. FIG. 292 is a schematic circuit depiction of an EMC surge filter consistent with DC converter elements of the present disclosure. FIG. 293 is a schematic flow depiction of a thermal analysis procedure, for example utilizable in determining a cooling scheme, usable in aspects of the present disclosure. FIG. 294 is a schematic cutaway view of an example breaker/relay device consistent with aspects of the present disclosure. FIG. 295 is a simplified comparison diagram including a breaker relay device. FIG. 296 depicts an example operating curve for a breaker relay device. FIG. 297 is a perspective view of an on-board charging module with the housing removed, consistent with aspects of the present disclosure. FIG. 298 is a perspective view of an alternate embodiment of an on-board charging module with the housing removed, consistent with aspects of the present disclosure. FIG. 299 is a simplified comparison diagram including a breaker relay device. FIG. 300 depicts a number of cutaway views of embodiments of example breaker/relay devices.

The methods and systems described herein may be deployed in part or in whole through a machine having a computer, computing device, processor, circuit, and/or server that executes computer readable instructions, program codes, instructions, and/or includes hardware configured to functionally execute one or more operations of the methods and systems disclosed herein. The terms computer, computing device, processor, circuit, and/or server, as utilized herein, should be understood broadly.

Any one or more of the terms computer, computing device, processor, circuit, and/or server include a computer of any type, capable to access instructions stored in communication thereto such as upon a non-transient computer readable medium, whereupon the computer performs operations of systems or methods described herein upon executing the instructions. In certain embodiments, such instructions themselves comprise a computer, computing device, processor, circuit, and/or server. Additionally or alternatively, a computer, computing device, processor, circuit, and/or server may be a separate hardware device, one or more computing resources distributed across hardware devices, and/or may include such aspects as logical circuits, embedded circuits, sensors, actuators, input and/or output devices, network and/or communication resources, memory resources of any type, processing resources of any type, and/or hardware devices configured to be responsive to determined conditions to functionally execute one or more operations of systems and methods herein.

Network and/or communication resources include, without limitation, local area network, wide area network, wireless, internet, or any other known communication resources and protocols. Example and non-limiting hardware, computers, computing devices, processors, circuits, and/or servers include, without limitation, a general purpose computer, a server, an embedded computer, a mobile device, a virtual machine, and/or an emulated version of one or more of these. Example and non-limiting hardware, computers, computing devices, processors, circuits, and/or servers may be physical, logical, or virtual. A computer, computing device, processor, circuit, and/or server may be: a distributed resource included as an aspect of several devices; and/or included as an interoperable set of resources to perform described functions of the computer, computing device, processor, circuit, and/or server, such that the distributed resources function together to perform the operations of the computer, computing device, processor, circuit, and/or server. In certain embodiments, each computer, computing device, processor, circuit, and/or server may be on separate hardware, and/or one or more hardware devices may include aspects of more than one computer, computing device, processor, circuit, and/or server, for example as separately executable instructions stored on the hardware device, and/or as logically partitioned aspects of a set of executable instructions, with some aspects of the hardware device comprising a part of a first computer, computing device, processor, circuit, and/or server, and some aspects of the hardware device comprising a part of a second computer, computing device, processor, circuit, and/or server.

A computer, computing device, processor, circuit, and/or server may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer readable instructions on a server, client, firewall, gateway, hub, router, or other such computer and/or networking hardware. The computer readable instructions may be associated with a server that may include a file server, print server, domain server, internet server, intranet server and other variants such as secondary server, host server, distributed server and the like. The server may include one or more of memories, processors, computer readable transitory and/or non-transitory media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, and the like. Additionally, this coupling and/or connection may facilitate remote execution of instructions across the network. The networking of some or all of these devices may facilitate parallel processing of program code, instructions, and/or programs at one or more locations without deviating from the scope of the disclosure. In addition, all the devices attached to the server through an interface may include at least one storage medium capable of storing methods, program code, instructions, and/or programs. A central repository may provide program instructions to be executed on different devices. In this implementation, the remote repository may act as a storage medium for methods, program code, instructions, and/or programs.

The methods, program code, instructions, and/or programs may be associated with a client that may include a file client, print client, domain client, internet client, intranet client and other variants such as secondary client, host client, distributed client and the like. The client may include one or more of memories, processors, computer readable transitory and/or non-transitory media, storage media, ports (physical and virtual), communication devices, and interfaces capable of accessing other clients, servers, machines, and devices through a wired or a wireless medium, and the like. The methods, program code, instructions, and/or programs as described herein and elsewhere may be executed by the client. In addition, other devices utilized for execution of methods as described in this application may be considered as a part of the infrastructure associated with the client.

The client may provide an interface to other devices including, without limitation, servers, other clients, printers, database servers, print servers, file servers, communication servers, distributed servers, and the like. Additionally, this coupling and/or connection may facilitate remote execution of methods, program code, instructions, and/or programs across the network. The networking of some or all of these devices may facilitate parallel processing of methods, program code, instructions, and/or programs at one or more locations without deviating from the scope of the disclosure. In addition, all the devices attached to the client through an interface may include at least one storage medium capable of storing methods, program code, instructions, and/or programs. A central repository may provide program instructions to be executed on different devices. In this implementation, the remote repository may act as a storage medium for methods, program code, instructions, and/or programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules, and/or components as known in the art. The computing and/or non-computing device(s) associated with the network infrastructure may include, apart from other components, a storage medium such as flash memory, buffer, stack, RAM, ROM and the like. The methods, program code, instructions, and/or programs described herein and elsewhere may be executed by one or more of the network infrastructural elements.

The methods, program code, instructions, and/or programs described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like.

The methods, program code, instructions, and/or programs described herein and elsewhere may be implemented on or through mobile devices. The mobile devices may include navigation devices, cell phones, mobile phones, mobile personal digital assistants, laptops, palmtops, netbooks, pagers, electronic books readers, music players, and the like. These mobile devices may include, apart from other components, a storage medium such as a flash memory, buffer, RAM, ROM and one or more computing devices. The computing devices associated with mobile devices may be enabled to execute methods, program code, instructions, and/or programs stored thereon. Alternatively, the mobile devices may be configured to execute instructions in collaboration with other devices. The mobile devices may communicate with base stations interfaced with servers and configured to execute methods, program code, instructions, and/or programs. The mobile devices may communicate on a peer to peer network, mesh network, or other communications network. The methods, program code, instructions, and/or programs may be stored on the storage medium associated with the server and executed by a computing device embedded within the server. The base station may include a computing device and a storage medium. The storage device may store methods, program code, instructions, and/or programs executed by the computing devices associated with the base station.

The methods, program code, instructions, and/or programs may be stored and/or accessed on machine readable transitory and/or non-transitory media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

Certain operations described herein include interpreting, receiving, and/or determining one or more values, parameters, inputs, data, or other information. Operations including interpreting, receiving, and/or determining any value parameter, input, data, and/or other information include, without limitation: receiving data via a user input; receiving data over a network of any type; reading a data value from a memory location in communication with the receiving device; utilizing a default value as a received data value; estimating, calculating, or deriving a data value based on other information available to the receiving device; and/or updating any of these in response to a later received data value. In certain embodiments, a data value may be received by a first operation, and later updated by a second operation, as part of the receiving a data value. For example, when communications are down, intermittent, or interrupted, a first operation to interpret, receive, and/or determine a data value may be performed, and when communications are restored an updated operation to interpret, receive, and/or determine the data value may be performed.

Certain logical groupings of operations herein, for example methods or procedures of the current disclosure, are provided to illustrate aspects of the present disclosure. Operations described herein are schematically described and/or depicted, and operations may be combined, divided, re-ordered, added, or removed in a manner consistent with the disclosure herein. It is understood that the context of an operational description may require an ordering for one or more operations, and/or an order for one or more operations may be explicitly disclosed, but the order of operations should be understood broadly, where any equivalent grouping of operations to provide an equivalent outcome of operations is specifically contemplated herein. For example, if a value is used in one operational step, the determining of the value may be required before that operational step in certain contexts (e.g. where the time delay of data for an operation to achieve a certain effect is important), but may not be required before that operation step in other contexts (e.g. where usage of the value from a previous execution cycle of the operations would be sufficient for those purposes). Accordingly, in certain embodiments an order of operations and grouping of operations as described is explicitly contemplated herein, and in certain embodiments re-ordering, subdivision, and/or different grouping of operations is explicitly contemplated herein.

The methods and systems described herein may transform physical and/or or intangible items from one state to another. The methods and systems described herein may also transform data representing physical and/or intangible items from one state to another.

The elements described and depicted herein, including in flow charts, block diagrams, and/or operational descriptions, depict and/or describe specific example arrangements of elements for purposes of illustration. However, the depicted and/or described elements, the functions thereof, and/or arrangements of these, may be implemented on machines, such as through computer executable transitory and/or non-transitory media having a processor capable of executing program instructions stored thereon, and/or as logical circuits or hardware arrangements. Example arrangements of programming instructions include at least: monolithic structure of instructions; standalone modules of instructions for elements or portions thereof; and/or as modules of instructions that employ external routines, code, services, and so forth; and/or any combination of these, and all such implementations are contemplated to be within the scope of embodiments of the present disclosure Examples of such machines include, without limitation, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements described and/or depicted herein, and/or any other logical components, may be implemented on a machine capable of executing program instructions. Thus, while the foregoing flow charts, block diagrams, and/or operational descriptions set forth functional aspects of the disclosed systems, any arrangement of program instructions implementing these functional aspects are contemplated herein. Similarly, it will be appreciated that the various steps identified and described above may be varied, and that the order of steps may be adapted to particular applications of the techniques disclosed herein. Additionally, any steps or operations may be divided and/or combined in any manner providing similar functionality to the described operations. All such variations and modifications are contemplated in the present disclosure. The methods and/or processes described above, and steps thereof, may be implemented in hardware, program code, instructions, and/or programs or any combination of hardware and methods, program code, instructions, and/or programs suitable for a particular application. Example hardware includes a dedicated computing device or specific computing device, a particular aspect or component of a specific computing device, and/or an arrangement of hardware components and/or logical circuits to perform one or more of the operations of a method and/or system. The processes may be implemented in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and computer readable instructions, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or computer readable instructions described above. All such permutations and combinations are contemplated in embodiments of the present disclosure.

While the methods and systems described herein have been disclosed in connection with certain preferred embodiments shown and described in detail, various modifications and improvements thereon may become readily apparent to those skilled in the art. Accordingly, the spirit and scope of the methods and systems described herein is not to be limited by the foregoing examples, but is to be understood in the broadest sense allowable by law.

All documents referenced herein are hereby incorporated by reference.

What is claimed is:

1. A system for power distribution in a mobile electric application, comprising:

a high voltage energy storage device;

a low voltage energy storage device;

an alternating current (AC) external interface configured to selectively couple a plurality of AC load/source components, wherein the AC external interface comprises a switch having a first position that electrically couples the plurality of AC load/source components to the high voltage energy storage device, and a second position that electrically isolates the plurality of AC load/source components from the high voltage energy storage device, wherein the second position of the switch comprises a closed position, and wherein the closed position of the switch bypasses a coupling inductor between the high voltage energy storage device and the AC external interface.

2. The system of claim 1, wherein the plurality of AC load/source components comprise a grid connection and an AC load connection.

3. The system of claim 2, wherein the grid connection comprises a charging connection.

4. The system of claim 2, wherein the grid connection comprises a 3-phase AC connection.

5. The system of claim 2, wherein the AC load connection comprises a consumer AC access.

6. The system of claim 1, wherein the switch in the second position electrically couples the high voltage energy storage device to the low voltage energy storage device.

7. A method, comprising:

operating a mobile electric application having a high voltage energy storage device, a low voltage energy storage device, and an alternating current (AC) external interface;

selectively operating a switch between:

a first position that electrically couples the high voltage energy storage device to the AC external interface and electrically isolates the high voltage energy storage device from the low voltage energy storage device; and a second position that electrically couples the high voltage energy storage device to the low voltage energy storage device and electrically isolates the high voltage energy storage device from the AC external interface, wherein the operating comprises a charging mode by selectively operating the switch to the second position, and controlling charging from the AC external interface to the high voltage energy storage device.

8. The method of claim 7, wherein the operating comprises a driving mode by selectively operating the switch to the first position, and controlling direct current DC-DC conversion between the high voltage energy storage device and the low voltage energy storage device.

9. The method of claim 8, further comprising controlling the DC-DC conversion by powering a controller with the high voltage energy storage device.

10. The method of claim 8, further comprising controlling the DC-DC conversion by powering a controller with the low voltage energy storage device.

11. The method of claim 7, further comprising controlling the charging by powering a controller with the low voltage energy storage device.

12. The method of claim 11, further comprising controlling the charging by pausing the charging in response to the low voltage energy storage device having a state-of-charge below a threshold state-of-charge, operating the switch in the second position to charge the low voltage energy storage device, and returning to the charging in response to the low voltage energy storage device having a state-of-charge exceeding a second threshold state-of-charge.

13. A method, comprising:

operating a mobile electric application having a high voltage energy storage device, a low voltage energy storage device, and an alternating current (AC) external interface;

selectively operating a switch between:

a first position that electrically couples the high voltage energy storage device to the AC external interface and electrically isolates the high voltage energy storage device from the low voltage energy storage device; and a second position that electrically couples the high voltage energy storage device to the low voltage energy storage device and electrically isolates the high voltage energy storage device from the AC external interface, wherein the operating comprises a discharging mode by selectively operating the switch to the second position, and controlling discharging from the high voltage energy storage device to the AC external interface.

14. The method of claim 13, further comprising controlling the discharging by synchronizing the discharging to a grid coupled to the AC external interface.

15. The method of claim 13, further comprising controlling the discharging by providing power to at least one of a grid or an AC load coupled to the AC external interface.

16. A controller, comprising:

a mobile application circuit structured to interpret an electrical distribution mode;

a distribution switch circuit structured to provide a switch position command in response to the electrical distribution mode; and a switch configured to be responsive to the switch position command, wherein the switch comprises:

a first position that electrically couples a high voltage energy storage device to an AC external interface and electrically isolates the high voltage energy storage device from a low voltage energy storage device; and a second position that electrically couples the high voltage energy storage device to the low voltage energy storage device and electrically isolates the high voltage energy storage device from the AC external interface.

17. The controller of claim 16, wherein the electrical distribution mode comprises at least one mode selected from the modes consisting of: a discharging mode providing power from the high voltage energy storage device to the AC external interface; a charging mode providing power from the AC external interface to the high voltage energy storage device; and a low voltage charging mode providing power from the high voltage energy storage device to the low voltage energy storage device.

18. The controller of claim 16, wherein the electrical distribution mode comprises a discharging mode providing power from the high voltage energy storage device to the AC electrical interface, the controller further comprising a power configuration circuit structured to synchronize power provided from the high voltage energy storage device with a grid electrically coupled to the AC external interface.

* * * * *